US007117162B1

(12) United States Patent
Seal et al.

(10) Patent No.: US 7,117,162 B1
(45) Date of Patent: Oct. 3, 2006

(54) SYSTEM AND METHOD FOR FACILITATING MANAGING A JOB

(75) Inventors: William M. Seal, Chelsea, AL (US); Terry L. Small, Irondale, AL (US); Carol A. Brechtel, Baton Rouge, LA (US); Gail W. Deaton, Hampton, GA (US); Ronnie M. Cochran, Martin, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 09/151,666

(22) Filed: Sep. 11, 1998

Related U.S. Application Data

(60) Provisional application No. 60/058,504, filed on Sep. 11, 1997, provisional application No. 60/058,570, filed on Sep. 11, 1997, provisional application No. 60/058,571, filed on Sep. 11, 1997, provisional application No. 60/058,572, filed on Sep. 11, 1997, provisional application No. 60/058,579, filed on Sep. 11, 1997, provisional application No. 60/058,580, filed on Sep. 11, 1997, provisional application No. 60/058,581, filed on Sep. 11, 1997, provisional application No. 60/058,582, filed on Sep. 11, 1997, provisional application No. 60/058,641, filed on Sep. 11, 1997, provisional application No. 60/058,657, filed on Sep. 11, 1997, provisional application No. 60/058,658, filed on Sep. 11, 1997.

(51) Int. Cl.
*G06Q 99/00* (2006.01)

(52) U.S. Cl. ................................ 705/9; 705/8; 705/26

(58) Field of Classification Search .................... 705/1, 705/7–9, 26, 28, 29; 700/99, 100, 106–110
See application file for complete search history.

(56) References Cited

U.S. PATENT DOCUMENTS

| | | | | |
|---|---|---|---|---|
| 4,885,694 | A * | 12/1989 | Pray et al. | 345/636 |
| 5,570,291 | A * | 10/1996 | Dudle et al. | 101/483 |
| 5,923,552 | A * | 7/1999 | Brown et al. | 700/100 |
| 6,216,108 | B1 * | 4/2001 | LeVander | 705/400 |

FOREIGN PATENT DOCUMENTS

JP 405250377 A * 9/1993

OTHER PUBLICATIONS

"Advanced Project Management Cost Optimization." IBM Technical Disclosure Bulletin, vol. 34, No. 12, pp. 61-64, May 1, 1992.*
"Material Logistics System." IBM Technical Bulletin, vol. 29, No. 4, pp. 1526-1530, Sep. 1986.*

(Continued)

*Primary Examiner*—Susanna M. Diaz
(74) *Attorney, Agent, or Firm*—Thomas, Kayden, Horestemeyer & Risley, LLP

(57) ABSTRACT

An outside Plant Construction Management (OSPCM) system simplifies and mechanizes many aspects of operating a facility, such as a Regional Bell Operating Company (RBOC). The OSPCM system performs a configuration function and this data is input to the awarded contract which entails breaking the job into its constituent tasks, sequencing the tasks, prioritizing the tasks, and scheduling the tasks. The OSPCM system completes the scheduling task by assigning the tasks to supervisors and/or to outside contractors. The OSPCM system automatically manages the materials required for tasks by determining what and when it is needed, ordering what is available from within inventory, and ordering necessary materials from outside providers. When a task is completed, the contractor accesses the OSPCM system and marks the task as completed. The OSPCM system then forwards invoices to the voucher system for those cases where work is completed as designed.

20 Claims, 153 Drawing Sheets

OTHER PUBLICATIONS

"BellSouth Selects Bentley and NetSpace Systems." Business Wire, p. 06181237, Jun. 18, 1997.*

Inglesby, Tom. "MES: Who, When, and Why." Industry Week, vol. 245, No. 21, p. A1(8), Nov. 18, 1996.*

* cited by examiner

Bid and Award
Prepare Bid Package

Job Entry EWO Contract Moves

Scheduling

Materials Management
Order Process

Materials Management
Inventory Process

Materials Management
Receipt Process

Materials Management
Assign and Transfer
Process

Materials Management Requrement Status and Issue Process

Materials Management
View Order Process

Job Entry Other - Approvals

6)

MP-10411

DATE: 07/20/1997 07:32 PM TABLE FOR OPEN PITLOG REPORT
CMC:XXXX

| JOB NUMBER | PRT | STEP | WORK ACTION | JOB TYPE | WORK LOCATION ADDRESS | TELCO OPEN PIT REQUEST DATE | CONTR OPEN PIT DATE | TELCO CLOSE PIT REQUEST DATE |
|---|---|---|---|---|---|---|---|---|
| RWF6N0 024 | 1 | 1 | PIT | RW | 6500 W. Military Trail Lot 426 | 07/17/1997 | 07/19/1997 | 07/21/1997 |
| RWF6N0 053 | 1 | 1 | PIT | RW | 4190 Centurian Circle | 07/17/1997 | 07/19/1997 | |
| RWF6N0 117 | 1 | 1 | PIT | RW | 5420 Maule Way Mangonia Park | 07/17/1997 | 07/19/1997 | |
| RWF6N0 256 | 1 | 1 | RW | RW | 1605 Lands End Rd. | 07/17/1997 | 07/19/1997 | 07/21/1997 |
| RWF6N0 339 | 1 | 1 | OPIT | RW | 12625 Whitby St RP | 07/18/1997 | 07/19/1997 | |
| RWF6N0 536 | 1 | 1 | OPIT | RW | 4451 E. Main St | 07/18/1997 | 07/19/1997 | 07/21/1997 |
| 7E891234 N | 1 | 12 | DIG | EWO | 2624 Muir Field Ct Royal Palm | 07/20/1997 | 07/20/1997 | 07/21/1997 |
| A1234 | 1 | 12CA | OPIT | EWO | 1345 Milk Drive | 07/20/1997 | 07/20/1997 | |
| PWO9123 4 | 1 | 2 | DIG | EWO | 4262 Tuna Fish Drive | 07/20/1997 | 07/20/1997 | 07/21/1997 |

FIG. 29

Date: 07/20/1997 07:32PM TABLE FOR PENDING OPEN REQUEST REPORT

CMC: XXXX

| JOB NUMBER | PRT | STEP | WORK ACTION | JOB TYPE | WORK LOCATION ADDRESS | TELCO OPEN PIT REQUEST DATE |
|---|---|---|---|---|---|---|
| RWF6N0 024 | 1 | 1 | PIT | RW | 6500 W. Military Trail Lot 426 | 07/17/1997 |
| RWF6N0 053 | 1 | 1 | PIT | RW | 4190 Centurian Circle | 07/17/1997 |
| RWF6N0 117 | 1 | 1 | PIT | RW | 5420 Maule Way Mangonia Park | 07/17/1997 |
| RWF6N0 256 | 1 | 1 | RW | RW | 1605 Lands End Rd. | 07/17/1997 |
| RWF6N0 339 | 1 | 1 | OPIT | RW\ | 12625 Whitby St RP | 07/18/1997 |
| RWF6N0 536 | 1 | 1 | OPIT | RW | 4451 E. Main St | 07/18/1997 |
| 7E891234 N | 1 | 12 | DIG | EWO | 2624 Muir Field Ct Royal Palm | 07/20/1997 |
| A1234 | 1 | 12CA | OPIT | EWO | 1345 Milk Drive | 07/20/1997 |
| PWO91234 | 1 | 2 | DIG | EWO | 4262 Tuna Fish Drive | 07/20/1997 |

ATE: 07/20/1997 07:32 PM TABLE FOR PENDING CLOSE REQUEST REPORT

CMC:XXXX

| JOB NUMBER | PRT | Step | Work Action | Job Type | WORK LOCATION ADDRESS | TELCO OPEN PIT REQUEST DATE | CONTR OPEN PIT DATE | TELCO CLOSE PIT REQUEST DATE |
|---|---|---|---|---|---|---|---|---|
| RWF6N0 024 | 1 | 1 | PIT | RW | 6500 W. Military Trail Lot 426 | 07/17/1997 | 07/19/1997 | 07/21/1997 |
| RWF6N0 256 | 1 | 1 | RW | RW | 1605 Lands End Rd. | 07/17/1997 | 07/19/1997 | 07/21/1997 |
| RWF6N0 536 | 1 | 1 | OPIT | RW | 4451 E. Main St | 07/18/1997 | 07/19/1997 | 07/21/1997 |
| 7E891234 N | 1 | 12 | DIG | EWO | 2624 Muir Field Ct Royal Palm | 07/20/1997 | 07/20/1997 | 07/21/1997 |
| PWO 91234 | 1 | 2 | DIG | EWO | 4262 Tuna Fish Drive | 07/20/1997 | 07/20/1997 | 07/21/1997 |

FIG. 31

Table For Open Pit Request

RW

MP-?????

Page 1

Date: 07/31/1997

Job Number RWF7N2610 Print 1 Step 1 Contract Number NFE999 Actual Work Date

CMC PALM Wire Center 561964 Complete Date

Work Address 4663 Jack & Jill Lane

Work Location Lake Worth Village Trailer Park Between Job Road and Military Trail Off Crew Number Lake Worth Road Any Questions Page Tech 821 @837-0903 Supervisor Larry Byrd Step Remarks Need Pit Dug For Terminal Replacement

| Status Code | RESID Telco Close Request Date | Action | CWI Code | EstCWIQty | Telco Open Pit Request Date | Contractor Open Date |
|---|---|---|---|---|---|---|
| OP | FNWPR5 | PIT | S001A | 1 | 07/31/1997 | |

Work Description: Need Pit Dug For Terminal Replacement. Pit Location Spay Painted On Ground.

FIG. 32

Table For Open Pit Request

EWO

MP-?????

Page 1

Date: 07/31/1997

Job Number A1234 Print 1 Step 1 Contract Number NFE999 Actual Work Date

CMC PALM Wire Center 561964

Complete Date

Work Address 4663 Jack & Jill Lane

Step Remarks Need Pit Dug For Terminal Replacement

| Status Code | RESID Telco Close Request Date | Work ID | Action | CWI Code | EstCWIQtv | Telco Open Pit Request Date | Contractor Open Date |
|---|---|---|---|---|---|---|---|
| OP | FNWPR5 | 1.102 | DIG | S001B | 1 | 07/31/1997 | |

FIG. 33

Table For Close Pit Request

RW

MP-?????

Page 1

Date: 07/31/1997

Job Number RWF7N2610 Print 1 Step 1 Contract Number NFE999

Actual Work Date

CMC PALM Wire Center 561964

Complete Date

Work Address 4663 Jack & Jill Lane

Work Location Lake Worth Village Trailer Park Between Job Road and Military Trail Off Crew Number Lake Worth Road Any Questions Page Tech 821 @837-0903 Supervisor Larry Byrd Step Remarks Need Pit Dug For Terminal Replacement

| Status Code | RESID | Action | CWI Code | EstCWIQty | Telco Open Pit Request Date | Contractor Open Date | Telco Close Request Date |
|---|---|---|---|---|---|---|---|
| OP | FNWPR5 | PIT | S001A | 1 | 07/31/1997 | 08/02/1997 | 08/04/1997 |

Work Description: Need Pit Dug For Terminal Replacement. Pit Location Spay Painted On Ground.

FIG. 34

Table For Close Pit Request

EWO

MP-?????

Page 1

Date: 07/31/1997

| | | | | | | | |
|---|---|---|---|---|---|---|---|
| Job Number | A1234 | Print | 1 | Step | 1 | Contract Number | NFE999 |
| Actual Work Date | | | | | | | |
| CMC | PALM | | | | | Wire Center | 561964 |
| Complete Date | | | | | | | |

Work Address 4663 Jack & Jill Lane

Remarks Need Pit Dug For Terminal Replacement

| Status Code | RESID | Action | Work ID | CWI Code | EstCWIQty | Telco Open Pit Request Date | Contractor Open Date | Telco Close Request Date |
|---|---|---|---|---|---|---|---|---|
| OP | FNWPR5 | DIG | 1.102 | S001A | 1 | 07/31/1997 | 08/03/1997 | 08/04/1997 |

FIG. 35

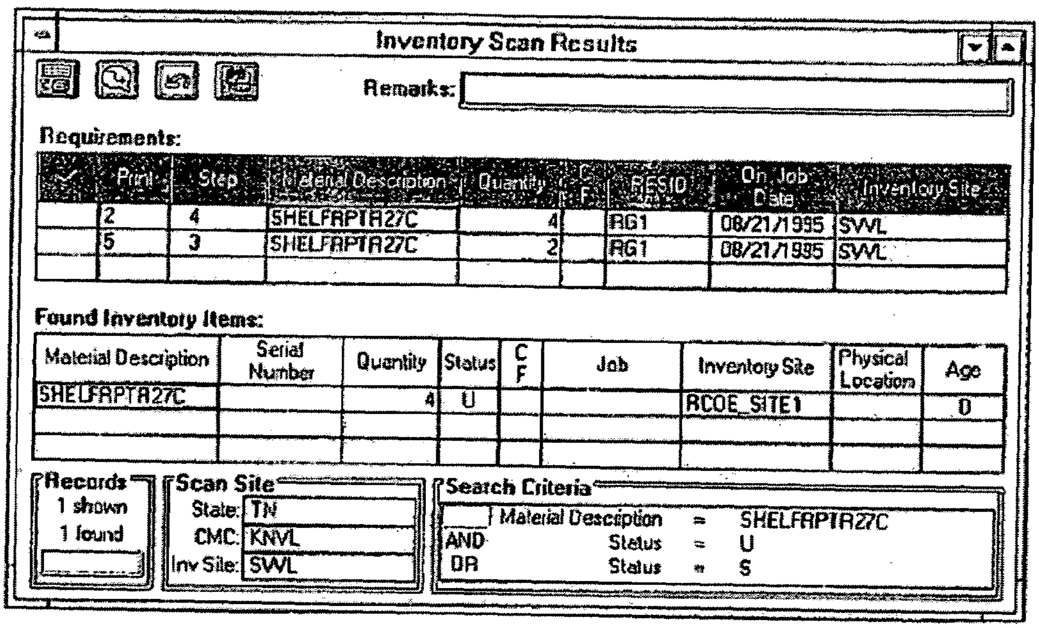

Inventory Scan Results

Remarks:

Requirements:

| ✓ | Print | Step | Material Description | Quantity | C F | RESID | On Job Date | Inventory Site |
|---|---|---|---|---|---|---|---|---|
| | 2 | 4 | SHELFRPTR27C | 4 | | RG1 | 08/21/1995 | SWL |
| | 5 | 3 | SHELFRPTR27C | 2 | | RG1 | 08/21/1995 | SWL |

Found Inventory Items:

| Material Description | Serial Number | Quantity | Status | C F | Job | Inventory Site | Physical Location | Age |
|---|---|---|---|---|---|---|---|---|
| SHELFRPTR27C | | 4 | U | | | RCOE_SITE1 | | 0 |

Records
1 shown
1 found

Scan Site
State: TN
CMC: KNVL
Inv Site: SWVL

Search Criteria

| | | | |
|---|---|---|---|
| | Material Description | = | SHELFRPTR27C |
| AND | Status | = | U |
| OR | Status | = | S |

FIG. 64

| Material Description | C F | Serial Number | Physical Location | Quantities: On Hand | Assigned | Un-assigned | Surplus | At Site | In Transit | Awaiting Return |
|---|---|---|---|---|---|---|---|---|---|---|
| BHAA-200 | | LOUEGJ3704 | | 250 | 0 | 0 | 250 | 0 | 0 | 0 |
| BHAA-200 | | K007119603 | | 350 | 0 | 0 | 0 | 0 | 0 | 350 |
| BHAA-200 | | LOUEGJ5006 | | 400 | 0 | 400 | 0 | 0 | 0 | 0 |
| BHAA-200 | | K007119604 | | 500 | 0 | 0 | 0 | 0 | 0 | 500 |
| BHAA-200 | | K007119605 | | 200 | 0 | 200 | 0 | 0 | 0 | 0 |
| BHAA-200 | | K007119606 | | 200 | 0 | 0 | 200 | 0 | 0 | 0 |
| BHAA-200 | | LOUEGK0134 | | 250 | 0 | 250 | 0 | 0 | 0 | 0 |
| BHAA-200 | | LOUEGL1224 | | 120 | 0 | 120 | 0 | 0 | 0 | 0 |
| BHAA-200 | | LOUEGL1240 | | 540 | 0 | 540 | 0 | 0 | 0 | 0 |
| BHAA-200 | | 0711960002 | | 920 | 0 | 920 | 0 | 0 | 0 | 0 |
| BHAA-200 | | LOUEGL3006 | | 1000 | 920 | 80 | 0 | 0 | 0 | 0 |
| BHAA-200 | | LOUEGL2055 | | 100 | 0 | 100 | 0 | 0 | 0 | 0 |

MP-10309
By: John Doe, jdjjj
Date: 11/10/1995 12:00:00 AM
Job: RECEIVING

INVESTMENT MANAGEMENT REPORT
REPORT PERIOD MM/DD/YYYY THRU MM/DD/YYYY
NUMBER OF DAYS IN PERIOD: XXX

PAGE: 1
STATE: TN
CMC: KNVL
INV SITE: SVVL
GROUP: ALL

| | JAN | FEB | MAR | APR | MAY | JUN | JUL | AUG | SEP | OCT | NOV | DEC |
|---|---|---|---|---|---|---|---|---|---|---|---|---|
| TOT. INVEST | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| CARRY COST | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| INVEST IND | XXX.XX | XXX.XX | XXX.XX | XXX.XX | XXX.XX | XXX.XX | XXX.XX | XXX.XX | XXX.XX | XXX.XX | XXX.XX | XXX.XX |
| | | | | | | | | | | | | |
| INVENTORY | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| TRANSFER OUT | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| PLACED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| RETURNED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| JUNKED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| ADDED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| DELETED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| EXEMPTED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| RECEIPTED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| RATIO PLC/RCT | XXX.XX | XXX.XX | XXX.XX | XXX.XX | XXX.XX | XXX.XX | XXX.XX | XXX.XX | XXX.XX | XXX.XX | XXX.XX | XXX.XX |
| DAYS STOCK | XXX.XX | XXX.XX | XXX.XX | XXX.XX | XXX.XX | XXX.XX | XXX.XX | XXX.XX | XXX.XX | XXX.XX | XXX.XX | XXX.XX |
| | | | | | | | | | | | | |
| XDAYS | | | | | | | | | | | | |
| INV > XDAYS | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| % INV > DAYS | XXX.XX | XXX.XX | XXX.XX | XXX.XX | XXX.XX | XXX.XX | XXX.XX | XXX.XX | XXX.XX | XXX.XX | XXX.XX | XXX.XX |
| CARRY COST | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| | | | | | | | | | | | | |
| YDAYS | | | | | | | | | | | | |
| INV > YDAYS | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| % INV > YDAYS | XXX.XX | XXX.XX | XXX.XX | XXX.XX | XXX.XX | XXX.XX | XXX.XX | XXX.XX | XXX.XX | XXX.XX | XXX.XX | XXX.XX |
| CARRY COST | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| | | | | | | | | | | | | |
| CABLE UNITS | XXX | | | | | | | | | | | |
| INV UNITS | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| TRANSFER OUT | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| PLACED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| RETURNED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| JUNKED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| ADDED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| DELETED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| EXEMPTED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| RECEIPTED | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX | XXXXXXXXXX |
| RATIO PLC/RCT | XXX.XX | XXX.XX | XXX.XX | XXX.XX | XXX.XX | XXX.XX | XXX.XX | XXX.XX | XXX.XX | XXX.XX | XXX.XX | XXX.XX |

| RESULTS | YEAR TO DATE DOLLARS | YEAR TO DATE MCF | YEAR TO DATE TOTAL FIBER | LAST 3 MONTHS DOLLARS | LAST 3 MONTHS MCF | LAST 3 MONTHS TOTAL FIBER |
|---|---|---|---|---|---|---|
| MATERIAL TRANSFERRED OUT | XXXXXXXXXX.XX | XXXXXXXXXX.XXX | XXXXXXXXXX.XXX | XXXXXXXXXX.XX | XXXXXXXXXX.XXX | XXXXXXXXXX.XXX |
| MATERIAL PLACED | XXXXXXXXXX.XX | XXXXXXXXXX.XXX | XXXXXXXXXX.XXX | XXXXXXXXXX.XX | XXXXXXXXXX.XXX | XXXXXXXXXX.XXX |
| MATERIAL RETURNED | XXXXXXXXXX.XX | XXXXXXXXXX.XXX | XXXXXXXXXX.XXX | XXXXXXXXXX.XX | XXXXXXXXXX.XXX | XXXXXXXXXX.XXX |
| MATERIAL JUNKED | XXXXXXXXXX.XX | XXXXXXXXXX.XXX | XXXXXXXXXX.XXX | XXXXXXXXXX.XX | XXXXXXXXXX.XXX | XXXXXXXXXX.XXX |
| MATERIAL ADDED | XXXXXXXXXX.XX | XXXXXXXXXX.XXX | XXXXXXXXXX.XXX | XXXXXXXXXX.XX | XXXXXXXXXX.XXX | XXXXXXXXXX.XXX |
| MATERIAL DELETED | XXXXXXXXXX.XX | XXXXXXXXXX.XXX | XXXXXXXXXX.XXX | XXXXXXXXXX.XX | XXXXXXXXXX.XXX | XXXXXXXXXX.XXX |
| MATERIAL EXEMPTED | XXXXXXXXXX.XX | XXXXXXXXXX.XXX | XXXXXXXXXX.XXX | XXXXXXXXXX.XX | XXXXXXXXXX.XXX | XXXXXXXXXX.XXX |
| MATERIAL RECEIPTED | XXXXXXXXXX.XX | XXXXXXXXXX.XXX | XXXXXXXXXX.XXX | XXXXXXXXXX.XX | XXXXXXXXXX.XXX | XXXXXXXXXX.XXX |
| RATIO MAT'L PLACED/RECEIPTED | XXX.XX | XXX.XX | XXX.XX | XXX.XX | XXX.XX | XXX.XX |
| AVG DAILY PLACEMENT | XXXXXXXXXX.XX | XXXXXXXXXX.XXX | XXXXXXXXXX.XXX | XXXXXXXXXX.XX | XXXXXXXXXX.XXX | XXXXXXXXXX.XXX |
| DAYS STOCK ON HAND | XXXX | XXXX | XXXX | XXXX | XXXX | XXXX |

* * * END OF REPORT * * *

FIG. 105

SAMPLE REPORT LAYOUT

MP-10306 MAJOR MATERIAL ACTIVITY REPORT Page: 1
FOR STATE : GA

By: Karin Oltzger, YJLGROD
Date: 08/20/1995 08:14:56 AM
Job: RMMMAJMA

MATERIAL JUNKED FROM CMC : ASHV
(Includes Transactions: Junk (JNK) and Reclassify to Exempt (RTE))

| Tran Type | Pair Size | Fiber Count | Cable Gauge | Material Description | Quantity | Value | Serial Number | From Location | To Location | Transaction Number | Transaction Date |
|---|---|---|---|---|---|---|---|---|---|---|---|
| JNK | | 2 | 17 | AL-34W216-036 | 220 | $77.00 | 6021110 | NUWA | | 07543042 | 07/06/1995 |
| JNK | 25 | | 22 | APAW-25 | 160 | $52.80 | LA10396 | INDV | | 07550097 | 07/11/1995 |
| RTE | 25 | | 22 | BHAS-25 | 300 | $123.00 | NC40650 | INDV | | 07554245 | 07/12/1995 |
| | | | | TOTALS | 680 | $252.80 | | | | | |

FIG. 106

MP-10306
By: Karlo Olinger, VJLGRQD
Date: 08/20/1995 08:14:56 AM
Job: RJ0D1MA/MA

MAJOR MATERIAL ACTIVITY REPORT
FOR STATE: GA

Page: 2

MATERIAL JUNKED FROM CMC : MACN
(Includes Transactions: Junk (JNK) and Reclassify to Exempt (RTE))

| Tran Type | Pair Size | Fiber Count | Cable Gauge | Material Description | Quantity | Value | Serial Number | From Location | To Location | Transaction Number | Transaction Date |
|---|---|---|---|---|---|---|---|---|---|---|---|
| JNK | 25 | | 22 | GFAW-25 | 140 | $46.20 | GA1110144 | GVPN | | 07594877 | 07/31/1995 |
| JNK | 25 | | 24 | BKMS-25 | 55 | $20.90 | NF30053 | WNRD | | 07553419 | 07/12/1995 |
| | | | | TOTALS | 195 | $67.10 | | | | | |

APPROVED BY: ______________________
NAME/TITLE (RETENTION PERIOD: 3 Years)

FIG. 107

MP-10306 | MAJOR MATERIA. ACTIVITY REPORT | Page: 3
FOR STATE : GA

By: Karla Olinger, YJLCRQD
Date: 08/10/1995 08:14:56 AM
Job: RMMMAJMA

INVENTORY RECORD ADJUSTMENTS FOR CMC : ASHV
(Includes Transactions: Inventory Addition (IA), Inventory Deletion (ID), Remove to Good (RM), Remove to Good Reversal (RMR), Recover from Junk (RCJ), and Reclassify from Exempt (RFE))

| Tran Type | Pair Size | Fiber Count | Cable Gauge | Material Description | Quantity | Value | Serial Number | From Location | To Location | Transaction Number | Transaction Date |
|---|---|---|---|---|---|---|---|---|---|---|---|
| IA | 25 | | 22 | ANAW-25 | 63 | $1.98 | 53436890 | | CHRY | 07543042 | 07/06/1995 |
| ID | | | | SOEDPM1R035CW | 1 | $49758.00 | 45465 | LCON | | 07589297 | 07/27/1995 |
| RCJ | | | | 10D1-50/30 | 3 | $169.83 | | | CHRY | 07569300 | 07/27/1995 |
| | | | | TOTALS | 67 | $49929.81 | | | | | |

Total value added to inventory: $171.83
Total value deleted from inventory: $49758.00

FIG. 108

MP-10306
By: Karla Olinger, YJLGRQD
Date: 08/20/1995 08:14:56 AM
Job: RMMMAJMA

MAJOR MATERIAL ACTIVITY REPORT
FOR STATE : GA

Page: 4

INVENTORY RECORD ADJUSTMENTS FOR CMC : MACN
(Includes Transactions: Inventory Addition (IA), Inventory Deletion (ID), Remove to Good (RM),
Remove to Good Reversal (RMR), Recover from Junk (RCJ), and Reclassify from Exempt (RFE))

| Tran Type | Pair Size | Fiber Count | Cable Gauge | Material Description | Quantity | Value | Serial Number | From Location | To Location | Transaction Number | Transaction Date |
|---|---|---|---|---|---|---|---|---|---|---|---|
| RFE | 1200 | | 24 | ANMW-1200 | 80 | $635.20 | GA122045 | | WNRD | 07594875 | 07/31/1995 |
| RM | 25 | | 22 | GFAW-25 | 140 | $46.20 | GA1110144 | | GYFN | 07594877 | 07/31/1995 |
| RMR | 25 | | 22 | GFAW-25 | 140 | $46.20 | GA1110144 | GYPN | | 07594530 | 07/31/1995 |
| | | | | TOTALS | 360 | $727.60 | | | | | |

Total value added to inventory: $681.40
Total value deleted from inventory: $46.20

FIG. 109

MP-10306
By: Karin Ollinger, YJLGRQD
Date: 08/20/1995 08:14:56 AM
Job: BMMMAJMA

MAJOR MATERIAL ACTIVITY REPORT
FOR STATE : GA

Page: 5

MATERIAL RETURNED TO SUPPLIER FROM CMC : ASHV
(Includes Transactions: Return (RT))

| Tran Type | Pair Size | Fiber Count | Cable Gauge | Material Description | Quantity | Value | Serial Number | From Location | To Location | Transaction Number | Transaction Date |
|---|---|---|---|---|---|---|---|---|---|---|---|
| RT | 200 | | 22 | GPAW-200 | 754 | $1470.30 | G1150033 | LCON | AN | 07553481 | 07/12/1995 |
| RT | 400 | | 24 | BKMA-400 | 76 | $188.48 | SC10056 | CHRY | LUCENT | 07582592 | 07/25/1995 |
| RT | 200 | | 22 | GPAW-200 | 754 | $1470.30 | G1150033 | LCON | LUCENT | 07553485 | 07/12/1995 |
| | | | | TOTALS | 1584 | $3129.08 | | | | | |

FIG. 110

MP-10306
By: Karin Olinger, VJLCROD
Date: 08/20/1995 00:14:50 AM
Job: RMMMAJMA

MAJOR MATERIAL ACTIVITY REPORT
FOR STATE : GA

Page: 6

MATERIAL TRANSFERRED OUT FROM CMC : ASHV
(Includes Transactions: Transfer (T) and Transfer Reversal (TRV))

| Tran Type | Pair Size | Fiber Count | Cable Gauge | Material Description | Quantity | Value | Serial Number | From Location | To Location | Transaction Number | Transaction Date |
|---|---|---|---|---|---|---|---|---|---|---|---|
| T | 200 | | 22 | GFAW-200 | 400 | $780.00 | G11400780 | LCON | ROMM | 07553481 | 07/12/1995 |
| T | 400 | | 24 | BKMA-400 | 76 | $188.48 | SC10056 | CHRY | ROMM | 07582592 | 07/25/1995 |
| TRV | 200 | | 22 | GFAW-200 | 400 | $780.00 | G1150033 | ROMM | LCON | 07553485 | 07/12/1995 |
| | | | | TOTALS | 876 | $1748.48 | | | | | |

FIG. 111

MP-10306 MAJOR MATERIAL ACTIVITY REPORT Page: 1
FOR STATE : GA

By: Karin Otinger, VJLGRQD
Date: 08/20/1995 08:14:56 AM
Job: RMMMAJMA

ORDER RECEIPT CORRECTIONS FOR CMC : ASHV
(Includes Transactions: Order Receipt Reversal (ORR))

| Trza Type | Pair Size | Fiber Count | Cable Gauge | Material Description | Quantity | Value | Serial Number | From Location | To Location | Transaction Number | Transaction Date |
|---|---|---|---|---|---|---|---|---|---|---|---|
| ORR | 200 | | 22 | GFAW-200 | 250 | $487.50 | G1156900 | LCON | | 07559005 | 07/12/1995 |
| ORR | 400 | | 24 | 0KMA-400 | 80 | $200.80 | 4C10053 | CHRY | | 07559200 | 07/25/1995 |
| | | | | TOTALS | 330 | $688.30 | | | | | |

FIG. 112

MP-10306
By: Karin Olinger, YJLCRQD
Date: 08/20/1995 08:14:56 AM
Job: RMMMAJMA

MAJOR MATERIAL ACTIVITY REPORT
FOR STATE : GA

Page: 8

DISBURSEMENT CORRECTIONS FOR CMC : ASHV
(Includes Transactions: Disbursement Reversal (DBR))

| Tran Type | Pair Size | Fiber Count | Cable Gauge | Material Description | Quantity | Value | Serial Number | From Location | To Location | Transaction Number | Transaction Date |
|---|---|---|---|---|---|---|---|---|---|---|---|
| DBR | 200 | | 22 | GFAW-200 | 75 | $146.25 | G114500 | | LCON | 07559020 | 07/12/1995 |
| DBR | 400 | | 24 | BKMA-400 | 100 | $251.00 | 3C12209 | | CHRY | 07559130 | 07/25/1995 |
| | | | | TOTALS | 175 | $397.25 | | | | | |

* END OF REPORT *

FIG. 113

SAMPLE REPORT LAYOUT

MP-10307 MATERIAL NOTIFICATION REPORT Page: 1
By: Karin Olinger, YJLGRQD FOR JOB NUMBER : 45G003456
Date: 08/20/1995 08:14:56 AM FOR RESOURCE ID : KKOT
Job: RMMMANOT

| Print | Step | Material Description | Quantity Required | Quantity Assigned | Serial Number | Reel Type | Custom Features? | Inventory Site | Bin Loc | Physical Location | Assigned Date |
|---|---|---|---|---|---|---|---|---|---|---|---|
| 1 | 1 | AFAW-100 | 1000 | 500 | G461902 | 415 | | SNLV | 45G | INV | 08/15/1995 |
| | | | | 500 | G561092 | 415 | | SNLV | 45H | INV | 08/15/1995 |
| 1 | 1 | AFAW-200 | 400 | 400 | .GC001321 | 420 | * | SNLV | 55F | ISS | 08/14/1995 |
| 1 | 5 | 10A1-50/30 | 3 | 2 | | | | SNLV | | ALT | 08/14/1995 |
| 2 | 3 | 10B1-50/30 | 3 | 2 | | | | SNLV | 602 | INV | 08/19/1995 |
| | | | | 1 | | | | SNLV | 605 | INV | 08/20/1995 |

* END OF REPOLT *

FIG. 114

SAMPLE REPORT LAYOUT

MP-10285
By: Karin Olinger, YJLGRQD
Date: 08/20/1995 08:14:56 AM
Job: RMMOPNOR

OPEN ORDER REPORT
FOR STATE : GA
DATE RANGE : 08/04/1995 - 08/20/1995

CMC : LAWR

Page: 1

| OrderMaster Number | OrderMaster Line Item | Material Description | Quantity | Order Date | Scheduled Ship Date | Inventory Site | Resource ID | Status | Ordered Late? | Custom Features? | Pre-Term? |
|---|---|---|---|---|---|---|---|---|---|---|---|
| Job: 45C003156 | | | | | | | | | | | |
| Q1234567 | 1 | AFAW-100 | 200 | 08/04/1995 | 08/23/1995 | SNLV | KKOT | ORDE | • | • | |
| Q1234567 | 2 | AFAW-200 | 400 | 08/04/1995 | | SNLV | KKOT | BKOD | | • | • |
| Q1234567 | 3 | 10A1-50/30 | 2 | 08/04/1995 | | SNLV | KKOT | CANC | | | |
| Job: 45C600890 | | | | | | | | | | | |
| Q1238902 | 1 | AFAW-50 | 100 | 08/15/1995 | 08/22/1995 | LRVL | MAS2 | ORDE | | | |
| Q1238902 | 2 | 10A1-50/30 | 2 | 08/15/1995 | 08/22/1995 | LRVL | RJMT | SHPD | | | |
| Q1238902 | 3 | ANAW-100 | 1000 | 08/15/1995 | 08/20/1995 | LRVL | MAS1 | RCVD | | • | |

MP-10285
By: Karin Olinger, YJLGRQD
Date: 08/20/1995 08:14:56 AM
Job: RMMOPNOR

OPEN ORDER REPORT
FOR STATE : GA
DATE RANGE : 08/04/1995 - 08/20/1995

CMC : ROME

Page: 2

| OrderMaster Number | OrderMaster Line Item | Material Description | Quantity | Order Date | Scheduled Ship Date | Inventory Site | Resource ID | Status | Ordered Late? | Custom Features? | Pre-Term? |
|---|---|---|---|---|---|---|---|---|---|---|---|
| Job: 45G891169 | | | | | | | | | | | |
| Q8907652 | 1 | 10A1-50/30 | 1 | 08/20/1995 | 08/22/1995 | ROMM | KKOT | ORDE | | | |
| Q8907652 | 2 | AFAW-200 | 400 | 08/20/1995 | 08/22/1995 | ROMM | KKOT | ORDE | | | |
| Q8907652 | 3 | 10A1-50/30 | 2 | 08/20/1995 | 08/22/1995 | ROMM | KKOT | ORDE | | | |

* End of Report *

Private/Proprietary. Not for use or disclosure outside BellSouth except by written permission. BellSouth OSPCM

FIG. 115

SAMPLE REPORT LAYOUT

MP-10308
By: Karin Olinger, YJLGRQD
Date: 08/20/1995 01:23:45 PM
Job: RMMOVAGM

OVER-AGE MATERIAL REPORT
INVENTORY SITE: SVVL

Page 1

| Job Number | Activity Number | Print | Step | Resource ID | Old Schedule Date | New Schedule Date | Material Description | Serial Number | Quantity | Receipt Date |
|---|---|---|---|---|---|---|---|---|---|---|
| 45G003456 | 1 | 1 | 2 | KKOT | 08/15/1995 | 09/25/1995 | AFAW-100 | S345903411 | 200 | 08/13/1995 |
| 45G006789 | 2 | 1 | 3 | KKOS | 08/21/1995 | 10/05/1995 | AFAW-200 | GA110789 | 400 | |
| 45G006789 | 3 | 1 | 4 | KKOT | 08/25/1995 | 10/06/1995 | 10A1-50/30 | | 2 | |

* END OF REPORT *

Private/Proprietary. Not for use or disclosure outside BellSouth except by written permission. BellSouth OSPCM

FIG. 116

SYSTEM AND METHOD FOR FACILITATING MANAGING A JOB

This application claims priority to patent application Ser. Nos. 60/058,504; 60/058,570; 60/058,571; 60/058,572; 60/058,579; 60/058,580; 60/058,581; 60/058,582; 60/058,641; 60/058,657; and 60/058,658, all concurrently filed on Sep. 11, 1997, the disclosures of which are incorporated herein by this reference.

FIELD OF THE INVENTION

The present invention relates generally to systems and methods for managing jobs and tasks and, more particularly, to systems and methods for managing outside plant construction contracts throughout the life-time of the contracts and for managing labor and materials from within a company.

BACKGROUND OF THE INVENTION

Many of the Regional Bell Operating Companies (RBOCs) inherited a system called Job Management Operation System (JMOS). As the name suggests, JMOS is used to manage jobs and is useful in tracking the status, staffing, and billing on various contracts performed on behalf of the RBOC. JMOS provides functionality in many aspects of job management, including employee time input, scheduling, and billing.

With regard to employee time input, JMOS requires employees to write down their time each day and provide their records to clerks. The clerks input the employees' time into JMOS. If the data is accepted by JMOS then it is fowarded to the payroll system (MTR) Mechanized Time Reporting system. The MTR system provides printouts back to the employees to verify the accuracy of the time reports. The employees provide the clerks with the necessary corrections which the clerks input again into JMOS. Thus, at the earliest, the time for an employee would not be provided to the MTR system until the next night. JMOS does not handle any exceptions to a regular scheduled day i.e. overtime or vacation time. This information had to be entered directly into the MTR system by the clerks.

The completion of tasks is accomplished in a similar manner. A technician, for instance, upon completion of a task would take the task off of a blue print and translate the task into a written report. The technician sends the report to a clerk who, the following day, interprets them and tries to enter them into JMOS. If the report is unintelligible, such as because the report is poorly written or was sent via facsimile, the clerk may incorrectly enter the task. If JMOS does not have a match for that task, then the clerk notifies the technician who then has to provide the correct information for entry into JMOS. The recording of a completed task would therefore take at least one full day, and possibly more, before JMOS is able to recognize the event.

The paying of contractor invoices is challenging with JMOS. When a task or tasks are completed, the contractor generates a written invoice and sends that invoice to the appropriate supervisor for approval. If the supervisor disagrees with the extent of work performed or the amount to be paid, the supervisor would note these concerns on the invoice which would be returned to the contractor. After the contractor and supervisor come to an agreement, the acceptable invoice is sent to the billing department. With the invoice, a clerk has to enter the invoice into JMOS and also some information into a voucher system in order to pay the contractor.

JMOS therefore suffers from a disadvantage in that it does not provide real-time data. As discussed above, the employees' time and the recognition of completed jobs are dated at least one day by the time they are entered into JMOS. The interface with the contractors presents even more delays in the processing of invoices and recognition of completed work. The current system requires the circulation of invoices to various departments within a company.

SUMMARY OF THE INVENTION

The present invention addresses the problems described above by providing systems and methods for managing jobs. A preferred embodiment of a system and method according to the invention is commonly referred to as Outside Plant Construction Management (OSPCM) system and method. The OSPCM system eliminates the need for much of the paperwork and clerical work required in conventional systems, thereby reducing workload and overhead. The OSPCM system covers virtually the entire contract life-time, including the bidding and awarding of the contract, the pricing, the entry of the job, the scheduling, the management of materials, the billing and reporting, and inspections.

The OSPCM system includes a regional contracts application for maintaining uniform information on contracts. The regional contracts application, for example, may code all work tasks of burying a cable as 101A and would include a unit price, such as $1.00 a foot. A bid and award application formulates a bid that is sent to each of the bidding contractors. The bid and award application fabricates this bid using historical data gathered from prior jobs and therefore can easily ascertain the needs of a particular contract. The bidders receive the bid package, either electronically or in printed form, and input their price information and other data and return their completed bids. The completed returns are input into the OSPCM system. The bid and award application is also used to view and evaluate the bids, to award the bid to one of the contractors, and to notify the bidders appropriately.

A job entry application in the OSPCM provides job details of a particular contract. The job entry application, for example, breaks down a contract into the individual tasks and sub-tasks and also performs a configuration process. The configuration process assigns standard time increments to all tasks. It assigns contract work items based on the contract in effect for the job. The configuration process also groups tasks into scheduling activities, sequences the tasks so that tasks dependent or otherwise tied to each are performed in the necessary order, and schedules the tasks and sub-tasks according to relative priorities and due dates. By using input data such as work action, the work environment, the materials category, the materials sub-category, and the materials size, the configuration process assigns resources. Supervisors, for example, may be limited in the types and sizes of tasks that they do and the configuration process assigns the supervisors their specific jobs.

A pricing application receives the output of the job entry application. The pricing application assigns prices to the tasks and sub-tasks and also obtains necessary approval for the charges. The pricing application provides its output to a budgeting system associated with the company.

A scheduling application also receives the output from the pricing application. The scheduling application uses this data to prioritize work activities. It has information on the work schedules of personnel and is able to schedule the tasks to the available personnel based on availability. It will take in to account vacation days and weekends along with holidays and other non-scheduled work days. The normal schedule days are entered and edited in the Workstation Module.

A materials management application manages the materials requirements of the various tasks. The materials management application determines the materials available from inventory, orders the appropriate materials from outside vendors or from other sites within the company, and tracks usage of the inventory. The materials management application also determines when the materials are needed based on the scheduling dates and orders the materials in advance after considering the delivery time associated with the materials. The materials management application provides its output to asset management systems within the company, such as its accounting system.

A workstation application within the OSPCM provides an interface by which time reporting personnel of the company can enter their time and arrange their work schedules directly with the OSPCM system. The personnel also report the completion of tasks in the OSPCM system.

A billing and reporting application within the OSPCM provides an interface to the contractors. Through the billing and reporting application, the contractors receive work and billing expectations, enter completions and/or changes to billing expectations. All information can be printed or saved to the contractors accounting system. The billing and reporting application compares the completed task to the design and sends any variations to a supervisor for approval (CIBE) change in billing expectations. Upon approval of a CIBE or if the work item did not vary from the design, the billing and reporting application prepares the invoice for payment.

An inspections application determines which ones of the tasks that have been marked as completed should be sampled and marked for inspection. The inspections application generates the inspection schedules and manages results of the inspections. The inspection application further receives input from company supervisors and contractors in the event that the inspection fails, such as input related to a contractor's appeal, revisions to the task, or contractor's acceptance of a failed inspection.

A management reports application provides the ability to generate and view various reports. These reports are accessed throughout the OSPCM process by the various applications.

BRIEF DESCRIPTION OF THE DRAWINGS

The accompanying drawings, which are incorporated in and form a part of the specification, illustrate preferred embodiments of the present invention and, together with the description, serve to explain the principles of the invention. In the drawings:

FIG. 29 is an exemplary table for Open Pitlog Report.

FIG. 30 is an exemplary table for Pending Open Request Report.

FIG. 31 is an exemplary table for Pending Close Request Report.

FIG. 32 is an exemplary table for Open Pit Request.

FIG. 33 is another exemplary table for Open Pit Request.

FIG. 34 is an exemplary table for Close Pit Request.

FIG. 35 is another exemplary table for Close Pit Request.

FIG. 64 is another exemplary screen print for Inventory Scan Results.

FIG. 94 is an exemplary screen print for Issues For.

FIG. 105 is an exemplary investment management report.

FIGS. 106–113 are exemplary major material activity reports.

FIG. 114 is an exemplary material notification report.

FIG. 115 is an exemplary open order report.

FIG. 116 is an exemplary over-age material report.

FIG. 122 is an exemplary screen print for OSPCM Material 0.93a.

FIG. 123 is an exemplary screen print for Needed Requirements for Job S8K87337N.

FIG. 124 is an exemplary screen print for Jobs Needed Today.

FIG. 125 is another exemplary screen print for Inventory Scan Results.

FIG. 126 is another exemplary screen print for Custom Features associated with cable.

FIG. 127 is another exemplary screen print for Custom Features associated with capacitors.

FIG. 128 is another exemplary screen print for Custom Features associated with non-standard pedestal cross-box.

FIG. 129 is another exemplary screen print for Custom Features associated with non-standard pole-mounted cross-box.

FIG. 130 is an exemplary screen print for Physical Location.

FIG. 131 is another exemplary screen print for Release Assignments.

FIG. 132 is another exemplary screen print for Inventory Scan Search Criteria.

FIG. 133 is another exemplary screen print for Inventory Scan Results.

Figure 134:
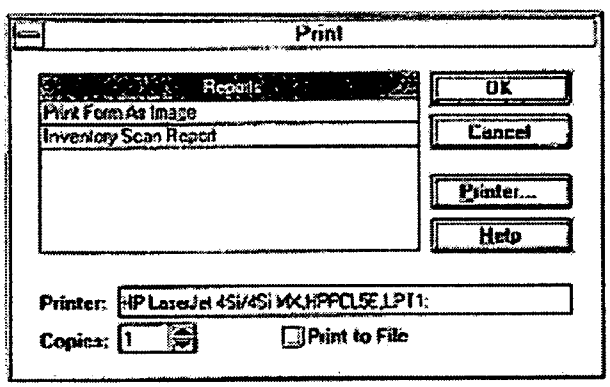

FIG. 134 is an exemplary screen print for Print from the Inventory Scan Results as shown in FIG.

Figure 133:
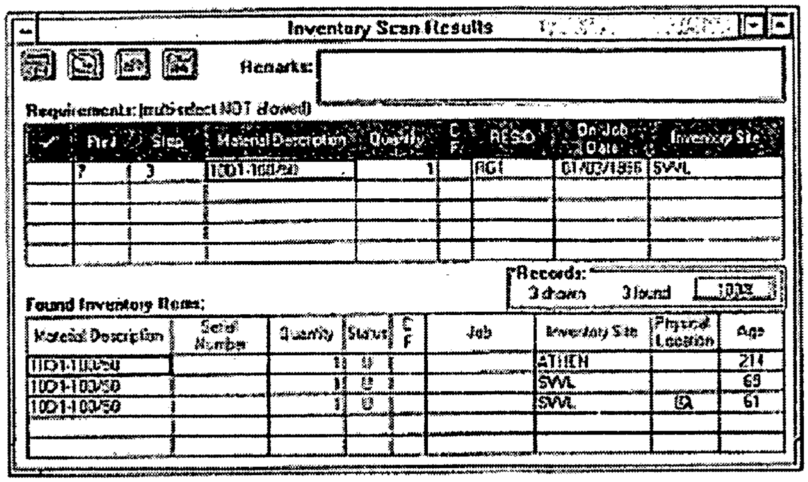
Figure 135:
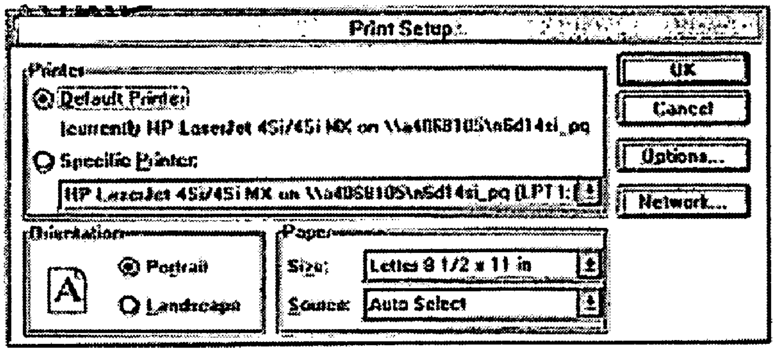

FIG. 133. FIG. 135 is an exemplary screen print for Print Setup from the Print screen as shown in FIG. 134.

Figure 136:
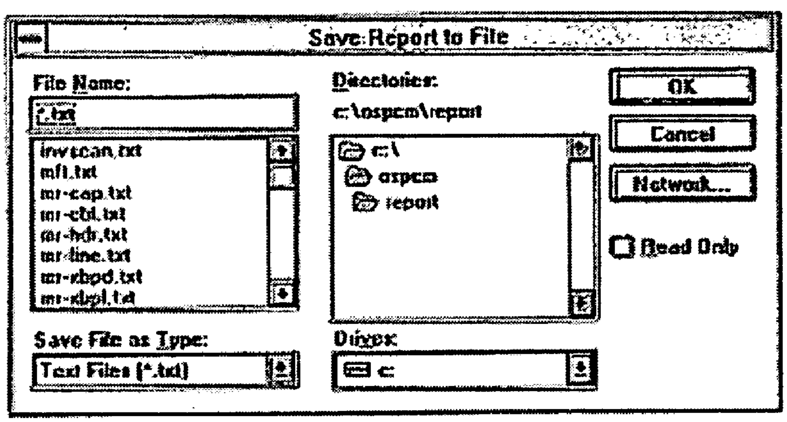

FIG. 136 is an exemplary screen print for Save Report To File.

Figure 137:
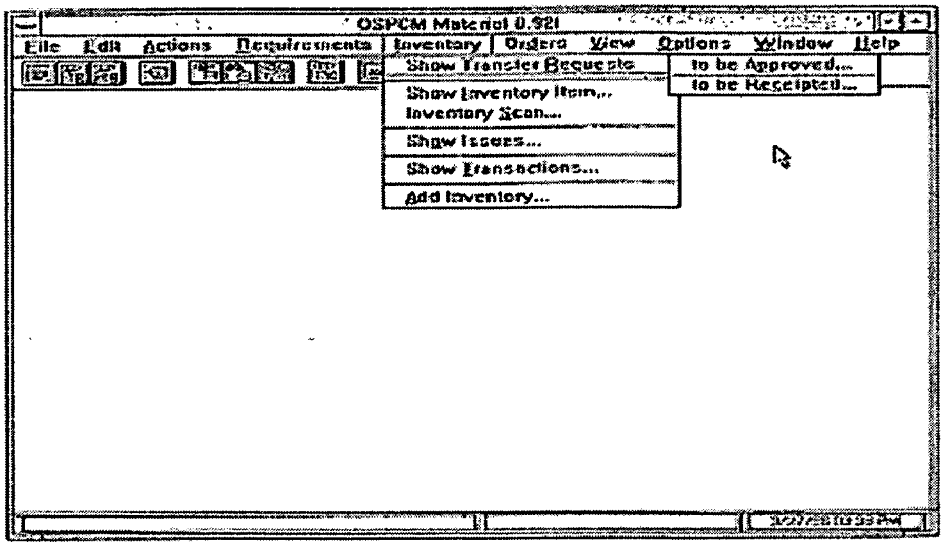

FIG. 137 is another exemplary screen print for OSPCM Material 0.92I.

Figure 138:
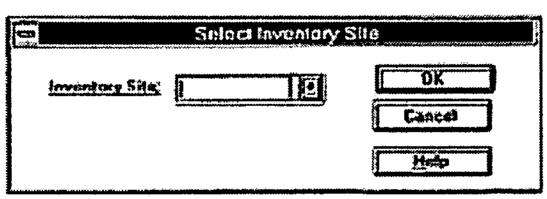

FIG. 138 is another exemplary screen print for Select Inventory Site.

Figure 139:
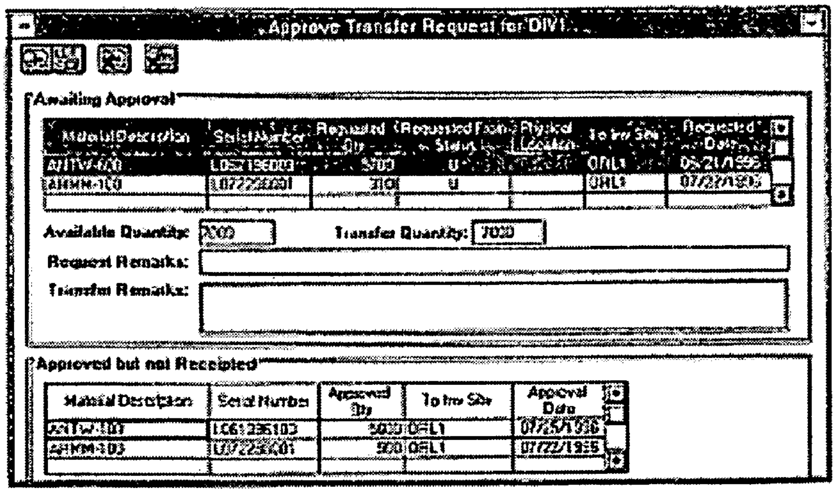

FIG. 139 is an exemplary screen print for Approve Transfer Request For Div1.

Figure 140:
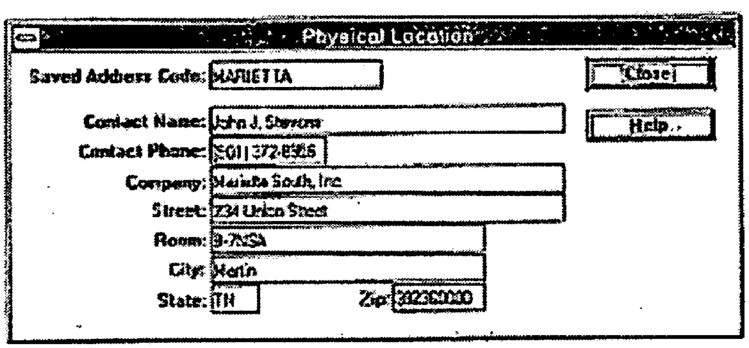

FIG. 140 is another exemplary screen print for Physical Location.

Figure 141:
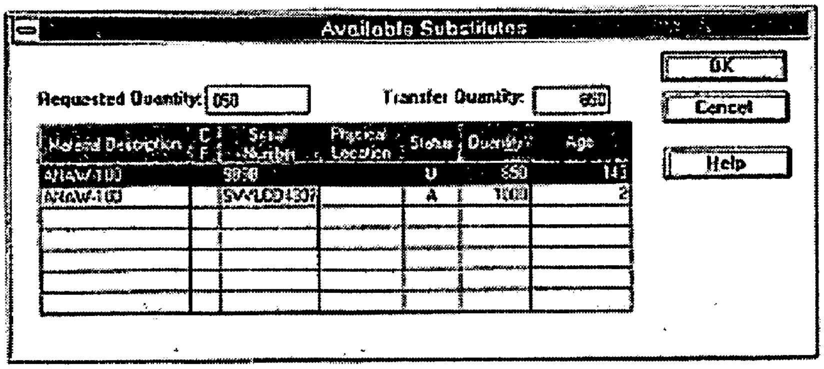

FIG. 141 is an exemplary screen print for Available Substitutes.

Figure 142:
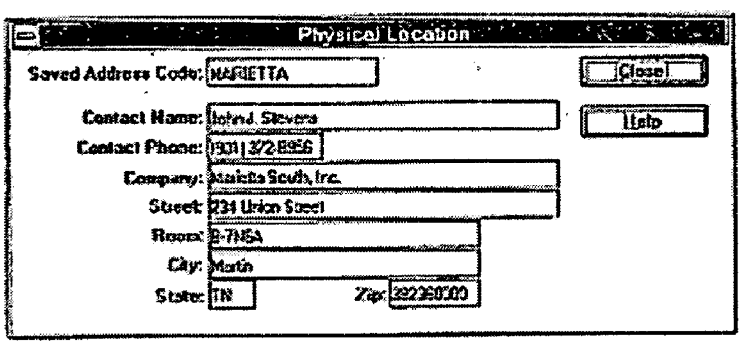

FIG. 142 is another exemplary screen print for Physical Location.

Figure 143:
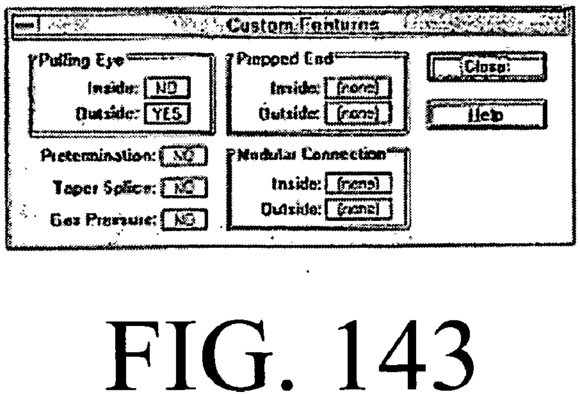

FIG. 143 is another exemplary screen print for Custom Features associated with cable.

Figure 144:
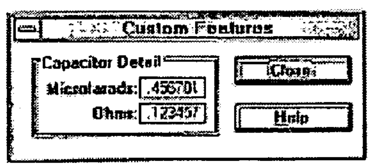

FIG. 144 is another exemplary screen print for Custom Features associated with capacitors.

Figure 145:
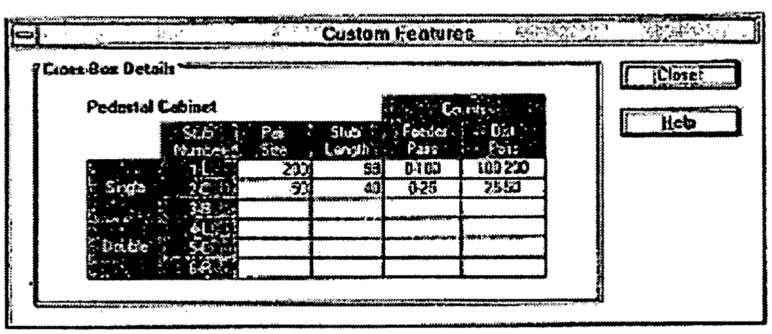

FIG. 145 is another exemplary screen print for Custom Features associated with non-standard pedestal cross-box.

Figure 146:
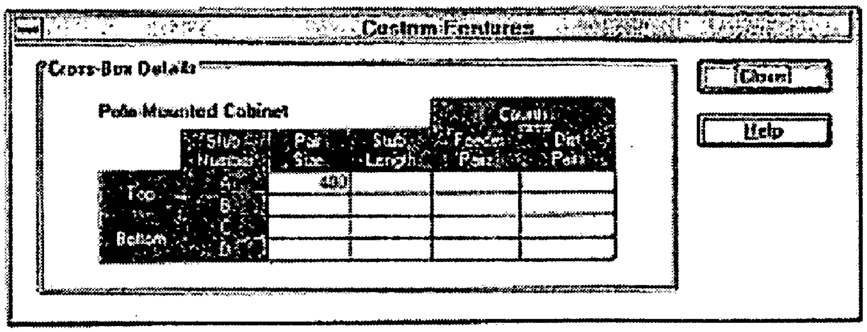

FIG. 146 is another exemplary screen print for Custom Features associated with non-standard pole-mounted cross-box.

Figure 147:
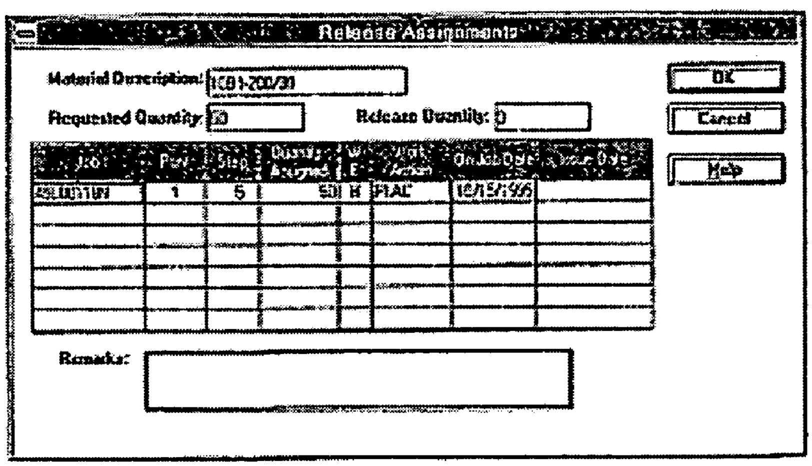

FIG. 147 is an exemplary screen print for Release Assignments.

Figure 148:
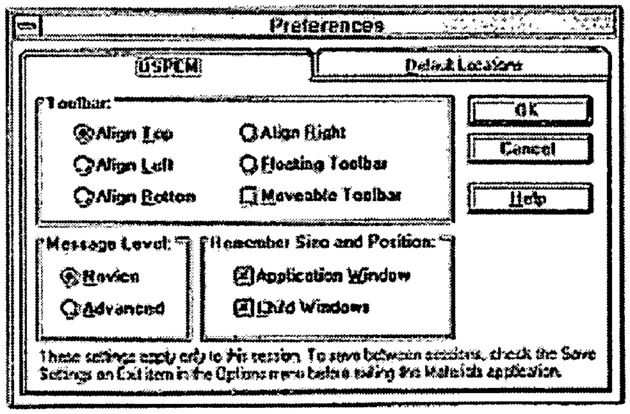

FIG. 148 is an exemplary screen print for Preferences.

Figure 149:
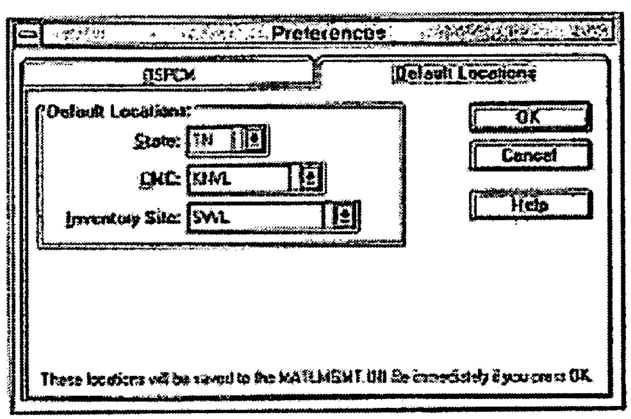

FIG. 149 is an exemplary screen print for Default Location Tab.

Figure 150:
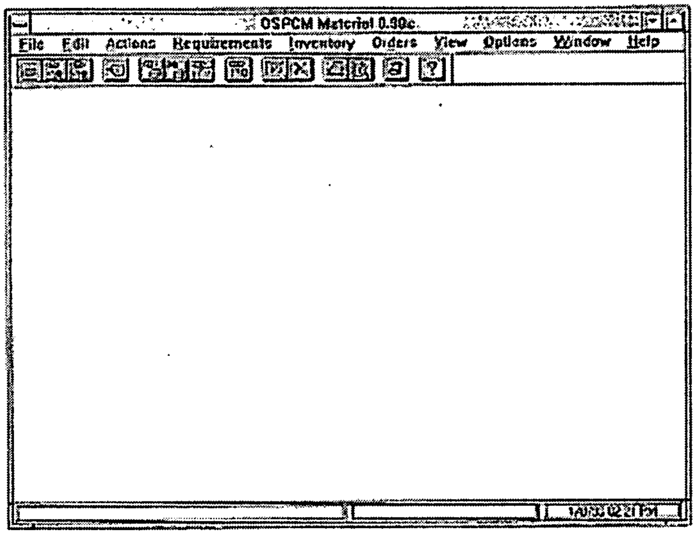

FIG. 150 is an exemplary screen print for OSPCM Material 0.90c.

Figure 151:
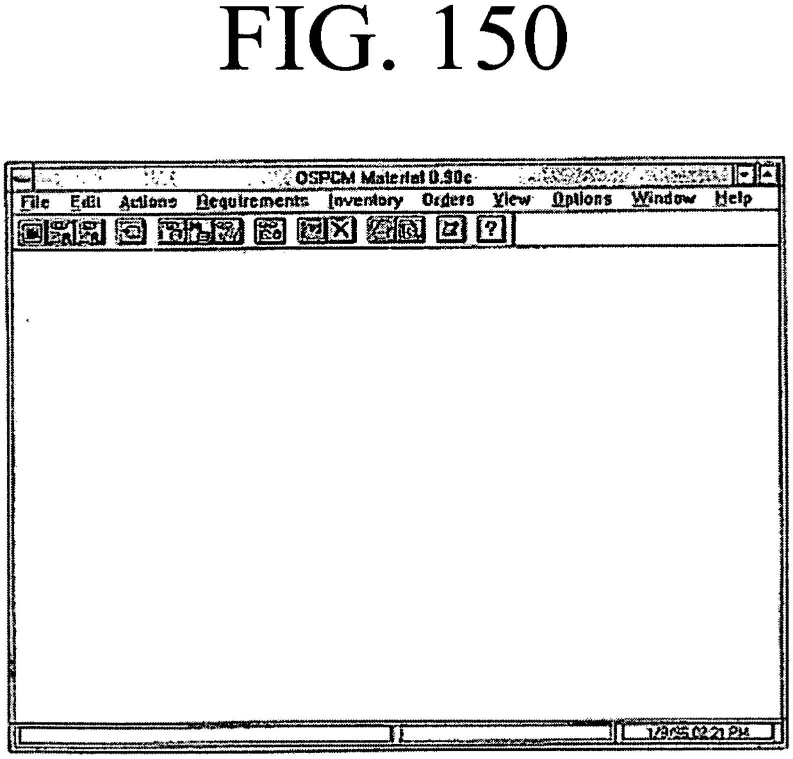

FIG. 151 is another exemplary screen print for OSPCM Material 0.90c.

Figure 152:
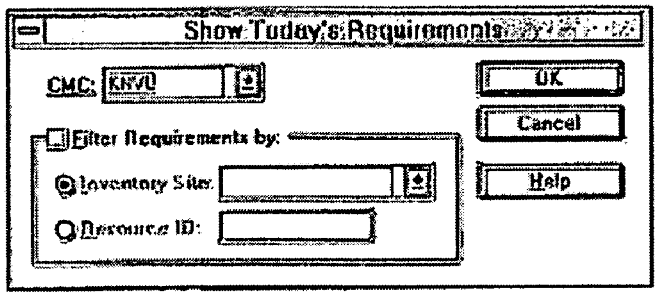

FIG. 152 is an exemplary screen print for Show's Today Requirements.

Figure 153:
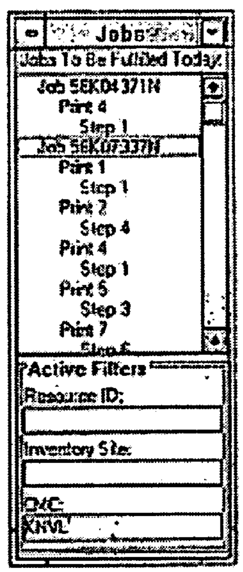

FIG. 153 is another exemplary screen print for Jobs.

Figure 154:
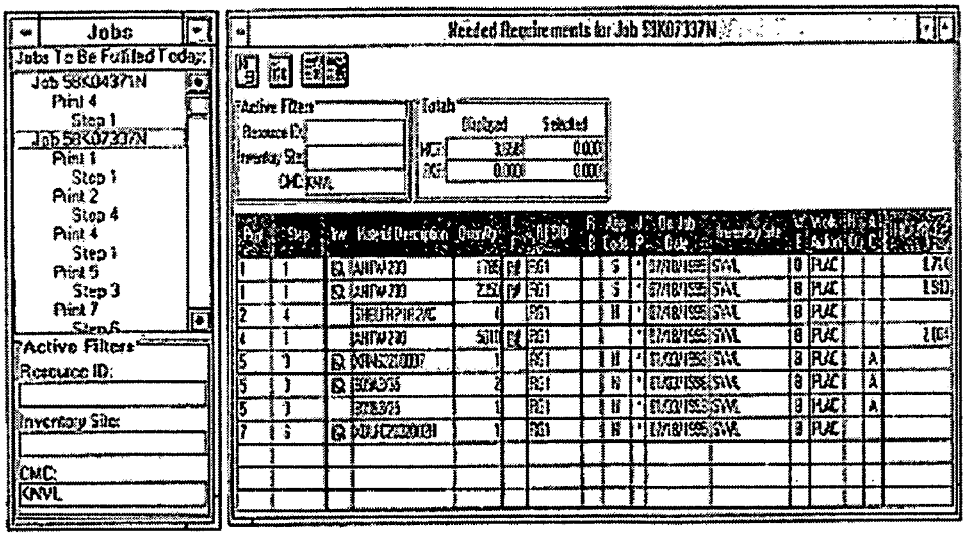

FIG. 154 is another exemplary screen print for Needed Requirement for Job.

Figure 155:
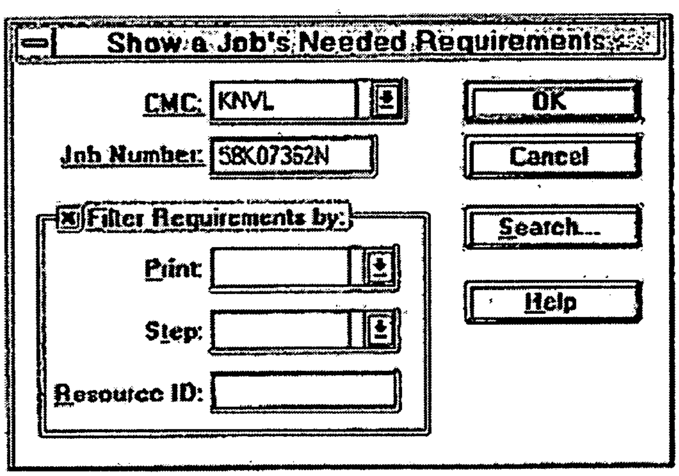

FIG. 155 is an exemplary screen print for Show A Job's Needed Requirement

Figure 156:
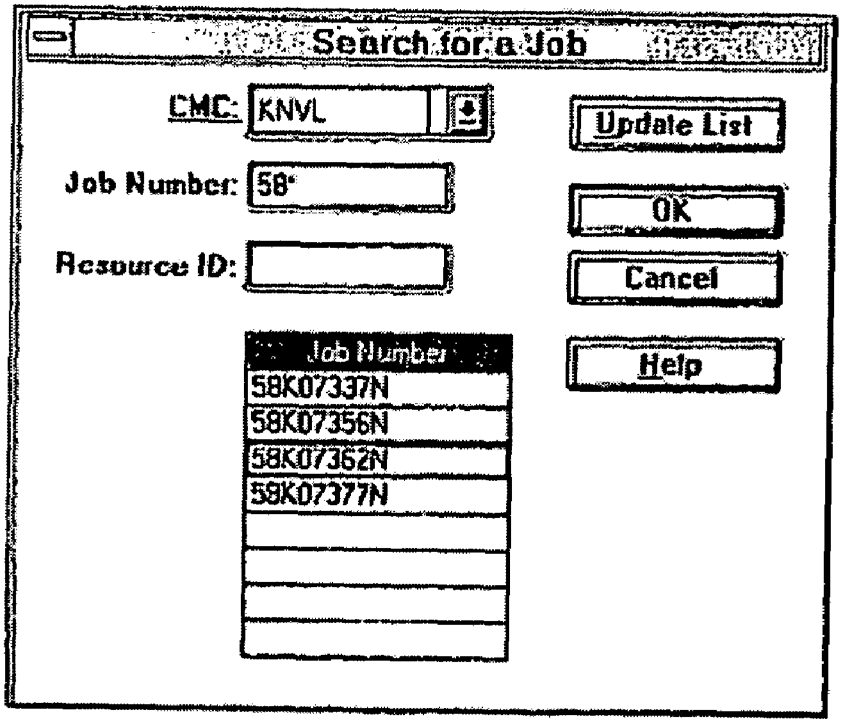

FIG. 156 is another exemplary screen print for Search for A Job.

Figure 157:
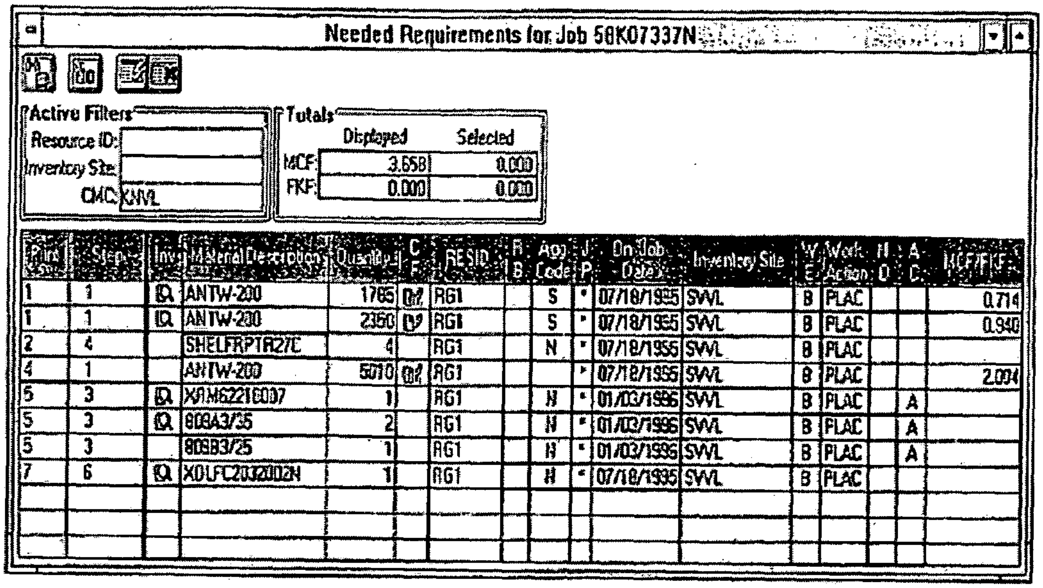

FIG. 157 is another exemplary screen print for Needed Requirement for Job.

Figure 158:
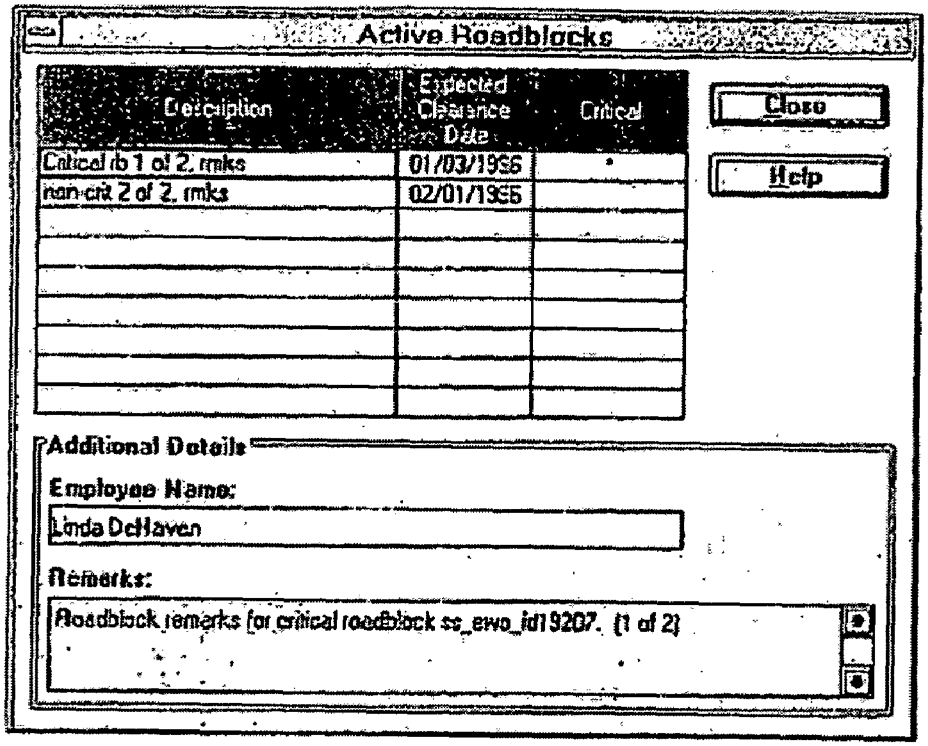

FIG. 158 is another exemplary screen print for Active Roadblocks.

Figure 159:
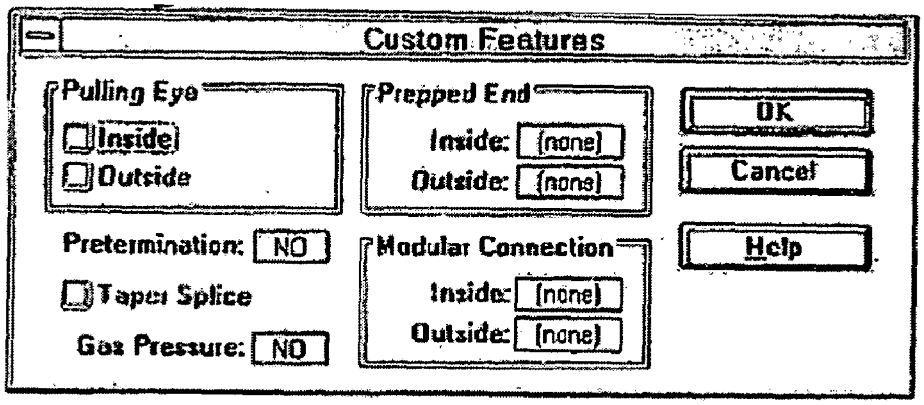

FIG. 159 is another exemplary screen print for Custom Features associated with cable.

Figure 160:
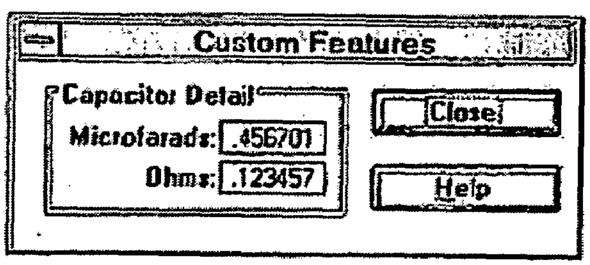

FIG. 160 is another exemplary screen print for Custom Features associated with capacitors.

Figure 161:
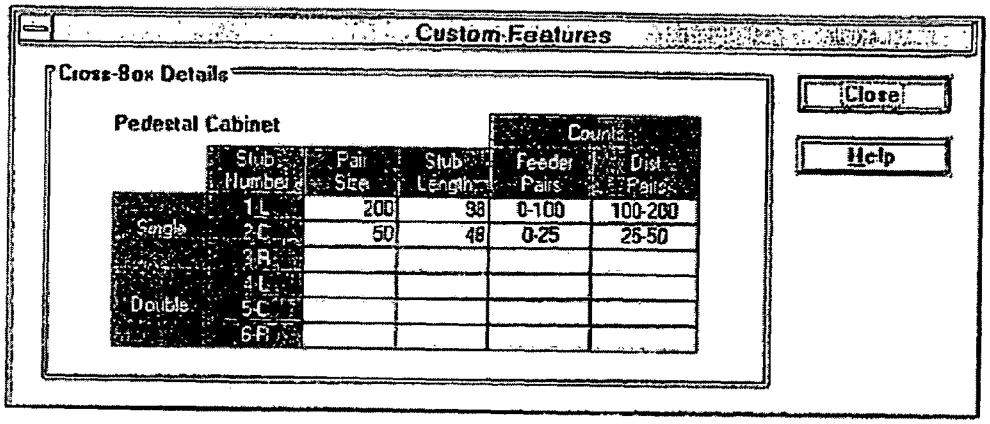

FIG. 161 is another exemplary screen print for Custom Features associated with non-standard pedestal cross-box.

Figure 162:
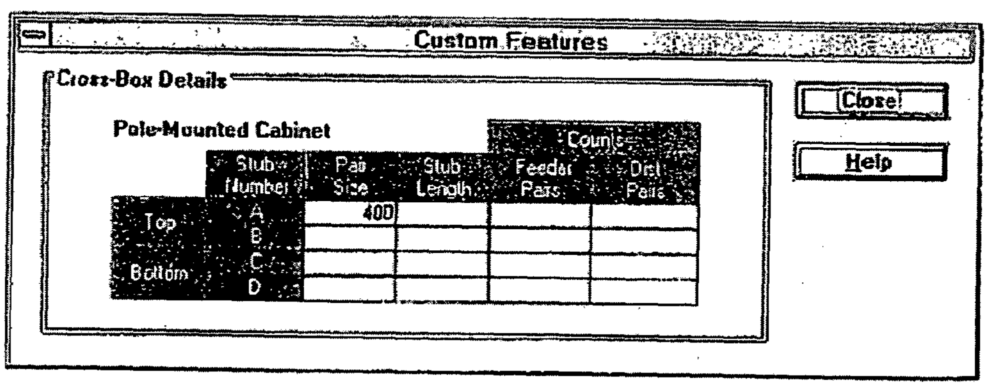

FIG. 162 is another exemplary screen print for Custom Features associated with non-standard pole-mounted cross-box.

Figure 163:
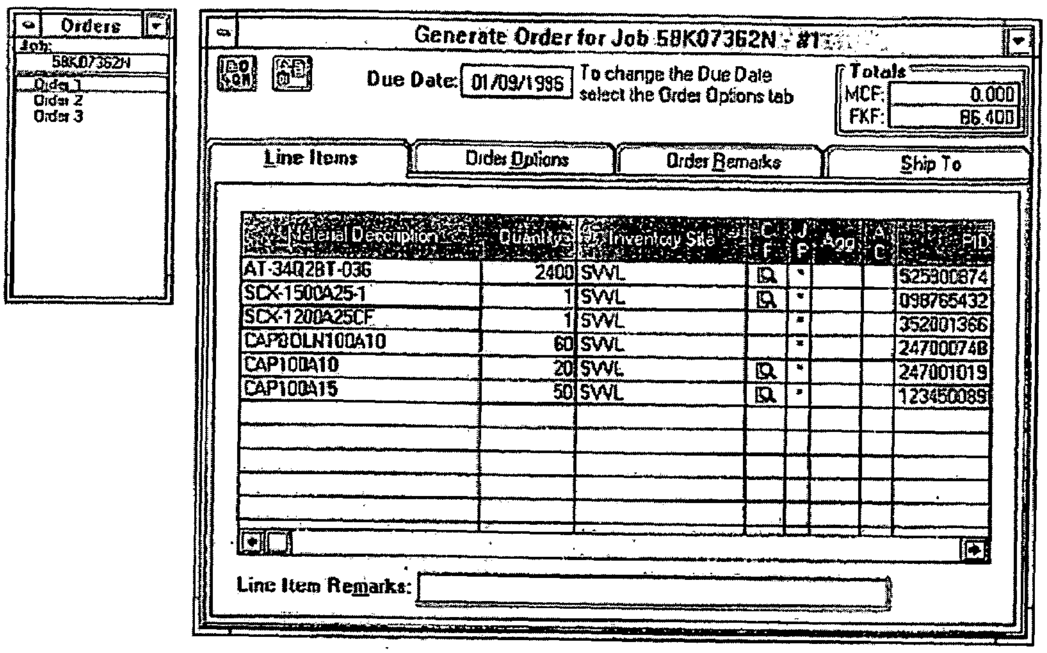

FIG. 163 is an exemplary screen print for Generate Order for Job.

Figure 164:
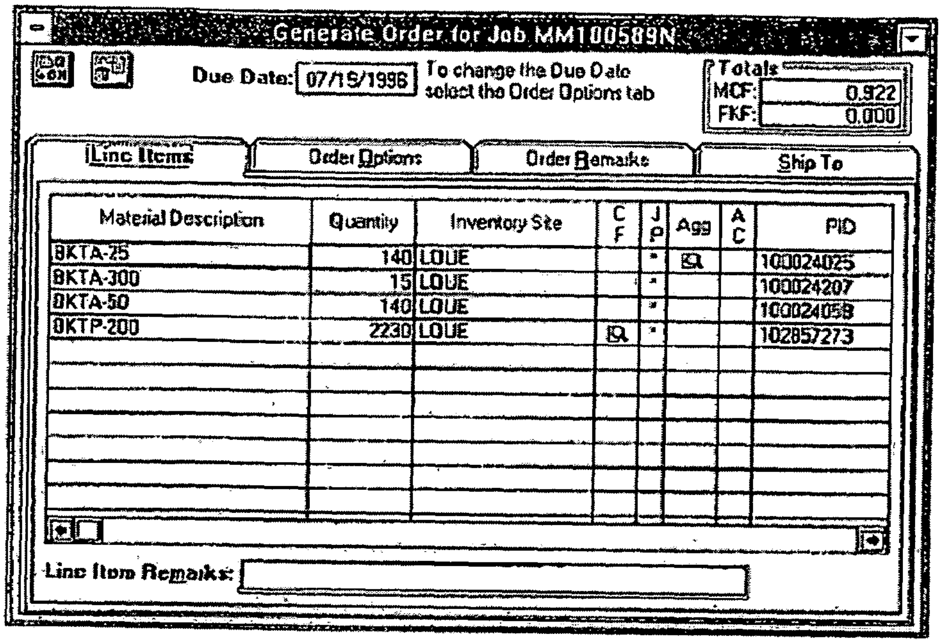

FIG. 164 is an exemplary screen print for Generate Order for Job showing a Line Items Tab.

Figure 165:
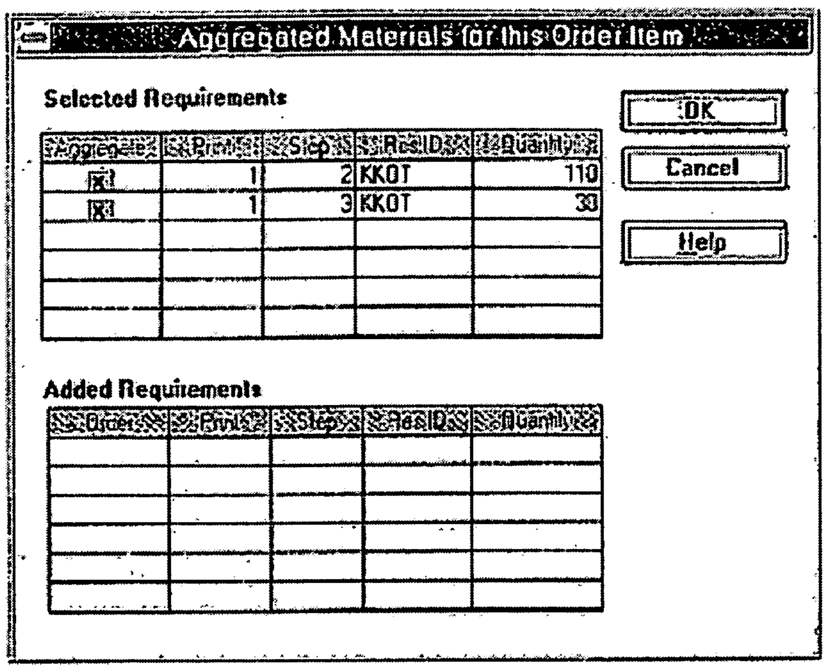

FIG. 165 is an exemplary screen print for Aggregated Materials For This Order Item.

Figure 166:
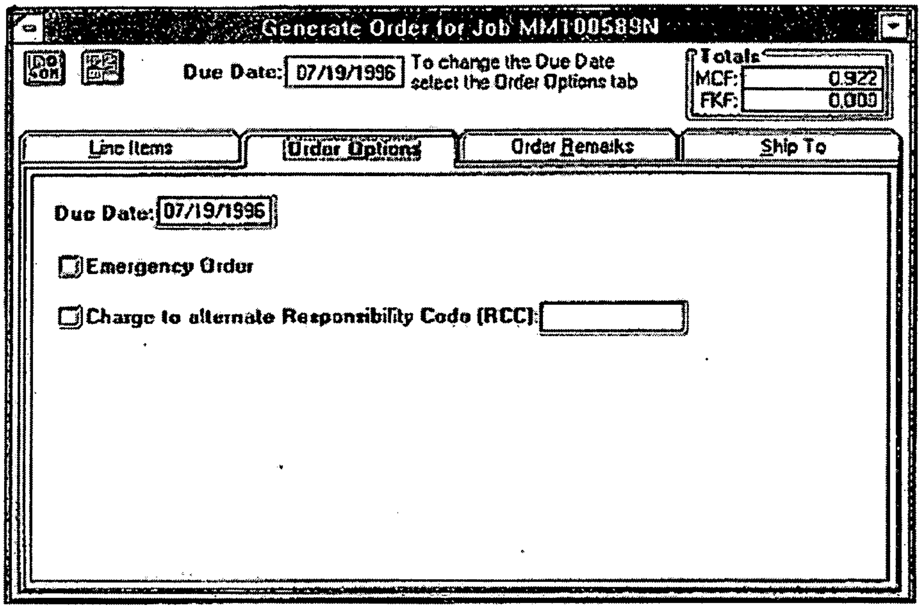

FIG. 166 is an exemplary screen print for Generate Order for Job showing an Order Options Tab.

Figure 167:
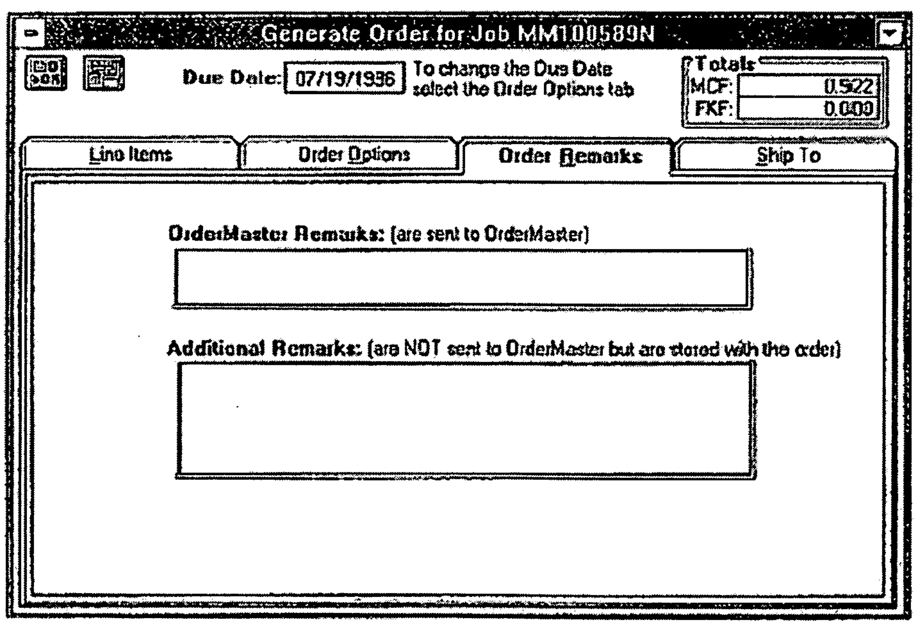

FIG. 167 is an exemplary screen print for Generate Order for Job showing an Order Remarks Tab.

Figure 168:
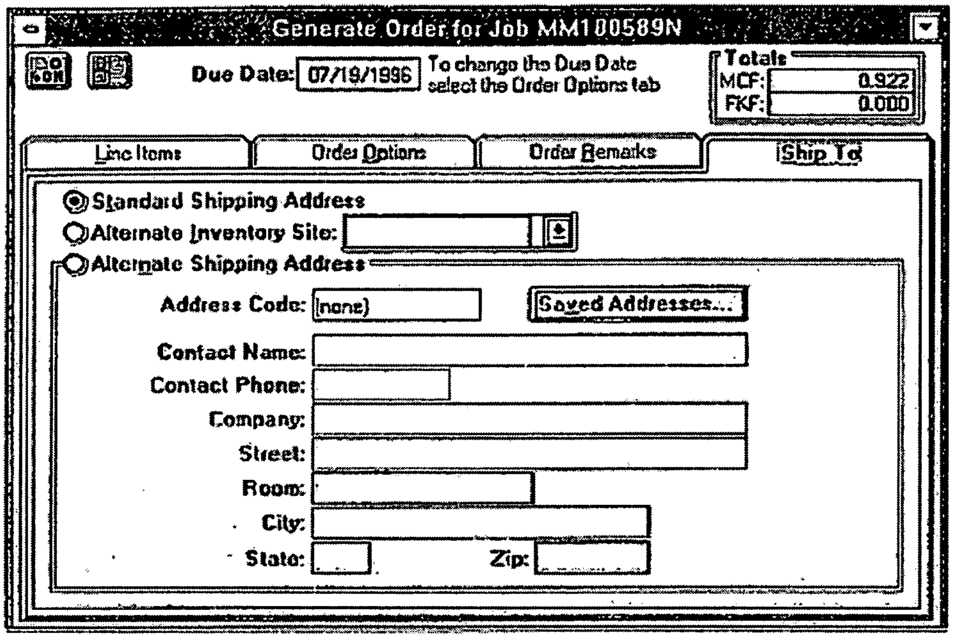

FIG. 168 is an exemplary screen print for Generate Order for Job showing a Ship To Tab.

Figure 169:
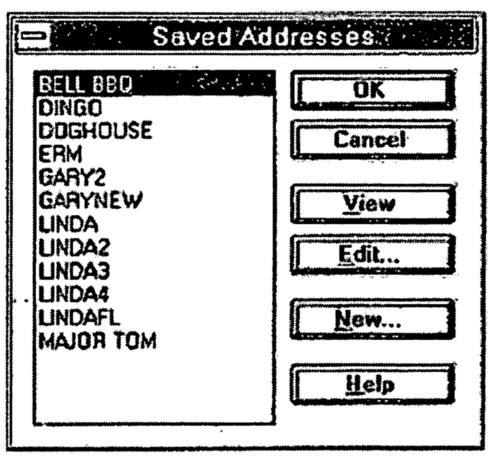

FIG. 169 is another exemplary screen print for Saved Addresses.

Figure 170:
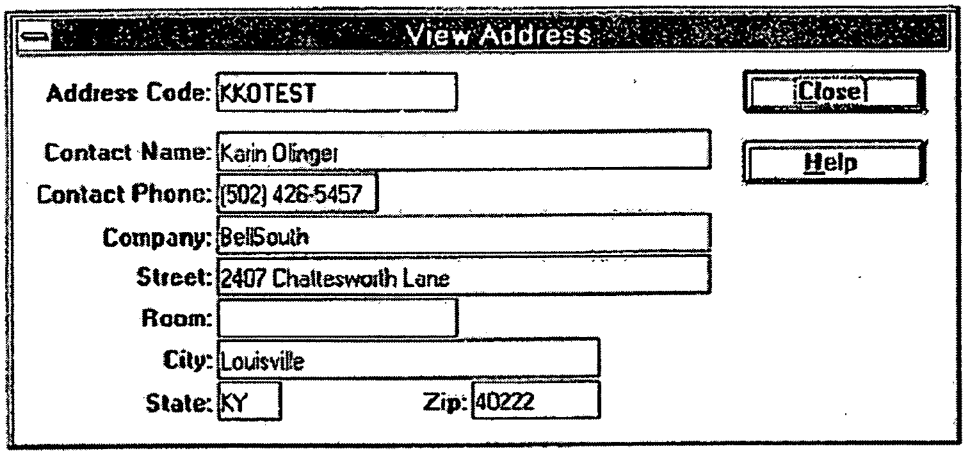

FIG. 170 is another exemplary screen print for View Address.

Figure 171:
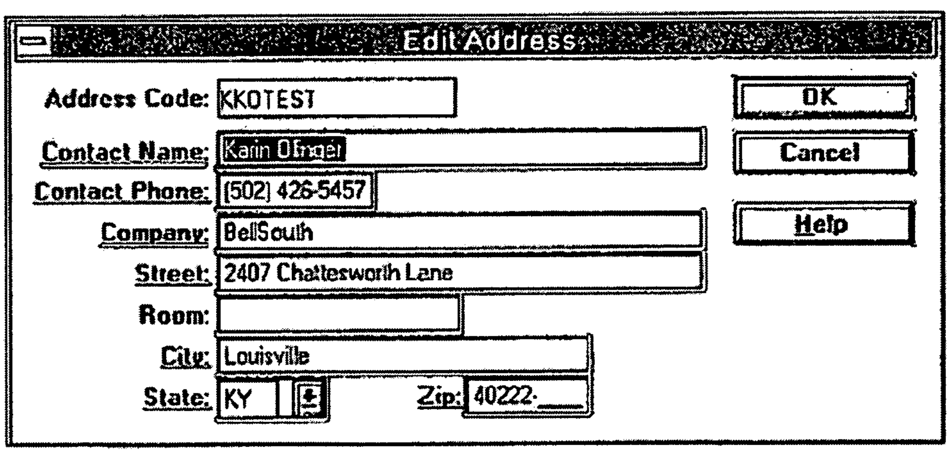

FIG. 171 is another exemplary screen print for Edit Address.

Figure 172:
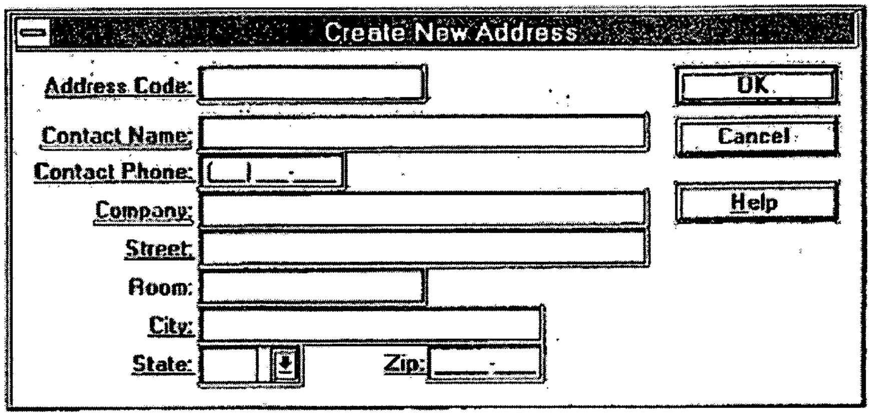

FIG. 172 is another exemplary screen print for Create New Address.

Figure 173:
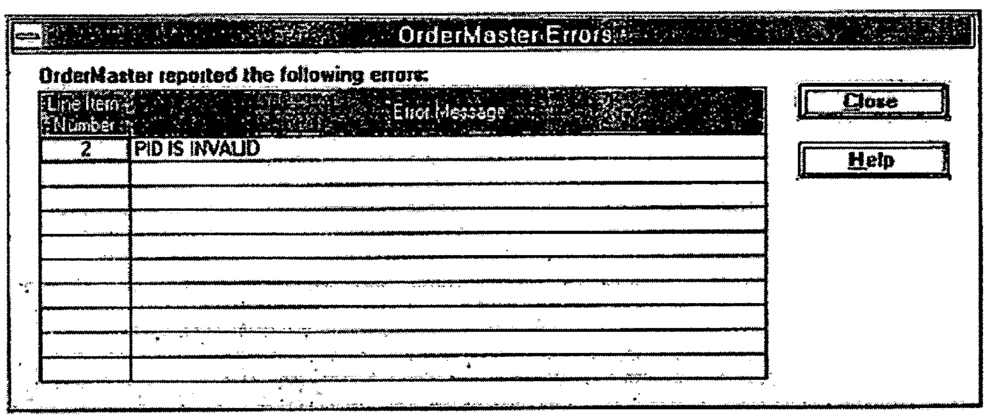

FIG. 173 is an exemplary screen print for Ordermaster Errors.

Figure 174:
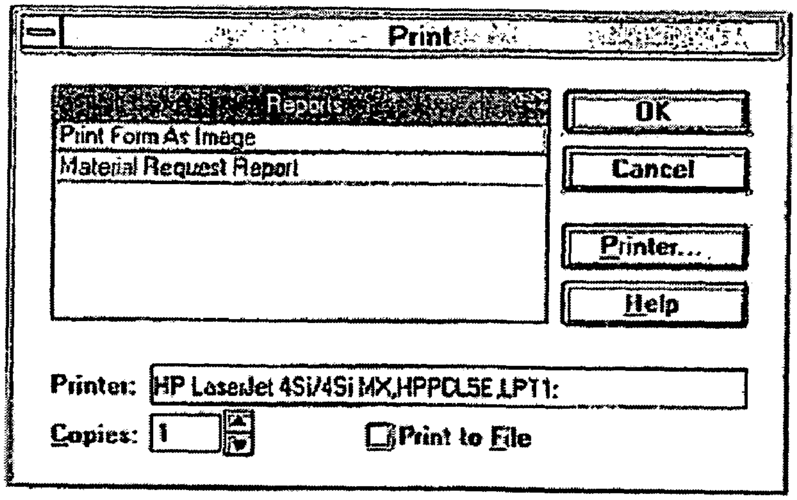

FIG. 174 is an exemplary screen print for Print from a Materials Management Application Window.

Figure 175:
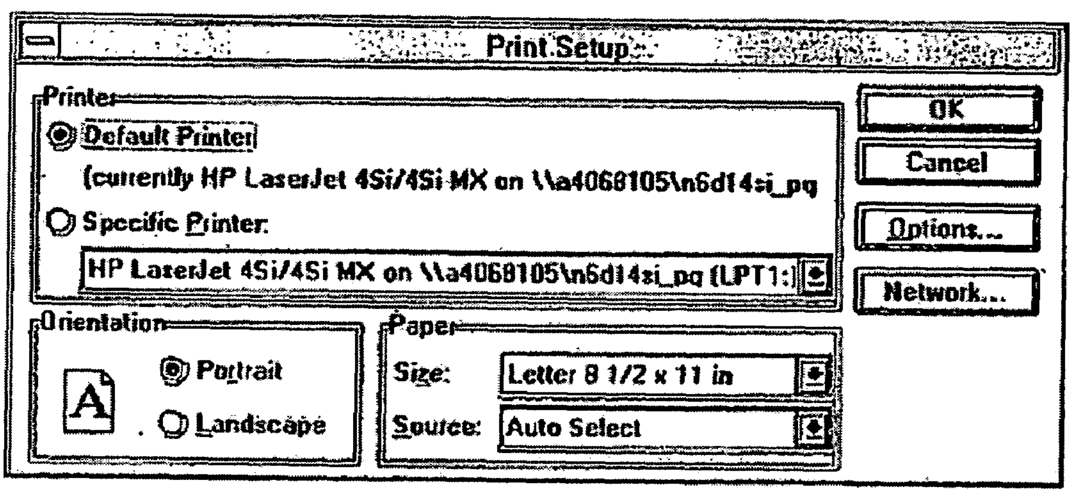

FIG. 175 is an exemplary screen print for Print Setup from the Print Screen as shown in FIG. 174.

Figure 176:
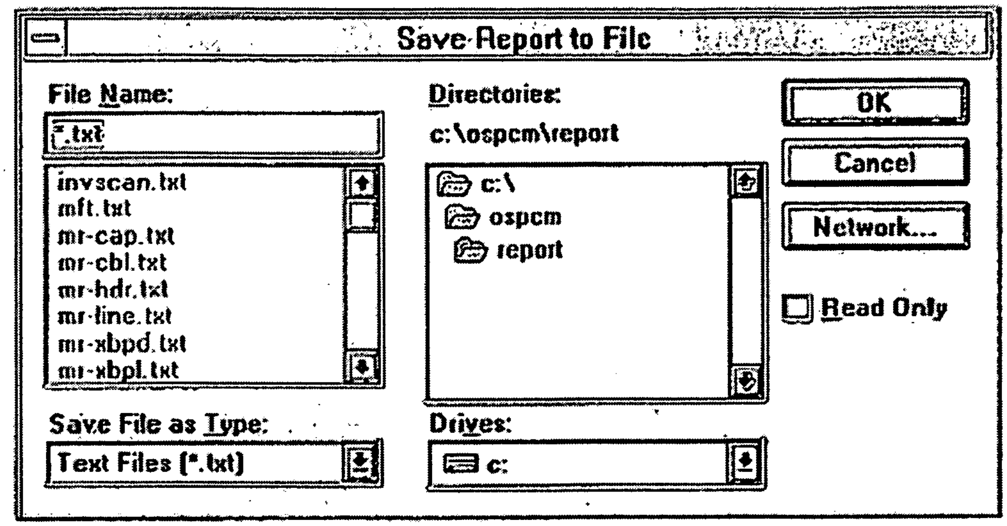

FIG. 176 is an exemplary screen print for Save Report to File from the Print Screen as shown in FIG. 174.

Figure 177:
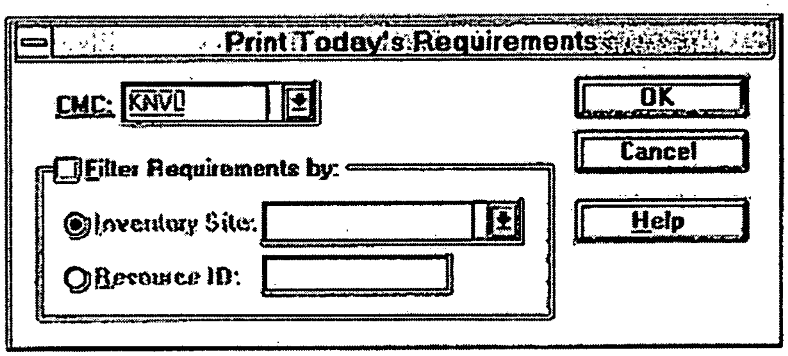

FIG. 177 is an exemplary screen print for Print Today's Requirements.

Figure 178:
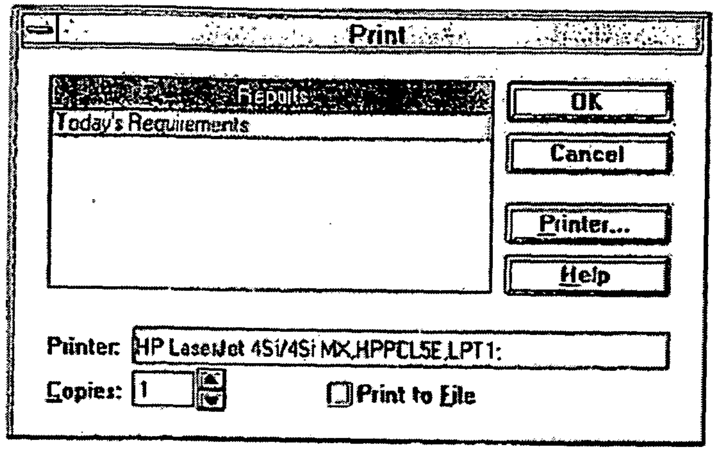

FIG. 178 is an exemplary screen print to print the Print Today's Requirement as shown in FIG.

Figure 179:
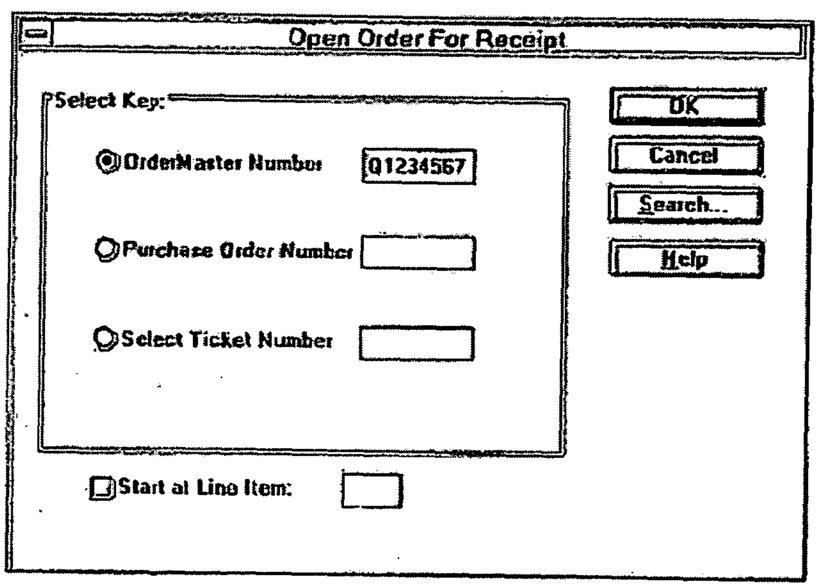

FIG. 177. FIG. 179 is an exemplary screen print for Open Order For Receipt.

Figure 180:
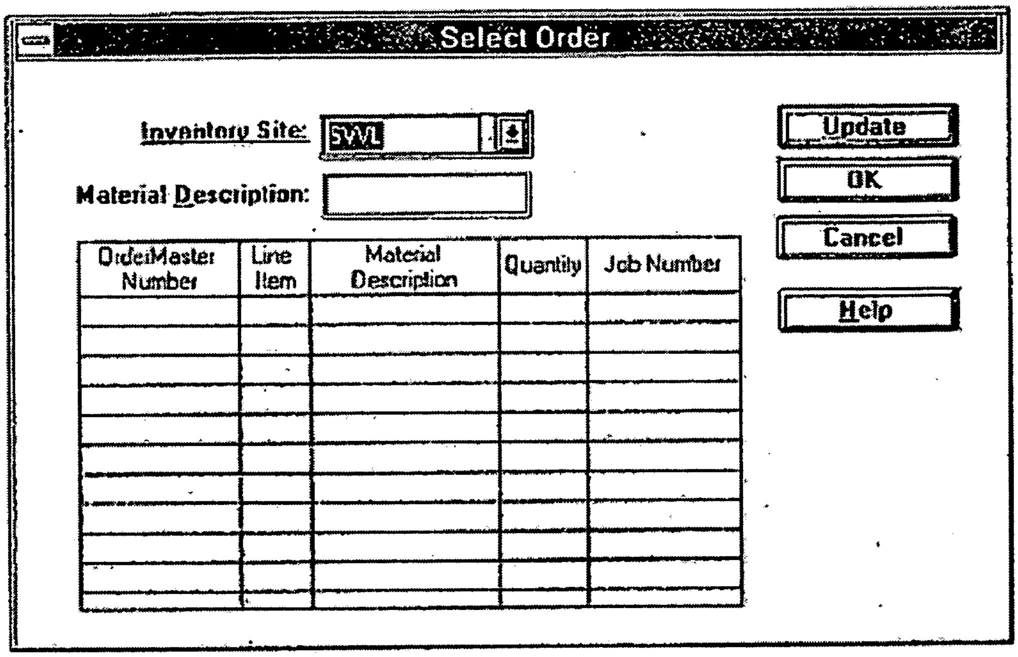

FIG. 180 is an exemplary screen print for Select Order.

Figure 181:
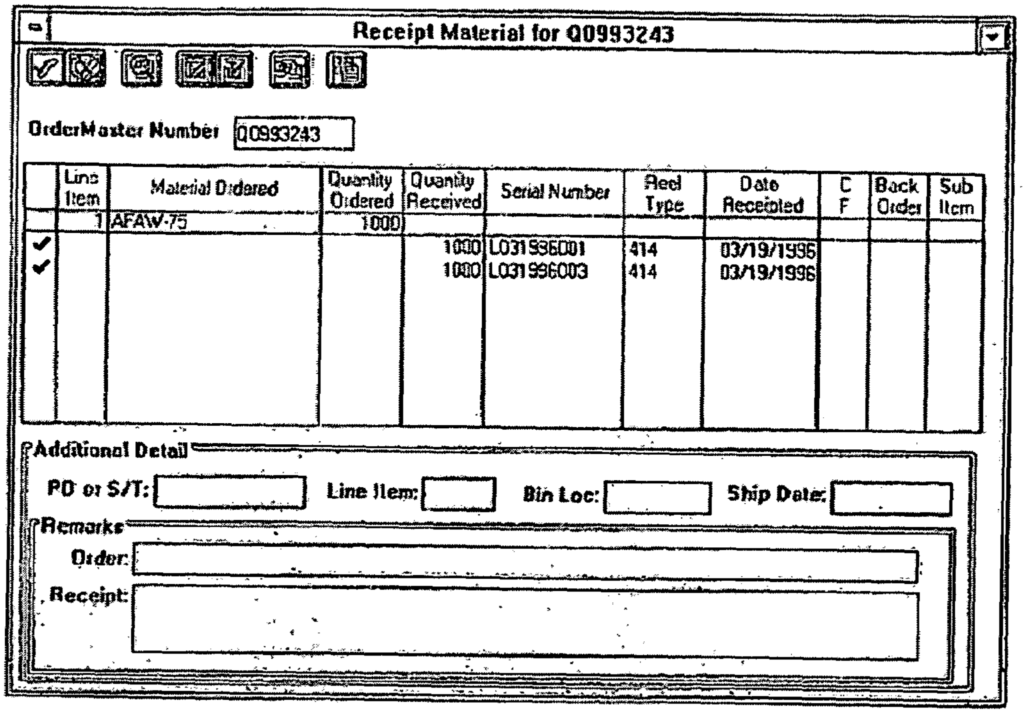

FIG. 181 is an exemplary screen print for Receipt Material.

Figure 182:
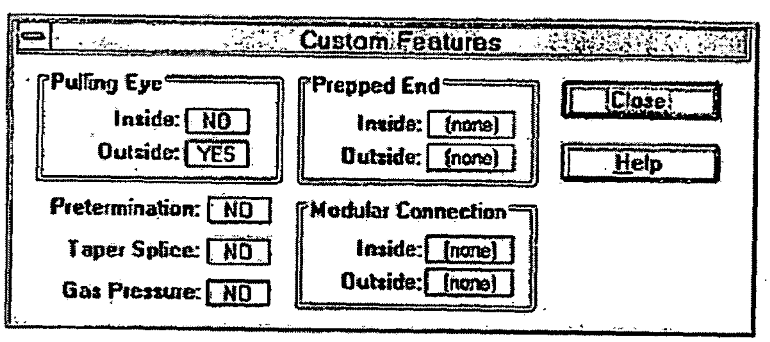

FIG. 182 is another exemplary screen print for Custom Features associated with cable.

Figure 183:
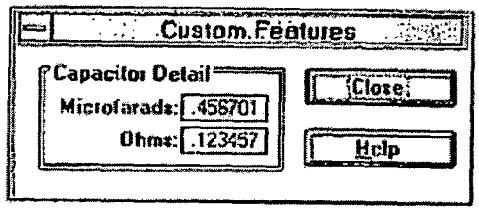

FIG. 183 is another exemplary screen print for Custom Features associated with capacitors.

Figure 184:
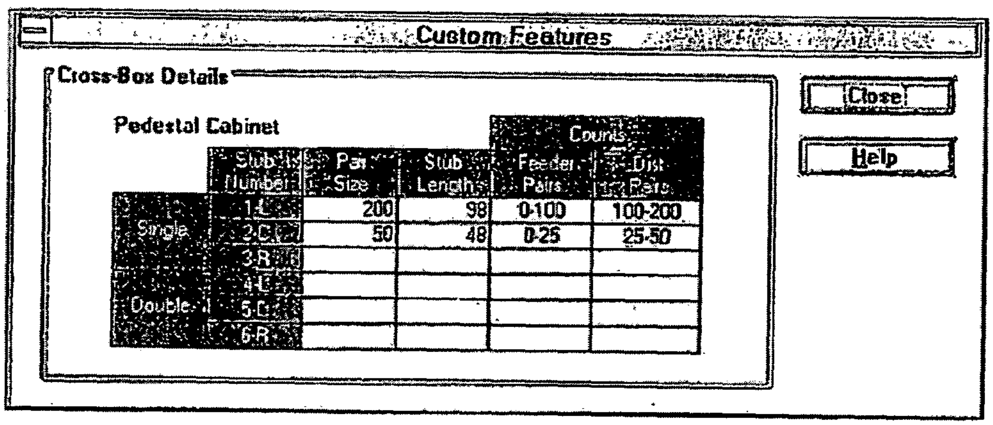

FIG. 184 is another exemplary screen print for Custom Features associated with non-standard pedestal cross-box.

Figure 185:
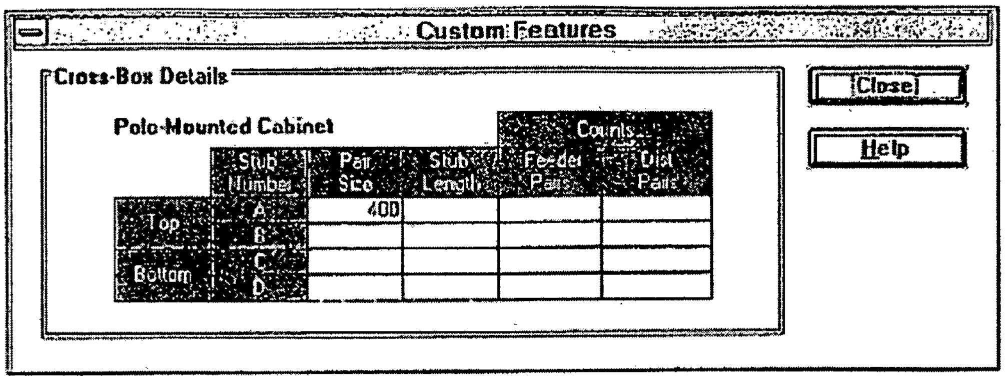

FIG. 185 is another exemplary screen print for Custom Features associated with non-standard pole-mounted cross-box.

Figure 186:
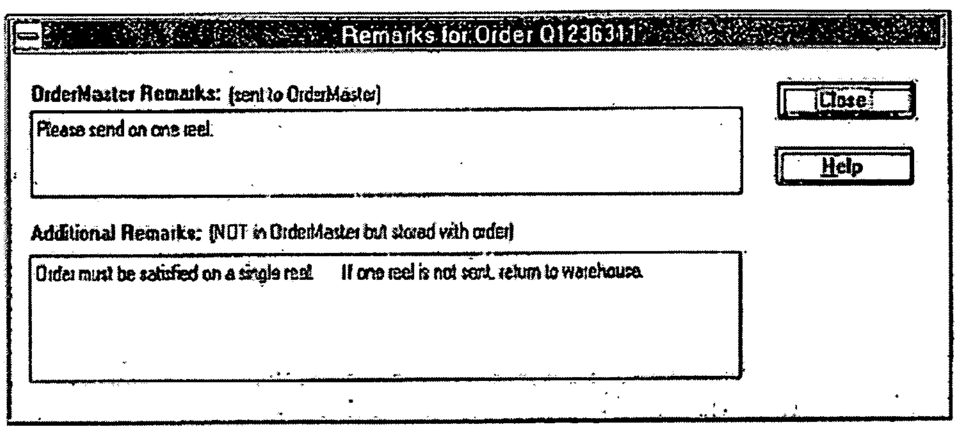

FIG. 186 is an exemplary screen print for Remarks For Order.

Figure 187:
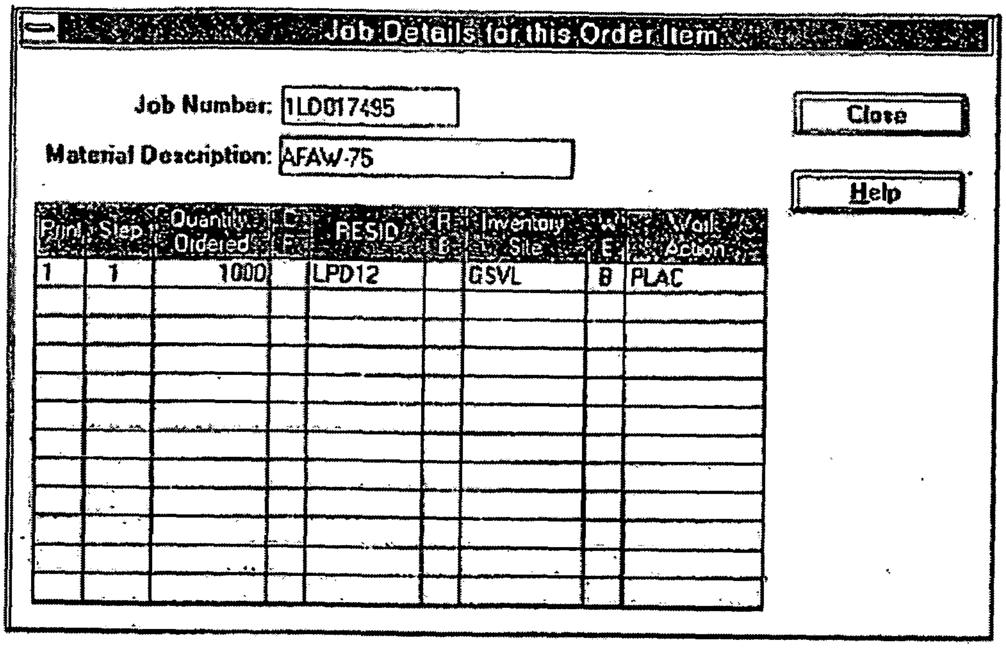

FIG. 187 is an exemplary screen print for Job Details For This Order Item.

Figure 188:
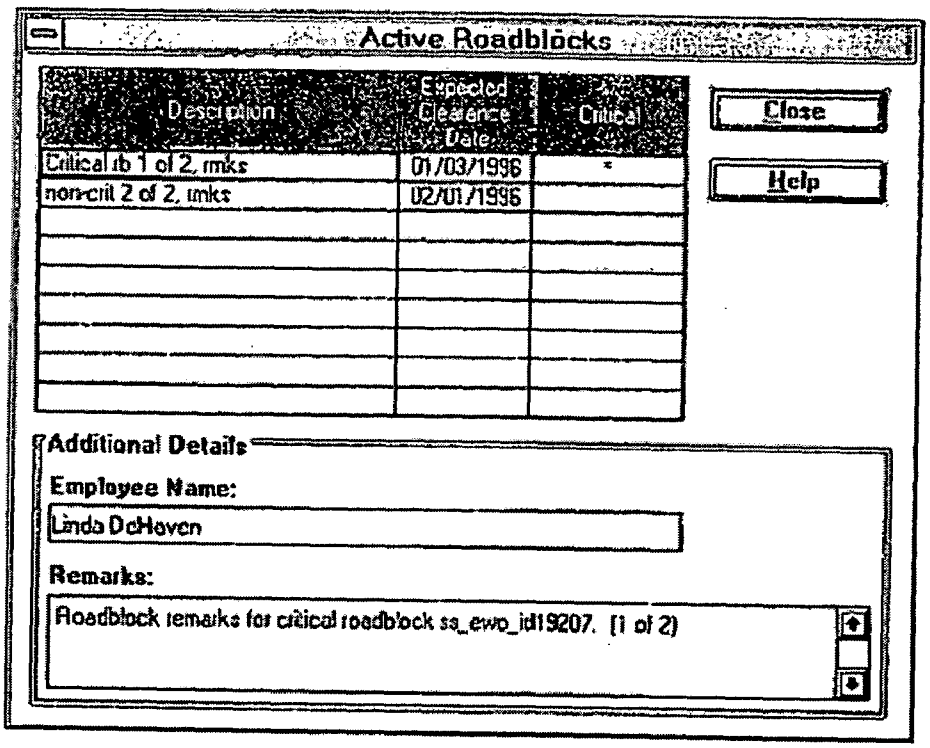

FIG. 188 is another exemplary screen print for Active Roadblocks.

Figure 189:
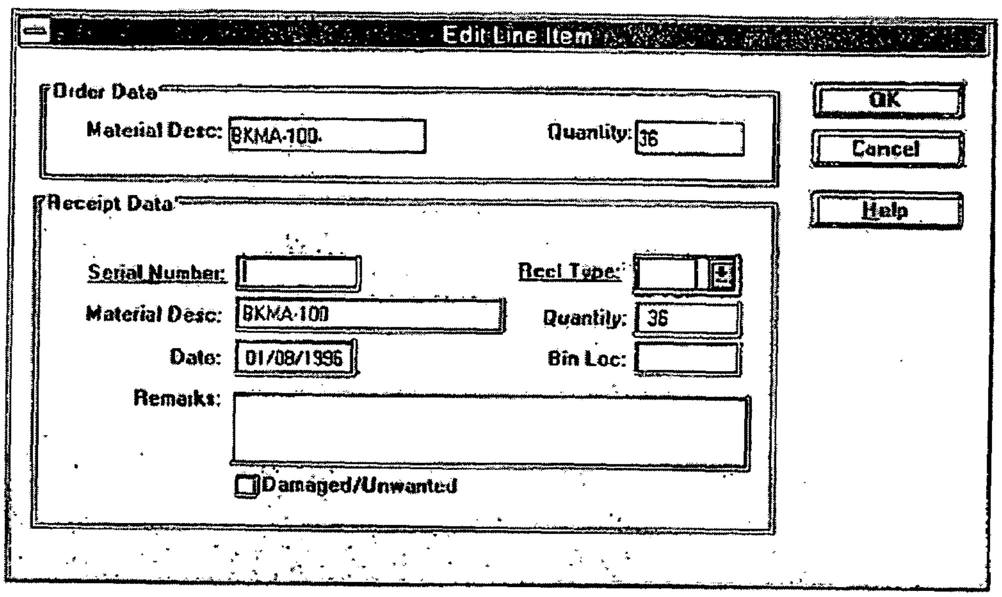

FIG. 189 is an exemplary screen print for Edit Line Item.

Figure 190:
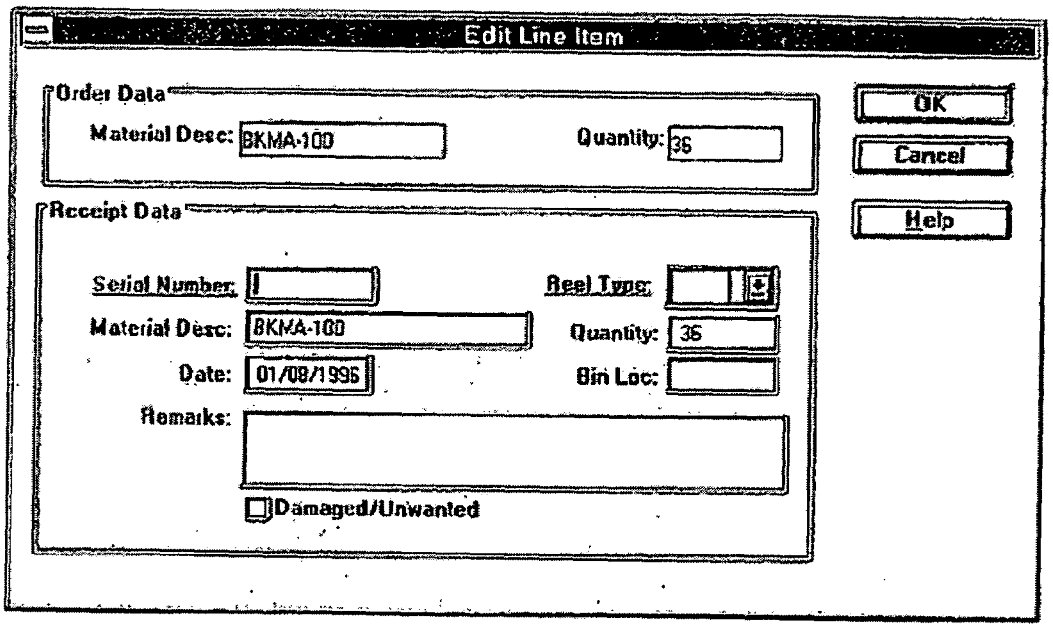

FIG. 190 is another exemplary screen print for Edit Line Item.

Figure 191:
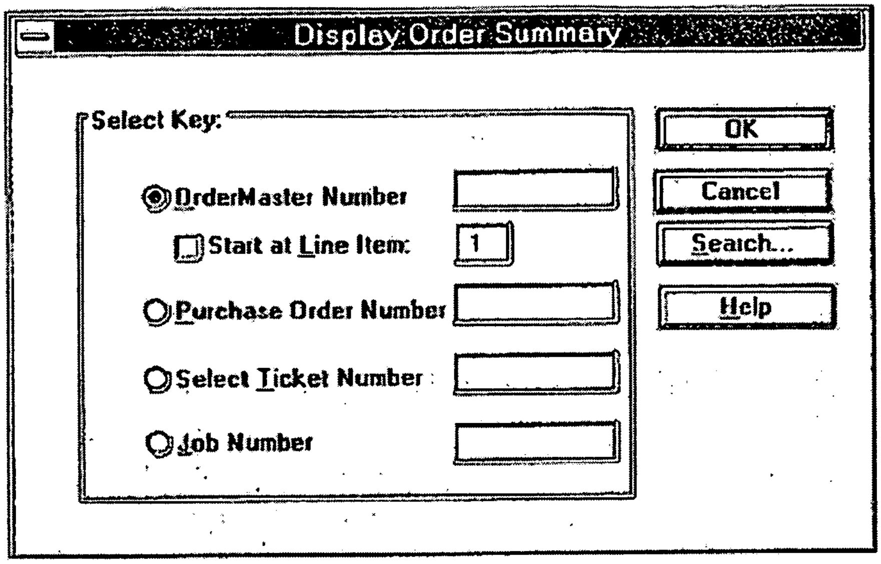

FIG. 191 is an exemplary screen print for Display Order Summary.

Figure 192:
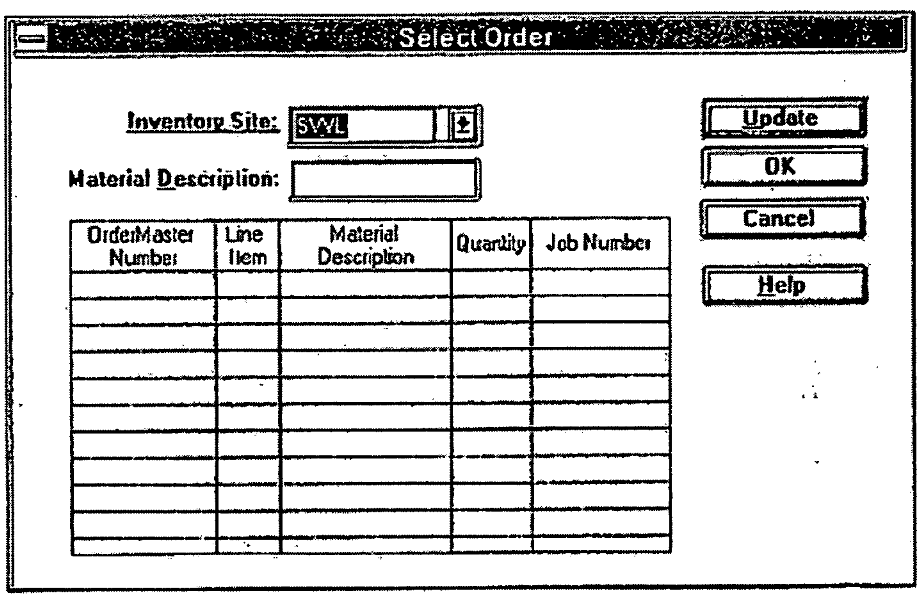

FIG. 192 is an exemplary screen print for Select Order.

FIGS. 193–197 are exemplary screen prints for Summary For Order.

Figure 198:
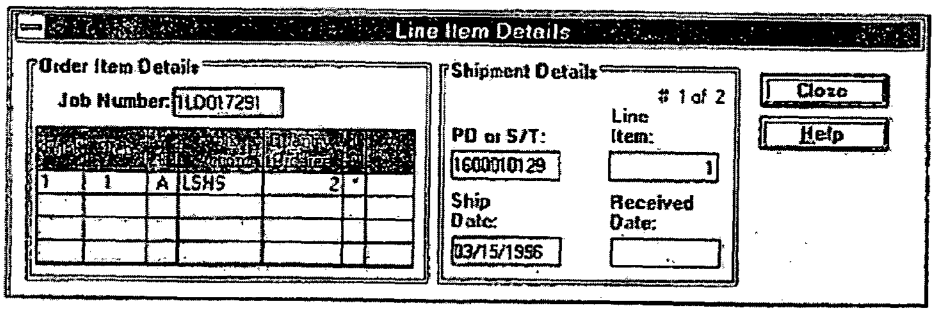

FIG. 198 is an exemplary screen print for Line Item Details.

Figure 199:
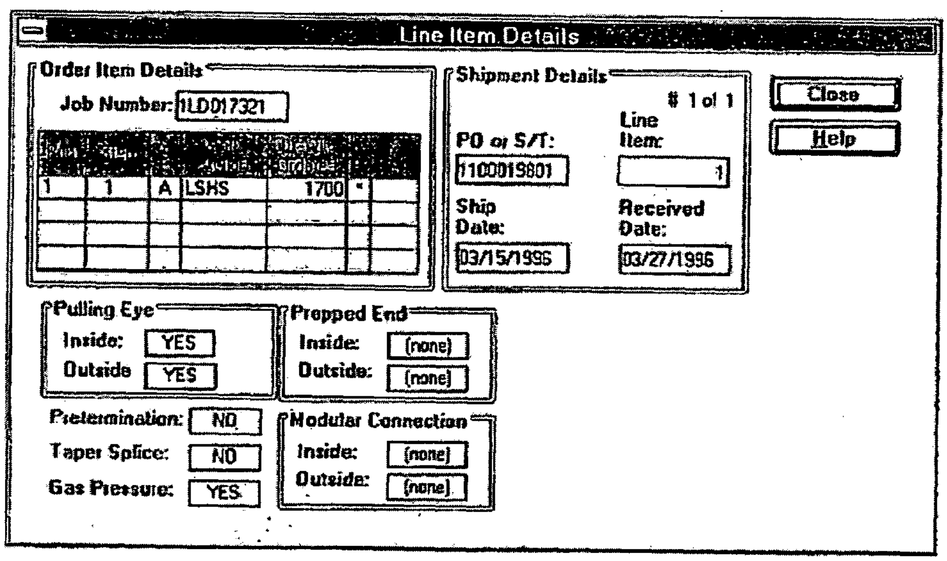

FIG. 199 is an exemplary screen print for Line Item Details associated with cable.

Figure 200:
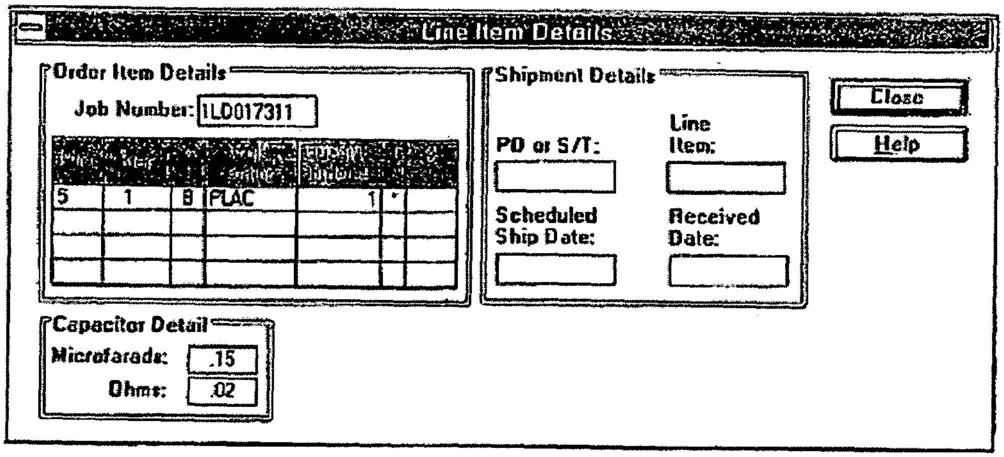

FIG. 200 is an exemplary screen print for Line Item Details associated with capacitors.

Figure 201:
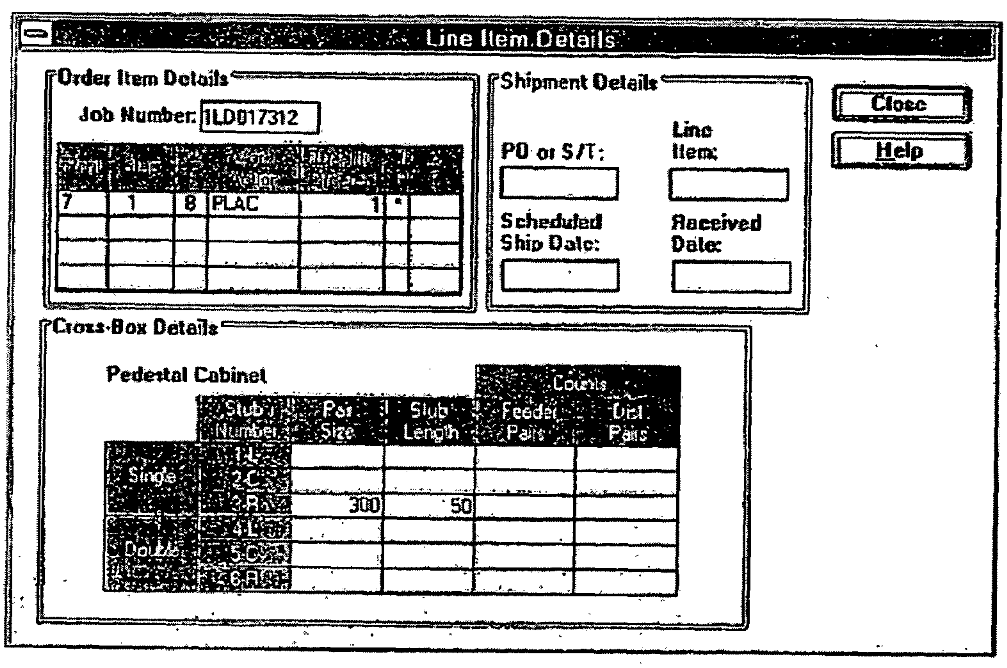

FIG. 201 is an exemplary screen print for Line Item Details associated with non-standard pedestal cross-box.

Figure 202:
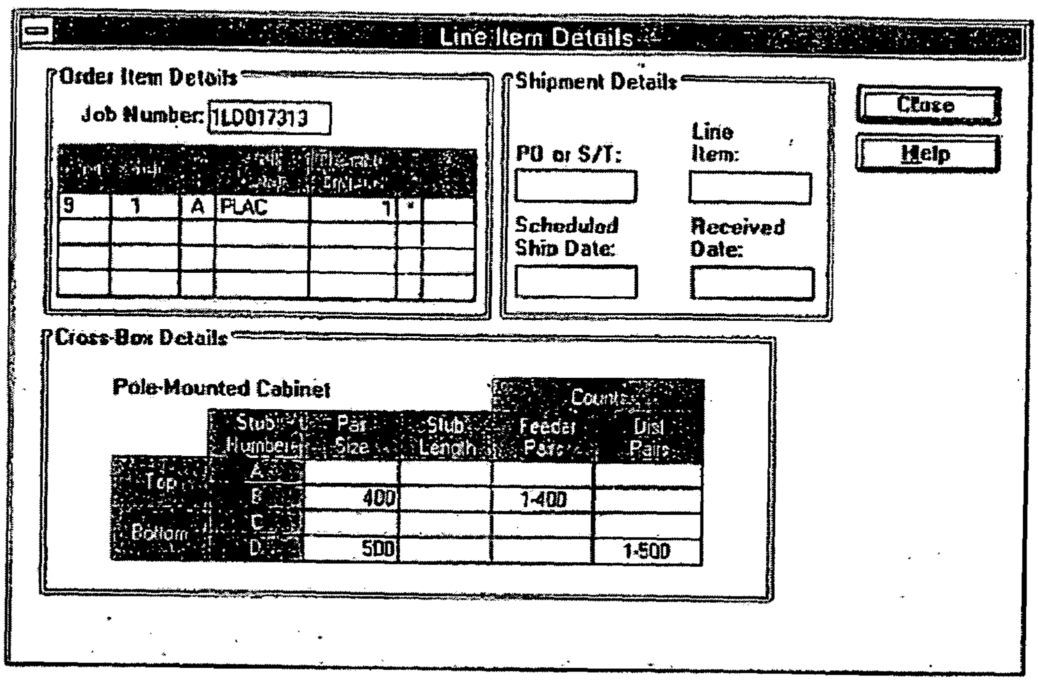

FIG. 202 is an exemplary screen print for Line Item Details associated with non-standard pole-mounted cross-box.

Figure 203:
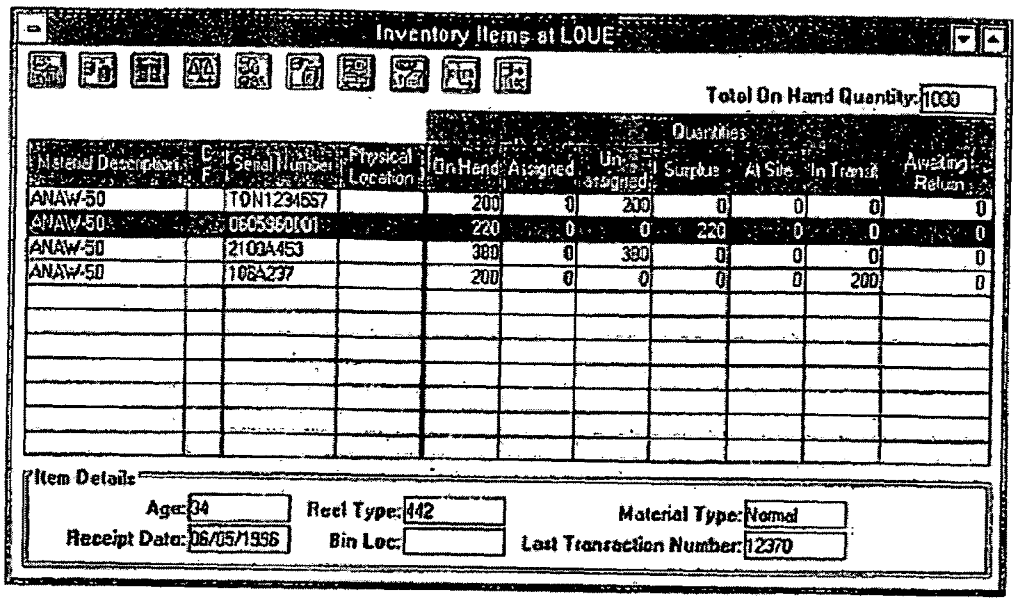

FIG. 203 is another exemplary screen print for Inventory Items.

Figure 204:
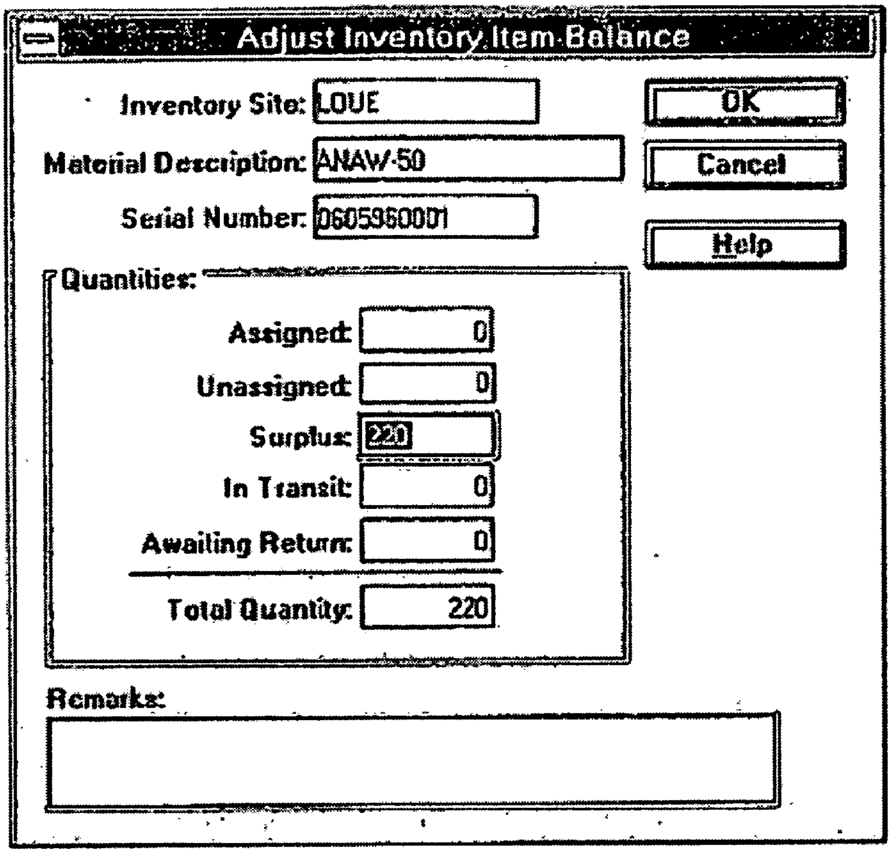

FIG. 204 is an exemplary screen print for Adjust Inventory Item Balance.

Figure 205:
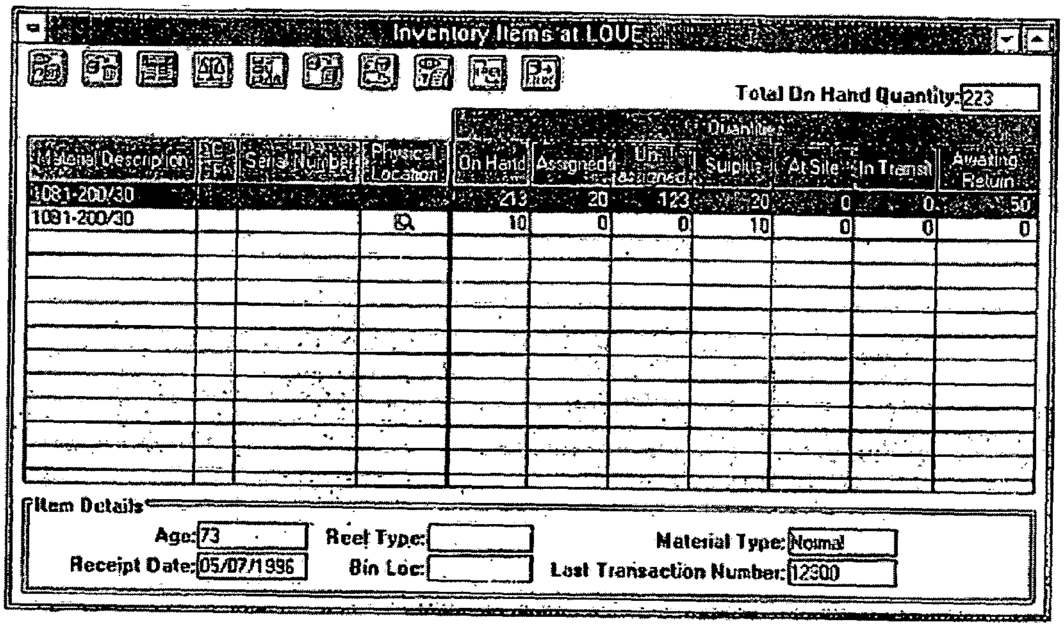

FIG. 205 is another exemplary screen print for Inventory Items.

Figure 206:
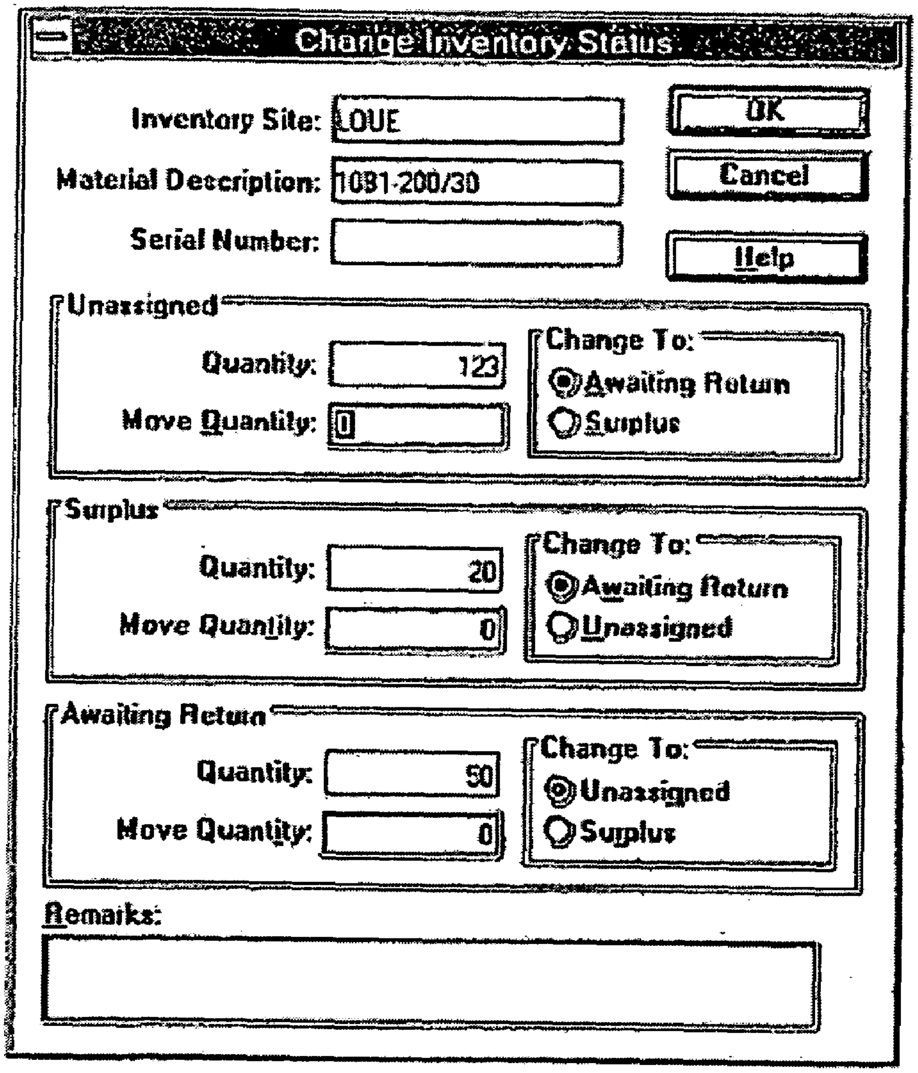

FIG. 206 is an exemplary screen print for Change Inventory Item Status.

Figure 207:
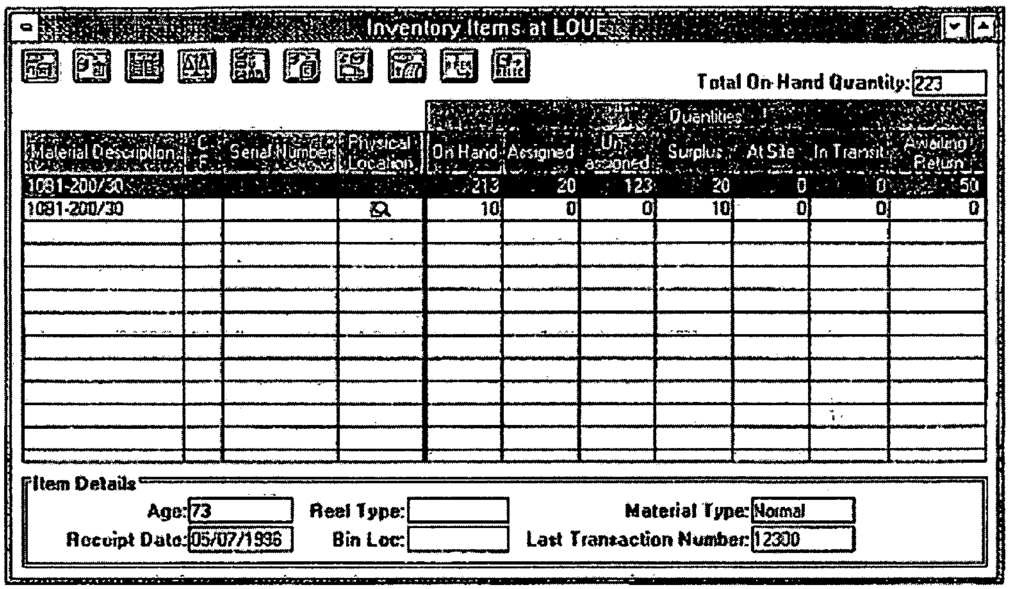

FIG. 207 is another exemplary screen print for Inventory Items.

Figure 208:
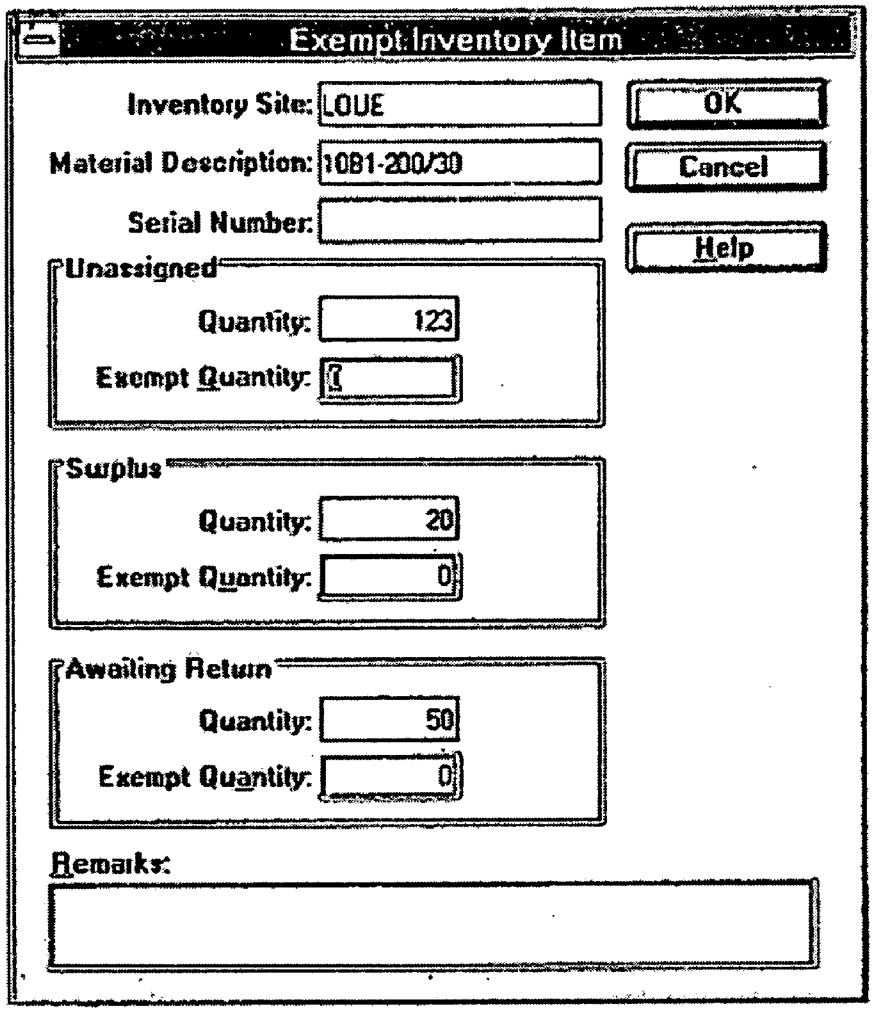

FIG. 208 is an exemplary screen print for Exempt Inventory Item.

DETAILED DESCRIPTION

Reference will now be made in detail to preferred embodiments of the invention, non-limiting examples of which are illustrated in the accompanying drawings.

I. Overview of Preferred System and Methods

Figure 1:
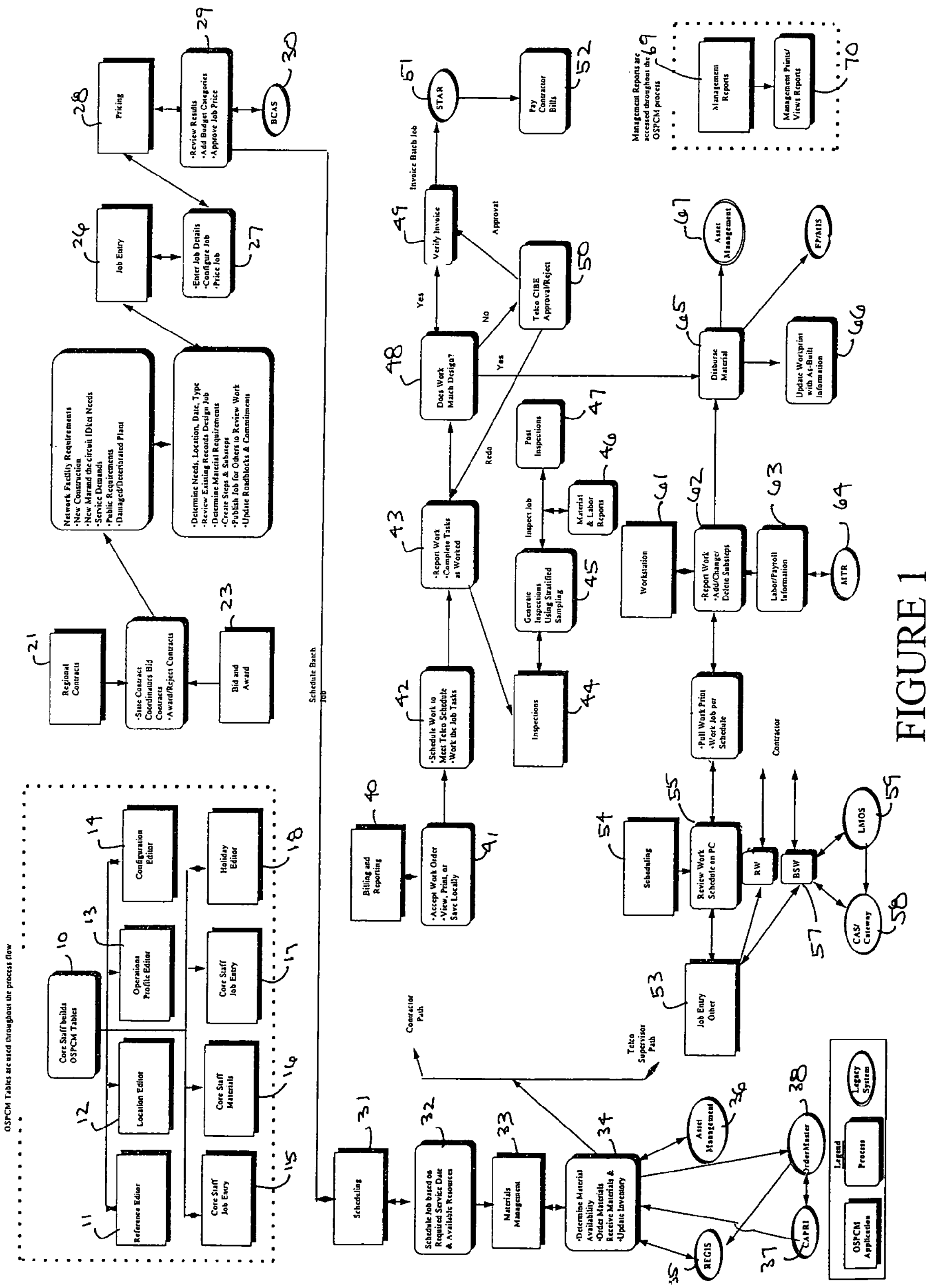
FIG. 1 is an overall process flow according to a preferred embodiment of the invention.

With reference to FIG. 1, processes and systems according to preferred embodiments of the invention will now be described. One process according to the invention comprises an Outside Plant Construction Management (OSPCM) process that accesses a number of tables 10 through 18. At 10, the core staff builds OSPCM tables through the assistance of a reference editor 11, location editor 12, operations profile editor 13, configuration editor 14, core staff job entry 15, core staff material 16, core staff job entry 17, and holiday editor 18.

The OSPCM process begins at 21 with a regional contracts application. The regional contracts application 21 provides uniform terminology throughout various contracts. For instance, a contract item of burying cable may be contract item 101A and is the same for all contractors.

At 23, a bid and award application is used for both the bidding of contracts and the awarding of them. The bid and award application tracks each contract work item (CWI) for each contractor per contract. Thus, for existing contracts, the OSPCM system has reliable historical information from which an accurate bid may be fabricated. For instance, the OSPCM system can accurately estimate the number of 30 foot poles, 40 foot poles, and 50 foot poles placed by a specific contractor in a specific area for a specific time period. Based on this information, the OSPCM system generates a bid that is sent to the contractors and the contractors include their pricing and other information to the bid. Based on the information already within the OSPCM system, the bid provided to the contractors is returned and input into the OSPCM system. The OSPCM system then provides a view of all of the bids that have been received and allows these bids to be compared to each other so that the contractor with the most desirable bid can be awarded the contract.

At 26, a job entry application is used to enter job details and to configure the job. An engineer or other person within the company draws up the job on blueprints and inputs all of the work tasks that need to be performed. The entry of job details also includes detailing all of the material that is needed to perform the job and any service commitments and due dates. A configuration process is also performed at 27. The configuration process reads the tasks involved in a job and groups the tasks into scheduling activities. The configuration process assigns standard time increments for the jobs, sequences the work depending upon which tasks need to be performed prior to other tasks, and creates desired schedule dates for the jobs based upon due dates and relative priorities. For example, the configuration process sequences the placing of poles prior to placing cable and ensures that the cables are in place prior to scheduling the task of splicing the cables. The configuration process also assigns the correct resource to each scheduling activity.

At 28, a pricing application assigns costs to each of the tasks. The pricing application places costs on all materials as well as labor. For instance, for placing cable the pricing application multiplies a loaded labor rate times the standard time increment for placing cable and the multiplies times the footage on the cable to come up with the labor cost. The pricing application also adds in engineering overhead and other related cost to arrive at a final price. At 29, the prices are reviewed and are approved, with the level of approval being dictated by the total cost of a job. At 30, the pricing information is provided to a budgeting tool, such as budget control administration system (BCAS).

At 31, a scheduling application looks at the available resources and assigns the tasks to the appropriate personnel. The scheduling application, for instance, knows which supervisors are available on certain dates within a certain region and can assign the tasks accordingly to the best-suited person, as shown at 32. The scheduling process employs a critical path method (CPM) to ensure that critical due dates are met. For example, if a task needs to be completed by a certain date but cannot be started until a second task is finished, then the scheduling application will ensure that the second application is completed a sufficient number of days prior to the due date so that all tasks may be completed on time.

At 33, a materials management application manages the required materials for the tasks. At 34, the materials management application determines what materials are available from within the RBOC and also determines what materials need to be ordered from outside vendors. The materials management application knows the time it takes to receive the material (shipping interval) once it is ordered and places the order so that the materials are available at the time that they are needed. The major materials are maintained by serial number and all materials are tracked when they are ordered, assigned to a job, and used for a job. The material needs are sent to an order master system 38 which determines whether orders must be placed from within the RBOC or to an outside vendor. The requisition entry and general inventory system (REGIS) 35 and computer assisted purchasing requisition and inventory (CAPRI) system 37 provide interfaces for ordering the materials from either the outside vendor or internally. The asset management system 36 provides an interface between OSPCM and the accounting system for the RBOC.

The OSPCM process then splits into a first path for contractors and a second path for internal jobs. With regard to the contractor path, a billing and reporting application 40 handles an interface with the contractor. At 41, the work order is provided to the contractor and the contractor acknowledges acceptance of the order. At 42, the work order is scheduled to meet the RBOC's work schedule and at 43, after the work was performed, the contractor accesses the OSPCM to indicate that the work has been completed. The OSPCM at 48 determines whether the completed work matches the design in the system. If it does, the OSPCM system verifies the invoice at 49 and sends the invoice to a voucher system 51 which handles the actual paying of the contractor at 52. If the work does not match the design, then at 50 the contractor's report is sent for approval, such as to a supervisor. The supervisor can approve the invoice, make modifications, or make comments to the report at 50. The billing and reporting therefore ensures that only work orders that were requested and that have been completed are sent for payment. The billing and reporting application eliminates the need for any paper invoices to be sent from the contractor to the RBOC and the need for these paper invoices to be sent between the supervisor and other people within the RBOC.

An inspections application at 44 uses a random sampling process to schedule inspections of completed work tasks, as shown at 45. A primary purpose of the inspections application is to provide a mechanism for monitoring the contractors to ensure that the work that they indicated as being completed is actually completed as designed and the billing also is accurate. The results of the inspections are posted at 47 and material and labor reports are generated at 46.

If the work is to be performed by the RBOC, then the work is scheduled at 55. The scheduling and review of the work is performed by the scheduling application at 54. If necessary, at 53 the job entry other application invokes a buried service wires (BSW) application 57 which provides an interface to another contractor via the construction administration system gateway (CAS/GATEWAY) 58 and loop management operation system (LMOS) 59, which are dispatch systems for installation personnel.

A work station application at 61 provides an interface through which employees may enter their time and for entering tasks that they have completed. The work station application is used in reporting work and noting added, changed, or deleted tasks at 62. This information at 63 is provided to the payroll system MTR at 64.

The completed tasks and jobs, regardless of whether they follow down the contractor path or the internal Telco supervisor path, are reported so that at 66 the master plan for a job may be updated. Also, materials are dispersed at 65 and are reported to the asset management system at 67. The OSPCM system also provides a management reports application 69 for providing various management printouts and reports at 70.

II. Regional Contracts

Reference is made to the Exhibits of this application for additional description of the regional contracts application. In general, the regional contracts application provides uniformity in terminology between all contractors. Each of the contractor work items (CWI) consequently are coded in the same manner, such as 101A for burying cable. The output of the regional contracts is provided to the bid and award application in generating bids for prospective contractors.

III. Bid and Award

Reference is made to the Exhibits of this application for additional description of the bid and award application. The bid and award application provides support in the contract itself, potential contractors with associated information, and some company parameter maintenance to administer the bidding and awarding of contracts. With regard to the contract itself, the bid and award application defines the contract and specific attributes or fixed variables about it. These attributes include such data as the geographical area that the contract covers and specific CWI codes associated with the contract.

After the contract is defined, the contract has a life cycle with a beginning, a termination, anniversaries, adjustment periods, extensions, and expiration. Changes may be made to the contract throughout its life cycle which are monitored and managed by the bid and award application. An existing contract will have a contractor associated with it and prices for each CWI may have periodic adjustments which may be manually or automatically made by the bid and award application. The bid and award application also includes definitions of each contractor that the company may consider and or contract with to perform tasks. The definition of the contractors will include the types of contracts that the contractor can work and where they can work on, and also license, insurance, financial, and security information.

As contractors are given contracts, the bid and award application establishes billing offices for handling day-to-day invoicing and payment activity. The bid and award application also maintains government price increase construction (PIC) figures, company PIC figures and inspection pools. The PIC figures are used by the bid and award application and the automatic price adjustment processes. The bid and award application uses the inspection pools to define a geographic area in which to monitor the performance of a contractor and to establish some of the parameters for inspection of the contractor's work.

Figure 2A:
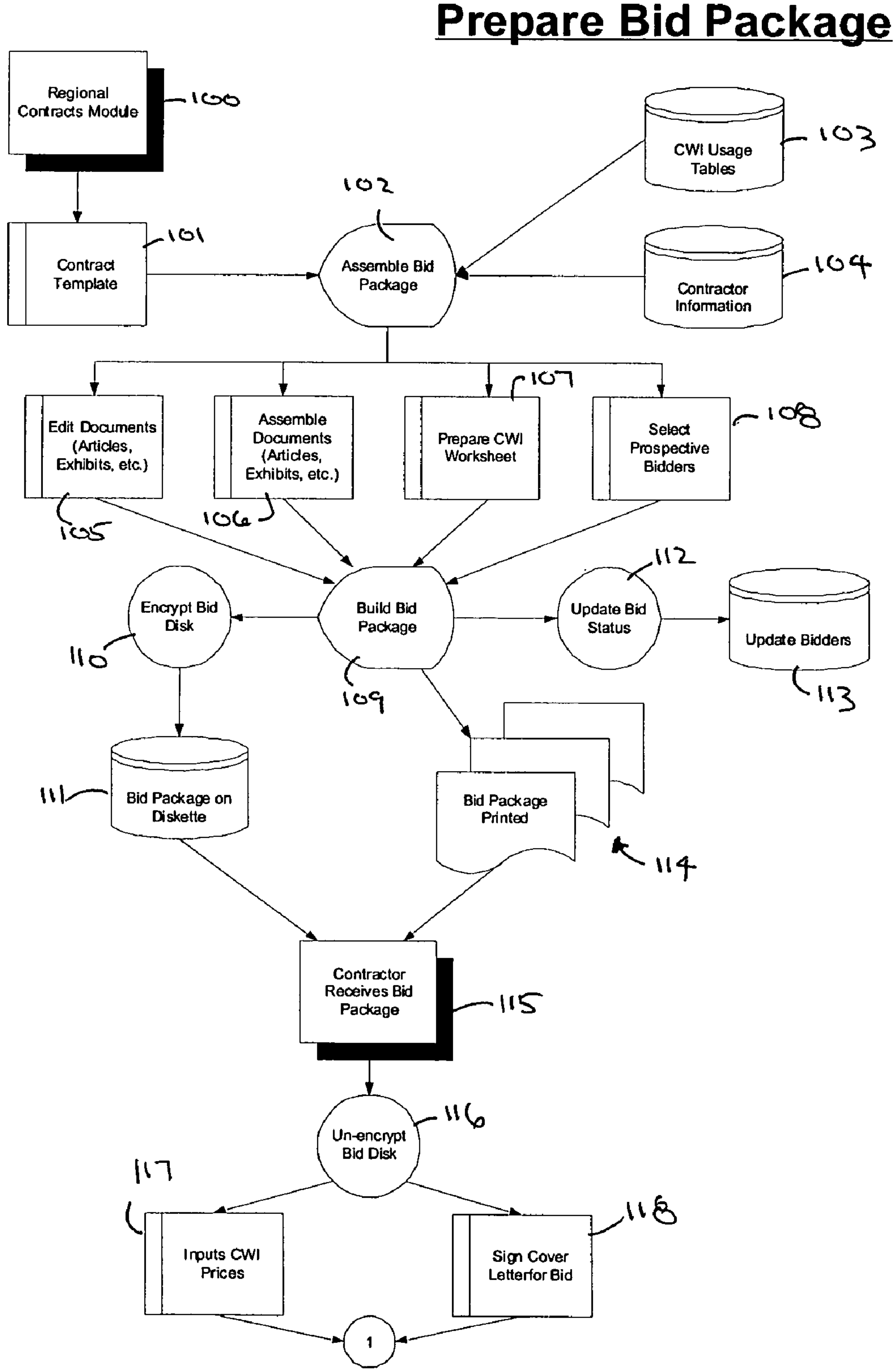
FIG. 2A is a prepare bid package process flow performed by a bid and award application shown in FIG. 1.
Figure 2B:
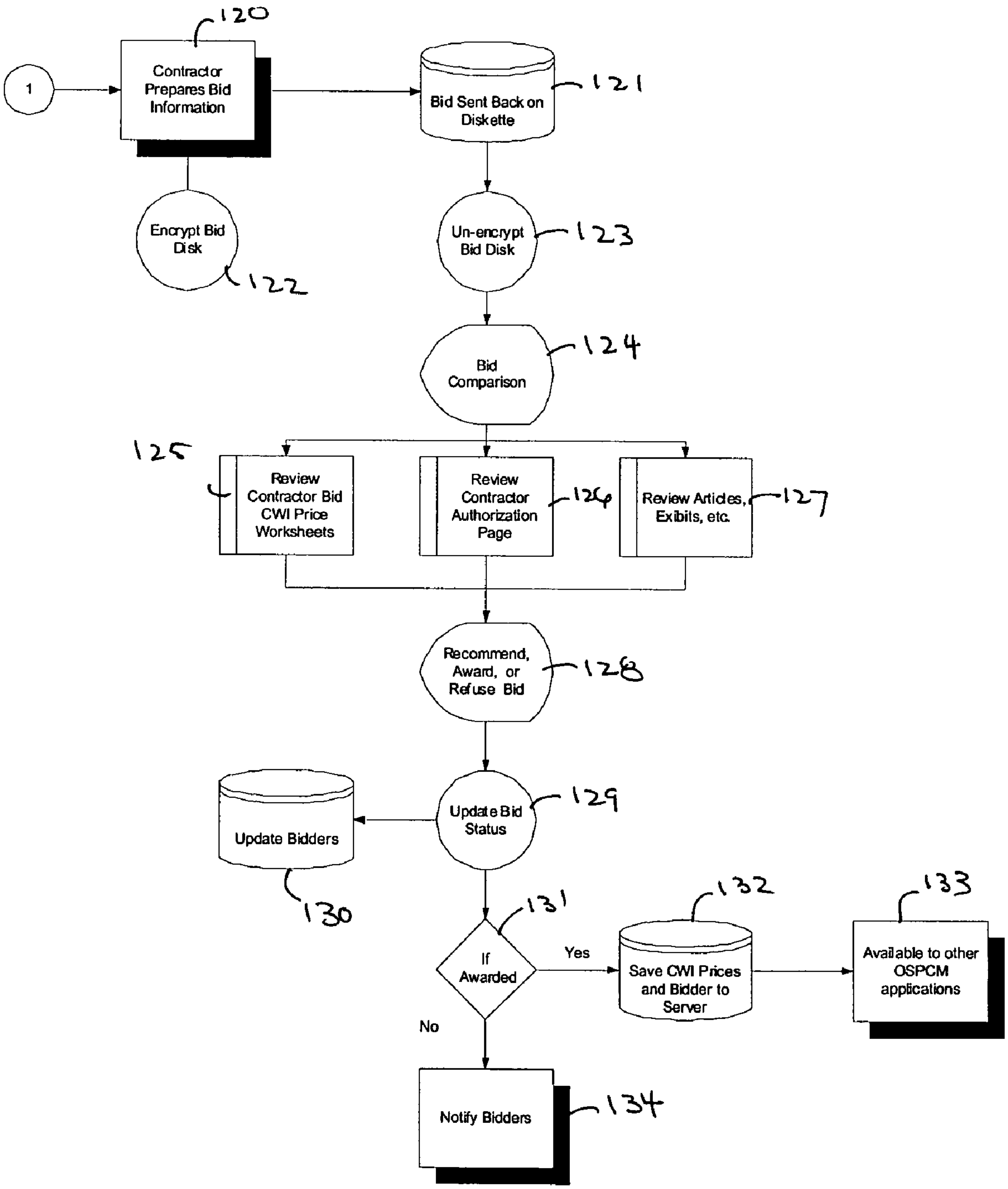
FIG. 2B is an award bid process flow performed by the bid and award application of FIG. 1.

With reference to FIG. 2A, the bid and award application will be described in more detail. At 100, the regional contracts application provides a contract template at 101. At 102, a bid package is assembled using CWI usage tables 103 and contractor information 104 contained within databases. Assembling the bid package entails editing documents at 105, assembling documents at 106, preparing CWI worksheets at 107 and selecting prospective bidders at 108. The bid package is built at 109, encrypted to a disk at 110, and placed on a diskette at 111. The bid package is also printed at 114, the bid status is updated at 112, and the bidders are updated in a database at 113. The contractor at 115 receives the bid package, either through the diskette or through the printed package. The contractor at 116 un-encrypts the disk and inputs CWI prices at 117 and signs a cover letter for the bid at 118. With reference to FIG. 2B, the bid information is prepared at 120 and is encrypted to the bid disk at 122. At 121, the bid disk is sent back to the RBOC which un-encrypts the disk at 123 and compares the various bids at 124. The bid comparison entails reviewing contractor bid CWI price worksheets at 125, review contractor authorization pages at 126, and review any articles or exhibits to the bids at 127. At 128, decisions are made as to whether to recommend a particular bid, award the bid, or refuse a particular bid. The bid status is updated at 129 and the updated information is stored in a database at 130. If a bid is awarded, as determined at 131, then the awarded bid information is saved to a database at 132 and is available to the other OSPCM applications at 133. At 134, the contractors that did not receive the award are notified by the OSPCM system.

IV. Job Entry

Reference is made to the Exhibits of this application for additional description of the job entry application. The job entry application performs a configuration process that determines the type of work on a task or sub-step and assigns a resource. The configuration process also groups the work into logical groups called scheduling activities and then places the scheduling activities in a sequence based on the scheduling sequence codes. The configuration process establishes a date type such as start or completion dates, crew size, a priority, and completion date for the entire scheduling network based on user input or default time periods. The job entry application in performing the configuration process also establishes desired start and end dates on each scheduling activity using the critical path method (CPM).

Figure 3:
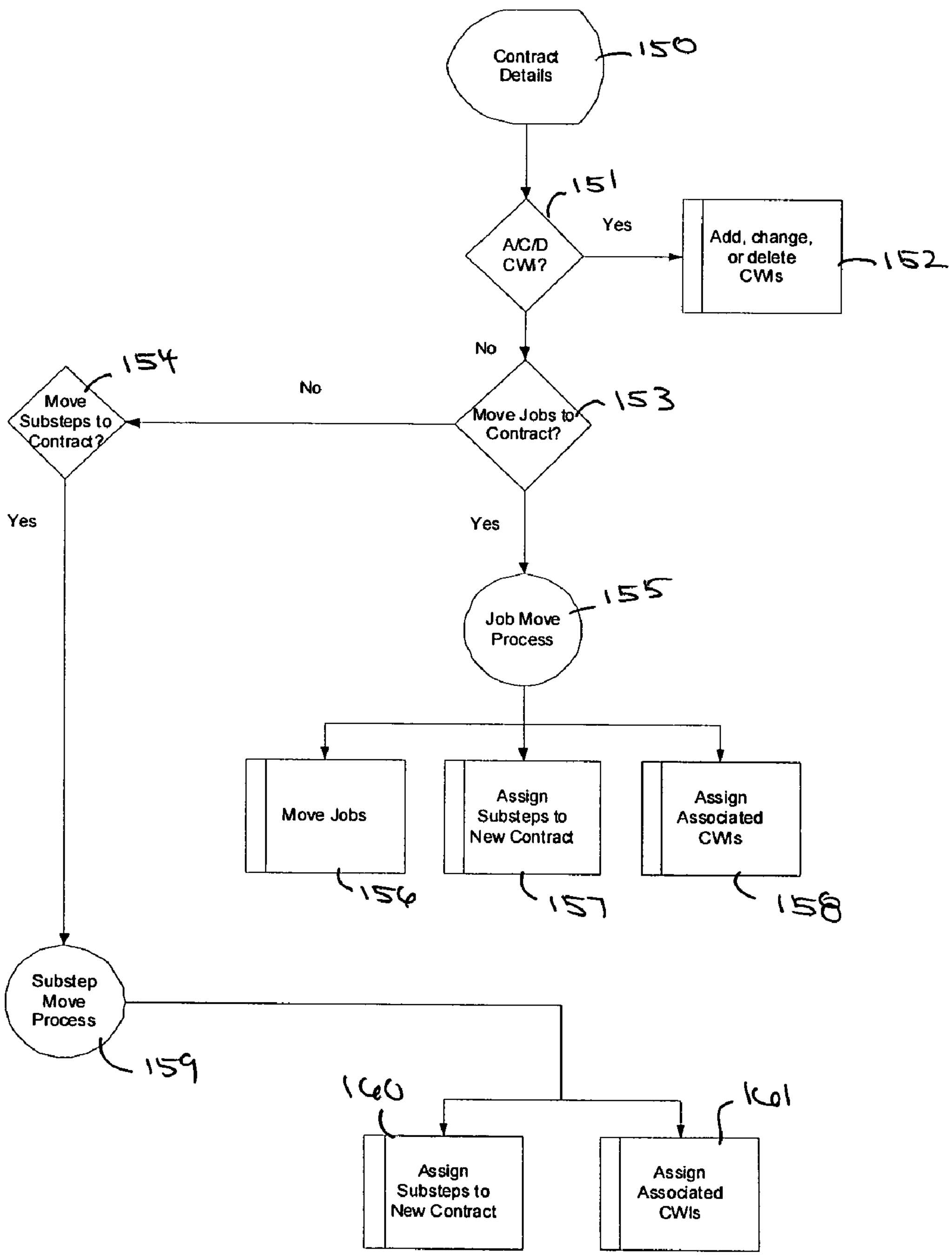
FIG. 3 is a contract moves process flow performed by a job entry application shown in FIG. 1.

A process performed by the job entry application called contract move will now be described with reference to FIG. 3. At 150, the job entry application reviews the contract details and at 151 determines whether there has been a change, addition, or deletion of a CWI If there has been, then at 152 the job entry application performs the necessary add, change, or deletion of the CWI. If not, then at 153 the job entry application determines whether jobs need to be moved to a contractor and, if so, moves the job at 155. Moving the job by the job entry application entrails moving the jobs at 156, assigning sub-steps to the new contract at 157, and assigning associated CWIs at 158. If jobs do not need to be moved to the contract, and if sub-steps need to be moved to the contract at 154, then the job entry application moves the sub-steps at 159. The job entry application assigns sub-steps to the new contract at 160 and assigns associated CWIs at 161.

V. Pricing

Reference is made to the Appendix Exhibits of this application for additional description of the pricing application. The pricing application associates prices with each sub-steps materials, labor, engineering, and contractor resources. The pricing application provides a user with the ability to view reports on-line and to add miscellaneous costs that were not captured during the encoding process by the pricing application. These miscellaneous costs include miscellaneous material, retirement, labor, contractor, engineering, and other costs. The pricing application also provides various reports, such as a report on a detailed price for a job. The pricing application may also provide a detailed construction details report that allows a user to view a list of the pricing reports that have been run for a specific job.

VI. Scheduling

Reference is made to the Exhibits of this application for additional description of the scheduling application. The scheduling application also contains the ability to adjust information on scheduling networks. This information includes desired completion dates, crew size, resource groups and priorities. This information is used to establish CPM dates and prioritize the activities. The OSPCM system provides a user with the ability to move work tasks from one activity to another and to change the sequence of work by changing the activity dependencies. The user also has the ability to manually move work into or out of the schedule within week one or week two and can lock down work so that the scheduling process will ignore resource availability when scheduling the locked down activity. The scheduling application provides scheduling reports and graphs, including individual schedules for each resource group. The scheduling application creates a schedule for each resource group, such as a supervisor group, and contains work for 20 weeks. The scheduling application will not schedule work on a date that has passed and no work is scheduled in weeks beyond 20 weeks. The scheduling application preferably performs a batch process that runs on Saturday nights but can alternatively be run at the user's discretion. The scheduling application creates a priority list of scheduling activities based on adjusted CPM start and end dates, priorities, date types, and activity dependencies. The application adjusts the CPM dates so that when the scheduling process runs, no activity will be scheduled in the past. For example, if the application executes the scheduling process at night, then the earliest scheduled start date for any activity will be the next day.

The scheduling application creates resource availability tables for each work group or resource pools. The scheduling application uses a worker profile for each worker that identifies the number of hours per day and the days per week that the worker is available. The scheduling application also uses any vacation time, training time or other miscellaneous off-time. After establishing the priority list and the resources availability tables, the scheduling application schedules the all activities based on the available resources for the CPM dates. If resources are not available for a particular CPM date, then the OSPCM system moves the activity out in the schedule until resources can be found. All activities are scheduled from the priority list in order even if resources are not available on the CPM dates.

Figure 4:
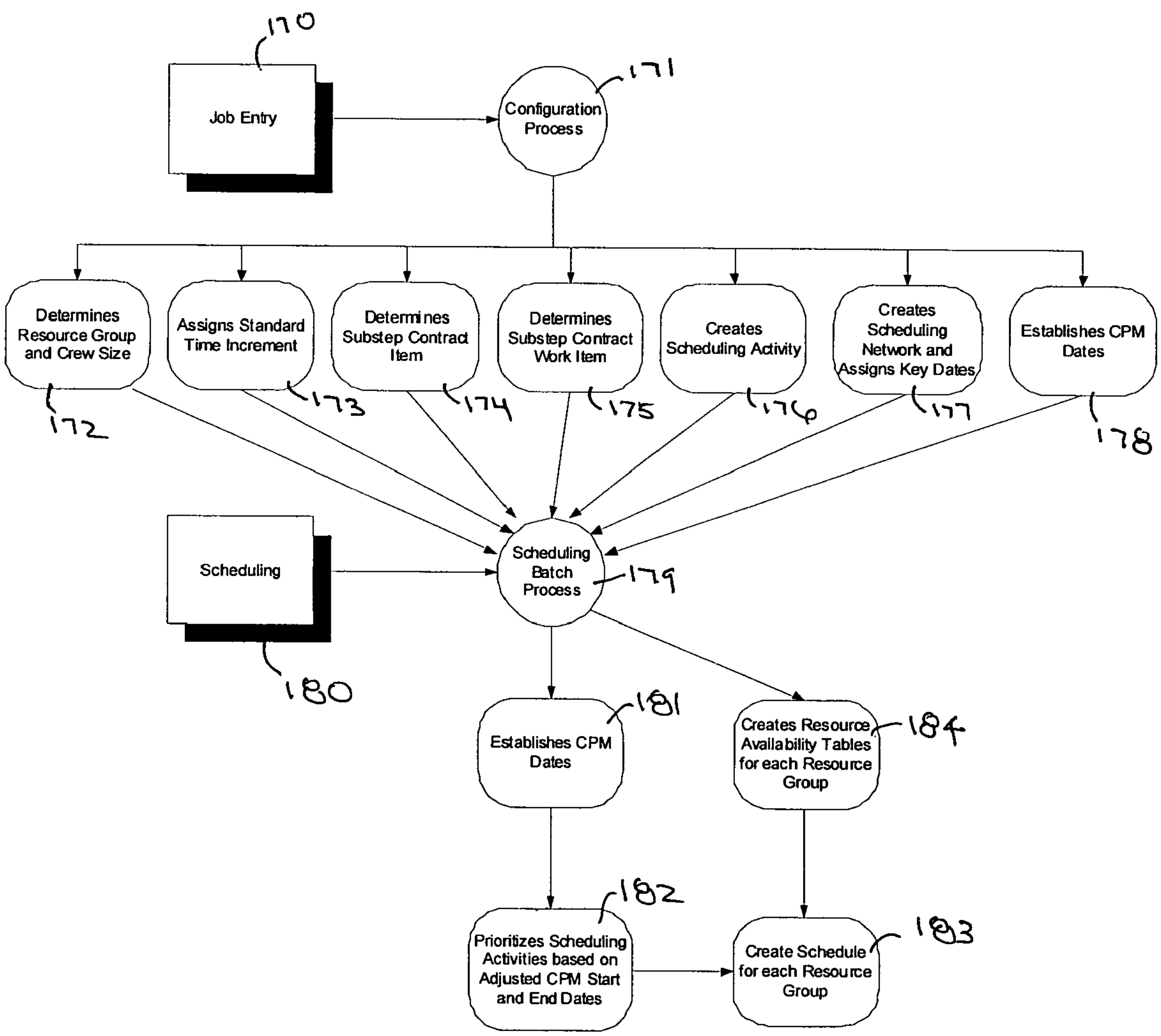
FIG. 4 is a scheduling process flow performed by the scheduling application shown in FIG. 1.

A process performed by the scheduling application will now be described with reference to FIG. 4. The output of the job entry application at 170 is provided to a configuration process at 171. The configuration process, as described above, performs the necessary grouping of tasks into activities, sequencing, and prioritizing according to due dates and schedules. The configuration process determines resource group and crew size at 172 and assigns standard time increments to the tasks at 173. The configuration process determines sub-step contract items at 174, determines sub-step contract work items at 175, and creates a scheduling activity at 176. At 177, the configuration process creates scheduling network and assigns key dates and at 178 establishes CPM dates. The scheduling application at 180 performs a batch process at 179. The batch process establishes CPM dates at 181, prioritizes scheduling activities based on adjusted CPM start and end dates at 182, creates schedules for each resource group at 183, and creates resource availability tables for each resource group at 184.

VII. Materials Management

Reference is made to the Appendix Exhibits of this application for additional description of the materials management application. The materials management application ensures that material requirements are met for all jobs. All new material is obtained through a real-time interface with the order master, which is the front-end interface to REGIS and CAPRI. All items with a product identifier are sent from the order master to REGIS to be fulfilled, preferably from within inventory. All non-product identified items are sent from the order master to CAPRI to be fulfilled by an outside vendor. The materials management application calculates the order date, identifies the requirements of today, orders material requirements, views an order, receives shipment details, receives ordered materials, sends receipt notification to CAPRI, and sets preferences.

The materials management application also satisfies material requirements on jobs with existing inventoried materials. The materials management application may satisfy a materials requirement with inventory, may execute a transfer request from another site, and also acknowledges receipt of transferred materials. The materials management application manages inventory on various levels. The materials management application performs the following functions: view a jobs material requirements, issue material needed on a job, view an inventory item, view assignments, junk an inventory item, split a reel of cable, adjust an inventory balance, change the status of an inventory item, exempt an inventory item, return an inventory item, transfer an inventory item, relocate an inventory item, add an inventory item, view issues, view material inventory transactions, run an inventory scan, process material usage, report material inventory transactions to asset management system, and report reconciliation file to the asset management system.

The materials management application can also be used to gain consensus on how material requirements are handled when changes are made to a sub-step. These changes include changes that indicate that the material requirement is no longer needed either because the job or sub-step was deleted, changes to the description of the material required on the sub-step, changes to the custom features required on the sub-step, such as creating, updating, or deleting custom features, or changes to the quantity of material required on the sub-step.

The materials management application is also used in combination with the management reports application to generate various reports. These reports include order reports, transaction reports, issue summary reports, major material activity reports, material notification reports, over-age material reports, and investment management reports.

Exemplary processes performed by the materials management application will now be described with reference to FIGS. 5A to 5F. At 200, the materials management application determines the requirements needed for a job. At 201, the materials management application selects the requirements for an order and generates the order for the job at 202. The order is generated after considering aggregation, custom features, group order requirements, and shipping to alternate addresses at 203. The order is sent to the order master process at 204 and the order master at 205 performs the order. At 206, the materials management application checks to see whether the order was successful and, if it is, receives a "Q" number at 207. If the order was not successful, then at 208 the materials management application views and fixes the order master errors and generates the order at 202.

Figure 5A:
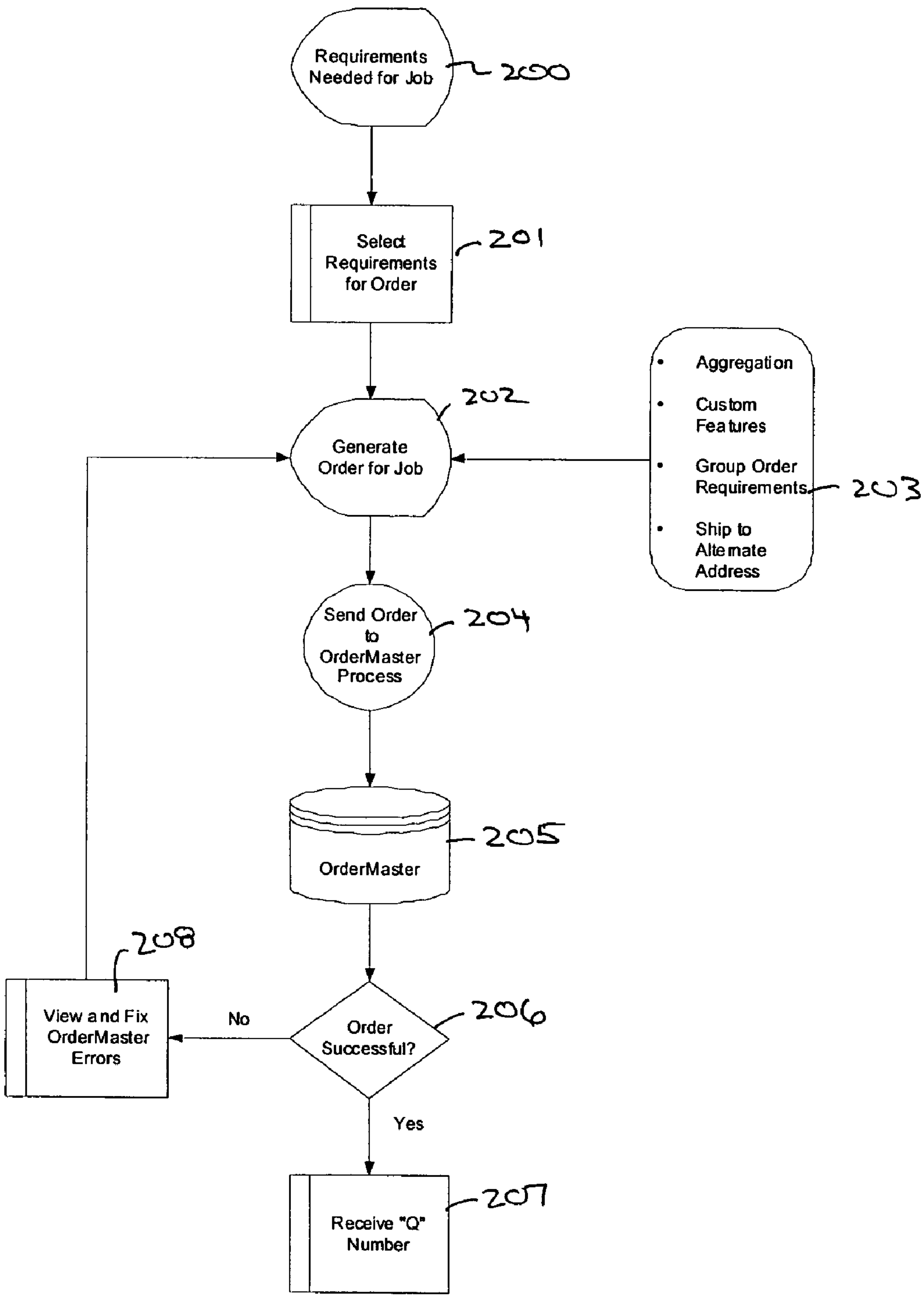
FIG. 5A is an order process flow performed by a materials management application shown in FIG. 1.
Figure 5B:
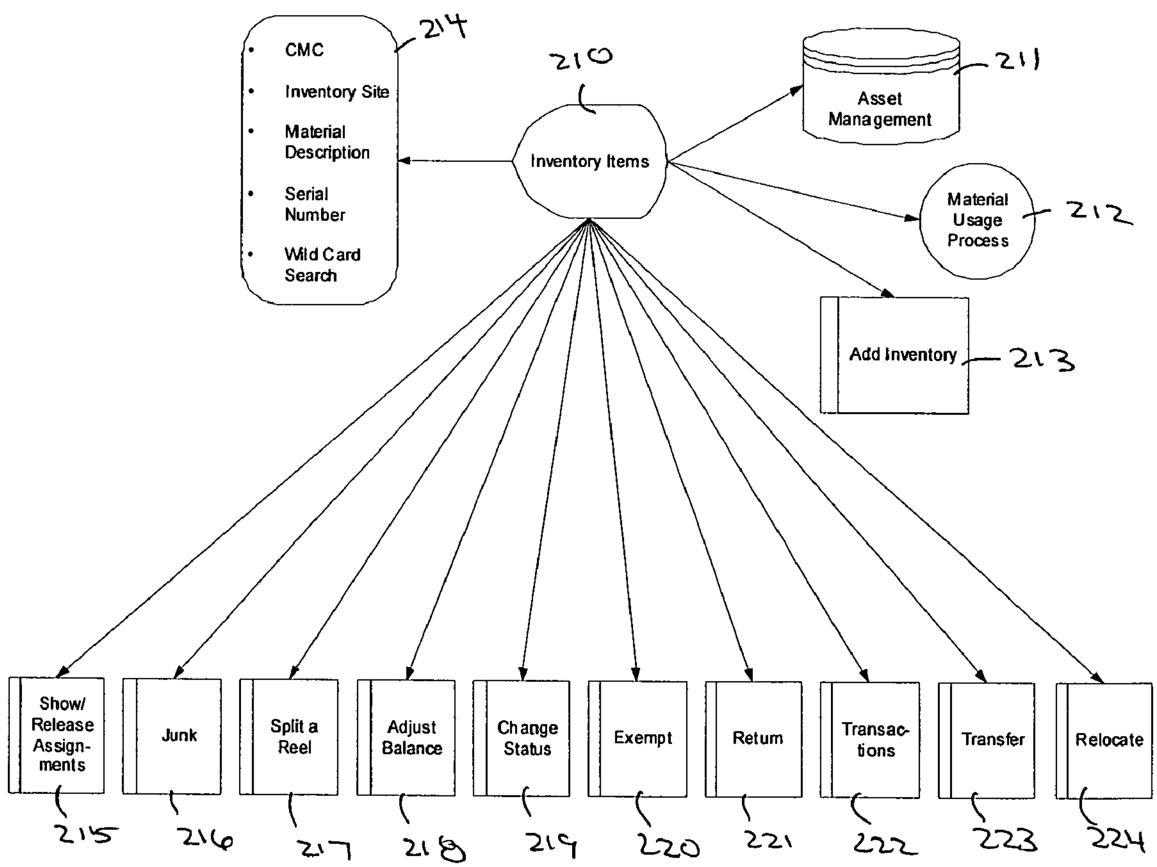
FIG. 5B is an inventory process flow performed by the materials management application of FIG. 1.

An inventory process performed by the materials management application will now be described with reference to FIG. 5B. The materials management application maintains an inventory of all items at 210. The materials management application provides outputs to the asset management system at 211, to a material usage process at 212, and determines whether inventory needs to be added at 213. The materials management application at 214 enables wild card searches, searches based on serial number, material description, inventory site, or CMC. Through its inventory process, the materials management application shows/releases assignments at 215, junks or discards inventory at 216, splits a reel at 217, adjusts balances at 218, changes the status at 219, indicates exempt status at 220, return status at 221, records transactions at 222, transfers at 223, and relocates at 224.

Figure 5C:
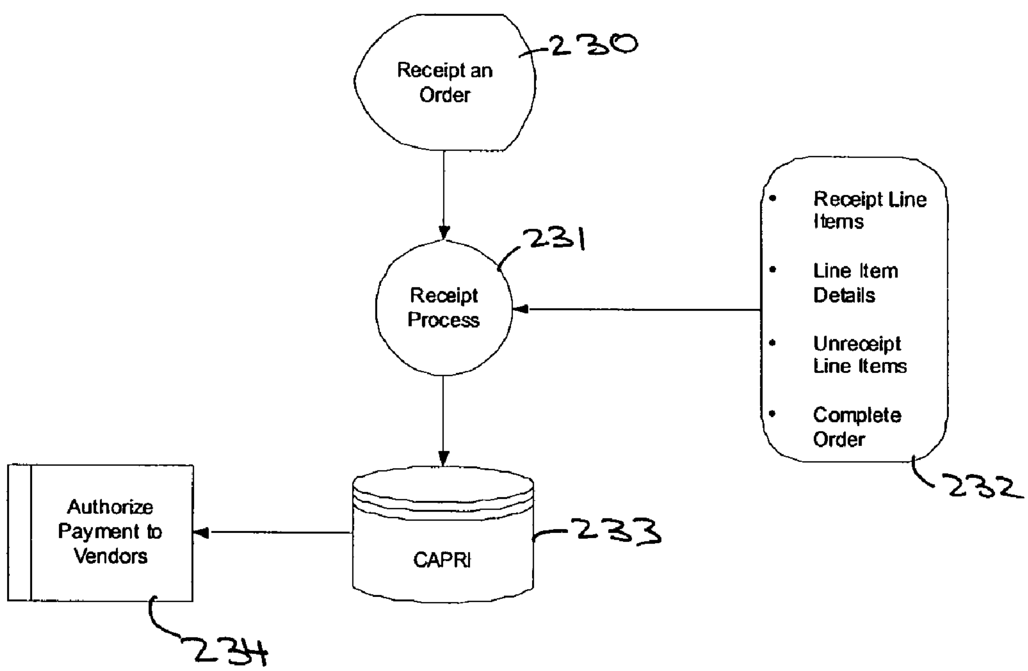
FIG. 5C is a receipt process flow performed by the materials management application of FIG. 1.

A receipt process performed by the materials management application will now be described with reference to FIG. 5C. The materials management application receives an order at 230 and executes a receipt process at 231. At 232, the materials management application indicates receipt line items, line item details, unreceipt line items, and complete orders. The materials management application provides an output to the CAPRI system at 233 which authorizes payments to the vendors at 234.

Figure 5D:
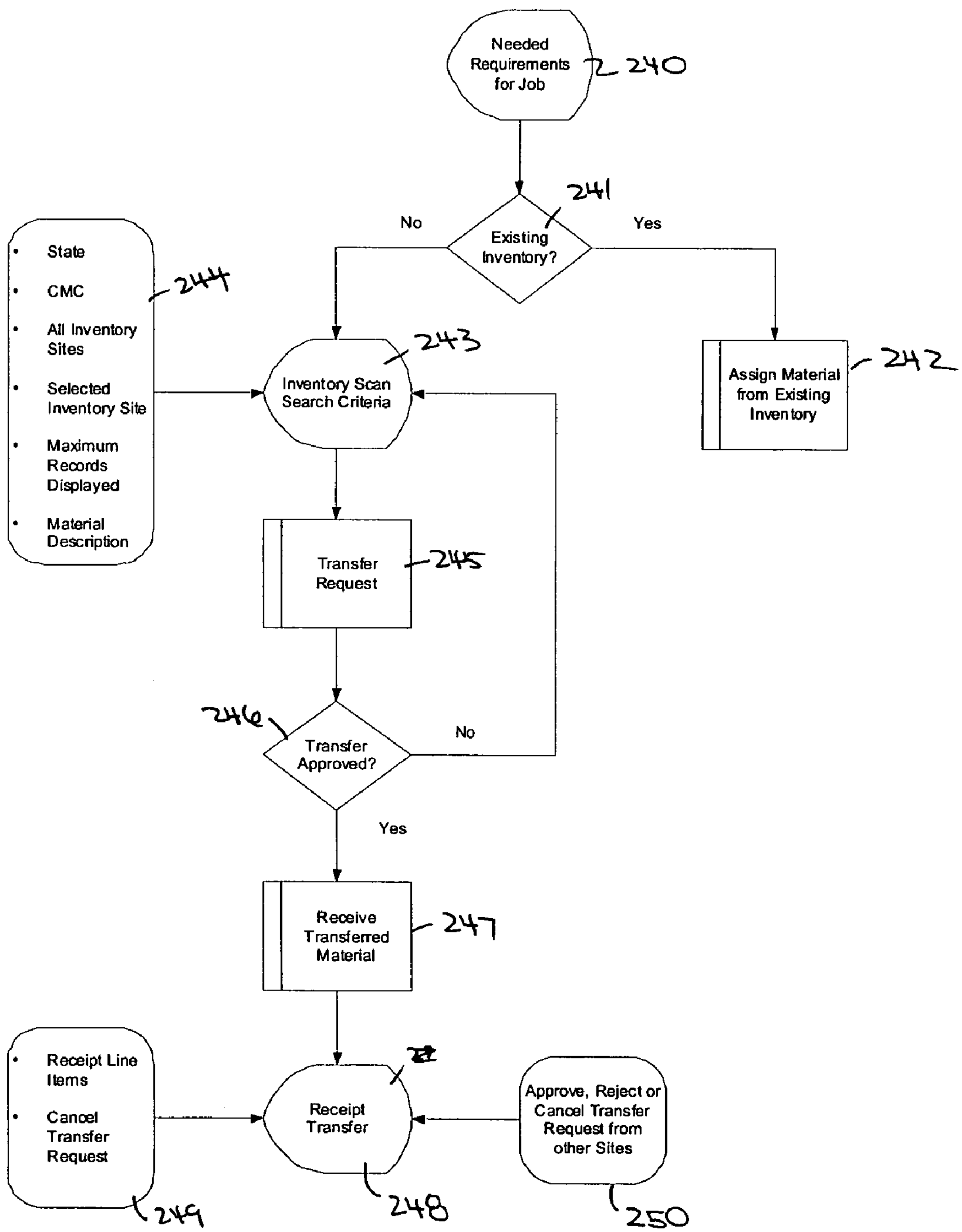
FIG. 5D is an assign and transfer process flow performed by the materials management application of FIG. 1.

An assign and transfer process performed by the materials management application will now be described with reference to FIG. 5D. At 240, the materials management application determines the needed requirements for a job. At 241, the materials management application determines whether or not these needs can be met by existing inventory, and if so, assigns the material from the existing inventory to the job at 242. If the requirements cannot be met by existing inventory, then at 243 the materials management application scans inventory using search criteria. These search criteria, as indicated at 244, include state, CMC, all inventory sites, selected inventory sites, maximum records displayed, and material descriptions. A transfer request is executed at 245 by the materials management application and at 246 the materials management application determines whether the transfer is approved. If the transfer is not approved, then the materials management application scans inventory at 243. If the transfer is approved, then at 247 the materials management application receives the transferred material and performs a receipt transfer process at 248. The receipt transfer process receives receipt line items and also cancel transfer requests at 249 and also the approval, rejection, or canceling of transfer requests from other sites at 250.

Figure 5E:
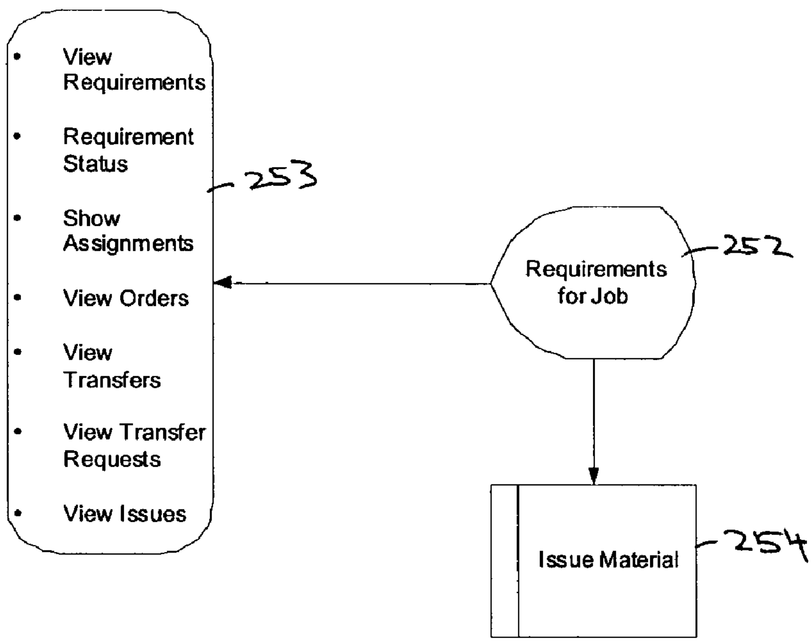
FIG. 5E is a requirement status and issue process flow performed by the materials management application of FIG. 1.

A requirement status and issue process performed by the materials management application will now be described with reference to FIG. 5E. At 252, the materials management application determines the requirements for a job. The materials management application determines the requirements by viewing the requirements, determining the requirement status, showing assignments, viewing orders, viewing transfers, viewing transfer requests, and viewing issues at 253. At 254, the materials management application issues the materials to the job at 254.

Figure 5F:
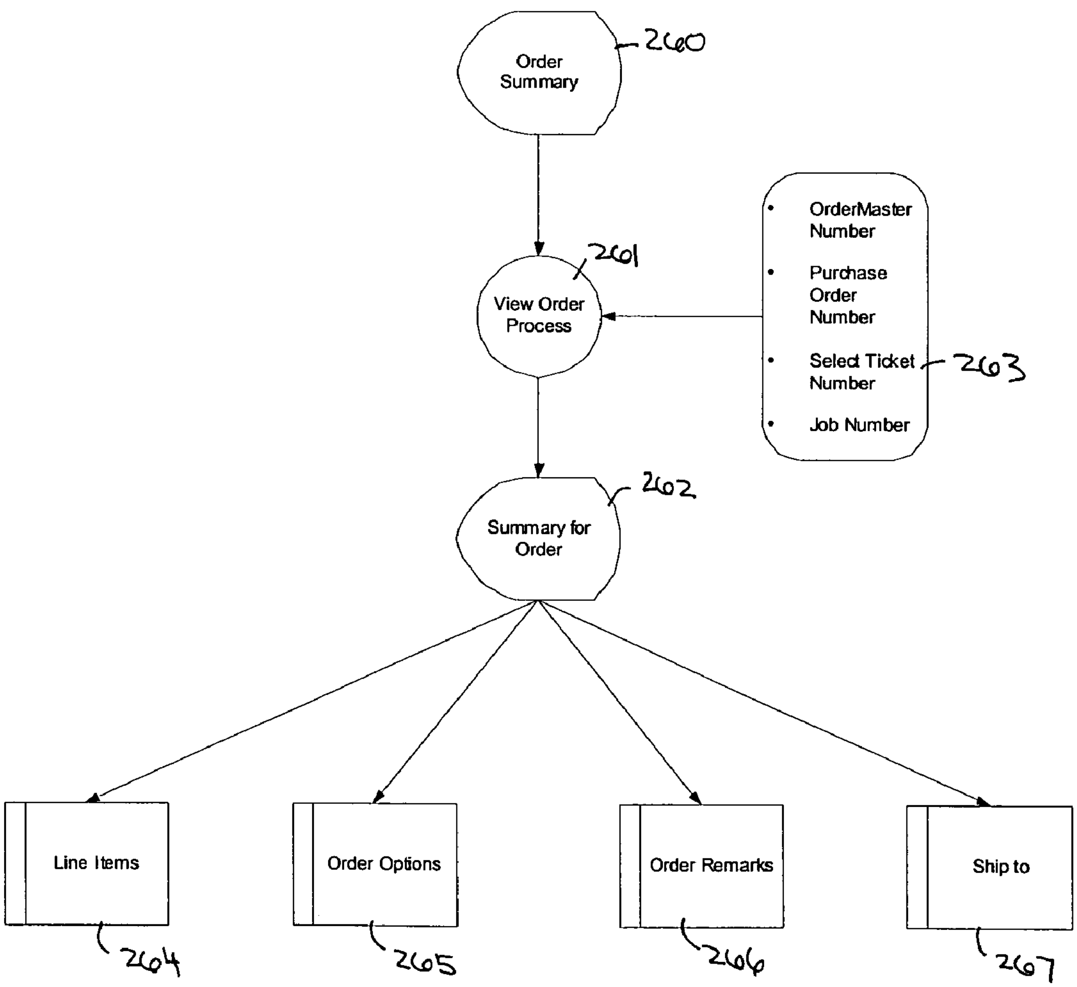
FIG. 5F is a view order process flow performed by the materials management application of FIG. 1.

A view order process performed by the materials management application will now be described with reference to FIG. 5F. At 260, the materials management application performs an order summary process. At 261, the materials management application views the order process based on the order master number, purchase order number, select ticket number, and job number as displayed at 263. At 262, the materials management application provides a summary for the order, including line items at 264, order options at 265, order remarks at 266, and ship to information at 267.

VIII. Job Entry Other

Reference is made to the Appendix Exhibits of this application for additional description of the job entry other application. The job entry other application performs processes to automatically authorize and approve contractor work tasks. The work tasks are authorized if an individual logged on has the proper authority level. If a higher level is required, the job entry other application notifies the user and provides an ability for such approval. The job entry other application tracks completed work to ensure that continued correct approval levels are maintained throughout the process. The job entry other application creates tables to set the allowed dollar approval limits for each management level for the type of work in process. The job entry other application also calculates the estimated dollar values of the proposed work task and uses this value to determine if the individual has the correct approval level.

Figure 6:
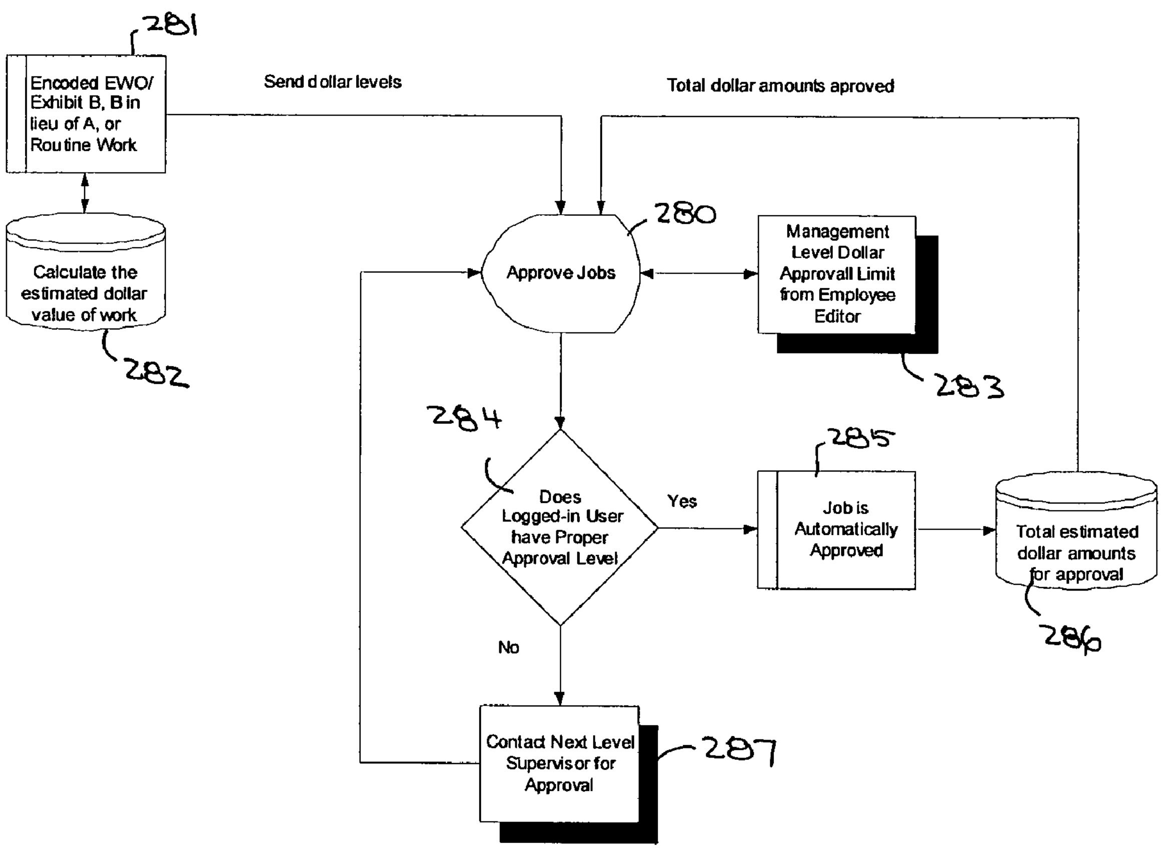
FIG. 6 is an approval process flow performed by the job entry other application shown in FIG. 1.

An approval process performed by the job entry other application will now be described with reference to FIG. 6. At 280, the job entry other application performs the function of approving jobs. The estimated dollar value of the work is calculated at 282 and is encoded at 281 and dollar levels are provided to the job entry other application. The job entry other application uses management level dollar approval limit from the employee editor at 283 and determines at 284 whether the logged-in user has the proper approval level. If the user does, then the job is automatically approved at 285 and the total estimated dollar amounts for approval are stored in a database at 286. If the user does not have the proper approval, then at 287 the job entry other application contacts the next level supervisor for approval.

IX. Billing and Reporting

Reference is made to the Appendix Exhibits of this application for additional description of the billing and reporting application. In general, the billing and reporting application provides an interface to the contractors through which they can accept work orders and view their schedules so that they may complete the jobs to meet appropriate due dates. After the job is completed, the contractors indicate the job as completed through the billing and reporting application and initiate a payment process. The billing and reporting application compares the completed jobs against the stored design and routes discrepancies to supervisors or other appropriate personnel for approval. In the event that the supervisor does not approve of the job that the contractor indicated as being completed, the billing and reporting application provides interfaces to the contractor and to the supervisor to come to a resolution. The billing and reporting application works in conjunction with the inspections application to oversee the contractors.

X. Inspections

Reference is made to the Exhibits of this application for additional description of the inspections application. The inspections application manages the inspection process of contractors and managers. The inspection application is involved in the following areas: inspection generation which may be either consensus or sample, reports, logging results, notification of failures, approvals, billing adjustments, management reporting, and contractor ratings.

Figure 7:
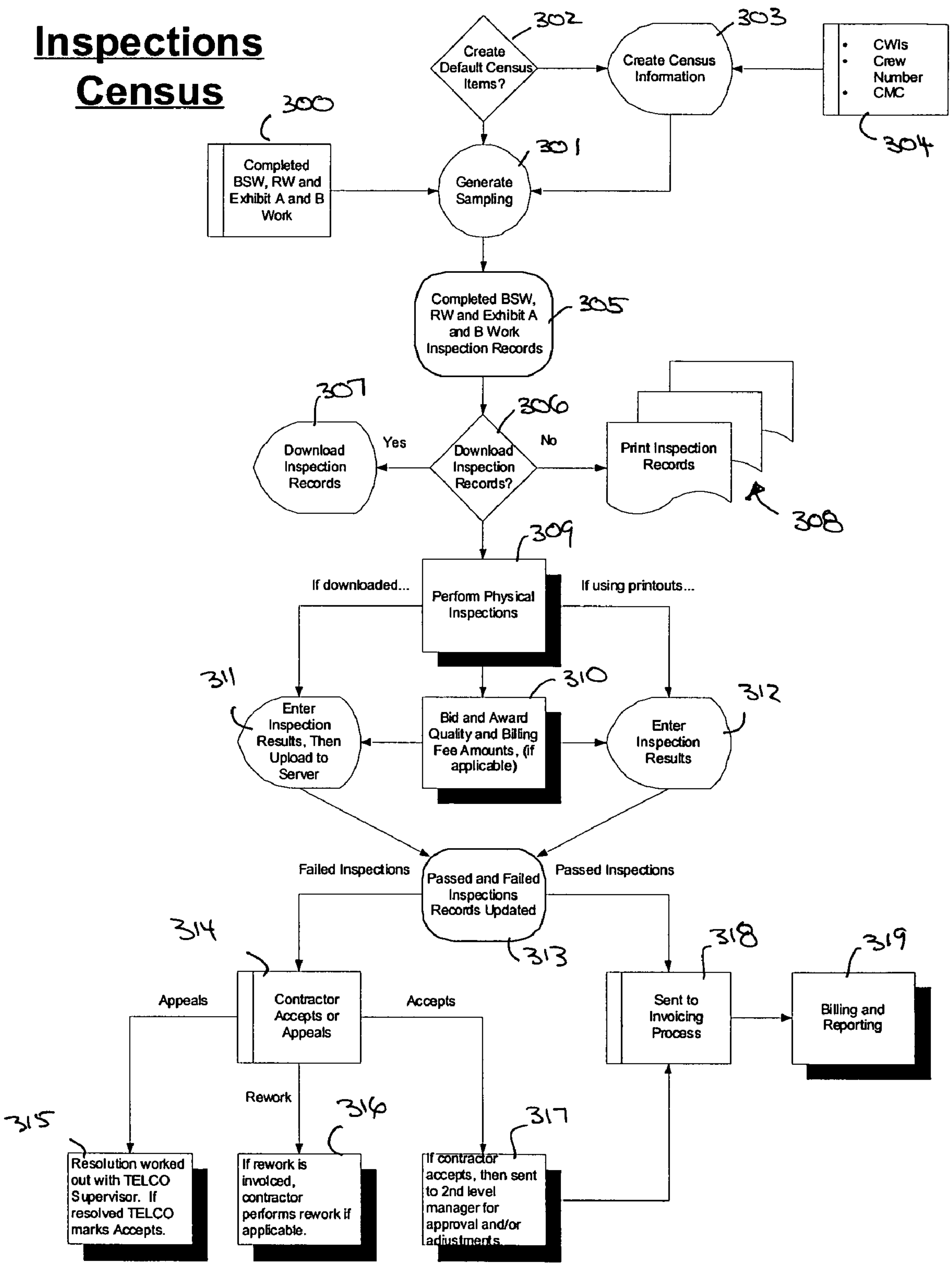
FIG. 7 is an inspection census process flow performed by the inspection application shown in FIG. 1.

An inspections census process performed by the inspection application will now be described with reference to FIG. 7. At 300, a job is indicated as completed, and at 301 the inspection application performs sampling. The inspection application uses the CWIs, crew numbers, and CMC at 304 to creates census information at 303. The inspection application may also create default census items for the sampling and also for the census information at 302. The inspection application generates inspection records at 305 and determines whether to download the inspection records at 306. If the inspection records should be downloaded, then at 307 the records are downloaded and are otherwise printed at 308.

At 309, the inspections are performed to ensure that the work that has been indicated as being completed was actually performed. If the inspection records were downloaded, then at 311 the inspector enters the inspection results and uploads the results to the inspection application. If the inspection records were printed, then at 312 the inspection results are entered on the records and provided to personnel for entry into the inspection application. The inspection is based on bid and award equality and billing fee amounts as indicated at 310. A determination is made at 313 as to whether the job passed or failed the inspection and records are updated appropriately.

For passed inspections, the inspection application sends the completed task to the invoicing process at 318 and the billing and reporting application performs its processes at 319. For inspections that failed, the contractor can accept or appeal at 314. If the contractor appeals, then at 315 a resolution is attempted between the contractor and the Telco. At 316, rework may be invoiced in which case the contractor would need to perform this work if applicable. If the contractor accepts the failed inspection, then the work item is sent to second level manager for approval and/or adjustments at 317.

XII. Workstation

Reference is made to the Exhibits of this application for additional description of the workstation application. In general, the workstation application provides an interface by which personnel within the company can enter their time and control their schedules. The personnel, for instance, can enter the time that they have worked as well as other time, such as vacation and training times. Through the workstation application, the personnel within a company also mark tasks as being completed. The information obtained from the workstation application is useful in dispersing time and materials promptly upon completion of tasks and in determining available resources. As discussed above, the scheduling application relies upon this type of data in scheduling jobs.

XI. Management Reports

Reference is made to the Exhibits of this application for additional description of the management reports application. The management reports application and the materials management application provide various reports on the OSPCM system and process. For instance, the management reports application provides an investment management report that provides an index measuring how efficiently inventory is managed. The index describes how much inventory was owned over a given period of time and how much it cost the company to own that inventory.

The management reports application may generate an issue summary report. The issue summary report contains information about issued material. The report is used to print a list of inventory items that have been taken from the inventory site to the job site.

The management reports application may also generate a major material activity report. The major material activity report contains information about material inventory transactions that involve movement in and out of inventory, excluding order receipts, transfer receipts, and disbursements. The report is designed so that a manager is aware of the transaction activity that occurs within an area for which he or she is responsible. Any abnormal activity is investigated.

The management reports application also generates a material notification report. The material notification report contains information about the inventory items currently assigned to a job. The report is used to determine the material that is available to begin work.

The management reports application may also generate an order report. The order report contains information about orders having a specified status. The status, for instance, may be ordered, shipped, received, or canceled.

The management reports application may also generate an over-age material report. The over-age material report contains information about material that will be held in inventory over 30 days because of a change in the associated job's schedule. This report includes material that is on order that, once receipted, will be in inventory for over 30 days before it is used and assigned material that will be in inventory for over 30 days before it is used. The report serves as a warning that the company is in jeopardy of holding inventory for over 30 days which could adversely affect the investment index of the company. The report can be used to reference the inventory items that could be unassigned from the original job and assigned to a job that will be worked earlier or used to reschedule the job again so that the material can be used for its original purpose.

The management reports application also generates a transaction report. The transaction report contains information about the transactions of a specified type. The transaction type includes order receipt, assignment, unassignment, inventory status change, inventory addition, inventory deletion, split a reel, transfer, transfer receipt, reclassify to exempt, reclassify from exempt, return, disbursement, remove to good, junk, and recover from junk.

XII. Reorganization

When organizational changes are made within the company that change boundaries of responsibility within a company, then jobs already in the OSPCM system must be re-assigned to the correct resources. These organizational changes include such changes as state, wire center, or construction management center (CMC) changes. A "Reorg" process within OSPCM does all of the re assigning of work to the appropriate areas without someone having to manually change every job.

Figure 8:
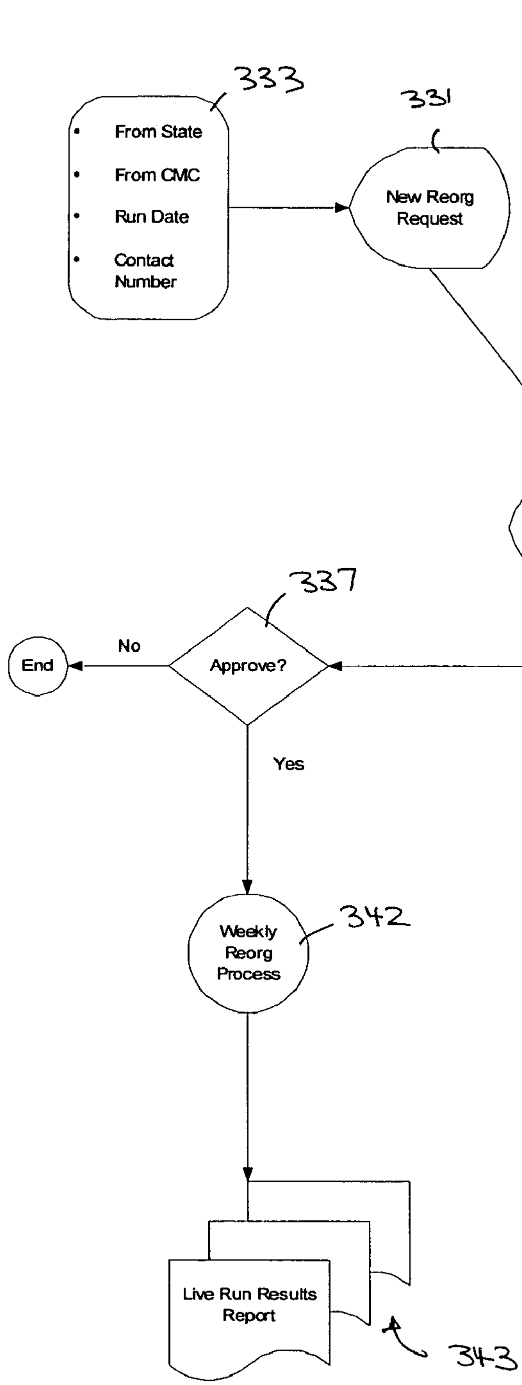
FIG. 8 is a process flow diagram performed by the OSPCM system in the event of a reorganization within a company.

A reorganization process according to a preferred embodiment of the invention will now be described with reference to FIG. 8. A reorganization request is processed at 335 with details of the reorganization request being provided at 336. These details include reports at 338, wire center rename at 339, wire center move at 340, or inventory site move at 341. The reorganization may be a new reorganization request at 331 or an existing reorganization request at 332. The new reorganization request may come from the state, CMC, run date or contact number as shown at 333. The existing reorganization request may come from a request number, state, CMC or run date, as shown at 334. At 337, a decision is made as to whether the reorganization request is approved and, if it is, then a weekly reorganization process occurs at 342. At 343, life run results are reported.

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, the invention has been described with reference to the management of jobs within a RBOC. The invention, however, may be applied to other types of companies both inside and outside the telecommunication fields. Also, as should be apparent from the description above, the invention is useful both with jobs performed from within a company and also with jobs that are performed by outside contractors. The invention provides additional functionality with outside contractors since it assists in the bidding and awarding of contracts.

The embodiments were chosen and described in order to explain the principles of the invention and their practical application so as to enable others skilled in the art to utilize the invention and various embodiments and with various modifications as are suited to the particular use contemplated.

EXHIBIT 1

BELLSOUTH OSPCM™

OUTSIDE PLANT CONSTRUCTION MANAGEMENT

FUNCTIONAL SPECIFICATION MODULE:

Description of System

The Outside Plant Construction Management (OSPCM™) system was developed by BellSouth and is used in conjunction with the construction of communication facilities.

This transaction describes the processes required to automatically authorize and approve contractor work tasks entered into Job Entry - Other. These tasks may create a separate Routine Work authorization or be accomplished under an Engineering Work authorization.

Routine Work Authorize and Approval

Provides methods to automatically authorize and approve work tasks entered into Job Entry – Other if the individual logged on has the proper authority level. If a higher level is required, notify the user and provide ability for such approval. Establish tracking of completed work to ensure that continued correct approval levels are maintained.

Process Flow:

(1) Use the security log on process to obtain the individual user CUID for approval level processing.

(2) Create tables in OSPCM to set the allowed dollar approval limits for each Management level for the type work in process. The data for this table should be obtained from the BST Network Approval Schedule.

(3) Calculate the estimated dollar values of the proposed work tasks during data entry and use at save to determine if individual logged on has correct level for dollar amount.

(4) If dollar level in prior calculation is correct do an automatic authorize and approval (else)

If dollar level in the prior calculation is above allowed level for individual logged on, present a warning message that higher level approval is required.

(5) The above warning message will not prevent work requests from going to the contractor but higher level approval should be obtained as soon as possible and in any event contractor payment will not be processed until correct approval is made.

(6) Provide for tracking of completed tasks to avoid exceeding approval limits after work starts. Need to track completion expenditures and cumulate for the job.

(7) Should over expenditures require higher approval a separate area is available to provide users with the job specifics so that a listing of any job in need of higher approval appears and may be opened to see the dollar details.

(8) Provides a search capability and the means to effect the approval. Also gives status of the job.

Benefits

The process will reduce much manual calculations and record keeping for each set of tasks by management level. This will maintain compliance with Corporate contract approval rules.

FUNCTIONAL SPECIFICATION MODULE: JOB ENTRY

Description of System

The Outside Plant Construction Management (OSPCM ™) system was developed by BellSouth and is used in conjunction with the construction of communication facilities. This transaction describes the processes required to schedule the work tasks necessary to add, change or remove BellSouth outside plant facilities. This transaction is dependent on the OSPCM™ Configuration process.

Configuration Process

This is the input to the scheduling process. This process creates a scheduling networks. The Configuration process determines the type of work on a task or substep and assigns a resource. This process also groups the work into logical groups called scheduling activities and then places them in a sequence based on the scheduling sequence codes. This process establishes a Date Type (start or completion), crew size, a priority and completion date for the entire scheduling network based on user input or default time periods. The last thing that configuration does is to establish start and end dates on each scheduling activity using the Critical Path Method. (CPM).

Scheduling Batch Process (1) This process creates a schedule for each resource group (Supervisor group) and contains work for 20 weeks. The scheduling process will never schedule work on a date that is past. No work scheduled in weeks 21 and greater.

(2) This is a batch process that always runs on Saturday night and can be run at the user's discretion on any and all other nights of the week. This process creates a priority list of scheduling activities based on adjusted CPM start and end dates, priorities, date types and activity dependencies. The system will adjust the CPM dates so that when the scheduling process runs no activity will be scheduled in the past. (If it runs tonight then the earliest schedule start date on any activity will be tomorrow's date.)

(3) This process creates resource availability tables for each work group or resource pools (Supervisor Group). Each worker has a profile in OSPCM which identifies the number of hours/day and the days/week that he is available to work. This profile also includes any vacation, training or miscellaneous off time.

(4) After establishing the priority list and the resource availability tables then the process simply schedules the first activity based on the available resources for the CPM dates. If resources are not available for a particular CPM date then the system will move the activity out in the schedule until resources can be found. All activities are scheduled from the priority list in order even if resources are not available on the CPM dates.

The scheduling module also contains the ability to adjust information on scheduling networks. This information includes desired completion dates, crew size, resource groups and priorities. This information is sued to establish CPM dates and prioritize the activities during the scheduling batch process. The user also has the ability to move work tasks from one activity to another, change the sequence of work by changing the activity dependencies.

The user also has the ability to manually move work into or out of the schedule within week one or week two. The user can also lock down work so that the scheduling process will ignore resource availability when scheduling the locked down activity.

Scheduling reports and graphs are available in the scheduling module including individual schedules for each resource group.

FUNCTIONAL SPECIFICATION MODULE

Materials Management:

Materials Management module of OSPCM is a comprehensive mechanized ordering system that requires little manual intervention. This module's predecessor was the Major Apparatus and Cable System (MACS). MACS had some similar features that required substantial manual intervention where Materials Management is mechanized. In the following pages the bold paragraphs are unique to OSPCM Materials Management.

Business Solution 1

The Materials Management Business Solution Area I deals with satisfying a material requirement on an Outside Plant Construction Engineering Work Order (EWO) or a Plant Work Order (PWO) job with new material. All new material is obtained through a real-time interface with OrderMaster, the front-end interface to REGIS and CAPRI. All PIDed items, those with a Product Identifier, are sent from OrderMaster to REGIS to be fulfilled, if possible, by a BellSouth Telecommunications (BST) warehouse. All non-PIDed items are sent from OrderMaster to CAPRI to be fulfilled by an outside vendor, such as AT&T. This Business Solution area is broken down into eight sections:

(1) Calculate Order Date (2) Identify Today's Requirements (3) Order Material Requirements (4) View an Order (5) Receive Shipment Details (6) Receipt Ordered Material (7) Send Receipt Notification to CAPRI (8) Set Preferences Each section is briefly described and then broken down into the actual navigational flow through the presentation and/or process. The purpose of this document is to gain consensus as to the deliverable for Materials Management Business Solution Area I.

The first section deals with calculating the order date for a material requirement. This process is called by the OSPCM Scheduling application each time a scheduling activity obtains a new schedule start date.

The second section deals with identifying material requirements that need to be satisfied today so that the material is available when the job is scheduled to be worked. An automated process will execute each night to identify those requirements for any open (i.e., not closed, cancelled, or completed) EWO-job that has been approved. (A PWO job will not be automatically identified as needing requirements to be fulfilled. These requirements must be identified manually and ordered on an individual basis.) The process will flag any open substep within that job that needs material and whose order date is less than or equal to today as having a material requirement that needs to be satisfied today. Each flagged substep may later be retrieved by a Visual Basic (VB) presentation window.

The third section deals with satisfying a material requirement with a new order. This area allows you to retrieve requirements for a specific job or to retrieve those requirements identified as needing to be satisfied today. The former is the method of choice is an emergency situation. The system provides a presentation that allows you to display a specific job or a list of jobs that have material requirements that need to be satisfied today. You then select those requirements you wish to order. The selected requirements are pre-processed and grouped into one or more orders/order items due to aggregation and various other ordering rules. The system provides a presentation that allows you to view each order created before it is sent to OrderMaster. Appropriate changes can be made at this time, such as deaggregating requirements aggregated to an order item within the order or changing the location to which an order should be shipped. You then send each order to OrderMaster separately. OrderMaster returns an OrderMaster Number ("Q" Number) if the order was processed successfully, indicates that the order has been queued, or indicates that an error was found.

The fourth section involves viewing an order which has already been sent to OrderMaster. This area allows you to retrieve a specific order and view details about that order and its associated line items. You may display a specific order via its OrderMaster Number, a Purchase Order Number or Select Ticket Number on which the order was or will be fulfilled, or via the Job Number for which the material was ordered.

The fifth section involves receiving shipment details from the procurement systems for an ordered item. An automated process will run each time shipment details are received from either REGIS or CAPRI. Shipment details are received from REGIS when a select ticket is created, each time a select ticket number changes (e.g. future day ticket to current day ticket), when the quantity or material to be shipped is changed, when a select ticket item is cancelled, or when the select ticket is loop closed indicating that the material has been shipped. Shipment details are received from CAPRI when a purchase order is created, when a shipment date has changed, or when a purchase order item is cancelled.

The sixth section involves receipting ordered material into inventory once the material has been shipped and delivered to the appropriate location. You have the choice of retrieving items to be receipted either by the OrderMaster Number on which the material was ordered or by the Purchase Order Number (vendor orders) or Select Ticket Number (BST warehouse orders) on which the material was shipped. The system provides a presentation that allows you to display order items within a specific order, order items shipped on a specific Purchase Order, or order items shipped on a specific Select Ticket. A list of items already receipted or to be receipted is displayed. T he material can be receipted into inventory as unassigned material, receipted into inventory and assigned to the appropriate substep within the job for which it was ordered, or receipted into inventory and flagged as material to be returned.

The seventh section involves sending receipt notification to CAPRI, the system that processes outside vendor orders. All material ordered from an outside vendor must be reported to CAPRI after it has been received into inventory so that CAPRI may authorize payment to the vendor. This section describes MATERIALS MANAGEMENT's daily interface to report order receipts to CAPRI. Since this is an automatic process initiated by the system on a daily basis, there is no user interface.

The eighth section involves setting user preferences. The system provides a presentation that allows you to set various preferences, such as the toolbar's position and a default location to be used throughout the application.

The navigation through the Materials Management application is done from the Materials Management application window, which has a button toolbar and pulldown menus to drive user selections.

Figure 9:
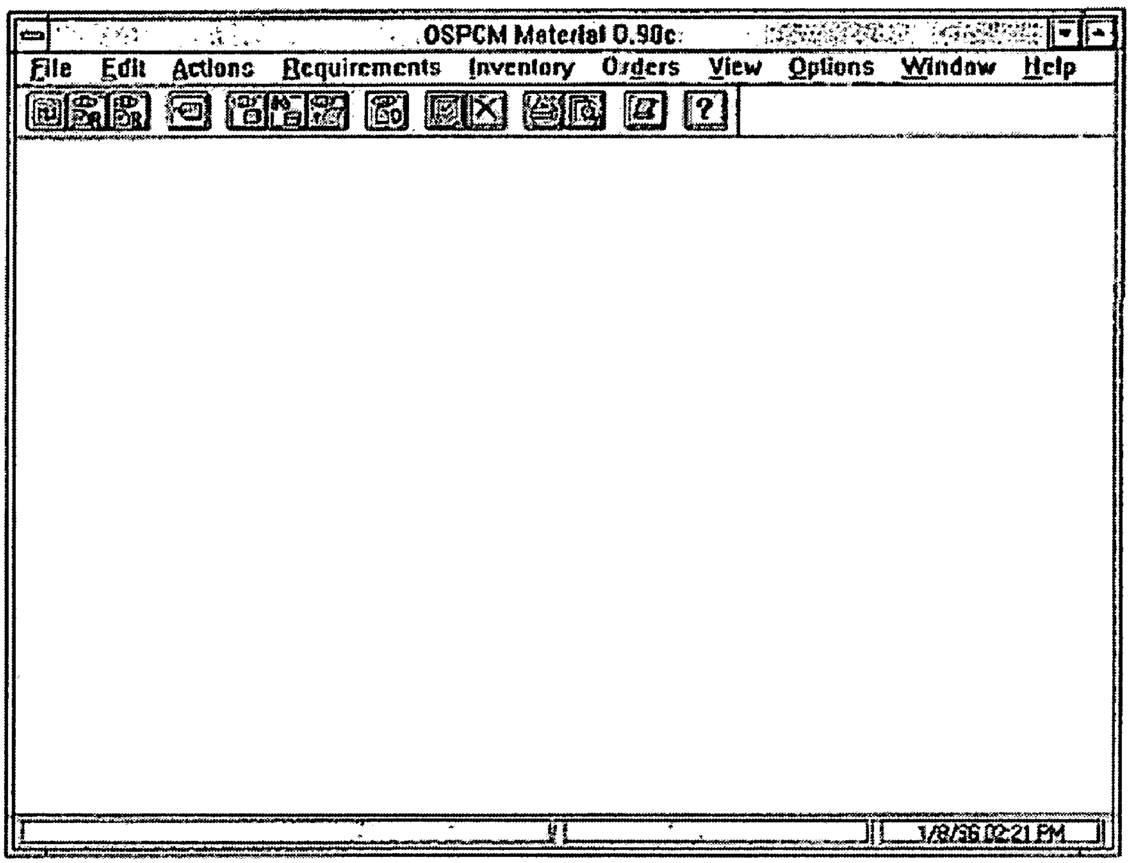
FIG. 9 is an exemplary screen print for OSPCM Material 0.90c.

The application window for Materials Management is shown in Fig. 9.

The first eight toolbar buttons on the OSPCM Material window apply only to Materials Management. Their functions are as follows:

(1) Show Today's Requirements
(2) Show a Job's Needed Requirements
(3) Show All Requirements for a Job
(4) Receipt an Order
(5) Show Inventory Item
(6) Inventory Scan
(7) Show Transactions
(8) Show an Order Summary The remaining toolbar buttons are standard buttons that appear in all OSPCM applications. The first, second, fourth, and eighth toolbar buttons are described in this document. The other Materials management Buttons are described in later business solutions.

Business Solution 2

The MATERIALS MANAGEMENT Business Solution Area II deals with satisfying a material requirement on an Outside Plant Construction Engineering Work Order (EWO) or a Plant Work Order (PWO) job with existing inventoried material. This method of satisfying a requirement may be used instead of ordering new material. This Business Solution area is broken down into three (3) sections:

(1) Satisfy a Material Requirement with Inventory (2) Approve a Transfer Request (3) Receipt Transferred Material Each section is briefly described and then broken down into the actual navigational flow through the presentation. The purpose of this document is to gain consensus as to the deliverable for MATERIALS MANAGEMENT Business Solution Area II.

The first section deals with retrieving material requirements that need to be satisfied and satisfying those requirements with either an assignment or a transfer request. The procedures for retrieving requirements are presented in Business Solution Area I (BS1OVER.DOC). When material requirements are displayed, an indicator is shown for each requirement that can be satisfied from existing inventory at the requirement's inventory site. You may choose to make assignments from the inventory found or initiate another inventory scan to search for suitable substitutions for which assignments or transfer requests may be made.

The second section deals with approving a transfer request to satisfy a material requirement or rejecting a transfer request. You may display simultaneously the transfer requests that need to be approved by your inventory site and the transfer requests that have been approved by your inventory site but have not been received. You may transfer the inventory item requested, transfer a substitute for the inventory item requested, reject the transfer request, or cancel an approved transfer request that has not been received.

The third section deals with receipting transferred material. You may display simultaneously the inventory items that have been transferred to your inventory site but have not been received into your inventory and the transfer requests that have been made by your inventory site but have not been approved for transfer. You may receipt an inventory item that has not been received or cancel any transfer request that has not been approved.

Business Solution 3

The MATERIALS MANAGEMENT Business Solution Area III deals with the management of inventory. This Business Solution area is broken down into 19 sections:

(1) View a Job's Material Requirements
(2) Issue Material Needed on a Job
(3) View an Inventory Item
(4) View Assignments
(5) Junk an Inventory Item
(6) Split a Reel of Cable
(7) Adjust an Inventory Balance
(8) Change the Status of an Inventory Item
(9) Exempt an Inventory Item
(10) Return an Inventory Item;
(11) Transfer an Inventory Item
(12) Relocate an Inventory Item
(13) Add an Inventory Item
(14) View Issues
(15) View Material Inventory Transactions
(16) Run an Inventory Scan
(17) Process Material Usage;
(18) Report Material Inventory Transactions to Asset Management;
(19) Report reconciliation File to Asset Management.

Each section is briefly described and then broken down into the actual navigational flow through the presentation. The purpose of this document is to gain consensus as to the deliverable for MATERIALS MANAGEMENT Business Solution Area III.

The first section deals with viewing a job's material requirements. This allows you to monitor the status of the material needed to work an approved job. You can view each requirement within the job, showing how much material is required, how much has been procured, how much has been assigned, how much still needs to be procured, and how much has been issued. You can also view any orders, shipments, transfer requests, or transfers made to satisfy the requirements that have not yet been delivered.

The second section deals with issuing the material needed on a job. Issuing material allows you to keep track of inventory that has been taken off the inventory yard to be used on a job. The issued inventory item is now considered "at site". The issue indicates to whom the material was issued, when the material was issued, and for which job the material was issued. Issues may be closed when the material is brought back to the inventory yard or when the substep is completed and its material disbursed.

The third section deals with viewing inventory items for which you have responsibility. These inventory items may be located at your inventory site, at an alternate storage location, or at a job site. You can view information about a specific inventory item including its inventory status and associated balances. You can also use several functions to manage your inventory such as junking and adjusting an inventory balance. Each function is described in a different section of the document.

The fourth section describes the function of viewing assignments. You can view the requirements to which an inventory item is assigned and unassign the inventory item from selected requirements. Unassigning an inventory item indicates that the inventory item is no longer reserved for use on a specific job. This makes it available to be assigned to any other job within the Construction Management Center (CMC) that needs this type of material. If a job is cancelled or a requirement is deleted, the system automatically unassigns the associated inventory item. You might want to unassign an inventory item yourself because the material is damaged and cannot be used.

The fifth section describes the function of junking an inventory item. Junking an inventory item deletes the inventory item from the system and is usually done to clear a reel of cable. When cable is reported used (disbursed), the system automatically junks the remaining cable on the reel if the CMC responsible for the inventory item is using the auto-junk feature and the remaining quantity is unassigned and less than or equal to the auto-junk quantity set by the CMC. You might want to junk an inventory item yourself because you are working in a CMC that is not using the auto-junk feature or you are junking a non-cable inventory item.

The sixth section describes the function of splitting a reel of cable. Splitting a reel of cable creates a new inventory item. It involves moving some or all of the cable from a reel to a new reel or to a hand-coil. You might want to split a reel of cable because you physically need to have the cable in two different places at the same time.

The seventh section describes the function of adjusting an inventory item's balance. You can increase or decrease both the unassigned and surplus inventory balances following a physical inventory.

The eighth section describes the function of changing the status of an inventory item. You can move some or all of an inventory balance among the unassigned, surplus, and awaiting return statuses. You might want to move a spare unassigned balance to surplus to make it available to anyone in the BellSouth region or instead of returning undamaged material you might want to move it to the unassigned status so that it may be used to satisfy a requirement on a rush job.

The ninth section describes the function of exempting an inventory item. You can reclassify a surplus or unassigned inventory item as exempt material so that it no longer remains a part of your inventory records. This is usually done to make material available for use on maintenance type work.

The tenth section describes the function of returning an inventory item. You can return damaged or unwanted material to either a BellSouth Telecommunications (BST) warehouse or to an outside vendor, like Lucent.

The eleventh section describes the function of transferring an inventory item. You can transfer an inventory item from your inventory site to another inventory site when you do not have a formal transfer request to approve. The use of this function should be limited to times of natural disaster when you may need to move a lot of inventory to handle emergency jobs.

The twelfth section describes the function of relocating an inventory item. You can change the bin location of an inventory item in your inventory yard or, since you can only transfer inventory items between inventory sites, move an inventory item located at an alternate address back to your inventory site or vice versa.

The thirteenth section deals with adding an inventory item. You can add an inventory item by recovering the material from junk, by reclassifying the material from exempt, by identifying the material as being needed on a Turn-Key job, by identifying the material as inventory converted from the Major Apparatus and Cable System (MACS), or by specifying the source of the material as "other". "Other" is used when you find material on your yard during a physical inventory and do not know where it came from. This function is also used by the BST emergency warehouses to replenish their emergency and consignment stock.

The fourteenth section deals with viewing issues. You can view open issues and return issued material. If all the material issued to you was not used, you may return the unused portion to the inventory site.

The fifteenth section describes the function of viewing inventory transactions. You can specify the transactions you want to view in several ways. One way is to specify the transaction number. Another way is to specify an inventory item (e.g., serial number 456789). A third way is to specify the type of transactions (e.g., junk transactions). Depending on the method chosen, you may be shown either a transaction scan results window or a transaction details dialog. The transaction scan results window displays a list of transactions starting with the most recent transaction. From here you may choose a transaction to view in greater detail. The transaction detail dialog displays additional information about the transaction such as who created the transaction and what job was affected by the transaction. This dialog allows you to "walk" the transaction chain backwards to the point the inventory item first became your responsibility (e.g., an order receipt) or forwards to the point the inventory item was no longer your responsibility (e.g., a disbursement).

The sixteenth section deals with scanning inventory. You can specify several options for creating an inventory scan report. The report is designed to aid in a physical inventory and may be viewed on your screen or may be printed.

The seventeenth section deals with processing material usage. Once material is placed in service, it is reported "used" by either a Telephone Company (TELCO) employee or by a contractor hired to do the work. Sometimes material is taken out of service and is put back into inventory. In both cases, if the material reported is tracked in inventory, the system must respond by either decreasing or increasing the appropriate inventory balance. This section describes how MATERIALS MANAGEMENT reacts when material usage is reported. Since this is an automatic process initiated by the system whenever material usage is reported, there is no user interface.

The eighteenth section deals with reporting material inventory transactions to the Asset Management system. Certain types of inventory transactions, those that affect the dollars in the non-exempt holding account (12201100), must be reported to accounting. This section describes MATERIALS MANAGEMENT's daily interface to report such inventory transactions to Asset Management which maintains the 12201100 account. Since this is an automatic process initiated by the system on a daily basis, there is no user interface.

The nineteenth section deals with reporting current inventory units to Asset Management in the form of a reconciliation file so that any discrepancies in the accounting records may be corrected. Asset Management can make a request for the file at any time by providing the information necessary to create the report. Since this is an automatic process initiated by the system upon receipt of the necessary information from Asset Management, there is no user interface.

Business Solution 4

The purpose of MATERIALS MANAGEMENT Business Solution Area IV is to gain consensus on how material requirements are handled when the Jobentry-EWO application makes one or more of the following changes to substep (a substep is a breakdown of the work required on a job step).

(1) Indicates that the material requirement is no longer needed either because the job or substep was deleted;

(2) Changes the description of the material required on the substep;

(3) Changes the custom features required on the substep (i.e., creating, updating, or deleting the custom features);

(4) Changes the quantity of material required on the substep.

When a change is made to a substep, Jobentry-EWO checks the material status of the substep and, based on that status, decides whether or not to call a Materials Management function to handle any material that may have already been procured, (for the purposes of this document, "procured" includes the following material statuses: Ordered, Shipped, Transfer Requested, and Transferred) or assigned to that substep. A substep can have one of the following material statuses:

(1) Unnecessary – The substep requires no material;

(2) Needed – All of the material required on the substep has not yet been procured; pending orders or transfers may exist or a partial assignment may exist, (a pending order or transfer is one in which the ordered or transferred material has not been received into inventory). If the remaining needed quantity on the substep is greater than zero but less than the substep's order quantity, the requirement is "partially satisfied";

(3) Ordered – The material required on the substep has been ordered; a pending transfer or partial assignment may also exist. The substep obtains a material status of "ordered" because that is the method of procurement used last;

(4) Shipped – The material required on the substep has been shipped; a pending transfer or partial assignment may also exist;

(5) Transfer Requested – The material required on the substep has been requested for transfer; a pending order or partial assignment may also exist. The substep obtains a material status of "transfer requested" because that is the method of procurement used last;

(6) Transferred – The material required on the substep has been transferred; a pending order or partial assignment may also exist;

(7) Received – All of the material required on the substep has been received and assigned to the substep; no pending orders or transfers exist;

(8) Disbursed – All of the material required on the substep has been reported and the substep is complete.

If a material requirement has changed (e.g., material description) and the substep has a material status of "needed", a call is made to Materials Management because the substep may be partially satisfied. If needed, any pending orders or transfers are disassociated from the substep and any material assigned to the substep is unassigned.

If the requirement is no longer needed (e.g., the substep is deleted) and the substep has a material status of "needed", a call is made to Materials Management only if the requirement has been partially satisfied; otherwise no call is made.

Regardless of the change made, if the substep has one of the "procured" material statuses, a call is made to Materials Management to disassociate any pending orders or transfers from the substep and to unassign any material that may be assigned to the substep.

Regardless of the change made, if the substep has a material status of "unnecessary", no call is made to Materials Management since material is not needed or the substep is complete. If the substep has a material status of "disbursed", Jobentry-EWO does not allow changes to be made.

The Materials Management function handles one type of change at a time. If multiple changes are to be made, the order in which the changes should be processed is as follows:

(1) A change in material description or custom features;

(2) A change in order quantity.

Depending on the nature of the change and the material status of the substep at the time of the change, one or more of the following may occur when a call is made to Materials Management:

(1) Pending transfers may be disassociated from the substep – Disassociating the substep from its transfer will mean that any material transferred for that substep will be received into inventory as unassigned material upon delivery;

(2) Pending orders may be disassociated from the substep – Disassociating the substep from its order will mean that any material ordered for that substep will be received into inventory as unassigned material upon delivery;

(3) Material assigned to the substep may be unassigned—Unassigning the material from the substep means that the material is no longer reserved for use on that substep;

(4) The remaining needed quantity on the substep may be adjusted; and (5) The material status of the substep may be changed.

After the material which has already been procured or assigned to the substep has been successfully handled, Jobentry-EWO may delete the substep, change the description of the material required, create/update/delete the custom features required, or change the quantity required.

MATERIAL REQUIREMENT IS NO LONGER NEEDED

A substep may be deleted when an engineer makes a revision to an approved job and the substep is no longer required or an entire job may be cancelled because of budget reasons, etc. If a substep is to be deleted or a job is to be cancelled, any material that has already been procured or assigned to the substep(s) must be handled. To do so, Jobentry-EWO provides the identifier of the substep, the substep's old order quantity, and a new order quantity equal to zero to the Materials Management function. (If cancelling a job, Jobentry-EWO must call this function for each substep requiring material within the job.) Passing a new order quantity of zero means that the requirement is no longer needed which prompts the system to take the appropriate action.

NEEDED OR PROCURED STATUS

If the material needed on a substep has already been procured or partially satisfied, any pending orders or transfers must be entirely disassociated from the substep and any material already assigned tot he substep must be unassigned as follows:

(1) Transfer Request – If the substep has a pending transfer, the action taken by the system depends on whether or not the transfer request has been approved;

(a) Unapproved – If the transfer request has not been approved, the substep is disassociated from the transfer request and, if the request was not made for any other substep, the transfer request is deleted because the inventory item has not yet been transferred. If the request was made to satisfy multiple substeps, the transfer request is not deleted so that it may still be approved for the remaining substeps for which it is needed. If multiple transfer requests exist, the system disassociates the substep from each transfer request found;

(b) Approved – If the transfer request has been approved, the substep is disassociated from the transfer request, but the transfer request is not deleted because the inventory item has been transferred and may have been shipped. The transfer request must remain in existence so that the inventory item may be receipted. If multiple transfer requests exist, the system disassociates the substep from each transfer request found;

(2) Order Request – If the substep has a pending order, the system changes the quantity to be assigned to the substep to zero. If multiple orders exist, the system changes the quantity to be assigned to the substep to zero on each order found;

(3) Assignment – If the substep has an assignment, the system takes the following action:

(a) Decreases the associated inventory item's assigned balance and increases its unassigned balance by the quantity assigned to the substep;

(b) Records an Unassignment material inventory transaction. If multiple assignments exist, the system creates an Unassignment material inventory transaction for each assignment found. If the inventory item is non-central office equipment and ordered direct to code, the Unassignment transaction is marked to be sent to Asset Management; otherwise it is marked as not to be sent to Asset Management.

Disassociation occurs first from the transfers, then from the orders, and then from the assignments until the old order quantity has been disassociated or there are no more orders, transfers, or assignments from which to disassociate, whichever comes first.

If no errors are found during this process, a flag of success is returned to the calling application; otherwise a flag of failure is returned. (The fact that no disassociations or unassignments may be done is NOT considered an error.) If a flag of success is returned, Jobentry-EWO changes the status of the substep to "DE" (deleted).

RECEIVED STATUS

If the material needed on a substep has already been received, all of the material assigned to the substep must be unassigned as follows:

(1) The associated inventory item's assigned balance is decreased and its unassigned balance is increased by the quantity assigned to the substep;

(2) Records an Unassignment material inventory transaction. If multiple assignments exist, the system creates an Unassignment material inventory transaction for each assignment found. If the inventory item is non-central office equipment and ordered direct to code, the Unassignment transaction is marked to be sent to Asset Management; otherwise it is marked as not to be sent to Asset Management.

If no errors are found during this process, a flag of success is returned to the calling application; otherwise a flag of failure is returned. If a flag of success is returned, Jobentry-EWO changes the status of the substep to "DE" (deleted).

Changing THE MATERIAL DESCRIPTION or a CUSTOM FEATURE OF a substep

If the material description or custom feature is to be changed on a substep, any material that has already been procured or assigned to the substep(s) must be handled. To do so, Jobentry-EWO provides the identifier of the substep, the substep's old order quantity, and a new order quantity equal to the substep's old order quantity to the Materials Management function. Passing a new order quantity equal to the old order quantity means that the material description or a custom feature of the substep has changed which prompts the system to take the appropriate action.

NEEDED OR PROCURED STATUS

If the material needed on a substep has already been procured or partially satisfied, any pending orders or transfers must be entirely disassociated from the substep and any material already assigned to the substep must be unassigned as follows:

(1) Transfer Request – If the substep has a pending transfer, the action taken by the system depends on whether or not the transfer request has been approved;

(a) Unapproved – If the transfer request has not been approved, the substep is disassociated from the transfer request and, if the request was not made for any other substep, the transfer request is deleted because the inventory item has not yet been transferred. If the request was made to satisfy multiple substeps, the transfer request is not deleted so that it may still be approved for the remaining substeps for which it is needed. If multiple transfer requests exist, the system disassociates the substep from each transfer request found;

(b) Approved – If the transfer request has been approved, the substep is disassociated from the transfer request, but the transfer request is not deleted because the inventory item has been transferred and may have been shipped. The transfer request must remain in existence so that the inventory item may be receipted. If multiple transfer requests exist, the system disassociates the substep from each transfer request found (2) Order Request – If the substep has a pending order, the system changes the quantity to be assigned to the substep to zero. If multiple orders exist, the system changes the quantity to be assigned to the substep to zero on each order found;

(3) Assignment – If the substep has an assignment, the system takes the following action:

(i) Decreases the associated inventory item's assigned balance and increases its unassigned balance by the quantity assigned to the substep;

(ii) Records an Unassignment material inventory transaction. If multiple assignments exist, the system creates an Unassignment material inventory transaction for each assignment found. If the inventory item is non-central office equipment and ordered direct to code, the Unassignment transaction is marked to be sent to Asset Management; otherwise it is marked as not to be sent to Asset Management.

Disassociation occurs first from the transfers, then from the orders, and then from the assignments until the old order quantity has been disassociated and there are no more orders, transfers, or assignments from which to disassociate, whichever comes first.

After all orders, transfers, and assignments have been disassociated, the system resets the substep's remaining needed quantity back to the old order quantity and its material status back to "needed". If disassociation was not needed because the substep's remaining needed quantity was equal to the old order quantity, the system just sets the remaining needed quantity to the old order quantity and the material status to "needed".

If no errors are found during this process, a flag of success is returned to the calling application; otherwise a flag of failure is returned. If a flag of success is returned, Jobentry-EWO changes the material description required on the substep to the new material description or creates, updates, or deletes the custom feature required.

The new material may be procured using the methods described in Business Solutions I and II (BS1OVER.DOC and BS2OVER.DOC).

RECEIVED STATUS

If the material needed on a substep has already been received, all of the material assigned to the substep must be unassigned as follows:

(1) The associated inventory item's assigned balance is decreased and its unassigned balance is increased by the quantity assigned to the substep;

(2) Records an Unassignment material inventory transaction. If multiple assignments exist, the system creates an Unassignment material inventory transaction for each assignment found. If the inventory item is non-central office equipment and ordered direct to code, the Unassignment transaction is marked to be sent to Asset Management; otherwise it is marked as not to be sent to Asset Management.

After all material has been unassigned, the system resets the substep's remaining needed quantity back to the old order quantity and its material status back to "needed".

If no errors are found during this process, a flag of success is returned to the calling application; otherwise a flag of failure is returned. If a flag of success is returned, Jobentry- EWO changes the material description required on the substep to the new material description or creates, updates, or deletes the custom feature required.

The new material may be procured using the methods described in Business Solutions I and II (BS1OVER.DOC and BS2OVER.DOC).

INCREASE THE ORDER QUANTITY OF A SUBSTEP

No matter what the material status of the substep, if the order quantity of a substep is to be increased, the substep's remaining needed quantity and its material status must be changed so that more material may be procured. To do so, Jobentry-EWO provides the identifier of the substep, the substep's old order quantity, and the substep's new order quantity to the Materials Management function. Passing a new order quantity greater than the old order quantity means that more material is needed which prompts the system to take the following action:

(1) Increases the substep's remaining needed quantity by the difference between the new order quantity and the old quantity;

(2) Resets the substep's material status to "needed".

If no errors are found during this process, a flag of success is returned to the calling application; otherwise a flag of failure is returned. If a flag of success is returned, Jobentry-EWO increases the substep's order quantity.

The additional material may be procured using the methods described in Business Solutions I and II (BS1OVER.DOC and BS2OVER.DOC).

DECREASE THE ORDER QUANTITY OF a substep

If the order quantity of a substep is to be decreased, any material that has already been procured or assigned to the substep(s) must be handled. To do so, Jobentry-EWO provides the identifier of the substep, the substep's old order quantity, and the substep's new order quantity to the Materials Management function. Passing a new order quantity less than the old order quantity means that less material is needed which prompts the system to take the appropriate action.

NEEDED STATUS

If the material needed on a substep has not been procured or has been partially satisfied, there remains some quantity still to be satisfied on the substep. If that is the case, the system decreases the substep's remaining needed quantity by the difference between the old order quantity and the new order quantity or by as much it can before decreasing the quantity to be assigned from any pending orders or transfers or before decreasing the quantity that may be already assigned to the substep.

If the substep's remaining needed quantity is not enough to satisfy the decrease in the quantity needed (remaining needed quantity < decrease in quantity), the system decreases the substep's remaining needed quantity by as much as it can until the remaining needed quantity reaches zero and then disassociates the difference from any pending transfers, pending orders, or assignments as follows.

(1) Transfer Request – If the substep has a pending transfer, the action taken by the system depends on whether or not the transfer request has been approved;

(a) Unapproved – If the transfer request has not been approved, the substep is disassociated from the transfer request by the quantity remaining to be decreased or by as much as it can, whichever is smaller. If the request was not made for any other substep, the transfer request is deleted because the inventory item has not yet been transferred. If the request was made to satisfy multiple substeps, the transfer request is not deleted so that it may still be approved for the remaining substeps for which it is needed. If multiple transfer requests exist, the system disassociates the substep from each transfer request found by the quantity remaining to be decreased until the decrease in quantity has been satisfied or there are no more transfer requests from which to disassociate;

(b) Approved – If the transfer request has been approved, the substep is disassociated from the transfer request by the quantity remaining to be decreased or by as much as it can, whichever is smaller, but the transfer request is not deleted because the inventory item has been transferred and may have been shipped. The transfer request must remain in existence so that the inventory item may be receipted. If multiple transfer requests exists, the system disassociates the substep from each transfer request found by the quantity remaining to be decreased until the decrease in quantity has been satisfied or there are no more transfer requests from which to disassociate.

(2) Order Request – If the substep has a pending order, the system decreases the quantity to be assigned to the substep by the quantity remaining to be decreased or by as much as it can, whichever is smaller. If multiple orders exist, the system decreases the quantity to be assigned to the substep on each order found by the quantity remaining to be decreased until the decrease in quantity has been satisfied or there are no more orders from which to disassociate.

(3) Assignment – If the substep has an assignment, the system takes the following action:

(a) Decreases the associated inventory item's assigned balance and increases its unassigned balance by the quantity remaining to be decreased;

(b) Records an Unassignment material inventory transaction. If multiple assignments exist, the system creates an Unassignment material inventory transaction for each assignment that was decreased. If the inventory item is non-central office equipment and ordered direct to code, the Unassignment transaction is marked to be sent to Asset Management; otherwise it is marked as not to be sent to Asset Management.

Disassociation occurs first from the transfers, then from the orders, and then from the assignments until the decrease in quantity has been satisfied or there are no more orders, transfers, or assignments from which to disassociate, whichever comes first.

After all order, transfers, and assignments have been disassociated, the system adjusts the substep's material status to the appropriate value as follows:

(1) If the quantity assigned to the substep is equal to the substep's new order quantity, its material status is set to "received";

(2) If a pending order exists for the substep, its material status is set to "ordered";

(3) If an unapproved pending transfer exists for the substep, its material status is set to "transfer requested";

(4) If an approved pending transfer exists for the substep, its material status is set to "transferred".

If the entire decrease is taken from the substep's remaining needed quantity (remaining needed quantity > = decrease in quantity), disassociation is not needed and the system adjusts the substep's material status to the appropriate value as follows:

(1) If the substep's remaining needed quantity is still greater than zero, its material status is set to "needed".

(2) If the quantity assigned to the substep is equal to the substep's new order quantity, its material status is set to "received".

(3) If a pending order exists for the substep, its material status is set to "ordered".

(4) If an unapproved pending transfer exists for the substep, its material status is set to "transfer requested".

(5) If an approved pending transfer exists for the substep, its material status is set to "transferred".

If no errors are found during this process, a flag of success is returned to the calling application; otherwise a flag of failure is returned. If a flag of success is returned, Jobentry-EWO decreases the substep's order quantity.

PROCURED STATUS

If the material needed on a substep has been procured, there is no quantity still to be satisfied on the substep. If that is the case, the system decreases the quantity to be assigned from any pending orders or transfers and decreases the quantity that may be already assigned to the substep by difference between the old order quantity and the new order quantity as follows:

(1) Transfer Request – If the substep has a pending transfer, the action taken by the system depends on whether or not the transfer request has been approved.

(a) Unapproved – If the transfer request has not been approved, the substep is disassociated from the transfer request by the quantity remaining to be decreased or by as much as it can, whichever is smaller. If the request was not made for any other substep, the transfer request is deleted because the inventory item has not yet been transferred. If the request was made to satisfy multiple substeps, the transfer request is not deleted so that it may still be approved for the remaining substeps for which it is needed. If multiple transfer requests exist, the system disassociates the substep from each transfer request found by the quantity remaining to be decreased until the decrease in quantity has been satisfied or there are no more transfer requests from which to disassociate;

(b) Approved – If the transfer request has been approved, the substep is disassociated from the transfer request, but the transfer request is not deleted because the inventory item has been transferred and may have been shipped. The transfer request must remain in existence so that the inventory item may be receipted. If multiple transfer requests exist, the system disassociates the substep from each transfer request found by the quantity remaining to be decreased until the decrease in quantity has been satisfied or there are no more transfer requests from which to disassociate.

(2) Order Request – If the substep has a pending order, the system decreases the quantity to be assigned to the substep by the quantity remaining to be decreased or by as much as it can, whichever is smaller. If multiple orders exist, the system decreases the quantity to be assigned to the substep on each order found by the quantity remaining to be decreased until the decrease in quantity has been satisfied or there are no more orders from which to disassociate.

(3) Assignment – If the substep has an assignment, the system takes the following action:

(a) Decreases the associated inventory item's assigned balance and increases its unassigned balance by the quantity remaining to be decreased.

(b) Records an Unassignment material inventory transaction. If multiple assignments exist, the system creates an Unassignment material inventory transaction for each assignment that was decreased. If the inventory item is non-central office equipment and ordered direct to code, the Unassignment transaction is marked to be sent to Asset Management; otherwise it is marked as not to be sent to Asset Management.

Disassociation occurs first from the transfers, then from the orders, and then from the assignments until the decrease in quantity has been satisfied or there are no more orders, transfers, or assignments from which to disassociate, whichever comes first.

After all orders, transfers, and assignments have been disassociated, the system adjusts the substep's material status to the appropriate value as follows:

(1) If the quantity assigned to the substep is equal to the substep's new order quantity, its material status is set to "received";

(2) If a pending order exists for the substep, its material status is set to "ordered";

(3) If an unapproved pending transfer exists for the substep, its material status is set to "transfer requested";

(4) If an approved pending transfer exists for the substep, its material status is set to "transferred".

If no errors are found during this process, a flag of success is returned to the calling application; otherwise a flag of failure is returned. If a flag of success is returned, Jobentry-EWO decreases the substep's order quantity.

RECEIVED STATUS

If the material needed on a substep has already been received, the system decreases the quantity assigned to the substep as follows:

(1) Decreases the associated inventory item's assigned balance and increases its unassigned balance by the difference between the old order quantity and the new order quantity;

(2) Records an Unassignment material inventory transaction. If multiple assignments exist, the system creates an Unassignment material inventory transaction for each assignment that was decreased. If the inventory item is non-central office equipment and ordered direct to code, the Unassignment transaction is marked to be sent to Asset Management; otherwise it is marked as not to be sent to Asset Management.

If no errors are found during this process, a flag of success is returned to the calling application; otherwise a flag of failure is returned. If a flag of success is returned, Jobentry-EWO decreases the substep's order quantity.

Business Solution 5

The MATERIALS MANAGEMENT Business Solution Area V deals with creating Management Reports. The business Solution area is composed of 7 reports as follows:

(1) Order reports (This group of reports is comprised of 4 individual reports);

(2) Transaction reports (This group of reports is comprised of 16 individual reports);

(3) Issue Summary Report;

(4) Major Material Activity Report;

(5) Material Notification Report;

(6) Over-Age Material Report (7) Investment Management Report (IMR)

Each report is described in a separate section of the document. Each section provides a description of the report and its purpose, a description of how the report may be requested, and a report layout and description of each field on the report. The purpose of this document is to gain consensus as to the deliverable for MATERIALS MANAGEMENT business Solution Area V.

The first section describes the types or Order reports that are available. This report contains information about orders for a specified status. You may print the report for a state, Construction Management Center (CMC), or inventory site.

The second section describes the types of Transaction reports that are available. This report contains information about material inventory transactions for a specified type. You may print the report for a state, CMC, or inventory site.

The third section describes the Issue Summary Report. This report contains information about inventory items that are currently issued. You may print the report for a state, CMC, or inventory site.

The fourth section describes the Major Material Activity Report. This report contains information about material inventory transactions that involve movement of material in and out of inventory, excluding receipts and disbursements. You may print the report for a state, CMC, or inventory site.

The fifth section describes the Material Notification Report. This report contains information about the material currently assigned to a job. You may print the report for a job and/or resource id.

The sixth section describes the Over-Age Material Report. This report contains information about material that will be over 30 days old because of a scheduling change. This includes material that is 1) on order that, once receipted, will be in inventory for over 30 days before it used and 2) assigned material that will be in inventory for over 30 days before it is used. You may print the report for an inventory site only.

The seventh section describes the Investment Management Report. This report provides an index which measures how efficient inventory is managed. The index describes how much inventory was owned over a given period of time and how much it cost the company to own that inventory. You may print the report for a state, CMC, or inventory site.

DESCRIPTION:

The outside Plant Construction Management (OSPCM™) system was developed by BellSouth and is used in conjunction with the construction of communication facilities. Bid & Award is designed to mechanized the bidding process and involves three main aspects of Outside Plant Vendor Master Contract and how they are initially setup and defined in the BellSouth Computer System (OSPCM™). These aspects are the contract itself, potential contractors with associated information and some parameter maintenance information to administer the BID/AWARD area. Individual Contractors, submitted and discussed in another request for patent area, uses the BID and AWARD module in the bid process.

BID AND AWARD PROCESSES:

Designed to mechanize the bidding process:

(1) STORES ALL INFORMATION ABOUT QUALIFIED CONTRACTORS;

(2) TAKES EXISTING USAGES TO DETERMINE VOLUME OF THE CONTRACT (3) USES OTHER OSPCM INFORMATION TO DETERMINE GEOGRAPHICAL BOUNDARIES OF THE CONTRACT;

(4) SELECTS QUALIFIED CONTRACTORS FOR BIDS;

(5) SELECTS DOCUMENTS FROM REGIONAL CONTRACT MODULE FOR BIDS;

(6) PREPARES A BID PACKAGE WHICH IS BASED ON PC DISK (7) AUTOMATES THE RECEIPT OF BIDS BASED ON INPUT FROM DISK INFORMATION PROVIDED BY THE CONTRACTOR (8) BUILDS TABLES NECESSARY FOR OTHER OSPCM EXECUTABLES TO WORK BASED ON BID AWARD

Location of the Input Price Worksheet:

(1) ALLOWS ACCESS TO THE ESSENTIAL PRICE DATA BEHIND EACH CONTRACTOR'S BID (MASTER & INDIVIDUAL)

(2) ALLOWS THE COORDINATOR TO CONTROL THE STATUS OF THE BIDS AND TO AWARD THE CONTRACT

Maintains government Price Increase Construction (PIC) figures, BellSouth PIC figures, and Inspection Pools. The PIC figures are used with the automatic price adjustment processes. The inspection pools are used to define a geographic area in which to monitor the performance of a contractor and establish some of the parameters that batch processes will use for sampling a contractor's completed work. The inspection pool and parameters must be defined in the system.

BENEFITS:

The BID and AWARD processes were designed to mechanize the bidding process, enhance the sampling (inspection) process, maintain prices for new and existing master and Individual bid contracts, and execute the use of PIC figures on annual PIC increases for existing master contractors. Without BID and AWARD mechanized contract bidding, the contractor quality program (inspections), Individual Contract bidding, and annual Price Increase Construction (PIC) increases would not be possible.

FUNCTIONAL SPECIFICATION MODULE: PRICING

Table For Business Transaction Description

| | |
|---|---|
| Business Transaction Name: | Generate Price for Detailed Job |
| Purpose: | This transaction describes the activities needed to generate a priced Detailed job for Outside Plant Construction and Maintenance. |
| Functional Specification(s): | Pricing – RPT 502<br>GUI – Detailed Added Cost |
| User Interfaces: | RPT: Detailed Construction Details – 502<br>SCR: Detailed Added Cost<br>SCR: Pricing Reports<br>SCR: View Reports<br>SCR: View Reports for Job |
| External Agent(s): | Job Entry |
| Trigger(s): | Job details via data store |

| | |
|---|---|
| Operational Method: | The Design Engineer selects an encoded job to be priced in detail. Added costs that were not captured during encoding are input through the Detailed Added Cost graphical user interface (GUI).<br><br>The user then generates the Detailed Pricing 502 Report. Each substep's materials, labor, engineering and contractor resources will be priced. A message will be sent to the user's terminal when the process completes. The user will have the ability to view the report on-line. Any errors encountered will be directed to the errors section of the Detailed Pricing 502 Report. |
| Operational Standard (Timing): | The time required to create a Detailed Pricing 502 Report should not exceed 15 minutes. |
| Operational Standard (Quality): | 100% of all Detailed Pricing 502 Report requests should be satisfied. |

Table For Procedure Description

| | |
|---|---|
| Procedure Name: | Enter Detailed Added Costs – ONL |
| Definition: | This procedure will allow a user to enter Detailed added costs. These miscellaneous costs were not captured during the encoding process but are components of the OSP job. |

The user enters a job or project number and selects the Detailed Added Cost GUI. Miscellaneous material, retirement, labor, contractor, engineering and other costs are entered into the system and saved. The job or project number will be used by the system to associate the saved added costs with the encoded job. The system will add the cost of each item entered to the total cost of the job.

| | |
|---|---|
| Triggers: | Detailed added costs via terminal |
| Frequency/Distribution: | Twice per week per Design Engineer |
| Operational Standard (Timing): | NA |
| Operational Standard (Quality): | Each cost item entered should be added to the total cost of the job. |
| Security and Access: | Design Engineer, Clerk. Construction supervisors should not have access to Pricing. |
| Design Complexity: | Medium. |
| Referenced Data: | |
| Field Name: CMC | The Construction Management Center where the job originated. This is retrieved from the original user entry requesting a new job. |
| Job Number: | The unique number given to the encoded job. This is |

| | |
|---|---|
| | retrieved from an OSPCM database. |
| Project Number: | The project number given to the encoded job. This is retrieved from an OSPCM database. |
| Billing: | Indicates that the item will be billed to the customer. |
| Total Adjustment %: | The percentage by which the total cost of the job will be adjusted. This is retrieved from an OSPCM database. |
| FRC: | The Field Reporting Code associated with the particular job. This is retrieved from an OSPCM database. |
| GLC: | The Geographic Location Code associated with the particular job. |
| Cost Type | The cost category that each item listed in the item description falls into. |
| Description | The description of the added cost item |
| Estimated Cost | The estimated cost of the item listed in the item description field. Initially this will be a user input field. |
| Engineering Hours | The total number of engineering hours to be used on the job. |
| Labor Hours | The total number of labor hours to be used on the job. |
| Business Rules: | Field Reporting Code must exist in an OSPCM database. |

Geographic Location Code must exist in an OSPCM database.

Cost Type must be MATL, RETR, LABR, CONT, ENGR or OTHR

Estimated Cost must be numeric.

Procedure Name: Run Detailed Construction Details Report 502 – ONL

Definition: This procedure allows the user to calculate a Detailed price for a job. The user enters the Construction Management Center (CMC) and a Job or Project Number and initiates the report run. The system uses the Detailed Pricing data entered into the system during Job Entry as well as any added cost or supplement data that exists for the job in order to calculate a price for the job.

The system will notify the user when the Detailed pricing process has completed. If the process fails the user will receive notification on-line.

A user can run a Detailed job report several times in order to get the desired price. The system will overlay the previous unapproved 502 report with each subsequent report.

Triggers: Report request via terminal

| | |
|---|---|
| Frequency/Distribution: | Twice per week per Design Engineer |
| Operational Standard (Timing): | A Detailed Pricing report request should be satisfied within 1 hour. |
| Operational Standard (Quality): | The timing standard should always be met and the user should be notified of the report completion or failure. |
| Security and Access: | Design Engineer, Clerk. Construction Supervisors should not have access to Pricing. |
| Design Complexity: | Very Difficult. |

Table For Referenced Data:

| Field Name | Entity Type | Attribute | Req/Opt/Cond | Source |
|---|---|---|---|---|
| | CPR Item | Lead Salvage Amount | Opt | OSPCM Table |
| | CPR State Book Value | Vintage Retirement Unit Cost Amount | Opt | OSPCM Table |
| | Field Reporting Code | Code | Req | OSPCM Table |
| | Job Authority Cost | Contractor Labor | Cond | OSPCM Table |
| | Job Authority Cost | Contractor Provided Material Amount | Cond | OSPCM Table |
| | Labor Rate | Amount | Req | OSPCM Table |
| | Labor Rate | End Date | Req | OSPCM Table |
| | Labor Rate | Start Date | Req | OSPCM Table |
| | Labor Rate | Type Code | Req | OSPCM Table |
| | Labor Type | Code | Req | OSPCM Table |

| Field Name | Entity Type | Attribute | Req/Opt/Cond | Source |
|---|---|---|---|---|
| | Lump Sum Contract Work Item | Amount | Opt | OSPCM Table |
| | Material Item | Description | Req | OSPCM Table |
| | Material Item | Fiber Quantity | Req | CORTS |
| | Material Item | Pair Quantity | Req | CORTS |
| | Material Item | Average Disbursed | Req | CORTS |
| | OSP Contract Work Item Price | Amount | Req | OSPCM Table |
| | Pair Quantity | Product Identification Number | Req | OSPCM Table |
| | State Field Reporting Code | Contractor Exempt Material Rate | Cond | OSPCM Table |
| | State | Supply Expense Percent | Cond | OSPCM Table |
| | State | Exempt Equivalent Labor Hrs Percent | Cond | OSPCM Table |
| | State Field Reporting Code | Engineering Labor Percent | Req | OSPCM Table |
| | State Field Reporting Code | Engineering Overhead Percent | Cond | OSPCM Table |
| | State Field Reporting Code | Labor Overhead Percent | Cond | OSPCM Table |
| | State Field Reporting Code | Telco Exempt Material Rate | Cond | OSPCM Table |
| | Substep | Contract Work Indicator | Req | OSPCM Table |
| | Substep | Geographic Location Code (GLC) | Req | OSPCM Table |
| | Substep | Placed in Service Date | Req | OSPCM Table |
| | Substep | Total Contract Hours Quantity | Opt | OSPCM Table |
| | Substep | Total Telco labor Hours Quantity | Opt | OSPCM Table |
| | Substep Contract | Base Unit Quantity | Req | OSPCM Table |

| Field Name | Entity Type | Attribute | Req/Opt/Cond | Source |
|---|---|---|---|---|
| | Work Item | | | |
| | Substep Material Requirement | Unit Quantity | Req | OSPCM Table |

CMC: The Construction Management Center where the job originated. This is retrieved from the original user entry requesting a new job.

Job Number: The unique number given to the encoded job. This is retrieved from the original user entry requesting a new job.

Project Number: The project number given to the encoded job. This is retrieved from the original user entry requesting a new job.

Non-List Code: Indicates that a material item will not be found in an OSPCM database.

Number Cable Splices: This is the number of cable splices for a material item in a particular FRC. This is used to calculate a cost for the job.

Telco Placing Hours: The number of telco hours it will take to place the item listed in the Item Description field. This is retrieved from an OSPCM database.

| | |
|---|---|
| Env: | The environment in which the item will be put into service. |
| Year: | The year that the item was placed into service. This is retrieved from an OSPCM database. |
| Retirement Value Cost: | The retirement value per unit of the item in the Item Description Field. |
| Salvage Value Cost: | The salvage value per unit of the item in the Item Description field. This is retrieved from an OSPCM database. |
| Telco Removal Hours: | The number of Telco labor hours it would take to remove the item described in the Item Description field. This is retrieved from an OSPCM database. |
| Telco Removal Cost: | The Telco cost of removal per item in the Item Description field. This is retrieved from an OSPCM database. |
| Contractor Removal Cost: | The contractor cost of removal per item in the Item Description field. This is retrieved from an OSPCM database. |
| Supplemental Costs: | Costs that will be authorized over the established threshold cost for an OSP job. |
| Grand Total Additions: | The calculated total cost of all material, labor, contractor, and engineering resources to add to, maintain, or repair |

| | |
|---|---|
| | the OSP. |
| Total Materials Additions: | The calculated total material cost to add to, maintain, or repair the OSP. |
| Total Labor Additions: | The calculated total labor cost to add to, maintain, or repair the OSP. |
| Total Contract Additions: | The calculated total contractor cost to add to, maintain, or repair the OSP. |
| Total Engineering Additions: | The calculated total contractor cost to add to, maintain, or repair the OSP. |
| Grand Total Retired Material Amount: | The calculated total retirement value of material removed from the OSP. |
| Salvaged Material Amount: | The scrap value of material being retired from the OSP. |
| Grand Total Cost of Removal: | The calculated total cost of removing material from the OSP. |
| Total Labor Retirements: | The calculated total labor cost for retiring material from the OSP. |
| Total Contract Retirements: | The calculated total contractor cost for retiring material from the OSP. |
| Total Engineering Retirements: | The calculated total engineering cost for retiring material from the OSP. |

| | |
|---|---|
| Telco Provided Material Amount: | The calculated amount of material provided by telco for a job. |
| Contractor Provided Material Amount: | The calculated cost of exempt contractor materials. |
| Telco Exempt Material Cost Amount: | The calculated amount of material provided by contractors for a job. |
| Contractor Exempt Material Cost Amount: | The calculated cost of exempt telco materials. |
| Supply Expense Cost Amount: | The calculated amount of supply expense per FRC. |
| Material Requirements Unit Quantity: | The amount of material needed for a certain work action. This is retrieved from an OSPCM database. |
| Material Disbursed Price Amount for All Associated Material Requirements: | The price of material used in the work action. This is retrieved from an outside system. |
| Contract Work Item Base Unit Quantity: | The number of hours of contract labor needed for a certain work action. This is retrieved from an OSPCM database. |
| OSP Contract Work Item Price Amount: | The price of contract work on an Outside Price Item. This is retrieved from an OSPCM database. |
| Total Telco Labor Hours Quantity: | The total number of telco labor hours needed for a certain work action. This is retrieved from an OSPCM database. |
| State FRC Telco Exempt Material Rate: | The telco exempt material rate based on state. This is retrieved from an OSPCM database. |

| | |
|---|---|
| State Exempt Equivalent Labor Hours Percentage: | The equivalent labor hours percentage based on state. This is retrieved from an OSPCM database. |
| Placing Labor: | The number of labor hours required to place a piece of material. This is retrieved from an OSPCM database. |
| Splicing Labor: | The number of labor hours required to splice a piece of cable. This is retrieved from an OSPCM database. |
| Other Labor: | The number of labor hours required to do tasks other than splicing and placing. This is retrieved from an OSPCM database. |
| Labor Adjustment: | The adjustment applied only to labor costs. This is retrieved from an OSPCM database. |
| Cost Adjustment Labor: | The labor portion of the global job adjustment. This is retrieved from an OSPCM database. |
| Cost of Removal Dollars Per Unit: | The per unit cost to remove a piece of material from the OSP. This is retrieved from an OSPCM database. |
| Telco Labor Amount: | The calculated amount of telco labor used for a job. This is retrieved from an OSPCM database. |
| Labor Rate Amount | The rate at which labor is charged. This is retrieved from an OSPCM database. |
| Contractor Labor Amount: | The amount of contractor labor hours needed to perform |

| | |
|---|---|
| | a certain work action. This is retrieved from an OSPCM database. |
| Contract Work Item Base Unit Quantity: | The quantity of work contractors will perform for a particular work action. This is retrieved from an OSPCM database. |
| OSP CWI Price Amount: | The price to be paid for the associated contract work item within an OSP contract. This is retrieved from an OSPCM database. |
| Telco Engineering Cost | The calculated cost of telco engineering for the OSP job. |
| Engineering Cost Amount: | The calculated cost of engineering for the OSP job. |
| State Field Reporting Code Engineering labor Percent: | The engineering labor percentage based on state. This is retrieved from an OSPCM database. |
| Retired Material Amount: | The retirement value of material being removed from the OSP. |
| CPR Book Value Amount for all associated Material Requirements: | The continuing property record material retirement value. This is retrieved from an OSPCM database. |
| CPR Item Lead Salvage Amount for all associated Material Requirements: | The continuing property record material salvage value. This is retrieved from an OSPCM database. |
| Total Supplement: | The total supplement that was approved for a particular job. |
| Supplement Material: | The material cost of the approved supplement. This is retrieved from an OSPCM database. |

| | |
|---|---|
| Supplement Telco Engineering: | The telco engineering cost of the approved supplement. This is retrieved from an OSPCM database. |
| Supplement Telco Labor: | The telco labor cost of the approved supplement. This is retrieved from an OSPCM database. |
| Supplement Contractor Engineering: | The contractor engineering cost of the approved supplement. This is retrieved from an OSPCM database. |
| Supplement Contractor labor: | The contractor labor cost of the approved supplement. This is retrieved from an OSPCM database. |
| Supplement Retirement: | The retirement cost of the approved supplement. This is retrieved from an OSPCM database. |
| Supplement Salvage: | The salvage cost of the approved supplement. This is retrieved from an OSPCM database. |
| Supplement Other: | The other costs of the approved supplement. This is retrieved from an OSPCM database. |
| Overhead Labor: | This is a calculated additional cost added to the Grand Total for each FRC if the job is being billed to a customer. |
| Overhead Labor Factor: | The factor that overhead labor hours is multiplied by to generate an overhead labor cost. This is retrieved from an OSPCM database. |
| Overhead Engineering: | This is a calculated additional cost added to the Grand Total for each FRC if the job is being billed to a customer. |
| Overhead Engineering Factor: | The factor that overhead engineering hours is multiplied by to generate an overhead engineering cost. This is retrieved from an OSPCM database. |

| | |
|---|---|
| Total Million Conductor Feet: | The calculated number of conductor feet (in millions) of cable. |
| Fiber Kilofeet: | The calculated number of fiber kilofeet of cable. |
| Material Size: | The size of the material to be placed for a certain job. This is retrieved from an OSPCM database. |
| Total Contract: | The calculated total cost of contractor work for a job. |
| Total Engineering: | The calculated total cost of engineering work for a job. |
| Gross Expenditures: | The calculated gross expenditure dollars for a job. |
| Total Cost of Removal: | The calculated total cost of removal dollars for a job. |
| Total Gross Additions | The calculated total gross additions dollars for job. |
| Net Requirements: | The calculated net required dollars for a job. |
| Total Salvage Value: | The calculated total scrap value of material being retired from the OSP. |
| Net Additions: | The calculated net additions dollars for a job. |
| Total Plant Retired: | The calculated total retirement value of all material being retired from the OSP. |
| Total Overhead Engineering | The calculated total overhead engineering costs added to a job. |
| Gross Additions: | The calculated gross additions by plant type. |

| | |
|---|---|
| Plant Retired: | The calculated retirement value of materials by plant type. |
| Salvage: | The calculated salvage value of materials by plant type. |
| Cost of Removal: | The calculate cost of removal by plant type. |
| Maintenance: | The calculated maintenance cost by plant type. |
| Business Rules: | Detailed job information must exist for a job. |

The 502 report will be sorted by FRC.

Four categories of cost will be identified on the report: Material, Labor, Engineering and Contract.

The Cost Type associated with each Detailed line will be examined and the cost associated with that line will be directed to the appropriate report category: Material, Labor, Engineering or Contract.

Grand Total Additions = Total Materials Additions + Total Labor Additions + Total Contract Additions + Total Engineering Additions Grand Total Retired Material Amount and Salvaged Material Amount = carry down of the subtotal for each.

Grand Total Cost of Removal = Total Labor Retirements + Total Contract Retirements + Total Engineering Retirements Total Material Additions = Telco Provided Material Amount + Contractor Provided Matl Amount + Telco Exempt Material Cost Amount + Contractor Exempt Matl Cost Amt + Supply Expense Cost Amount + Cost Adjustment Material Telco Provided Material Amount = Sum of: Substep Material Requirements Unit Quantity * Material Item Group Cost Average Disbursed Price Amount for all associated Substep Material Requirements Contractor Provided Matl Amount = Substep Contract Work Item Base Unit Quantity * OSP Contract Work Item Price Amount Telco Exempt Material Cost Amount – Sum of: substeps Total Telco Labor Hours Quantity * State FRC Telco Exempt Material Rate Contractor Exempt Matl Cost Amt = (Job Authority Contractor Provided Material Amount + Job Authority Contractor Labor Amount) * State Exempt Equivalent Labor Hours Percentage * State Field Reporting Code Contractor Exempt Material Rate.

Supply Expense Cost Amount = Telco Provided Material Amount + Telco Exempt Material Cost Amt + Contractor Exempt Matl Cost Amt) * State Supply Expense Rate Total Labor Additions = Placing Labor + Splicing Labor + Other Labor + Labor Adjustment + Cost Adjustment Labor Total Labor Retirements = Sum of: (Cost Removal Dollars Per Unit * Substep Material Requirement Unit Quantity) + Labor Adjustment + Cost Adjustment Labor Telco Labor Amount = Sum of: Substeps Total Telco Labor Hours Quantity * Labor Rate Amount (For State with Type Code – Telco)

Total Contract Additions = sum, over all Detailed input lines whose cost type is MATL or CONT, of the products (Substep Contract Work Item Base Unit Quantity * OSP Contract Work Item Price Amount)

Total Contract Retirements = sum, over all Detailed Retirement input lines whose Contractor Removal Cost line is populated, of the products (Substep Contract Work Item Base Unit Quantity * OSP Contract Work Item Price Amount)

Contractor Labor Amount = Sum of: (Substep Contract Work Item Base Unit Quantity * OSP Contract Work Item Price Amount)) + all Lump Sum CWI amount.

Engineering Cost Amount = (Telco Labor Amount + Contractor Labor Amount) * State Field Reporting Code Engineering Labor Percent Other Cost Amount = Right-of-Way expense or any kind of miscellaneous cost Retired Material Amount = Sum of: Substep Material Requirements Unit Quantity * CPR Book Value Vintage Retirement Unit Cost Amount for all associated Substep Material Requirements Salvaged Material Amount = Substep Material Requirements Unit Quantity * CPR Item Lead Salvage Amount for all associated Substep Material Requirements Total Supplement = Supplement Material + Supplement Telco Eng. + Supplement Telco Labor + Supplement Cont. Eng. + Supplement Cont. Labor + Supplement Retirement + Supplement Salvage + Supplement Other Overhead Labor = (Placing Labor + Splicing Labor + Other Labor + Labor Adjustment + Cost Adjustment Labor) * State Field Reporting Code Labor Overhead Percent. Only calculated for billing jobs.

Overhead Engineering = Telco Engineering Cost * State Field Reporting Code Engineering Overhead Percent. Only calculated for billing jobs.

The following algorithms are calculated as a total for all FRCs:

Total Million Conductor Feet = (2 * (Matl size from OSPCM Table or from user input # pairs) * (Quantity from user input)) / 1,000,000

Fiber Kilofeet = (Matl size from OSPCM Table or from user input # pairs) * (Quantity from user input)) / 1,000

Total Contract = sum over all FRCs for Total Contract Additions + Total Contract Retirements Total Engineering = sum over all FRCs for Total Engineering Additions + Total Engineering Retirements Gross Expenditures = Total Gross Additions + Total Cost of Removal Net Requirements = Total Gross Additions + Total Cost of Removal Total Salvage Value Net Additions = Total Gross Additions – Total Plant Retired Total Overhead Labor = sum over all FRCs for Total Overhead Labor Total Overhead Engineering = sum over all FRCs for Total Overhead Engineering The following algorithms will be calculated by Plant Type where there could be many FRCs to one Plant Type:

Gross Additions = Sum, over the 'C' FRCs within a particular Plant Type, of the amount computed for Grand Total Additions Plant Retired = Sum, over the 'X' FRCs within a particular Plant Type, of the amount computed for Grand Total Retirements Salvage = sum, over 'X' FRCs within a particular Plant Type, of the amount computed for the Total Salvage Value Amount Cost of Removal = Sum, over the 'X' FRCs within a particular Plant Type, of the amount computed for the Total Cost of Removal Maintenance = Sum, over the 'M' or 'R' FRCs within a particular Plant Type, of the amount computed for Grand Total Maintenance Table For Procedure Description

| | |
|---|---|
| Procedure Name: | View 502 Detailed Construction Details Report – ONL |
| Definition: | This procedure will allow a user to view a list of the pricing reports that have been run for a specific Job Number. From this list the user is able to select a report for viewing. The user must supply CMC and Job Number or Project Number to obtain the list. The list can be narrowed further by entering an Engineer's Initials. The system will use Job Number of Project Number and Engineer's Initials when retrieving the report. |
| Triggers: | Successful report run notification via terminal. |
| Frequency/Distribution: | Twice per week per Design Engineer |
| Operational Standard (Timing): | Delay time for displaying the report should not exceed 4 seconds. |
| Operational Standard (Quality): | 100% of all view 502 report requests should be satisfied |
| Security and Access: | Design Engineer, Clerk. Construction Supervisors should not have access to Pricing. |
| Design Complexity: | Medium |

| | |
|---|---|
| Referenced Data: | The Construction Management Center where the job originated. This is retrieved from the original user entry requesting a new job. |
| Job Number: | A unique number, within a CMC, given to an OSP job. This is placed into an OSPCM database. |
| Project Number: | A unique number given to an OSP job. This is placed into an OSPCM database. |
| Engineer's Initials: | The initials of the engineer who enters the job for broadgauge pricing. This is retrieved from an OSPCM database. |
| Business Rules: | CMC and Job Number or Project Number must exist in OSPCM databases. |

EXHIBIT 2

BAE FUNCTIONAL REQUIREMENT DOCUMENT

Table # 6424

| | | | |
|---|---|---|---|
| **BAE Start Date:** | 05-20-1997 | **BAE Name:** | Gail Deaton<br>Ron Cochran |
| **BAE Comp. Date:** | 05-22-1997<br>07-16-1997 revision 1 | **BAE Tele. No.:** | 977-3615<br>977-7444 |
| **BAE Hours:** | 42 | **LA Assigned:** | |

CMVC Component Name: Job Entry-EWO

Associated Defect/Feature No.: 6424

| | | | |
|---|---|---|---|
| **Target Release:**<br>(give target release this needs to be in) | Phase_2.1 | **Target Release Date:**<br>(give target release date for this enhancement) | ASAP |

| | |
|---|---|
| **Priority:**<br>(provide priority from 'feature priority' list – production_hi through deferred_low) | Production_hi |

| | |
|---|---|
| **Revision No.:** | 1 |
| **Reason for Revision:** | Reformat the functional requirements to enumerated sections |

Subject:

(brief description of change)

1. Job Entry-EWO: Provide the functionality of move work from a contract(s) to another contract(s) as master contracts expire.
2. Job Entry-EWO: Add batch process to accommodate item 1.
3. Job Entry-EWO: Provide the functionality to configure and assign a job to a new master contract not yet in effect
4. Job Entry-EWO: Revise the Contract Bid form to facilitate the moving of individual substeps.
5. Job Entry-EWO: Change the configuration process so it knows when to include open and closed substeps in configuration.
6. Job Entry-EWO: Remove the functionality in configuration that uses the contract "type" logic.
7. Configuration Editor: Remove the Contract Type field on the Resource Group/Work Type form.
8. Management Reports: Remove Contract Type column from the Resource Configuration Report.

Introduction:

(description of what system currently does, what needs to be changed and why)

Currently, the system has no method of transferring work authorizations from the old contract to the new when a master contract is expiring. These changes will allow the field users to move work from one contract to another. It will also allow work, which is being encoded, to be configured and assigned to a new master contract not yet in effect.

Solution:

(describe what the system will or should do and any general constraints or conditions that limit the solution)

1. Job Entry-EWO: Create a new form to identify entire jobs to be moved from the old contract number(s) to the new contract(s).
2. Job Entry-EWO: Create a new process to facilitate the moving of entire jobs from the old contract(s) to the new contract(s).
3. Job Entry-EWO: Provide a new field on the Encode a New Job form and the Job form to designate a Contract Date which will be used to determine what contract is in effect at a particular date in time. This will provide the user the ability to encode work to a contract, which is not yet in effect. Change the configuration processes to use contract(s) which are in effect for that wire center on a specified Contract Date rather than the current date.
4. Job Entry-EWO: Revise the Contract Bid from to facilitate the moving of individual substeps between contracts.
5. Job Entry-EWO: Change the configuration process so that it knows when to include both open and closed steps when calculating CWIs.
6. Job Entry-EWO: Remove the functionality in configuration that uses the contract "type" logic.
7. Configuration Editor: Remove the Contract Type field in configuration editor on the Resource Group/Work Type form.
8. Management Reports: Remove Contract Type column from the Resource Configuration Report

Change(s):

(detailed description of change) – [add additional rows if multiple changes])

1. Job Entry-EWO: Develop Move Jobs-Contract functionality.
   1.1 User needs to be able to designate the state, CMC and wire center in which jobs should be moved.
   1.2 Once the wire center is chosen, all job numbers, which have, open contact substeps belonging to that wire center should be displayed.
   1.3 User needs to be able to identify the contract to which the job should be moved by providing the contract's effective date. This date must be a future date.
   1.4 User needs to be able to select and deselect the jobs to be moved.
   1.5 Only jobs from one wire center may be moved at a time. If jobs from more than one wire center should be moved, the user must Save before selecting a new wire center.
   1.6 Upon saving, the system should check to see if a valid master contract(s) for that wire center is effective for the date specified by the user. If not, error.
   1.7 Information from this screen should be held in a until which time a batch process runs to re-configure the jobs identified to be moved.

2. Job Entry-EWO: Batch Run
   2.1 The batch process file should include the following information: the CMC, Effective Date, Job Number, Job Wire Center, Contract Number(s) and ContractorID necessary for the batch program. It should also carry the associated CUID(s) of the persons requesting the Move feature.
   2.2 This batch program should run a modified configuration program. The purpose of this program is to replace the existing contract number, CI's, CWI's on the substep level with the new contract(s).

2.3 The program should check each "job wire center" to the Exhibit "C" wire center on any master contract(s) which are effective on the date supplied by the user. Once the contract(s) is found, the jobs should be reconfigured with the following stipulations.

2.3.1 If the new contract number has the same contractor nickname as the old contract number, configuration should include both open and completed substeps on the job using the new contract number format. (This does not mean that CWI Codes are changed for completed substeps. It just means that they are considered when calculating the CWI's <groupings> for open substeps using the new contract. The completed substeps should remain in the data base with the old contract number and CWI's. (Any future added/deleted/changed substeps with subsequent configuration in Job Entry will have to include this factor. (A configuration override indicator on these substeps might be considered.)

2.3.2 If the new contract number has a different contractor nickname, only open substeps are reconfigured. CWI groupings only apply to the open substeps on the job authorization. Again, completed substeps remain with the old contract number and remain in the database as they are presently populated.

2.4 Any substeps which fail configuration should not be moved, but will remain in the data base under the old contract number. A report of the reasons for each failure should be open mailed to the CUID of the person who requested the Move in the Job Entry – EWO.

3. Job Entry-EWO Contract Date Field 3.1 Provide a new field on the Encode a New Job form and the Job form to designate a Contract Date. This field is a date field (mm/dd/yyyy). Default to the current date. The user may overtype with a future date only.

3.2 Presently, the configuration process uses the contract(s) which are in effect for the current date. If this field is populated with a future date, the process should look for the contract(s) which are in effect for that wire center on the date entered by the user. Whatever contract is in effect for that wire center on the Contract Date entered should be used.

4. Job Entry-EWO: Contract Detail form 4.1 Re-label form from Contract Bid to Contract Detail.

4.2 This form should be redesigned similar to the example in the attachment which is a prototype from the Bid and Award module.

4.3 The job contents area on both the top and bottom should be identical when the form is originally displayed. However, after that time, there is separate functionality. Either job contents area should be able to be expanded according to the business rules currently in place. Specifically, the job should be displayed with a contract number associated with that job in the tree. As folders are opened the prints and steps are displayed with the substeps finally being populated in the appropriate grid associated with that particular job content tree. The grid heading should indicate which contract number is being displayed for the associated substeps.

4.4 No grid should be populated specifically for the Bid Pool. Rather the bid pool should be displayed as another "contract number" in the contents form. Only when the bid pool folder is opened in the contents should the grid become active with the "Bid Pool" as its title.

4.5 Substeps which are to be moved from the old contract number to the new contract number will be moved by using the "associate" icon. If the associate function is used, one of the grids must be blank with no focus in the contents form.

4.6 The following is the users perspective of how the screen should operate when jobs are to be moved.

4.6.1 The user will open a folder in one of the contents form.

4.6.2 The open substeps for that contract are displayed in the appropriate grid.

4.6.3 The user will select the substeps in the grid by highlighting individual or a select all function.

4.6.4 The associate icon will be clicked.

4.6.5 The text box will be displayed and the user will enter the new contract number.

4.6.6 Once the OK is selected, the "other contents form will be refreshed with the new contract number and the appropriate substeps which were chosen will be displayed.

4.6.7 The user may select other substeps by "dragging" them to the new contract grid. This is a retention of the current method of moving substeps between contracts and bid pools.

4.6.8 If the user tries to open the same contract in both grids. Issue EMU: Contract XXXXX is currently open in one Move Grid. Cannot open in $2^{nd}$ grid.

4.7 The user should only be allowed to move work between one contract to another without saving the work. Upon SAVE, the system should reconfigure the job using the same basic rules as the batch configuration process.

4.7.1 If the new contract number has the same contractor nickname as the old contract number, configuration should include both open and closed steps on the job using the new contract number format.

4.7.2 If the new contract number has a different contractor nickname, only open substeps are considered in configuration.

4.8 Once configuration is successful, the job contents area should return to its original condition.

4.9 Using the above procedures, the user can move work from multiple contracts to single contracts or the reverse, by performing the function based on substeps. The above procedures will also allow the user to move jobs back to the old contract if it is decided that this is necessary.

5. Job Entry-EWO: Change the configuration process 5.1 Configuration should check each "job wire center" to the Exhibit "C" wire center on any master contract(s) which are effective on the date supplied by the user. Once the contract(s) is found, the jobs should be reconfigured with the following stipulations.

5.1.1 If the new contract number has the same contractor nickname as the old contract number, configuration should include both open and completed substeps on the job using the new contract number format. (this does not mean that CWI Codes are changed for completed substeps. It just means that they are considered within calculating the CWI" <groupings> for open steps suing the new contract. The completed substeps should remain in the data base with the old contract number and CWI". (any future added/deleted/changed substeps with subsequent configuration in Job Entry will have to include this factor. (A configuration override indicator on these substeps might be considered.)

5.1.2 If the new contract number has a different contractor nickname, only open substeps are reconfigured. CWI groupings only apply to the open substeps on the job authorization. Again, completed substeps remain with the old contract number and remain in the data base as they are presently populated.

6. Job Entry-EWO: Remove the functionality in configuration that uses the contract "type" logic.

6.1 Since contract types may be different in a future environment that the current environment, the configuration processes should be modified to not use the contract "type" logic that is presently used. Rather the CI and CWI codes should determine the appropriate contract.

6.2 Current logic = work_type → rg_wca → contract_type → ospmcd (OSP contract)

6.3 Proposed logic = work_type → rg_wca →ospmcd (OSP contract) → contract_type

7. Configuration Editor: Remove the Contract Type field in configuration editor on the Resource Group/Work Type form.

7.1 As a result of item 6, this field should be removed.

8. Management Reports: Remove the Contract Type column from the Resource Configuration Report.

Performance Requirements:

| | |
|---|---|
| (list any performance requirements associated with this change) | Performance should not be affected. |

Dependencies:

(list any defects or features that this enhancement is dependent on)

Benefits:

| | |
|---|---|
| (provide benefits in dollars, reduced headcount, time, savings, etc. for doing this work) | Allows for the conversion to new master contracts. |

| **Affected Components:** | | **(check) Yes** | **(check) No** |
|---|---|---|---|
| **RTOC Instructions** | | | |
| **HELP** | X | | |
| **User Guides** | | **X** | |
| **Testing** | | **X** | |
| **Infra-structure** | | **X** | |
| **Management Reports** | | **X** | |
| **Database** | | **X** | |

Interfaces:

| | |
|---|---|
| (list any legacy or new interface systems impacted by this change) | None |

Work-around:

| | (check) Yes | | (check) No |
|---|---|---|---|
| (is there a temporary work around??) (describe work around in detail) | | X | |

Risks:

| | |
|---|---|
| (list factors that impact, positive/negative, not doing this change) | This is a show stopper. When a CMC renews a master contract, we presently do not have a method in OSPCM to convert to the new contract(s). |

Business Rules:
(list any business rules or constraints that should apply)

Document Changes:
(list affected documents requiring change)

Acceptance Criteria/Test Scenario:
(list test scenarios required to test change prior to user acceptance) REQUIRED

Attachments:

| | |
|---|---|
| (copies of screens, reports, etc. before and after proposed change) | Form prototypes for Encode a New Job and Contractor Work Items.<br>Test scripts. |

Signatures of Agreement:

(add additional rows if necessary)

| | |
|---|---|
| **BAE:** | Gail Deaton |
| **BAE:** | Ron Cochran |
| **Team Manager:** | Marty Smith |
| **Team Lead:** | Karin Olinger |
| **Analyst:** | Mark Shockey |
| **Analyst:** | Mitra Partian |
| **Analyst:** | Byron Thomas |
| **Test Manager:** | Kathy Klammer |

BAE FUNCTIONAL REQUIREMENT DOCUMENT

Table # 3640

| | | | |
|---|---|---|---|
| **BAE Start Date:** | December 4, 1996 | **BAE Name:** | Carol A. Brechtel |
| **BAE Comp. Date:** | December 12, 1996 | **BAE Tele. No.:** | 205-977-3611 |
| **BAE Hours:** | 18 | **LA Assigned:** | Karin Oinger |

CMVC Component Name: Reorg

Associated Defect/Feature No.: 3640

| | | | |
|---|---|---|---|
| **Target Release:** (give target release this needs to be in) | 2.0x | **Target Release Date:** (give target release date for this enhancement) | September, 1997 |

Priority:
(provide priority from 'feature priority' list – production_hi through deferred_low) — Production_hi

Revision No.: 2

Reason for Revision: Update spec with information from BAE/SME & Reorg Meetings
(Revision Date: January 25, 1997, additional BAE hours 20)
Update spec with information from functional walkthrough
(Revision Date: June 17, 1997, additional BAE hours 3)

Subject:

| | |
|---|---|
| (brief description of change) | Functionality to 1) rename a wire center 2) move wire centers/inventory sites between CMCs (Construction Management Center) 3) change resource id's assigned to the jobs that are involved in the reorg.<br>Give the user the capability to create, update, delete, approve, unapprove, and search for reorg data.<br>**Due to the time frame allowed for development, reorgs across states have been deferred to a later release.** |

Introduction:

| | |
|---|---|
| (description of what system currently does, what needs to be changed, and why) | The system does not handle the moving or renaming of wire centers and/or inventory sites. Also can not mass update the resource id assigned to a job (a resource id assigned to a ajob can be changed in pre-survey).<br>Enhance the system to handle wire center name changes, movement of wire centers/inventory sites between CMCs, and to handle changing resource id's assigned to work the jobs.<br><br>**At this time, the Reorg process will not provide for moving inventory to a new inventory site (inventory site rename). The entire inventory site can be moved to a new CMC, buts name must remain the same.** |

| | |
|---|---|
| **Solution:**<br>(describe what the system will or should do and any general constraints or conditions that limit the solution) | 1. New user screens to handle the renaming of wire centers, the movement of inventory sites and wire centers between CMCs, and the changing of resource ids. Capability of new screens, create a new reorg, update or delete an existing reorg, approve a reorg, unapprove a reorg, and the ability to search for an existing reorg.<br>2. Crystal Report to printout the requested reorg information (possibility exist of handling more than one reorg request at a time).<br>3. Reports to list all jobs involved in the reorg. These reports could be run before the reorg and again after the reorg to ensure that all data was moved properly.<br>4. Batch runs that will move/update the data in the data bases. |
| **Change(s):**<br>(detailed description of change) – [add additional rows if multiple changes] | <u>Types of reorgs/changes</u>:<br>1. CMC consolidation<br>2. Wire Centers and inventory sites split between two or more CMCs (CMC split)<br>3. Resource ID changed in associated with wire center move<br>4. Wire Center Name Change<br><br>If the reorg involves adding a new CMC or deleting an existing CMC, the following must be done prior to running the reorg:<br>1. update the routing rules in the navigator cat tables<br>2. add the new CMC to the location tables, if applicable (this must be done prior to requesting the reorg)<br><br>The following OSPCM executables will probably be affected by the reorg: |

Billing & Reporting, Complaints, Employee Editor, Inspections, Job Entry EWO, Job Entry Other, Location Editor, OPF Editor, Pricing, Scheduling, Bid & Award, Work Station, and Materials Management.

Wire Center Name Change (reorg Type #4):

Wire Center name changes are performed when the state has a NPA split.

The process should do the following:

1. End date the old wire center.
2. Create a new wire center based on the associated data from the old wire center (the new wire center name is equal to the new NPA + last three characters of the old wire center name)
3. Update all occurrences of the old wire center name in various OSPCM tables with the new wire center name by replacing the first three characters of the old wire center name with the new NPA.

- Types of tables affected (These are "groups" of tables not the names of the tables. This may not be an inclusive list-any containing a wire center name may need to be reorged. The actual tables to be reorged will be determined during detail design.):
  - Location tables (including the LMOS wire centers associated to the wire centers being renamed)
  - Contract tables (including Exhibit C section of any contracts and the inspection pool associated to the wire centers being renamed)
  - Job tables (update all jobs, regardless of status)
  - Configuration tables Example of a wire center name change: all wire centers in KNVL Tennessee currently have a NPA of 615XXX, after the NPA split, all wire centers in KNVL, Tennessee have a NPA of 423XXX. The process would need to end date the old 615XXX wire centers and build new wire centers with the 423XXX NPA. The batch process would need to update all occurrences of the old wire center name with the new wire center name.

CMC Consolidation, Wire Centers/Inventory Site Splits and Resource ID changes (Reorg Types #1, #2 & #3):

The process should do the following when inventory sites and/or wire centers are moved:

1. Update all occurrences of the old CMC with the new CMC in various OSPCM tables.

- Types of tables affected (These are "groups" of tables not the names of the tables. This may not be an inclusive list-any containing a CMC may need to be reorged. The actual tables to be reorged will be determined during detail design.):
  - location tables
  - job tables (update all jobs, regardless of status)
  - configuration tables
  - pricing tables
  - contract tables (including inspection tables and complaints)
  - scheduling tables 2. Update resource id's assigned to open substeps involved in the reorg. The user would provide the information for these changes by populating the Resource Id window.

__Job Entry__ - if all wire centers on a job are being moved to the same CMC the process should change the primary CMC to the new CMC, at the job header level. If the wire centers on a job are being split between two or more CMCs-the primary CMC should be changed to the CMC of the primary wire center shown on the job header.

Pricing - The CMC is used when printing reports. The CMC should be updated in pricing identical to the change made in job entry.

Configuration – Three configuration tables need to be updated when the reorg is done, the tables are:

- RG_WCA – change only the resource id assigned to the wire center area
- RG_WORK_TYPE – copy all wire centers over and fill in any not yet existing.
- RG_WORK_TYPE_WCA – change on the resource id assigned to the wire center area.

Employee – the filed user will need to build all new employee data before the resource id screen can be populated. When updating employee data with the new CMC and/or resource id the user must use the same effective date as the reorg. The changes made in the employee editor will build future employee records. After all new resource id are built the reorg resource id screen may be populated by the user.

It is important to note that the resource id's will only be update on open substeps. Closed, completed substeps will not be updated with the new resource id.

Workstation – all jobs should be moved to the new CMC, using the same procedures as indicated for job entry.

Inspections – CMC information is stored on the inspection tables, when the reorg process is run it will be necessary to update the with the new CMC. If wire centers are being split between multiple CMC, the process will need to read the wire center to determine which CMC to use. It may be necessary for the contract co-ordinator to re-build inspection pools after the reorg is executed.

Location Editor – Move inventory site and wire centers to the new CMC, and end date the old CMC if all associated wire centers and inventory sites are moved. If all inventory sites and wire centers are not being moved, the CMC should stay active.

Billing and Reporting – All jobs (open, closed, completed, etc.) should be moved. This included all job types: BSW, EWO and RW.

Job Entry Other – All jobs (open, closed, completed, etc.) should be moved. This included all job types: BSW, EWO and RW.

Scheduling – Scheduling reads the job entry tables, so when they are updated by the reorg process and when the schedule is run it should pick up the correct data.

The following processes should be run after the reorg is complete:

1. If the user adds a new scheduling area (manual effort), a process named CrStndCTypes should be executed. This process updates the CMC drop-down list in the Job Entry Commitment grid on the substep screen.

2. The schedule should be run for all CMC's involved in the reorg.

Materials Management – If an inventory site is being moved to a new or existing CMC, the inventory site name is not being changed, the process needs to change the CMC name associated with the inventory site. The inventory (serialized and non-serialized), orders, transfer requests, shipments, and material inventory transactions would stay with the inventory site.

If the user wants to move inventory at one site to another inventory site or multiple inventory sites the user will need to manually move the inventory (serialized and non-serialized) using the transfer process and end-date the old inventory site, if applicable.

The main thing to remember in this execuis to change the association of the inventory site to the new CMC, if the inventory site is being moved in the reorg. All inventory (serialized and non-serialized) will stay with the inventory site but the inventory site will be associated with the new CMC.

The possibility exists for the reorg to only move wire centers, if no inventory sites are being moved the reorg will not effect this executable.

Example: Inventory Site IV1 is being moved from CMC1 to CMC2, the process would need to change the association of INV1 from CMC1 to CMC2.

The following functionality is needed in the presentation:

1. Allow the user to search for reorg requests by State and (Reorg Number, CMC and/or Effective Date)
2. Allow the user to provide the new NPA, if applicable.
3. Allow the user to select/deselect a wire center to rename/move, if applicable.
4. Allow the user to select/deselect an inventory site to move, if applicable.
5. Allow the user to provide the CMC to which the wire center/inventory site should be moved, if applicable.
6. Allow the user to provide the new resource ids that should be assigned to the jobs in the wire center being moved, if applicable.
7. Allow the user to provide an effective date for the Reorg
   - The effective date is defined as the date the Reorg batch process should run.

Security:

1. Only user types of 247, 231, or 232 can create, update, or delete a reorg request prior to approval
   - A 247 user can only update or delete those reorg requests that he/she originated
   - A 231 or 232 user can update or delete any reorg request.
2. Only user types of 231 or 232 can approve or unapprove a reorg request
   - A 231 or 232 user can approve or unapprove any reorg request.
3. Any user that has access to the Reorg Application can view reorg requests
4. If user has security for all states, the state drop down lists all nine states; otherwise, just the states for which he/she has security should be listed. Therefore, if a user only has security for FL, he can only request reorgs or view reorg requests for FL.

Edits:

1. When the reorg is approved, it is locked, the system will allow a user to view the data associated with the reorg, but no changes can be made.
2. Updates/Cancellations cannot be made to the request once it has been approved. A Core Staff user or the OSPCM Administrator must first unapprove the reorg. After the reorg is unapproved the updates/cancellation may be made by the user.
3. The reorg will not run unless it has been approved.
4. Resource Ids and CMCs must exist, have a start date equal to the effective date of the reorg, and must not be end-dated. The effective date of the reorg is the date the reorg will process.
5. Effective Date must be a future date and must be a Saturday (future employee records need to be created for a Saturday so that they may continue to work in the old CMC on Friday)
6. Verify that there is not already an overlapping reorg request in existence.
   - Perform verification at the time reorg details are saved
   - Verification should be done on only the requests that have not been processed (doesn't matter if it has been approved or not)
   - Overlapping Reorg requests are determined as follows:
     - If there is more than one request to rename the same wire center (e.g., request to rename wc1 to wc2 and another request to rename wc1 to wc3)

- If there is more than one request to move the same wire center (e.g., request to move wc1 to CMC1 and another request to move wc1 to CMC2)
- If there is more than one request to move the same inventory site (e.g., request to move is 1 to CMC1 and another request to move is 1 to CMC2)

- Display an error message if there is an overlapping reorg request.

Performance Requirements:

| | |
|---|---|
| (list any performance requirements associated with this change) | All updates must be made over the week-end. Reorg could begin on Saturday morning completing on Sunday so the users could verify that all data was updated correctly. System must be available on Monday morning, normal working hours. |

Dependencies:

| | |
|---|---|
| (list any defects or features that this enhancement is dependent on) | None. |

Benefits:

| | |
|---|---|
| (provide benefits in dollars, reduced headcount, time savings, etc. for doing this work) | Keep wire center names current and accurate. Keep the system in line with realignment of districts, managers, etc. |

| Affected Components: | | (check) Yes | | (check) No |
|---|---|---|---|---|
| RTOC Instructions | X | | | |
| HELP | | X | | |
| User Guides | | X | | |
| Testing | | X | | |
| Infra-structure | | X | | |
| Management Reports | | | X | |
| Database | X | | | |

| | |
|---|---|
| **Interfaces:** | |
| (list any legacy or new interface systems impacted by this change) | Majority of systems that interface with OSPCM would need to know about the changes we were making. In today's environment this is done by letters to MTR, STAR, Financial Processing, BCAS, Asset Management etc. Any change moving or renaming wire centers in OSPCM would need to be coordinated with OPEDS. For a Wire Center name change OSPCM would need to coordinate the change with LMOS. |

| Work-Around: | (check) Yes | | (check) No |
|---|---|---|---|
| (is there a temporary work around??)<br>(describe work around in detail) | | X | |

Risks:

(list factors that impact, positive/negative, not doing this change)

Don't rename the wire centers when area code splits are done, don't move wire centers and inventory sites when CMCs are combined or split. Management would be difficult since it would be almost impossible to pull data on the location you are responsible for. The user would also be required to manually update the resource id assigned to work a substep when changes are made.

Business Rules:

(list any business rules or constraints that should apply)

1. If adding a new CMC, it must be built using the Location Editor prior to the Reorg being requested.
2. Resource Ids and future dated employee records must be created prior to the Reorg being requested (this includes both craft and supervisors).
3. All jobs (open, closed, cancel, etc.) should be updated with the new (TO) CMC if a CMC consolidation or split is executed.
4. All jobs (open, closed, cancel, etc.) should be updated with the new wire center name if a wire center name change is executed.
5. Resource Ids should be changed on all "open" substeps on all "open" jobs if a CMC consolidation or split is executed. Do not update resource ids on completed and closed jobs/substeps.
6. A Reorg cannot be done below a wire center level.
7. When moving a wire center to a new CMC, the user must assign new resource ids.
8. A CMC consolidation is defined as combining the wire centers of one or more CMCs into one CMC.

9. A CMC consolidation MUST involve a wire center and inventory site move.
10. The old CMC must be end-dated in a CMC consolidation; therefore a CMC consolidation involves moving all of the wire centers and all of the inventory sites from the old CMC(s) to the new CMC.
11. A CMC split is defined as moving some or all of the wire centers and/or inventory sites of one CMC to one or more difference CMCs.
12. A CMC split does not require inventory sites to be moved.
13. The old CMC may be kept in a CMC split.
14. Management Reports will not be involved in the reorg process (reports should be requested through the Reorg Application).
15. The reorg should not generate duplicate job numbers.
16. System should be backup before the reorg is run.
17. Regional Contract, BSW LookUp and the Holiday Editor do not need to be updated with the reorg process.

Documentation Changes:

| | |
|---|---|
| (list affected documents requiring change) | No documentation exists for this process. Would need to develop M&P, test scenarios and functional decomps. |

Acceptance Criteria/Test Scenario:

(list test scenarios required to test change prior to user acceptance)

1. Rename several wire centers.
2. Change resource id assigned to do work on jobs.
3. Move all of the wire centers and all of the inventory sites from two or more CMCs to a new or existing CMC (delete old CMCs)
4. Move all of the wire centers and all of the inventory sites from one CMC to a new or existing CMC (delete old CMC).

5. Move some of the wire centers from one CMC to a new or existing CMC (keep old CMC)
6. Move some of the wire centers and some of the inventory sites from one CMC to a new or existing CMC (keep old CMC).
7. Move some of the wire centers from one CMC to 2 or more new or existing CMCs (keep old CMC).
8. Move some of the wire centers and some of the inventory sites from one CMC to 2 or more new or existing CMCs (keep old CMC)
9. Move all of the wire centers and all of the inventory sites from one CMC to 2 or more new or existing CMCs (delete old CMC).
10. Move some of the inventory sites from one CMC to a new or existing CMC (keep old CMC).
11. Move some of the inventory sites from one CMC to 2 or more new or existing CMCs (keep old CMC).

DETAILED TEST SCENARIOS WILL BE FURNISHED AT A LATER DATE.

Attachments:

(copies of screens, reports, etc. before and after proposed change)

- Screen layouts (wire center name change, wire center and inventory site moves, and resource id changes) Several of the editors required on each screen is also on the screen layouts.
- Manual Reorg Efforts
- Open/Closed Issues

Signatures of Agreement:

(add additional rows if necessary)

BAE:

Lead Analyst:

BAE FUNCTIONAL REQUIREMENT DOCUMENT

Table # 6622_FS

| | | | |
|---|---|---|---|
| **BAE Start Date:** | 06/24/97 | **BAE Name:** | Terry L. Small |
| **BAE Comp. Date:** | 06/24/97 | **BAE Tele. No.:** | 205-977-3613 |
| **BAE Hours:** | 2 | **LA Assigned:** | |

CMVC Component Name: Interfaces_extracts_mtr

Associated Defect/Feature No.: 6622

| | | | |
|---|---|---|---|
| **Target Release:** (give target release this needs to be in) | 2.01 | **Target Release Date:** (give target release date for this enhancement) | ASAP |

Priority:
(provide priority from 'feature priority' list – production_hi through deferred_low) Production_hi

Revision No.:
Reason for Revision:

Subject:
(brief description of change) 1. Reduce MTR error list before processing errors in OSPCM

| | |
|---|---|
| **Introduction:**<br>(description of what system currently does, what needs to be changed, and why) | 1. Currently MTR send all errors in the company to OSPCM. When OSPCM processes all of the errors trying to determine whether the errors belong to OSPCM or not, it causes lock out problems for the users whenever this process is run. |
| **Solution:**<br>(describe what the system will or should do and any general constraints or conditions that limit the solution) | 1. Add code to perform the edits of whether the MTR error should be displayed in OSPCM prior to actually doing the process that is causing our lock outs to the user. This process should also reduce the errors displayed to only include construction time reporting craft and I&M reporting errors that were sent to MTR through OSPCM only. |
| **Change(s):**<br>(detailed description of change)-[add additional rows if multiple changes) | Determine if error is a reporting error that belongs to OSPCM and display only the errors that belong to OSPCM. Make sure processing is done so as not to create locking problem for the users community. It will probably be best to perform these edits by social security number against the 'CRAFT' employee in OSPCM. It may be a requirement to also check against the daily work report record for the date under report for those that have a labor type of I&M in the craft employee table.<br>If there is an error from MTR that belongs to an OSPCM craft employee that has a 'labor type' equal to I&M we need to display this error. If the error from MTR is for a labor type I&M and there is no work report for that date under report in OSPCM, do not display the error. |

Display all errors for 'labor types' not equal to CLERICAL and I&M except for case identified in 2 above.

Performance Requirements:

| | |
|---|---|
| (list any performance requirements associated with this change) | 1. Must eliminate locking problems with this process. This process should take as little time as required so as not to interfere with anything else being processed at the same time. It should be done as early as possible, preferably before 7:00 am eastern time. |

Dependencies:

| | |
|---|---|
| (list any defects or features that this enhancement is dependant on) | 1. None |

Benefits:

| | |
|---|---|
| (provide benefits in dollars, reduced headcount, time savings, etc. for doing this work) | 1. Eliminate locking problems.<br>2. Reduce errors from MTR to a point that we only display errors that will apply to OSPCM. |

| **Affected Components:** | | **(check) Yes** | **(check) No** |
|---|---|---|---|
| **RTOC Instructions** | | | |
| **HELP** | X | | |
| **User Guides** | | X | |
| **Testing** | | X | |
| **Infra-structure** | | | |
| **Management Reports** | | | |
| **Database** | | | |

| | | |
|---|---|---|
| **Interfaces:** | | |
| (list any legacy or new interface systems impacted by this change) | 1. MTR interface for error processing. | |
| **Work-around:** | **(check) Yes** | **(check) No** |
| (is there a temporary work around??) (describe work around in detail) | X | |
| **Risks:** | | |
| (list factors that impact, positive/negative, not doing this change) | 1. If not implemented, the user will lose access with OSPCM during these lock out problems.<br>2. System will not be deployed. | |
| **Business Rules:** | | |
| (list any business rules or constraints that should apply) | 1. OSPCM will not edit that I&M actually reported time for the day. It will only process errors for time actually reported through OSPCM for I&M employees.<br>2. Construction employees will get errors on reports sent to MTR and for not reporting to MTR. | |
| **Documentation Changes:** | | |
| (list affected documents requiring change) | 1. Workstation | |

Acceptance Criteria/Test Scenario:

(list test scenarios required to test change prior to user acceptance) REQUIRED

1. Enter time reporting for labor type of I&M.
   1.1 Create one report with errors and one report without errors.
   1.2 Process through MTR
   1.3 Should get error for only one that was reported with errors.
   1.4 Also verify that employees with labor type of I&M that do not report time for the day through MTR do not get errors back into OSPCM.
2. Enter time reporting for regular time reporting construction craft person.
   2.1 Create one report with errors, one report without errors and a craft person with no report.
   2.2 Process through MTR
   2.3 Should get error on report with errors, error on person that did not report, and no error on report with no errors.
3. Verify OSPCM does not display any errors that were not time reported through OSPCM.

Attachments:

(copies of screens, reports, etc. before and after proposed change)

1. None

Signatures of Agreement:

(add additional rows if necessary)

BAE:

Lead Analyst:

BAE FUNCTIONAL REQUIREMENT DOCUMENT

Table # 6427_FS

| | | | |
|---|---|---|---|
| **BAE Start Date:** | 05/20/1997 | **BAE Name:** | Mark Seal |
| **BAE Comp. Date:** | 05/30/1997 | **BAE Tele. No.:** | 205-977-3618 |
| **BAE Hours:** | 3 | **LA Assigned:** | |

CMVC Component Name: CHANGE_MGMT

Associated Defect/Feature No.: 6427

Target Release:
(give target release this needs to be in) 2.1

Target Release Date:
(give target release date for this enhancement)

Priority:
(provide priority from 'feature priority' list – production_hi through deferred_low) PROD HI

Revision No.:
Reason for Revision:

Subject:
(brief description of change) 1. CHANGE DEFAULT INVENTORY SITE

| | |
|---|---|
| **Introduction:**<br>(description of what system currently does, what needs to be changed, and why) | 1. DURING CONFIGURATION A RES ID IS ASSIGNED TO EACH ACTIVITY ON A JOB. ALSO DURING CONFIGURATION A DEFAULT INVENTORY SITE IS ASSIGNED BASED ON THE RES ID ASSIGNED. IF THERE ARE MULTIPLE RES ID'S IN THE CONFIGURATION THE SYSTEM WILL ASSIGN ONE AT RANDOM. THE USER CAN, AFTER CONFIGURATION, CHANGE THE RES ID. THE PROBLEM IS THAT THE DEFAULT INVENTORY SITE DOES NOT CHANGE. |
| **Solution:**<br>(describe what the system will or should do and any general constraints or conditions that limit the solution) | 1. WHEN THE USER CHANGES THE CONFIGURATION ASSINGED RES ID AND THE MATERIAL IS NOT ALREADY ON ORDER THEN CHANGE THE DEFAULT INVENTORY SITE. |
| **Change:**<br>(detailed description of change)-[add additional rows if multiple changes] | 1. CHANGES SHOULD APPLY TO THE ACTIVITY MTCE SCREEN IN PRESURVEY AND IN SCHEDULING.<br>2. CHANGE THE SYSTEM SO THAT WHEN A USER CHANGES THE RES ID ASSIGNED TO AN ACTIVITY, AND THE MATERIAL HAS NOT BEEN ORDERED FOR THE ACTIVITY, THEN THE DEFAULT INVENTORY SITE SHOULD ALSO BE CHANGED TO THE DEFAULT INVENTORY SITE OF THE NEW RES ID.<br>3. IF NO DEFAULT INVENTORY SITE EXISTS FOR THE |

ASSINGED RES ID FROM CONFIGURATION AND THE USER CHANGES THE RES ID, AND THE MATERIAL HAS NOT BEEN ORDERED THEN THE SYSTEM SHOULD TRY TO ASSIGN THE DEFAULT INVENTORY SITE FOR THE NEW RES ID.

4. IF WHEN TRYING TO CHANGE THE DEFAULT INVENTORY SITE FOR A NEWLY ASSINGED RES ID AND THAT NEW RES ID DOES NOT HAVE A DEFAULT INVENTORY ASSIGNED THEN DON'T CHANGE THE INVENTORY SITE.
5. FOR THOSE SUBSTEPS THAT HAVE MATERIAL THAT HAS BEEN ORDERED DO NOT CHANGE THE INVENTORY SITE.

Performance Requirements:

| | |
|---|---|
| (list any performance requirements associated with this change) | 1. NONE |

Dependencies:

| | |
|---|---|
| (list any defects or features that this enhancement is dependent on) | 1. NONE |

Benefits:

| | |
|---|---|
| (provide benefits in dollars, reduced headcount, time savings, etc. for doing this work) | 1. THIS WILL SAVE THE USER TIME IN ASSIGNING AN ALT INV SITE IN THE MATERIAL MODULE. MOSTLY, THE FIELD USERS WILL FORGET AND MATERIAL WILL NOT GET ORDERED ON TIME OR TO THE CORRECT INVENTORY SITE. |

| **Affected Components:** | | **(check) Yes** | **(check) No** |
|---|---|---|---|
| **RTOC Instructions** | X | | |
| **HELP** | | **X** | |
| **User Guides** | | **X** | |
| **Testing** | | **X** | |
| **Infra-structure** | | | |
| **Management Reports** | | | |
| **Database** | | | |

Interfaces:

| | |
|---|---|
| (list any legacy or new interface systems impacted by this change) | 1. N/A |

| **Work-Around:** | | **(check) Yes** | **(check) No** |
|---|---|---|---|
| (is there a temporary work around??) | X | | |
| (describe work around in detail) | 1. THE WORK AROUND IS FOR THE USER TO ASSIGN AN ALT INVENTORY SITE. IF THE USER FORGETS TO DO THIS THEN THE | | |

MATERIAL WON'T GET ORDERED ON TIME.

| | |
|---|---|
| **Risks:** (list factors that impact, positive/negative, not doing this change) | 1. THE USER WILL HAVE TO ASSIGN AN ALT INVENTORY SITE. IF THE USER FORGETS TO DO THIS THEN THE MATERIAL WON'T GET ORDERED ON TIME AND/OR TO THE CORRECT INVENTORY SITE. |
| **Business Rules:** (list any business rules or constraints that should apply) | 1. THESE CHANGES SHOULD APPLY TO THE ACTIVITY MTCE SCREEN IN PRESURVEY AND IN SCHEDULING. |
| **Documentation Changes:** (list affected documents requiring change) | 1. USER GIDES AND HELP SCREENS |
| **Acceptance Criteria/Test Scenario:** (list test scenarios required to test change prior to user acceptance) **REQUIRED** | 1. ENTER AND CONFIGURE A JOB SO THAT THE CONFIGURATION PROCESS ASSIGNS A RES ID (A) AND A DEFAULT INV SITE (A) TO AN ACTIVITY. IN PRESURVEY ON THE ACTIVITY MTCE SCREEN CHANGE THE RES ID (A) FOR THE ACTIVITY TO A NEW RES ID (B) AND VERIFY THAT THE DEFAULT INV. SITE IS CHANGED TO (B)<br>2. ENTER AND CONFIGURE A JOB SO THAT THE CONFIGURATION PROCESS ASSIGNS A RES ID (A) AND A DEFAULT INV SITE (A) TO AN ACTIVITY. CHANGE THE RES ID (A) TO A NEW ONE (B) THAT |

DOES NOT HAVE A DEFAULT INV. SITE ASSIGNED. EXPECTED RESULT…IS THAT THE RES ID (A) GETS CHANGED TO RES ID (B) AND THE DEFAULT INV SITE (A) DOES NOT.

3. ENTER AND CONFIGURE A JOB SO THAT THE CONFIGURATION PROCESS ASSIGNS A RES ID (A) AND THERE IS NO DEFAULT INV SITE ASSIGNED TO AN ACTIVITY. CHANGE THE RES ID (A) TO A NEW RES ID (B) THAT HAS A DEFAULT INV SITE (B). EXPECTED RESULTS…THE RES ID AND THE DEFAULT INV. SITE GET CHANGED TO (B).
4. THESE TESTS SHOULD BE PERFORMED ON THE ACTIVITY MTCE SCREEN IN PRESURVEY AND IN SCHEDULING.

Attachments:
(copies of screens, reports, etc. before and after proposed change)

1. NONE

Signatures of Agreement:
(add additional rows if necessary)

BAE:

Lead Analyst:

BAE FUNCTIONAL REQUIREMENT DOCUMENT

Table # 6436_FS

| | | | |
|---|---|---|---|
| **BAE Start Date:** | 05/21/1997 | **BAE Name:** | Mark Seal |
| **BAE Comp. Date:** | 05/30/1997 | **BAE Tele. No.:** | 205-977-3618 |
| **BAE Hours:** | 6 | **LA Assigned:** | |

CMVC Component Name: CHANGE_MGMT

Associated Defect/Feature No.: 6436

Target Release:
(give target release this needs to be in) 2.1

Target Release Date:
(give target release date for this enhancement)

Priority:
(provide priority from 'feature priority' list – production_hi through deferred_low) PROD-HI

Revision No.:
Reason for Revision:

Subject:
(brief description of change)

1. ADD EDITS TO THE PRESURVEY SCREEN WHEN ADDING ROADBLOCKS FOR FACTORY ADD ON ITEMS ASSOCIATED WITH AN ASSEMBLY

| | |
|---|---|
| **Introduction:** | |
| (description of what system currently does, what needs to be changed, and why) | 1. CURRENTLY THE SYSTEM WILL ALLOW A ROADBLOCK TO BE PLACED ON A SUBSTEP THAT HAS A FACTORY ADD-ON MATERIAL ITEM. BECAUSE THE SYSTEM WILL AUTO COMPLETE THE FACTORY ADD-ON SUBSTEPS, NO OTHER COMPLETION PROCESSING WILL OCCUR. THIS MEANS THAT IF A ROADBLOCK EXISTED IT WOULD NOT BE AUTOMATICALLY CLEARED WHEN THE FACTORY ADDOON SUBSTEP IS AUTO COMPLETED. |
| **Solution:** | |
| (describe what the system will or should do and any general constraints or conditions that limit the solution) | 1. DON'T ALLOW A ROADBLOCK TO BE ENTERED FROM THE PRESURVEY SCREEN ON A SUBSTEP THAT HAS FACTORY ADD-ON MATERIAL ASSIGNED |
| **Change(s):** | |
| (detailed description of change)-[add additional rows if multiple changes]) | 1. ADD AN EDIT ON THE PRESURVEY SCREEN. WHEN THE USER ATTEMPTS TO ENTER A ROADBLOCK THE SYSTEM SHOULD CHECK THE MATERIAL ASSIGNED TO THE SUBSTEP. IF THE MATERIAL HAS AN ASSEMBLY INDICATOR SET TO "Y" IN THE OSPCM MATERIAL ITEM THEN DO NOT ALLOW THE ROADBLOCK TO BE ENTERED. RETURN A MESSAGE "ROADBLOCK NOT ALLOWED ON A SUBSTEP WITH FACTORY ADD-ON MATERIAL. ENTER THE ROADBLOCK ON THE ASSOCIATED CABINET". |

| | |
|---|---|
| **Performance Requirements:** | |
| (list any performance requirements associated with this change) | 1. NONE |
| **Dependencies:** | |
| (list any defects or features that this enhancement is dependant on) | 1. NONE |
| **Benefits:** | |
| (provide benefits in dollars, reduced headcount, time savings, etc. for doing this work) | 1. WITHOUT THIS EDIT WE HAVE NO WAY TO ENSURE THAT ROADBLOCKS WILL BE CLEARED ON ALL CLOSED JOBS. THAT MEANS THAT THE ROADBLOCK REPORT COULD HAVE ROADBLOCKS FOR CLOSED JOBS. IF THIS HAPPENS THERE IS CURRENTLY NO WAY TO REMOVE THESE ROADBLOCKS. |

| **Affected Components:** | | **(check) Yes** | **(check) No** |
|---|---|---|---|
| **RTOC Instructions** | X | | |
| **HELP** | | **X** | |
| **User Guides** | | **X** | |
| **Testing** | | **X** | |
| **Infra-structure** | | | |
| **Management Reports** | | | |
| **Database** | | | |

| | | |
|---|---|---|
| **Interfaces:** | | |
| (list any legacy or new interface systems impacted by this change) | 1. NONE | |
| **Work-around:** | **(check)** **Yes** | **(check)** **No** |
| (is there a temporary work around??) (describe work around in detail) | X | |
| **Risks:** | | |
| (list factors that impact, positive/negative, not doing this change) | 1. IF THIS CHANGE IS NOT MADE ROADBLOCKS COULD APPEAR ON THE ROADBLOCK REPORT AND IN THE SYSTEM THAT CANNOT BE REMOVED. | |
| **Business Rules:** | | |
| (list any business rules or constraints that should apply) | 1. ROADBLOCKS ASSOICATED WITH AN ASSEMBLY SHOULD BE ON THE SUBSTEP WITH THE CABINET ASSIGNED. | |

Document Changes:

| | |
|---|---|
| (list affected documents requiring change) | 1. USER GUIDES, HELP, M&P |

Acceptance Criteria/Test Scenario:

| | |
|---|---|
| (list test scenarios required to test change prior to user acceptance) **REQUIRED** | 1. ENTER A JOB WITH SEVERAL SUBSTEPS THAT MAKE UP AN ASSEMBLY. GO TO THE PRESURVEY SCREEN AND TRY TO ENTER A ROADBLOCK ON A SUBSTEP THAT HAS FACTORY ADD-ON MATERIAL ASSIGNED. THE ERROR "ROADBLOCK NOT ALLOWED ON A SUBSTEP WITH FACTORY ADD-ON MATERIAL. ENTER THE ROADBLOCK ON THE ASSOCIATED CABINET" SHOULD DISPLAY.<br>2. TRY TO ENTER THE ROADBLOCK ON THE SUBSTEP THAT HAS THE CABINET ASSIGNED. THIS SHOULD BE ALLOWED. |

Attachments:

| | |
|---|---|
| (copies of screens, reports, etc. before and after proposed change) | 1. NONE |

Signatures of Agreement:

(add additional rows if necessary)

BAE:

Lead Analyst:

BAE FUNCTIONAL REQUIREMENT DOCUMENT

Table # 6501

| | | | |
|---|---|---|---|
| **BAE Start Date:** | June 5, 1997 | **BAE Name:** | Carol A. Brechtel |
| **BAE Comp. Date:** | June 6, 1997 | **BAE Tele. No.:** | 205-977-3611 |
| **BAE Hours:** | 6 Hours | **LA Assigned:** | |

CMVC Component Name: MATMGMT

Associated Defect/Feature No.: 6501

| | | | |
|---|---|---|---|
| **Target Release:** (give target release this needs to be in) | 2.1 | **Target Release Date:** (give target release date for this enhancement) | 9/1997 |

Priority:
(provide priority from 'feature priority' list – production_hi through deferred_low) Production_hi

Revision No.:
Reason for Revision:

Subject:
(brief description of change)

1. Enhance the system to allow the user to save the 8010, 6241 and 1010 forms to a file, for printing at a later date.

| | |
|---|---|
| **Introduction:**<br>(description of what system currently does, what needs to be changed, and why) | 1. Today whenever non-COE equipment is transferred between inventory sites the system automatically generates a RF-6241-M1 form.<br>2. When COE equipment is:<br>*transferred between inventory sites<br>*assigned to a job from existing inventory<br>*unassigned from a job<br>3. When material (COE and non-COE) is returned to a BST/GTES warehouse or an outside vendor the system automatically generates a RF-1010-A1.<br>4. Enhance the system to allow these forms to be saved to a file so they can be printed at a later date. |
| **Solution:**<br>(describe what the system will or should do and any general constraints or conditions that limit the solution) | 1. The system should give the user the option of<br>* printing the form<br>* save the form to a file<br>* print the form and save it to a file |
| **Change(s):**<br>(detailed description of change)-[add additional rows if multiple changes] | 1. Enhance the system to display a window, before automatically generating any of the forms (8010, 6241 & 1010) giving the user a selection of:<br>* print the form only<br>* save the form to a file<br>* print the form and save the form to a file<br>2. This will allow the user to print the form if they are ready to ship the cable. They can send the form to a file that can be |

printed later or they can keep for the office record copy. By allowing the user to create the file they have no need to keep a paper copy of the form.

Performance Requirements:

| | |
|---|---|
| (list any performance requirements associated with this change) | 1. There should be no noticeable affect on performance. |

Dependencies:

| | |
|---|---|
| (list any defects or features that this enhancement is dependent on) | 1. NONE |

Benefits:

| | |
|---|---|
| (provide benefits in dollars, reduced headcount, time savings, etc. for doing this work) | 1. Allow the user to save the forms to be printed later or they could save the file for their records. Eliminate the need for a paper copy.<br>2. Also if multiple copies are needed they can print as many as they need, for remote locations this may be easier than making copies. |

| Affected Components: | (check) Yes | | (check) No |
|---|---|---|---|
| RTOC Instructions | | X | |
| HELP | X | | |
| User Guides | X | | |
| Testing | X | | |
| Infra-structure | | X | |
| Management Reports | | | X |
| Database | | | X |

Interfaces:

| | |
|---|---|
| (list any legacy or new interface systems impacted by this change) | 1. NONE |

| Work-around: | | (check) Yes | (check) No |
|---|---|---|---|
| (is there a temporary work around??) | X | | |
| (describe work around in detail) | 1. The user would need to make a copy for future use. | | |

Risks:

| | |
|---|---|
| (list factors that impact, positive/negative, not doing this change) | 1. If the form is printed when the transaction is done and the material is not shipped the paper work could get lost.<br>2. 8010 may not be handled correctly and DCPR would not get the data they need to keep their records accurate. |

Business Rules:

(list any business rules or constraints that should apply)

1. Give the user a choice whenever the form is generated by the system.

Documentation Changes:

(list affected documents requiring change)

1. User Guide updated with the new window and process
2. Test Scenarios and Functional Decomps

Acceptance Criteria/Test Scenario:

(list test scenarios required to test change prior to user acceptance) REQUIRED

1. Generate the following transactions and print a 8010, save the 8010, and print and save the 8010:
   - assign COE equipment to a job from existing inventory
   - unassign COE equipment from a job
   - transfer COE equipment between inventory sites
2. Generate the following transactions and print a 6241, save the 6241, and print and save the 6241:
   - transfer non COE equipment between inventory sites.
3. Generate the following transaction and print a 1010, save the 1010, and print and save the 1010:
   - Return material to a warehouse (COE and non-COE material)
   - Return material to an outside vendor (COE and non-COE material)
4. Verify all forms are handled properly
5. A more detailed test case will be provided when it is determined how the feature will be programmed.

| | |
|---|---|
| **Attachments:**<br>(copies of screens, reports, etc. before and after proposed change) | 1. NONE |
| **Signatures of Agreement:**<br>(add additional rows if necessary) | |
| **BAE:** | |
| **Lead Analyst:** | |

BAE FUNCTIONAL REQUIREMENT DOCUMENT

Table # 6575

| | | | |
|---|---|---|---|
| **BAE Start Date:** | June 14, 1997 | **BAE Name:** | Carol A. Brechtel |
| **BAE Comp. Date:** | June 16, 1997 | **BAE Tele. No.:** | 205-977-3611 |
| **BAE Hours:** | 2 Hours | **LA Assigned:** | |

CMVC Component Name: MATMGMT

Associated Defect/Feature No.: 6575

Target Release: (give target release this needs to be in) 2.1

Target Release Date: (give target release date for this enhancement)

Priority: (provide priority from 'feature priority' list – production_hi through deferred_low) Production_low

Revision No.:

Reason for Revision:

Subject:

(brief description of change)

1. Enhance the inventory scan to allow the user to sort the scan by Serial Number, when requesting a scan for serialized inventory.

Introduction:

| | |
|---|---|
| (description of what system currently does, what needs to be changed, and why) | 1. Today the user can sort an inventory scan by 15 different attributes, but Serial Number is not one of the sort options. The scan will display/print all assigned material first. Enhance the system to allow the user to sort an inventory scan by serial number. |

Solution:

| | |
|---|---|
| (describe what the system will or should do and any general constraints or conditions that limit the solution) | 1. Add the attribute of Serial Number to the "SorFields" grid on the "Sort Inventory" window. |

Change(s):

| | |
|---|---|
| (detailed description of change)-[add additional rows if multiple changes] | 1. Allow the user to sort inventory scans by serial number when requesting a scan for serialized material. (ascending order)<br>2. Allow the user to select Serial Number as a sort option.<br>3. If Serial Number is selected display/print in ascending order. |

Performance Requirements:

| | |
|---|---|
| (list any performance requirements associated with this change) | 1. There should be no noticeable affect on performance. |

Dependencies:

(list any defects or features that this enhancement is dependent on)

1. NONE

Benefits:

(provide benefits in dollars, reduced headcount, time savings, etc. for doing this work)

1. Make it easier for the user to determine the on hand quantity of cable on a reel. Today the system will print/display all assigned material first, therefore, the user needs to scan the full report to determine the total amount of cable on a reel.
2. Easier to compare what is in the system to what is on the yard.

| Affected Components: | (check) Yes | | (check) No |
|---|---|---|---|
| **RTOC Instructions** | | X | |
| **HELP** | **X** | | |
| **User Guides** | **X** | | |
| **Testing** | **X** | | |
| **Infra-structure** | | X | |
| **Management Reports** | | | **X** |
| **Database** | | | **X** |

Interfaces:

(list any legacy or new interface systems impacted by this change)

1. NONE

| | | |
|---|---|---|
| **Work-around:** | **(check)** | **(check)** |
| | **Yes** | **No** |
| (is there a temporary work around??) (describe work around in detail) | | X |

Risks:

(list factors that impact, positive/negative, not doing this change)

1. Inventory adjustments may be made that are not necessary.
2. Not user friendly when doing a physical inventory.

Business Rules:

(list any business rules or constraints that should apply)

1. If the user requests an inventory scan sorted by serial number, the scan should be sorted in ascending order using the serial number.

Documentation Changes:

(list affected documents requiring change)

1. Materials Management User Guide
2. Functional Decomps
3. Test Scenarios

Acceptance Criteria/Test Scenario:

(list test scenarios required to test change prior to user acceptance) REQUIRED

1. Display the "Inventory Scan Search Criteria" window
2. Select the "Sort By" button
3. Verify that "Serial Number" appears in the "SorField" grid on the "Sort Inventory" window
4. Select Serial Number and verify that it moves over to the "Sort Order" grid
5. Arrange the sort order options so that Serial Number is the first option
6. Select OK
7. Run the Inventory scan – verify that it sorted in Serial Number order.

Attachments:

(copies of screens, reports, etc. before and after proposed change)

Signatures of Agreement:

(add additional rows if necessary)

BAE:

Lead Analyst:

BAE FUNCTIONAL REQUIREMENT DOCUMENT

Table # 6426_FS

| | | | |
|---|---|---|---|
| **BAE Start Date:** | 05/31/1997 | **BAE Name:** | Mark Seal |
| **BAE Comp. Date:** | 06/01/1997 | **BAE Tele. No.:** | 205-977-3618 |
| **BAE Hours:** | 4 | **LA Assigned:** | |

CMVC Component Name: CHANGE_MGMT

Associated Defect/Feature No.: 6426

| | | | |
|---|---|---|---|
| **Target Release:** (give target release this needs to be in) | 2.01 | **Target Release Date:** (give target release date for this enhancement) | |

Priority:
(provide priority from 'feature priority' list – production_hi through deferred_low) PROD HI

Revision No.:
Reason for Revision:

Subject:
(brief description of change) 1. SERVER PROCESS TO PROVIDE NOTIFICATIONS

| | |
|---|---|
| **Introduction:**<br>(description of what system currently does, what needs to be changed, and why) | 1. CURRENTLY THERE IS NO NOTIFICATION TO THE SUPERVISOR AS TO WHEN AND WHO REPORTS AN EXCEPTION CODE OR WHEN ADDED STEPS ARE REPORTED. |
| **Solution:**<br>(describe what the system will or should do and any general constraints or conditions that limit the solution) | 1. THE SOLUTION IS TO WRITE A SERVER PROCESS TO RUN EACH NIGHT AND READ THE DATA BASE. COLLECT ANY ADDED STEP AND/OR EXCEPTION INFORMATION BY RES ID. USING THE RES ID GET THE SUPERVISOR'S EMAIL ADDRESS AND SEND THE DATA TO THAT ADDRESS. |
| **Change(s):**<br>(detailed description of change)-[add additional rows if multiple changes] | CREATE A SERVER PROCESS THAT WILL RUN IN A BATCH MODE EACH NIGHT. THIS PROCESS WILL LOOK AT EACH WORK REPORT THAT WAS CREATED OR CHANGED FOR EACH DAY. THE PROCESSED *IND* SHOULD BE SET TO "BA". THIS PROCESS SHOULD CHECK EACH WORK REPORT WITH A PROCESSED_IND SET TO "BA" TO SEE IF ANY ADDED STEPS HAVE BEEN REPORTED. IF SO THEN CAPTURE THE INFORMATION AS FOLLOWS. EMPLOYEE NAME, RES ID, DATE UNDER REPORT, ADDED STEP NUMBER AND REQUIRED REMARKS.<br>THIS SERVER PROCESS WILL LOOK AT EACH NON-SS TIME REPORT THAT HAS A DATE AND TIME |

STAMP FOR THE DAY BEING PROCESSED. IF A NON SS TIME REPORT DOES EXIST FOR THE PROCESSED DAY THEN CAPTURE THE INFORMATION AS FOLLOWS: EMPLOYEE NAME, RES ID, DATE UNDER REPORT, EXCEPTION CODE, START TIME, END TIME.

USING THE EMPLOYEE'S RES ID, GO TO THE SUPER_RG FOR THE RES ID AND GET THE SUPERVISOR'S CUID AND THEN GO TO THE EMPLOYEE AND GET THE SUPERVISOR'S EMAIL ADDRESS. ONCE THE EMAIL ADDRESS IS OBTAINED THEN SEND ALL OF THE CAPTURED DATA TO THE ADDRESS IN ONE E-MAIL MESSAGE. IF NO E-MAIL ADDRESS EXISTS THEN DON'T SEND THE INFORMATION TO ANY ONE.

Performance Requirements:

| | |
|---|---|
| (list any performance requirements associated with this change) | 1. THIS WILL BE DONE IN A BATCH MODE AND SHOULD NOT AFFECT PERFORMANCE. |

Dependencies:

| | |
|---|---|
| (list any defects or features that this enhancement is dependent on) | 1. NONE |

Benefits:

| | |
|---|---|
| (provide benefits in dollars, reduced headcount, time savings, etc. for doing this work) | THIS PROCESS WILL REPLACE THE CONTROLS THAT A SUPERVISOR MUST SIGN A WORK REPORT FOR EACH EMPLOYEE FOR EACH WORK DAY.<br>BY NOTIFIYING THE SUPERVISOR OF ANY EXCEPTIONS |

AND ADDED STEPS, APPROPRIATE ACTION CAN BE TAKEN IF NEEDED. THIS ALONG WITH THE CURRENT MTR REPORTS ARE CONSIDERED TO BE ACCEPCONTROLS.

| **Affected Components:** | **(check) Yes** | **(check) No** |
|---|---|---|
| RTOC Instructions | X | |
| HELP | | X |
| User Guides | | X |
| Testing | X | |
| Infra-structure | | X |
| Management Reports | | X |
| Database | | X |

Interfaces:

(list any legacy or new interface systems impacted by this change)

1. NONE.

| **Work-around:** | **(check) Yes** | **(check) No** |
|---|---|---|
| (is there a temporary work around??) | X | |

(describe work around in detail)

1. THE ONLY WORK AROUND IS FOR THE SUPERVISOR TO PHYSICALLY LOG IN AND PULL UP EACH EMPLOYEE'S WORK REPORT AND ACCESS THE EXCEPTIONS SCREEN TO CHECK FOR EXCEPTIONS. THEN THE

SUPERVISOR WILL ACCESS THE WORK REPORT SCREEN AND CHECK FOR ANY ADDED STEPS. THIS WILL BE A VERY TIME CONSUMING PROCESS.

Risks:

(list factors that impact, positive/negative, not doing this change)

1. WITHOUT PROPER CONTROLS A PAPER WORK REPORT MAY BE NECESSARY TO OBTAIN A SUPERVISOR'S SIGNATURE FOR APPROVAL.

Business Rules:

(list any business rules or constraints that should apply)

Document Changes:

(list affected documents requiring change)

1. ADD M&P TO RECOMMEND THAT ALL SUPERVISORS ENTER A VALID E-MAIL ADDRESS ON THE EMPLOYEE RECORDS.

Acceptance Criteria/Test Scenario:

(list test scenarios required to test change prior to user acceptance) REQUIRED

1. CREATE A WORK REPORT WHICH CONTAINS OVERTIME AND SAVE A BALANCE THE REPORT. RUN THE SERVER PROCESS. THE EXPECTED RESULT IS THAT THE SUPERVISOR OF THE EMPLOYEE ON THE WORK REPORT WILL RECEIVE AN E-MAIL WITH THE APPROPRIATE

INFORMATION.

2. CREATE A WORK REPORT WHICH CONTAINS AN ADDED STEP, SAVE AND BALANCE THE WORK REPORT. RUN THE SERVER PROCESS. THE EXPECTED RESULT IS THAT THE SUPERVISOR OF THE EMPLOYEE ON THE WORK REPORT WILL RECEIVE AN E-MAIL WITH THE APPROPRIATE INFORMATION.
3. CREATE A WORK REPORT WHICH CONTAINS NO EXCEPTIONS OR ADDED STEPS AND SAVE AND BALANCE. RUN THE SERVER PROCESS. THE EXPECTED RESULT IS THAT THE SUPERVISOR OF THE EMPLOYEE ON THE WORK REPORT WILL NOT RECEIVE AN E-MAIL.
4. ACCESS THE WORK REPORT IN NUMBER THREE AVOVE AND ADD OVERTIME AND AN ADDED STEP. SAVE AND CLOSE. RUN THE SERVER PROCESS. THE EXPECTED RESULT IS THAT THE SUPERVISOR OF THE EMPLOYEE ON THE WORK REPORT WILL RECEIVE AN E-MAIL WITH THE APPROPRIATE INFORMATION.

Attachments:

| | |
|---|---|
| (copies of screens, reports, etc. before and after proposed change) | 1. NONE |

Signatures of Agreement:

(add additional rows if necessary)

BAE:

Lead Analyst:

BAE FUNCTIONAL REQUIREMENT DOCUMENT

Table # 6814A

| | | | |
|---|---|---|---|
| **BAE Start Date:** | October 9, 1997 | **BAE Name:** | Carol Brechtel |
| **BAE Comp. Date:** | October 9, 1997 | **BAE Tele. No.:** | 205-977-3611 |
| **BAE Hours:** | 2 ½ hours | **LA Assigned:** | |

CMVC Component Name: MATMGMT

Associated Defect/Feature No.: NONE

Target Release: (give target release this needs to be in) [Only identify if this is required for an emergency release or must be worked in next scheduled release]

Target Release Date: (give target release date for this enhancement, if required)

Priority: (provide priority from 'feature priority' list – number preliminary assigned by SME)

Top 25 Rating=15
Module Rating=7

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Add one additional display field to the Transaction Details window, display the "Total on Hand Quantity" for the material item on the transaction, this is for serialized and non serialized material.

2. Current Problem:

| | |
|---|---|
| (brief description of what system currently does, what needs to be changed, and why) | 2.1 "Total On Hand Qty" is not displayed on the Transaction Details window – currently the system displays the Transaction Quantity and the Balance Quantity. |
| **3. Proposed Solution:** (brief description of what the system will or should do and any general constraints or conditions that limit the solution) | 3.1 Add one field to the Transaction Details window – add "Total on Hand Quantity" to the Transaction Data section of the window. For non-serialized material & serialized material. |
| **4. Change/Addition(s):** (detailed description of change/addition) | 4.1 Add one field to the Transaction Data Section of the Transaction Details window. |
| **5. Performance Requirements:** (list any performance requirements associated with this change) **[Identify system response requirements that must be met for user acceptance]** | 5.1 There should be no noticeable affect on performance. |
| **6. Dependencies:** (list any defects or features that this enhancement is dependent on or that will be dependent on this feature) | 6.1 NONE |

7. Benefits:

(provide benefits in dollars, reduced headcount, time savings, etc. for doing this work) [This is required to identify any savings that can be attributed this feature for securing budget approval]

7.1 For two sided transactions the user would be required to add the Balance quantity from both sides of the transaction to determine the total quantity of material on hand.

7.2 The Total on Hand Quantity would be display.

| **8. Affected Components:** | | **(check) Yes** | | **(check) No** |
|---|---|---|---|---|
| **RTOC Instructions** | | | X | |
| **HELP** | X | | | |
| **User Guides** | | **X** | | |
| **Testing** | | **X** | | |
| **Infra-structure** | | | | **X** |
| **Management Reports** | | | | **X** |
| **Database** | | | | |

9. Interfaces:

(list any legacy or new interface systems impacted by this change) [Make sure other interface systems are aware of and agree with any requirement change that impacts them before proceeding]

9.1 NONE

| 10. Work-around: | (check) Yes | (check) No |
|---|---|---|
| (is there a temporary work around?) | X | |
| (describe work around in detail) **[Also identify this in the OSPCM 'known problem' document]** | 10.1 Manually calculate the on hand quantity of the inventory item | |

11. Risks:

| | |
|---|---|
| (list factors that impact, positive/negative, not doing this change) | 11.1 The user may believe they have more or less material in inventory then they actually have. |

12. Business Rules:

| | |
|---|---|
| (list any business rules or constraints that should apply. If business rules are included in the changes section, identify these with asterisk in bold, ***business rule***) | 12.1 NONE |

13. Documentation Changes:

| | |
|---|---|
| (list affected documents requiring change) **[Documentation should prepare a checklist covering each document that must be updated for this feature]** | 13.1 User Guide<br>13.2 Help<br>13.3 Functional Decomps |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 NONE |

15. Acceptance Criteria/Test Scenario:

| | |
|---|---|
| (list test scenarios required to test change prior to user acceptance, this can be updated after the detailed design is completed.) **<u>REQUIRED</u> [Tester should prepare checklist based on these test scenarios for documentation on results of tests. These should be in matrix form identified back to the numbering scheme used in these test scenarios]** | 15.1 Use the "Show Inventory item" window to find inventory that has an unassigned and assigned balance.<br>15.2 Either display the last transaction from here or go to Show Transactions<br>15.3 Display transaction (from the Inventory item on Show Inventory item window)<br>15.4 Display the details of the transaction<br>15.5 Verify that they "Total on Hand Quantity" is displayed<br>15.6 Return to the Show Inventory item window and verify the "Total on Hand quantity" displayed on the transaction was correct. |

16. Attachments:
(copies of screens, reports, etc. before and after proposed change-only identify if the customer requires the screen or something on the screen to look a certain way)

Signatures of Agreement:
(add additional rows if necessary)
BAE:
Lead Analyst:

BAE FUNCTIONAL REQUIREMENT DOCUMENT

Table # 7055A

| | | | |
|---|---|---|---|
| **BAE Start Date:** | 09/17/1997 | **BAE Name:** | Larry Edgar |
| **BAE Comp. Date:** | 09/25/1997 | **BAE Tele. No.:** | 977-7375 |
| **BAE Hours:** | 18 | **LA Assigned:** | |

CMVC Component Name: Change_mgmt

Associated Defect/Feature No.:

Target Release:
(give target release this needs to be in) [Only identify if this is required for an emergency release or must be worked in next scheduled release]

Target Release Date:
(give target release date for this enhancement, if required)

Priority:
(provide priority from 'feature priority' list – number preliminary assigned by SME) Prod_hi

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Provide a system method to either advise user by display message or to automatically point a production user to the correct server when logging on to a unit that has not been used before for OSPCM.

2. Current Problem:

| | |
|---|---|
| (brief description of what system currently does, what needs to be changed, and why) | 2.1 Users download a new release in production on a unit not used for OSPCM before and do not verify the state server is pointed to. Can cause time outs and delays due to "traffic" routing. A default state of FL is given. |
| **3. Proposed Solution:** (brief description of what the system will or should do and any general constraints or conditions that limit the solution) | 3.1 Provide an OSPCM method in or after the download process that will identify the user "correct server" based on location feedback. Then advise the user by display message dialog box to point to correct server if needed.<br>3.2 Consider an automatic method to do the pointing during the download if not too complex. |
| **4. Change/Addition(s):** (detailed description of change/addition) | 4.1 Add user location detection method to system<br>4.2 Add method to determine correct server based on location detection |
| | 4.3 Add method to display advisory message "please select state and choose State" on OSPCM Guide (may consider adding to the Production/Training selection).<br>4.4 Consider if user can be pointed automatically during a download. |

| | |
|---|---|
| **5. Performance Requirements:** (list any performance requirements associated with this change) **[Identify system response requirements that must be met for user acceptance]** | 5.1 No delay foreseen-should enhance user times. |
| **6. Dependencies:** (list any defects or features that this enhancement is dependent on or that will be dependent on this feature) | 6.1 None. |
| **7. Benefits:** (provide benefits in dollars, reduced headcount, time savings, etc. for doing this work) **[This is required to identify any savings that can be attributed this feature for securing budget approval]** | 7.1 Will avoid the "traffic" routing congestion and thus reduce user time outs. User acceptance enhanced. |

| 8. Affected Components: | | (check) Yes | | (check) No |
|---|---|---|---|---|
| RTOC Instructions | X | | | |
| HELP | X | | | |
| User Guides | | X | | |
| Testing | | X | | |
| Infra-structure | X | | | |
| Management Reports | | | | X |
| Database | | | X | |

9. Interfaces:

(list any legacy or new interface systems impacted by this change) [Make sure other interface systems are aware of and agree with any requirement change that impacts them before proceeding]

9.1 NONE

| | | |
|---|---|---|
| **10. Work-around:** | **(check) Yes** | **(check) No** |
| (is there a temporary work around?) | X | |
| (describe work around in detail) **[Also identify this in the OSPCM 'known problem' document]** | 10.1 Users have been and are continued to be advised during deployment that a standard procedure is to always (not just for OSPCM firsts) go to OSPCM Guide to select the State and choose/verify the local state. | |

11. Risks:

(list factors that impact, positive/negative, not doing this change)

11.1 Users complain of time outs as caused by routing traffic which bogs down a server since use is not correctly dispersed.

12. Business Rules:

(list any business rules or constraints that should apply. If business rules are included in the changes section, identify these with asterisk in bold, *business rule*)

12.1 Advise users to perform state verify function to avoid potential traffic delays

13. Documentation Changes:

(list affected documents requiring change)

13.1 Chapter to Overview of OSPCM Application, each module – intro chapter and Getting Started user guide

| | |
|---|---|
| **[Documentation should prepare a checklist covering each document that must be updated for this feature]** | needs to reflect the added download message and manual state selection procedure emphasis. |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 Deployment teams and/or training needs to continue to emphasize the probability of delays and cause. |

15. Acceptance Criteria/Test Scenario:

| | |
|---|---|
| (list test scenarios required to test change prior to user acceptance, this can be updated after the detailed design is completed.) **<u>REQUIRED</u> [Tester should prepare checklist based on these test scenarios for documentation on results of tests. These should be in matrix form identified back to the numbering scheme used in these test scenarios]** | 15.1 Perform a new release download in production and verify that a display message appears to advise user to select state after security logon.<br>15.2 Go to a second test unit in production and select the state point option, then perform the new release download and determine if no message displayed.<br>15.3 Use the OSPCM in the file to verify server changes. |

16. Attachments:

| | |
|---|---|
| (copies of screens, reports, etc. before and after proposed change-only identify if the customer requires the screen or something on the screen to look a certain way) | 16.1 NONE |

Signatures of Agreement:

(add additional rows if necessary)

| | |
|---|---|
| **BAE:** | Larry Edgar |
| **Lead Analyst:** | |

BAE FUNCTIONAL REQUIREMENT DOCUMENT

Table # 7166

| | | | |
|---|---|---|---|
| **BAE Start Date:** | 01/30/1998 | **BAE Name:** | Wesley White |
| **BAE Comp. Date:** | 01/30/1998 | **BAE Tele. No.:** | 977-7436 |
| **BAE Hours:** | 1 | **LA Assigned:** | |

CMVC Component Name: MGMT_REPORTS

Associated Defect/Feature No.:

| | | | |
|---|---|---|---|
| **Target Release:** | | **Target Release Date:** | |
| (give target release this needs to be in) **[Only identify if this is required for an emergency release or must be worked in next scheduled release]** | Emergency | (give target release date for this enhancement, if required) | Emergency |

Priority:
(provide priority from 'feature priority' list – number preliminary assigned by SME) 1

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Create extract file from dic material tracking report to bufit to 90.11.244.172/bto/sys/lec3/ospcm

2. Current Problem:
(brief description of what system currently does, what needs to be changed, and why)

2.1 Extract files needed for SSI business process server to load data into LEC3 database

3. Proposed Solution:
(brief description of what the system will or should do and any general constraints or conditions that limit the solution)

3.1 Extract fields from DLC material Tracking report and bufit to ip address nightly. Email verification that process did or did not run to Paul.W.White@bridge.bellsouth.com

4. Change/Addition(s):
(detailed description of change/addition)

4.1 Run DLC Material Tracking Report Nightly and Extract:
4.2 Wire, Center char17
4.3 Design, Engineer char35
4.4 Job, Number char16
4.5 Prt char6
4.6 Step char9
4.7 Work, id char12
4.8 GLC char16
4.9 FRC char14
4.10 Work, action char16
4.11 Stat char6
4.12 Substep, Stat Date char20
4.13 Material, Desc char30
4.14 Order, Quantity char21
4.15 Mtl, Stat char12
4.16 Mtl, Stat date char16

4.17 Capri PO# char15

4.18

4.19 Bufit file to 90.11.244.172/bto/sys/lec3/ospcm 4.20

4.21 file should be called ospcm with an extension of the date yyyy/mm/dd example: ospcm.19980130

4.22

4.23 File should contain data for all states FL, GA, SC, NC, TN, KY, LA, AL, MS 4.24

4.25 The new DLC Tracking Report edits should be put into production before this report is run.

4.26

4.27 The report should bufit the files MON-FRI at 10:00 PM EST 4.28

4.29

5. Performance Requirements:

| | |
|---|---|
| (list any performance requirements associated with this change) **[Identify system response requirements that must be met for user acceptance]** | 5.1 No deterioration in current response time. |

6. Dependencies:

| | |
|---|---|
| (list any defects or features that this enhancement is dependent on or that will be dependent on this feature) | 6.1 NONE |

7. Benefits:

| | |
|---|---|
| (provide benefits in dollars, reduced headcount, time savings, etc. for doing this work) **[This is required to identify any savings that can be attributed to this feature for securing budget approval]** | 7.1 NONE |

| **8. Affected Components:** | **(check) Yes** | **(check) No** |
|---|---|---|
| **RTOC Instructions** | | |
| **HELP** | | |
| **User Guides** | | |
| **Testing** | **X** | |
| **Infra-structure** | | |
| **Management Reports** | | |
| **Database** | | |

9. Interfaces:

| | |
|---|---|
| (list any legacy or new interface systems impacted by this change) **[Make sure** | 9.1 NONE |

other interface systems are aware of and agree with any requirement change that impacts them before proceeding]

| | | |
|---|---|---|
| **10. Work-around:** | **(check)**<br>**Yes** | **(check)**<br>**No** |
| (is there a temporary work around?)<br>(describe work around in detail) **[Also identify this in the OSPCM 'known problem' document]** | | X |

11. Risks:
(list factors that impact, positive/negative, not doing this change)

12. Business Rules:
(list any business rules or constraints that should apply. If business rules are included in the changes section, identify these with asterisk in bold, *business rule*)

13. Documentation Changes:

| | |
|---|---|
| (list affected documents requiring change) **[Documentation should prepare a checklist covering each document that must be updated for this feature]** | 13.1 NONE |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 NONE |

15. Acceptance Criteria/Test Scenario:

| | |
|---|---|
| (list test scenarios required to test change prior to user acceptance, this can be updated after the detailed design is completed.) **<u>REQUIRED</u> [Tester should prepare checklist based on these test scenarios for documentation on results of tests. These should be in matrix form identified back to the numbering scheme used in these test scenarios]** | 15.1 NONE |

16. Attachments:

| | |
|---|---|
| (copies of screens, reports, etc. before and after proposed change-only identify if the customer requires the screen or something on the screen to look a certain way) | 16.1 NONE |

Signatures of Agreement:

(add additional rows if necessary)

BAE:

Lead Analyst:

BAE FUNCTIONAL REQUIREMENT DOCUMENT

Table # 7349A

| | | | |
|---|---|---|---|
| **BAE Start Date:** | 11/19/1997 | **BAE Name:** | Larry Edgar |
| **BAE Comp. Date:** | 12/12/1997 | **BAE Tele. No.:** | 205-977-7375 |
| **BAE Hours:** | 20 | **LA Assigned:** | |

CMVC Component Name: Change_mgmt

Associated Defect/Feature No.: N/A

Target Release:
(give target release this needs to be in) [Only identify if this is required for an emergency release or must be worked in next scheduled release]

Target Release Date:
(give target release date for this enhancement, if required) 1/1/1998

Priority:
(provide priority from 'feature priority' list – number preliminary assigned by SME

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Prepare/provide a search program to find all occurrences of the T, D, and F prefix FRCs in Florida CMCs for open EWOs. Then make global changes to change the prefixes from T, D, F to be '8'. Verify that FRCs from CORTS valid.

2. Current Problem:

(brief description of what system currently does, what needs to be changed, and why)

2.1 Florida uses the T, D, and F prefixed FRCs for fiber per the state PSC but this will change effective 1/1/98 so all substeps on open EWOs need to be found and changed per CCRs # 287, 288 and 292.

3. Proposed Solution:

(brief description of what the system will or should do and any general constraints or conditions that limit the solution)

3.1 Provide a program to find each occurrence of the T, D, and F prefixed FRCs in Florida CMCs and then make "global" changes to change the prefix to the number "8" for each cable substep and remove the TDF if circuit equipment.

4. Change/Addition(s):

(detailed description of change/addition)

4.1 Find each T, D, and F prefix FRC in Florida EWOs.

Change each occurrence by removing the letter prefix and/or substitute with an eight (8) as example:

D/F/T 12 C/X/M will be 812C/X/M

D/F/T 22C/X/M will be 822C/X/M

D/F/T 5C/X/M will be 85C/X/M

D/F/T 45C/X/M will be 845C/X/M

D/F/T 6C/X/M will be 86C/X/M

D/F/T 52/C/X/M will be 852C/X/M

D/F/T 257C/X/M will be 257C/X/M

D/F 958C/X/M will be 958C/X/M

5. Performance Requirements:

| | |
|---|---|
| (list any performance requirements associated with this change) **[Identify system response requirements that must be met for user acceptance]** | 5.1 None since this should be done at night or weekend times. |

6. Dependencies:

| | |
|---|---|
| (list any defects or features that this enhancement is dependent on or that will be dependent on this feature) | 6.1 NONE |

7. Benefits:

| | |
|---|---|
| (provide benefits in dollars, reduced headcount, time savings, etc. for doing this work) **[This is required to identify any savings that can be attributed this feature for securing budget approval]** | 7.1 Avoid each CMC having to do manual and separate searches and manual changes. |

| 8. Affected Components: | | (check) Yes | | (check) No |
|---|---|---|---|---|
| RTOC Instructions | | | X | |
| HELP | X | | | |
| User Guides | | X | | |
| Testing | | X | | |
| Infra-structure | X | | | |
| Management Reports | | | | X |
| Database | X | | | |

9. Interfaces:

(list any legacy or new interface systems impacted by this change) [Make sure other interface systems are aware of and agree with any requirement change that impacts them before proceeding]

9.1 NONE

| | | |
|---|---|---|
| **10. Work-around:** | **(check) Yes** | **(check) No** |
| (is there a temporary work around?) | X | |
| (describe work around in detail) **[Also identify this in the OSPCM 'known problem' document]** | 10.1 Each CMC in Florida will be required to search and find all occurrences of open T, D, and F prefix FRCs. Then, each such substep will require a manual change. Note that this must be done in a very short time frame since old codes are valid until 12/31/1997. | |

11. Risks:

| | |
|---|---|
| (list factors that impact, positive/negative, not doing this change) | 11.1 Probable errors in changes and reporting of FRCs. Much manual work to accomplish task. |

12. Business Rules:

| | |
|---|---|
| (list any business rules or constraints that should apply. If business rules are included in the changes section, identify these with asterisk in bold, *****business rule*****) | 12.1 Refer to CCRs #287, 288 and 292 which specify the change. This does not change what we do but does change the FRCs that are valid. |

13. Documentation Changes:

| | |
|---|---|
| (list affected documents requiring change) **[Documentation should prepare a checklist covering each document that must be updated for this feature]** | 13.1 Verify that user guides and help do not contain reference to FRCs such as Tnnx. |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 Notify Florida users in advance that this feature is pending so they do not make effort to do. Consider using a broadcast message on the system. |

15. Acceptance Criteria/Test Scenario:

| | |
|---|---|
| (list test scenarios required to test change prior to user acceptance, this can be updated after the detailed design is completed.) **<u>REQUIRED</u> [Tester should prepare checklist based on these test** | 15.1 Perform JE data creation to verify changed FRCs are OK. Open an EWO that had prefix of T, D, and F to ascertain change. |

| | |
|---|---|
| **scenarios for documentation on results of tests. These should be in matrix form identified back to the numbering scheme used in these test scenarios]** | |
| **16. Attachments:** (copies of screens, reports, etc. before and after proposed change-only identify if the customer requires the screen or something on the screen to look a certain way) | 16.1 NONE |
| **Signatures of Agreement:** (add additional rows if necessary) | L.A. Edgar |
| **BAE:** | |
| **Lead Analyst:** | |

BAE FUNCTIONAL REQUIREMENT DOCUMENT

Table # 7916c

| | | | |
|---|---|---|---|
| **BAE Start Date:** | 04/07/1998 | **BAE Name:** | Mark Seal |
| **BAE Comp. Date:** | 06/19/1998 | **BAE Tele. No.:** | 205-977-3618 |
| **BAE Hours:** | 10 | **LA Assigned:** | |

CMVC Component Name: Billing and Reporting

Associated Defect/Feature No.:

| | | |
|---|---|---|
| **Target Release:** (give target release this needs to be in) **[Only identify if this is required for an emergency release or must be worked in next scheduled release]** | 2.15 | **Target Release Date:** (give target release date for this enhancement, if required) |
| **Priority:** (provide priority from 'feature priority' list – number preliminary assigned by SME) | 19 | |

Revision No.: (B, C, etc. – this will require new signatures)

Reason for Revision:

B. The contract material correction screen in Billing and Reporting must have more changes. The correction process behind the Bulk reporting screen must recognize disbursed and non-disbursed material.

C. The contract material requires more information than is presently contained on the Bulk screens. It has been decided to use the material corrections screen in Billing and Reporting. This revision addresses the changes to that screen in order to make material corrections on contractor completed substeps.

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.

5. Continue numbering scheme in your text input under each to provide traceability for matrixes.

1. Abstract:

(brief description of change/addition) – This should pretty closely match the abstract in CMVC.

1.1 Allow telco users to change material on completed contractor substeps in Billing and Reporting.
1.2 Do not allow material to be disbursed when errors are returned from the material edit process.
1.3 Material error messages from the material edit process are not clear enough for the user to know how to make corrections.

2. Current Problem:

(brief description of what system currently does, what needs to be changed, and why)

2.1 Cannot correct or change any materials reporting on a contractor substep.
2.2 All material is being disbursed when the substep is completed even if errors are returned from the material management process.
2.3 Material error messages from the material edit process are not clear enough for the user to know how to make corrections.

3. Proposed Solution:

(brief description of what the system will or should do and any general constraints or conditions that limit the solution)

3.1 Allow a telco user to change material on a contractor substep on the material corrections screen in Billing and Reporting module.

3.2 Do not disburse material to FP on contract substeps when an error is generated in the material management process. Create material usage records and reversals the same way workstation handles materials.

3.3 Where possible change the error messages being provided from the material edit process to provide more information so users can understand the problems and make corrections.

4. Change/Addition(s):

(detailed description of change/addition)

4.1 Changes

Change the system so that when a contractor substep is completed in Billing and Reporting that the system will generate a material usage record. Change the logic so that when a contractor substep is completed that the system does not automatically set the opeds indicator to "Y". This indicator should be set only if no error is returned from the material management process. If a negative return code is generated in the material management process then the error should be displayed on the "Error Correction" screen in Billing and Reporting.

Change the material corrections screen in Billing and Reporting so that a user can access any contractor completed substep's material information that is in error.

Allow the user to edit the material information and save. If the material correction passes the material edit process then set the opeds indicator to "Y". The user should be able to change the same fields that are currently being edited in workstation.

Allow the user to enter a job name and access material for editing purposes on jobs that do not have a material management processing error. After the user makes changes the system will check the material management process for negative return codes. If no errors are found then the system will create a reversal usage record and a new material usage record to go to FP.

5. Performance Requirements:

| | |
|---|---|
| (list any performance requirements associated with this change) **[Identify system response requirements that must be met for user acceptance]** | 5.1 These changes should not affect the performance of the Billing and Reporting process at all. |

| | |
|---|---|
| **6. Dependencies:** | |
| (list any defects or features that this enhancement is dependent on or that will be dependent on this feature) | 6.1 NONE |

7. Benefits:

(provide benefits in dollars, reduced headcount, time savings, etc. for doing this work) [This is required to identify any savings that can be attributed this feature for securing budget approval]

7.1 Telco users will be able to correct material reporting errors for contract substeps.

7.2 This will also stop material from being disbursed to FP when errors occur in the material management process.

8. Affected Components:

| | | (check) Yes | | (check) No |
|---|---|---|---|---|
| **RTOC Instructions** | | | X | |
| **HELP** | X | | | |
| **User Guides** | | X | | |
| **Testing** | | X | | |
| **Infra-structure** | | | | X |
| **Management Reports** | | | | X |
| **Database** | X | | | |

9. Interfaces:

(list any legacy or new interface systems impacted by this change) [Make sure other interface systems are aware of and agree with any requirement change that impacts them before proceeding]

9.1 OSPCM Financial Process interface will send corrected material reporting information on contract substeps as well as telco substeps. This process should not be affected by the changes in this specification.

| | | |
|---|---|---|
| **10. Work-around:** | **(check)**<br>**Yes** | **(check)**<br>**No** |
| (is there a temporary work around?) | | X |
| (describe work around in detail) **[Also identify this in the OSPCM 'known problem' document]** | 10.2 Currently there is no way to correct material errors generated in OPSCM or FP for completed contract substeps. | |

11. Risks:

(list factors that impact, positive/negative, not doing this change)

11.1 If this change is not made then there is no way in OSPCM to correct material reporting errors generated in OPSCM or FP for contract completed substeps.

12. Business Rules:

(list any business rules or constraints that should apply. If business rules are included in the changes section, identify these with asterisk in bold, ***business rule***)

12.1

Do not allow any users or the system to uncomplete a contractor substep.

Any change in material on a completed contract substep will not uncomplete the substep.

Do not change or delete an invoice or CIBE if one exists for a completed contract substep.

When an invoice is created for a completed contract substep that has had the material changed, then the invoice will continue to be based on the cwi and cwi quantity.

This process will *NOT* change the substep flag from C (contract) to T (telco).

13. Documentation Changes:

(list affected documents requiring change) [Documentation should prepare a checklist covering each document that must be updated for this feature]

13.1 Billing and Reporting user guides and help create or update any job aid on material corrections.

14. Special Training/Implementation Requirements:

(list any special training/implementation required for this feature. Identify what will be required to train and implement this feature to the customer, i.e., by documentation, e-mail, help, cue cards, on sight training, etc.)

14.1 Some training may be required for the material correction screen's new functionality.

15. Acceptance Criteria/Test Scenario:

(list test scenarios required to test change prior to user acceptance. This can be updated after the detailed design is completed) REQUIRED [Tester should

15.1 Billing and Reporting:
Complete a contract substep in Billing and Reporting that has no errors from the material process. Check the Opeds Ind. And it should be set to "Y".
Verify that the material information is sent to FP.

prepare checklist based on these test scenarios for documentation on results of tests. These should be in matrix form identified back to the numbering scheme used in these test scenarios]

Repeat this process where an invoice and/or CIBE is generated and verify that the material flows to FP in the same manner as above.

15.2 Billing and Reporting:

Complete a contract substep in Billing and Reporting that has errors returned from the material process. Check the Opeds Ind. and it should be set to "N."

Check the material correction screen in Billing and Reporting and an error should be displayed.

Verify that all fields can be edited and make the necessary corrections.

Check the Opeds Ind. and it should be set to "Y."

Verify that the material information is sent to FP.

15.3

Complete a contract substep in Billing and Reporting that has errors returned from the material process. Check the Opeds Inc. and it should be set to "N."

Check the material correction screen in Billing and Reporting and an error should be displayed.

Verify that all fields can be edited and make corrections that will generate another error.

Verify that the system will not save this until the error is corrected.

Check the Opeds Ind. and it should be set to "N".

Make the correction and verify that the Opeds Ind. is set to "Y" and the material is disbursed to FP.

15.4

Access the material correction screen in Billing and Reporting and enter a job name, print, and step.

Report and enter a job name, print and step.

Verify that changes can be made to existing material information even though there is no error.

Verify that a reversal usage is created and a new material usage record is created and sent to FP.

16. Attachments:

(copies of screens, reports, etc. before and after proposed change-only identify if the customer requires the screen or something on the screen to look a certain way)

16.1 NONE

Signatures of Agreement:

(add additional rows if necessary)

BAE:

Lead Analyst:

BAE FUNCTIONAL REQUIREMENT DOCUMENT

Table # 7900a

| | | | |
|---|---|---|---|
| **BAE Start Date:** | 04/08/1998 | **BAE Name:** | Mark Seal |
| **BAE Comp. Date:** | 04/08/1998 | **BAE Tele. No.:** | 205-977-3618 |
| **BAE Hours:** | 3 | **LA Assigned:** | |

CMVC Component Name: Workstation

Associated Defect/Feature No.: 7944

Target Release:
(give target release this needs to be in) [Only identify if this is required for an emergency release or must be worked in next scheduled release] 2.12

Target Release Date:
(give target release date for this enhancement, if required)

Priority:
(provide priority from 'feature priority' list – number preliminary assigned by SME 18

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Allow more users to access work reports and work report errors generated by MTR.

1.2 Allow core staff users the ability to create work reports.

2. Current Problem:

(brief description of what system currently does, what needs to be changed, and why)

2.1 Currently, Core Staff, level 59 managers, craft and their supervisors can view errors and access existing work reports. This is limited for the supervisor to only those reports for employees assigned to them.

2.2 Currently, only the craft and their supervisors can create work reports.

3. Proposed Solution:

(brief description of what the system will or should do and any general constraints or conditions that limit the solution)

3.1 Change the workstation module to allow clerical users to have access to workstation and view MTR errors, MTR profiles and correct existing work reports.

3.2 Change the workstation module so that core staff users will have the ability to create new work reports. NOTE: Level 59 manager access will not change due to this feature.

4. Change/Addition(s):
(detailed description of change/addition)

4.1 Any user that is identified in the employee editor as non-management and has a work type of "Clerical" will have access to workstation and will be allowed to open the MTR error screen, the MTR profile screen and existing work reports for all employees in the CMC. For a clerical user disable all other tool bar buttons and "File" options. Currently, if a user has access to the MTR error screen then he/she can open existing work reports by double clicking on the error and there should be no change in that functionality.
4.2 Change the system so that any user with a 231 security tag (core staff user) will have the ability to create work reports. There will be no change for level 59 managers.

5. Performance Requirements:
(list any performance requirements associated with this change) [Identify system response requirements that must be met for user acceptance]

5.1 The changes identified in this functional specification should not affect system performance.

6. Dependencies:
(list any defects or features that this enhancement is dependent on or that will be dependent on this feature)

6.1 Defect 7944 must be worked with this feature.

7. Benefits:

| | |
|---|---|
| (provide benefits in dollars, reduced headcount, time savings, etc. for doing this work) **[This is required to identify any savings that can be attributed this feature for securing budget approval]** | 7.1 Clerical users need access to all errors and existing work reports. Clerical users need access to the MTR profile for all employees in the CMC. 7.2 Core staff users need to be able to create work reports for testing and investigating troubles. There will be no change for level 59 management users. |

| **8. Affected Components:** | | **(check) Yes** | | **(check) No** |
|---|---|---|---|---|
| **RTOC Instructions** | | | X | |
| **HELP** | X | | | |
| **User Guides** | | **X** | | |
| **Testing** | | **X** | | |
| **Infra-structure** | X | | | |
| **Management Reports** | | | | **X** |
| **Database** | X | | | |

9. Interfaces:

| | |
|---|---|
| (list any legacy or new interface systems impacted by this change) **[Make sure other interface systems are aware of and agree with any requirement change that impacts them before proceeding]** | 9.1 NONE |

| | | |
|---|---|---|
| **10. Work-around:** | **(check)** **Yes** | **(check)** **No** |
| (is there a temporary work around?) (describe work around in detail) **[Also identify this in the OSPCM 'known problem' document]** | X | |

11. Risks:

(list factors that impact, positive/negative, not doing this change)

11.1 The only work around is to log onto the system using someone else's cuid and password which is a security violation.

12. Business Rules:

(list any business rules or constraints that should apply. If business rules are included in the changes section, identify these with asterisk in bold, ***business rule***)

12.1 A core staff user should have access to read, create and update data.

12.2 A clerical user will not be allowed to create new work reports.

12.3 A craft employee with a work type of "placing, splicing, mixed or I&M" should continue to have access to their MTR errors and work reports only.

12.4 A Supervisor's access should not be changed due to this feature.

12.5 A level 59 management user's access will not change due to this feature.

13. Documentation Changes:

| | |
|---|---|
| (list affected documents requiring change) **[Documentation should prepare a checklist covering each document that must be updated for this feature]** | 13.1 Workstation user guides and help. |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 NONE |

15. Acceptance Criteria/Test Scenario:

| | |
|---|---|
| (list test scenarios required to test change prior to user acceptance. This can be updated after the detailed design is completed) <u>**REQUIRED**</u> **[Tester should prepare checklist based on these test scenarios for documentation on results of tests. These should be in matrix form identified back** | 15.1 Level 59 Management user;<br>Log in to OSPCM as a management user and access the MTR error screen. All errors for the CMC should be displayed.<br>Double click on an error for an employee.<br>The employee work report should open.<br>Updates to the work report should be allowed along with save and save and close.<br><br>15.2 Clerical user;<br>Log in to OSPCM as a clerical user and access |

to the numbering scheme used in these test scenarios]

the MTR error screen. All errors for the CMC should be displayed.

Double click on an error for any employee.

The employee work report should open.

Updates to the work report should be allowed along with save and save and close.

Access the MTR profile screen and make changes to an employee's profile.

Verify that as a clerical user a new work report cannot be created.

15.3 Core staff user;

Log in to OSPCM as a core staff users and access the MTR error screen. All errors for the CMC should be displayed.

Double click on an error for an employee.

The employee work report should open.

Updates to the work report should be allowed along with save and save and close.

From the workstation desk top, click on the NEW button on the tool bar.

The employee drop down list should display with all employees for the CMC listed.

Select one employee and build a work report and save and close.

From the workstation desk top, click on the NEW button on the tool bar.

The employee drop down list should display with all employees for the CMC listed.

Select one employee and click OK.

Add up to 5 additional employees and build a work report and save and close.
From the workstation desk top, click on FILE and select new report.
The crew screen should display with all employees for the CMC listed.
Select one employee and build a work report and save and close.
From the workstation desk top, click on FILE and select new report.
The crew screen should display with all employees for the CMC listed.
Select up to 6 employees and build a work report and save and close.

15.4 Supervisor
Log in to OSPCM as a supervisor and access the MTR error screen. All errors for that supervisor should be displayed.
Double click on an error for an employee.
The employee work report should open.
Updates to the work report should be allowed along with save and save and close.
From the workstation desk top, click on the new button on the tool bar.
The employee work report should open.
Updates to the work report should be allowed along with save and save and close.
From the workstation desk top, click on the NEW button on the tool bar.
The employee drop down list should display with all employees for the supervisor only.

Select one employee and build a work report and save and close.

From the workstation desk top, click on the NEW button on the tool bar.

The employee drop down list should display with all employees for the Supervisor.

Select one employee and click OK.

Add up to 5 additional employees and build a work report and save and close.

15.5

Verify that superiors and craft employees access does not change with this feature.

15.6

Perform regression testing on supervisor and craft functionality.

16. Attachments:

| | |
|---|---|
| (copies of screens, reports, etc. before and after proposed change-only identify if the customer requires the screen or something on the screen to look a certain way) | 16.1 NONE |

Signatures of Agreement:

(add additional rows if necessary)

BAE:

Lead Analyst:

BAE FUNCTIONAL REQUIREMENT DOCUMENT

Table # 7903A

| | | | |
|---|---|---|---|
| **BAE Start Date:** | May 1, 1998 | **BAE Name:** | Carol A. Brechtel |
| **BAE Comp. Date:** | May 6, 1998 | **BAE Tele. No.:** | 205-977-3611 |
| **BAE Hours:** | 1.5 hours | **LA Assigned:** | Karin Olinger |

CMVC Component Name: Materials Management

Associated Defect/Feature No.:

Target Release:
(give target release this needs to be in) [Only identify if this is required for an emergency release or must be worked in next scheduled release]

Target Release Date:
(give target release date for this enhancement, if required)

Priority:
(provide priority from 'feature priority' list – number preliminary assigned by SME

Revision No.: (B, C, etc. -- this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Add the age of the material to the "Inventory Scan Summary" crystal report in Materials Management.

2. Current Problem:

(brief description of what system currently does, what needs to be changed, and why)

2.1 Today the 'Inventory Scan Summary' report displays/prints the MIC, material description, serial number, reel type, quantity, bin loc, inventory site, phy. Loc., job number, res id. And status of all material items displayed on the report. Today the filed user must display/print the 'Inventory Scan Details' report to know the age of the material, this is a two line report and contains much more information then the Summary Report. Also the detail report is usually three times the size of the summary report when printed.

3. Proposed Solution:

(brief description of what the system will or should do and any general constraints or conditions that limit the solution)

3.1 Enhance the 'Inventory Scan Summary' crystal report-add one additional column to display/print the AGE of the material.

4. Change/Addition(s):

(detailed description of change/addition)

4.1 Add one column to display the Age of material on the 'Inventory Scan Summary' crystal report in Materials Management. The column can be added after the status column.

4.2 The age of the material is the number of days since the material was added into inventory (see calculation used on the Inventory Scan Details Report)

5. Performance Requirements:

| | |
|---|---|
| (list any performance requirements associated with this change) **[Identify system response requirements that must be met for user acceptance]** | 5.1 There should be no noticeable affect on performance. |

6. Dependencies:

| | |
|---|---|
| (list any defects or features that this enhancement is dependent on or that will be dependent on this feature) | 6.1 NONE |

7. Benefits:

| | |
|---|---|
| (provide benefits in dollars, reduced headcount, time savings, etc. for doing this work) **[This is required to identify any savings that can be attributed this feature for securing budget approval]** | 7.1 Give the user the capability of pulling a report that will give them all the information they need to determine what material should be used first in the yard. This will help them control the cost of doing business. |

| 8. Affected Components: | (check) Yes | (check) No |
|---|---|---|
| RTOC Instructions | | X |
| HELP | | X |
| User Guides | | X |
| Testing | X | |
| Infra-structure | | X |
| Management Reports | | X |
| Database | | X |

| 9. Interfaces | |
|---|---|
| (list any legacy or new interface systems impacted by this change) **[Make sure other interface systems are aware of and agree with any requirement change that impacts them before proceeding]** | 9.1 NONE |

| 10. Work-around: | (check) Yes | (check) No |
|---|---|---|
| (Is there a temporary work around?) | X | |
| (describe work around in detail) **[Also identify this in the OSPCM 'known problem' document]** | 10.1 Pull the Inventory Scan Details Report | |

11. Risks:

| | |
|---|---|
| (list factors that impact, positive/negative, not doing this change) | 11.1 This change would make the crystal reports available in Material Management more user friendly. This will help the construction supervisor to track and use the surplus and unassigned material in the yards. |

12. Business Rules:

| | |
|---|---|
| (list any business rules or constraints that should apply. If business rules are included in the changes section, identify these with asterisk in bold, ***business rule***) | 12.1 NONE |

13. Documentation Changes:

| | |
|---|---|
| (list affected documents requiring change) **[Documentation should prepare a checklist covering each document that must be updated for this feature]** | 13.1 Functional Decomps<br>13.2 Test Scenarios<br>13.3 Material Management Business Solution |

14. Special Training/Implementation Requirements:

(list any special training/implementation required for this feature. Identify what will be required to train and implement this feature to the customer, i.e., by documentation, e-mail, help, cue cards, on sight training, etc.)

15. Acceptance Criteria/Test Scenario:

| | |
|---|---|
| (list test scenarios required to test change prior to user acceptance, this can be updated after the detailed design is completed.) <u>**REQUIRED**</u> **[Tester should prepare checklist based on these test scenarios for documentation on results of tests. These should be in matrix form identified back to the numbering scheme used in these test scenarios]** | 15.1 Log on to OSPCM<br>15.2 Display the Inventory Scan Search Criteria window<br>15.3 Run an Inventory Scan<br>15.4 After the result of the scan is displayed (Inventory Scan Results Window) select print<br>15.5 Select print "Inventory Scan Summary"<br>15.6 Verify that the age for each material item listed on the report is populated |

16. Attachments:

| | |
|---|---|
| (copies of screens, reports, etc. before and after proposed change-only identify if the customer requires the screen or something on the screen to look a certain way) | 16.1 NONE |

Signatures of Agreement

(add additional rows if necessary)

| | |
|---|---|
| **BAE:** | (on file) 05/11/98 |
| **Lead Analyst:** | (on file) 05/11/98 |

BAE FUNCTIONAL REQUIREMENT DOCUMENT

Table # 7915A

| | | | |
|---|---|---|---|
| **BAE Start Date:** | 05/08/1998 | **BAE Name:** | Mark Seal |
| **BAE Comp. Date:** | 05/08/1998 | **BAE Tele. No.:** | 205-977-3618 |
| **BAE Hours:** | 3 | **LA Assigned:** | |

CMVC Component Name: Workstation

Associated Defect/Feature No.:

| | | |
|---|---|---|
| **Target Release:** (give target release this needs to be in) **[Only identify if this is required for an emergency release or must be worked in next scheduled release]** | 2.15 | **Target Release Date:** (give target release date for this enhancement, if required) |

| | |
|---|---|
| **Priority:** (provide priority from 'feature priority' list – number preliminary assigned by SME) | High |

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Change the system so that the Bulk reporting screen in workstation will open faster when a CMC is selected and job information is retrieved.

2. Current Problem:

(brief description of what system currently does, what needs to be changed, and why)

2.1 Currently the system takes a very long time to open the Bulk reporting screen when a CMC is selected and job information is retrieved. This is because the system retrieves from the data base all jobs, prints and steps when a CMC is selected. Then when retrieving substep information and associated material information it takes too long to populate the substep grid.

3. Proposed Solution:

(brief description of what the system will or should do and any general constraints or conditions that limit the solution)

3.1 Change the system so that when selecting a CMC on the Bulk screen the system only retrieves and displays the job information faster.

3.2 When the user selects a job, the system should retrieve and display the associated prints and steps.

3.3 When the user selects a step the system should retrieve and display in the substep grid the substeps and associated material information faster.

4. Change/Addition(s):

(detailed description of change/addition)

4.1 Change the system and/or contracts so that when selecting a CMC on the Bulk screen the system only retrieves and displays the job information faster.

4.2 Change the system and/or contracts so that when the user selects a job, the system will retrieve and display the associated prints and steps.

4.3 Change the system and/or contracts so that when the user selects a step the system will retrieve and display in the substep grid the substeps and associated material information faster.

5. Performance Requirements:

(list any performance requirements associated with this change) [Identify system response requirements that must be met for user acceptance]

5.1 These should be a great performance improvement when accessing information on the Bulk reporting screen due to this feature.

6. Dependencies:

(list any defects or features that this enhancement is dependent on or that will be dependent on this feature)

6.1 NONE

7. Benefits:

(provide benefits in dollars, reduced headcount, time savings, etc. for doing this work) [This is required to identify any savings that can be attributed this feature for securing budget approval]

7.1 This change will improve the performance of the Bulk reporting screens in the workstation module

| **8. Affected Components:** | **(check)** Yes | No | **(check)** |
|---|---|---|---|
| **RTOC Instructions** | | | **X** |
| **HELP** | | | **X** |
| **User Guides** | | | **X** |
| **Testing** | | | **X** |
| **Infra-structure** | | | **X** |
| **Management Reports** | | | **X** |
| **Database** | | | **X** |

9. Interfaces:

(list any legacy or new interface systems impacted by this change) [Make sure other interface systems are aware of and agree with any requirement change that impacts them before proceeding]

9.1 NONE

| | | |
|---|---|---|
| **10. Work-around:** | **(check)** **Yes** | **(check)** **No** |
| (is there a temporary work around?) | | |
| (describe work around in detail) **[Also identify this in OSPCM 'known problem' document]** | 10.1 The only work around today is to sit and wait for the system to retrieve all of the data. | |

11. Risks:

(list factors that impact, positive/negative, not doing this change)

11.1 Continued complaints from the users about poor system performance.

12. Business Rules:

(list any business rules or constraints that should apply. If business rules are included in the changes section, identify these with asterisk in bold, ***business rule***)

12.1 Current Business rules should apply.

13. Documentation Changes:

| | |
|---|---|
| (list affected documents requiring change) **[Documentation should prepare a checklist covering each document that must be updated for this feature]** | 13.1 NONE |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 NONE |

15. Acceptance Criteria/Test Scenario:

| | |
|---|---|
| (list test scenarios required to test change prior to user acceptance, this can be updated after the detailed design is completed.) REQUIRED **[Tester should prepare checklist based on these test** | 15.1 Verify that when selecting a CMC on the Bulk reporting screens the contracts only retrieve the Job name.<br>15.2 Verify that all open and price firmed job names are retrieved.<br>15.3 Verify that when selecting a job that the system retrieves all prints and steps for the job selected. |

| | |
|---|---|
| **scenarios for documentation on results of tests. These should be in matrix form identified back to the numbering scheme used in these test scenarios]** | 15.4 Verify that when a step is selected that the system retrieves and displays all substeps and associated material faster.<br>15.5 Verifying the increase in performance may require that some time studies be done before and after the code has been changed. |

16. Attachments:

| | |
|---|---|
| (copies of screens, reports, etc. before and after proposed change-only identify if the customer requires the screen or something on the screen to look a certain way) | 16.1 NONE |

Signatures of Agreement:

(add additional rows if necessary)

BAE:

Lead Analyst:

BAE FUNCTIONAL REQUIREMENT DOCUMENT

Table # 7899A

| | | | |
|---|---|---|---|
| **BAE Start Date:** | 05-08-1998 | **BAE Name:** | Mark Seal |
| **BAE Comp. Date:** | 05-08-1998 | **BAE Tele. No.:** | 205-977-3618 |
| **BAE Hours:** | 7 | **LA Assigned:** | |

CMVC Component Name: JE-EWO/Configuration/Scheduling

Associated Defect/Feature No.:

| | | |
|---|---|---|
| **Target Release:** (give target release this needs to be in) **[Only identify if this is required for an emergency release or must be worked in next scheduled release]** | 2.15 | **Target Release Date:** (give target release date for this enhancement, if required) |

| | |
|---|---|
| **Priority:** (provide priority from 'feature priority' list – number preliminary assigned by SME) | HIGH |

Revision No.: (B, C, etc. – this will require new signatures)
Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Change the configuration process so that each time a job is configured before the price is firmed, the system will reconfigure the entire job.

1.2 Change the configuration process so that when a job is re-configured after the price has been firmed that the system will attempt to place changed and added substeps in the correct existing activity.

1.3 Change the configuration process so that when a substep cannot be placed in an existing activity that the system creates an activity and that activity is inserted into the existing scheduling network, if possible. If not possible, a new scheduling network will be created.

2. Current Problem:

(brief description of what system currently does, what needs to be changed, and why)

2.1 Each time a job is configured after the initial configuration the system creates "NEW" activities for those additional and changed substeps. When a job is re-configured, "NEW" activities are created and they do not schedule.

3. Proposed Solution:

(brief description of what the system will or should do and any general constraints or conditions that limit the 3.1 Eliminate the "N/E" activity flag in the database. This flag identifies a NEW activity verses an EXISTING activity.

3.2 Change the configuration process so that when solution)

a job is re-configured and the price is not firmed the whole job is reconfigured as if it were the first time. This means that the process will re-establish all of the activities, activity dependencies, key dates and CPM dates.

3.3 Change the configuration process so that when a job is re-configured after the price has been firmed any new and/or changed substeps will be inserted into an existing activity based on work type resource group.

3.4 When the work type resource group of an added or changed substep does not exist on an activity within the scheduling network then the system will create a new activity.

3.5 When the system creates an activity it will attempt to insert the activity into the existing scheduling network based on the current business rules associated with using the scheduling sequence codes and work types. If it can't, a new scheduling network will be created for the activity.

4. Change/Addition(s):
(detailed description of change/addition)

4.1 Change the configuration process so that when a job is configured and the price has not been firmed then the configuration process will treat the job as if it has never been configured. This means that the process will establish all of the activities, activity dependencies, key dates, date types and CPM dates.

4.2 Change the configuration process so that when a job is configured and the price has already been firmed the system will recognize any new or changed substep. The system will maintain the existing scheduling network(s) and insert the new or changed substeps into existing activities based on the following business rules.

4.3 Do not change the network key date.

4.4 If the new or changed substep has the same resource group and work type as an existing activity then add the substep to the existing activity.

4.5 If more than one activity has the same work type and resource group assigned then insert the new or changed substep into the first activity found.

4.6 If there are no existing activities with the same work type and resource group then place the new or changed substep in a new activity.

4.7 Place the new activity in the existing scheduling network based on the current business rules associated with work type resource group scheduling sequence codes. If multiple scheduling networks exist then try to insert the new activity in the oldest network first and then the next oldest and so on.

4.8 If the system can't insert the new activity into an existing network then create a new scheduling network.

4.9 Do not add or change key dates, date types and priorities on existing scheduling networks.

4.10 Once all of the new or changed substeps are inserted into an activity if there are any activities that do not have a substep then use the existing business rules to delete the activity and the scheduling network if necessary. See Defect 7987.

4.11 In those cases where substeps are deleted resulting in a need to delete an activity or an entire scheduling network then the existing business rules will apply. See Defect 7987.

5. Performance Requirements:

(list any performance requirements associated with this change) [Identify system response requirements that must be met for user acceptance]

5.1 These changes should result in slightly slower performance during the configuration process which runs in the back ground and should not affect the user.

5.2 These changes should result in slightly better performance for the scheduling module.

6. Dependencies:

(list any defects or features that this enhancement is dependent on or that will be dependent on this feature)

6.1 Defect 7987 This defect corrects the problem of handling activities correctly when no substeps are in the activity.

6.2 Removing the N/E New or Existing flag in the data base will affect management reports.

6.3 Removing the N/E New or Existing flag in the data base will affect the GUI in scheduling and workstation modules.

7. Benefits:

(provide benefits in dollars, reduced headcount, time savings, etc. for doing this work) [This is required to identify any savings that can be attributed this feature for securing budget approval]

7.1 All activities will schedule after the price has been firmed.

7.2 Numerous hours are being spent to handle NEW activities today.

7.3 There will be no need to handle New activities or scheduling networks in order to schedule work.

| 8. Affected Components: | | (check) Yes | No | (check) |
|---|---|---|---|---|
| RTOC Instructions | | | | X |
| HELP | X | | | |
| User Guides | | X | | |
| Testing | | X | | |
| Infra-structure | | | | X |
| Management Reports | | X | | |
| Database | | X | | |

9. Interfaces:

| | |
|---|---|
| (list any legacy or new interface systems impacted by this change) **[Make sure other interface systems are aware of and agree with any requirement change that impacts them before proceeding]** | 9.1 NONE |

| **10. Work-around:** | | **(check)** **Yes** | **(check)** **No** |
|---|---|---|---|
| (is there a temporary work around?) | X | | |
| (describe work around in detail) **[Also identify this in OSPCM 'known problem' document]** | | 10.1 Currently many hours are being spent to handle the NEW activities in order to schedule the work in these activities. This feature will eliminate NEW activities and therefore schedule all work. | |

11. Risks:

(list factors that impact, positive/negative, not doing this change)

11.1 The users will continue to spend many hours handling the NEW activities in order to schedule all work.

12. Business Rules:

(list any business rules or constraints that should apply. If business rules are included in the changes section, identify these with asterisk in bold, *business rule*)

12.1 Change the configuration process so that when a job is configured and the price has already been firmed the system will recognize any new or changed substep.

12.2 The system will maintain the existing scheduling network(s) and insert the new or changed substeps into existing activities based on the following business rules.

- Do not change the network key date.

- If the new or changed substep has the same resource group and work type as an existing activity then add the substep to the existing activity.
- If more than one activity has the same work type and resource group assigned then insert the new or changed substep into the first activity found.
- If there are no existing activities with the same work type and resource group then place the new or changed substep in a new existing activity.
- Place the new activity in the existing scheduling network based on the current business rules associated with work type resource group and scheduling sequence codes. If multiple scheduling networks exist then try to insert the new activity in the oldest network first and then the next oldest and so on.
- If the system can't insert the new activity into an existing network then create a new scheduling network.
- Do not add or change key dates, date types and priorities on existing scheduling networks.
- Once all of the new or changed substeps are inserted into an activity if there are any activities that do not have a substep then use the existing business rules to delete the activity and the scheduling network if necessary. See Defect 7987.
- In those cases where substeps are deleted resulting in a need to delete an activity or an entire scheduling network then the existing business rules will apply. See Defect 7987.

13. Documentation Changes:

| | |
|---|---|
| (list affected documents requiring change) **[Documentation should prepare a checklist covering each document that must be updated for this feature]** | 13.1 User Guides<br>13.2 Help |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 User guides<br>14.2 Help<br>14.3 Job aids<br>14.4 Release Notes<br>14.5 On-Site training |

15. Acceptance Criteria/Test Scenario:

| | |
|---|---|
| (list test scenarios required to test change prior to user acceptance, this can be updated after the detailed design is completed.) REQUIRED **[Tester should prepare checklist based on these test** | 15.1 Encode and configure a new job so that after configuration there are at least 3 activities created with at least 6 substeps in each activity. Do not firm price the job.<br>15.2 Add several new substeps to the job and re-configure the job.<br>15.3 Verify that the whole job re-configured and no NEW activities are created. |

scenarios for documentation on results of tests. These should be in matrix form identified back to the numbering scheme used in these test scenarios]

15.4 Price firm the job.

15.5 Add several new substeps and delete at least 2 substeps and then re-configure the job.

15.6 Verify that no NEW activity has been created.

15.7 Verify that the deleted substeps are not in any activity.

15.8 Verify that the added substps have been inserted into an existing activity.

15.9 Add a new substep that has a work type that does not exist on the job yet.

15.10 Re-configure the job.

15.11 Verify that no NEW activity has been created.

15.12 Verify that a new existing activity has been created and that it has been placed in the scheduling network.

15.13 Verify that the new activity does not affect the existing network key date, date type and priority.

15.14 Delete the substep added on step 15.9 and configure the job.

15.15 Verify that the last activity created was deleted during the last configuration.

| | |
|---|---|
| **16. Attachments:** (copies of screens, reports, etc. before and after proposed change-only identify if the customer requires the screen or something on the screen to look a certain way) | 16.1 NONE |

Signatures of Agreement:
(add additional rows if necessary)

| | |
|---|---|
| **BAE:** | (on file) 5/14/98 |
| **Lead Analyst:** | (on file) 5/14/98 |

BAE FUNCTIONAL REQUIREMENT DOCUMENT

Table # 7947B

| | | | |
|---|---|---|---|
| **BAE Start Date:** | 04/16/1998 | **BAE Name:** | Gail W. Deaton |
| **BAE Comp. Date:** | 04/23/1998 | **BAE Tele. No.:** | 205-977-3615 |
| **BAE Hours:** | 3 | **LA Assigned:** | |

CMVC Component Name: je_ewo

Associated Defect/Feature No.:

| | | | |
|---|---|---|---|
| **Target Release:** (give target release this needs to be in) **[Only identify if this is required for an emergency release or must be worked in next scheduled release]** | 2.14 | **Target Release Date:** (give target release date for this enhancement, if required) | 6/1998 |

Priority:
(provide priority from 'feature priority' list – number preliminary assigned by SME) Hi

Revision No.: (B, C, etc. – this will require new signatures)

Reason for Revision: Walkthru results and change target release

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Make the default for the Est. Comp. Date in job_ewo 120 days from the current date.

2. Current Problem:

(brief description of what system currently does, what needs to be changed, and why)

2.1 Currently the default for the Est. Comp. Date is 30 days from today's date. Designers are not properly changing the date to a realistic date. When the job is FIRMed in Pricing and sent to BCAS the approval date is after the Est. Comp. Date. This is causing BCAS errors to be generated.

3. Proposed Solution:

(brief description of what the system will or should do and any general constraints or conditions that limit the solution)

3.1 Make the default for the Est. Comp. Date in job_ewo 120 days from the current date. This should eliminate most of the BCAS errors.

4. Change/Addition(s):

(detailed description of change/addition)

4.1 The Est. Comp. Date currently defaults to 30 days from the current date. With this feature, this date will default to the current date + 120 days. This will be the default for the creation of EWO and PWO jobs. In addition, when the user selects to clone a job, the Est. Comp. Date will default to the current date + 120 days. The user can change the Est. Comp. Date, but it must be the current date or a future date.

5. Performance Requirements:
(list any performance requirements associated with this change) [Identify system response requirements that must be met for user acceptance]

6. Dependencies:
(list any defects or features that this enhancement is dependent on or that will be dependent on this feature)

7. Benefits:
(provide benefits in dollars, reduced headcount, time savings, etc. for doing this work) [This is required to identify any savings that can be attributed this feature for securing budget approval]

7.1 Eliminates BCAS errors generated to the users. Savings in the time it takes to investigate and correct these errors.

| 8. Affected Components: | | (check) Yes | No | (check) |
|---|---|---|---|---|
| RTOC Instructions | | | | X |
| HELP | X | | | |
| User Guides | | | | X |
| Testing | | X | | |
| Infra-structure | | | | X |
| Management Reports | | | | X |
| Database | | | | X |

9. Interfaces:

(list any legacy or new interface systems impacted by this change) [Make sure other interface systems are aware of and agree with any requirement change that impacts them before proceeding]

| 10. Work-around: | (check) Yes | | (check) No |
|---|---|---|---|
| (is there a temporary work around?) (describe work around in detail) **[Also identify this in OSPCM 'known problem' document]** | | X | |

11. Risks:
(list factors that impact, positive/negative, not doing this change)

11.1 User acceptance and BCAS response.

12. Business Rules:
(list any business rules or constraints that should apply. If business rules are included in the changes section, identify these with asterisk in bold, ***business rule***)

13. Documentation Changes:
(list affected documents requiring change)
[Documentation should prepare a checklist covering each document that must be updated for this feature]

13.1 On Line Help show the default for the Est. Comp. Date is 120 days from the current date. Indicate that this date can be changed by the user.

14. Special Training/Implementation Requirements:

(list any special training/implementation required for this feature. Identify what will be required to train and implement this feature to the customer, i.e., by documentation, e-mail, help, cue cards, on sight training, etc.)

15. Acceptance Criteria/Test Scenario:

| | |
|---|---|
| (list test scenarios required to test change prior to user acceptance, this can be updated after the detailed design is completed.) REQUIRED **[Tester should prepare checklist based on these test scenarios for documentation on results of tests. These should be in matrix form identified back to the numbering scheme used in these test scenarios]** | 15.1<br>Enter a new EWP type job in job_entry. Check to make sure the Est. Comp. Date default is 120 days from today.<br>Enter a new PWO type job in job_entry. Check to make sure the Est. Comp. Date default is 120 days from today.<br>Test to see if the default date of 120 days from today can be changed to the current date or a future date.<br>Enter a past date in the Est. Comp. Date. Verify that an error message is generated.<br>Select the refresh button, the Est. Comp. Date should be reset to the current date + 120 days.<br>15.2<br>Clone a job. Verify that the default Est. Comp. Date is 120 days from the current date. |

16. Attachments:

(copies of screens, reports, etc. before and after proposed change-only identify if the customer requires the screen or something on the screen to look a certain way)

Signatures of Agreement:

(add additional rows if necessary)

BAE:

Lead Analyst:

BAE FUNCTIONAL REQUIREMENT DOCUMENT

Table # 8101A

| | | | |
|---|---|---|---|
| **BAE Start Date:** | 05/18/1998 | **BAE Name:** | Wesley White |
| **BAE Comp. Date:** | 05/18/1998 | **BAE Tele. No.:** | 977-7436 |
| **BAE Hours:** | 1 | **LA Assigned:** | |

CMVC Component Name: Mgmt_reports

Associated Defect/Feature No.: 8101

Target Release:
(give target release this needs to be in) [Only identify if this is required for an emergency release or must be worked in next scheduled release] 2.14

Target Release Date:
(give target release date for this enhancement, if required)

Priority:
(provide priority from 'feature priority' list – number preliminary assigned by SME)

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:
(brief description of change/addition) – This should pretty closely match the abstract in CMVC.

1.1 Add a new variable to indicate if the requested report should be sent directly to the printer or returned to the screen for online viewing.

2. Current Problem:
(brief description of what system currently does, what needs to be changed, and why)

2.1 Currently the user only has the option of printing the report AFTER it has been returned to the screen.

3. Proposed Solution:
(brief description of what the system will or should do and any general constraints or conditions that limit the solution)

3.1 Allow the user the choice of sending the selected report directly to the printer or viewing it online to improve performance. This requires a variable to be passed with the report request.

4. Change/Addition(s):

(detailed description of change/addition)

4.1 When user selects a report vbfile.ftm is created. It is a comma delimited file of the variables the user has selected. Add an additional variable to vbfile.ftm. Add a checkbox to the vb screen with a title of "Send To Printer". If the user checks the checkbox populate a "y" in the variable in vbfile.ftm. If the user does not check the checkbox populate a "n" in vbfile.ftm. The checkbox should work the same as the other prompts on the vb screen. The checkbox should only be activated for reports where the prompt is turned on, by reading the prompts from admin module. Include help file for context # 125500043 to F1 key for field "return after preview".

5. Performance Requirements:

(list any performance requirements associated with this change) [Identify system response requirements that must be met for user acceptance]

5.1 Performance of the Management Reports application should be improved because the user won't have to wait for the report to be returned to the screen if they only want to print a copy of the report.

6. Dependencies:

(list any defects or features that this enhancement is dependent on or that will be dependent on this feature)

6.1 NONE

7. Benefits:

(provide benefits in dollars, reduced headcount, time savings, etc. for doing this work) [This is required to identify any savings that can be attributed this feature for securing budget approval]

7.1 The user won't have to wait for the report to be returned to the screen if they only want to print a copy of the report.

| **8. Affected Components:** | | **(check)** **Yes** | No | **(check)** |
|---|---|---|---|---|
| **RTOC Instructions** | | | | **X** |
| **HELP** | X | | | |
| **User Guides** | | **X** | | |
| **Testing** | | **X** | | |
| **Infra-structure** | | | | **X** |
| **Management Reports** | | **X** | | |
| **Database** | | | | **X** |

9. Interfaces:

(list any legacy or new interface systems impacted by this change) [Make sure other interface systems are aware of and agree with any requirement change that impacts them before proceeding]

9.1 NONE

10. Work-around:

| | (check) Yes | (check) No |
|---|---|---|
| (is there a temporary work around?) | | X |
| (describe work around in detail) **[Also identify this in OSPCM 'known problem' document]** | | |

11. Risks:

(list factors that impact, positive/negative, not doing this change)

11.1 If feature is not worked poor performance of mgmt reports will continue. User will have to wait until report is formatted to screen before choosing to print the report.

12. Business Rules:

(list any business rules or constraints that should apply. If business rules are included in the changes section, identify these with asterisk in bold, ***business rule***)

12.1 When the Send to Printer check box is activated a variable of Y should be written to the vbfile file. If the send to printer check box is not checked a N should be written to the file. The Send to printer check box should only be activated if specified for the particular report being run.

13. Documentation Changes:

| | |
|---|---|
| (list affected documents requiring change) **[Documentation should prepare a checklist covering each document that must be updated for this feature]** | 13.1 Management Reports, Online Help and User Guide |

14 Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 Release Notes |

15. Acceptance Criteria/Test Scenario:

| | |
|---|---|
| (list test scenarios required to test change prior to user acceptance, this can be updated after the detailed design is completed.) REQUIRED [Tester should prepare checklist based on these test scenarios for documentation on results of tests. These should be in matrix form identified back to the numbering scheme used in these test scenarios] | 15.1 1.)Verify that you can turn the check-box off and on for various reports, 2.) request a report and send it directly to the printer and 3.) request a report and view it on-line as is currently designed 4.) verify help works for return after preview and send to printer. |

16. Attachments:

(copies of screens, reports, etc. before and after proposed change-only identify if the customer requires the screen or something on the screen to look a certain way)

Signatures of Agreement:
(add additional rows if necessary)

| | |
|---|---|
| **BAE:** | (on file) 5/28/98 |
| **Lead Analyst:** | (on file) 5/28/98 |

BAE FUNCTIONAL REQUIREMENT DOCUMENT

Table # 8102B

| | | | |
|---|---|---|---|
| **BAE Start Date:** | 05/18/1998 | **BAE Name:** | Wesley White |
| **BAE Comp. Date:** | 05/30/1998 | **BAE Tele. No.:** | 977-7436 |
| **BAE Hours:** | 3 | **LA Assigned:** | |

CMVC Component Name: Pricing, job entry, management reports

Associated Defect/Feature No.: 8102

Target Release: (give target release this needs to be in) [Only identify if this is required for an emergency release or must be worked in next scheduled release]

Target Release Date: (give target release date for this enhancement, if required)

Priority: (provide priority from 'feature priority' list – number preliminary assigned by SME)

| | | |
|---|---|---|
| **Revision No.:** | B | (B, C, etc. – this will require new signatures) |
| **Reason for Revision:** | Add additional functionality | |

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1. Capture initial approval date and original sti_time_qty to create "Encoding Audit Report". BUFIT file to gain shar m asur ments group.

Definitions:

a) Initial approval date – the date the first time the job is firmed in ospcm
b) Original sti_time_qty – amount of sti_time_qty on substep at initial approval date
c) Actual sti_time_qty – the amount in the sti_time_qty field on a substep as it exists now.
d) Period of batch process – time period the batch process is being run for, the process needs to run at least once a month to calculate a months worth of data. For example, the process might run on 1st to calculate amounts on all completed and cancelled substeps from the 1st to the 31st of the previous month. It should retain a rolling 12 months data.

2. Current Problem:

(brief description of what system currently does, what needs to be changed, and why)

2.1 Currently the system overwrites the approval date each time the job is firmed, and the system overwrites the sti_time_qty for a substep each time a job is reconfigured and changes that affect the substep_sti quantity have been made. The users cannot determine which steps are added after the first approval and cannot tell how much change there may be in sti_time_qty from time of encoding to completion. The users need the data to create the "Encoding Audit Report". The gain share group needs a file to be bufited to them for loading into their database. The dollars spent on EXHB L001A and E001A CWIs must be tracked for use in gain share measurement.

3. Proposed Solution:

(brief description of what the system will or should do and any general constraints or conditions that limit the solution)

3.1 Add database fields to capture

A.) "initial approval date" of job

B.) "original sti_time_qty" for all substeps on a job at time of approval.

3.2 Create batch process to calculate percent difference between sum of "original sti_time_qty" and sum of "actual sti_time_qty" for all substeps completed or canceled for "period of batch process". The sti fields should be summed first on all substeps within an rc_cd and wirecenter then the difference calculated.

3.3 BUFIT a copy of file that will be updated in new database to the gain share group.

4. Change/Addition(s):

(detailed description of change/addition)

4.1 JOB ENTRY

A.) create new field to capture "original sti_time_qty"

B.) When a substep is entered in job_entry the "original sti_time_qty" should be populated with 0

C.) When an existing substep is updated in job entry the process should not repopulate "original sti_time_qty"

D.) The "actual sti_time_qty" field should work as it currently does

E.) Add a date of deletion field to the database. Populate the field with the current date when a substep is canceled or deleted.

4.2 PRICING

A.) Capture "initial approval date" of job – this date should be captured in pricing at the time the job is firmed. The existing approval date field should not change and should continue to function as it currently does.

B.) On clicking the firm button the process should check to see if "initial approval date" is populated.

1. If "initial approval date" is not populated populate the current approval_dt field and a.) populate "initial approval date" field with the approval date b.) copy sti_time_qty on all existing substeps to "original sti_time_qty"

2. If "initial approval date" is populated a.) populate current approval date field and do not repopulate "initial approval date"

b.) do not repopulate "original sti_time_qty"

4.3 MANAGEMENT REPORTS

A.) Create batch process to capture:

1. "original sti_time_qty"
2. "Actual sti_time_qty"
3. PERCENT Difference between "original sti_time_qty" and "actual_time_qty" completed or canceled substeps during "period of batch run"
4. CMC of job of substep
5. Rc_cd of resid of substep
6. Wirecenter of substep
7. Total # of complete substeps for rc_cd and wirecenter for period of batch run
8. Month/year of completion for substeps for which batch process is being run
9. Total dollars spent on L001A Exhibit B
10. Total dollars spent on E001A Exhibit B SEE ATTACHED FOR 9 and 10

B. Data should be stored by CMC, by Wirecenter, by rc_cd

C. Data should be calculated only for EWO jobs and PWO jobs where the fourth digit of the job_nbr is an 'E'. Exclude exhibit B work xc pt for calculating total dollars spent on completed EXHB sust ps with L001A and E001A CWIs during the period of the batch run.

D. Data should only contain jobs that are approved.

E. Data should contain only substeps complete, canceled, or deleted during period of batch run.

F. Batch run should run at least once a month to calculate the full previous months data.

G. A flat file should be bufited to the gain share group each time the process is run and contain the information that will be populated in the batch process table. Using a numbering scheme for the file so that the bufit group can determine which server and when the file was sent, such as AL271498

H. The should retain a rolling 12 month data.

5. Performance Requirements:

(list any performance requirements associated with this change) [Identify system response requirements that must be met for user acceptance]

5.1 Performance should be improved because batch process will calculate data faster than focus.

6. Dependencies:

(list any defects or features that this enhancement is dependent on or that will be dependent on this feature)

6.1 NONE

7. Benefits:

(provide benefits in dollars, reduced headcount, time savings, etc. for doing this work) [This is required to identify any savings that can be attributed this feature for securing budget approval]

7.1 Currently some of this data cannot be calculated and requires manual effort to calculate this process will reduce effort needed to calculate this information.

| **8. Affected Components:** | | **(check)** | | **(check)** |
|---|---|---|---|---|
| | | **Yes** | No | |
| **RTOC Instructions** | X | | | |
| **HELP** | X | | | |
| **User Guides** | | **X** | | |
| **Testing** | | **X** | | |
| **Infra-structure** | | **X** | | |
| **Management Reports** | | **X** | | |
| **Database** | | **X** | | |

9. Interfaces:

(list any legacy or new interface systems impacted by this change) [Make sure other interface systems are aware of and agree with any requirement change that impacts them before proceeding]

9.1 NONE

| **10. Work-around:** | **(check)** | **(check)** |
|---|---|---|
| | **Yes** | **No** |
| (is there a temporary work around?) | | X |

(describe work around in detail) [Also identify this in OSPCM 'known problem' document]

11. Risks:

(list factors that impact, positive/negative, not doing this change)

11.1 Improved performance and ability to calculate information not currently in system.

12. Business Rules:

(list any business rules or constraints that should apply. If business rules are included in the changes section, identify these with asterisk in bold, *business rule*)

12.1 JOB ENTRY

A.) create new field to capture "original sti_time_qty"

B.) When a substep is entered in job_entry the "original sti_time_qty" should be populated with 0

C.) When an existing substep is updated in job entry the process should not repopulate "original sti_time_qty"

D.) The "actual sti_time_qty" field should work as it currently does

E.) Add a date of deletion field to the database. Populate the field with the current date when a substep is canceled or deleted.

12.2 PRICING

A.) Capture "initial approval date" of job – this date should be captured in pricing at the time the job is firmed. The existing approval date field should not change and should continue to function as it currently does.

B.) On clicking the firm button the process should check to see if "initial approval date" is populated.

1. If "initial approval date" is not populated a.) populate the current approval_dt field and populate "initial approval date" field with the approval date b.) copy sti_time_qty on all existing substeps to "original sti_time_qty"

2. If "initial approval date" is populated a.) populate current approval date field and do not repopulate "initial approval date"

b.) do not repopulate "original sti_time_qty"

12.3 MANAGEMENT REPORTS

A.) Create batch process to capture:

1. "original sti_time_qty"
2. "Actual sti_time_qty"
3. PERCENT Difference between "original sti_time_qty" and "actual_time_qty" completed or canceled substeps during "period of batch run"
4. CMC of job of substep
5. Rc_cd of resid of substep
6. Wirecenter of substep
7. Total # of complete subteps for rc_cd and wirecenter for period of batch run
8. Month/year of completion for substeps for which batch process is being run
9. Total dollars spent on L001A Exhibit B
10. Total dollars spent on E001A Exhibit B

SEE ATTACHED FOR 9 and 10

B.) Data should be stored by CMC, by Wirecenter, by rc_cd

C.) Data should be calculated only for EWO jobs and PWO jobs where the fourth digit of the job_nbr is an 'E'. Exclude exhibit B work except for calculating total dollars spent on completed EXHB substeps with L001A and E001A CWIs during the period of the batch run.

D.) Data should only contain jobs that are approved.

E.) Data should contain only substeps complete, canceled, or deleted during period of batch run.

F.) Batch run should run at least once a month to calculate the full previous months data G.) The should retain a rolling 12 months data.

13. Documentation Changes:

| | |
|---|---|
| (list affected documents requiring change) **[Documentation should prepare a checklist covering each document that must be updated for this feature]** | 13.1 user guides for mgmt_reports, rtoc instructions for batch process |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 release notes, rtoc instructions |

15 Acceptance Criteria/Test Scenario:

| | |
|---|---|
| (list any special training/implementation required for this feature. Identify what will be required to train and implement this feature to the customer, i.e., by documentation, e-mail, help, cue cards, on sight training, etc.) | 15.1 JOB ENTRY<br>A.) create new field to capture "original sti_time_qty"<br>B.) When a substep is entered in job_entry the "original sti_time_qty" should be populated with 0<br>C.) When an existing substep is updated in job entry the process should not repopulate "original sti_time_qty" verify "original sti_time_qty" field is not affected by update<br>D.) The "actual sti_time_qty" field should work as it currently does<br>E.) Date Deleted field should be populated if a substep is canceled or deleted.<br>15.2 PRICING<br>A.) Create "initial approval date" field in database field should exist in database<br>B.) Capture "initial approval date" of job – this date should be captured in pricing at the time the job is firmed. The existing approval date field should not change and should |

continue to function as it currently does. Verify existing approval date field works as it currently does.

C.) On clicking the firm button the process should check to see if "initial approval date" is populated.

1. If "initial approval date" is not populated a.) populate the current approval_dt field and populate "initial approval date" field with the approval date.

b.) Copy sti_time_qty on all existing substeps to "original sti_time_qty"
   Verify if initial approval date is not populated that it gets populated with the approval date when the job is firmed. Verify that the original sti_time_qty field is populated with sti-time-qty when job is firmed.

2. if "initial approval date" is populated a.) populate current approval date field and do not repopulate "initial approval date"

b.) do not repopulate "original sti_time_qty"
   Verify that if initial approval date is populated that if job is refirmed that initial approval date is not overwritten. Verify that the original sti-time-qty fields are not overwritten 15.3 MANAGEMENT REPORTS A.) Create batch process to capture:

1. "original sti_time_qty"
2. "Actual sti_time_qty"
3. PERCENT Difference between "original sti_time_qty" and "actual_time_qty" completed or canceled substeps during "period of batch run"
4. CMC of job of substep
5. Rc_cd of resid of substep
6. Wirecenter of substep 7. Total # of complete substeps for rc_cd for period of batch run
8. Month of completion for substeps for which batch process is being run B.) Data should be stored by CMC, by Wirecenter, by rc_cd C.) Data should be calculated only for EWO and EWO jobs and PWO jobs where the fourth digit of the job_nbr is an 'E'. Exclude exhibit B work except for calculating total dollars spent on completed EXHB substeps with L001A and E001A CWIs during the period of the batch run.

D.) Data should only contain jobs that have an approval_dt

E.) Data should contain only substeps complete or canceled during period of batch run. Batch run should run at least once a month to calculate the full previous months data.

F.) A flat file should be bufited to the gain share group each time the process is run and contain the information that will be populated in the batch process table. Using a numbering scheme for the file so that the bufit group can determine which server and when the file was sent, such as AL271498.

should store data as described above.

16. Attachments:

| | |
|---|---|
| (copies of screens, reports, etc. before and after proposed change-only identify if the customer requires the screen or something on the screen to look a certain way) | 16.1 NONE |

Signatures of Agreement:
(add additional rows if necessary)

| | |
|---|---|
| **BAE:** | (on file) 7/17/98 |
| **Lead Analyst:** | (on file) 7/17/98 |

BAE FUNCTIONAL REQUIREMENT DOCUMENT

Table # 8192A

| | | | |
|---|---|---|---|
| **BAE Start Date:** | 06/15/98 | **BAE Name:** | Steve Kaminski |
| **BAE Comp. Date:** | 06/19/98 | **BAE Tele. No.:** | 977-2646 |
| **BAE Hours:** | 4 | **LA Assigned:** | |

CMVC Component Name: All OSPCM Applications

Associated Defect/Feature No.: NA

Target Release:
(give target release this needs to be in) [Only identify if this is required for an emergency release or must be worked in next scheduled release] 2.15

Target Release Date:
(give target release date for this enhancement, if required)

Priority:
(provide priority from 'feature priority' list – number preliminary assigned by SME)

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:
(brief description of change/addition) – This should pretty closely match the abstract in CMVC.

1.1 This is a simple feature that adds a macro to each current HLP file within OSPCM allowing the user to access the OSPCM web site. The user would select various jump-links within a HLP file to display a job aid, OSPCM Product Bulletin, or specific document web page for an OSPCM User Guide from the OSPCM web site.

2. Current Problem:
(brief description of what system currently does, what needs to be changed, and why)

2.1 The OSPCM web site is used to store most user documentation for OSPCM. This documentation consists of user guides, job aids, known workarounds and product bulletins. A user may or may not know what information is contained on this web site. As a result users are not using the web as much as they should or if they are they must access the OSPCM web site and search the associated pages for the documentation.

3. Proposed Solution:
(brief description of what the system will or should do and any general constraints or conditions that limit the solution)

3.1 The proposed solution provides quick access to the OSPCM web site from the online help (which is already part of an OSPCM application). Specific links can be provided that the user can select and go straight to the web site information.

For example, if a user is on the Splicing Tab for the Job Entry application and accesses the online help for information, there will be a link to the web site stating "For further information about encoding underground splicing work click here to display the Job Aid information."

4. Change/Addition(s):

(detailed description of change/addition)

4.1 Create a new macro that contains the command script and appropriate parameters. (The macro command is the same, the only parameter change is the actual web site address such as ("ttp:/ospcm.bst.bls.com"or "http:/ospcm.bst.blx.com/pages/ospdocs.htm#jobaid")

4.2 Add one new DLL INETWH16 (provided with the RoboHelp product) to access the web site from the online help.

4.3 Add macro routine to the Configuration section of the project file (HPJ) within each HLP file.

4.4 Add a standard OSPCM web icon (to jump to the web site) to each application's contents help topic.

4.5 Add a "shortcut" icon for appropriate jumps to job aids, user guides, and product bulletins within each help file of an application.

4.6 Add key word of "web" to any jumps to the web for search capability.

4.7 Update How to Use OSPCM Help topic to include instructions on accessing the web site from the help file.

4.8 Add new DLL INETWH16 to CMVC Help component. This DLL must be included in the Help directory for the OSPCM build package.

5. Performance Requirements:

| | |
|---|---|
| (list any performance requirements associated with this change) **[Identify system response requirements that must be met for user acceptance]** | 5.1 There will be no impact on performance to any OSPCM applications as a result of this feature. |

6. Dependencies:

| | |
|---|---|
| (list any defects or features that this enhancement is dependent on or that will be dependent on this feature) | 6.1 NONE |

7. Benefits:

| | |
|---|---|
| (provide benefits in dollars, reduced headcount, time savings, etc. for doing this work) **[This is required to identify any savings that can be attributed this feature for securing budget approval]** | 7.1 Provides the user with direct access to current updated OSPCM documentation.<br>7.2 Speeds up user tasks when information is readily available such as going to the Job Aid when encoding underground splicing work. |

| 8. Affected Components: | | (check) Yes | No | (check) |
|---|---|---|---|---|
| RTOC Instructions | | | | |
| HELP | X | | | |
| User Guides | | X | | |
| Testing | | X | | |
| Infra-structure | | | | |
| Management Reports | | | | |
| Database | | | | |

| 9. Interfaces: | |
|---|---|
| (list any legacy or new interface systems impacted by this change) **[Make sure other interface systems are aware of and agree with any requirement change that impacts them before proceeding]** | 9.1 Need to coordinate with the OSPCM Web Master for any changes or additions to the current page/web structure. For example, if there is a jump to a job aid on the Documentation page and a new page was developed for only job aids, there could be a corrupted link from the online help. |

| 10. Work-around: | | (check) Yes | (check) No |
|---|---|---|---|
| (is there a temporary work around?) | X | | |
| (describe work around in detail) **[Also identify this in OSPCM 'known problem' document]** | | 10.1 User would have to access the OSPCM web site from outside the OSPCM application and search for the appropriate information. | |

11. Risks:

(list factors that impact, positive/negative, not doing this change)

11.1 A user may not know what information is contained on the OSPCM web site.

12. Business Rules:

(list any business rules or constraints that should apply. If business rules are included in the changes section, identify these with asterisk in bold, *business rule*)

Currently all BellSouth terminals are required to have Netscape as part of their standard load.

12.1 Add to the How to Use OSPCM Help topic, information about having Netscape installed in order to access the OSPCM web site.

12.2 Create a pop-up for the following words "OSPCM web site." This pop-up will display the following text when a user places their cursor on these words (which will be in green and underlined) "You must have Netscape installed in order to access the OSPCM web site."

12.3 In the event that a terminal does not have Netscape (or any other web browser) and the user selects an Internet jump/link then an error message will pop up stating that the "Routine was not found." They click OK and can continue onto their next task. This is a standard Microsoft error message for this type of occurrence.

13. Documentation Changes:

| | |
|---|---|
| (list affected documents requiring change) **[Documentation should prepare a checklist covering each document that must be updated for this feature]** | 13.1 Online Help<br>13.2 Overview chapters of user guides about online help<br>13.3 System Overview Guide section about accessing the web site. |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 Add statement to the main OSPCM home page introducing this new feature.<br>14.2 Add instructions to the How to Use OSPCM Help topic to include accessing the OSPCM web site. |

15. Acceptance Criteria/Test Scenario:

| | |
|---|---|
| (list test scenarios required to test change prior to user acceptance, this can be | For each application:<br>15.1 Access the OSPCM Guide.<br>15.1.1 Select an application. |

| | |
|---|---|
| updated after the detailed design is completed.) **REQUIRED [Tester should prepare checklist based on these test scenarios for documentation on results of tests. These should be in matrix form identified back to the numbering scheme used in these test scenarios]** | 15.2 Select the Help icon from the toolbar.<br>15.2.1 Select the OSPCM web site icon.<br>15.2.2 View the web page contents.<br>15.2.3 Exit web site and return to application.<br>15.3 Select the Help Contents menu item from the Help menu.<br>15.1.1 Select Search button and type "web" as the search word.<br>15.1.2 Select the Show Topics button.<br>15.1.3 Select a web jump topic.<br>15.2 Double-click the web jump from the Help topic.<br>15.2.1 View the web page contents.<br>15.2.2 Exit the web site and return to the application. |

16. Attachments:

| | |
|---|---|
| (copies of screens, reports, etc. before and after proposed change-only identify if the customer requires the screen or something on the screen to look a certain way | 16.1 NONE |

Signatures of Agreement:

(add additional rows if necessary)

| | |
|---|---|
| BAE: | (on file) 6/23/98 |
| Lead Analyst: | (on file) 6/23/98 |

BAE FUNCTIONAL REQUIREMENT DOCUMENT

Table # 7341B

| | | | |
|---|---|---|---|
| **BAE Start Date:** | 04/07/1998 | **BAE Name:** | Mark Seal |
| **BAE Comp. Date:** | 04/15/1998 | **BAE Tele. No.:** | 205-977-3618 |
| **BAE Hours:** | 4 hours | **LA Assigned:** | |

CMVC Component Name: Scheduling

Associated Defect/Feature No.:

| | | |
|---|---|---|
| **Target Release:** (give target release this needs to be in) **[Only identify if this is required for an emergency release or must be worked in next scheduled release]** | 2.12 | **Target Release Date:** (give target release date for this enhancement, if required) |

| | |
|---|---|
| **Priority:** (provide priority from 'feature priority' list – number preliminary assigned by SME) | 7 |

Revision No.: (B, C, etc. – this will require new signatures)

Reason for Revision: B...Revised spec to delete the workstation changed because this functionality already exists in workstation.

General:

(General Information – nothing is to be typed here, this is for information only about the functional spec process)

1. The purpose of this document is to provide the customer's view of the <u>functionality</u> that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Need to add ability to create and clear roadblocks on the activity mtce screen in scheduling.

1.2 NOTE: This change will require less than 40 hours of work and therefore will not require a detail design document.

2. Current Problem:

(brief description of what system currently does, what needs to be changed, and why)

2.1 User cannot create or clear roadblocks from the activity mtce screen in scheduling.. Screens are inconsistent.

3. Proposed Solution:

(brief description of what the system will or should do and any general constraints or conditions that limit the solution)

3.1 Allow the user to create and clear roadblocks on the activity mtce screen in scheduling. Make the roadblock screen look and work the same in both scheduling and workstation.

4. Change/Addition(s):

(detailed description of change/addition)

4.1 Scheduling module:

Currently, on the activity mtce screen, if a roadblock exists on an activity and the user selects the activity and clicks on the roadblock button on the tool bar, then the roadblock screen is displayed with the roadblock data. Change the system so that the user can create or clear roadblocks on substeps. When a user selects a substep and clicks on the roadblock screen is displayed with any existing roadblock data. If there is no roadblock data then the screen will display with no data. The user will have the ability to create a roadblock or clear any existing roadblocks. This functionality exists in workstation today and can be used in the scheduling module.

5. Performance Requirements:

| | |
|---|---|
| (list any performance requirements associated with this change) **[Identify system response requirements that must be met for user acceptance]** | 5.1 There should be no change in performance due to this change. |

6. Dependencies:

| | |
|---|---|
| (list any defects or features that this enhancement is dependent on or that will be dependent on this feature) | 6.1 NONE |

7. Benefits:

(provide benefits in dollars, reduced headcount, time savings, etc. for doing this work) [This is required to identify any savings that can be attributed this feature for securing budget approval]

7.1 This will allow the user responsible for scheduling to create, view and clear roadblocks when in the scheduling module.

| **8. Affected Components:** | | **(check)** **Yes** | No | **(check)** |
|---|---|---|---|---|
| **RTOC Instructions** | | | | **X** |
| **HELP** | X | | | |
| **User Guides** | | **X** | | |
| **Testing** | | **X** | | |
| **Infra-structure** | | **X** | | |
| **Management Reports** | | | | **X** |
| **Database** | | | | **X** |

9. Interfaces:

(list any legacy or new interface systems impacted by this change) [Make sure other interface systems are aware of and agree with any requirement change that impacts them before proceeding]

9.1 NONE

| | (check) Yes | (check) No |
|---|---|---|
| **10. Work-around:** (is there a temporary work around?) (describe work around in detail) **[Also identify this in OSPCM 'known problem' document]** | | X |

11. Risks:

(list factors that impact, positive/negative, not doing this change)

11.1 Users responsible for scheduling are not creating roadblocks because it currently requires that the scheduling module be closed and another module opened to create roadblocks. The schedule becomes inaccurate and roadblocked work is being scheduled incorrectly.

12. Business Rules:

(list any business rules or constraints that should apply. If business rules are included in the changes section, identify these with asterisk in bold, ***business rule***)

12.1 Users should not be able to delete a roadblock. If a roadblock is entered in error then the user should clear the roadblock.

12.2 When a substep is completed by the user and a roadblock exists on the substep then the system should clear the roadblock automatically.

13. Document Changes:

| | |
|---|---|
| (list affected documents requiring change) **[Documentation should prepare a checklist covering each document that must be updated for this feature]** | 13.1 Scheduling user guide<br>13.2 Help for the activity mtce screen in the scheduling module. |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 NONE |

15. Acceptance Criteria/Test Scenario:

| | |
|---|---|
| (list test scenarios required to test change prior to user acceptance, this can be updated after the detailed design is completed.) **<u>REQUIRED</u> [Tester should prepare checklist based on these test scenarios for** | 15.1 Scheduling module<br>• Access the activity mtce screen for a job.<br>• Select a substep that has no existing roadblock and click the roadblock button.<br>• The roadblock screen should open.<br>• Add a roadblock to the substep and click OK<br>• Re-open the roadblock screen to verify that the new roadblock exists.<br>• Repeat this scenario creating and clearing critical and non- |

| | |
|---|---|
| **documentation on results of tests. These should be in matrix form identified back to the numbering scheme used in these test scenarios]** | critical roadblocks.<br>• Verify that multiple roadblocks can be entered on a single substep<br>• Verify that when completing a substep in workstation or Billing and Reporting that the roadblocks are automatically cleared by the system. |
| **16. Attachments:**<br>(copies of screens, reports, etc. before and after proposed change-only identify if the customer requires the screen or something on the screen to look a certain way) | 16.1 NONE |

Signatures of Agreement:

(add additional rows if necessary)

BAE:

Lead Analyst:

BAE FUNCTIONAL REQUIREMENT DOCUMENT

Table # 7342a

| | | | |
|---|---|---|---|
| **BAE Start Date:** | 04/08/1998 | **BAE Name:** | Mark Seal |
| **BAE Comp. Date:** | 04/08/1998 | **BAE Tele. No.:** | 205-977-3618 |
| **BAE Hours:** | 3 | **LA Assigned:** | |

CMVC Component Name: Scheduling

Associated Defect/Feature No.:

| | | |
|---|---|---|
| **Target Release:** (give target release this needs to be in) **[Only identify if this is required for an emergency release or must be worked in next scheduled release]** | 2.15 | **Target Release Date:** (give target release date for this enhancement, if required) |

| | |
|---|---|
| **Priority:** (provide priority from 'feature priority' list – number preliminary assigned by SME) | HIGH |

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Allow the user to request, display and print the scheduling diagnostic report for a single job.

2. Current Problem:

(brief description of what system currently does, what needs to be changed, and why)

2.1 Currently to check the scheduling diagnostic report to determine why an activity was delayed or did not schedule at all, the user must request the entire report which is for every job in the scheduling area.

3. Proposed Solution:

(brief description of what the system will or should do and any general constraints or conditions that limit the solution)

3.1 Allow the user to request, display and print the scheduling diagnostic report for a single job.

4. Change/Addition(s):

(detailed description of change/addition)

4.1 When the user selects the Scheduling diagnostic report from the print or print preview buttons, the system will display a dialog box. The user will have the option to select "ALL" or enter a job name in the dialog box.

4.2 When the user enters a job name and if the scheduling process generated data for the scheduling diagnostic report then only that job name will be on the report.

4.3 If the job name is not on the report then a message should be displayed that says that the job is not on the scheduling diagnostic report.

4.4 When the user selects "ALL" from the dialog box then the entire report will be displayed or printed appropriately.

5. Performance Requirements:

| | |
|---|---|
| (list any performance requirements associated with this change) [Identify system response requirements that must be met for user acceptance] | 5.1 There should be no change in system performance due to this feature. |

6. Dependencies

| | |
|---|---|
| (list any defects or features that this enhancement is dependent on or that will be dependent on this feature) | 6.1 NONE |

7. Benefits:

| | |
|---|---|
| (provide benefits in dollars, reduced headcount, time savings, etc. for doing this work) **[This is required to identify any savings that can be attributed this feature for securing budget approval]** | 7.1 This will save the user time when investigating only one job. This will also reduce system processing time to retrieve and display the entire report. |

| 8. Affected Components: | | (check) | | (check) |
|---|---|---|---|---|
| | | Yes | No | |
| RTOC Instructions | | | | X |
| HELP | X | | | |
| User Guides | | X | | |
| Testing | | X | | |
| Infra-structure | | | | X |
| Management Reports | | | | X |
| Database | | | | X |

| | |
|---|---|
| **9. Interfaces:** | |
| (list any legacy or new interface systems impacted by this change) **[Make sure other interface systems are aware of and agree with any requirement change that impacts them before proceeding]** | 9.1 NONE |

| 10. Work-around: | (check) | | (check) |
|---|---|---|---|
| | Yes | | No |
| (is there a temporary work around?) | | X | |
| (describe work around in detail) **[Also identify this in OSPCM 'known problem' document]** | | | |

11. Risks:

| | |
|---|---|
| (list factors that impact, positive/negative, not doing this change) | 11.1 If this change is not implemented the user will continue to spend time going through the entire report instead of only one job. |

12. Business Rules:

| | |
|---|---|
| (list any business rules or constraints that should apply. If business rules are included in the changes section, identify these with asterisk in bold, ***business rule***) | 12.1 Job number is actually job name.<br>12.2 Job name must have information on the report.<br>12.3 When the user selects "ALL" from the dialog box then the entire report will be displayed or printed appropriately.<br>12.4 Only job names that existed when the last schedule run took place will be on the diagnostic report. |

13. Document Changes:

| | |
|---|---|
| (list affected documents requiring change) **[Documentation should prepare a checklist covering each document that must be updated for this feature]** | 13.1 Scheduling user guides and help. |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 NONE |

15. Acceptance Criteria/Test Scenario:

| | |
|---|---|
| (list test scenarios required to test change prior to user acceptance, this can be updated after the detailed design is completed.) <u>**REQUIRED**</u> **[Tester should prepare checklist based on these test scenarios for** | 15.1<br>• Go to the scheduling desk top<br>• Click on the print report button on the tool bar<br>• The report menu should display<br>• Select the scheduling diagnostic report<br>• A dialog box should be displayed<br>• Enter a valid job name for a job that should be on the report and click OK<br>• The report should print with only the information for the job |

documentation on results of tests. These should be in matrix form identified back to the numbering scheme used in these test scenarios]

name entered 15.2

- Go to the scheduling desk top
- Click on the print report button on the tool bar
- The report menu should display
- Select the scheduling diagnostic report
- A dialog box should be displayed
- Select "ALL" click OK
- The entire scheduling diagnostic report should print 15.3

- Go to the scheduling desk top
- Click on the print report button on the tool bar
- The report menu should display
- Select the scheduling diagnostic report
- A dialog box should be displayed
- Enter a valid job name for a job that should NOT be on the report
- A message should display saying that this job number is not on the scheduling diagnostic report.

15.4

- Go to the scheduling desk top
- Click on the print preview button on the tool bar
- The report menu should display
- Select the scheduling diagnostic report
- A dialog box should be displayed
- Enter a valid job name for a job that should be on the report and click OK
- The report should display with only the information for the job name entered 15.5

- Go to the scheduling desk top
- Click on the print preview button on the tool bar
- The report menu should display
- Select the scheduling diagnostic report
- A dialog box should be displayed
- Select "ALL" and click OK
- The entire scheduling diagnostic report should display.

15.6

- Go to the scheduling desk top
- Click on the print preview button on the tool bar
- The report menu should display
- Select the scheduling diagnostic report
- A dialog box should be displayed
- Enter a valid job name for a job that should NOT be on the report
- A message should display saying that this job is not on the scheduling diagnostic report.

15.7

- Go to job entry and change the name of a job that should be on the scheduling diagnostic report and save
- Go to the scheduling desk top
- Click on the print preview button on the tool bar
- The report menu should display
- Select the scheduling diagnostic report
- A dialog box should be displayed
- Enter the new job name for the job changed in job entry
- A message should display saying that this job is not on the scheduling diagnostic report
- NOTE: Only job names that existed when the last schedule run took place will be on the diagnostic report 15.8

- Go to the scheduling desk top
- Click on the print button on the tool bar
- The report menu should display
- Select the scheduling diagnostic report
- A dialog box should be displayed
- Enter the new job name for the job changed in job entry
- A message should display saying that this job is not on the scheduling diagnostic report
- NOTE: Only job names that existed when the last schedule run took place will be on the diagnostic report

16. Attachments:

(copies of screens, reports, etc. before and after proposed change-only identify if the customer requires the screen or something on the screen to look a certain way)

16.1 NONE

Signatures of Agreement:

(add additional rows if necessary)

| | |
|---|---|
| BAE: | (on file) 5/14/98 |
| Lead Analyst: | (on file) 5/14/98 |

BAE FUNCTIONAL REQUIREMENT DOCUMENT

Table # 7376B

| | | | |
|---|---|---|---|
| **BAE Start Date:** | December 8, 1997 | **BAE Name:** | Carol A. Brechtel |
| **BAE Comp. Date:** | February 24, 1998 | **BAE Tele. No.:** | 205-977-3611 |
| **BAE Hours:** | 2.5 hours | **LA Assigned:** | |

CMVC Component Name: MATMGMT

Associated Defect/Feature No.: None

Target Release:
(give target release this needs to be in) [Only identify if this is required for an emergency release or must be worked in next scheduled release]

Target Release Date:
(give target release date for this enhancement, if required)

Priority:
(provide priority from 'feature priority' list – number preliminary assigned by SME)

Priority XX

Revision No.: 7376B (B, C, etc. – this will require new signatures)

Reason for Revision: The Due Date should only default to blanks/nulls if the system generated due date is less than tomorrow or blank.

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Allow the user to change the Due Date on an order on the "Generate Order for Job XXX" main window.

1.2 Hide/Remove the Due Date on the Order Option Tab 1.3 Default the Due Date field to nulls/blanks if the system generated Due Date is less than or equal to tomorrow; otherwise use the calculated date.

1.4 Due Date field is a required field – require the user to populate the field before sending the order to OrderMaster.

2. Current Problem:

(brief description of what system currently does, what needs to be changed, and why)

2.1 To change the Due Date on an order the user must select the Order Options Tab on the "Generate Order for Job XX" window and make the date change on the tab. The user would like the capability to change the Due Date on the main window.

2.2 The due date defaults to the date generated when the job was scheduled. If the date is blank the due date defaults to today + one day. The system should be enhanced to require the user to enter a due date if the system generated Due Date is less than or equal to tomorrow; otherwise use the calculated due date. If the system generated Due Date is greater than tomorrow populate the Due Date field with that date.

2.3 The due date field should be a required field before the order can be sent to OrderMaster

3. Proposed Solution:
(brief description of what the system will or should do and any general constraints or conditions that limit the solution)

3.1 Require the user to enter the Due Date on the header of the "Generate Order for Job XX" window, this is a display only field now.

3.2 Remove the note next to the Due Date field on the main window.

3.3 Default the Due Date to nulls/blanks if the system generated Due Date is less than or equal to tomorrow; otherwise use the calculated due date.

3.4 Due Date field – required field before sending the order to OrderMaster.

4. Change/Addition(s):
(detailed description of change/addition)

4.1 Change the Due Date display field on the header section of the "Generate Order for Job XX" window, to a field that can be updated.

4.2 Remove the note next to the Due Date field on the main window.

4.3 Remove or hide the Due Date field on the Order Option Tab.

4.4 Default the Due Date field to nulls/blanks if the system generated Due Date field is less than or equal to tomorrow; otherwise use the calculated due date.

4.5 Due Date is required field before the Order can be sent to OrderMaster.

5. Performance Requirements:

| | |
|---|---|
| (list any performance requirements associated with this change) **[Identify system response requirements that must be met for user acceptance]** | 5.1 There should be no noticeable affect on performance. |

6. Dependencies:

| | |
|---|---|
| (list any defects or features that this enhancement is dependent on or that will be dependent on this feature) | 6.1 NONE |

7. Benefits:

| | |
|---|---|
| (provide benefits in dollars, reduced headcount, time savings, etc. for doing this work) **[This is required to identify any savings that can be attributed to this feature for securing budget approval]** | 7.1 Allow the user to change the due date without going to the Order Option Tab – more user friendly.<br>7.2 Most users forget to select the order Option tab, therefore, the due date doesn't get changed. Order is sent as rushed when it really isn't a rush job. |

| 8. Affected Components: | | (check) Yes | No | (check) |
|---|---|---|---|---|
| RTOC Instructions | | | | X |
| HELP | X | | | |
| User Guides | | X | | |
| Testing | | X | | |
| Infra-structure | | | | X |
| Management Reports | | | | X |
| Database | | | | |

| | |
|---|---|
| **9. Interfaces:** | |
| (list any legacy or new interface systems impacted by this change) **[Make sure other interface systems are aware of and agree with any requirement change that impacts them before proceeding]** | 9.1 NONE |

| **Work-around:** | | **(check) Yes** | **(check) No** |
|---|---|---|---|
| (is there a temporary work around?) | X | | |
| (describe work around in detail) **[Also identify this in the OSPCM 'known problem' document]** | 10.1 The user must select the Order Options Tab & change the due date before sending the order to OrderMaster. | | |

| | |
|---|---|
| **11. Risks:** | |
| (list factors that impact, positive/negative, not doing this change) | 11.1 Order will be created with the wrong due date.<br>11.2 Creating rush orders when they really aren't rush. |
| **12. Business Rules:** | |
| (list any business rules or constraints that should apply. If business rules are included in the changes section, identify these with asterisk in bold, *****business rule*****) | 12.1 Same rules that exist today when creating an order.<br>12.2 The user must enter a future day (due date must be greater than today) |
| **13. Document Changes:** | |
| (list affected documents requiring change) **[Documentation should prepare a checklist covering each document that must be updated for this feature]** | 13.1 Functional Decomps<br>13.2 Test Scenarios<br>13.3 Materials Management Business Solution(s)<br>13.4 Materials Management User Guide<br>13.5 Help |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 NONE |

15. Acceptance Criteria/Test Scenario:

| | |
|---|---|
| (list test scenarios required to test change prior to user acceptance, this can be updated after the detailed design is completed.) **<u>REQUIRED</u> [Tester should prepare checklist based on these test scenarios for documentation on results of tests. These should be in matrix form identified back to the numbering scheme used in these test scenarios]** | <u>First Test</u>:<br>15.1 Encode a job in Job Entry<br>15.2 Configure, price and firm the job<br>15.3 Select the job in Materials Management – "Needed Requirements for Job XX" window<br>15.4 Select one or more requirement and select the Create Order Toolbar button.<br>15.5 Change or enter the Order Due date on the "Generate Order for Job XX" main window.<br><u>Second Test</u>:<br>Complete steps 15.1 to 15.4 a second time, select the send order to Order Master button, the system should generate an error message letting the user know that the Due Date is a required field. |

Figure 10:
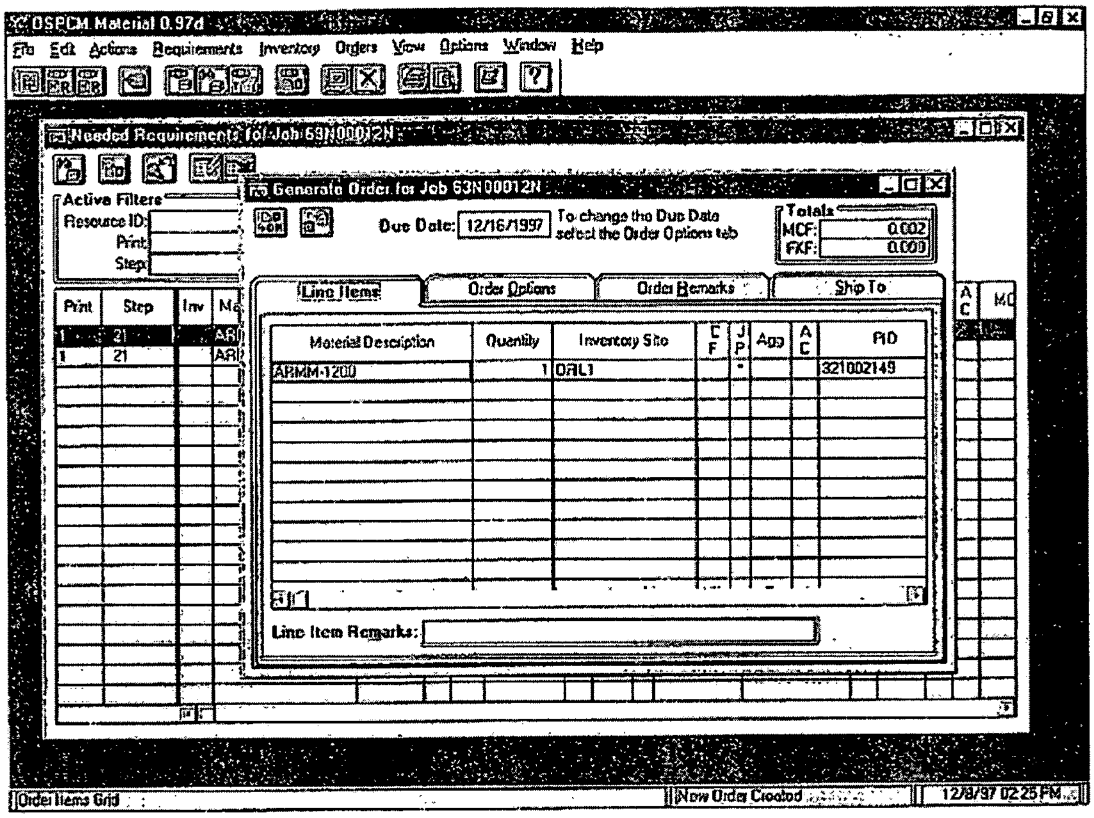
FIG. 10 is an exemplary screen print for OSPCM Material 0.97d.

16. Attachments:

| | |
|---|---|
| (copies of screens, reports, etc. before and after proposed change-only identify if the customer requires the screen or something on the screen to look a certain way) | 16.1 Fig. 10 is an exemplary screen print for OSPCM Material 0.97d. |

Signatures of Agreement:

(add additional rows if necessary)

BAE:

Lead Analyst:

Allow the user to change the Due Date on the header of the main window. Remove the note "To change the Due Date select the Order Option tab".

BAE FUNCTIONAL REQUIREMENT DOCUMENT

Table # 7380A

| | | | |
|---|---|---|---|
| **BAE Start Date:** | December 10, 1997 | **BAE Name:** | Carol A. Brechtel |
| **BAE Comp. Date:** | December 18, 1997 | **BAE Tele. No.:** | 205-977-3611 |
| **BAE Hours:** | 2 Hours | **LA Assigned:** | Jeff Elder |

CMVC Component Name: CORE_TABLES_LOC_EDIT

Associated Defect/Feature No.: NONE

Target Release:
(give target release this needs to be in) [Only identify if this is required for an emergency release or must be worked in next scheduled release]

Target Release Date:
(give target release date for this enhancement, if required)

Priority:
(provide priority from 'feature priority' list – number preliminary assigned by SME)

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 The user should not be allowed to end date or delete an inventory site that has inventory assigned to it or that is used anywhere in OSPCM (example: inventory site is on an open order)

1.2 The user should not be allowed to end date or delete a wire center if it is being used somewhere else in OSPCM (configuration tables, encoded on open substeps on open jobs, etc.)

1.3 The user should not be allowed to end date or delete a CMC if inventory sites or wire centers are still associated with the CMC. Also, if the CMC is being used some where else in OCPCM (open complaints, open jobs, etc.) the user should not be allowed to end date or delete the CMC.

2. Current Problem:

(brief description of what system currently does, what needs to be changed, and why)

2.1 Today an inventory site can be end dated or deleted when inventory still resides at the locations. Enhance the system to not allow the user to end date or delete an inventory site with existing inventory, generate an error message letting the user know that inventory still exists at the location. Also if the inventory site is assigned to an open order the user should not be allowed to end date or delete the inventory site, system should generate error message.

2.2 Today a wire center can be end dated or deleted when open jobs exist for the wire center. Enhance the system to only allow the user to end date or delete a wire center only if the wire center is not used on any open substep (jobs) within OSPCM. (Not only jobs but complaints, exhibit C of the contract, etc.) The system should generate an error message letting the user know that the wire center is being used in OSPCM.

2.3 Today a CMC can be deleted or end dated even if inventory sites or wire centers are associated to the CMC. The system should generate an error message letting the user know that they can not delete or end date the CMC until all inventory sites and wire centers have either been moved to another CMC, have been end dated or deleted.

3. Proposed Solution:

(brief description of what the system will or should do and any general constraints or conditions that limit the solution)

3.1 If inventory still exists at an inventory site or if the inventory site is associated with configuration tables or open orders the system should generate an error message letting the user know that the inventory site can not be end dated or deleted.

3.2 If a wire center is associated with an open job (all types), configuration table, valid contract, complaints, or inspection the system should generate an error message letting the user know that the wire center can not be end dated or deleted. Also if a wire center is not being used in OSPCM the system should generate a warning message to let the user know that they may need to update LMOS, since when a wire center is end dated or deleted it also effects the associated LMOS and OSPCM in sync.

3.3 If a CMC still has inventory sites or wire centers associated with it the system should generate an error message letting the user know that the CMC can not be end dated or deleted, because wire centers or inventory sties still exist for the CMC.

3.4 The inventory site is associated to the master contract as a supply center and can not be validated until moved to informix data base.

4. Change/Addition(s):

(detailed description of change/addition)

4.1 Add additional edits to the OSPCM Location Editor when the user attempted to delete or end date a CMC, wire center or inventory site. The edits should not allow locations of any type to be deleted or end dated if the locations are being used by any OSPCM executable. (job entry, configuration tables, job entry-other, materials management, etc.)

4.2 Make sure that hard deletes are only performed when there are no associated records.

5. Performance Requirements:

(list any performance requirements associated with this change) [Identify system response requirements that must be met for user acceptance]

5.1 There should be no noticeable affect on performance.

NOTE: Due to the number of tables to check there may be a performance problem, need to look at the best way to handle all edits without causing a performance problem.

6. Dependencies:

| | |
|---|---|
| (list any defects or features that this enhancement is dependent on or that will be dependent on this feature) | 6.1 NONE |

7. Benefits:

| | |
|---|---|
| (provide benefits in dollars, reduced headcount, time savings, etc. for doing this work) **[This is required to identify any savings that can be attributed to this feature for securing budget approval]** | 7.1 Existing inventory will not be available for the user if the inventory site is end dated or deleted.<br>7.2 Jobs that are encoded with the end dated or deleted wire center will not work properly.<br>7.3 If a CMC is end dated or deleted all location associated with it (inventory sites and wire centers) will not be good in OSPCM. |

| **8. Affected Components:** | **(check) Yes** | **(check) No** |
|---|---|---|
| **RTOC Instructions** | | **X** |
| **HELP** | **X** | |
| **User Guides** | | **X** |
| **Testing** | **X** | |
| **Infra-structure** | | **X** |
| **Management Reports** | | **X** |
| **Database** | | **X** |

| | | |
|---|---|---|
| **9. Interfaces** | | |
| (list any legacy or new interface systems impacted by this change) **[Make sure other interface systems are aware of and agree with any requirement change that impacts them before proceeding]** | 9.1 NONE | |
| **10. Work-around:** | **(check)** **Yes** | **(check)** **No** |
| (is there a temporary work around?) (describe work around in detail) **[Also identify this in the OSPCM 'known problem' document]** | | **X** |
| **11. Risks:** | | |
| (list factors that impact, positive/negative, not doing this change) | 11.1 OSPCM Data Bases may be out of sync.<br>11.2 Lost of data & inventory<br>11.3 We will have a very messed up system. | |
| **12. Business Rules:** | | |
| (list any business rules or constraints that should apply. If business rules are included in the changes section, identify these with asterisk is bold, ***business rule***) | 12.1 Locations (CMC, Inventory Sites and Wire Centers) in OSPCM should not be end dated or deleted if they are being used by any execuin OSPCM. Examples: inventory still assigned to an inventory site, open order being shipped to the inventory site, wire centers that are encoded on open substeps (all jobs: EW, BSW, RW, | |

PWO, etc.), or that exist on a valid contract, CMC that are valid on open jobs or that still have inventory sites and wire centers associated with them.

13. Documentation Changes:

| | |
|---|---|
| (list affected documents requiring change) **[Documentation should prepare a checklist covering each document that must be updated for this feature]** | 13.1 Functional Decomps<br>13.2 Test Scenario<br>13.3 Help |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training etc.) | 14.1 NONE |

15. Acceptance Criteria/Test Scenario:

| | |
|---|---|
| (list test scenarios required to test change prior to user acceptance, this can be updated after the detailed design is completed.) **<u>REQUIRED</u> [Tester should** | 15.1 Open the Location Editor<br>15.2 Attempt to end date a CMC with associated inventory sites and/or wire centers.<br>15.3 Attempt to end date an inventory site that still has inventory assigned to the site.<br>15.4 Attempt to end date a wire center that is valid on an open |

| | | |
|---|---|---|
| **prepare checklist based on these test scenarios for documentation on results of tests. These should be in matrix form identified back to the numbering scheme used in these test scenarios]** | | substep/job. |
| | 15.5 | Complete the above test again attempting to delete the CMC, inventory site and wire center. |
| | 15.6 | Attempt to end date a location that has only historical records associated to it. |
| | NOTE: | Test both future day and current end dates. |

16. Attachments:

| | | |
|---|---|---|
| (copies of screens, reports, etc. before and after proposed change-only identify if the customer requires the screen or something on the screen to look a certain way) | 16.1 | NONE |

Signatures of Agreement:

(add additional rows if necessary)

BAE:

Lead Analyst:

BAE FUNCTIONAL REQUIREMENT DOCUMENT

Table # 7420A

| | | | |
|---|---|---|---|
| **BAE Start Date:** | 05/13/1998 | **BAE Name:** | Gail Deaton |
| **BAE Comp. Date:** | 05/13/1998 | **BAE Tele. No.:** | 977-3615 |
| **BAE Hours:** | 4 | **LA Assigned:** | |

CMVC Component Name: Je_ewo

Associated Defect/Feature No.: 6424

| | | | |
|---|---|---|---|
| **Target Release:** (give target release this needs to be in) | 2.15 | **Target Release Date:** (give target release date for this enhancement) | 8/98 |

Priority:
(provide priority from 'feature priority' list – production_hi through deferred_low) Production_hi

Revision No.:
Reason for Revision:

General:

(General Information – nothing is to be typed here, this is for information only about the functional spec process)

1. The purpose of this document is to provide the customer's view of the <u>functionality</u> that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Add an OSPCM generated report for Contract-Move errors generated by the Contract Move process in F6424

2. Current Problem:

(brief description of what system currently does, what needs to be changed, and why)

2.1 No mechanized report exists to notify the user of errors that were generated during the Contract Move process. Currently a programmer receives the errors, reformats into a Word document and then e-mails to the user that requested the move.

3. Proposed Solution:

(brief description of what the system will or should do and any general constraints or conditions that limit the solution)

3.1 Create a mechanized report for the errors generated from the batch Contract Move process. Create an ICON on the Contract Move screen to access Contract Move Results.

4. Change/Addition(s):

(detailed description of change/addition)

4.1 Create a mechanized report for the errors generated from the batch Contract Move process. Create an ICON on the Contract Move screen to access Contract Move Results. Display a list of contract moves for the user to select from. [from MTN512 to MTN598 process date 05/11/1998] Have the user select from a list by double clicking. See attachment for report layout.

5. Performance Requirements:

| | |
|---|---|
| List any performance requirements associated with this change) **[Identify system response requirements that must be met for user acceptance]** | 5.1 Performance should not be affected. |

6. Dependencies:

| | |
|---|---|
| (list any defects or features that this enhancement is dependent on or that will be dependent on this feature) | 6.1 Completion of F6424 |

7. Benefits:

| | |
|---|---|
| (provide benefits in dollars, reduced headcount, time savings, etc. for doing this work) **[This is required to identify any savings that can be attributed to this feature for securing budget approval]** | 7.1 Takes the programmer out of the loop in the Contract Move process which will result in a time and dollar savings. Also gives any user in the CMC the ability to pull and view the Contract Move Results. |

| **8. Affected Components:** | **(check) Yes** | **(check) No** |
|---|---|---|
| **RTOC Instructions** | | |
| **HELP** | | |
| **User Guides** | X | |
| **Testing** | | |

Infra-structure
Management Reports
Database

9. Interfaces

(list any legacy or new interface systems impacted by this change) [Make sure other interface systems are aware of and agree with any requirement change that impacts them before proceeding]

| **10. Work-around:** | **(check) Yes** | **(check) No** |
|---|---|---|
| (is there a temporary work around?) | X | |
| (describe work around in detail) **[Also identify this in the OSPCM 'known problem' document]** | 10.1 Continue to have a programmer check the servers each night for a batch Contract Move and then generate the error reports, reformat the report into a Word document and email to the user who requested the move. | |

11. Risks:

(list factors that impact, positive/negative, not doing this change)

11.1 Loss of experienced programmer to perform this process and field user acceptability of the Contract Move process.

12. Business Rules:

| | |
|---|---|
| (list any business rules or constraints that should apply. If business rules are included in the changes section, identify these with asterisk in bold, ***business rule***) | |

13. Documentation Changes:

| | |
|---|---|
| (list affected documents requiring change) [Documentation should prepare a checklist covering each document that must be updated for this feature] | 13.1 User Guides and On-Line Help |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | |

15. Acceptance Criteria/Test Scenario:

| | |
|---|---|
| (list test scenarios required to test change prior to user acceptance. This can be updated after the detailed design is completed.) <u>**REQUIRED**</u> **[Tester should prepare checklist based on these test scenarios for documentation on results of tests. These should be in matrix form identified back to the numbering scheme used in these test scenarios]** | 15.1 Run a Contract Move process.<br>Go to JE-EWO and to the Move Contract icon.<br>Verify that an icon exists for Contract Move Results.<br>Request report<br>Print report<br>Verify that the report contains all fields specified.<br>Verify that the report data is formatted correctly.<br>Verify that the data generated is correct.<br>Verify that all data is generated from the Move process. |

16. Attachments:

| | |
|---|---|
| (copies of screens, reports, etc. before and after proposed change- only identify if the customer requires the screen or something on the screen to look a certain way) | 16.1 Report layout |

Signatures of Agreement:

(add additional rows if necessary)

BAE:

Lead Analyst:

BAE FUNCTIONAL REQUIREMENT DOCUMENT

Table # 7420B

| | | | |
|---|---|---|---|
| **BAE Start Date:** | 05/13/1998 | **BAE Name:** | Gail Deaton |
| **BAE Comp. Date:** | 06/05/1998 | **BAE Tele. No.:** | 977-3615 |
| **BAE Hours:** | 6 | **LA Assigned:** | |

CMVC Component Name: je_ewo

Associated Defect/Feature No.: 6424

| | | | |
|---|---|---|---|
| **Target Release:** (give target release this needs to be in) **[Only identify if this is required for an emergency release or must be worked in next scheduled release]** | 2.15 | **Target Release Date:** (give target release date for this enhancement, if required) | 8/98 |

Priority:
(provide priority from 'feature priority' list – number preliminary assigned by SME) production_hi

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Add an OSPCM generated report for Contract-Move errors generated by the Contract Move process in F6424.

2. Current Problem:

(brief description of what system currently does, what needs to be changed, and why)

2.1 Feature 6424 provides an email of the errors for each job that failed preconfiguration and configuration. Using this method, the user who requests the Contract Move could be deluged with individual job error messages. In addition, if the user who requests the move does not have an established email address, the errors are not sent.

3. Proposed Solution:

(brief description of what the system will or should do and any general constraints or conditions that limit the solution)

3.1 Create a mechanized report for the errors generated from the batch Contract Move process. Create an ICON on the Contract Move screen to access Contract Move Results.

4. Change/Addition(s):

(detailed description of change/addition)

4.1 Create a mechanized report for the errors generated from the batch Contract Move process.

4.1.1 Create an ICON on the Contract Move screen to access Contract Move Results.

4.1.2 Display a list of contract moves for the user to select from [from MTN512 to MTN598 process date 05/11/1998]

4.1.3 Have the user select from a list by double clicking 4.1.4 Positive reporting should be indicated for each successful run.

4.1.5 Store results for each run and then purge after 30 days.

4.1.6 For jobs that fail to process, update the batch processing run date to the next day.

4.1.7 Eliminate the emailing of errors established by Feature 6424.

See attachment for report layout.

5. Performance Requirements:

| | |
|---|---|
| (list any performance requirements associated with this change) **[Identify system response requirements that must be met for user acceptance]** | 5.1 Performance should not be affected. |

6. Dependencies:

| | |
|---|---|
| (list any defects or features that this enhancement is dependent on or that will be dependent on this feature) | 6.1 Completion of F6424 |

7. Benefits:

| | |
|---|---|
| (provide benefits in dollars, reduced headcount, time savings, etc. for doing this work) **[This is required to identify any savings that can be attributed to this feature for securing budget approval]** | 7.1 Gives any user in the CMC the ability to pull and view the Contract Move Results. Eliminates emailing of errors. |

| **8. Affected Components:** | **(check) Yes** | **(check) No** |
|---|---|---|
| **RTOC Instructions** | | **X** |
| **HELP** | **X** | |
| **User Guides** | **X** | |
| **Testing** | **X** | |
| **Infra-structure** | | **X** |
| **Management Reports** | | **X** |
| **Database** | **X** | |

| | | |
|---|---|---|
| **9. Interfaces** | | |
| (list any legacy or new interface systems impacted by this change) **[Make sure other interface systems are aware of and agree with any requirement change that impacts them before proceeding]** | 9.1 NONE | |
| **10. Work-around:** | **(check)** **Yes** | **(check)** **No** |
| (is there a temporary work around?) | **X** | |
| (describe work around in detail) **[Also identify this in the OSPCM 'known problem' document]** | 10.1 Email process of notification will continue. | |
| **11. Risks:** | | |
| (list factors that impact, positive/negative, not doing this change) | 11.1 If no email address exists for the cuid requesting the Move, no error messages can be retrieved. Only the person who requests the Move has access to the errors. Possibility of a deluge of emails. | |

12. Business Rules:

| | |
|---|---|
| (list any business rules or constraints that should apply. If business rules are included in the changes section, identify these with asterisk is bold, ***business rule***) | 12.1 NONE |

13. Documentation Changes:

| | |
|---|---|
| (list affected documents requiring change) **[Documentation should prepare a checklist covering each document that must be updated for this feature]** | 13.1 User Guides and On-Line Help |

14. Special Training/Implementation Requirements:

| | |
|---|---|
| (list any special training/implementation required for this feature. Identify what will be required to train and implement this feature to the customer, i.e., by documentation, e-mail, cue cards, on sight training, etc.) | 14.1 Release Notes<br>Issue RL to detail the Contract move process. |

15. Acceptance Criteria/Test Scenario:

| | | |
|---|---|---|
| (list test scenarios required to test change prior to user acceptance, this can be updated after the detailed design is completed) **REQUIRED** **[Tester should prepare checklist based on these test scenarios for documentation on results of tests. These should be matrix from identified back to the numbering scheme used in these test scenarios]** | 15.1 | Setup test data to ensure that some jobs fail. (See Gail Deaton)<br>Run a Contract Move process.<br>Go to JE-EWO and to the Move Contract icon.<br>Verify that a icon exists for Contract Move Results.<br>Request report.<br>Print repot.<br>Verify that the report contains all fields specified.<br>Verify that the report data is formatted correctly.<br>Verify that the data generated is correct.<br>Verify that all data is generated from the Move process.<br>Verify that the report contains preconfiguration and configuration errors.<br>For jobs that fail Move verify that the batch date changes.<br>Verify that no email messages are sent for errors.<br>Correct errors for jobs that failed.<br>Rerun batch process.<br>Verify that a positive report is generated with no jobs in error. |

16. Attachments:

| | | |
|---|---|---|
| (copies of screens, reports, etc. before and after proposed change-only identify if the customer requires the screen or something on the screen to look a certain way.) | 16.1 | Report layout |

Signatures of Agreement:

(add additional rows if necessary)

| | |
|---|---|
| BAE: | (on file) 6/9/98 |
| Lead Analyst: | (on file) 6/9/98 |

BAE FUNCTIONAL REQUIREMENT DOCUMENT

Table # 7182a

| | | | |
|---|---|---|---|
| **BAE Start Date:** | 04/13/1998 | **BAE Name:** | Mark Seal |
| **BAE Comp. Date:** | 04/15/1998 | **BAE Tele. No.:** | 205-977-3618 |
| **BAE Hours:** | 4 | **LA Assigned:** | |

CMVC Component Name: Scheduling

Associated Defect/Feature No.:

| | | |
|---|---|---|
| **Target Release:** (give target release this needs to be in) **[Only identify if this is required for an emergency release or must be worked in next scheduled release]** | 2.13 | **Target Release Date:** (give target release date for this enhancement, if required) |

| | |
|---|---|
| **Priority:** (provide priority from 'feature priority' list – number preliminary assigned by SME) | 104 |

Revision No.: (B, C, etc. – this will require new signatures)

Reason for Revision:

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

1. Abstract:

(brief description of change/addition) – This should pretty closely match the abstract in CMVC.

1.1 Allow the user to request, view and print the scheduling 210 report by wire center, CST/MPT number or Res ID.

2. Current Problem:

(brief description of what system currently does, what needs to be changed, and why)

2.1 Currently the user must request the entire report which can be very large and time consuming to view and print.

3. Proposed Solution:

(brief description of what the system will or should do and any general constraints or conditions that limit the solution)

3.1 Add a dialog box so the user can specify how the report is to be retrieved.

4. Change/Addition(s):

(detailed description of change/addition)

4.1 When the user selects the 210 from the print or print preview option on the scheduling screen, the system will display a dialog box. The user can select in this dialog box only one of the following options; ALL, RES ID, CST/MPT#, WIRE CENTER.

4.2 When the user selects ALL and clicks OK then the entire report is retrieved.

4.3 When the user selects the RES ID option then the system will require that the user enter a valid RES ID for the CMC. Only jobs that have activities that are assigned to the RES ID will be retrieved and placed on the report.

4.4 When the user selects CST/MPT# option then the system will require that the user enter a valid CST/MPT# for the CMC. Only jobs assigned to the CST/MPT# entered will be retrieved and placed on the report.

4.5 When the user selects WIRE CENTER option then the system will require that the user enter a valid WIRE CENTER for the CMC. Only jobs assigned to the WIRE CENTER entered will be retrieved and placed on the report.

4.6 In all cases the wire center will be the first sort and then the job name will be listed in numerical order.

4.7 Only one option will be allowed when selecting "ALL or RES ID or CST/MPT# or wire center.

5. Performance Requirements:

| | | |
|---|---|---|
| (list any performance requirements associated with this change) **[Identify system response requirements that must be met for user acceptance]** | 5.1 | Since this is a batch report there may be some processing time added for this change. |
| | 5.2 | On line performance should not be affected by this change. |

6. Dependencies:

| | |
|---|---|
| (list any defects or features that this enhancement is dependent on or that will be dependent on this feature) | 6.1 NONE |

7. Benefits:

| | |
|---|---|
| (provide benefits in dollars, reduced headcount, time savings, etc. for doing this work) [This is required to identify any savings that can be attributed to this feature for securing budget approval] | 7.1 This will allow the user to select a report with less information. Printing the report will save time if there is less data on the report. |

| **8. Affected Components:** | **(check) Yes** | **(check) No** |
|---|---|---|
| **RTOC Instructions** | | **X** |
| **HELP** | **X** | |
| **User Guides** | **X** | |
| **Testing** | **X** | |
| **Infra-structure** | | **X** |
| **Management Reports** | | **X** |
| **Database** | | **X** |

| | | |
|---|---|---|
| **9. Interfaces**<br>(list any legacy or new interface systems impacted by this change) **[Make sure other interface systems are aware of and agree with any requirement change that impacts them before proceeding]** | 9.1 NONE | |
| **10. Work-around:** | **(check)**<br>**Yes** | **(check)**<br>**No** |
| (is there a temporary work around?) | | **X** |
| (describe work around in detail) **[Also identify this in the OSPCM 'known problem' document]** | 10.1 Currently the user must request the entire report. | |
| **11. Risks:**<br>(list factors that impact, positive/negative, not doing this change) | 11.1 This is a very high user priority. This report will be used for scheduling purposes which are already a time consuming effort. | |

12. Business Rules:

| | |
|---|---|
| (list any business rules or constraints that should apply. If business rules are included in the changes section, identify these with asterisk is bold, ***business rule***) | 12.1 Valid data for the CMC must be entered when selecting RES ID or CST/MPT# or WIRE CENTER. The user should be allowed to select only one option at a time. |

13. Documentation Changes:

| | |
|---|---|
| (list affected documents requiring change) **[Documentation should prepare a checklist covering each document that must be updated for this feature]** | 13.1 Scheduling user guides and help screens. |

14. Special Training/Implementation Requirements:

| | |
|---|---|
| (list any special training/implementation required for this feature. Identify what will be required to train and implement this feature to the customer, i.e., by documentation, e-mail, cue cards, on sight training, etc.) | 14.1 NONE |

15. Acceptance Criteria/Test Scenario:

(list test scenarios required to test change prior to user acceptance, this can be updated after the detailed design is completed)

<u>REQUIRED</u> [Tester should prepare checklist based on these test scenarios for documentation on results of tests. These should be matrix from identified back to the numbering scheme used in these test scenarios]

15.1

- OPEN the scheduling module for a valid CMC.
- Click on the print button on the tool bar and a list of reports is displayed.
- Select the 210 scheduling report.
- A dialog box will open with the following options.
  - ALL
  - RES ID
  - CST/MPT#
  - WIRE CENTER
- Select ALL and click OK
- Verify that the entire 210 report is printed.

15.2

- OPEN the scheduling module for a valid CMC.
- Click on the print button on the tool bar and a list of reports is displayed.
- Select the 210 scheduling report.
- A dialog box will open with the following options.
  - ALL
  - RES ID
  - CST/MPT#
  - WIRE CENTER
- Select RES ID and enter a valid RES ID for the CMC and click OK.
- Verify that the 210 report is printed with only jobs that contain the res id entered.

15.3

- OPEN the scheduling module for a valid CMC.

- Click on the print button on the tool bar and a list of reports is displayed.
- Select the 210 scheduling report.
- A dialog box will open with the following options.
- ALL
- RES ID
- CST/MPT#
- WIRE CENTER
- Select CST/MPT# and enter a valid CST/MPT# for the CMC and click OK.
- Verify that the 210 report is printed with only jobs that are assigned to the CST/MPT# entered.

15.4

- OPEN the scheduling module for a valid CMC.
- Click on the print button on the tool bar and a list of reports is displayed.
- Select the 210 scheduling report.
- A dialog box will open with the following options.
    - ALL
    - RES ID
    - CST/MPT#
    - WIRE CENTER
- Select WIRE CENTER and enter a valid WIRE CENTER for the CMC and click OK.
- Verify that the 210 report is printed with only jobs that are assigned to the WIRE CENTER entered.

15.5

- Verify that only one option can be selected.
- Verify that the system will not allow entering invalid RES ID's, CST/MPT#'s and WIRE CENTERS.

15.6

- OPEN the scheduling module for a valid CMC.
- Click on the print preview button on the tool bar and a list of reports is displayed.
- Select the 210 scheduling report.
- A dialog box will open with the following options.
  - ALL
  - RES ID
  - CST/MPT#
  - WIRE CENTER
- Select ALL and click OK
- Verify that the entire 210 report is displayed.

15.7

- OPEN the scheduling module for a valid CMC.
- Click on the print preview button on the tool bar and a list of reports is displayed.
- Select the 210 scheduling report.
- A dialog box will open with the following options.
  - ALL
  - RES ID
  - CST/MPT#
  - WIRE CENTER
- Select RES ID and enter a valid RES ID for the CMC and click OK.
- Verify that the 210 report is displayed with only jobs that contain the res id entered.

15.8

- OPEN the scheduling module for a valid CMC.
- Click on the print preview button on the tool bar and a list of reports is displayed.

- Select the 210 scheduling report.
- A dialog box will open with the following options.
  - ALL
  - RES ID
  - CST/MPT#
  - WIRE CENTER
- Select CST/MPT# and enter a valid CST/MPT# for the CMC and click OK.
- Verify that the 210 report is displayed with only jobs that are assigned to the CST/MPT# entered.

15.9

- OPEN the scheduling module for a valid CMC.
- Click on the print preview button on the tool bar and a list of reports are displayed.
- Select the 210 scheduling report.
- A dialog box will open with the following options.
  - ALL
  - RES ID
  - CST/MPT#
  - WIRE CENTER
- Select WIRE CENTER and enter a valid WIRE CENTER for the CMC and click OK.
- Verify that the 210 report is displayed with only jobs that are assigned to the WIRE CENTER entered.

15.10

- Verify that only one option can be selected.
- Verify that the system will not allow entering invalid RES ID's, CST/MPT#'s and WIRE CENTERS.

16. Attachments:

(copies of screens, reports, etc. before and after proposed change-only identify if the customer requires the screen or something on the screen

Signatures of Agreement:

(add additional rows if necessary)

BAE:

Lead Analyst:

BAE FUNCTIONAL REQUIREMENT DOCUMENT

Table # 7011B

| | | | |
|---|---|---|---|
| **BAE Start Date:** | 04/17/1998 | **BAE Name:** | Gail Deaton |
| **BAE Comp. Date:** | 04/23/1998 | **BAE Tele. No.:** | 977-3615 |
| **BAE Hours:** | 5 | **LA Assigned:** | |

CMVC Component Name: je_ewo

Associated Defect/Feature No.:

| | | | |
|---|---|---|---|
| **Target Release:** (give target release this needs to be in) **[Only identify if this is required for an emergency release or must be worked in next scheduled release]** | 2.14 | **Target Release Date:** (give target release date for this enhancement, if required) | 6/1998 |

| | |
|---|---|
| **Priority:** (provide priority from 'feature priority' list – number preliminary assigned by SME) | Hi |

Revision No.: (B, C, etc. – this will require new signatures)

Reason for Revision: Walk thru updates and change target release

General:

(General Information – nothing is to be typed here, this is for information only about the functional spec process)

1. The purpose of this document is to provide the customer's view of the functionality that needs to be changed or added to the existing OSPCM product. It is not the detail design requirements. It should concentrate on the 'what' that is needed and not on the 'how' it is provided.
2. All features that are > 40 hours/1 business area require a structured inspection walk through process (currently using FAGAN). This is to be scheduled by the responsible SME for this feature with the testing team lead, documentation team lead and the IT development Managers. The IT develop managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date and participants.
5. Continue numbering scheme in your text input under each to provide traceability for matrixes.

| | |
|---|---|
| **1. Abstract:** (brief description of change/addition) – This should pretty closely match the abstract in CMVC. | 1.1 Add "Ex Geoloc" to Splicing and Other screens |
| **2. Current Problem:** (brief description of what system currently does, what needs to be changed, and why) | 2.1 The "Ex Geoloc" cannot be entered on the Splicing and the Other screens. This forces the outside craft to type in the "Ex Geoloc" when reporting in Work Station. |
| **3. Proposed Solution:** (brief description of what the system will or should do and any general constraints or conditions that limit the solution) | 3.1 Add the "Ex Geoloc" field to the Splicing and Other screens. |
| **4. Change/Addition(s):** (detailed description of change/addition) | 4.1 Add the "Ex Geoloc" field to the Splicing and Other screens. The field should be located in the substep grid after the "Wire Center" for each screen. The format and edits that apply for "Ex Geoloc" for the Placing and Removal screen should be applied.<br>4.2 The Ex Geoloc needs to be populated for Splicing and Other substeps (that require the Ex Geoloc based on the edits referred to in 4.1) in the |

MTR extract. This may or may not require a change to Work Station.

| | |
|---|---|
| **5. Performance Requirements:** (list any performance requirements associated with this change) [Identify system response requirements that must be met for user acceptance] | 5.1 Performance should not be affected. |
| **6. Dependencies:** (list any defects or features that this enhancement is dependent on or that will be dependent on this feature) | |
| **7. Benefits:** (provide benefits in dollars, reduced headcount, time savings, etc. for doing this work) **[This is required to identify any savings that can be attributed to this feature for securing budge approval]** | 7.1 Accuracy of reporting the Ex Geoloc and a saving in craft labor by having the Ex Geoloc prepopulated for the substep. |

| **8. Affected Components:** | **(check) Yes** | **(check) No** |
|---|---|---|
| **RTOC Instructions** | | **X** |
| **HELP** | **X** | |
| **User Guides** | **X** | |
| **Testing** | **X** | |
| **Infra-structure** | | **X** |
| **Management Reports** | | **X** |
| **Database** | | **X** |

| **9. Interfaces** | |
|---|---|
| (list any legacy or new interface systems impacted by this change) **[Make sure other interface systems are aware of and agree with any requirement change that impacts them before proceeding]** | 9.1 NONE |

| **10. Work-around:** | **(check) Yes** | **(check) No** |
|---|---|---|
| (is there a temporary work around?) | **X** | |
| (describe work around in detail) **[Also identify this in the OSPCM 'known problem' document]** | 10.1 Have the craft continue to type in the Ex Geoloc for splicing and other work. | |

11. Risks:

(list factors that impact, positive/negative, not doing this change)

12. Business Rules:

| | |
|---|---|
| (list any business rules or constraints that should apply. If business rules are included in the changes section, identify these with asterisk is bold, ***business rule***) | 12.1 Ex Geoloc is required for digital loop carrier materials and labor. Digital loop carrier materials and labor are identified for the substep by the FRC of the substep. OSPCM reads the area required indicator for the substep FRC in the FRC table. If the indicator is Y then an EX Geoloc is required. |

13. Documentation Changes:

| | |
|---|---|
| (list affected documents requiring change) **[Documentation should prepare a checklist covering each document that must be updated for this feature]** | 13.1 User Guides<br>On-line Help |

14. Special Training/Implementation Requirements:

| | |
|---|---|
| (list any special training/implementation required for this feature. Identify what will be required to train and implement this feature to the customer, i.e., by documentation, e-mail, cue cards, on sight training, etc.) | 14.1 NONE |

15. Acceptance Criteria/Test Scenario:

| | |
|---|---|
| (list test scenarios required to test change prior to user acceptance. This can be updated after the detailed design is completed) <u>**REQUIRED**</u> **[Tester should prepare checklist based on these test scenarios for documentation on results of tests. These should be in matrix form identified back to the numbering scheme used in these test scenarios]** | 15.1 |

- Enter a substep with a 257C "FRC" on the splicing screen.
  - Do not populate the "Ex Geoloc" field and save
    - Error should be returned requiring an entry in the "Ex Geoloc" field.
  - Populate the "Ex Geoloc" field with a geoloc of a wire center.
    - Verify that a message returns that the entry is invalid
  - Populate the "Ex Geoloc" field with a valid entry
    - Verify that the substep can be saved
- Configure, price and firm the job
- Go to workstation
  - Pull up the job and the substep
  - Report 1 hour to the substep and complete
  - Verify that Work Station does not ask user to enter an EX Geoloc when reporting on substep.

- Verify that the Ex Geoloc is in the MTR extract
- Repeat above for an "ESTS" work action and 257C FRC on the Other screen
- Enter an "ESTS" work action on the Other screen. Encode with an FRC of "45C". Validate that no Ex Geoloc is required.

16. Attachments:
(copies of screens, reports, etc. before and after proposed change-only identify if the customer requires the screen or something on the screen to look a certain way)

Signatures of Agreement:
(add additional rows if necessary)
BAE:
Lead Analyst:

BAE FUNCTIONAL REQUIREMENT DOCUMENT

Table # 6507A

| | | | |
|---|---|---|---|
| **BAE Start Date:** | June 5, 1997 | **BAE Name:** | Carol A. Brechtel |
| **BAE Comp. Date:** | June 6, 1997 | **BAE Tele. No.:** | 205-977-3611 |
| **BAE Hours:** | 2.5 Hours | **LA Assigned:** | |

CMVC Component Name: MATMGMT

Associated Defect/Feature No.: 6507

| | | | |
|---|---|---|---|
| **Target Release:** (give target release this needs to be in) **[Only identify if this is required for an emergency release or must be worked in next scheduled release]** | 2.05 | **Target Release Date:** (give target release date for this enhancement, if required) | 10/6/97 |

Priority:
(provide priority from 'feature priority' list – number preliminary assigned by SME) production_hi

Revision No.: (B, C, etc. – this will require new signatures)

Reason for Revision:

Subject:

(brief description of change) 1. Allow the user to deselect the custom feature "pulling eye".

Introduction:

(description of what system currently does, what needs to be changed, and why)

1. Custom Feature of outside pulling eye is automatically assigned to a substep when:
* placing fiber cable in the underground environment
* placing copper cable that is assigned a Subcategory of PULP or DUCT PIC in the Material Item Table 2. Enhance the system to allow the user to deselect the custom feature in the Materials Management executable.

Solution:

(describe what the system will or should do and any general constraints or conditions that limit the solution)

1. Allow the user to deselect a system generated pulling eye custom feature. In Materials the change is needed on the Custom Feature window when it is displayed from the "Needed Requirements for Job XXX" window.

Change(s):

(detailed description of

1. Materials – from the Needed Requirements for

| | |
|---|---|
| change) – [add additional rows if multiple changes] | Job XX window, the user can display the existing "Pulling Eye" custom feature or add a new custom feature. The user should also be able to deselect any existing "Pulling Eye" custom feature passed from Job Entry. |

Performance Requirements:

| | |
|---|---|
| (list any performance requirements associated with this change) | 1. There should be no noticeable affect on performance. |

Dependencies:

| | |
|---|---|
| (list any defects or features that this enhancement is dependent on) | NONE |

Benefits:

| | |
|---|---|
| (provide benefits in dollars, reduced headcount, time savings, etc. for doing this work) | 1. Allow the user to order fiber cable to be placed in the underground environment without a pulling eye.<br>2. Allow the user to order copper cable with material subcategories of either PULP or DUCT PIC without a pulling eyes.<br>3. Reduce cost by not ordering custom features that are not required. |

| **Affected Components:** | **(check) Yes** | **(check) No** |
|---|---|---|
| **RTOC Instructions** | | **X** |
| **HELP** | **X** | |

| | | |
|---|---|---|
| **User Guides** | | X |
| **Testing** | X | |
| **Infra-structure** | | X |
| **Management Reports** | | X |
| **Database** | | X |

Interfaces:

(list any legacy or new interface systems impacted by this change) NONE

| **Work-around:** | **(check)** | **(check)** |
|---|---|---|
| | **Yes** | **No** |
| (is there a temporary work around?) | | X |
| (describe work around in detail) | | |

Risks:

(list factors that impact, positive/negative, not doing this change)

1. Cable may be ordered with custom features that are not required to do the job, we pay for something we don't need and can't use.

Business Rules:

(list any business rules or constraints that should apply)

1. Allow the user to deselect system generated "Pulling Eye" custom features.

Documentation Changes:

(list affected documents requiring change)

1. Test Scenario
2. Functional Decomps

Acceptance Criteria/Test Scenario:

| | |
|---|---|
| (list test scenarios required to test change prior to user acceptance. This can be updated after the detailed design is completed) **REQUIRED** | 1. Encode a job with at least two substeps<br>*one placing fiber cable in the underground environment<br>*place copper cable that is in the PULP or DUCT PIC material Subcategory (Material Item Table)<br>2. configure and firm the job<br>3. Exit Job Entry<br>4. From the Show a Job's Needed Requirement window, display the job<br>5. From the Needed Requirements for Job XX window display the custom feature window and deselect the pulling eye custom feature, both substeps.<br>6. Select OK and close the custom feature window<br>7. Generate an order for both substeps<br>8. Verify that both items do not have custom features |

Figure 11:
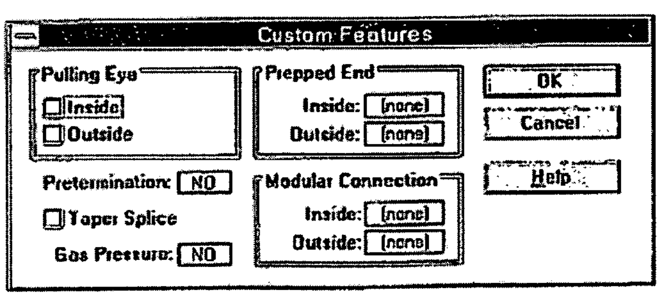
FIG. 11 is an exemplary screen print for Custom Features from Materials Management executable.

Attachments:

| | |
|---|---|
| (Screen shots are attached)) | 1. Fig. 11 is an exemplary screen print for Custom Features from the Materials Management executable. |

Signatures of Agreement:

(add additional rows if necessary)

BAE:

Lead Analyst:

BAE FUNCTIONAL REQUIREMENT DOCUMENT

Table # 6844B

| | | | |
|---|---|---|---|
| **BAE Start Date:** | 08/01/1997 | **BAE Name:** | L. Edgar |
| **BAE Comp. Date:** | 09/10/1997 | **BAE Tele. No.:** | 205-977-7375 |
| **BAE Hours:** | 42 | **LA Assigned:** | |

CMVC Component Name: Change_mgmt

Associated Defect/Feature No.:

Target Release:
(give target release this needs to be in) [Only identify if this is required for an emergency release or must be worked in next scheduled release]

Target Release Date:
(give target release date for this enhancement, if required)

Priority:
(provide priority from 'feature priority' list – number preliminary assigned by SME)

Revision No.: (B, C, etc. – this will require new signatures)

Reason for Revision:

General:

(General Information)

1. All features that are >40 hours/1 business area require a structured inspection walk through process (currently using FAGAN). This is to be scheduled by the responsible SME for this feature.
2. The 'Analysis Phase Specific' checklist must be used, documented and baselined for each feature.
3. Any correspondence associated with this feature should also be documented (i.e., impromptu meetings, phone conversations, etc.) and associated with the feature number. It should include time, date, and participants.

1. Subject:

(brief description of change)

1. Provide methods to route a Complaint to the Contractor responsible for problem
2. Document and track dates, e.g., "Date Sent to Contractor" and "Date Returned from Contractor" Fields to be added to Complaint presentation.

2. Introduction:

(description of what system currently does, what needs to be changed, and why)

1. Currently there is no OSPCM method to directly send a Complaint to the Contractor perceived to be at fault, no are specific date fields available to enter a date sent to or received from a contractor. Also, user cannot directly switch to JE or JE-O to review an associated job which may be related to the Complaint. These capabilities are needed to avoid printing and faxing of info and to allow quick review of an associated Job. The dates are desired by Managers to review responsiveness of a contractor to Complaints. The data can be used for a Management Report to indicate status of Complaints.

3. Solution:
(describe what the system will or should do and any general constraints or conditions that limit the solution)

1. Provide Contractor access by addition of Complaints Icon to the Contractor allowed applications. Requires security code changes.
2. Telco District office will enter Complaints (may be at a distant location) and needs a revised form to first assign to a ResID who later will assign to a Contractor. Add fields to the Complaint presentation that allows user to select the contractor and enter "date sent to contractor". This could be default to "today" with overwrite capability. These fields would need to be added to database. These dates could then be used to report against in Mgmt. Reports.
3. Provide new form in Complaints for a Contractor to open and review. Then use to accept, reject and close the Complaint. Add "date for contractor return" for tracking.
4. Telco may need new form or revised "open list " form to review status daily. New field of "status" necessary.

4. Change(s):

| | |
|---|---|
| (detailed description of change) – [add additional rows if multiple changes] | 1. Add drop down with valid contractors by CMC and the selected nickname will be assigned to contractor.<br>2. Add date fields entry capability on Complaint.<br>3. Make ResID field required (Verify closing ability)<br>4. Add new fields to the database.<br>5. Make ResID field a dropdown list for CMC-default to logon but allow change.<br>6. Add Complaint Icon to Contractor menu with associated security addition and WinDDS download.<br>7. Allow a contractor to close or return a Complaint. |

5. Performance Requirements:

| | |
|---|---|
| (list any performance requirements associated with this change) **[Identify system response requirements that must be met for user acceptance]** | 1. None apparent |

6. Dependencies:

| | |
|---|---|
| (list any defects or features that this enhancement is dependent on or that will be | 1. Verify that any IC type of contractor nickname is included in CMC dropdown listing. |

dependent on this feature)

7. Benefits:

(provide benefits in dollars, reduced headcount, time savings, etc. for doing this work) [this is required to identify any savings that can be attributed to this feature for securing budget approval]

1. Simplify work process for users.
2. Better control of contractor administration by assignment to responsible contractor.
3. Manager time saving by avoidance of manual read of Complaints or assuming dates sent to or received from contractor.

| **8. Affected Components:** | **(check) Yes** | **(check) No** |
|---|---|---|
| **RTOC Instructions** | | **X** |
| **HELP** | **X** | |
| **User Guides** | **X** | |
| **Testing** | **X** | |
| **Infra-structure** | **X** | |
| **Management Reports** | | **X** |
| **Database** | **X** | |

9. Interfaces:

(list any legacy or new interface systems impacted by this change) [Make sure other interface systems are aware of and agree with any requirement change that impacts them before proceeding]

NONE

| | | |
|---|---|---|
| **10. Work-around** | **(check)**<br>**Yes** | **(check)**<br>**No** |
| (is there a temporary work around?) | **X** | |
| (describe work around in detail) **[Also identify this in the OSPCM 'known problem' document]** | 1. User may use the existing Mgmt. Report "Open Complaints" which gives the date opened and age of Complaint. It has an option to select by ResID.<br>2. It would be necessary to then open the actual Complaint and look for the date sent to contractor in the Complaint text. This would have to be mandatory by local M&P.<br>3. Send copy of Complaint by Fax to contractor. | |

11. Risks:

(list factors that impact, positive/negative, not doing this change)

1. User dissatisfaction
2. Work content not reduced
3. Contractor responsiveness to customers not easily measured
4. Status of Complaint difficult to determine.

12. Business Rules:

(list any business rules or constraints that should apply)

1. Make ResID a required field.
2. Allow contractor access only to own data.
3. M&P to cover local arbitration of disagreements
4. Contractor responsible for Subcontractor (M&P)
5. Contractor allowed to close a Complaint

13. Document Changes:

| | |
|---|---|
| (list affected documents requiring change) [Documentation should prepare a checklist covering each document that must be updated for this feature] | 1. Complaint User Guide<br>2. Help information |

14. Special Training Requirements:

| | |
|---|---|
| (list any special training required for this feature, i.e., documentation, e-mail, help, cue cards, on sight, etc.) | 1. Update User Guides and Help to reflect |

15. Acceptance Criteria/Test Scenario:

| | |
|---|---|
| (list test scenarios required to test change prior to user acceptance. This can be updated after the detailed design is completed.)<br>**<u>REQUIRED</u> [Tester should prepare checklist based on these test scenarios for documentation on results of tests. These should be in matrix form identified back to the numbering scheme use din these test scenarios]** | 1. Create a Complaint and assign to a ResID. Save and Close.<br>2. ResID opens Complaints and searches by ResID for open list.<br>3. Selects, reviews and determines responsible contractor – makes notes in text field.<br>4. Assigns to a contractor (by contract # and nickname) in a dropdown for CMC.<br>5. Verify/enter Date Assigned field (default today)<br>6. Contractor opens new form "Complaints Assigned" that provides search<br>7. Contractor selects (receive data populates) Complaint for review.<br>8. Contractor review (in field or office) and decides to accept and fix as written by ResID in test field.<br>9. Click field or check boxes to indicate "status" such as accept, reject, and close.<br>10. Contractor performs work, makes notes in text field, selects check box, and enters closed date. Saves.<br>11. Telco opens Complaints and "returned list" (new form) Search for Complaint and opens to review status and notes and closure.<br>12. Telco satisfied with status and saves.<br>13. ***Note: Steps #1 thru #12 reflect the normal flow. Other*** |

*decisions follow and use the normal as a guide.*

14. In step #2, ResID decides that item belongs to another Supervisor so either refers back to District office with text notes or "reassigns" to correct ResID.
15. Original Telco/ResID enters correct ID in ResID field, text info and saves.
16. Now return to Step #2 and follow thru to #12 for the reassigned ResID.
17. *Next scenario* performs Step #1 thru #7 and then in step #8 contractor does not agree to fix or feels it belongs to another (e.g., CATV)
18. Contractor checks "reject" as in #9 and probably calls Telco/ResID to discuss offline.
19. Verify that steps #11 and #12 occur correctly, then assume an agreement with text notes (need a form of date tracking for such cases)
20. Return to step #8 for acceptance and on thru #12
21. *Next case* uses step #1 thru #7 and then #18 thru #20 and now Telco/ResID agrees that item needs to go to different contractor (e.g., BSW versus MM) or could be non Telco work (CATV0 and need to notify complainer.
22. Enter new "assignment", make text notes and Save.
23. Possible that #21 will also require closing of time-enter date and save.
24. Dates and status should be verified in the dB.
25. When available, Management Report should be verified.
26. *Next scenario* adds a related job as in existing Complaints module.
27. Perform steps #1 thru #12 but at step #3 see the Complaints User Guide and relate a Job to the item. Verify that related info follows thru process.

28. Review info as needed then Cancel or Exit to return to Guide.

16. Implementation:

(Identify if there is any special implementation issues that need to be addressed, i.e., field deployment; etc.)

1. Local agreements is needed as to arbitration methods for returned/rejected Complaints
2. Train District Complaint taker, ResIDs and contractor in new methods

17. Attachments:

(copies of screens, reports, etc. before and after proposed change)

Screens for the following are shown in Figs. 12-16.

1. First Open (Note: Will print attached, Placeholders On)
2. Open by ResID
3. Search results
4. Contractor complete
5. Close by ResID

Signatures of Agreement:

(add additional rows if necessary)

BAE: L. Edgar

Lead Analyst: M. Eike

Figure 12:
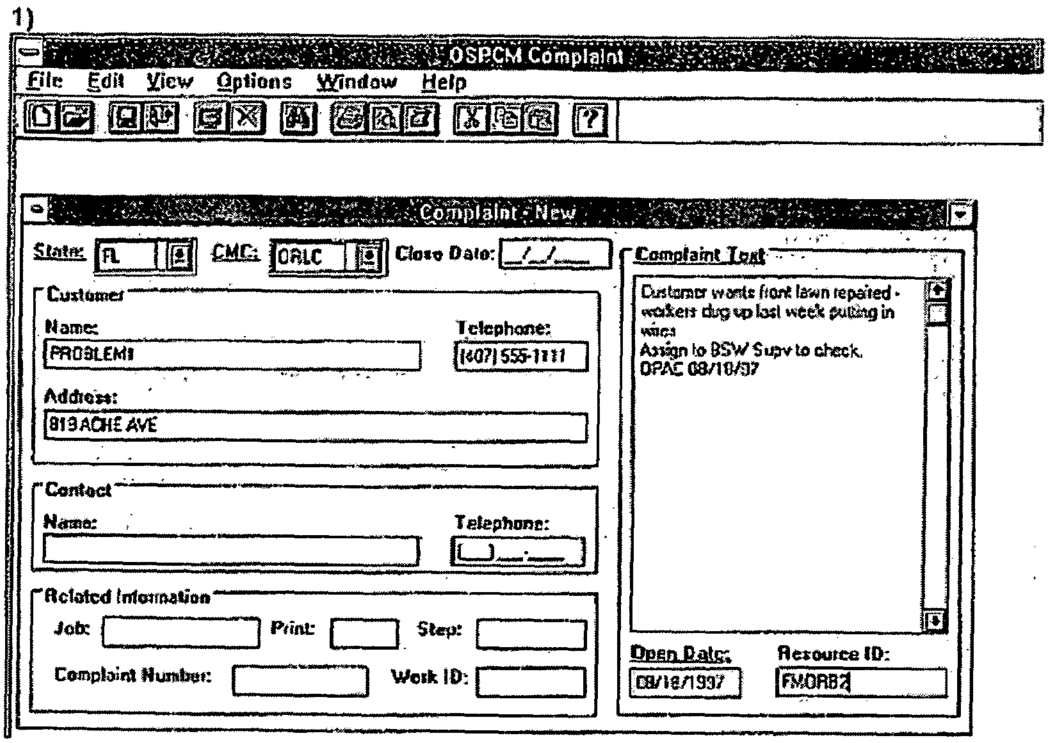
FIG. 12 is an exemplary screen print for OSPCM Complaint.

Fig. 12 is an exemplary screen print for opening a New Complaint in OSPCM.

Figure 13:
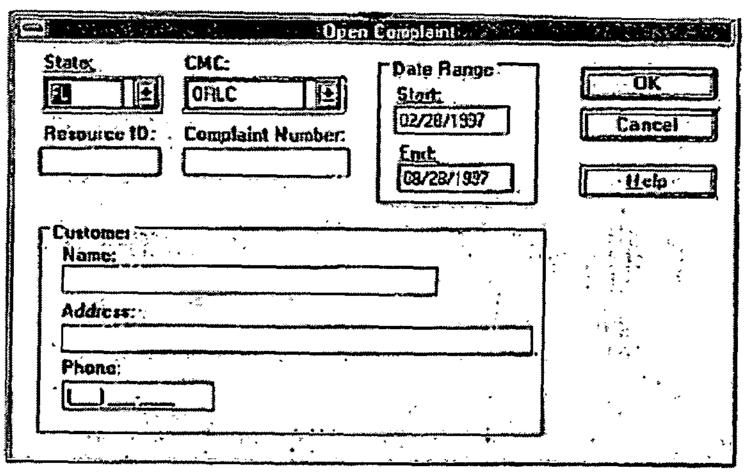
FIG. 13 is an exemplary screen print for Open Complaint

Fig. 13 is an exemplary screen print for Open Complaint, which the Supervisor [ResID] can log on and open Complaints.

-displays above search form

-situation is daily view so would used ResID? Can this populate based on logon?

-could we adapt to also use for contractor with some fields inactive?

Figure 14:
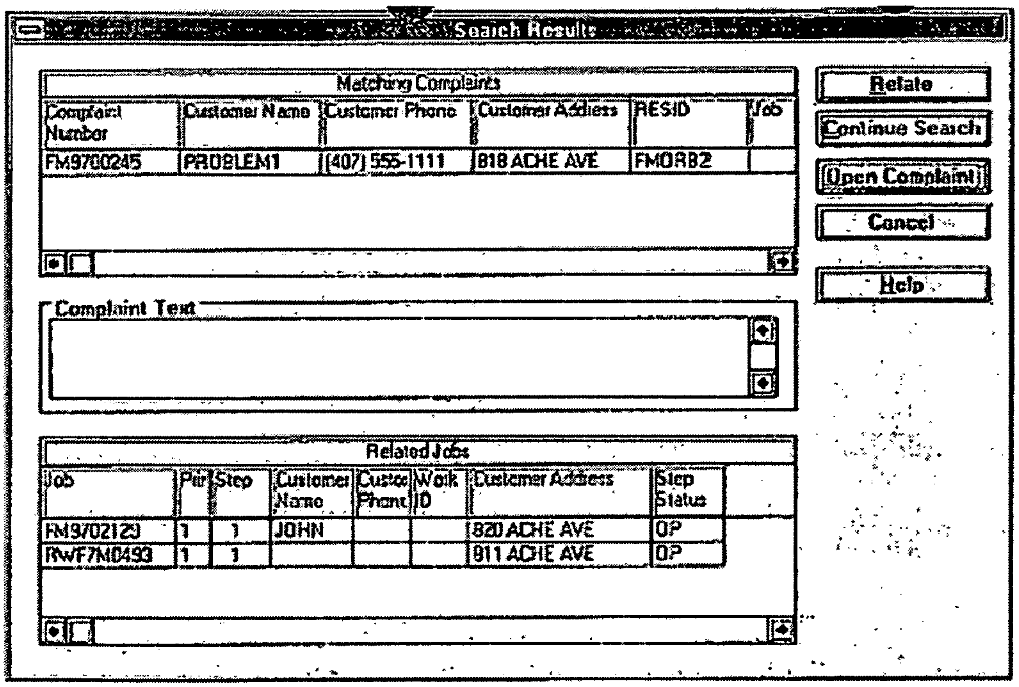
FIG. 14 is an exemplary screen print for Search Results.

Fig. 14 is an exemplary screen print for Search Results.

After ResID opens Complaint and does search based on address

Decides to relate BSW job to Complaint-may be wrong-visit will help

Figure 15:
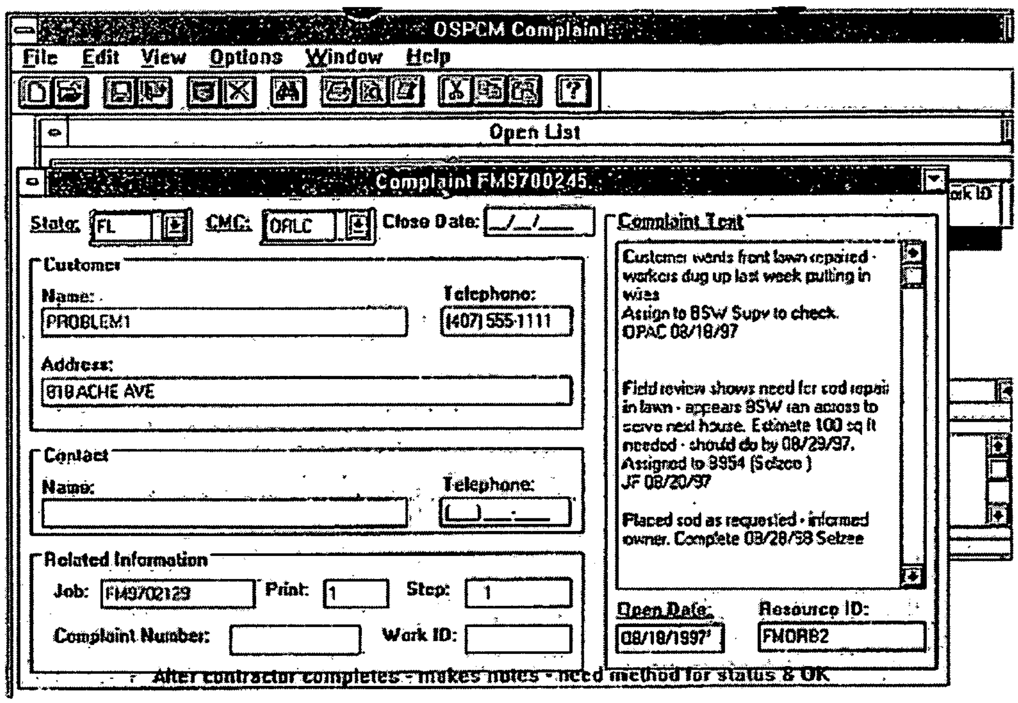
FIG. 15 is an exemplary screen print for Complaint on a Job.
Figure 16:
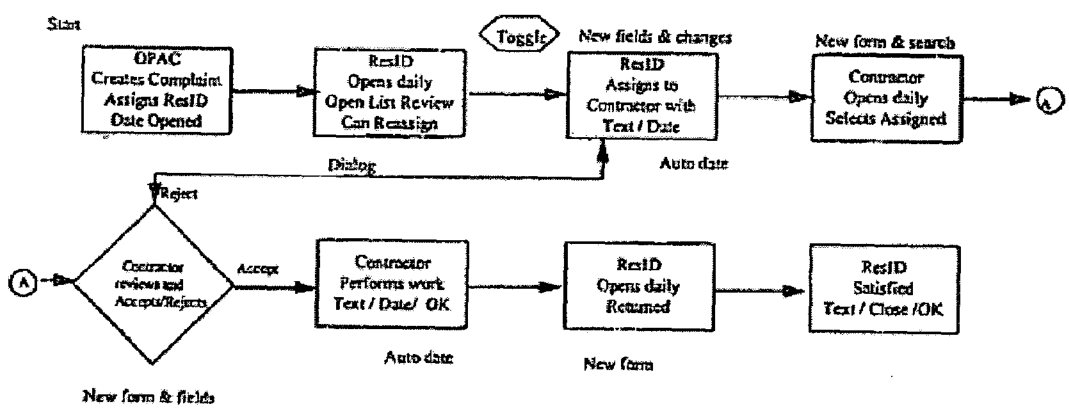
FIG. 16 is an exemplary flow chart from creating a complaint to satisfying the complaint.

Fig. 15 is an exemplary screen print for Complaint on a Job. Fig. 16 is an exemplary flow chart from creating a complaint to satisfying the complaint Notes for Fig. 16:

(1) toggle may be an Icon or other method to allow ResID to switch to JE or JE-O for job review & return.

(2) OPAC is used as creator but may be a District Office or other.

(3) Auto Date refers to a default or auto populated date.

(4) Dialog implies tel conversations or such to locally resolve rejection-text will help.

BAE FUNCTIONAL REQUIREMENT DOCUMENT

Table # 7000C

| | | | |
|---|---|---|---|
| **BAE Start Date:** | 03/04/1998 | **BAE Name:** | Gail Deaton |
| **BAE Comp. Date:** | 03/25/1998 | **BAE Tele. No.:** | (205) 977-3615 |
| **BAE Hours:** | 4 | **LA Assigned:** | |
| **CMVC Component Name:** | je_ewo | | |

Associated Defect/Feature No.:

| | | | |
|---|---|---|---|
| **Target Release:**<br>(give target release this needs to be in) **[Only identify if this is required for an emergency release or must be worked in next scheduled release]** | 2.12 | **Target Release Date:**<br>(give target release date for this enhancement, if required) | 06/98 |

Priority:
(provide priority from 'feature priority' list – number preliminary assigned by SME) — hi

Revision No.: C (B, C, etc. – this will require new signatures)

Reason for Revision: Add comments and corrections identified in walkthru on 3/24

General:
(General Information – nothing is to be typed here, this is for information only about the functional spec process.)

1. The purpose of this document is to provide the customer's view of the functionality that needs to be changed or added to the existing OSPCM product. It is not the detail design requirements. It should concentrate of 'what' is needed and not on the 'how' it is provided.
2. All features that are >40 hours/1 business area require a structured inspection walk through process (currently using FAGAN). This is to be scheduled by the responsible SME for this feature with the testing team lead, documentation team lead and the IT development Managers. The IT development Managers will assign the appropriate representatives to attend the meeting. These inspections are not to inspect the author, they are to be used to understand the functionality required for development of the 'Detail Design Document'.

3. The 'Analysis Phase Specific' checklist must be used, documented and baselined for each feature.

4. Any correspondence associated with this feature should also be documented (i.e., impromptu meetings, phone conversations, etc.) and associated with the feature number. It should include time, date, and participants.

5. Continue numbering scheme in your text input under each table to provide traceability for matrixes.

| | |
|---|---|
| **1. Abstract:** (brief description of change/addition - This should pretty closely match the abstract in CMVC. | 1.1 Order quantity for stub should always be "1". Do not allow user to change. |
| **2. Current Problem** (brief description of what system currently does, what needs to be changed and why) | 2.1 Field users are entering the footage of the stub. These stubs come already in pre-determined footages as described in the material description. When the user enters the footage of the stub in the order quantity, then that quantity of stubs are ordered. |
| **3. Proposed Solution:** (brief description of what the system will or should do an any general constraints or conditions that limit the solution) | 3.1 The field is prepopulated with the order quantity for stubs to "1". Do not allow any changes to the prepopulated data. |

4. Change/Addition(s):

| | |
|---|---|
| (detailed description of change/addition) | 4.1 On the Placing screen in je_ewo, the order quantity for stub is defaulted to "1".<br>Do not allow the user to change the prepopulated "1" in the order quantity field for the material category of **CABLE-STUB** and the material subcatagory of **STUB**. |

5. Performance Requirements:

| | |
|---|---|
| (list any performance requirements associated with this change) **[Identify system response requirements that must be met for user acceptance]** | 5.1 Performance should not be affected. |

6. Dependencies:

| | |
|---|---|
| (list any defects or features that this enhancement is dependent on or that will be dependent on this feature) | 6.1 |

7. Benefits:

| | |
|---|---|
| (provide benefits in dollars, reduced headcount, time savings, etc. for doing this work) **[This is required to identify any savings that can be attributed this feature for securing budget approval]** | 7.1 Save the field users from ordering and receiving large quantities of cable stubs from the factory and then having to process the returns. |

| **8. Affected Components:** | **(Check) Yes** | **(Check) No** |
|---|---|---|

| | | |
|---|---|---|
| RTOC Instructions | | |
| HELP | x | |
| User Guides | | |
| Testing | x | |
| Infra-structure | | |
| Management Reports | | |
| Database | | |

| | | |
|---|---|---|
| **9. Interfaces:** | | |
| (list any legacy or new interface systems impacted by this change) **[Make sure other interface systems are aware of and agree with any requirement change that impacts them before proceeding]** | 9.1 | |
| | **(Check) Yes** | **(Check) No** |
| **10. Work-around:** | | |
| (is there a temporary work around?) | | X |
| (describe work around in detail) **[Also identify this in the OSPCM 'known problem' document]** | 10.1 | |
| **11. Risks:** | | |
| (list factors that impact, positive/negative, not doing this change) | 11.1 Continue to allow field users to order and pay for huge quantities of cable stubs. | |

12. Business Rules:

| | |
|---|---|
| (list any business rules or constraints that should apply. If business rules are included in the changes section, identify these with asterisk in bold, *****business rule*****) | 12.1 Job Entry EWO on the Placing screen...Any substep entered with the material category of CABLE-STUB and the subcategory of STUB should always default to "1" in the Order Quantity field. The user should not be able to change this default. |

13. Documentation Changes:

| | |
|---|---|
| (list affected documents requiring change) **[Documentation should prepare a checklist covering each document that must be updated for this feature]** | 13.1 Change On-Line Help to indicate that the Order Quantity field for the material category of CABLE-STUB and the subcategory of STUB cannot be changed by the user. |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 Send out OSPCM Product Bulletin |

15. Acceptance Criteria/Test Scenario:

| | |
|---|---|
| (list test scenarios required to test change prior to user acceptance, this can be updated after the detailed design is complemented.) **REQUIRED** | 15.1 Enter a cable stub in the "A" environment. Verify that the Order Quantity field is prepopulated with a "1". Save the substep, configure and price. Firm the price. Go to materials management and verify that the cable stub is in the "N" status on the requirements screen. Repeat the above for "B" "U" "H" environments. |

| | |
|---|---|
| **[Tester should prepare checklist based on these test scenarios for documentation on results of tests. These should be in matrix from identified back to the numbering scheme use in these test scenarios]** | Enter a stub substep and try to blank out the prepopulated quantity of "1". The system should not allow this.<br><br>Enter a stub substep and try to overtype the prepopulated quantity of "1" with a "0". The system should not allow this. |
| **17. Attachments:**<br>(copies of screens, reports, etc. before and after proposed change – only identify if the customer requires the screen or something on the screen to look a certain way) | 16.1 |

Signatures of Agreement:
(add additional rows if necessary)
BAE:
Lead Analyst:

BAE FUNCTIONAL DOCUMENT

Table # 7002B

| | | | |
|---|---|---|---|
| **BAE Start Date:** | **09/09/1997** | **BAE Name:** | **Gail Deaton** |
| **BAE Comp. Date:** | **05/21/1998** | **BAE Tele. No.:** | **977-3615** |
| **BAE Hours:** | **20** | **LA Assigned:** | |

CMVC Component Name: je_ewo
Associated Defect/Feature No.:

| | | | |
|---|---|---|---|
| **Target Release**<br>(give target release this needs to be in) **[only identify if this is** | 2.15 | **Target Release Date:**<br>(give target release date for this enhancement, if required | |

| | | |
|---|---|---|
| **required for an emergency release or must be worked in next scheduled release]** | | |
| **Priority:** (provide priority from 'feature priority' list – number preliminary assigned by SME) | Production_hi | |
| **Revision No.:** | B | (B, C, etc. – this will require new signatures) |
| **Reason for Revision:** | | |

General:

(General information – nothing to be typed here, this is for information only about the functional spec process)

1. The purpose of this document is to provide the customer's view of the functionality that needs to be changed or added to the existing OSPCM product. It is not the detail design requirements. It should concentrate of 'what' is needed and not on the 'how' it is provided.
2. All features that are >40 hours/1 business area require a structured inspection walk through process (currently using FAGAN). This is to be scheduled by the responsible SME for this feature with the testing team lead, documentation team lead and the IT development Managers. The IT development Managers will assign the appropriate representatives to attend the meeting. These inspections are not to inspect the author, they are to be used to understand the functionality required for development of the 'Detail Design Document'.
3. The 'Analysis Phase Specific' checklist must be used, documented and baselined for each feature.
4. Any correspondence associated with this feature should also be documented (i.e., impromptu meetings, phone conversations, etc.) and associated with the feature number. It should include time, date, and participants.
5. Continue numbering scheme in your text input under each table to provide traceability for matrixes.

1. Abstract:

(brief description of change/addition - This should pretty closely match the abstract in CMVC.)

Reopen or close jobs

Create a new process and screen for EWO and PWO type jobs that will allow the user to reopen a job after auto close.

Create a new process and screens for EWO and PWO type jobs that will allow the user to close a job manually before the auto close process.

2. Current Problem:

(brief description of what systems currently does, what needs to be changed, and why)

Reopen or close jobs

Create there is not a process that will allow the user to reopen a EWO or PWO after that job has been auto closed. A new process and new screens need to be created to allow the user to reopen a closed EWO or PWO.

Currently there is not a process that will allow the user to close a EWO or PWO before the auto close process.

A new process and new screens need to be created to allow the user to close a EWO or PWO before the auto close process.

3. Proposed Solution:

(brief description of what the system will or should do an any general constraints or conditions that limit the solution)

Reopen or close jobs

Create new REOPEN JOB menu, toolbar and screens that will allow the user to reopen a closed job.

Create new CLOSE JOB menu, toolbar and screens that will allow the user to close a job.

Need to capture the previous and last CUIDs (or last 2 instances) of who reopened and closed jobs.

4. Change/Addition(s):

(detailed description of

4. Reopen or close jobs change/addition)

4.1 Create a new icon (REOPEN JOB) and place on the je_ewo tool bar. Icon should always to active.

This icon should allow the user to access a new screen to reopen a closed EWO or PWO.

4.1.1 The new screen labeled REOPEN JOB should contain:

4.1.1.1 State 4.1.1.2 CMC 4.1.1.3 Job Name field 4.1.1.4 There should also be a grid labeled Job Name which will contain a drop down of closed jobs when search is selected.

4.1.1.5 The user will enter or select the job name desired.

4.1.1.6 EMU should be generated if the job number entered is not a closed job.

4.1.1.7 EMU should be generated if job is invalid for state.

4.1.2 Once entered OSPCM should display a new screen with the following prepopulated information:

4.1.2.1 Job Name 4.1.2.2 State 4.1.2.3 CMC 4.1.2.4 The "end-date" of the job 4.1.2.5 The "closed" date of the job.

4.1.2.6 The user should be given two options to reopen the job:

4.1.2.6.1 Reopen the job and reset end date to today's date. This option will start the auto close counter and close the job based on the auto close default in the OPF table for this CMC.

4.1.2.6.2 Reopen the job and leave open. This option will leave the job open until it is manually closed by the user. To do this set the Progressive Job Indicator to "Y".

4.2 Close job 4.2.1 Create a new icon (CLOSE JOB) and place on the main je_ewo tool bar. Icon should always be active. This icon should allow the user to access a new screen to Close a EWO or PWO.

4.2.2 Create a new screen and label CLOSE JOB. Screen should contain:

4.2.2.1 State 4.2.2.2 CMC 4.2.2.3 Job Name 4.2.2.4 Job Name grid. This grid should contain a drop down of all open job when Search is selected.

4.2.2.5 The user will enter or select the job number desired.

4.2.2.6 EMU should be issued if the job number entered is already closed.

4.2.2.7 EMU should be generated if job is invalid in State.

4.2.3 Once entered OSPCM should query and display the following job information on a new screen.

4.2.3.1. If there are substeps open on the job, List the Work ID, Print, Step, WE and WA for all substeps and the Material Description (for placing and removal screen) of the open substeps. Issue message to user that the above substeps are open and the job cannot be closed.

4.2.4 If all the substeps are closed. Create a new screen labeled CLOSE JOB. The screen should contain:

4.2.4.1.1 Job Name 4.2.4.1.2 State 4.2.4.1.3 CMC 4.2.4.1.4 All the substeps for this job are complete. The last substep close date is xx/xx/xxxx. Please enter the job close date. Field should be labeled Close Date.

4.2.4.1.5 Job close date must be between and can include last substep close date and current date.

4.2.4.1.6 EMU should be generated if outside of range.

5. Performance Requirements:
(list any performance requirements associated with this change)
[Identify system response requirements that must be met for user acceptance]

Standard three second response time should be adhered.

6. Dependencies:

| | | |
|---|---|---|
| (list any defects or features that this enhancement is dependent on or that will be dependent on this feature) | 6 | None |

7. Benefits:

| | | |
|---|---|---|
| (provide benefits in dollars, reduced headcount, time savings, etc. for doing this work) **[This is required to identify any savings that can be attributed this feature for securing budget approval]** | 7 | Currently the user calls the HELP desk for OSPCM to reopen or close a job. This process is timely for the user and it also adds volume to the HELP desk troubles. This feature will allow the user to perform these functions in a quick manner. |

| **8. Affected Components:** | **(Check) Yes** | **(Check) No** |
|---|---|---|
| RTOC Instructions | | x |
| HELP | x | |
| User Guides | x | |
| Testing | x | |
| Infra-structure | x | |
| Management Reports | | x |
| Database | x | |

9. Interfaces:

| | | |
|---|---|---|
| (list any legacy or new interface systems impacted by this change) **[Make sure other interface systems are aware of and agree with any requirement change that impacts them before** | 9 | None |

proceeding]

| | (Check) Yes | | (Check) No |
|---|---|---|---|
| **10. Work-around:** | | | |
| (is there a temporary work around?) | X | | |
| (describe work around in detail) **[Also identify this in the OSPCM 'known problem' document]** | 10 | Continue to use the HELP desk. | |
| **11. Risks:** | | | |
| (list factors that impact, positive/negative, not doing this change) | 11 | None | |
| **12. Business Rules:** | | | |
| (list any business rules or constraints that should apply. If business rules are included in the changes section, identify these with asterisk in bold, *****business rule*****) | 12 | Any user with je_ewo access can reopen or close jobs. | |
| **13. Documentation Changes:** | | | |
| (list affected documents requiring change) **[Documentation should prepare a checklist covering each document that must be updated for this feature]** | 13 | Job Entry_EWO guide.<br>On-line Help | |

14. Special Training/Implementation Requirements:

| | | |
|---|---|---|
| (list any special training/implementation required for this feature. Identify what will be required to train and implement this feature to the customer, i.e., by documentation, e-mail, help, cue cards, on sight training, etc.) | 14 | Release Notes |

15. Acceptance Criteria/Test Scenario:

| | | |
|---|---|---|
| (list test scenarios required to test change prior to user acceptance, this can be updated after the detailed design is complemented.) **REQUIRED [Tester should prepare checklist based on these test scenarios for documentation on results of tests. These should be in matrix from identified back to the numbering scheme use in these test scenarios]** | 15 | See Attachment |

16. Attachments:

| | |
|---|---|
| (copies of screens, reports, etc. before and after proposed change – only identify if the customer requires the screen or something on the screen to look a certain way) | Attachments of proposed screens<br>Test scenarios |

Signatures of Agreement:

(add additional rows if necessary)

BAE: (on file) 5/28/98

Lead Analyst: (on file) 5/28/98

BAE FUNCTIONAL DOCUMENT

Table # 2375

| | | | |
|---|---|---|---|
| **BAE Start Date:** | **June 15, 1997** | **BAE Name:** | **Carol A. Brechtel** |
| **BAE Comp. Date:** | **June 16, 1997** | **BAE Tele. No.:205-977-3611** | |
| **BAE Hours:** | **1** | **LA Assigned:** | |
| **CMVC Component Name:** | MATMGMT | | |
| **Associated Defect/Feature No.:** | **6574** | | |

| | | | |
|---|---|---|---|
| **Target Release**<br>(give target release this needs to be in) | 2.1 | **Target Release Date:**<br>(give target release date for this enhancement, if required | |

Priority:
(provide priority from 'feature priority' list – production_hi through deferred_low) — Production_hi

Revision No.:

Reason for Revision:

Subject:
(brief description of change)

1 Allow the user to scan for inventory items with less quantity than required.

Introduction:
(description of what system currently does, what needs to be changed, and why)

1 The automatic inventory scan only searches for an displays existing inventory equal to or greater than the smallest requirement. Need to enhance the system to find and display ALL like existing inventory.

Solution:
(describe what the system will

1 Small inventory scan (automatic scan) should display ALL

| | |
|---|---|
| or should do and any general constraints or conditions that limit the solution) | existing inventory found to satisfy the requirement regardless of the quantity needed to satisfy the requirements. |
| **Changes:** | |
| (detailed description of change) [add additional rows of multiple changes] | 1 Automatic inventory scan should display ALL existing inventory for like materials. Allow the user to view cable items that are less than the quantity needed on the requirement. |
| **Performance Requirements:** | |
| list any performance requirements associated with this change) | 1 There should be no noticeable affect on performance. |
| **Dependencies:** | |
| (list any defects or features that this enhancement is dependent on) | 1 None |
| **Benefits:** | |
| (provide benefits in dollars, reduced headcount, time savings, etc. for doing this work) | 1 Allow the user to see all existing inventory for the material description requested on the scan<br>2 Use existing inventory to satisfy a job's requirements |

| **Affected Components:** | **(Check) Yes** | **(Check) No** |
|---|---|---|

| | | |
|---|---|---|
| RTOC Instructions | | x |
| HELP | x | |
| User Guides | x | |
| Testing | x | |
| Infra-structure | | x |
| Management Reports | | x |
| Database | | x |

Interfaces:

(list any legacy or new interface systems impacted by this change) 1 None

| **Work-around:** | (Check) **Yes** | (Check) **No** |
|---|---|---|
| (is there a temporary work around?) | | x |
| (describe work around in detail) | 1. | |

Risks:

(list factors that impact, positive/negative, not doing this change) 1. Material may be ordered when existing inventory could be used.

Business Rules:

(list any business rules or constraints that should apply) 1. Display all existing inventory that satisfies the requested scan, regardless of the quantity.

Documentation Changes:

(list affected documents requiring change)

1. Material Management User Guide
2. Functional Decomps
3. Test Scenarios

Acceptance Criteria/Test Scenario:

| | | |
|---|---|---|
| (list test scenarios required to test change prior to user acceptance) **REQUIRED** | 1 | Encode or select a job with cable requirements |
| | 2 | Build unassign or surplus inventory to satisfy the requirements. Build the material into several inventory sites. |
| | 3 | Display the "Job Needed Requirements for Job XX" window |
| | 4 | Select the substep for the cable requirement |
| | 5 | Execute an inventory scan |
| | 6 | Verify that the scan returns ALL like inventory, regardless of the quantity |
| | 7 | Assign and/or transfer the material. Depending on where the material is located will determine if you need to assign or request a transfer. (Test Scenario may need to be updated if Feature #6574 is worked before this feature) |

Attachments:

| | | |
|---|---|---|
| (copies of screens, reports, etc. before and after proposed change) | 1. | None |

Signatures of Agreement:

(add additional rows if necessary)

BAE:

Lead Analyst:

BAE FUNCTIONAL DOCUMENT

Table # 7012A

BAE Start Date: May 8, 1998 BAE Name: Carol A. Brechtel

BAE Comp. Date: May 11, 1998 BAE Tele. No.:205-977-3611

BAE Hours: 3 hours LA Assigned: Karin Olinger

CMVC Component Name: MATMGMT

Associated Defect/Feature No.:

Target Release
(give target release this needs to be in) [only identify if this is required for an emergency release or must be worked in next scheduled release]

Target Release Date:
(give target release date for this enhancement, if required

Priority:
(provide priority from 'feature priority' list – number preliminary assigned by SME)

Revision No.: (B, C, etc. – this will require new signatures)

Reason for Revision:

General:
(General Information – nothing is to be typed here, this is for information only about the functional spec process.)

1. The purpose of this document is to provide the customer's view of the functionality that needs to be changed or added to the existing OSPCM product. It is not the detail design requirements. It should concentrate of 'what' is needed and not on the 'how' it is provided.
2. All features that are >40 hours/1 business area require a structured inspection walk through process (currently using FAGAN). This is to be scheduled by the responsible SME for this feature with the testing team lead, documentation team lead and the IT development Managers. The IT development Managers will assign the appropriate representatives to attend the meeting. Th4ese inspections are not to inspect the author, they are to be used to understand the functionality required for development of the 'Detail Design Document'.

3. The 'Analysis Phase Specific' checklist must be used, documented and baselined for each feature.

4. Any correspondence associated with this feature should also be documented (i.e., impromptu meetings, phone conversations, etc.) and associated with the feature number. It should include time, date, and participants.

5. Continue numbering scheme in your text input under each table to provide traceability for matrixes.

1. Abstract:

(brief description of change/addition - This should pretty closely match the abstract in CMVC.

1.1 Enhance Materials to read the Job Entry substep remarks and populate the order item remarks when the order is created.

2. Current Problem:

(description of what system currently does, what needs to be changed, and why)

2.1 Today the order remark and order line item remarks can not be populated until the order is created in the Materials Management executable. Any substep remarks entered while encoding the jobs are not read by materials. This feature will allow the user to encode substep remarks while encoding the job and materials will pre-populate the order line items remarks with the substep remarks when the order is created.

3. Proposed Solution:

(describe what the system will or should do and any general constraints or conditions that limit the solution)

3.1 Any substeps remark entered during encoding will be read by materials and the substep remark will appear as the order line item remark when the order is created.

3.2 A substep remark can be up to 250 characters but an order item remarks can only be 35 characters. so a substep remark longer than 35 characters will be truncated.

3.3 The order line remark will be populated with the first 35 characters of the first remark of the first substep that makes up that order item.

4. Changes/Addition(s):

(detailed description of change)

4.1 When a order is created, materials will read the substep remarks and populate the order item remarks with the information. The remarks will be sent to OrderMaster.

4.2 Substep remark can be up to 250 characters (longer if multiple remarks) but only 35 characters can be sent to OrderMaster. So a substep remark longer than 35 characters will be truncated. The system will populate the order item remarks with the first 35 characters of the substep remark.

4.3 The user will need the ability to edit the order item remarks before sending the order to OrderMaster (available today).

4.4 The system will populate the order item remarks with the first 35 characters of the first remark of the first substep aggregated to the order item.

4.5 Materials will read all substep remarks when an order is created no just the substep remarks associated with DLC/COE equipment.

4.6 If the order is marked as emergency and one of the substeps is for consignment material, the substep remark will be overwritten with the ship from consignment remark. This is currently being done by the system.

5. Performance Requirements:

(list any performance requirements associated with this change) [Identify system response requirements that must be met for user acceptance]

5.1 There should be no noticeable affect on performance

6. Dependencies:

| | | |
|---|---|---|
| (list any defects or features that this enhancement is dependent on or that will be dependent on this feature) | 6.1 | None |

7. Benefits:

| | | |
|---|---|---|
| (provide benefits in dollars, reduced headcount, time savings, etc. for doing this work) **[This is required to identify any saving that can be attributed this feature for securing budget approval]** | 7.1 | The user will have the ability to encode any order item remarks while encoding the job(as substep remarks). |
| | 7.2 | In many of the districts material is being ordered by the Construction Supervisor they do not remember or know what remarks needs to be sent tot he vendor when ordering Central Office Equipment. |

| **8. Affected Components:** | **(Check) Yes** | **(Check) No** |
|---|---|---|
| RTOC Instructions | | x |
| HELP | x | |
| User Guides | x | |
| Testing | x | |
| Infra-structure | | x |
| Management Reports | | x |
| Database | | x |

9. Interfaces:

| | | |
|---|---|---|
| (list any legacy or new interface systems impacted by this change) **[Make sure other interface systems are aware of and agree with any requirement change that** | 9.1 | None |

| | | |
|---|---|---|
| impacts them before proceeding] | | |
| | (Check) | (Check) |
| **10. Work-around:** | **Yes** | **No** |
| (is there a temporary work around?) | x | |
| (describe work around in detail) **[Also identify this in the OSPCM 'known problem' document]** | 10.1 The user must remember to enter the order item remarks on the Generate Order window before the order is sent to OrderMaster. | |
| **11. Risks:** (list factors that impact, positive/negative, not doing this change) | 11.1 Today material is being ordered without the correct remarks being sent tot he vendor.<br>11.2 Material can be ordered and the user not get exactly what they required or the material may be shipped to the incorrect location. | |
| **12. Business Rules:** (list any business rules or constraints that should apply. If the business rules are included in the changes section, identify these with asterisk in bold, *****business rule*****) | 12.1 If the order is marked as emergency and for consignment material any substeps remarks will be over written with the ship from consignment remark.<br>12.2 For this to work properly the user must populate the substep remark field.<br>12.3 The system will populate the order item remarks with the first 35 characters of the first remark of the first substep aggregated to that order item. | |
| **13. Documentation Changes:** (list affected documents requiring change) **[Documentation should prepare a checklist covering** | 13.1 Job Entry User Guide (to inform the user where the remarks should be entered and that only the first 35 characters are sent to OrderMaseter).<br>13.2 Functional Decomps | |

| | |
|---|---|
| **each document that must be updated for this feature]** | 13.3 Help, for both Job Entry & Materials Management<br>13.4 Test Scenario<br>13.5 Material Management User Guide<br>13.6 Material Management Business Solution(s) |

14. Special Training/Implementation Requirements:

| | |
|---|---|
| (list any special training/implementation required for this feature. Identify what will be required to train and implement this feature to the customer, i.e. by documentation, e-mail, help, cue cards, on-sight training, etc.) | 14.1 None |

Acceptance Criteria/Test Scenario:

| | |
|---|---|
| (list test scenarios required to test change prior to user acceptance, this can be updated after the detailed design is completed.) **<u>REQUIRED</u>** **[Tester should prepare checklist based on these test scenarios for documentation on results of tests. These should be in matrix from identified back to the numbering scheme used in these test scenarios]** | 15.1 Encode a job with multiple substeps: one for DLC equipment with a substep remark of 35 characters or less, one for DLC equipment with a substep remark with more than 35 characters, encode several substeps for cable that will be aggregated when the order is created and put a substep remarks on all cable substeps, encode one substep for consignment material, encode a substep with multiple remarks, and encode several substep without substep remarks.<br>15.2 Configure, price and firm the job<br>15.3 In Materials Management create an order and verify that the substep remarks have been populate in the order item remarks field.<br>15.4 For the consignments item verify that when the order is sent to OrderMaster that the order item remarks was changed tot he shop from consignment remarks.<br>15.5 For the aggregate cable order verify that the order item remarks is populated with the substep remark from the first aggregate item. |

15.6 For the item that was encoded with a substep remark greater than 35 characters verify that the remark was truncated and the order item remarks was populated with the first 35 characters.

15.7 Verify that all remarks are being passed to OrderMaster properly. I have listed all the items that need to be test, this can be done by encoding one job or multiple jobs, but created one order or multiple orders I will leave this up to the tester.

16. Attachments:
(copies of screens, reports, etc. before and after proposed change – only identify if the customer requires the screen or something on the screen to look a certain way)

16.1 None

Signatures of Agreement:
(add additional rows if necessary)

BAE: (on file) 5/14/98
Lead Analyst: (on file) 5/14/98

BAE FUNCTIONAL DOCUMENT

Table # 7017B

BAE Start Date: 05/22/1998 BAE Name: Gail Deaton
BAE Comp. Date: 06/04/1998 BAE Tele. No.: 205-977-3615
BAE Hours: 10 LA Assigned:
CMVC Component Name: je_ewo
Associated Defect/Feature No.:

| | | |
|---|---|---|
| **Target Release**<br>(give target release this needs to be in) **[only identify if this is required for an emergency release or must be worked in next scheduled release]** | **2.15** | **Target Release Date:**<br>(give target release date for this enhancement, if required |

| | |
|---|---|
| **Priority:**<br>(provide priority from 'feature priority' list – number preliminary assigned by SME) | Production_hi |

Revision No.: B (B, C, etc. – this will require new signatures)
Reason for Revision: Walkthru changes

General:

(General information – nothing to be typed here, this is for information only about the functional spec process)

1. The purpose of this document is to provide the customer's view of the functionality that needs to be changed or added to the existing OSPCM product. It is not the detail design requirements. It should concentrate of 'what' is needed and not on the 'how' it is provided.
2. All features that are >40 hours/1 business area require a structured inspection walk through process (currently using FAGAN). This is to be scheduled by the responsible SME for this feature with the testing team lead, documentation team lead and the IT development Managers. The IT development Managers will assign the appropriate representatives to attend the meeting. Th4ese inspections are not to inspect the author, they are to be used to understand the functionality required for development of the 'Detail Design Document'.

3. The 'Analysis Phase Specific' checklist must be used, documented and baselined for each feature.

4. Any correspondence associated with this feature should also be documented (i.e., impromptu meetings, phone conversations, etc.) and associated with the feature number. It should include time, date, and participants.

5. Continue numbering scheme in your text input under each table to provide traceability for matrixes.

| | |
|---|---|
| **1. Abstract:**<br>(brief description of change/addition<br>- This should pretty closely match the abstract in CMVC. | 1 Placing screen and Placing Replaced Item screen – CWI Information grid – Enable to CWI Qty field for all substeps. |
| **2. Current Problem**<br>(brief description of what the system will or should do and any general constraints or conditions that limit the solution) | 2. The CWI Information grid is only enabled for substeps that require a Depth, Width, Diameter, New/Existing. Substeps not requiring the entries read the Record Qty as the CWI Qty. It has been identified that work actions such as PLAC2 can have a CWI Qty different that they Record Qty. Precast manholes in the 1995 Regional Contract are calculated on cubic feet. The user needs to be able to enter the cubic feet in the CWI Qty field. This feature will allow the user to enter the actual CWI Qty for contract work. |
| **3. Proposed Solution:**<br>(brief description of what the system will or should do an any general constraints or | 3. Enable CWI Qty on the Job Entry Placing and the Placing Replaced Item Screen for all substeps. |

conditions that limit the solution)

4. Change/Addition(s):
(detailed description of change/addition)

4. Job Entry – Placing screen Enable the CWI Qty field in the CWI Information grid for all substeps entered on the Placing screen and the Placing Replaced Item screen 4.1 The Depth, Width, Diameter, New/Existing fields should continue to be enabled and defaulted as currently coded. The CWI Qty is presently required when the CWI Qty is presently required when the CWI Information fields of Depth, Width, Diameter or New/Existing is prepopulated.

4.2 For substeps not using Depth, Width, Diameter, New/Existing 4.2.1 CWI Qty is enabled but input it is optional.

4.2.2 "0" zero is not allowed 4.2.3 Null or blank is allowed 4.3 Preconfiguration of substep 4.3.1 Determine if the substep is "C" contract or "T" telco 4.3.1.1 If the substep is "T" telco 4.3.1.1.1 Always use the Record Qty for STIs 4.3.1.1.2 CWI Qty is ignored 4.3.1.2 If the substep is "C" contract 4.3.1.2.1 Always use the Record Qty for STIs 4.3.1.2.2 For CWI generation look at the CWI Qty(s) first. If the populated use this qty. If the CWI Qty is not populated, use the Record Qty as the CWI Qty.

4.3.2 Configuration will use the quantities determined in preconfiguration.

| | |
|---|---|
| **5. Performance Requirements:** | |
| (list any performance requirements associated with this change) **[Identify system response requirements that must be met for user acceptance]** | 5. Performance should not be affected |
| **6. Dependencies:** | |
| (list any defects or features that this enhancement is dependent on or that will be dependent on this feature) | 6. None |
| **7. Benefits:** | |
| (provide benefits in dollars, reduced headcount, time savings, etc. for doing this work) **[This is required to identify any savings that can be attributed this feature for securing budget approval]** | 7. Enable the user to provide accurate contract billing expectations to the master contractors. Reduce the number of CIBEs generated by the contractor. |

| **8. Affected Components:** | **(Check) Yes** | **(Check) No** |
|---|---|---|

| | | |
|---|---|---|
| RTOC Instructions | | x |
| HELP | x | |
| User Guides | x | |
| Testing | x | |
| Infra-structure | | x |
| Management Reports | | x |
| Database | | x |

9. Interfaces:

| | |
|---|---|
| (list any legacy or new interface systems impacted by this change) **[Make sure other interface systems are aware of and agree with any requirement change that impacts them before proceeding]** | 9. None |

| | (Check) | (Check) |
|---|---|---|
| **10. Work-around:** | **Yes** | **No** |
| (is there a temporary work around?) | | X |
| (describe work around in detail) **[Also identify this in the OSPCM 'known problem' document]** | 10. | |

11. Risks:

| | |
|---|---|
| (list factors that impact, positive/negative, not doing this change) | 11. OSPCM is producing inaccurate billing exceptions to the master contractors for PLAC2 work actions and for precast manholes in the 1995 regional contract. |

12. Business Rules:

| | |
|---|---|
| (list any business rules or constraints that should apply. If business rules are included in the changes section, identify these with asterisk in bold, *****business rule*****) | 12. Always ignore the CWI Qty field when preconfiguring Telco substeps.<br><br>CWI Qty can be greater than, less than, or equal to the Record Qty.<br>CWI Qty cannot be "0" zero. |

13. Documentation Changes:

| | |
|---|---|
| (list affected documents requiring change) **[Documentation should prepare a checklist covering each document that must be updated for this feature]** | 13. On-line Help<br>User Guides |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14 Release Notes |

15. Acceptance Criteria/Test Scenario:

| | |
|---|---|
| (list test scenarios required to test change prior to user acceptance, this can be updated after the detailed design is complemented.) **REQUIRED [Tester should prepare checklist based on these test** | 15. **Test using the 1995 version of the master contract See Gail Deaton to set up Tables before testing**<br>15.1 Enter a contractor substep on the Placing screen<br>WE= "A" Work Action = "PLAC" FRC= "1C"<br>Material Desc = "40-5" Record Qty = "1" Order Qty = "1"<br>Verify that the CWI Qty in the CWI Information grid is enabled<br>Verify that the Depth, Width, Diameter, New/Existing is not |

scenarios for documentation on results of tests. These should be in matrix from identified back to the numbering scheme use in these test scenarios]

enabled.

Verify a number can be entered in the CWI Qty.

Enter "5" in CWI Qty

Enter a "0". Verify that "0" cannot be entered.

Blank out the field. Verify that the field can be blanked out.

Save the substep.

Configure.

Go to the Contract Detail screen and verify

CWI = "P001A" CWI = "1"

CWI = "P405M" CWI = "1"

15.2 Enter a contractor substep on the Placing screen

WE= "A" Work Action = "PLAC" FRC= "1C"

Material Desc = "40-5" Record Qty = "1" Order Qty = "1"

Verify that the CWI Qty in the CWI Information grid is enabled.

Verify that the Depth, Width, Diameter, New/Existing is not enabled.

Enter a "0". Verify that "0" cannot be entered.

Blank out the field. Verify that the field can be blanked out.

Enter "5" in CWI Qty

Save the substep.

Configure.

Go to the Contract Detail screen and verify

CWI = "P001B" CWI Qty = "5"

CWI = "P405M" CWI Qty = "5"

15.3 Enter a contractor substep on the Placing screen

WE= "B" Work Action = "PLAC2" FRC= "45C"

Material Desc = "ANMW-100" Record Qty = "1000" Order Qty = "1050"

Verify that the CWI Qty in the CWI Information grid is enabled.

Verify that the Depth, Width, Diameter, New/Existing is not enabled.

Enter "950" in CWI Qty

Save the substep.

Configure.

Go to the Contract Detail screen and verify that the CWI = "C120A" CWI Qty = "950"

15.4 Enter a contractor substep on the Placing screen WE= "B" Work Action = "FP" FRC= "45C"

Material Desc = "MH-PC-6x12x12" Record Qty = "1" Order Qty = "1"

Verify that the CWI Qty in the CWI Information grid is enabled.

Verify that the Depth, Width, Diameter, New/Existing is not enabled.

Enter "864" in CWI Qty

Save the substep.

Configure.

Go to the Contract Detail screen and verify that the CWI = "M031B" CWI Qty = "864"

Enter a contractor substep on the Placing screen

WE= "B" Work Action = "PLAC" FRC= "45C"

Material Desc = "MH-PC-6x12x12" Record Qty = "1" Order Qty = "1"

Verify that the CWI Qty in the CWI Information grid is enabled.

Verify that the Depth, Width, Diameter, New/Existing is not enabled.

Save the substep.

Configure.

Go to the Contract Detail screen and verify that the CWI = "M030B" CWI Qty = "864"

Enter a contractor substep on the Placing screen

WE= "B" Work Action = "PLAC" FRC= "45C"

Material Desc = "AMNW-100" Record Qty = "1860" Order Qty = "1900"

Verify that the CWI Qty in the CWI Information grid in enabled.

Verify that the Depth, Width, Diameter, New/Existing is enabled.

Verify that the Depth field has a default value.

Check the default value. "24"should be entered if not default.

Enter "1800" in CWI Qty

Save the substep.

Configure.

Go to the Contract Detail screen and verify that the

CWI = "C024B" CWI Qty = "1800"

Enter a Telco substep on the Placing screen

WE= "A" Work Action = "PLAC" FRC= "22C"

Material Desc = "BKMA-100" Record Qty = "860" Order Qty = "900"

Verify that the CWI Qty in the CWI Information grid is enabled.

Verify that the Depth, Width, Diameter, New/Existing is not enabled.

Save the substep.

Configure.

Go to the 207 Report in Job Entry and verify Record Qty and Order Qty.

Enter a Telco substep on the Placing screen

WE= "A" Work Action = "PLAC" FRC= "22C"

Material Desc = "BKMA-100" Record Qty = "860" Order Qty = "900"

Verify that the CWI Qty in the CWI Information grid is enabled.

Verify that the Depth, Width, Diameter, New/Existing is not enabled.

Enter a "0". Verify that "0" cannot be entered.

Blank out the field. Verify that the field can be blanked out.

Enter "100" in the CWI Qty

Save the substep.

Configure.

Go to the 207 Report in Job Entry and verify Record Qty and Order Qty.

Go to substep in database and verify that "100" CWI Qty has been ignored.

17. Attachments:

| | |
|---|---|
| (copies of screens, reports, etc. before and after proposed change – only identify if the customer requires the screen or something on the screen to look a certain way) | 16.1 None |

Signatures of Agreement:

(add additional rows if necessary)

BAE: (on file) 6/9/98

Lead Analyst: (on file) 6/9/98

BAE FUNCTIONAL DOCUMENT

Table # 7020A

| | | | |
|---|---|---|---|
| **BAE Start Date:** | **01/28/1998** | **BAE Name:** | **Gail W. Deaton** |
| **BAE Comp. Date:** | **01/28/1998** | **BAE Tele. No.:** | **205-977-3615** |
| **BAE Hours:** | **2** | **LA Assigned:** | |

CMVC Component Name: je_ewo

Associated Defect/Feature No.:

| | | | |
|---|---|---|---|
| **Target Release**<br>(give target release this needs to be in) **[only identify if this is required for an emergency release or must be worked in next scheduled release]** | 2.10 | **Target Release Date:**<br>(give target release date for this enhancement, if required | |

Priority:
(provide priority from 'feature priority' list – number preliminary assigned by SME) Hi

Revision No.: (B, C, etc. – this will require new signatures)
Reason for Revision:

General:
(General Information – nothing is to be typed here, this is for information only about the functional spec process.)

1. The purpose of this document is to provide the customer's view of the functionality that needs to be changed or added to the existing OSPCM product. It is not the detail design requirements. It should concentrate of 'what' is needed and not on the 'how' it is provided.
2. All features that are >40 hours/1 business area require a structured inspection walk through process (currently using FAGAN). This is to be scheduled by the responsible SME for this feature with the testing team lead, documentation team lead and the IT development Managers. The IT development Managers will assign the appropriate representatives to attend the meeting. Th4ese inspections are not to inspect the author, they are to be used to understand the functionality required for development of the 'Detail Design Document'.

3. The 'Analysis Phase Specific' checklist must be used, documented and baselined for each feature.

4. Any correspondence associated with this feature should also be documented (i.e., impromptu meetings, phone conversations, etc.) and associated with the feature number. It should include time, date, and participants.

5. Continue numbering scheme in your text input under each table to provide traceability for matrixes.

| | |
|---|---|
| **1. Abstract:** | |
| (brief description of change/addition - This should pretty closely match the abstract in CMVC. | 1.1 Make the default for the Est. Completion date in job_ewo 30 days from the current date. |
| **2. Current Problem** | |
| (brief description of what system currently does, what needs to be changed, and why) | 2.1 Currently the default for the Est. Completion date is today's date. Designers are not properly changing the date to a realistic date and today's date is being populated as the Est. Completion Date. When the job is FIRMed in Pricing and sent to BACAS the approval date is after the Est. Completion date.<br>This is causing BSCAS errors to be generated. |
| **3. Proposed Solution:** | |
| (brief description of what the system will or should do an any general constraints or conditions that limit the | 3.1 Make the default for the Est. Completion date in job_ewo 30 days from the current date. This should eliminate most of the BSCAS errors. |

solution)

| | |
|---|---|
| **4. Change/Addition(s):** | |
| (detailed description of change/addition) | 4.1 The estimated completion date currently defaults to the current date. With this feature, this date will default to the current date + 30 days. This will be the default for the creation of EWO and PWO jobs. In addition, when the user selects to clone a job, the estimated completion date will default to the current date + 30 days. The user can change the estimated completion date, but it must be the current date or a future date. |
| **5. Performance Requirements:** | |
| (list any performance requirements associated with this change) **[Identify system response requirements that must be met for user acceptance]** | 5.1 |
| **6. Dependencies:** | |
| (list any defects or features that this enhancement is dependent on or that will be dependent on this feature) | 6.1 |
| **7. Benefits:** | |
| (provide benefits in dollars, reduced headcount, time savings, etc. for doing this work) **[This is required to identify any savings that can be attributed this feature for securing budget approval]** | 7.1 Eliminates BSCAS errors generated to the users. Savings in the time it takes to investigate and correct these errors. |

| **8. Affected Components:** | **(Check) Yes** | **(Check) No** |
|---|---|---|
| RTOC Instructions | | |
| HELP | | |
| User Guides | | |
| Testing | | |
| Infra-structure | | |
| Management Reports | | |
| Database | | |

9. Interfaces:

| | |
|---|---|
| (list any legacy or new interface systems impacted by this change) **[Make sure other interface systems are aware of and agree with any requirement change that impacts them before proceeding]** | 9.1 |

| **10. Work-around:** | **(Check) Yes** | **(Check) No** |
|---|---|---|
| (is there a temporary work around?) | | X |
| (describe work around in detail) **[Also identify this in the OSPCM 'known problem' document]** | 10.1 | |

11. Risks:

| | |
|---|---|
| (list factors that impact, positive/negative, not doing | 11.1 User acceptance and BSCAS response. |

this change)

12. Business Rules:

| | |
|---|---|
| (list any business rules or constraints that should apply. If business rules are included in the changes section, identify these with asterisk in bold, *****business rule*****) | 12.1 |

13. Documentation Changes:

| | |
|---|---|
| (list affected documents requiring change) **[Documentation should prepare a checklist covering each document that must be updated for this feature]** | 13.1 |

14. Special Training/Implementation Requirements:

| | |
|---|---|
| (list any special training/implementation required for this feature. Identify what will be required to train and implement this feature to the customer, i.e., by documentation, e-mail, help, cue cards, on sight training, etc.) | 14.1 |

15. Acceptance Criteria/Test Scenario:

| | |
|---|---|
| (list test scenarios required to test change prior to user acceptance, this can be updated after the detailed design is | 15.1 Enter a new EWO type job in job_entry. Check to make sure the estimated completion date default is 30 days from today.<br>• Enter a new PWO type job in job_entry. check to make sure the estimated completion date default is 30 days from today. |

| | |
|---|---|
| complemented.) **REQUIRED [Tester should prepare checklist based on these test scenarios for documentation on results of tests. These should be in matrix from identified back to the numbering scheme use in these test scenarios]** | • Test to see if the default date of 30 days from today can be changed to the current date or a future date.<br>• Select the refresh button, the estimated completion date should be reset to the current date + 30 days. |
| **17. Attachments:**<br>(copies of screens, reports, etc. before and after proposed change – only identify if the customer requires the screen or something on the screen to look a certain way) | 16.1 |
| **Signatures of Agreement:**<br>(add additional rows if necessary) | |
| **BAE:** | |
| **Lead Analyst:** | |

BAE FUNCTIONAL DOCUMENT

Table # 7046A

| | | | |
|---|---|---|---|
| **BAE Start Date:** | **11/18/1997** | **BAE Name:** | **Mark Seal** |
| **BAE Comp. Date:** | **11/18/1997** | **BAE Tele. No.:** | **205-977-3618** |
| **BAE Hours:** | **8.5** | **LA Assigned:** | |
| **CMVC Component Name:** | sched | | |
| **Associated Defect/Feature No.:** | | | |

| | |
|---|---|
| **Target Release**<br>(give target release this needs to be in) **[only identify if this is required for an emergency release or must be worked in next scheduled release]** | **Target Release Date:**<br>(give target release date for this enhancement, if required |

| | |
|---|---|
| **Priority:**<br>(provide priority from 'feature priority' list – number preliminary assigned by SME) | SCHED<br>#1 |

Revision No.: (B, C, etc. – this will require new signatures)

Reason for Revision:

General:

| | |
|---|---|
| (General Information – nothing is to be typed here, this is for information only about the functional spec process.) | 1. The purpose of this document is to provide the customer's view of the functionality that needs to be changed or added to the existing OSPCM product. It is not the detail design requirements. It should concentrate of 'what' is needed and not on the 'how' it is provided.<br>2. All features that are >40 hours/1 business area require a structured inspection walk through process (currently using FAGAN). This is to be scheduled by the responsible SME for this feature with the testing team lead, documentation team lead and the IT development Managers. |

The IT development Managers will assign the appropriate representatives to attend the meeting. Th4ese inspections are not to inspect the author, they are to be used to understand the functionality required for development of the 'Detail Design Document'.

3. The 'Analysis Phase Specific' checklist must be used, documented and baselined for each feature.

4. Any correspondence associated with this feature should also be documented (i.e., impromptu meetings, phone conversations, etc.) and associated with the feature number. It should include time, date, and participants.

5. Continue numbering scheme in your text input under each table to provide traceability for matrixes.

1. Abstract:

(brief description of change/addition - This should pretty closely match the abstract in CMVC.

1.1 Provide the user the ability to choose range of weeks to be displayed on the scheduling screen.

2. Current Problem

(brief description of what system currently does, what needs to be changed, and why)

2.1 Currently the system may not be able to display a 20 week schedule due to the large number of jobs in a particular CMC.

3. Proposed Solution:

(brief description of what the system will or should do an any general constraints or conditions that limit the solution)

3.1 When the user enters the scheduling module the system should ask the user to enter range of weeks of scheduled work to be displayed.

4. Change/Addition(s):

(detailed description of change/addition)

4.1 When the user enters the scheduling module, the scheduling desk top should be displayed. The following tool bar buttons should be active.

20 week limited
20 week unlimited
current week
next week
activity mtce
reports 4.2 When the user selects the 20 week limited schedule button from the desk top tool bar, the system will display a dialog box asking the user to enter a range of weeks to be displayed. The maximum range that the user can request is 1 to 20 weeks. The system will try to display the requested range of weeks of data. If there is too much data to be displayed then the system will display a message tot he user saying that there is too much data to be displayed at once. The system will prompt the user to enter a range of weeks again. If the user requests only one week of data and the system determines that there is too much data to be displayed then the system will display a message that says that there is too much data to be displayed for the week requested. When the user clicks OK then the system should display as much data as possible.

4.3 when the user selects the 20 week unlimited schedule button from the desk top tool bar, the system will display a dialog box asking the user to enter a range of weeks to be displayed. The maximum number that the user can request is 1 to 20 weeks. The system will try to display the requested range of weeks data. If there is too much data to be displayed then the system will display a message to the user saying that there is too much data to be displayed at once.

The system will prompt the user to enter a range of weeks again. If the user requests only one week of data and the system determines that there is too much data to be displayed then the system will display a message that says that there is too much data to be displayed for week requested. When the user clicks OK then the system should display as much data as possible.

4.4 When the user selects the Current week button the desk top tool bar, the system will only display week 1 data. If the system determines that there is too much data to be displayed then the system will display a message that says that there is too much data to be displayed for week 1. when the user clicks OK then the system should display as much data as possible.

4.5 When the user selects the Next week button from the desk top tool bar, the system will only display week 2 data. if the system determines that there is too much data to be displayed then the system will display a message that says there is too much data to be displayed for week 2. When the system should display as much data as possible.

4.6 When the user selects the Activity Mtce button from the desk top tool bar then the system will display a dialog box allowing the user to type in the Job name. This is the same dialog box that currently exists in scheduling.

4.7 Reports button on the desk top tool bar will be active so that a user can select an available report to be printed even though a schedule screen is not displayed.

5. Performance Requirements:

| | |
|---|---|
| (list any performance requirements associated with this change) **[Identify system response requirements that must be met for user acceptance]** | 5.1 By limiting the amount of data requested to be displayed the system should not be displaying buffer overload errors. By only displaying the requested range of weeks of scheduling data....performance should increase because the user will likely request less data than is being displayed today. |

6. Dependencies:

| | |
|---|---|
| (list any defects or features that this enhancement is dependent on or that will be dependent on this feature) | 6.1 NONE |

7. Benefits:

| | |
|---|---|
| (provide benefits in dollars, reduced headcount, time | 7.1 Benefits are that the users will see improved performance because the system is handling and displaying less data. |

savings, etc. for doing this work) [This is required to identify any savings that can be attributed this feature for securing budget approval]

| 8. Affected Components: | (Check) Yes | (Check) No |
|---|---|---|
| RTOC Instructions | x | |
| HELP | x | |
| User Guides | x | |
| Testing | x | |
| Infra-structure | | |
| Management Reports | | |
| Database | | |

9. Interfaces:

(list any legacy or new interface systems impacted by this change) [Make sure other interface systems are aware of and agree with any requirement change that impacts them before proceeding] 9.1 N/A

| 10. Work-around: | (Check) Yes | (Check) No |
|---|---|---|
| (is there a temporary work around?) | | X |
| (describe work around in detail) | 10.1 | |

[Also identify this in the

OSPCM 'known problem' document]

| | |
|---|---|
| **11. Risks:** | |
| (list factors that impact, positive/negative, not doing this change) | 11.1 Some users can't see the scheduling data at all and others will be in the same situation as volumes increase. |
| **12. Business Rules:** | |
| (list any business rules or constraints that should apply. If business rules are included in the changes section, identify these with asterisk in bold, *****business rule*****) | 12.1 See Changes |
| **13. Documentation Changes:** | |
| (list affected documents requiring change) **[Documentation should prepare a checklist covering each document that must be updated for this feature]** | 13.1 User guides, Help |
| **14. Special Training/Implementation Requirements:** | |
| (list any special training/implementation required for this feature. Identify what will be required to train and implement this feature to the customer, i.e., by documentation, e-mail, help, cue cards, on sight training, | 14.1 Release notes, User Guides and Release notes will document the changes. |

etc.)

15. Acceptance Criteria/Test Scenario:

(list test scenarios required to test change prior to user acceptance, this can be updated after the detailed design is complemented.) REQUIRED [Tester should prepare checklist based on these test scenarios for documentation on results of tests. These should be in matrix from identified back to the numbering scheme use in these test scenarios]

15.1 Verify that when entering the scheduling module, the scheduling desk top is displayed. The following tool bar buttons will be active.

20 week limited
20 week unlimited
current week
next week
activity mtce
reports 15.2 20 week limited

- Select the 20 week limited schedule button from the desk top tool bar, the system will display a dialog box asking the user to enter a range of weeks to be displayed. Verify that the maximum number that the user can request is 1 to 20 week range.
- Verify that any range combination from 1 to 0 can be requested. Verify that when too much data exists to be displayed that the system displays a message saying that there is too much data to be displayed at once.
- Verify that the system prompts the user to enter the range of weeks request again.
- Verify that when the user requests only one week of data and the system determines that there is too much data to be displayed that the system will display a message that says that there is too much data to be displayed for week 1.
- Click OK and the system should display as much data as possible.

15.3 20 week unlimited

- Select the 20 week Unlimited schedule button from the desk top tool bar, the system will display a dialog box asking the user to enter a range of weeks to be displayed. verify that the maximum number that the user can request is 1 to 10 weeks.
- Verify that when too much data exists to be displayed that the system displays an message saying that there is too much data to be displayed at once.

- Verify that the system prompts the user to enter the range of weeks requested again.
- Verify that when the user requests only one week of data and the system determines that there is too much data to be displayed that the system will display a message that says that there is too much data to be displayed for week.
- Click OK and the system should display as much data as possible.

15.4 Current week Button

- Verify that when the user selects the Current week button from the desk top tool bar, the system will only display week 1 data.
- Verify that when the system determines that there is too much data to be displayed that the system will displays a message that says there is too much data to be displayed for week 1.
- Verify that when the user clicks OK then the system should display as much data as possible.

15.5 Next Week Button

- Verify that when the user selects the Next week button from the desk top tool bar, the system will only display week 2 data.
- Verify that when the system determines that there is too much data to be displayed that the system will displays a message that says there is too much data to be displayed for week 2.
- Verify that when the user clicks OK then the system should display as much data as possible.

15.6 Activity Mtce Button

- Verify that the user selects the Activity Mtce button from the desk top tool bar then the system will display a dialog box allowing the user to type in the Job name.

15.7 Reports button

- Verify that the report button on the desk top tool bar will be active so that a user can select an available report to be printed even through a schedule screen is not displayed.

15.8 Verify that when any schedule is displayed that all existing too bar functionality works as it does today.

17. Attachments:

(copies of screens, reports, etc. before and after proposed change – only identify if the customer requires the screen or something on the screen to look a certain way)

16.1 NONE

Signatures of Agreement:

(add additional rows if necessary)

BAE:

Lead Analyst:

BAE FUNCTIONAL DOCUMENT

Table # 6723A

| | | | |
|---|---|---|---|
| **BAE Start Date:** | **07/11/1997** | **BAE Name:** | **Larry Rice** |
| **BAE Comp. Date:** | **08/04/1997** | **BAE Tele. No.:977-7436** | |
| **BAE Hours:** | **49** | **LA Assigned:** | |

CMVC Component Name: Job Entry
Job Entry Other
Billing & Reporting
Management Reports

Associated Defect/Feature No.:

Target Release
(give target release this needs to be in) [only identify if this is required for an emergency release or must be worked in next scheduled release]

Target Release Date:
(give target release date for this enhancement, if required

Priority:
(provide priority from 'feature priority' list – number preliminary assigned by SME)

Revision No.: (this will require new signatures)

Reason for Revision:

General:

(General Information)

1. All features that are >40 hours/1 business area require a structured inspection walk through process (currently using FAGAN). This is to be scheduled by the responsible SME for this feature.
2. The 'Analysis Phase Specific' checklist must be used, documented and baselined for each feature.

3. Any correspondence associated with this feature should also be documented (i.e., impromptu meetings, phone conversations, etc.) and associated with the feature number. It should include time, date, and participants.

1. Subject:

(brief description of change)

1. The creation of an mechanized Pitlog that would track the life cycle of a pit request for both an Engineering Work Order (EWO) and Routine Work (RW). This process would address the request for both planned (Exhibit "A") and demand (Exhibit "B") pits. The Pitlog would provide a mechanized request tot he contractor to open and to close a pit, and provide OpenMail notification o Telco when the contractor has opened a planned pit. The process would also create an Open Pitlog Report, Pending Open Request Report and a Pending Closed Report that could be utilized by both Telco and contractor.
2. The regional standard developed for mechanized Pitlog must be followed if this process is to function correctly.

2. Introduction:

(description of what system currently does, what needs to be changed, and why)

1. Currently the system allows the user to input work tasks that can be defined as a pit in user terms. These are identified for EWO's in JE with the work action of DIG that configures the substep with the CWI for open/close a pit. For RW's, the user identifies these work tasks by using one of three work actions of PIT, OPIT & CPIT. The user provides the CWI appropriate for the work requested either Exhibit "A" or Exhibit "B".
2. The application lacks a process that would track these work task requests identified by the user as a pit. The application does not have a process in place that would completely track the life cycle for a "pit request". This cycle includes: (1) Identify the need for a pit and provide contractor expectations, (2) Telco request to the contractor to open a pit, (3) actual date the contractor opened the pit, (4) the Telco request to the contractor to close the pit, and (5) the actual date the contractor closed the pit.

3. Process should minimize the coding changes required for JE & JEO by utilizing the existing M&P for encoding and requesting both planned (Exhibit 'A') and demand (Exhibit 'B') pits.

4. The Pitlog process will use the initial data entered in Job Entry for EWO's and Job Entry Other for RW's (Process #1), mechanize the communication of the "Telco Open Pit Request" to the contractor (Process #2), mechanize the "Contractor Open Pit" notification (OpenMail) to Telco that the pit was actually opened (Process #3), mechanize the "Telco Close Pit Request" to the contractor (Process #4), and if the user elects not to use the Pitlog process, then this process would not affect the existing Billing & Reporting process of substep completions by the contractor. (Process #5).

5. The intent is that the data entry required to provide the contractor billing expectations and pit request be performed only once. For example, if the "Desired Work Date" was entered in JEO that the application would populate the "Telco Requested Open Pit Date" in the Pitlog for a demand (Exhibit "B") pit. And upon completion by the contractor in B&R-Completions that the application would populate the "Contractor Actual Close Date' in the Pitlog.

Work flow of Pit Request for Planned Work Exhibit "A"

EWO/PWO: Having the designed work encoded in JE, the Telco supervisor has all of the work locations identified that require a pit. The expectations for each job have been provided to the contractor by the MP-10484 Engineering Work Order. However, the contractor has not been notified when actually open the pit substep.

Once the EWO/PWO job has been scheduled and requires that a pit be opened, the Telco Supervisory will access B&R-Open-Pitlog-Telco Open Pit Request and select from the grid the job that Telco wants to have a pit substep opened. The Telco supervisor will populate the "Telco Open Pit Request Date" field with the date that the pit is to be opened by.

RW: The same process for an EWO Exhibit "A" pit can also be utilized for RW planned pits. Otherwise, Telco has the option of populating the "Desired Work Date" in JEO at the time the RW substep (PIT) is created. Either method will generate notification to the contractor in the same manner discussed next.

This transaction will create an "Open Pit Request" for the contractor in B&R-New Work the next time the contractor requests their New Work Orders. This will be considered the mechanized request to the contractor to open a pit.

Once the contractor has completed opening the pit substep requested, they will select B&R-Open Pitlog-Contractor Open Pit Update and populate the "Contractor Open Pit Date" field with the actual date the pit substep was opened in the field.

This transaction will then create a notification for each pit that was opened by the contractor and will be OpenMail to the Telco RESID assigned to that substep. This will be considered the mechanized notification from the contractor to Telco that the pit has been opened and ready for Telco forces to work.

After the technician has completed the work operation associated with the pit request, he/she will notify their supervisor that the pit is ready to close.

The Telco Supervisor will then access B&R-Open-Pitlog-Telco Close Pit Request and select from the gird the job that he/she wants to have the pit closed. The Telco Supervisor will populate the "Telco Close Pit Request Date" field with the current date or the date the pit can be closed by the contractor.

This transaction will create a "Close Pit Request" for the contractor in B&R-New Work the next time the contractor requests their New Work Orders. This will be considered the mechanized request to the contractor to close a pit.

Once the contractor has completed closing the pit substep requested, they will select B&R-Completions and populate the data as they are currently doing today for substep completions. The B&R application will populate the "Contractor Closed Pit Date" field in the Pitlog.

With the data entered, the following reports would be available for both the contractor and Telco that will track the planned pits:

- The Open Pitlog Report will provide the complete status of each pit that has opened by the contractor.
- The Pending Open Request Report will provide a list and status of all pit that had been requested by Telco and have not been reported open by the contractor.
- The Pending Close Request Report will provide a list and status of each pit that have been requested to closed by Telco but have not been completed by the contractor.

Work Flow of Pit Request for Demand Work (Exhibit "B")

Having encoded the demand wok in JEO, the Telco supervisor has request that a contractor be dispatched on an Exhibit "B" hourly rate to dig at a specific location that will result in a pit being left open.

When Telco generates the initial request using the work action of OPIT, Telco will populate the "Desired Work Date" in JEO. This makes the substep available to the contractor and an generates an existing MP-10482 Routine Work Order for the contractor as his billing expectations. This becomes mechanized request then populate the "Telco Open Pit Request Date" field in the Pitlog for this RW step (RW steps that have a OPIT & CPIT substep will be reflected in Pitlog as one pit location as a step).

Telco knows that a pit will be left open at this location and created a second substep on the same step using the work action of CPIT for either Exhibit "B" or Exhibit "A' CWI's to have the pit closed. Telco does not populate the "Desired Work Date" at this time.

Once the contractor has completed this request (CPIT substep) in B7R-Completions, the system will populate the "Contractor Open Pit Date" in the Pitlog.

Once the Telco work operation has been completed for this RW request, the Telco technician will notify his/her supervisory that this location needs to be closed.

At this time, Telco will populate the "Desired Work Date" in JEO for the second substep on the same step, where the work action is CPIT, with the current date or the date Telco wants this location closed. This makes this substep available to the contractor and generates an existing MP-10482 Routine Work Order for the contractor and his billing expectations. This becomes the mechanized request to the contractor to close a pit on Exhibit 'B' hourly cost or Exhibit 'A' unit price.

The process will also populate the "Telco Close Pit Request Date" field in the Pitlog for this RW step (RW steps that have a OPIT & CPIT substep will be reflected in Pitlog as one pit location as a step).

Again once the contractor completes the second substep of CPIT and the system will populate the "Contractor Closed Pit Date" in Pitlog.

With the data entered the following reports would be available for both the contractor and Telco that will track the demand pits:

- The Open Pitlog Report will provide the complete status of each pit that has been opened b the contractor.
- The Pending Open Request Report will provide a list and status of all pit that had been requested by Telco and have not been reported open by the contractor.
- The Pending Close Request Report will provide a list and status of each pit that have been requested to closed by Telco but have not been completed by the contractor.

1. A new pit_log table will be crated to record the transactions that will enable the user to track the pit request from start to finish.
2. The pit_log table will populated by the initial entry in Job Entry Other for RW Exhibit 'A' unit price planned pits.
3. The pit_log table will populated by the initial entry in Job Entry Other for RW Exhibit 'A' unit price planned pits, and RW & EWO Exhibit 'B' hourly cost demand pits.
    3.1 The application will identify demand pits at a step level with an OPIT & CPIT substep.
    3.2 The process will create only one pit_log record for a step that has OPIT & CPIT substep.
4. The M&P developed would allow those substeps identified by the four work actions of DIG, PIT, OPIT & CPIT to be tracked in the

Pitlog.

5. The updates form the new Pitlog selection in Billing & Reporting will populate the dates for:
    5.1 Telco Open Pit Request Date
    5.2 Contractor Open Pit Date
    5.3 Telco Close Pit Request Date
6. With the completion of the substep in B&R-Completions by the contractor, this process will populate the date for:
    6.1 Contractor Close Pit Date 7. Regional Standard for Pits in JE & JEO

7.1. <u>Planned Pits (Exhibit 'A'):</u> For EWO pit substeps, these pit locations <u>will</u> be requested to be open & closed in the new Pitlog. For RW pit locations, the user will have the option of populating the "Desired Work Date" when the RW is being keyed in JEO. Or the user may elect to populate the "Telco Open Pit Request Date" in the new Pitlog. Either scenario will produce the same result. Both EWO & RW planned pits and will be tracked on three new Pitlog Reports.

7.1.1 Job Entry (JE) – Exhibit 'A': The job entry configuration currently uses the work action of DIG to configure substeps for Exhibit 'A' CWI's to open/close a pit. No changes would be required for this process.

7.1.2 Job Entry Other (JEO) 'A': For those locations (substeps) that a pit is to be open/close on Exhibit 'A' CWI's for Routine Work, the work action PIT <u>must</u> be used on each substep.

7.1.2.1 For RW planned pits, the Pitlog process will track these requests at a step level.

7.1.2.2 If there are to be multiple pits opened on for this RW then each pit must be created on a separate step. This provides the unique location/address for each pit request.

7.1.3 Both of these transactions will create an occurrence in the pitlog for each request.

7.2 Demand Pits (Exhibit 'B'): These pit substeps will not be requested to be open & closed in the new Pitlog, but will be tracked on the three new Pitlog Reports. The normal process of populating the substep JEO-Desired Work Date for both the OPIT & CPIT substeps will make this work available to the contractor.

7.2.1 Job Entry Other (JEO) – Exhibit 'B': For those locations (substeps) were a pitlog was requested to be opened on Exhibit "B" CWI's the work action OPIT is used. The user will then create a second step using the work action CPIT to have the pit closed on either Exhibit 'B' hourly cost or Exhibit 'A' unit price.

8. For those planned substeps that have been identified as EWO/PWO Exhibit 'A' unit price pits (DIG), and RW Exhibit 'A' unit price pits (PIT), Telco will use the Pitlog to generate MP - ?????? Open Pit Request work orders. These work orders will appear in B&R-New Work for the contractor to use for their employees dispatch ticket.
9. For RW Exhibit 'A' unit price pits (PIT), Telco also the option of populating the "Desired Work Date" in JEO at the time Telco creates the RW Exhibit 'A' request. The process will generate a "Pit Request Work Order" in lieu of the MP – 10482 Routine Work Order.
10. For those demand substeps that have been identified as EWO or RW Exhibit 'B' hourly cost pits (OPIT/CPIT), Telco will continue to use the existing method of populating the "Desired Work Date' in JEO for each substep when Telco wishes to make the work available to the contractor.
11. This process will continue to provide billing expectations, the "Who, What, Where, When and Why" required for the contractor for Exhibit 'B' expenditures by the "MP-10482 Routine Work Order".

12. By using this methodology, all substeps identified as pits will be tracked on the following three new Pitlog Reports: Open Pitlog Report, Pending Open Request Report and Pending Closed Request Report that can be utilized by both Telco and contractor.

4. Change(s):
(detailed description of change) –
[add additional rows if multiple changes]

1. Data Input

1.1 EWO/PWO: User enters a Exhibit 'A' substep_ewo where the work action equals DIG in JE. When the application creates, configures and saves the substep_ewo record, the application will create a new pit_log record linking it to the original substep_ewo.

1.2 RW Exh-A: User creates substep_rw for Exhibit 'A' where the work action equals PIT in JEO. When the application saves the substep_rw record the application will create a new pit_log record linking it to the original substep_rw.

1.2.1 If the user elects to populate the "Desired Work Date" in JEO the application will populate the "Telco Requested Open Date' field on the pit_log record.

1.3 RW Exh-B: User creates the first substep_rw where the work action equals OPIT and the second substep where the work action equals CPIT in JEO. When the application saves the substep_rw record, the application will also create a new pit_log record linking it to the original OPIT substep_rw. The application will create only one occurrence of pit)log for this step_rw.

1.3.1 When Telco populates "Desired Work Date" for the OPIT substep in JEO, the application will populate "Telco Requested Open Date" on pit_log record.

1.3.2 When Telco populates "Desired Work Date" for the CPIT substep in JEO, the application will populate "Telco Requested Close Date" on pit_log record.

1.4 EWO Exh-B: User creates the first substep_ewo where the work action equals OPIT and the second substep where the work action equals CPIT in JEO. when the application saves the substep_ewo record, the application will also crate a new pit_log record linking it to the original OPIT substep_ewo. The application will create only one occurrence of pit_log for this step_ewo.

1.4.1 When Telco populates "Desired Work Date" for the OPIT substep in JEO, the application will populate 'Telco Requested Open Date' on pit_log record.

1.4.2 When Telco populates "Desired Work Date" for the CPIT substep in JEO, the application will populate "Telco Requested Close Date" on pit_log record.

1.5 The new pit record may require an accepted_ind for this table to ensure not sending multiple request to the contractor.

1.6 Once the pit substep has been successfully encoded in either JE or JEO, the application will have created a corresponding pit_log record for each of these pit substeps and steps that have the work action equal to DIG for EWO/PWO Exhibit 'A', PIT for RW Exhibit 'A', and one for a step_rw where there is a step with two substeps of OPIT & CPIT for RW/EWO Exhibit 'B'. The assumption is that there is now a corresponding pit_log record for each substep identified in the JE & JEO requiring a pit.

1.7 The contracts for JE & JEO will require modification.

1.8 Only those substeps that follow the regional standard for encoding of a pit will have a presence in the pit_log table and therefore be considered to tract on the Pitlog Reports.

2. Billing & Reporting

Figure 17:
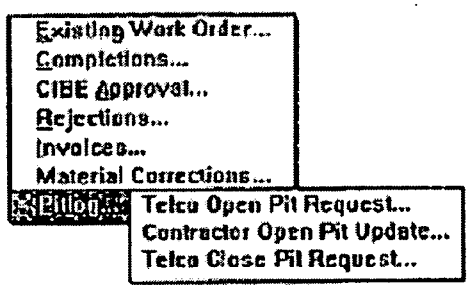
FIG. 17 is an exemplary screen print for a Drop Down Menu.

This application will require a new entry of Pitlog in the "Open" drop down menu. Upon selection of Pitlog, a new drop down menu will populate with the following selections and functions: (See Fig. 17).

2.1 Telco Open Pit Request...

2.1.1 This selection will allow Telco to request a pit to be opened in the Pitlog for planned pits. The selection criteria are State & CMC, RESID, or Job Number.

2.1.2 Telco populates Cont#, State, CMC and RESID to selected all planned pit substeps (EWO/PWO & RW) for the selection criteria provided.

2.1.3 If the user does not populate RESID, then the application would populate the grid with all pit substeps where the "Telco Requested Open" date was not populated and that are assigned to this RESID.

2.1.4 If the user does populate RESID, then the application would populate the grid with all pit substeps where the "Telco Requested Open" date was not populated for the entire CMC.

Figure 18:
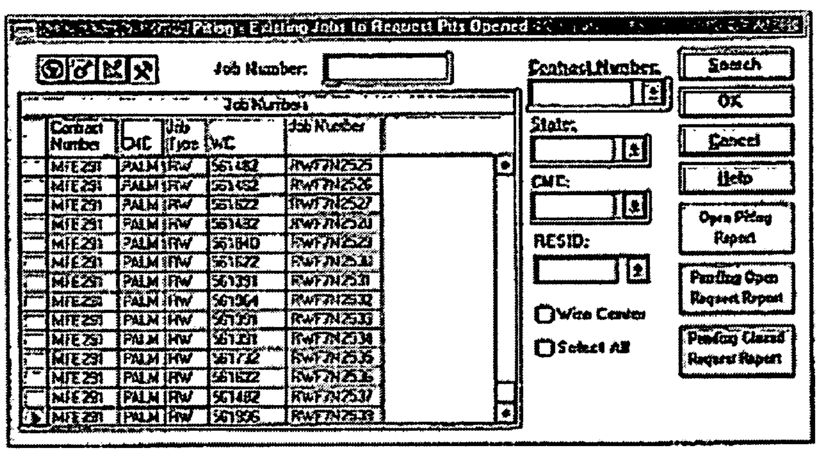
FIG. 18 is an exemplary screen print for Existing Jobs.

2.1.5 The user can then select from the grid the jobs that Telco wanted to request from the pit substep be opened. (See Fig. 18)

Figure 19:
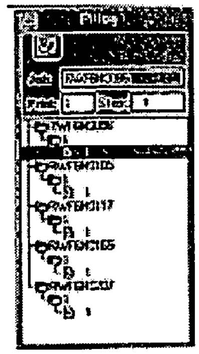
FIG. 19 is an exemplary screen print for a Drop Down Box Listing Jobs.

2.1.6 Once these jobs have been selected, a drop down box listing the jobs selected with the corresponding print and step information will be provided. (See Fig. 19)

2.1.7 The user then is placed on a grid that displays Job, Print, Step and Substep Information of the Job, Print & Step that was selected.

2.1.8 The user will populate the "Telco Requested Open" date field.

2.1.9 This will generate a MP-????? Open Pit Request for the contractor in the B&R-New Work Orders presentation to have the pit substep opened.

Figure 20:
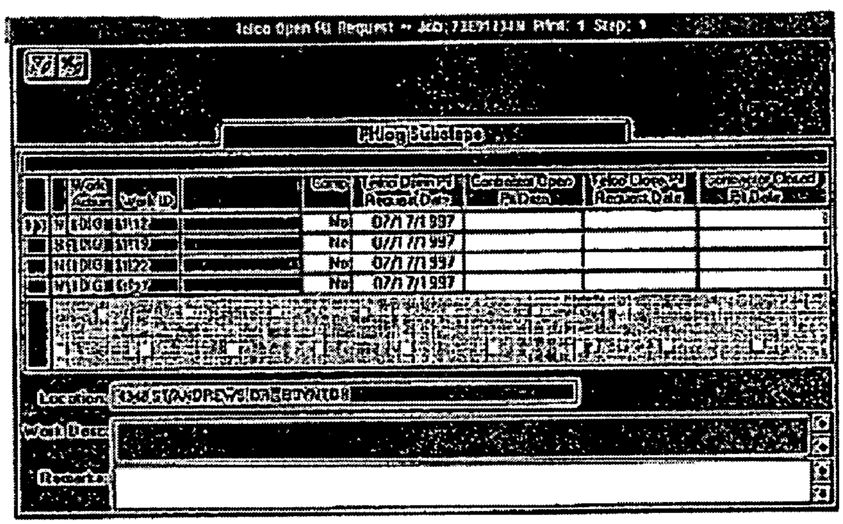
FIG. 20 is an exemplary screen print for a Telco Open Pit Request Date.

2.1.10 The 'Telco Open Pit Request Date" is for <u>only</u> Telco to populate. (See Fig. 20)

2.1.11 when Telco populates the JEO-Desired Work Date for RW Exhibit 'A' planned pits or RW & EWO Exhibit 'B' demand pits, the system will populate these dates in the Pitlog.

2.1.12 If Telco where to request on of the demand pit jobs, then the dates would be reflective in the Pitlog.

2.2 Contractor Receives Open Pit Request

2.2.1 When the contractor accesses B7R-Completions-New Work, the gird will include a new column for PIT that will enable the contractor to identify his pit requests.

Figure 21:
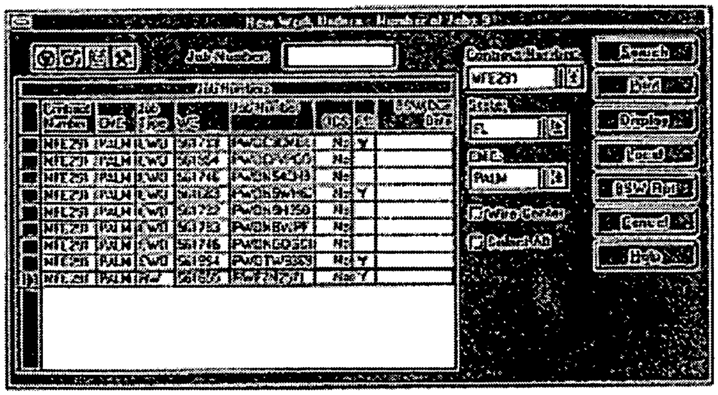
FIG. 21 is an exemplary screen print for New Work.

2.2.2 The processes by which the contractor will receive their planned EWO/PWO & RW Exhibit 'A' unit price pit requests to open a pit will utilize the existing procedure of making them available in the B&R-New Work. (See Fig. 21)

2.2.3 The contractor will receive the new "MP-???? Open Pit Request: for all planned pit substeps that have been requested to be open by Telco.

2.2.4 The process by which the contractor will receive their demand EWO & RW Exhibit 'B' hourly cost pit requests to open a pit will utilize the existing procedure of making them available in the B&R-New Work.

2.2.5 The contractor will continue to receive the MP-10482 Routine Work Order that will provide the request for the OPIT substeps.

2.3 Contractor Open Pit Update...

2.3.1 This selection allows the contractor to populate the date the contractor actually opened the pit that had been request to open in Pitlog for planned pits.

2.3.2 For demand pits, the B&R-Completions dates are reflected in the Pitlog for these pit requests.

Figure 22:
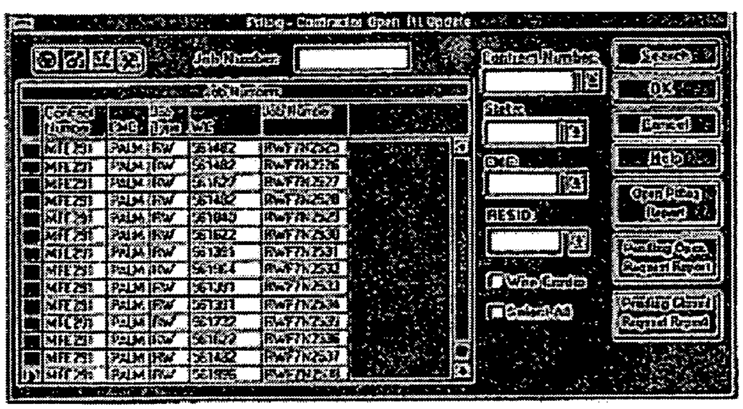
FIG. 22 is an exemplary screen print for Telco Open Pit Request.

2.3.3 The contractor selects the "Contractor Open Pit Update: selection that will list all jobs that have a pending "Telco Open Pit Request" in the Pitlog. (See Fig. 22)

2.3.4 The contractor selects the jobs that are to be populated with the date they where actually opened in the.

Figure 23:
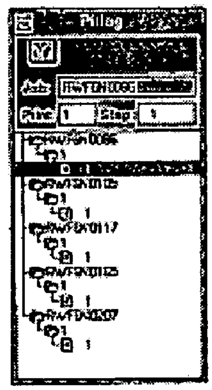
FIG. 23 is another exemplary screen print for a Drop Down Box Listing Jobs.

2.3.5 Once these jobs have been selected a drop down box listing the jobs selected with the corresponding print and step information will be provided. (See Fig. 23)

2.3.6 The contractor is placed on a grid that displaysJob, Print, Step and Substep information.

2.3.7 The contractor will populate the "Contractor Open Pit" date with the date that the pit was actually opened in the field.

2.3.8 This will generate a OpenMail notification for planned pits to the owner (RESID) of the substep. This will be the notification from the contractor to Telco that the pit is open and ready to be worked by Telco forces.

Figure 24:
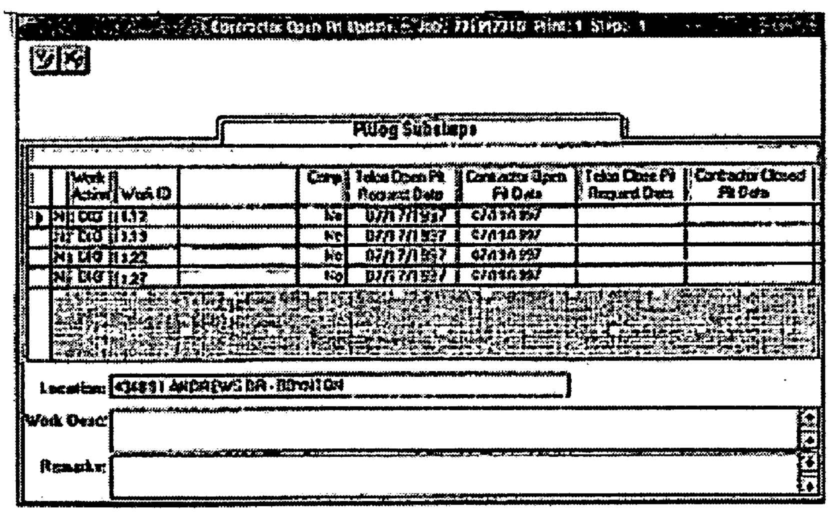
FIG. 24 is an exemplary screen print for Contractor Open Pit Date.

2.3.9 The "Contractor Open Pit Date" is only to be populated by the Contractor. (See Fig. 24)

2.4 Telco Close Pit Request...

2.4.1 This selection will allow Telco to Request a planned pit to be closed in the Pitlog.

2.4.2 Telco populates State & CMC, RESID or Job Number to select all substeps (EWO/PWO & RW) for the selection criteria provided 2.4.3 If the user <u>does</u> populate RESID then the application would populate the grid with all pits substeps where the "Contractor Open Pit" date is populated and that are assigned to this RESID.

2.4.4 If the user <u>does not</u> populate RESID then the application would populate the grid with all pits substeps where the 'Contractor Open Pit" date is populated for the entire CMC.

Figure 25:
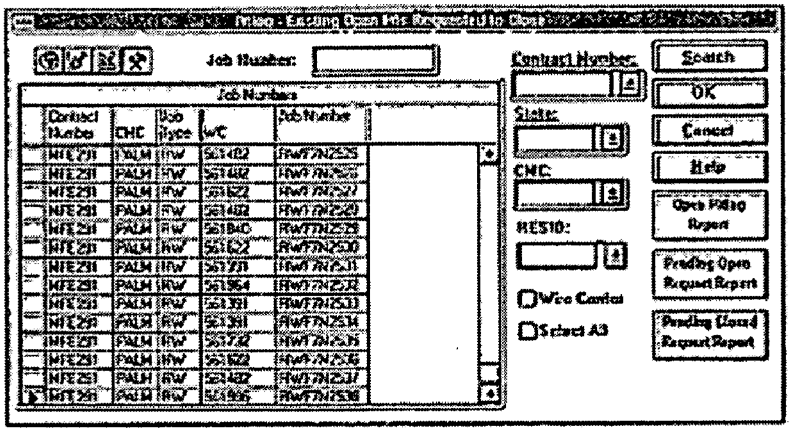
FIG. 25 is an exemplary screen print for Telco Close Pit Request.

2.4.5 The user will then select from the grid the jobs that Telco wants to request the pit to be closed. (See Fig. 25)

Figure 26:
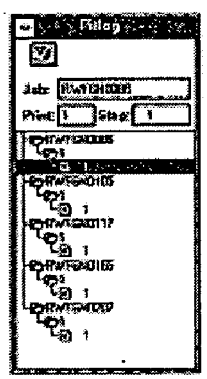
FIG. 26 is another exemplary screen print for a Drop Down Box Listing Jobs.

2.4.6 Once these jobs have been selected, a drop down box listing the jobs selected with the corresponding print and step information.(See Fig. 26)

2.4.7 The user then is placed on a grid that displays Job, Print, Step and Substep information.

2.4.8 The user will populate the "Telco Requested Close" date field for planned pits.

2.4.9 This will generate a MP-????? Close Pit Request for the contractor in the B&R-New Work Order presentation to close the pit.

Figure 27:
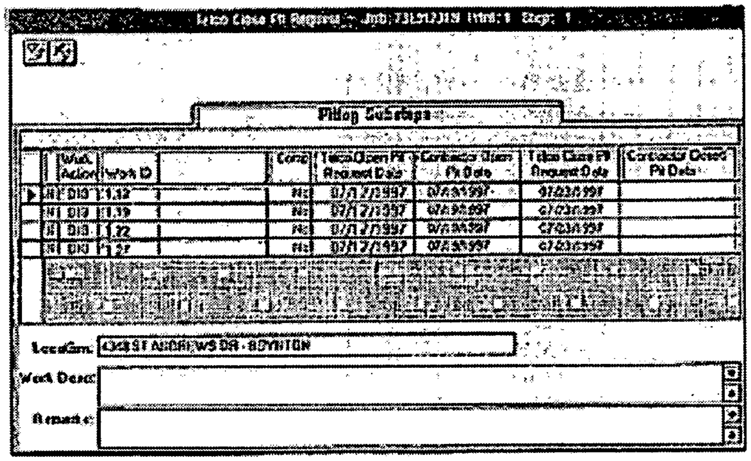
FIG. 27 is another exemplary screen print for Telco Close Pit Request.

2.4.10 The "Telco Close Pit Request Date" is for <u>only</u> Telco to populate. (See Fig. 27)

2.5 Contractor Receives Close Pit Request

2.5.1 The contractor will access B&R-Completions-New Work. The grid can include a new column for PIT that will enable the contractor to identify his pit requests.

Figure 28:
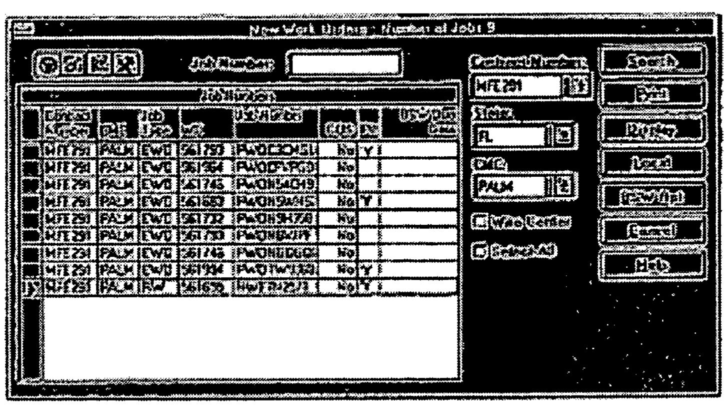
FIG. 28 is another exemplary screen print for New Work.

2.5.2 The process by which the contractor will receive their planned EWO/PWO & RW Exhibit 'A' unit price pit requests to have a pit closed will utilize the existing procedure of making them available in their New Work. (See Fig. 28)

2.5.3 The contractor will receive the new "MP-????? Close Pit Request" for all planned pit substeps that have been requested to be open by Telco.

2.5.4 The process by which the contractor will receive their demand EWO & RW Exhibit 'B' hourly cost pit requests to open a pit will utilize the existing procedure of making them available in the B&R-New Work.

2.5.5 The contractor will continue to receive the MP-10482 Routine Work Order that will provide the request for CPIT substeps.

2.6 Open Pit Report…

2.6.1 This will generate a Crystal report that <u>will list</u> all pit substeps that are open for the selection criteria provided by the user.

2.6.2 The selection criteria is State, CMC, and Cont# with the RESID optional. This will allow the user to request this report for an individual RESID instead of for the entire CMC.

2.6.3 This report will reflect the status of all pit substeps that have a "Contractor Open Pit" date populated.

2.6.4 The "days" column of the report calculates the number of days a pit has been open (Today-Contractor Open Pit Date)

2.6.5 This report will be made available to both Telco and contractor.

2.7 Pending Open Request Report...

2.7.1 This will generate a Crystal report that will list all pit substeps that have been requested to be open for the selection criteria provided by the user.

2.7.2 The selection criteria is State, CMC, and Cont# with the RESID optional. This will allow the user to request this report for an individual RESID instead of for the entire CMC.

2.7.3 This report will reflect the status of all pit substeps that have a "Telco Open Pit Requested Date" populated and the "Contractor Open Pit Date" has not been populated.

2.7.4 The 'days' column of the report calculates the number of days from when the pit was requested to be opened (Today-Telco Open Pit Request Date).

2.7.5 This report will be made available to both Telco and contractor.

2.8 Pending Close Request Report…

2.8.1 This will generate a Crystal report that will list all pit substeps that have been request to be closed for the selection criteria provided by the user.

2.8.2 The selection criteria is State, CMC, and Cont# with the RESID optional. This will allow the user to request this report for an individual RESID instead of for the entire CMC.

2.8.3 This report will reflect the status of all pit substeps that have a "Telco Close Pit Requested Date' populated and the "Contractor Closed Pit Date" has not been populated.

2.8.4 The "days" column of the report calculates the number of days from when the pit was requested to be closed (Today – Telco Close Pit Request Date)

2.8.5 This report will be made available to both Telco and contractor.

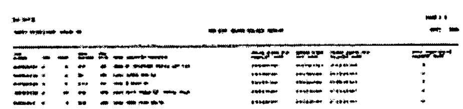

5. Performance Requirements:

(list any performance requirements associated with this change)

[Identify system response requirements that must be met for user acceptance]

1. Should not affect performance.

6. Dependencies:

| | | |
|---|---|---|
| (list any defects or features that this enhancement is dependent on or that will be dependent on this feature) | 1. | None |

7. Benefits:

| | | |
|---|---|---|
| (provide benefits in dollars, reduced headcount, time savings, etc. for doing this work) **[This is required to identify any savings that can be attributed this feature for securing budget approval]** | 1. | Eliminates manual log kept by most Telco supervisors in the field. |
| | 2. | Mechanizes the request process for Exhibit 'A' planned pits to the contractor for opening and closing request. |
| | 3. | Provides positive notification to Telco when the contractor has opened an Exhibit 'A' planned pit. |

| **8. Affected Components:** | **(Check)**<br>**Yes** | **(Check)**<br>**No** |
|---|---|---|
| **RTOC Instructions** | | x |
| **HELP** | x | |
| **User Guides** | x | |
| **Testing** | x | |
| **Infra-structure** | x | |
| **Management Reports** | x | |
| **Database** | x | |

9. Interfaces:

| | | |
|---|---|---|
| (list any legacy or new interface systems impacted by this change) **[Make sure other interface systems are aware of and agree with any requirement change that impacts them before** | 1. | None |

proceeding]

| | (Check) Yes | (Check) No | |
|---|---|---|---|
| **10. Work-around:** | | | |
| (is there a temporary work around?) | | x | |
| (describe work around in detail) **[Also identify this in the OSPCM 'known problem' document]** | 1. | | |

| | | |
|---|---|---|
| **11. Risks:** | | |
| (list factors that impact, positive/negative, not doing this change) | 1. | (-) Will require the Telco supervisor to maintain a manual Pitlog. |
| | 2. | (+) Provides a mechanized pitlog for a CMC or specific RESID. |
| | 3. | (-) Requires Telco to continue to make manual request to have an Exhibit 'A' planned pit opened or closed. |
| | 4. | (+) Provides a mechanized way of requesting the opening and closing of Exhibit 'A' Planned pits for the contractor. |
| | 5. | (+) Provides positive notification to Telco when the Exhibit 'A' planned pit has been opened. |
| **12. Business Rules:** | | |
| (list any business rules or constraints that should apply) | 1. | See text provided |
| **13. Documentation Changes:** | | |
| (list affected documents requiring change) **[Documentation should prepare a checklist covering each document that must be** | 1. | User Guides |
| | | 1.1 Job Entry |
| | | 1.2 Job Entry Other |
| | | 1.3 Billing & Reporting |

updated for this feature]

14. Special Training/Implementation Requirements:

| | |
|---|---|
| (list any special training required for this feature, i.e., documentation, e-mail, help, cue cards, on sight, etc.) | 1. |

15. Acceptance Criteria/Test Scenario:

| | |
|---|---|
| (list test scenarios required to test change prior to user acceptance, this can be updated after the detailed design is complemented.) **REQUIRED [Tester should prepare checklist based on these test scenarios for documentation on results of tests. These should be in matrix from identified back to the numbering scheme use in these test scenarios]** | 1. |

16. Implementation:

| | |
|---|---|
| (Identify if there is an special implementation issues that need to be addressed, i.e., field deployment, etc.) | 1. **The M7P established for this process must be followed for a planned or demand pit to be tracked on the Pitlog Reports.** |

17. Attachments:

| | |
|---|---|
| (copies of screens, reports, etc. before and after proposed change) | 1. Fig. 29 is an exemplary table for Open Pitlog Report<br>2. Fig. 30 is an exemplary table for Pending Open Request Report<br>3. Fig. 31 is an exemplary table for Pending Close Request Report<br>4. Fig. 32 is an exemplary table for Open Pit Request |

5. Fig. 33 is another exemplary table for Open Pit Request
6. Fig. 34 is an exemplary table for Close Pit Request
7. Fig. 35 is another exemplary table for Close Pit Request

Signatures of Agreement:

(add additional rows if necessary)

BAE:

Lead Analyst:

BAE Functional Requirement Document

Table # 2042

| | | | |
|---|---|---|---|
| **BAE Start Date:** | 05/22/1996 | **BAE Name:** | Gail Deaton |
| **BAE Comp. Date:** | 05/28/1996 | **BAE Tele. No.:** | 977-3615 |
| **BAE Hours:** | 20 | | |

| | |
|---|---|
| **CMVC Component Name** | EXCEPTION GEOGRAPHIC LOCATION EDIT FOR DIGITAL LOOP ELECTRONICS |

| | |
|---|---|
| **Associated Defect/Feature No.:** | 2042 |

| | | | |
|---|---|---|---|
| **Target Release:** (give target release this needs to be in) | 2.0 | **Target Release Date:** (give target release date for this enhancement) | 04/02/1997 |

| | |
|---|---|
| **Priority:** (provide priority from 'feature priority' list – production_hi through deferred_low | production_hi |

Revision No.:

| | |
|---|---|
| **Reason for Revision:** | |
| **Subject:**<br>(brief description of change) | Add edit into OSPCM Job Entry EWO to ensure that a ExGLC is present and is valid for digital loop electronics (DLE). |
| **Introduction:**<br>(description of what system currently does, what needs to be changed, and why) | OSPCM currently does not require the entry of a ExGLC for digital loop electronics. The addition of this edit will answer a Internal Audit finding for the equipment placement in Network. The failure of ordering equipment to a ExGL results in accounting posting error. The equipment cannot be booked. A edit needs to be incorporated for placing DLE materials to ensure that a ExGL is entered by the user and that the ExGL is valid in CORTS. |
| **Solution:**<br>(describe what the system will or should do) | The area_req_ind field is already in the ref edit application and Informix database and can be used for this feature. If this field is set to Y, an exception GLC is required. The field is in the frc table and the frc history table. The frc area_req_ind fields are downloaded as a local table so the field can be used for local VB edits. |
| **Change(s):**<br>(detailed description of change) – [add additional rows if multiple changes] | The area_req_ind field is already in the ref edit application and Informix database and can be used for this feature. If this field is set to Y, an exception GLC is required. The field is in the frc table and the frc history table. The frc and area_req_ind fields are downloaded as a local table so the field can be used for local VB edits.<br><br>Job entry VB presentation would add several new error messages. Two new Job Entry/Configuration "C' functions |

required to respond to the "Save" function of the VB presentation:

1) Examine the substep FRC and determine if the FRC requires an Exception GLC.
2) Validate the Exception GLC associated with the DLE substeps to ensure:
a) it is a valid GLC
b) the exception GLC does not belong to a wire center
c) the exemption GLC does not belong to an inventory site OPEDS Pricing Contract "C" code required to call the above two new functions to edit substep information coming from OPEDS.

CHANGES TO GUI:
Better correlation between the Materials screens and the substep screens would be necessary. No new fields would be necessary on the Job Entry EWO screens but exception GLC is not on the same screen with the substep information. Exception GLC should be validated as mentioned above. Therefore, when an exception GLC is required, the user should be forced to go to the Materials screens and enter the GLC.

NEW MESSAGES:
1. "The FRC associated with this substep requires an Exception GLC"
2. "Exception GLC is not a valid GLC."
3. "Exception GLC is currently associated with an existing Wire Center."
4. "Exception GLC is currently associated with an existing Inventory Site."

NEW/CHANGED CONTRACTS FOR CDF FILE:
Contracts to examine the FRC of the substep and determine if

| | |
|---|---|
| | the FRC requires an Exception GLC. Contract to validate GLC to see if already associated with a wire center or an inventory site. |
| **Performance Requirements:** (list any performance requirements associated with this change) | |
| **Dependencies:** (list any defects or features that this enhancement is dependent on) | |
| **Benefits:** (Provide benefits in dollars, reduced headcount, time saving, etc, for doing this work) | Answers Internal Audit finding against DLC equipment placement in Network |

| **8. Affected Components:** | (Check) Yes | (Check) No |
|---|---|---|
| RTOC Instructions | | |
| HELP | x | |
| User Guides | x | |
| Testing | x | |
| Infra-structure | | |
| Management Reports | | |
| Database | x | |

| **Work-around:** | (Check) Yes | (Check) No |
|---|---|---|
| (is there a temporary work around?) (describe work around in | | x |

| | |
|---|---|
| detail) | |
| **Risks:**<br>(list factors that impact, positive/negative, not doing this change) | Not responding to audit finding |
| **Business Rules:**<br>(list any business rules that should apply) | |
| **Documentation Changes:**<br>(list affected documents requiring change) | 1.4 |
| **Test Scenario:**<br>(list test scenarios required to test change) | |
| **Attachments:**<br>(copies of screens, reports, etc. before and after proposed change) | 8. |
| **Signatures of Agreement:**<br>(add additional rows if necessary) | |
| **BAE:** | |
| **Lead Analyst:** | |

BAE Functional Requirement Document

Table # 1263

| | | | |
|---|---|---|---|
| **BAE Start Date:** | 04/03/1996 | **BAE Name:** | Gail Deaton |
| **BAE Comp. Date:** | 04/05/1996 | **BAE Tele. No.:** | 977-3615 |
| **BAE Hours:** | 6 | | |

CMVC Component Name CORE TABLES - CONFIGURATION

Associated Defect/Feature No.: 2042

Target Release:
(give target release this needs to be in) 2.01

Target Release Date:
(give target release date for this enhancement) 06/30/1997

Priority:
(provide priority from 'feature priority' list – production_hi through deferred_low
production_hi

Revision No.:
Reason for Revision:

Subject:
(brief description of change) Add drop down boxes on the Configuration Tables.

Introduction:
(description of what system currently does, what needs to be changed, and The Configuration Editor Module is a district user tool. In adding information to the Resource Group/Work Type screen

| | |
|---|---|
| why) | the user should have drop down selections. |
| **Solution:**<br>(describe what the system will or should do) | Configuration Editor Module –On the Resource Group/Work Type screen, drop down selection boxes should be available in two fields.<br>• The "Schedule Sequence Code" field is edited against the sched_sequence table. A drop down selection box should be available to the user. Entries in the drop down selection should be retrieved from the sched_sequence table, the sched_seq_cd field.<br>• The "Contract Type" field is edited against the contract_type table. A drop down selection box should be available to the user. Entries in the drop down selection should be retrieved from the contract_type table, the contract type field. |
| **Change(s):** | See above. |
| **Performance Requirements:**<br>(list any performance requirements associated with this change) | |
| **Dependencies:**<br>(list any defects or features that this enhancement is dependent on) | |
| **Benefits:**<br>(Provide benefits in dollars, reduced headcount, time saving, etc, for doing this work) | Ease of use for the user. Faster selection time. |

8. Affected Components: (Check) (Check)

| | Yes | No |
|---|---|---|
| RTOC Instructions | | |
| HELP | x | |
| User Guides | x | |
| Testing | x | |
| Infra-structure | | |
| Management Reports | | |
| Database | | |

| | (Check) Yes | (Check) No |
|---|---|---|
| **Work-around:** (is there a temporary work around?) (describe work around in detail) | | |

| | |
|---|---|
| **Risks:** (list factors that impact, positive/negative, not doing this change) | These tables are not in a presentation that the user is privy to. There are no drop downs to indicate what a valid entry should be. The configuration tables will be a source of user frustration. |
| **Business Rules:** (list any business rules that should apply) | |
| **Documentation Changes:** (list affected documents requiring change) | |
| **Test Scenario:** (list test scenarios required to test change) | |

Attachments:
(copies of screens, reports, etc.
before and after proposed
change)
Signatures of Agreement:
(add additional rows if necessary)
BAE:
Lead Analyst:

BAE Functional Requirement Document

Table # 1415

| | | | |
|---|---|---|---|
| **BAE Start Date:** | 05/15/1997 | **BAE Name:** | Gail Deaton |
| **BAE Comp. Date:** | 05/15/1997 | **BAE Tele. No.:** | 977-3615 |
| **BAE Hours:** | 1 | | |

CMVC Component Name CORE TABLES - CONFIGURATION

Associated Defect/Feature No.:

Target Release:
(give target release this needs to be in) phase_3.0

Target Release Date:
(give target release date for this enhancement)

Priority:
(provide priority from 'feature priority' list – production_hi through deferred_low deferred_hi

Revision No.:

Reason for Revision:

Subject:
(brief description of change)

1. If a job contains no prints and steps, disable the configuration button.

Introduction:

| | | |
|---|---|---|
| (description of what system currently does, what needs to be changed, and why) | 1. | On the job outline screen the configuration button is enabled before any prints and steps are entered. If the user clicks on the configuration button, OSPCM tries to configure the job. Configuration is kicked off and a message is sent to user. After processing, a successful configuration message is sent to the user. |
| **Solution:** | | |
| (describe what the system will or should do) | 1. | Do not allow configuration to be kicked off when the job is empty. |
| **Change(s):** | | |
| | 1. | Disable the configuration button until a print, step, substep has been successfully saved. |
| **Performance Requirements:** | | |
| (list any performance requirements associated with this change) | 1. | Performance should not be impacted. |
| **Dependencies:** | | |
| (list any defects or features that this enhancement is dependent on) | | |
| **Benefits:** | | |
| (Provide benefits in dollars, reduced headcount, time saving, etc, for doing this work) | 1. | Save processing time. |
| | 2. | Enhance user acceptance. |

| **Affected Components:** | (Check) Yes | (Check) No |
|---|---|---|

RTOC Instructions

| | |
|---|---|
| **HELP** | |
| **User Guides** | x |
| **Testing** | x |
| **Infra-structure** | |
| **Management Reports** | |
| **Database** | |

Interfaces

(list any legacy or new interface systems impacted by this change) 1.

| | (Check) Yes | (Check) No |
|---|---|---|
| **Work-around:** (is there a temporary work around?) | | X |
| (describe work around in detail) | 1. | |

Risks:

(list factors that impact, positive/negative, not doing this change)

1. Confusion of the user
2. Save processing time

Business Rules:

(list any business rules that should apply)

1. Do not allow the configuration process to be kicked off until at least one print, step, substep has been saved.

Documentation Changes:

(list affected documents requiring change) 1.

Acceptance Criteria/Test Scenario:

(list test scenarios required to 1. Enter a new job on the job entry information screen. Save and

| | | |
|---|---|---|
| test changes) | | close. The job outline will appear. Verify that the configuration button is disabled. |
| | 2. | Enter a new job on the job entry information screen. Save and close. The job outline will appear. Verify that the configuration button is disabled. Enter a print, step, substep to the job. Save and close. On the job entry outline verify that the configuration button is enabled. Configure the job. Verify a successful configuration. |
| **Attachments:** (copies of screens, reports, etc. before and after proposed change) | | |
| **Signatures of Agreement:** (add additional rows if necessary) | | |
| **BAE:** | | |
| **Lead Analyst:** | | |

BAE Functional Requirement Document

Table # 1416

| | | | |
|---|---|---|---|
| **BAE Start Date:** | 05/15/1997 | **BAE Name:** | Gail Deaton |
| **BAE Comp. Date:** | 05/15/1997 | **BAE Tele. No.:** | 977-3615 |
| **BAE Hours:** | 1 | | |

CMVC Component Name: Job Entry - EWO

Associated Defect/Feature No.:

| | | |
|---|---|---|
| **Target Release:**<br>(give target release this needs to be in) | phase_3.0 | **Target Release Date:**<br>(give target release date for this enhancement) |

Priority:
(provide priority from 'feature priority' list – production_hi through deferred_low — deferred_hi

Revision No.:

Reason for Revision:

Subject:
(brief description of change)

1. PWO type jobs should not allow billing codes or replaced items.
2. Add a edits to ensure that that Job Name starts will PWO.

| | |
|---|---|
| **Introduction:**<br>(description of what system currently does, what needs to be changed, and why) | 1. Currently billing information can be added to a PWO. This is not allowable under BellSouth policy.<br>2. The Job Name for a PWO type job will currently accept any format. This is unacceptable in that a PWO job type must always start with PWO. |
| **Solution:**<br>(describe what the system will or should do) | 1. Add edits to the PWO job to disallow any billing information entries.<br>2. Ensure that a PWO job name start with "**PWO...**" |
| **Change(s):**<br>(detailed description of change) – [add additional rows if multiple changes] | 1. Gray out fields that are for billing information on a PWO.<br>• On the Job Information screen, gray out "CLAIM#"<br>• On the Placing screen, gray out the "Billing" field<br>• On the Placing screen, gray out the "Replaced Item" icon<br>• On the Splicing screen, gray out the "Billing' field<br>• On the Splicing screen, gray out the "Replaced Item" icon.<br>2. On the Job Information screen, prepopulate "**PWO...**" in the Job Name field. |
| **Performance Requirements:**<br>(list any performance requirements associated with this change) | 1. Performance should not be affected |

Dependencies:

| | |
|---|---|
| (list any defects or features that this enhancement is dependent on) | 1. |

Benefits:

| | |
|---|---|
| (Provide benefits in dollars, reduced headcount, time saving, etc, for doing this work) | 1. |

| **Affected Components:** | (Check) Yes | (Check) No |
|---|---|---|
| **RTOC Instructions** | | |
| **HELP** | x | |
| **User Guides** | x | |
| **Testing** | x | |
| **Infra-structure** | | |
| **Management Reports** | | |
| **Database** | | |

Interfaces

| | |
|---|---|
| (list any legacy or new interface systems impacted by this change) | 1. |

| | (Check) Yes | (Check) No |
|---|---|---|
| **Work-around:** | | |
| (is there a temporary work around?) | | X |
| (describe work around in detail) | 1. | |

Risks:

| | |
|---|---|
| (list factors that impact, positive/negative, not doing this change) | 1. This feature will ensure the user does not enter erroneous information on a PWO type job. |

Business Rules:

| | | |
|---|---|---|
| (list any business rules that should apply) | 1. | Billing information cannot be entered on a PWO type job. |
| | 2. | the Job Name for a PWO type job must begin with "**PWO**..." |

Documentation Changes:

| | | |
|---|---|---|
| (list affected documents requiring change) | 1. | |

Acceptance Criteria/Test Scenario:

(list test scenarios required to test changes)

1. Enter information for a new PWO.
   - On the Job Information screen, verify that "CLAIM" is grayed out
   - On the Placing screen verify that the "Billing" field is grayed out
   - On the Placing screen, verify that the "Replaced Item" icon field is grayed out
   - On the Splicing screen, verify that the "Billing" field grayed out
   - On the Splicing screen, verify that the "Replaced Item" icon grayed out
2. On the Job Information screen, verify that "PWO..." is prepopulated in the Job Name field.
3. Enter substep information for placing and splicing. Save and Configure. Verify a successful configuration.

Attachments:

| | | |
|---|---|---|
| (copies of screens, reports, etc. before and after proposed change) | 1. | |

Signatures of Agreement:

(add additional rows if necessary)

BAE:

Lead Analyst:

BAE Functional Requirement Document

Table # 2035

| | | | |
|---|---|---|---|
| **BAE Start Date:** | 11/20/1996 | **BAE Name:** | Gail Deaton |
| **BAE Comp. Date:** | 11/21/1996 | **BAE Tele. No.:** | 977-3615 |
| **BAE Hours:** | 4 | | |

CMVC Component Name: Reorg

Associated Defect/Feature No.: 2035

| | | | |
|---|---|---|---|
| **Target Release:** (give target release this needs to be in) | 2.01 | **Target Release Date:** (give target release date for this enhancement) | 06/30/1996 |

Priority:
(provide priority from 'feature priority' list – production_hi through deferred_low production_hi

Revision No.:
Reason for Revision:

Subject:
(brief description of change)

Add OPF parameter to determine on a CMC level if material will be furnished by Telco, the Master Contractor, or a Vendor.

Introduction:

| | |
|---|---|
| (description of what system currently does, what needs to be changed, and why) | OSPCM currently assumes that the master contractor furnishes all poles, manholes and conduit. A OPF parameter needs to be established to determine at a CMC level, which party will furnish material. This OPF will also establish the ability to handle Vendor provided material. |
| **Solution:**<br>(describe what the system will or should do) | Add OPF parameter to allow the input of the preference of Telco furnished material, Master Contractor, or Vendor furnished material. |
| **Change(s):**<br>(detailed description of change) – [add additional rows if multiple changes] | **CORE TABLES OPF**<br>Add a OPF parameter that can be tied to a specific material category and subcategory. This parameter would have three options:<br>• Telco Furnished<br>• Master Contractor Furnished<br>• Vendor Furnished<br>**JOB ENTRY** – EWO<br>• Material Status Flag<br>1. Telco furnished material will have the material status flag set to "N".<br>2. Master Contractor furnished material will have the material status flag set to "U".<br>3. Vendor furnished material will have the material status flag set to "U".<br><br>**PRICING**<br>• Price of materials<br>1. Telco furnished material – Dollars will be generated from the average disbursed price of the material item. |

2. Master Contractor furnished material – Dollars will be generated from the material CWI code and it's associated price located in the specific master contract for the wire center.
3. Vendor furnished material – Dollar for vendor supplied material will be generated from the avg_price_amt populated in CID.

Performance Requirements:
(list any performance requirements associated with this change)

Dependencies:
(list any defects or features that this enhancement is dependent on)

| | |
|---|---|
| **Benefits:**<br>(Provide benefits in dollars, reduced headcount, time saving, etc, for doing this work) | Accuracy in the ordering of materials needed for engineering work orders. Accurate price amount for the material. The materials will be inventoried if required and disbursed from inventory when completed. |

| **Affected Components:** | **(Check)** Yes | **(Check)** No |
|---|---|---|

| | | |
|---|---|---|
| **RTOC Instructions** | | |
| **HELP** | x | |
| **User Guides** | x | |
| **Testing** | x | |
| **Infra-structure** | | |
| **Management Reports** | | |
| **Database** | x | |

| | (Check) Yes | (Check) No |
|---|---|---|
| **Work-around:** (is there a temporary work around?) (describe work around in detail) | | X |

Risks:
(list factors that impact, positive/negative, not doing this change)

Poles, conduit and manholes are currently hard coded to be furnished by the Master Contractor. There are some districts where Telco does order and place into inventor poles, manholes and conduit. In these particular districts, OSPCM does not generate a material order and this is a manual process.

Vendor supplied materials for DLE equipment are becoming more common place. This will allow the district to specify which material items will be supplied by the vendor.

Pricing will not reflect the most accurate cost based on who supplies the material.

Business Rules:
(list any business rules that should apply)

Documentation Changes:

(list affected documents requiring change)

Test Scenario:
(list test scenarios required to test change) REQUIRED

Attachments:
(copies of screens, reports, etc. before and after proposed change)

Signatures of Agreement:
(add additional rows if necessary)

BAE:

Lead Analyst:

BAE Functional Requirement Document

Table # 3640

| | | | |
|---|---|---|---|
| **BAE Start Date:** | December 4, 1996 | **BAE Name:** | Carol A. Brechtel |
| **BAE Comp. Date:** | December 12, 1996 | **BAE Tele. No.:** | 205-977-3611 |
| **BAE Hours:** | 18 | | |

CMVC Component Name: Job Entry – Reorg

Associated Defect/Feature No.: 3640

Target Release:

Target Release Date:

| | | | |
|---|---|---|---|
| (give target release this needs to be in) | 2.01 | (give target release date for this enhancement) | July 1, 1997 |

Priority:

| | |
|---|---|
| (provide priority from 'feature priority' list – production_hi through deferred_low | production_hi |

Revision No.:

Reason for Revision:

Subject:

| | |
|---|---|
| (brief description of change) | Functionality to rename a wire center, move a wire center/inventory site between CMCs, possibility in different states. The functionality to change resource id's assigned to the jobs that are involved in the reorg. |

Introduction:

| | |
|---|---|
| (description of what system currently does, what needs to be changed, and why) | The system does not handle the moving or renaming of wire centers and/or inventory sites. Also can not update the resource id assigned to a job.<br>Enhance the system to handle wire center name changes, movement of wire centers/inventory sites between CMCs, and to handle changing the resource id's assigned to do work on a job. |

Solution:

| | |
|---|---|
| (describe what the system will or should do) | New user screens to handle the renaming of wire centers, the movement of inventory sites and wire center between CMCs, and the changing of resource ids.<br>Crystal Report to printout the requested reorg information (possibility exist of handling more than one reorg request at a time).<br>Management Reports to list all jobs involved in the reorg and |

one that will list all inventory (serialized and non-serialized) that should be moved in the reorg. These reports could be run before the reorg and again after the reorg to ensure that all data was moved properly.

Batch runs that will actually move/update the data in the data bases.

Change(s):

(detailed description of change) – [add additional rows if multiple changes]

Types of reorgs/changes:

1. CMC consolidation
2. Wire Centers and inventory sites split between two or more CMCs
3. Resource ID changed in associated with wire center move
4. Wire Center Name Change If the reorg involves adding a new CMC all navigator contracts must be updated with the new location. Also before the reorg is processed the location table must be updated with the new location.

All data will be moved with the reorg batch process, this includes closed and completed job data.

The following OSPCM executable will probably be affected by the reorg:

Billing & Reporting, Complaints, Employee Editor, Inspections, Job Entry EWO, Job Entry Other, Location Editor, OPF Editor, Pricing, Scheduling and Work Station.

Wire Center Name Change (Reorg Type #4):

On a wire center name change OSPCM would need to update all occurrences of the existing wire center name with the new wire center name. Before this type of change can be processed it will be necessary to build all the new wire centers in the location editor.

CMC Consolidation, Wire C nt rs splits and R source ID changes (R org Types #1, #2 & #3):

OSPCM would need to update all occurrences of the old CMC with the new CMC, when inventory sites and wire centers are moved.

If CMC consolidation or split is being processed the reog would also need to update all the substeps assigned to the resource id to the new resource id. The user would provide the information for these changes by populating the Resource Id window.

Job Entry – if all wire centers on a job are being moved to the same CMC the process should change the primary CMC to the new CMC, at the job header level. If the wire centers on a job are being split between two or more CMCs – the primary CMC should be changed to the CMC of the primary wire center shown on the job header.

Pricing – The CMC is used when printing reports. The CMC should be updated in pricing identical to the change made in job entry.

Configuration Table – If a CMC consolidation is being down update the tables with the new CMC. If wire centers from one CMC are being moved to multiple existing CMC no change is required. If wire centers are being moved from one CMC to multiple CMC, one of which is a new CMC, duplicate the table for the new CMC using the old CMC data.

Employee Table – If the old CMC is being deleted and all existing wire centers under that CMC are being moved to the same CMC the process should update the CMC on the employee table.

If the wire centers are being split between multiple CMC the process should use the information on the resource id window to update the CMC and resource id on the employee table. Both Management and non-management employees need to be updated.

The batch process should end date the existing employee record (from CMC and Res ID), and build a new employee record with the to CMC and Res ID.

Workstation – all jobs should be moved to the new CMC, using the same procedures as indicated for job entry.

Inspections – CMC information is stored on the inspection tables, when the reorg process is run it will be necessary to update the table with the to CMC. If wire centers are being split between multiple CMC, the process will need to read the wire center to determine which CMC to use.

Location Editor – Move inventory site and wire centers tot he new CMC, and end date or delete the old CMC. If all data is being moved to the new CMC I don't see any reason to keep from CMC.

If inventory is being moved from one inventory site to a new or exiting inventory site when the process is completed and all inventory has been moved.

Billing & Reporting – All jobs open and closed should be moved. This included all job types: BSW, EWO and RW.

Job Entry Other – All jobs open and closed should be moved. This included all job types: BSW, EWO and RW.

Scheduling – Scheduling read the job entry tables, so when they are updated by the reorg process and when the schedule is run it should pick up the correct data.

Materials Management – Transaction should be generated whenever inventory is moved during the reorg process. A new transaction type will be needed.

If a inventory site is being moved to a new or existing CMC, the inventory site name is not being changed, the process needs to change the CMC name associated with the inventory site. The inventory, serialized and non-serialized, would stay with the inventory site.

All material request, material request item, serialized and non-serialized should be changed during the batch process.

Completed orders should be moved during the process, since we are moving all job data, regardless of the status.

If the reorg is attempting to move inventory at one site to multiple inventory sites the user will need to manually move the inventory )serialized and non-serialized) using the transfer process. The batch process would have no way of know what material to move where.

Performance Requirements:

| | |
|---|---|
| (list any performance requirements associated with this change) | All updates must be made over the week-end. Reorg could begin on Friday night completing on Sunday so the users could verify that all data was updated correctly. System must be available on Monday morning, normal working hours. |

Dependencies:

| | |
|---|---|
| (list any defects or features that this enhancement is dependent on) | None |

Benefits:

| | |
|---|---|
| (Provide benefits in dollars, reduced headcount, time saving, etc, for doing this work) | Keep wire center names current and accurate. Keep the system in line with realignment of districts, manager etc. |

| **Affected Components:** | (Check) Yes | (Check) No |
|---|---|---|
| **RTOC Instructions** | x | |
| **HELP** | x | |
| **User Guides** | x | |
| **Testing** | x | |
| **Infra-structure** | x | |
| **Management Reports** | x | |
| **Database** | x | |

Interfaces:

(list any legacy or new interface systems by this change)

Majority of systems that interface with OSPCM would need to know about the changes we were making. In today's environment this is done be letters to MTR, STAR, Financial Processing, BCAS, Asset Management etc. Any change moving or renaming wire centers in OSPCM would need to be coordinated with OPEDS.

For a Wire Center name change OSPCM would need to coordinate the change with LMOS.

| | (Check) Yes | (Check) No |
|---|---|---|
| **Work-around:** (is there a temporary work around?) (describe work around in detail) | | X |

Risks:

(list factors that impact, positive/negative, not doing this change)

Don't rename the wire center when area code splits are done, don't move wire centers and inventory sites when CMCs are combined or split. Management would be difficult since it would be almost impossible to pull data on the location you are responsible for. The user would also be required to manually update the resource id assigned to work a substep when changes are made.

Business Rules:

(list any business rules that should apply)

1. All jobs should be moved, closed, completed, open, canceled, etc.
2. Management Report will not be involved in the reorg process.
3. The reorg should not generate duplicate job numbers.
4. System should be backup before the reorg is run.
5. Bid & Award, Regional Contract, BSW LookUp and the Holiday Editor do not need to updated with the reorg process.

THIS IS JUST A START AT LISTING BUSINESS RULES AS THE PROCESS IS DETAILED IT MAY BE NECESSARY TO ADD OTHERS.

Documentation Changes:

| | |
|---|---|
| (list affected documents requiring change) | No documentation exist for this process. Would need to develop M&P, test scenarios and functional decomps. |

Acceptance Criteria/Test Scenario:

| | |
|---|---|
| (list test scenarios required to test changes prior to user acceptance) | 1. Consolidate two existing CMC<br>2. Split wire centers and inventory sites between two CMC one existing and one new CMC)<br>3. Rename several wire centers<br>4. Change resource id assigned to do work on jobs.<br>DETAILED TEST SCENARIOS WILL BE FURNISHED AT A LATER DATE |

Attachments:

| | |
|---|---|
| (copies of screens, reports, etc. before and after proposed change) | Screen Layouts (wire center name change, wire center and inventory site moves, and resource id changes)<br>Manual Reorg Efforts<br>Open Issues |

Signatures of Agreement:

(add additional rows if necessary)

BAE:

Lead Analyst:

BAE Functional Requirement Document

Table # 2355

| | | | |
|---|---|---|---|
| **BAE Start Date:** | 06/13/1996 | **BAE Name:** | Gail Deaton |
| **BAE Comp. Date:** | 06/13/1996 | **BAE Tele. No.:** | 205-977-3615 |
| **BAE Hours:** | 5 | | |

CMVC Component Name: Job Entry – EWO ability to print OSPCM messages

Associated Defect/Feature No.: 2355

| | | | |
|---|---|---|---|
| **Target Release:** (give target release this needs to be in) | 2.0 | **Target Release Date:** (give target release date for this enhancement) | 04/02/1997 |

Priority:

| | |
|---|---|
| (provide priority from 'feature priority' list – production_hi through deferred_low | production_hi<br>OSPCM plan B |

Revision No.:

Reason for Revision:

Subject:

| | |
|---|---|
| (brief description of change) | Job Entry – EWO module – give the user the ability to print OSPCM generate messages. |

Introduction:

| | |
|---|---|
| (description of what system currently does, what needs to be changed, and | Currently Job Entry will generate messages for the user. Some of these messages are lengthy. There is no print capability for |

| | |
|---|---|
| why) | the message. The use must remember the message or write down the message. |
| **Solution:** | |
| (describe what the system will or should do) | Give the user print capability for OSPCM generated messages in Job Entry – EWO. |
| **Change(s):** | |
| (detailed description of change) – [add additional rows if multiple changes] | OSPCM should provide print functionality for model error screens. This functionality should be added in 3 places: the substep save error screen, the delete warning and error messages, and the configuration error messages. |
| **Performance Requirements:** | |
| (list any performance requirements associated with this change) | |
| **Dependencies:** | |
| (list any defects or features that this enhancement is dependent on) | |
| **Benefits:** | |
| (Provide benefits in dollars, reduced headcount, time saving, etc, for doing this work) | Ease of use: more rapid error resolution.<br>Save processing time – the user is forced to recreate the error message if they do not remember the original message. |

| **Affected Components:** | (Check) Yes | (Check) No |
|---|---|---|

| | | |
|---|---|---|
| **RTOC Instructions** | | |
| **HELP** | **x** | |
| **User Guides** | | |
| **Testing** | **x** | |
| **Infra-structure** | | |
| **Management Reports** | | |
| **Database** | | |

| | (Check) | (Check) |
|---|---|---|
| **Work-around:** | Yes | No |
| (is there a temporary work around?) (describe work around in detail) | | |

| | |
|---|---|
| **Risks:** | |
| (list factors that impact, positive/negative, not doing this change) | User acceptability of product will be at risk if this is not implemented. |

Business Rules:
(list any business rules that should apply)

Documentation Changes:
(list affected documents requiring change)

Test Scenario:
(list test scenarios required to test change)

Attachments:

(copies of screens, reports, etc. before and after proposed change)

Signatures of Agreement:

(add additional rows if necessary)

BAE:

Lead Analyst:

BAE Functional Requirement Document

Table # 3794

| | | | |
|---|---|---|---|
| **BAE Start Date:** | 12/01/1996 | **BAE Name:** | Larry Rice |
| **BAE Comp. Date:** | 12/02/1996 | **BAE Tele. No.:** | 977-7436 |
| **BAE Hours:** | 3.0 | | |

CMVC Component Name: bill_report

Associated Defect/Feature No.:

| | | | |
|---|---|---|---|
| **Target Release:** (give target release this needs to be in) | 2.0 | **Target Release Date:** (give target release date for this enhancement) | Pilot |

Priority:
(provide priority from 'feature priority' list – production_hi through deferred_low — prod_hi

Revision No.:
Reason for Revision:

Subject:
(brief description of change) — Make the necessary software changes to facilitate the invoicing changes required for the Supplier Transactions and Remittace (STAR) system.

Introduction:
(description of what system currently does, what needs to be changed, and — What system currently does: Today OSPCM provides a mechanized feed to SAVE/MAPS that bundles the contractor why)

completions to invoices and then create a voucher. The voucher number is generated by OSPCM and is printed on the pay draft generated by SAVE/MAPS. This voucher number enables the contractor to identify step & substep completions in OSPCM that have been bundled on an invoice and voucher. The SAVE/MAPS system will be replaced by the Supplier Transactions and Remittance (STAR) system effective January 1, 1997. STAR does not use OSPCM generated vouchers but instead is a one-to-one OSPCM invoice to a STAR voucher.

What needs to be changed: Billing & Reporting needs to revise all VB presentations and Crystal reports that use the Voucher as a key to determine payment for the contractor. The contractors will use only the Invoice Number when navigating the B&R screens when query about payments. All functionality that dealt with Vouchers will be focused on an Invoice, with all references to Vouchers eliminated.

Why system needs to be changed: STAR draft payments will be populated with the OSPCM Invoice Number not the STAR voucher number. The Invoice Number will be the key which the contractor will use to query OSPCM to determine what completions have been bundled on an invoice.

Solution:
(describe what the system will or should do)

The Billing & Reporting VB presentation for Vouchers will need to be modified to present only the Invoices. All references to Vouchers for VB GUI and Crystal reports will be changed to focus on the Invoice Number. The logic to display the currently 90 day billing should stay the same. The server process that bundles completions to an invoice should always try to maximize the STAR limit of 250 detail lines on an invoice.

| | |
|---|---|
| **Change(s):**<br>(detailed description of change) – [add additional rows if multiple changes] | • Modify Mail Menu selection from Vouchers to Invoices.<br>• Remove Voucher control from **Identify the Invoice** frame.<br>• Group the State, CMC & Contract # controls within the **Identify the Invoice** frame.<br>• Remove Vouchers grid from **Identify the Invoice** frame.<br>• Relocate Invoice grid to be centered on the **Identify the Invoice** frame.<br>• Add Job Number text box to the **Identify the Invoice** frame.<br>• Expand Invoices grid size to display more invoice detail lines on the **Invoice Number** screen.<br>• Add Job Number grid to frame to display invoice detail lines on the **Job Number** screen.<br>• Remove all references to Voucher from all frames, screens and Crystal reports. |
| **Performance Requirements:**<br>(list any performance requirements associated with this change) | Ensure that the 90 day time period does not impact on response time to populate this grid. May need to re-evaluate the time frame and consider 60 days if performance becomes and issue. |
| **Dependencies:**<br>(list any defects or features that this enhancement is dependent on) | The removal of the Voucher grid is dependent on the success of the Phase I changes made for the initial OSPCM/STAR source feed changes effective 01/01/97. With the existing SAVE/MAPS voucher still in the 90 day window through the end of March, the contractor will still need the ability to relate OSPCM generated Voucher Number to Invoice Number for a period of time after the initial implementation. This will probably me a mote point with the scheduled field trail date of May 1007. This will be well past the 90 day window at the |

time OSPCM Phase II goes to field trail.

Benefits:

(Provide benefits in dollars, reduced headcount, time saving, etc, for doing this work)

- No headcount reduction
- No benefit in dollar savings
- Required functional changes imposed by the Phoenix project.

| **Affected Components:** | (Check) Yes | (Check) No |
|---|---|---|
| **RTOC Instructions** | | x |
| **HELP** | x | |
| **User Guides** | x | |
| **Testing** | x | |
| **Infra-structure** | | x |
| **Management Reports** | | x |
| **Database** | | x |

| **Work-around:** | (Check) Yes | (Check) No |
|---|---|---|
| (is there a temporary work around?) (describe work around in detail) | | X |

Risks:

(list factors that impact, positive/negative, not doing this change)

The contractor will have no way of matching his draft payment information with OSPCM data unless the Invoice Number is used as the key for payment queries. The OSPCM generated Voucher Number will have no meaning with the implementation of STAR.

Business Rules:

| | |
|---|---|
| (list any business rules that should apply) | The server process should maximize the STAR limit of 250 invoice detail lines on an invoice. The reduction of the number of invoices generated by this bundling process will make the process much simpler for the contractor to determine what completions are bundled on an invoice for payment. |
| **Documentation Changes:**<br>(list affected documents requiring change) | • HELP<br>• User Guide<br>• Instructor Guide<br>• Functional Decomp<br>• Test plan |
| **Test Scenario:**<br>(list test scenarios required to test change) | |
| **Attachments:**<br>(copies of screens, reports, etc. before and after proposed change) | |
| **Signatures of Agreement:**<br>(add additional rows if necessary) | |
| **BAE:** | |
| **Lead Analyst:** | |

BAE Functional Requirement Document

Table # 6254

| | | | |
|---|---|---|---|
| **BAE Start Date:** | 04/30/97 | **BAE Name:** | Larry Rice |
| **BAE Comp. Date:** | 05/01/97 | **BAE Tele. No.:** | 977-7436 |
| **BAE Hours:** | 2.0 Hours | | |

CMVC Component Name: bill_report

Associated Defect/Feature No.: 6254

| | | | |
|---|---|---|---|
| **Target Release:**<br>(give target release this needs to be in) | 2.01 | **Target Release Date:**<br>(give target release date for this enhancement) | 06/01/97 |

Priority:
(provide priority from 'feature priority' list – production_hi through deferred_low — production_hi

Revision No.:
Reason for Revision:

Subject:
(brief description of change)

1. In Phase 2.0 as well as in Phase I.09, any time that Routine Work, EWO Exhibit 'B' or EWO Exhibit 'B/A' work orders are requested to display, print or local, all steps are printed regardless whether they have open or closed substeps on a step. The application needs to be changed so that <u>only</u> those steps that have open substeps will display, print or local download when request in New and Existing.

| | | |
|---|---|---|
| **Introduction:** | | |
| (description of what system currently does, what needs to be changed, and why) | 1. | Currently when work orders for Routine Work, EWO Exhibit 'B' or EWO Exhibit 'B/A' are requested to display, print or local, all steps for the job request are displayed, printed or downloaded to the clients C drive, regardless of there status of 'OP' or 'CO'. |
| | 2. | The application needs to be changed so that only those work orders for Routine Work, EWO Exhibit 'B' or EWO Exhibit 'B/A' that have at least one open substep on a step display, print or local when requested from New or Existing by the contractor. |
| | 3. | When the contractor selects a RW or EWO job to display, print or local in New or Exiting, the search retrieves all job, prints, steps and substeps, regardless if they are 'OP' or 'CO'. If a job were to have (99) closed steps and (1) open step, the application will print all (100) steps. This would require the contractor to sift through these (100) work orders to find the (1) that still required work to be dispatched on. |
| **Solution:** | | |
| (describe what the system will or should do and any general constraints or conditions that limit the solution) | 1. | For New and Existing, when the contractor requests work orders for Routine Work, EWO Exhibit 'B' or EWO Exhibit 'B/A', only those work orders that have at least one open substep on a step should be retrieved and displayed, printed or downloaded to the clients C drive. |
| **Change(s):** | | |
| (detailed description of change) – [add additional rows if multiple changes] | 1. | **New Work Orders for RW, EWO Exhibit 'B' & EWO Exhibit 'B/A'** |

- Retrieve and then display, print or local all job numbers that have at least one open substep on a step and have not been accepted by the contractor.
- If there are multiple substeps on a step then display all substeps for each step that have at least one open substep on the step and display the status code for each substep.
- If there are no open substeps on a step then do not display, print, local that step.
- For each work order page break on each step number, sorted by Job, Print and Step Number.

1. Existing Work Orders for RW, EWO Exhibit 'B' & EWO Exhibit 'B/A'

- Retrieve and then display, print or local all job numbers that have at least one open substep on a step.
- If there are multiple substeps on a step then display all substeps for each step that have at least one open substep on the step and display the status code for each substep.
- If there are no open substeps on a step then do not display, print, local that step.
- For each work order page break on each step number, sorted by Job, Print and Step Number.

| | | |
|---|---|---|
| **Performance Requirements:**<br>(list any performance requirements associated with this change) | 1 | Changes should no impact on performance. |
| **Dependencies:**<br>(list any defects or features that this enhancement is dependent on) | 1 | None |

Benefits:

| | |
|---|---|
| (Provide benefits in dollars, reduced headcount, time saving, etc, for doing this work) | 1 For the contractor, only those work orders that have work remaining to complete will display, print or local. |

| **Affected Components:** | (Check) Yes | (Check) No |
|---|---|---|
| **Interfaces:** | | |
| (list any legacy or new interface systems impacted by this change) | 1. None | |
| **RTOC Instructions** | | |
| **HELP** | | |
| **User Guides** | x | |
| **Testing** | x | |
| **Infra-structure** | | |
| **Management Reports** | | |
| **Database** | | |

| | (Check) Yes | (Check) No |
|---|---|---|
| **Work-around:** (is there a temporary work around?) (describe work around in detail) | | X |

Risks:

| | |
|---|---|
| (list factors that impact, positive/negative, not doing this change) | 1 In the case of a job that has many steps that have bee completed and then a new step is added, the process will continue to print all of the open and closed steps. |

| | | |
|---|---|---|
| **Business Rules:** (list any business rules that should apply) | 1 | See changes |
| **Documentation Changes:** (list affected documents requiring change) | 1 | User guide |
| **Acceptance Criteria/Test Scenario:** (list test scenarios required to test change prior to user acceptance) (**<u>REQUIRED</u>**) | 1. | Select a RW and EWO that have both open and closed steps to validate that only those steps that have at least one open substep on them are printed, displayed or downloaded to the clients C drive in both New and Existing. |
| | 2. | Add new step in JEO to a RW and EWO that have no open steps to validate that when new work is added that only the new step that had been added is printed, displayed or downloaded to the clients C drive in both New and Existing. |
| **Attachments:** (copies of screens, reports, etc. before and after proposed change) | 1 | |
| **Signatures of Agreement:** (add additional rows if necessary) | | |
| **BAE:** | | |
| **Lead Analyst:** | | |

BAE Functional Requirement Document

Table # F5305_fs.doc

| | | | |
|---|---|---|---|
| **BAE Start Date:** | 12/02/1996 | **BAE Name:** | Ron Cochran |
| **BAE Comp. Date:** | 01/15/1997 | **BAE Tele. No.:** | 205-977-7444 |
| **BAE Hours:** | 25 | **LA Assigned:** | |

CMVC Component Name: Bid & Award

Associated Defect/Feature No.: 5304

Target Release:

(give target release this needs to be in) 1.9 (give target release date for this enhancement)

Priority:

(provide priority from 'feature priority' list – production_hi through deferred_low HI

Revision No.:

Reason for Revision: To provide printing capabilities for existing contracts

Subject:

(brief description of change) Make system changes necessary to allow the user to print any existing contract when eve the need arises.

Introduction:

(description of what system currently does, what needs to be changed, and why) Currently, the contract coordinator can only print a copy of the contract when the system is used for bidding purposes. At that time, the contract can be printed (including the appropriate prices and other associated data substitution) only until the contract is in effect. At that time, the specific documents for that contract are stored on the local access data base. These documents should be placed on the server and then have the capability to print them upon demand. This is specifically needed when a contract work adjustment has been made. In addition , there are no provisions for entering or printing contact documents on conversion contracts which were not bid through OSPCM.

Solution:

(describe what the system will or should do and any general constraints or conditions that limit the solution)

The system should allow the user to select from the contract type's current regional/status documents for a conversion contract. It should be modified to allow the printing of a portion or all of the selected documents whenever necessary.

Change(s):

(detailed description of change) – [add additional rows if multiple changes]

1. All access to these functions come from the OPEN Contracts screen. The present edits on that form should be continued.
2. The Contract Maintenance from should have an additional icon added with the title of Print Doc Copy. An edit should be performed when the Print Doc Copy is selected. The edit should verify that the contract prices are activated and the start date of the contract is today or in the past. If not, the user should received an error which essentially states that they cannot print a contract which is not in effect. For individual contracts (future consideration) the start date is not applicable.
3. When this action is complete, three tabs should be available: the Build, Edit and assemble tabs are used for input. These are identical in appearance and functionality as the Bid Package forms with the following limitations.

Assemble

- If the contract is one which was bid using OSPCM, the Selected Components grid should be populated with the documents previously stored for the specific contract. These documents cannot be deselected.
- The Available Components grid should be populated with regional and state document types which were not stored for the specific contract. These document types be may be selected or deselected in the Selected Component grid. The final selected components will be saved as specific documents for this particular contract upon SAVE or SAVE/CLOSE.
- If the contract is a conversion contract, the Selected Components grid will be blank. The user may select any of the documents from Available Components grid.

Edit

- All documents (except articles) may be modified by the user regardless of whether the contract is a conversion or bid contract. The exact functionality as the Bid Package form should be carried forward to this form.

Build

- In all cases, the Bidders Grid should be populated with the contractor name for this specific contract. The grid should be a read only grid.
- The Components Grid has the same functionality as it does when used as part of the Bid Package.

- The Print and Disk options will have the same functions with the following exception. The print to file will be for documents only. There is only one disk. No Excel spread sheets will be produced since no interaction with the contractor is necessary.

| | |
|---|---|
| **Performance Requirements:** | |
| (list any performance requirements associated with this change) | None |
| **Dependencies:** | |
| (list any defects or features that this enhancement is dependent on) | None |
| **Benefits:** | |
| (Provide benefits in dollars, reduced headcount, time saving, etc, for doing this work) | When the original specifications were written for this module, every contract coordinator had a clerical person assigned to them. In addition, three other clerks at the core headquarters were available to help these people. By the end of the first quarter, there will be no clerical help for the coordinator. In addition, the Mechanized Analyze and Contract Payment Administration System (MACPAS) has been discontinued. That system would print new contracts when additional items were added or deleted or PIC adjustments are made.<br><br>The additional functionality of printing these contract through OSPCM will save a minimum amount of 1200 hours per year for a PG58 Manager. |

| Affected Components: | (Check) Yes | (Check) No |
|---|---|---|
| RTOC Instructions | | x |
| HELP | x | |
| User Guides | x | |
| Testing | x | |
| Infra-structure | | x |
| Management Reports | | x |
| Database | x | |

Interfaces:

(list any legacy or new interface systems impacted by this change) None

| | (Check) Yes | (Check) No |
|---|---|---|
| **Work-around:** (is there a temporary work around?) (describe work around in detail) | | X |

Risks:

(list factors that impact, positive/negative, not doing this change) Possibility of very negative adverse reaction on the part of the field users by not having a copy of the most up-to-date prices in a reasonable time frame. Other duties of the contract coordinator in a time of reduced personnel will be severely curtailed.

Business Rules:

(list any business rules that should apply) In change text.

| | |
|---|---|
| **Documentation Changes:** | |
| (list affected documents requiring change) | None (other than user guides) |
| **Acceptance Criteria/Test Scenario:** | |
| (list test scenarios required to test change prior to user acceptance) | Functionality of forms |
| **Attachments:** | |
| (copies of screens, reports, etc. before and after proposed change) | None |
| **Signatures of Agreement:** | |
| (add additional rows if necessary) | |
| **BAE:** | |
| **Lead Analyst:** | |

BAE Functional Requirement Document

Table # 6092

| | | | |
|---|---|---|---|
| **BAE Start Date:** | 4/30/1997 | **BAE Name:** | Gail W. Deaton |
| **BAE Comp. Date:** | 05/20/1997 | **BAE Tele. No.:** | 977-3615 |
| **BAE Hours:** | 7 | **LA Assigned:** | |

CMVC Component Name: CONFIGURATION EDITOR

Associated Defect/Feature No.: 6901

| | | | |
|---|---|---|---|
| **Target Release:**<br>(give target release this needs to be in) | phase_2.1 | **Target Release Date:**<br>(give target release date for this enhancement) | 09/01/1997 |

Priority:
(provide priority from 'feature priority' list – production_hi through deferred_low — production-med

Revision No.:
Reason for Revision:

Subject:
(brief description of change)

1. Give the user global delete capability in Configuration Editor for a expired resource
2. Give the user copy capability in Configuration Editor for a new resource.

| | | |
|---|---|---|
| **Introduction:** | | |
| (description of what system currently does, what needs to be changed, and why) | 1 | Currently the system does not have global delete capability for a resource. This delete capability should be given to the user for expired resources. |
| | 2 | Currently the system does not have any copy capability. Give the user the ability to copy the work types for an newly created resource. |
| **Solution:** | | |
| (describe what the system will or should do and any general constraints or conditions that limit the solution) | 1 | If a RESID is expired, allow a global delete in Configuration Editor. |
| | 2 | Add the ability to copy work types from an existing resource for newly created RESIDs. |
| **Change(s):** | | |
| (detailed description of change) – [add additional rows if multiple changes] | 1. | Add a "Delete Resource" icon on the Resource Group/Work Type screen. When the icon is clicked, a screen should appear that states: "Enter RESID to be deleted. ______. This is a global delete. Save will remove this RESID from Resource Group/Work Type; Resource Group/Wire Center Area; and the Resource Group/Work Type/Wire Center. Only expired RESIDs will be globally deleted." Implement an edit to check the expiration date of the RESID. If the expiration is today or in the future, do not allow the delete and issue error message. EMU should read "This RESID is not expired. Cannot delete." |
| | 2. | Add a new screen to Configuration Editor. This should be a COPY RESOURCE screen. The user will enter the RESID and the Wire Center to be copied; and the RESID and the Wire Center to receive the copy. This copy should populate the data for the Resource Group/Work Type screen and the Resource |

| | |
|---|---|
| | Group/Wire Center Area screen should be prepopulated by the user before trying to use the COPY RESOURCE screen.<br>• Add an edit on the save for the COPY RESOURCE that the RESID to receive the copy must be in the Resource Group/Wire Center Area Table and must have Travel Time and Inventory Site populated.<br>• Add an edit that the RESID to receive the copy must not be expired.<br>• Allow the copies from RESID to be activate or expired. |
| **Performance Requirements:**<br>(list any performance requirements associated with this change) | 1 Performance of OSPCM should not be affected by this change. |
| **Dependencies:**<br>(list any defects or features that this enhancement is dependent on) | This Feature is dependent on Feature 6091 |
| **Benefits:**<br>(Provide benefits in dollars, reduced headcount, time saving, etc, for doing this work) | 1 User input time will be greatly reduced by these global deletes and copies. |

| **Affected Components:** | **(Check) Yes** | **(Check) No** |
|---|---|---|

| | | |
|---|---|---|
| RTOC Instructions | | |
| HELP | x | |
| User Guides | x | |
| Testing | x | |
| Infra-structure | | |
| Management Reports | | |
| Database | | |

Interfaces:

| | |
|---|---|
| (list any legacy or new interface systems impacted by this change) | 1 |

| | (Check) Yes | (Check) No |
|---|---|---|
| **Work-around:** | | |
| (is there a temporary work around?) | X | |
| (describe work around in detail) | 1 User will individually delete or add work types to the Configuration Editor. | |

Risks:

| | |
|---|---|
| (list factors that impact, positive/negative, not doing this change) | 1 User acceptability of the OSPCM product. |

Business Rules:

| | |
|---|---|
| (list any business rules that should apply) | 1 A RESID cannot be globally deleted from the Configuration Editor unless it is expired. |

Documentation Changes:

| | |
|---|---|
| (list affected documents requiring change) | 1. |

| | | |
|---|---|---|
| **Acceptance Criteria/Test Scenario:** | | |
| (list test scenarios required to test change prior to user acceptance) **REQUIRED** | 1. | Enter a RESID that is not expired using the DELETE RESOURCE icon on the Resource Group/Work Type screen. Should received EMU that the RESID is not expired and cannot be deleted. |
| | 2. | Enter a RESID that is expired using the DELETE RESOURCE icon on the Resource Group/Work Type screen. Delete the Resource.<br>• Pull up the Resource Group/Work Type screen and search for work types linked to this RESID. None should be linked.<br>• Pull up the Resource Group/Wire Center Area screen and search for linked wire centers. None should be linked.<br>• Pull up the Resource Group/Work Type/Wire Center screen and search for linked work types. None should be linked. |
| | 3. | On the COPY RESOURCE screen, enter information to copy a RESID. Verify via Management Reports that the data was correctly copies and applied to the correct wire center. |
| **Attachments:** | | |
| (copies of screens, reports, etc. before and after proposed change) | 1 | |
| **Signatures of Agreement:** | | |
| (add additional rows if necessary) | | |
| **BAE:** | | |
| **Lead Analyst:** | | |

BAE Functional Requirement Document

Table # 4665

| | | | |
|---|---|---|---|
| **BAE Start Date:** | September 23, 1996 | **BAE Name:** | Gail Deaton |
| **BAE Comp. Date:** | November 05, 1996 | **BAE Tele. No.:** | 977-3615 |
| **BAE Hours:** | 28 | | |

CMVC Component Name: 4665

Associated Defect/Feature No.:

| | | | |
|---|---|---|---|
| **Target Release:** (give target release this needs to be in) | 2.0 | **Target Release Date:** (give target release date for this enhancement) | 03/1997 |

Priority:
(provide priority from 'feature priority' list – production_hi through deferred_low    production_hi

Revision No.:
Reason for Revision:

Subject:
(brief description of change)    add features to handle DLC Turnkey applications

Introduction:

(description of what system currently does, what needs to be changed, and why)

Currently, OSPCM and OPEDS have no features for DLC turnkey applications. DLC turnkey is a process in which a vendor orders necessary equipment for a DLC, assembles the equipment, makes splices and performs pre-service turn up carrier systems.

The vendor is responsible for total project management of each application. The vendor sends a paper request to the BellSouth Purchasing Group to request BellSouth to order materials. This procedure takes the local district personnel out of the loop for equipment ordering/receipting material/and tracking inventory until the product is delivered fully assembled.

OSPCM changes will allow for the encoding, prevention of ordering, and the disbursement of DLC turnkey substeps.

Solution:

(describe what the system will or should do)

OSPCM will require changes in the Job Entry Module, the Materials Module, Management Reports and possibly the Scheduling Module.

For Job Entry the placing substeps, splicing substeps and the data base will need to be changed to allow the encoding of each piece of equipment, cable or splice with a DLC Turnkey indicator.

The DLC turnkey indicator will turn off or blank out any STI's and CWI's generated by configuration.

OPEDS must incorporate the above changes in the substep data sent to OSPCM. ODEDS/OSPCM contracts must be revised to transmit the data.

Materials will read the indicator and not calculate an order date and on job date if the indicator is set to "Y" but will leave the material in the "N" needed status. Once assembled, this material gets shipped to the field and must be added to inventory and assigned to a job. The material is added to inventory using the Inventory Add process and checking turnkey. The Needed and the All Requirements screens need to be changed to display the DLC turnkey indicator on each substep. If the substep is selected to be ordered, a new edit mush be added so that substep cannot be ordered.

Scheduling will need to add another scheduling code of DLC-TNKY in order to place all the turnkey equipment and splicing into the same activity. Another labor type of "VS", vendor supplied will be required.

Upon completion of a substep the Material Module will disburse the materials as required from inventory.

Workstation and Contractor Reporting will disburse the items to CPR.

A management report will also be required to list the material components of a DLC Turnkey.

| | |
|---|---|
| **Change(s):** | |
| (detailed description of change) – [add additional rows if multiple changes] | **Job Entry**- Add DLC turnkey indicator on the **Material Data – Order Data** screen. Options for this indicator will be "Y" or "N". The default for this indicator will be "N". A indicator must also be added for the **splicing screen** to indicate turnkey. Add DLC turnkey indicatory in the **job entry data base**.<br><br>**Materials**- Add code for the DLC turnkey indicator. If the indicatory is "Y" do not calculate an order date and on job date. If the indicator is "N" proceed as code currently exists. Display indicator on each substep on the Needed and the All Requirements screens. In addition, an edit will be required so that a turnkey substep cannot be ordered in OSPCM.<br><br>**Management Reports** – add report listing DLC Turnkey Requirements |
| **Performance Requirements:** | |
| (list any performance requirements associated with this change) | |
| **Dependencies:** | |
| (list any defects or features that this enhancement is dependent on) | |
| **Benefits:** | |
| (Provide benefits in dollars, reduced headcount, time saving, etc, for doing this work) | Ability to track DLC turnkey operations in OSPCM as part of a engineering authorization. |

| **Affected Components:** | **(Check) Yes** | **(Check) No** |
|---|---|---|

| | |
|---|---|
| RTOC Instructions | |
| HELP | x |
| User Guides | x |
| Testing | x |
| Infra-structure | |
| Management Reports | x |
| Database | x |
| Job Entry | x |
| Materials Mgmt | x |
| OPEDS | x |

| | (Check) | (Check) |
|---|---|---|
| **Work-around:** | **Yes** | **No** |
| (is there a temporary work around?) | X | |

| | |
|---|---|
| (describe work around in detail) | Do not place DLC equipment or splicing for turnkey jobs into OSPCM. Back end report all equipment in "As Builts." |

Risks:

| | |
|---|---|
| (list factors that impact, positive/negative, not doing this change) | Possibility lose tract of job requirements for equipment.<br>No inventory tracking.<br>Work will be added to the field technician to complete substeps in vendor activity. |

Business Rules:

(list any business rules that should apply)

Documentation Changes:

| | |
|---|---|
| (list affected documents requiring change) | JOB ENTRY USER GUIDE<br>JOB ENTRY INSTRUCTOR GUIDE |

MATERIALS USER GUIDE

| | |
|---|---|
| **Acceptance Criteria/Test Scenario:** | |
| (list test scenarios required to test change) | Test scenarios to be provided by January 15, 1997. |
| **Attachments:** | |
| (copies of screens, reports, etc. before and after proposed change) | Job Entry – Custom material screen<br>Job Entry – Splicing screen<br>Management Report - layout |
| **Signatures of Agreement:** | |
| (add additional rows if necessary) | |
| **BAE:** | |
| **Lead Analyst:** | |

BAE Functional Requirement Document

Table # 5989

| | | | |
|---|---|---|---|
| **BAE Start Date:** | 03/26/1997 | **BAE Name:** | Gail Deaton |
| **BAE Comp. Date:** | 03/26/1997 | **BAE Tele. No.:** | 977-3615 |
| **BAE Hours:** | 1 | **LA Assigned:** | |

CMVC Component Name:

Associated Defect/Feature No.: 4707

| | | | |
|---|---|---|---|
| **Target Release:** (give target release this needs to be in) | 2.0 | **Target Release Date:** (give target release date for this enhancement) | 04/01/1997 |

Priority:
(provide priority from 'feature priority' list – production_hi through deferred_low — HI

Revision No.:
Reason for Revision:

Subject:
(brief description of change) — Change step edits in Job Entry Ewo

Introduction:
(description of what system currently does, what needs to be changed, and — System currently allows no duplicate steps on the job. Need to change edit to no duplicate steps on the print.

| | |
|---|---|
| why) | This change is required to accommodate conversion job. |
| **Solution:**<br>(describe what the system will or should do and any general constraints or conditions that limit the solution) | The system should edit each step number for duplicate entries. There should not be any duplicate step numbers for the print specified. Duplicate step number can be entered for the job. |
| **Change(s):**<br>(detailed description of change) – [add additional rows if multiple changes] | Feature 4707 implemented the job level edit. The feature needs to be reversed. Example: there can be print 1 step 1; print 2 step 1; print 3 step 1; etc. |
| **Performance Requirements:**<br>(list any performance requirements associated with this change) | Should not change any current performance. |
| **Dependencies:**<br>(list any defects or features that this enhancement is dependent on) | |
| **Benefits:**<br>(Provide benefits in dollars, reduced headcount, time saving, etc, for doing this work) | Allows for the conversion of JMOS jobs into the OSPCM system without the changing of step numbers of the physical work prints. |

| Affected Components: | (Check) Yes | (Check) No |
|---|---|---|

| | | |
|---|---|---|
| **RTOC Instructions** | | |
| **HELP** | | |
| **User Guides** | x | |
| **Testing** | x | |
| **Infra-structure** | | |
| **Management Reports** | | |
| **Database** | | |

Interfaces:
(list any legacy or new interface systems impacted by this change)

| | (Check) Yes | (Check) No |
|---|---|---|
| **Work-around:** | | |
| (is there a temporary work around?) (describe work around in detail) | | X |

Risks:
(list factors that impact, positive/negative, not doing this change)

| | |
|---|---|
| **Business Rules:** (list any business rules that should apply) | A step number is unique to the print. |
| **Documentation Changes:** (list affected documents requiring change) | 1. |

Acceptance Criteria/Test Scenario:
(list test scenarios required to
test change)

Attachments:
(copies of screens, reports, etc.
before and after proposed
change)
Signatures of Agreement:
(add additional rows if necessary)
BAE:
Lead Analyst:

BAE Functional Requirement Document

Table # 6091

| | | | |
|---|---|---|---|
| **BAE Start Date:** | 04/30/1997 | **BAE Name:** | Gail W. Deaton |
| **BAE Comp. Date:** | 05/20/1997 | **BAE Tele. No.:** | 977-3615 |
| **BAE Hours:** | 6 | **LA Assigned:** | |

CMVC Component Name: CONFIGURATION EDITOR

Associated Defect/Feature No.: 6091

Target Release:
(give target release this needs to be in) phase_2.1

Target Release Date:
(give target release date for this enhancement) 09/01/1997

Priority:
(provide priority from 'feature priority' list – production_hi through deferred_low HI

Revision No.:
Reason for Revision:

Subject:
(brief description of change) 1 Add an edit to alert the user that a resource has been end dated.

| | |
|---|---|
| **Introduction:**<br>(description of what system currently does, what needs to be changed, and why) | 1 Currently an expired resource can be assigned in the configuration tables. A edit needs to be in place that will make a call to the employee editor to check the resource end date. |
| **Solution:**<br>(describe what the system will or should do and any general constraints or conditions that limit the solution) | 1 When a user calls up a specific resource on any configuration table and tries to make updates to this resource, a call should be made to employee editor to see it this resource is expired. |
| **Change(s):**<br>(detailed description of change) – [add additional rows if multiple changes] | 1 Resource Group/Work Type – When changes or additions are entered on this form, a call should be made to see if the resource has expired. If the resource has not expired, allow the user to continue with updates. If the resource is expired, allow only deletes.<br>2 Resource Group/Wire Center Area – When changes or additions are entered on this form, a call should be made to see if the resource has expired. If the resource has not expired, allow the user to continue with updates. If the resource is expired, allow only deletes.<br>3 Resource Group/Work Type/Wire Center – Resource Group/Wire Center Area – When changes or additions are entered on this form, a call should be made to see if the resource has expired. If the resource has not expired, allow the user to continue with updates. If the resource is expired, allow only deletes.<br><br>Implement an edit to check the expiration date of the RESID. If the expiration is before today's date, allow the delete. If the expiration is today or in the future, do no allow the delete. |

Error message should read: THE RESOURCE FOR THIS UPDATE HAS EXPIRED. ONLY DELETIONS ARE ALLOWED FOR THE RESID.

1.

Performance Requirements:
(list any performance requirements associated with this change)

1 Performance should not be affected by this feature.

Dependencies:
(list any defects or features that this enhancement is dependent on)

1.

Benefits:
(Provide benefits in dollars, reduced headcount, time saving, etc, for doing this work)

1. The user will not be able to assign work on the Configuration Editor to a expired RESID. This will save invalid inputs from the user and also serve to notify the user that the RESID is expired.

| **Affected Components:** | **(Check) Yes** | **(Check) No** |
|---|---|---|
| RTOC Instructions | | |
| HELP | | |
| User Guides | x | |
| Testing | x | |
| Infra-structure | x | |
| Management Reports | | |
| Database | | |

Interfaces:
(list any legacy or new interface systems impacted by this

1.

change)

| | (Check) | (Check) |
|---|---|---|
| **Work-around:** | **Yes** | **No** |
| (is there a temporary work around?) | | X |
| (describe work around in detail) | 1. | |

Risks:

| | | |
|---|---|---|
| (list factors that impact, positive/negative, not doing this change) | 1. | |

Business Rules:

| | | |
|---|---|---|
| (list any business rules that should apply) | 1. | |

Documentation Changes:

(list affected documents requiring change)

Acceptance Criteria/Test Scenario:

| | | |
|---|---|---|
| (list test scenarios required to test change prior to user acceptance) **REQUIRED** | 1 | Expire a RESID in Employee Editor. Next date – access the Configuration Editor and try to make a update. EMU should be generated that RESID is expired. |
| | 2 | Delete some information for this RESID. Verify the information is deleted. |

| | |
|---|---|
| **Attachments:** | |
| (copies of screens, reports, etc. before and after proposed change) | 1. |
| **Signatures of Agreement:** | |
| (add additional rows if necessary) | |
| **BAE:** | |
| **Lead Analyst:** | |

BAE Functional Requirement Document

Table # 4652

| | | | |
|---|---|---|---|
| **BAE Start Date:** | 10/07/1996 | **BAE Name:** | MARK SEAL<br>GAIL DEATON<br>LARRY RICE |
| **BAE Comp. Date:** | 11/05/1996 | **BAE Tele. No.:** | 977-3618<br>977-3615<br>977-7436 |
| **BAE Hours:** | GAIL = 105 HOURS<br>MARK = 102 HOURS<br>LARRY = 45 HOURS | | |

CMVC Component Name: OSPCM-STAND ALONE

Associated Defect/Feature No.:

| | | | |
|---|---|---|---|
| **Target Release:**<br>(give target release this needs to be in) | 2.0 | **Target Release Date:**<br>(give target release date for this enhancement) | 6/01/1997 |

Priority:
(provide priority from 'feature priority' list – production_hi through deferred_low HI

Revision No.:
Reason for Revision:

Subject:

(brief description of change)

Make necessary software changes in order to deploy OSPCM system as a stand alone. This means without the mechanized interface with the OPEDS system.

Introduction:

(description of what system currently does, what needs to be changed, and why)

Currently the OPEDS system creates data and mechanically inputs that data into the OSPCM system. The OPEDS system also receives completion data mechanically from the OSPCM system. These two interfaces handle only the data necessary for interaction between these two systems and does not include data for other down stream systems such as (FP) financial processor.

Solution:

(describe what the system will or should do)

OSPCM will be modified to handle a manual encoding process which will encompass all the necessary data for the down stream accounting systems. OSPCM will also be modified, and an interface created to pass completion information to the down stream accounting systems.

Code has been developed in OPEDS by Watson Dorn to accept the data feed from OSPCM. This code adds data that is currently kept only in the OPEDS system and does some translations and then passes the information Requirement onto the FP (Financial Process) system. It is assumed that this code and the projected OPEDS to FP interface will be utilized when OSPCM is modified for a stand alone deployment. The overall procedure will encompass a very detailed level of complexity which is necessary in order to achieve the acceptable level of accuracy. It is assumed that is existing code along with Mr. Dorn and some part of his development team will be incorporated into the OSPCM team responsible for the OSPCM Stand alone development effort. It should also be noted that some changes to this existing OPEDS code must be made in order to read data from OSPCM rather than the OPEDS data base.

| | |
|---|---|
| **Change(s):** | |
| (detailed description of change) – [add additional rows if multiple changes] | The existing code for the OPEDS to FP interface will be moved to the OSPCM system and will continue to feed the down stream financial system. By using this "already developed" code, the changes that will be needed are to add additional information in OSPCM and feed the OPEDS/FP interface code. This additional information is the data that would have been provided by the OPEDS data base if it were completed. All historical material reporting information which includes original, previous and correcting records will also be handled by this code. The changes in OSPCM that will be necessary are to the modules...Job-Entry EWO, Job-Entry Other, Scheduling, Management Reports, Billing and Reporting, Workstation and OPF Table. |

1 OSPCM FUNCTIONAL DECOMP'S – UPDATE

- Functional decomps will be revised to include the process of using the added code and the changes which include the additional data fields.

2. OSPCM "HELP" – UPDATE

- All of the "HELP" information on the affected screens and modules will be revised to reflect these changes.

3. OSPCM USER/INSTRUCTOR GUIDES - UPDATE

- User guides and instructor guides will be to include these changes in and additional data fields.

4. OSPCM/OPEDS COMPLETION CONTRACT - STANDALONE

- OSPCM will maintain the existing substep completion contract to be used in the event that the OPEDS system will eventually be completed. For a stand alone application a new substep completion contract will be developed and will contain all of the information necessary for the OPEDS/FP code to work correctly with the accounting system. This new substep completion contract (stand alone substep completion contract) will contain all of the data presently in the existing contract along with additional information as described below.

- These are not all fields but include the additions. OSPCM stand alone substep completion contract fields:

| name | Character type | Length |
|---|---|---|
| job_nbr | alpha/numeric | 9 |
| print _nbr | alpha/numeric | 4 |
| step_nbr | alpha/numeric | 6 |
| substep_nbr | alpha/numeric | 3 |
| cmpl_dt | alpha/numeric | 8 |
| rco | alpha/numeric | 8 |
| rcc | alpha/numeric | 8 |
| frc | alpha/numeric | 5 |
| wc | alpha/numeric | 8 |
| work_act | alpha/numeric | 4 |
| work_env | alpha/numeric | 1 |
| direct_to_code | alpha/numeric | 1 |
| excpt_glc | alpha/numeric | 1 |

| | | |
|---|---|---|
| material_item | alpha/numeric | 15 |
| cpr_cd | alpha/numeric | 10 |
| cpr_ind | alpha/numeric | 1 |
| mic_cd | alpha/numeric | 10 |
| pi_cd | alpha/numeric | 1 |
| order_qty | numeric | 8 |
| record_qty | numeric | 8 |
| year | numeric | 4 |
| ret_dt | numeric | 8 |
| tax_district | numeric | 5 |
| pcte_qtyret_ind | numeric | 3 |
| cmc_enc | alpha/numeric | 8 |
| cmc_rpt | alpha/numeric | 8 |
| misc_cd | alpha/numeric | 3 |
| misc_cd_value | alpha/numeric | 16 |

- MISC CODES – Additional misc codes will be added to the drop down list on the work reporting screen. These codes are explained in this document on an individual basis. The new substep completion contract for a stand alone application will operate the as the current contract that is that multiple misc codes can be generated and passed with each substep completion.

- CMC -Two new fields will be added to the substep completion contract to identify the cmc responsible for encoding the job and the cmc responsible for reporting the job completion. When the substep completion contract is created the fields "cmc_enc" and "cmc_rptBecause" will be populated with the cmc__cd for which the job was encoded.

- CPR CODE - The cpr code will be added to the substep completion contract for all material items. The cpr code can be obtained using the material item in the CID table when the substep completion contract is created. Note that if the cpr_ind is "N" then there will not be a cpr_code

- CPR IND – The cpr indicator will be added to the substep completion contract for all material items. The cpr indicator can be obtained using the material item in the CID table when the substep completion contract is created. Note that if the cpr_ind is "N" then there will not be a cpr_code

- MIC CODE - If a material item has a MIC code associated then this code will be populated in the substep completion contract in the "misc_cd" field. The mic code will be obtained using the material item from the CID table.

- PI INDICATOR - The pi_cd field will be added to the substep contract and populated based on the material item in the CID table. If the misc_cd in the mtl_misc_cd table is "PI" then the misc code value is entered on the substep completion contract in the pi_cd for the material item on the substep.

- TAX DISTRICT - A new field will be added to the substep completion contract and will be called "tax_dist. This field will have a value of 5 numeric characters.

- YEAR PLACED - A misc code of "YPL" will be used for a removal or abandon work action on added substeps. The value of this misc code will be 4 numeric characters and will be populated on the substep completion contract.

- "YEAR" 'field.'- The will be populated for on the front end. When these are completed the encoded year placed will be populated in the "YEAR" field on the substep completion contract. If there is a year placed encoded on the job entry screens and at the time of substep completion the misc of YPL is used then the value of the misc code is used to populate the YEAR field in the substep completion contract.

5. MULTIPLE MODULES – TAX DISTRICT

- A new field of TAX" will be added to the Job-entry screens to facilitate the entry of tax districts. This field will be available on the job level screen and will then default to the placing screen and removal screen. If a substep has a different tax district then the user can over type the default. Pick list should be available in a drop down. The drop down should list all the valid tax district codes associated with the wire center entered. On the substep level, if a wire center is changed from the job level default, the tax district in the drop down should be associated with the new wire center entered. Tax districts will be validated against the Wire Center Area table in OSPCM. Currently tax district does exist in this table.
   - In work reporting the misc code of "TAX" will be added to the list of valid misc codes to enable the user to provide a tax district on added substeps. For encoded substeps, when the substep is completed, the misc code of "TAX" should be used when changing the encoded tax district. If no change is needed for an encoded tax district on a substep then no misc code is necessary. The system will use the misc code value for TAX from the "mtl_mis_cd" table if any exists to populate the substep completion contract If there is not a misc code of "TAX" in the mtl_misc_cd table then the encoded tax district from substep_ewo will be used to populate the substep completion contract This same logic will apply to substep completions on the BULK reporting screens.

- For contractor completed substeps the misc code of TAX will not be used. When a contractor completes a substep the tax district value that was encoded will be used to populate the substep completion contract. When a contractor adds a substep, it is cloned from another substep and the tax district will follow. When the substep completion contract is created for contractor substeps then the tax district field will be populated using the tax district value in substep_ewo.

6. JOB ENTRY MODULE – PERCENT OWNERSHIP

- A new field of TCP or "PERCENT OWNERSHIP" will be added to the job-entry screens at a Job level and the value will apply to all of the placing substeps on the job. The default value will be "100" and can be over typed at a substep level if necessary. No decimal should be in this field. This field will be added to the substep_ewo table and will be passed at a substep level in the substep completion contract.

7. JOB ENTRY MODULE - MATERIAL DROP DOWN

- The job entry placing screen will be enhanced to add three additional fields in the material drop down box. The new fields will be :
  - material category
  - material subcategory
  - stock indicator
- Sort alphabetically and the order of the fields should be MATERIAL SHORT DESC / MATERIAL CATEGORY / MATERIAL SUBCATEGORY / STOCK INDICATOR
- Incorporate edit in drop down to show only the materials in the same material category that is derived from the material description entered.

8. MULTIPLE MODULES - EXPAND JOB DESCRIPTION

- Expand the job description field to 65 characters. This expansion will affect:
  - Job entry information screen, job description field
  - Scheduling screens that display the job description
  - Reports that display the job description

9. JOB ENTRY - EDIT ON STEP NUMBERS

- Add edit on step numbers in Job Entry to make step number unique across the entire job. Currently the step number is associated with a print. Example, a job can have print 1 step 1 and print 2 step 1. The edit should disallow the duplication of step numbers.

Business Rule - Step number should be unique across the entire job.

10.- MULTIPLE MODULES – ADD WORK ID FIELD

- Add an ID field to further identify a work location, this field should be 6 characters and accept numbers and alpha characters. This field will be added to:
  - Job-entry screens of placing, splicing, other and removal
  - Scheduling screens
  - Work station reporting screens
  - Contractor work order screens
  - Contractor reporting screens
  - Job-entry Other screens
  - Inspections
  - Reports

- A edit is needed to require that the ID number is unique across the entire job.
- Business Rule - ID number should be unique across the entire job.

11. WORKSTATION - RE-DESIGN WORK REPORTING SCREEN

- Re-Design the work reporting screen to fit on a 15" monitor. We will maintain the substep grid and make the column widths adjustable. Change the column headings to reflect the following from left to right. Job, Print, Step, ID#, Work Act, Work Env., FRC, Type, Cmt, RB, Rmk, Mtl, Mrs, Status, Address. we will make the screen larger, the detail information tabs will be displayed on the lower portion of the screen. When the screen opens the cursor will be focused on the first substep and the details tab will reflect the detail information on that substep. The details icon will be eliminated. The address field on the materials detail tab will be removed and the splicing configuration grid from Job entry will be displayed in this area for splicing sub steps. The name of the first tab will be changed from "Materials" to "Details".

12. SCHEDULING - ADD COLUMN FOR WIRE CENTER

- Add to all scheduling screens an additional column which will reflect the job level wire center. This column will be inserted following the activity number column.

- Add to all scheduling screens an additional column at the far right called Job Description. This will be a 65 character field and will be sizable by the user.

13. JOB ENTRY - "HOT KEYS"

- Develop "Hot Keys[89] to allow the user to jump from grid to grid (without using the mouse) on the job entry placing, splicing, other and removal screens*
- File menu drop down should provide "Hot Key" mapping

14. JOB ENTRY - LAUNCH PRICING

- The ability for the user to access pricing without closing job entry and opening pricing.
    - The user should be able to launch pricing from job entry print/step/substep outline.
    - The user should not have to reopen the job that is currently being encoded. The job number should be carried forward into pricing.
    - Business Rule - Pricing cannot be executed unless the job is configured.
    - Business Rule - Pricing cannot be executed while step screen is open.

15. PRICING - DIALOG BOX / CHANGE REPORT NAME

- Change reports headings and buttons to PRELIMINARY and FIRM
    - change "Unapproved" term to "Preliminary"
    - change "Approved" term to "Firm"

- A dialog box should be displayed upon exiting pricing to prompt "Do you want to FIRM this price?".
  - Display if the job has not been FIRMED
  - Display if the job has had pricing changes since last FIRM

16. JOB ENTRY - POWER-SEARCH

- The job entry open existing job screen should go to the job # in the job number grid as it is keyed in the job number field.

17. JOB ENTRY - CONTRACT ITEMS BID SCREEN

- Give the user the ability to access the Contract Items Bid Screen after a successful configuration.
  - Currently the job must be approved in the pricing module before the user can access the Contract Items. Remove this edit.

18. JOB ENTRY – RESIZE INDICATOR

- A new indicator "RSIZE" will be added to the job-entry placing and removal screens at a substep level in order to identify when a material item is associated with resizing a terminal This indicator will default to "N" for no. "Y" in this field will indicate that the material item is associated with the resizing of a terminal and will be used to generate the CPR ADJP code of "M" which will be populated in the substep completion contract "N" in this field will indicate that the material item is not associated with a resize and will generate a "NULL" entry in the CPR ADJP field on the substep completion contract.
- Two new work actions will be created in Job-entry for use on the "OTHER" type substep screen to facilitate the identification of CPR resizing information. The work actions will be "PCPR and RCPR". The quantity field will indicate the size of the terminal when either of these work actions are entered. Upon completion of a substep with either of these work actions the CPR ADJP code will be set to "R" for those substeps with a work action of RCPR and "P" for those substeps with a work action of PCPR. The substep completion contract will be populated with the usual data with the following completion exceptions and these will apply to substeps with either work action (PCPR..RCPR).

- The material_tem field in the substep completion contract will be populated with "TERM-[xxxx]pr" where the "xxxx" is equal to the "wa_qty" field in substep_ewo.
- The record___qty field in the substep completion contract will be populated with "1".

19. JOB ENTRY - CLONE JOB/SUBSTEP.

- Clone Job - Additional functionality will be added to job entry to facilitate cloning of a Job. An icon will be added to the Job Details screen in Job entry. The user will select a template job for the job to be cloned and then selects the icon. A dialog box is displayed allowing the user to enter job level details for the new job. The user enters the Job level details and either clicks "OK" or "CANCEL". If the user clicks cancel the dialog box disappears and the new job is not created. If the user enters a job number and clicks the OK then the Job number is to insure it is formatted correctly and does not already exist. Once edited, the system creates the entire job with and substep data.

- Business Rule - Clone ID field as blank
- Business Rule - Clone address field as blank

- Clone Substep - An icon will be to the substep entry screens. When a substep is entered and focus is on that substep line, and the user clicks on the clone icon a dialog box will be displayed. The dialog box will ask how many substeps are required to be cloned. The dialog box will have "CANCEL and OK" buttons. When a number is entered and the OK button selected the system will create the additional substeps. If the user selects cancel then no new substeps are created.
- Business Rule - Clone ID field as blank

20. MULTIPLE MODULES - ADVANCED RETIREMENT

- A new indicator will be added to the substep_ewo table called RETJND. This indicator will default to "N" for no. The purpose of this indicator is to indicate that material has been retired and that retirement has been sent to the financial system. A new field in the substep completion contract will be added called "ret". This field will be populated from the substep_ewo table with a "N" for no and "Y" for yes.

When a substep is encoded in job entry it may or may not have a retirement date entered at that time. If a retirement date is entered (that is...the date comes from the engineer), then the date is populated in the substep_ewo table in the retirement date field. The user can advance retire the material using this date by going to the Bulk Reporting screen and displaying the job and clicking the advance retire icon. A dialog box is displayed showing the retirement date entered on the job entry screen. If the user does not want to retire the material at that time he can select CANCEL and nothing happens. If the user wants to go ahead and advance retire the material then he selects OK and the substep completion contract is populated. When the completion contract is populated for the advance retirement the RET field is set to "N" according to the substep_ewo table. Once the contract is . populated successfully, the system will change the indicator in the substep_ewo table from "N" to "Y". This indicates that the material has been retired even though the substep is not complete. When the substep is completed the completion contract is populated again and this time the RET IND in the substep_ewo table is set to "Y" so the RET field in the completion is set to "Y" indicating the material has already retired. The "ret_dt field in the substep completion contract is with he advance retirement date.

- When a substep is entered In job entry and a retirement date is not provided by the engineer the RET IND will default of "N". If the user wants to advance retire material he will access the Bulk Reporting screen and display the Job. The user then clicks on the advance retirement icon and a dialog box is displayed asking for a date. The user will enter the advance retirement date and click OK. The system will populate the substep completion contract and the RET field will be "N"...same as the RET IND in the substep_ewo table. Once the completion contract is successfully executed the RET IND will be set to "Y" meaning that the material has been advance retired.

- When the substep is completed the substep completion contract is populated and the RET field is populated with a "Y" indicating that the material has already been retired. The "ret_Jf will be populated with the advance retirement date.

21. JOB ENTRY-YEAR PLACED EDIT

- When a removal type substep is entered on the job entry screens an additional edit will be performed to check the material item and cpr indicator. If the material item has a cpr indicator set to "Y" then the year placed should be a required entry. If the cpr indicator is set to "NT then the year placed entry is not required.

22. OFF TABLE - JOB CLOSE INTERVAL

- A new field will be added to the OPF table at a cmc level and will be called the Job Close Interval. The value in this table field will be 2 numeric characters (00 to 99) and should be user controlled and at a CMC level. The regional default will be 10. This will be the interval (in days) between the Job End Date and the Job Close Date. A batch process will be added to check the Job End Date and the Job Close Interval and if necessary populate the Job Close Date.
- Example: The Job End Date is 6-1 -1996. The Job Close Interval is set to 10. If the current date is 10 or more days past the Job End Date then the system will populate the Job Close Date with the current date.

NOTE: Once a job is closed it can not be re-opened for any reason.

- The routine that will populate the Job End Date is as follows; When the last substep on a job is completed the system will check the progressive engineering indicator. If the indicator is set to "Y" then no further action is required at that time. If the indicator is set to "N" when the last substep is completed then the system will check the 1NV_CD for all substeps. If this code is populated with a "N" or "I" for all substeps then the system will populate the Job End Date with the current date.
- When the progressive engineering application indicator is set to "Y" and the user changes the indicator to "N" then the system will do a check to see if all substeps on the job are complete and the Inv_cd is set to "N" or "I". If there are substeps that are not complete then no further action is needed. If there are substeps with the Inv_cd populated with a code other than "N" or "I" then no further action necessary. If all of the substeps are complete and the Inv_cd is populated with an "N" or T then the system will populate the Job End Date with the current date.
- If a job has the Job End Date populated with a date and a substep is uncompleted or if a new substep has been added to the job then the Job End Date will be removed. Once the additional substeps are completed then the system will go through the process as described above to populate the Job End Date and the Job Close Date fields.

23. MANAGEMENT REPORT - JOB CLOSE REPORT

- A mechanized Job Close report will created to list all of the jobs that have closed in the current week. The report will be sent mechanically to the cost office. This feed can probably be accomplished with a bufit file sent via E-MAIL The E-MAIL address for the cost office will be held in the OPF table in a new field called cost_mail_add.
- Management Reports will provide the same data on line in OSPCM on a similar report. This report will be requested by CMC and Date. The date will identify the particular week that data is being requested for. In addition a second report will be developed and available on a weekly and monthly basis which will be a list of all jobs that closed for the current month. On this report additional information will be included such as percent of open jobs that closed, etc.

24. TABLE – OPEDS WORK ACTION CONVERSION

- Presently the code developed by Watson Dorn includes a conversion work action table and it is assumed that this table will continue to be used in a stand alone application. The four work action codes that are used by the financial system are PLAC, REMO, PCPR and RCPR.

25. TABLE - OPF

- Additional information will be added to the OPF table at a regional and/or cmc level. The table will hold the default values for contract work involving (depth, width, diameter, new/existing). When the system searches this table it will look at a CMC level and use the information available. If there is no information at a cmc level then the system will look at a regional level. If no information exists, then the user will have to input the data on the job entry placing screen. This is an existing feature [JBNTRY12.DOC] in the current application.

26. MANAGEMENT REPORT - PICS/DCPR

- A management report will be created to reflect the same data being retrieved from JMOS today. That is information associated with completed substep involving COE, DLC equipment. See attachment

27. JOB ENTRY - EXCEPTION GEO LOG

- A new field "EX GL" will be added to job entry removal screen for removal type substeps. This field will be used to enter the exception GL for removal substeps associated with COE and DLC equipment. When the FRC associated with this type of equipment is used then the system should edit this field and require that a valid GL has been entered.

28. SCHEDULING -ADD JOB DESCRIPTION TO SCHEDULING SCREENS

- Add a new column on the "Current Week, Next Week, 20 week limited and unlimited scheduling screens. This new column will be called "JOB DESCRIPTION". This new column will be the last column on the right hand side of all of the screens. The 65 character Job description will be populated in this column for each and every activity on the screen. The grid will continue to be adjustable and will be left to the user to change and save the column widths.

29. OSPCM – WINDOWNS NT COMPATABILE

- The following should be designed to work on Windows NT
  - •OSPCM
  - •OSPCM managments reports
  - •Chameleon
  - •Focus for Windows
  - •Navigator contracts
  - •A letter should be drafted to all Outside Plant Contractors to assure compatibility of software

30. ADDITIONAL ITEMS – FEASABILITY

- The following items will be evaluated during the detail design process to determine what if anything, can be done and the best way to accomplish these items.
- Default the work action on the job entry placing screen to "PLAC".
- Default the work action on the job entry splicing screen to "SPL".
- On the job entry placing screen, default the record qty and order qty on non cable material items to
- On the job entry placing screen, default the order qty to "1" on items when the record qty of "1" is entered.
- Add description to the work actions on the drop down menu on the job entry screens.

31. JOB ENTRY - PERFORMANCE

- Edits are performed on each field as entered for the job entry screens. The system is slow in performing this edit and allowing the user to continue to the next field of input The response time of the system should be improved for these screens.

| | |
|---|---|
| **Performance Requirements:**<br>(list any performance requirements associated with this change) | Job entry material drop downs may affect performance goal of 2 seconds. No significant difference in performance should be seen when opening the scheduling screens due to adding the Job Description field at an activity level. |
| **Dependencies:**<br>(list any defects or features that this enhancement is dependent on) | OSPCM interface to FP is dependent on the use of Watson Dorn's existing code. |
| **Interfaces:**<br>(list any interfaces that this enhancement is dependent on) | Job closed reports to Accounting<br>PICS/DCPR reports<br>Interface with the FP system |
| **Benefits:**<br>(Provide benefits in dollars, reduced headcount, time saving, etc, for doing this work) | • Benefits in dollars &00.00.<br>• No reduced head count.<br>• Some time saving on encoding screens and very little if any on the time reporting screens. No savings on scheduling screens. |

| **Affected Components:** | **(Check) Yes** | **(Check) No** |
|---|---|---|
| Job – Entry | x | |
| Pricing | x | |

| | |
|---|---|
| Scheduling | x |
| Workstation | x |
| Contractor Reporting | x |
| JE – Other | x |
| HELP | x |
| User Guides | x |
| Testing | x |
| Infra-structure | x |
| Management Reports | x |
| Database | x |

| | **(Check)** | **(Check)** |
|---|---|---|
| **Work-around:** | **Yes** | **No** |
| (is there a temporary work around?) (describe work around in detail) | | X |

Risks:

(list factors that impact, positive/negative, not doing this change)

- The items critical to passing material to the down stream system (FP) must all be developed for OSPCM to work as a stand alone system.
- The items that are "nice to have" or allegedly reduce user work content are not critical to making OSPCM a stand alone application.
- Change of current personnel or a personnel reduction of OSPCM team members will have a severe impact on a June, 1997 deployment date.
- Watson Dorn code for FP interface not compatible with OSPCM or necessary changes not made by his development team members.
- Budget funding

| | |
|---|---|
| **Business Rules:** | |
| (list any business rules that should apply) | See Items above. |
| **Documentation Changes:** | |
| (list affected documents requiring change) | • HELP<br>• User guides<br>• Instructor guides<br>• Functional decomp's<br>• Data Model<br>• Data dictionary |
| **Test Scenario:** | |
| (list test scenarios required to test change) | To be furnished by Feb 01, 1997. |
| **Attachments:** | |
| (copies of screens, reports, etc. before and after proposed change) | • Job entry screens<br>• Pricing<br>• Scheduling<br>• Work station<br>• Contractor Reporting<br>• JE-Other<br>• Management Reports |

Signatures of Agreement:

(add additional rows if necessary)

BAE:

BAE:

BAE:

BAE:

Lead Analyst:

Lead Analyst:

Lead Analyst:

Lead Analyst:

BAE Functional Requirement Document

Table # 6212

| | | | |
|---|---|---|---|
| BAE Start Date: | 05/06/1997 | BAE Name: | Gail Deaton |
| BAE Comp. Date: | 05/06/1997 | BAE Tele. No.: | 977-3615 |
| BAE Hours: | 1 | | |

CMVC Component Name Job Entry - EWO

Associated Defect/Feature No.:

| | | | |
|---|---|---|---|
| Target Release: (give target release this needs to be in) | Phase_2.1 | Target Release Date: (give target release date for this enhancement) | 09/1997 |

Priority:
(provide priority from 'feature priority' list – production_hi through deferred_low — med Revision No.:
Reason for Revision:

Subject:
(brief description of change) — 1. Add percent ownership to the removal screen

Introduction:
(description of what system currently does, what needs to be changed, and why) — 1. Currently the system is hard coded to enter 100 percent ownership for BellSouth. In the case of partial ownership, OSPCM cannot generate the appropriate transaction to FP.

Solution:

(describe what the system will or should do)

1. OSPCM should allow the entry of percent ownership for removal items.

Change(s):

1. Add the field "PCT" for percent ownership on the removal screen for Job Entry – EWO. Default the entry in this field to 100. Allow the user to overtype with changes.

Performance Requirements:

(list any performance requirements associated with this change)

1. None

Dependencies:

(list any defects or features that this enhancement is dependent on)

1.

Benefits:

(Provide benefits in dollars, reduced headcount, time saving, etc, for doing this work)

1. Allows for the proper reporting of material removal items that are partially owned.

8. Affected Components: (Check)(Check)

| | Yes | No |
|---|---|---|
| RTOC Instructions | | |
| HELP | x | |
| User Guides | | |
| Testing | x | |
| Infra-structure | | |
| Management Reports | | |
| Database | | |

(Check) (Check)

| | | |
|---|---|---|
| **Work-around:** | Yes | No |
| (is there a temporary work around?) | x | |
| (describe work around in detail) | 1. The work around is to default "PCT" to 100 for all removal items. | |

| | | |
|---|---|---|
| **Risks:** | | |
| (list factors that impact, positive/negative, not doing this change) | 1. | |
| **Business Rules:** | | |
| (list any business rules that should apply) | 1. | |
| **Documentation Changes:** | | |
| (list affected documents requiring change) | 1. | |
| **Acceptance Criteria/Test Scenario:** | | |
| (list test scenarios required to test change prior to user acceptance) REQUIRED | 1. | Enter a substep on the removal screen.<br>Change to default from 100 to 80.<br>Complete the step and follow the transaction to FP. |

Attachments:
(copies of screens, reports, etc. before and after proposed change)
Signatures of Agreement:
(add additional rows if necessary)
BAE:
Lead Analyst:

BAE FUNCTIONAL DOCUMENT

Table # 6249_FS

| | | | |
|---|---|---|---|
| **BAE Start Date:** | 04/15/1997 | **BAE Name:** | Mark Seal |
| **BAE Comp. Date:** | 04/18/1997 | **BAE Tele. No.:** | 205-977-3618 |
| **BAE Hours:** | 10.5 | **LA Assigned:** | |

CMVC Component Name: WORKSTATION --- JOBENTRY EWO --- MATERIALS MODULES

Associated Defect/Feature No.: 6249

Target Release
(give target release this needs to be in) 2.01 2.1

Target Release Date:
(give target release date for this enhancement, if required

Priority:
(provide priority from 'feature priority' list – number preliminary assigned by SME) HI

Revision No.:
Reason for Revision:

Subject:
(brief description of change)

1. ADD, CHANGE AND DELETE EDITS TO HANDLE THE ENCODING, ORDERING, RECEIPTING, INVENTORYING, REPORTING AND DISBURSEMENT OF ASSEMBLY ITEMS.

Introduction:

(description of what system currently does, what needs to be changed, and why)

1. CURRENTLY THE SYSTEM DOES NOT HANDLE ASSEMBLY ITEMS CORRECTLY FOR EXAMPLE:

- NON-ASSEMBLY MATERIAL ITEMS, SUCH AS CABLE, CAN BE ORDERED AS PART OF AN ASSEMBLY.
- THERE IS A POTENTIAL FOR NOT ORDERING ALL OF THE ITEMS IN AN ASSEMBLY.
- SINCE OSPCM INVENTORIES XPIDED AND NON-XPIDED ASSEMBLY ITEMS DIFFERENTLY, THERE ARE PROBLEMS WHEN THE USER COMPLETES THE SUBSTEPS FOR THE FACTORY ADD-ON ITEMS.
- THE USER WOULD NOT BE ABLE TO RECEIPT THE CABINET IN AN ASSEMBLY THAT HAD AN XPIDED ADD-ON IF IT WAS NOT THE FIRST ITEM ON THE ORDER.
- SINCE CABINETS ARE MAINLY PLACED BY A CONTRACTOR AND CWIS ARE NOT GENERATED FOR ANY ADD-ON ITEMS, THE SUBSTEPS FOR ANY FACTORY ADD-ON ITEMS WOULD NEVER GET COMPLETED BECAUSE THEY DON'T APPEAR ON THE CONTRACTORS SCREEN.

Solution:

(describe what the system will or should do and any general constraints or conditions that limit the solution)

1. Change the system to ensure that an assembly item is encoded correctly.
2. Change the system to ensure all items in an assembly are ordered at the same time.

3. Change the system so that the user can only receipt the cabinet within an assembly item and have the system auto-receipt the add-on items.
4. Change the system so that only the user must complete only substep that contains the cabinet and have the system auto-complete the add-on items. This will be for work reporting, bulk reporting and contractor reporting.

| | |
|---|---|
| **Change(s):** (detailed description of change/addition) – [add additional rows if multiple changes] | |

1. JOBENTRY

1. Remove any existing edits referring to XPIDS (A PIDed item beginning with an "X"). This will allow the system to handle all types of PIDed materials with assembly codes.

2. Business Rule: Material Items having an assembly indicator = "Y", must be encoded with an assembly code. Add additional edits to the Jobentry screens so that when material is entered without an assembly code, the system will check the Assembly Indicator in the OSPCM MATERIAL ITEM TABLE. If the Assembly Indicator is set to "Y", then return an error message to the user saying 'THIS MATERIAL ITEM CANNOT BE ENTERED WITHOUT AN ASSEMBLY CODE". If the Assembly Indicator is set to "N", then allow the entry.

3. Business Rule: If an assembly is encoded, one of the substeps with that assembly code in that step must be for a cabinet having a subcategory code of "CABINET-HW" or "CABINET=HW&PI". Add additional edits to the Jobentry screens so that when material is with assembly the system will check the Assembly in the OSPCM MATERIAL ITEM. If the Assembly Indicator flag is set to "Y", then an additional check will be made to all other material entered on the same Step with the same assembly code. A substep having a cabinet description from the Category of Circuit_Eqpt and the Sub-Category of "CABINET-HW" or "CABINET-HW&PI must exist with the same assembly code. If a cabinet description from the Category of Circuit_Eqpt and the Sub-Category of "CABINET-HW" or "CABINET-HW&PI" does not exist, then return an error message saying THIS ITEM CANNOT BE ENTERED WITHOUT A CABINET WITH THE SAME ASSEMBLY CODE ON THIS STEP." If a cabinet description from the Category of Circuit_Eqpt and the Sub-Category of "CABINET-HW" or "CABINET-HW&PI" does exist and has the same assembly code then allow the entry.

4. Business Rule: Material Items having an assembly indicator = "N", cannot be encoded with an assembly code, unless the material item has a subcategory code of "CABINET-HW" or "CABINET=HW&PI. When material is entered and an assembly code is entered, the system will check the OSPCM MATERIAL ITEM TABLE. If the item entered has an Assembly Indicator flag set to "N", then check to see if the material item is in either of the sub-categories of "CABINET-HW" or "CABINET-HW&PI" under the category of CIRCU1T-EQPT. If the item is not in one of these sub-categories then return an error message to the user saying "AN ASSEMBLY CODE IS NOT ALLOWED ON THIS MATERIAL ITEM".

5. Business Rule: Only one cabinet may exist per assembly code within a job step. If the assembly indicator is "N" and the item has a subcategory of "CABINET-HW" or "CABINET-HW&PI", then verify that only one item from these sub-categories exist with the same assembly code on the same step. If only one cabinet exists then allow the entry. If the user is attempting to enter more than one cabinet per assembly then return an error message saying "NO MORE THAN ONE CABINET IS ALLOWED FOR EACH ASSEMBLY CODE".

6. Business Rule: If a cabinet is encoded with an assembly code, there must exist at least one substep in that assembly for factory add-on material on that step. If the user enters a cabinet description from the Category of Circuit_Eqpt and the Sub-Category of or "CABINET-HW&PI" with an assembly code then at least one other substep with a material item having an assembly indicator equal to "Y" must have the same assembly code on the same step. If no other of these substeps exist, then return an error message saying "FACTORY ADD-ON MATERIAL MISSING FROM THIS ASSEMBLY".

7. Business Rule: Cannot a substep to an assembly item if the cabinet for that assembly item has already been ordered, If the user attempts to add a material item with an assembly code after the assembly item has been ordered then return an error message saying "CANNOT ADD MATERIAL ITEMS TO A MATERIAL ASSEMBLY ITEM THAT HAS ALREADY BEEN ORDERED".

8. Business Rule: Assembly codes are alphanumeric and the field size is 1. Do not allow the user to type in any other character other than A-Z or 0-9.

2. MATERIALS ORDERING & RECEIPTING

1. Remove any existing edits referring to XPIDS (Except the one that ensures that the XPIDed item is the first item on the order. See #3 below.). This will allow the system to handle all types of PIDed materials with assembly codes.

2. Change the material application to add an edit to insure that all items with the same assembly code on a step are ordered at the same time. This needs to be true from the "Show Needed Requirements" option and the "Show Today's Requirements" option. Normally the cabinet will have the longest ship interval so the system should calculate an order date for each item in the assembly based on the cabinet order date.

3. The order process should continue to insure that if ordering an XPIDed item that it be the first item on the order. Usually the cabinet is XPIDed, but if ordering a non-XPIDed cabinet and an XPIDed add on item, the XPIDed add-on item must be the first item on the order. CAPRI has a business rule which requires that the XPIDed item, if one exists, be the first item on the order. If multiple XPIDed items exist on the order, it doesn't matter which one comes first.

4. Change the materials "Order Receipting Process" so that when items with assembly codes are receipted, only the cabinets are receipted by the user. Any add on items should be auto-receipted by the system when the cabinets are receipted in OSPCM. Do not create order receipt transactions for the factory addition items, but change their substep material status to "R". When receipting, only the cabinet should be placed in the inventory. Do not create inventory items for the factory addition items.

3. MATERIAL REPORTING & DISBURSEMENTS

1. In workstation the user will see the substep displayed only for the cabinet in an assembly item. The substeps for the factory add-on items will be masked or will not be displayed.
2. In BULK Reporting screens, the user will see the substep displayed only for the cabinet in an assembly item. The substeps for the factory add-on items will be masked or will not be displayed.
3. This same process should be followed when a user completes on the Bulk reporting screens at a Job, Print and Step level.
4. In Billing and Reporting the contractor will see the substep displayed for only the cabinet only in an assembly item. This is mainly because only the cabinet placement should generate CWI's. The substeps for the factory add-on items will be masked or will not be displayed because they do not have CWI's associated.
5. When the user completes the substep that contains the cabinet, a material usage record is created and sent to materials for disbursement from the inventory. If that cabinet is part of an assembly, the materials disbursement process will auto-disburse the substeps containing the factory add-on items in that assembly by changing the substep material status to "D" and changing the substep status to "CO".
6. The auto-disbursing process will not attempt to delete the factory add-on items from the inventory.

Performance Requirements:

| | | |
|---|---|---|
| (list any performance requirements associated with this change) | 1. | There should be no noticeable affect on performance. |

Dependencies:

| | | |
|---|---|---|
| (list any defects or features that this enhancement is dependent on or that will be dependent on this feature) | 1. | NONE |

Benefits:

| | | |
|---|---|---|
| (provide benefits in dollars, reduced headcount, time savings, etc. for doing this work) | 1. | Can handle the encoding, ordering, receipting, inventorying, reporting and disbursing of assembly items. |

| **Affected Components:** | **(Check) Yes** | **(Check) No** |
|---|---|---|
| **RTOC Instructions** | | |
| **HELP** | x | |
| **User Guides** | x | |
| **Testing** | x | |
| **Infra-structure** | | |
| **Management Reports** | x | |
| **Database** | | |

| | | |
|---|---|---|
| **Interfaces:** | | |
| (list any legacy or new interface systems impacted by this change) | 1. The DCPR report in the Management Reports Module will display all cabinets and all add-on information. This is already in effect with the existing report. | |
| | **(Check)** | **(Check)** |
| **Work-around:** | **Yes** | **No** |
| (is there a temporary work around?) | | X |

(describe work around in detail)

There are work-arounds for part of this process, but it leaves "holes" in other areas of the application. For example,

- M&Ps could be written to handle most of the jobentry edits, but if cable is ever encoded with an assembly code, that cable would be shipped to the vendor.
- M&Ps could be written to instruct the user to order assembly items from the "Show Needed Requirements" window, but if they don't we may not order all of the items in the assembly since we cannot guarantee that all of the items would receive the same order date.
- Since we inventory add-on items in a non-XPIDed assembly and don't inventory add-on items in a XPIDed assembly, reporting doesn't know how to "complete" the substeps. They could report zero quantity on those add-ons in the XPIDed assembly, but how would the user know the difference between an XPIDed assembly and a non-XPIDed assembly.
- There is no work-around in the receipting process for XPIDed assembly items that have XPIDed add-ons. The user would not be able to receipt the cabinet if it wasn't the first item on the order.

Risks:

(list factors that impact, positive/negative, not doing this change)

1. If this change is not done then the potential exists for some items in an assembly to be missed in the ordering process. Other items could be reported incorrectly. The user could order items in an assembly like cable and other non-assembly type items. This will lead to unnecessary expense to reconcile these types of situations.

Business Rules:

(list any business rules or constraints that should apply.)

1. See changes above.

Document Changes:

(list affected documents requiring change)

1. Help and User Guides

Acceptance Criteria/Test Scenario:

(list test scenarios required to test change prior to user acceptance, this can be updated after the detailed design is complemented.) REQUIRED

1. Attempt to input into the jobentry screens a substep containing a description from the material item table category of Circuit_Eqpt and a sub-category of CABINET-ADD-FAC. Do not enter an assembly code. Result should be an error message saying you need an assembly code with this material item.
2. Add the assembly code above and try to save and close. Result - should get error message saying that a cabinet must have the same assembly code on the same step. Enter the cabinet from either of the sub-categories of "CABINET-HW" or "CABINET-HW&PI" under the category of CIRCUIT-EQPT on a different step with the same assembly code, (try each cabinet) Result - should get same error message.
3. Enter a cabinet from some other Category and sub-category with the same assembly code on the same step and the result should be the same error message.
4. Enter the cabinet from both of the sub-categories of "CABINET-HW" or "CABINET-HW&PI" under the category of CIRCUIT-EQPT on the same step with the same assembly code. Result -should get error message saying that only one cabinet is allowed in an assembly item.
5. Remove one of the cabinets and the system should accept the entry
6. Encode a substep for a material description having an assembly indicator = "N" (i.e., cable) and enter an assembly code. Result - should get error message saying that an assembly code is not allowed on this material item.

7. Encode a substep for a cabinet having a subcategory of "CABINET-HW" or "CABINET-HW&PI with an assembly code but don't encode a factory-added substep on the step. Save the substep. Result - should get an error message stating that factory add-on material is missing from the assembly.

8. Try to enter a non-alphanumeric character as the assembly code. Result - should not be able to produce the keystroke.

9. Verify that after configuration that the substeps for the assembly item are in different activities.

10. Verify that all of the material on the assembly item has the same order date when being ordered. This date should be based on the shipping interval of the cabinet 11. Verify that the XPIDed item is always the first item listed on the order.

12. Try to add a factory add-on substep to an assembly after the cabinet has been ordered. Result - should get an error message which states that the substep cannot be added because the cabinet in that assembly has already been ordered.

13. Verify that only the cabinet can be receipted on an assembly item. Receipt the cabinet on an assembly item. Verify that all of the other items in the assembly item are auto-receipted and that only the cabinet is placed in the inventory.

14. Go to workstation and build a work report. Report the substep containing a cabinet that is part of an assembly item.

15. Verify that the substeps in the assembly item that don't contain the cabinet are not seen or that they are grayed out on the screen. Verify that all other substeps containing that are part of the assembly are completed.

16. Verify that a material is created for the cabinet only. Verify that only the cabinet is removed from the inventory.

17. Go to Bulk reporting screens and complete a substep containing the cabinet of an assembly item. Verify that the substeps in the assembly item that don't contain the cabinet are not seen or that they are grayed out on the screen 18. Verify that all other substeps containing material that are part of the assembly item are auto-completed.

19. Verify that a material usage is created for the cabinet only. Verify that only the cabinet is removed from the inventory.

20. Repeat this process in Bulk Reporting at the Job, Print and Step level.

21. Go to Billing and Reporting and complete a substep containing the cabinet of an assembly item. Verify that the substeps in the assembly item that don't contain the cabinet are not seen.

22. Verify that all other substeps containing material that are part of the assembly item are auto-completed.

23. Verify that a material usage is created for the cabinet only. Verify that only the cabinet is removed from the inventory.

- Include test cases for XPIDed and non-XPIDed assembly items.
- Include test cases for an XPIDed add-on item with an XPIDed cabinet and an XPIDed add-on item with a non-XPIDed cabinet.

Attachments:

(copies of screens, reports, etc. before and after proposed change – only identify if the customer requires the screen or something on the screen to look a certain way)

1. NONE

Signatures of Agreement:

(add additional rows if necessary)

BAE:

Lead Analyst:

BAE Functional Requirement Document

Table # 6372

| | | | |
|---|---|---|---|
| **BAE Start Date:** | 06/18/1997 | **BAE Name:** | Gail Deaton |
| **BAE Comp. Date:** | 06/24/1997 | **BAE Tele. No.:** | 977-3615 |
| **BAE Hours:** | 6 | **LA Assigned:** | |

CMVC Component Name: Job Entry – EWO

Associated Defect/Feature No.: 6372

Target Release:
(give target release this needs to be in) 2.1

Target Release Date:
(give target release date for this enhancement) 9/97

Priority:
(provide priority from 'feature priority' list – production_hi through deferred_low production_hi

Revision No.:

Reason for Revision:

Subject:
(brief description of change)

1. Add code behind the CST/MPT number currently entered on the Job Information screen to route the work the proper resource.

Introduction:

(description of what system currently does, what needs to be changed, and why)

1. Currently the CST/MPT number is a required field on the Job Information screen, but this information is not used by the system. Code needs to be built to use the CST/MPT number in configuration to determine which team to assign work to. This is required because currently there are instances of a MPT and a CST team being assigned to the same wire center. The system will assign the work to the resource that it finds first The user needs the ability to choose.

Solution:

(describe what the system will or should do and any general constraints or conditions that limit the solution)

1. The configuration editor should look for a CST/MPT number in resource assignment when configuring the job. If a match is found, then assign the work to the resource associated with the CST/MPT # entered.

Change(s):

(detailed description of change) – [add additional rows if multiple changes]

1. EMPLOYEE EDITOR - add a field on the resource line to assign a CST/MPT# This field should be optional. This field should be 2 characters. This field should be effective on the day it is input No effective date is required!
2. JOB INFORMATION SCREEN - Change the CST/MPT# field to optional.
3. CONFIGURATION - On a substep save, the existing configuration code assigns a resource by selecting the first resource it comes to that can perform the substep work type in the wire center
   - If a CST/MPT# is populated. Change the configuration process to read if a CST/MPT# is populated, if this field is populated, find a match with the resource that can perform the substep work type. Assign the work to this resource. This must be done for every substep.

- If the CST/MPT# is blank. Assign a resource to the substep as in the existing code.
- If the CST/MPT# is populated but no matches are found in the resources that can perform the work. Assign a resource to the substep as in the existing code.

4. If a CST/MPT# is changed or deleted after configuration. The entire job must be reconfigured. Enter a message on the save, when this field is changed after a initial configuration. EMU should read. You are possibly changing the assignment of resources for this job. Do you want to continue and reconfigure the job. YES or NO

Performance Requirements:
(list any performance requirements associated with this change)

1 Performance should not be affected by this feature.

Dependencies:
(list any defects or features that this enhancement is dependent on)

1.

Benefits:
(Provide benefits in dollars, reduced headcount, time saving, etc, for doing this work)

1. The current code does not allow the assignment of a CST or MPT team. Changes to direct the work to the correct resource are currently being performed after configuration in the scheduling module. This function will eliminate the manual effort associated with moving this work to the proper resource.

| Affected Components: | (Check) Yes | (Check) No |
|---|---|---|
| RTOC Instructions | | |
| HELP | | |
| User Guides | | |
| Testing | x | |
| Infra-structure | | |
| Management Reports | x | |
| Database | | |

Interfaces:
(list any legacy or new interface systems impacted by this change) 1.

| Work-around: | (Check) Yes | (Check) No |
|---|---|---|
| (is there a temporary work around?) | X | |

(describe work around in detail) 1. The work is moved to the proper resource in the scheduling module manually.

Risks:
(list factors that impact, positive/negative, not doing this change) 1. Confusion of the users by thinking that the input of the CST/MPT # will drive the work to the proper resource. The confusion of the work being assigned to the wrong resource and the manual effort to correct the problem.

Business Rules:
(list any business rules that should apply) 1.

Documentation Changes:
(list affected documents requiring change)

1.

Acceptance Criteria/Test Scenario:

(list test scenarios required to test change prior to user acceptance) REQUIRED

1. Assign CST/MPT # "1" to a existing resource in test. Assign CST/MPT # "51" to a different resource.
   - Verify that the field is optional.
   - Verify that the changes in this field are effective immediately.
2. In configuration tables - assign the same work to each of the two resources for a wire center.
3. In Job Entry EWO enter a new job (in the wire center that was changed in configuration) and specify CST/MPT # "1" on the job information screen.
   - Enter substeps on the job and save.
   - Configure the job.
   - Print the 206 Report out of Workstation Presurvey to verify the assignment of the correct resource.
4. In Job Entry EWO enter a new job and specify CST/MPT # "51" on the job information screen.
   - Enter substeps on the job and save.
   - Configure the job.
   - Print the 206 Report out of Workstation Presurvey to verify the assignment of the correct resource.
5. In Job Entry EWO enter a new job in a and specify CST/MPT # "blank" on the job information screen.
   - Enter substeps on the job and save.
   - Configure the job.
   - Print the 206 Report out of Workstation Presurvey to verify the assignment of one of the resources. (System should have selected the first it came to.)

6. In Job Entry EWO enter a new job in a and specify CST/MPT # "99" on the job information screen.
   - Enter substeps on the job and save. « Configure the job.
   - Print the 206 Report out of Workstation Presurvey to verify the assignment of one of the resources. (System should have selected the first it came to.)
7. In Job Entry EWO enter a new job in a and specify CST/MPT # "1" on the job information screen.
   - Enter substeps on the job and save.
   - Configure the job.
   - Print the 206 Report out of Workstation Presurvey to verify the assignment of the resource associated with CST/MPT # 1.
   - Access the Job Information screen again. Change the CST/MPT# to "51 "and save.
   - You should get EMU "You are possibly changing the assignment of resources for this job. Do you want to continue and reconfigure the job? YES or NO
   - Select YES
   - Print the 206 Report out of Workstation Presurvey to verify the assignment of the resource associated with CST/MPT # 51.
8. In Job Entry EWO enter a new job in a and specify CST/MPT # "1" on the job information screen.
   - Enter substeps on the job and save.
   - Configure the job.
   - Print the 206 Report out of Workstation Presurvey to verify the assignment of the resource associated with CST/MPT # 1.
   - Access the Job Information screen again. Change the CST/MPT # to "51 "and save.

- You should get EMU "You are possibly changing the assignment of resources for this job. Do you want to continue and reconfigure the job? YES or NO
- Select NO
- Print the 206 Report out of Workstation Presurvey to verify the assignment of the resource associated with CST/MPT # 1.

Attachments:

(copies of screens, reports, etc. before and after proposed change) 1.

Signatures of Agreement:

(add additional rows if necessary)

BAE:

Lead Analyst:

BAE Functional Requirement Document

Table # 6403

| | | | |
|---|---|---|---|
| **BAE Start Date:** | 05/15/1997 | **BAE Name:** | Gail Deaton |
| **BAE Comp. Date:** | 05/15/1997 | **BAE Tele. No.:** | 977-3615 |
| **BAE Hours:** | 2 | **LA Assigned:** | |

CMVC Component Name: CS – Job Entry Editor

Associated Defect/Feature No.:

| | | | |
|---|---|---|---|
| **Target Release:** (give target release this needs to be in) | phase_3.0 | **Target Release Date:** (give target release date for this enhancement) | 09/01/1997 |

Priority:
(provide priority from 'feature priority' list – production_hi through deferred_low    med

Revision No.:
Reason for Revision:

Subject:
(brief description of change)    1.    Develop a presentation for the CI and the CWI tables

| | |
|---|---|
| **Introduction:**<br>(description of what system currently does, what needs to be changed, and why) | 1. OSPCM currently does not have a presentation for the CI and the CWI table. Core Staff must access ISQL forms to enter updates to these tables. Adding these forms (with edits) to OSPCM will reduce the difficulty of these table updates. In addition, the user currently does not have access to view these tables. By having this forms in CS -Job Entry Editor, the user can view these tables. |
| **Solution:**<br>(describe what the system will or should do and any general constraints or conditions that limit the solution) | 1. Develop a presentation for the CI and the CWI tables. The fields that are available on the current ISQL forms should be used.<br>2. Search will be focused on the individual CI code or the CWI code. |
| **Change(s):**<br>(detailed description of change) – [add additional rows if multiple changes] | 1. Add the CI and the CWI table forms to CS – Job Entry Editor. |
| **Performance Requirements:**<br>(list any performance requirements associated with this change) | 1. Performance should not be affected. |
| **Dependencies:**<br>(list any defects or features that this enhancement is dependent on) | 1. |
| **Benefits:**<br>(Provide benefits in dollars, reduced headcount, time saving, etc, for doing this work) | 1. Benefit from this feature is ease in table updates and the accuracy of data. |

| **Affected Components:** | **(Check) Yes** | **(Check) No** |
|---|---|---|
| RTOC Instructions | | |
| HELP | x | |
| User Guides | x | |
| Testing | x | |
| Infra-structure | | |
| Management Reports | | |
| Database | | |

Interfaces:
(list any legacy or new interface systems impacted by this change) 1.

| **Work-around:** | **(Check) Yes** | **(Check) No** |
|---|---|---|
| (is there a temporary work around?) | X | |

(describe work around in detail) 1. Leave form access in ISQL.

Risks:
(list factors that impact, positive/negative, not doing this change) 1. Accuracy of data and access for the user will be impacted, if this feature is not done.

Business Rules:
(list any business rules that should apply) 1.

| | | |
|---|---|---|
| **Documentation Changes:** | | |
| (list affected documents requiring change) | 1. | |
| **Acceptance Criteria/Test Scenario:** | | |
| (list test scenarios required to test change prior to user acceptance) **REQUIRED** | 1. | Compare the OSPCM CI and CWI presentation to the ISQL presentation and verify that all fields are captured. |
| | 2. | Make changes in the fields for a CI and save. Make sure the changes are saved and applied to configuration |
| | 3. | Make changes in the fields for a CWI and save. Make sure the changes are saved and applied to configuration. |
| | 4. | Log on as a read-only user type. Make sure this user type does not have update capability. |
| **Attachments:** | | |
| (copies of screens, reports, etc. before and after proposed change) | 1. | |
| **Signatures of Agreement:** | | |
| (add additional rows if necessary) | | |
| **BAE:** | | |
| **Lead Analyst:** | | |

EXHIBIT 3

OSPCM MATERIALS MANAGEMENT – BS III

INTRODUCTION

The MATERIALS MANAGEMENT Business Solution Area III deals with the management of inventory. This Business Solution area is broken down into 19 sections: view a job's material requirements, issue material needed on a job, view an inventory item, view assignments, junk an inventory item, split a reel of cable, adjust an inventory balance, change the status of an inventory item, exempt an inventory item, return an inventory item, transfer an inventory item, relocate an inventory item, add an inventory item, view issues, view material inventory transactions, run an inventory scan, process material usage, report material inventory transactions to asset management, report reconciliation file to asset management.

Each section is briefly described and then broken down into the actual navigational flow through the presentation. The purpose of this document is to gain consensus as to the deliverable for MATERIALS MANAGEMENT Business Solution Area III.

The first section deals with viewing a job's material requirements. This allows you to monitor the status of the material needed to work an approved job. You can view each requirement within the job, showing how much material is required, how much has been procured, how much has been assigned, how much still needs to be procured, and how much has been issued. You can also view any orders, shipments, transfer requests, or transfers made to satisfy the requirements that have not yet been delivered.

The second section deals with issuing the material needed on a job. Issuing material allows you to keep track of inventory that has been taken off the inventory yard to be used on a job. The issued inventory item is now considered "at site". The issue indicates to whom the material was issued, when the material was issued, and for which job the material was issued. Issues may be closed when the material is brought back to the inventory yard or when the substep is completed and its material disbursed.

The third section deals with viewing inventory items for which you have responsibility. These inventory items may be located at your inventory site, at an alternate storage location, or at a job site. You can view information about a specific inventory item including its inventory status and associated balances. You can also use several functions to manage your inventory such as junking and adjusting an inventory balance. Each function is described in a different section of the document.

The fourth section describes the function of viewing assignments. You can view the requirements to which an inventory item is assigned and unassign the inventory item from selected requirements. Unassigning an inventory item indicates that the inventory item is no longer reserved for use on a specific job. This makes it available to be assigned to any other job within the Construction Management Center (CMC) that needs this type of material. If a job is cancelled or a requirement is deleted, the system automatically unassigns the associated inventory item. You might want to unassign an inventory item yourself because the material is damaged and cannot be used.

The fifth section describes the function of junking an inventory item. Junking an inventory item deletes the inventory item from the system and is usually done to clear a reel of cable. When cable is reported used (disbursed), the system automatically junks the remaining cable on the reel if the CMC responsible for the inventory item is using the auto-junk feature and the remaining quantity is unassigned and less than or equal to the auto-junk quantity set by the CMC. You might want to junk an inventory item yourself because you are working in a CMC that is not using the auto-junk feature or you are junking a non-cable inventory item.

The sixth section describes the function of splitting a reel of cable. Splitting a reel of cable creates a new inventory item. It involves moving some or all of the cable from a reel to a new reel or to a hand-coil. You might want to split a reel of cable because you physically need to have the cable in two different places at the same time.

The seventh section describes the function of adjusting an inventory item's balance. You can increase or decrease both the unassigned and surplus inventory balances following a physical inventory.

The eighth section describes the function of changing the status of an inventory item. You can move some or all of an inventory balance among the unassigned, surplus, and awaiting return statuses. You might want to move a spare unassigned balance to surplus to make it available to anyone in the BellSouth region or instead of returning undamaged material you might want to move it to the unassigned status so that it may be used to satisfy a requirement on a rush job.

The ninth section describes the function of exempting an inventory item. You can reclassify a surplus or unassigned inventory item as exempt material so that it no longer remains a part of your inventory records. This is usually done to make material available for use on maintenance type work.

The tenth section describes the function of returning an inventory item. You can return damaged or unwanted material to either a BellSouth Telecommunications (BST) warehouse or to an outside vendor, like Lucent.

The eleventh section describes the function of transferring an inventory item. You can transfer an inventory item from your inventory site to another inventory site when you do not have a formal transfer request to approve. The use of this function should be limited to times of natural disaster when you may need to move a lot of inventory to handle emergency jobs.

The twelfth section describes the function of relocating an inventory item. You can change the bin location of an inventory item in your inventory yard or, since you can only transfer inventory items between inventory sites, move an inventory item located at an alternate address back to your inventory site or vice versa.

The thirteenth section deals with adding an inventory item. You can add an inventory item by recovering the material from junk, by reclassifying the material from exempt, by identifying the material as being needed on a Turn-Key job, by identifying the material as inventory converted from the Major Apparatus and Cable System (MACS), or by specifying the source of the material as "other". "Other" is used when you find material on your yard during a physical inventory and do not know where it came from. This function is also used by the BST emergency warehouses to replenish their emergency and consignment stock.

The fourteenth section deals with viewing issues. You can view open issues and return issued material. If all the material issued to you was not used, you may return the unused portion to the inventory site.

The fifthteenth section describes the function of viewing inventory transactions. You can specify the transactions you want to view in several ways. One way is to specify the transaction number. Another way is to specify an inventory item (e.g., serial number 456789). A third way is to specify the type of transactions (e.g., junk transactions). Depending on the method chosen, you may be shown either a transaction scan results window or a transaction details dialog. The transaction scan results window displays a list of transactions starting with the most recent transaction. From here you may choose a transaction to view in greater detail. The transaction detail dialog displays additional information about the transaction such as who created the transaction and what job was affected by the transaction. This dialog allows you to "walk" the transaction chain backwards to the point the inventory item first became your responsibility (e.g., an order receipt) or forwards to the point the inventory item was no longer your responsibility (e.g., a disbursement).

The sixteenth section deals with scanning inventory. You can specify several options for creating an inventory scan report. The report is designed to aid in a physical inventory and may be viewed on your screen or may be printed.

The seventeenth section deals with processing material usage. Once material is placed in service, it is reported "used" by either a Telephone Company (TELCO) employee or by a contractor hired to do the work. Sometimes material is taken out of service and is put back into inventory. In both cases, if the material reported is tracked in inventory, the system must respond by either decreasing or increasing the appropriate inventory balance. This section describes how MATERIALS MANAGEMENT reacts when material usage is reported. Since this is an automatic process initiated by the system whenever material usage is reported, there is no user interface.

The eighteenth section deals with reporting material inventory transactions to the Asset Management system. Certain types of inventory transactions, those that affect the dollars in the non-exempt holding account (12201100), must be reported to accounting. This section describes MATERIALS MANAGEMENT'S daily interface to report such inventory transactions to Asset Management which maintains the 12201100 account. Since this is an automatic process initiated by the system on a daily basis, there is no user interface.

The nineteenth section deals with reporting current inventory units to Asset Management in the form of a reconciliation file so that any discrepancies in the accounting records may be corrected. Asset Management can make a request for the file at any time by providing the information necessary to create the report. Since this is an automatic process initiated by the system upon receival of the necessary information from Asset Management, there is no user interface.

REPORT TRANSACTIONS TO ASSET MANAGEMENT

This section defines the material inventory transaction interface between OSPCM and Asset Management, the accounting system that tracks inventory dollars in the 12201100 account. This account is maintained in Asset Management by geographic location code (GLC) and material item code (MIC). Material inventory transactions created in OSPCM that involve inventory movement to and from this account must be reported to Asset Management. Since OSPCM inventories both non-exempt material ordered to the 12201100 account (e.g., cable) and non-exempt material ordered directly to the in-service account (e.g., central office equipment, conduit, manholes), those transactions affecting inventory items ordered directly to the in-service account must be excluded from the interface. There a few exceptions to this rule which can found at the end of this document.

The chosen interface is a daily file transmission using BUFIT and is automatically initiated daily by the system 7 days a week. The interface will run after midnight and will contain transactions that have not been posted to Asset Management and have a transaction date less than 1 month of the current date. Under normal circumstances, this file would contain transaction data for the previous day (e.g., a file created on Saturday morning contains transaction data from Friday's business). There may be special circumstances in which transactions were missed and the file could contain transactions for multiple days. One file is transmitted from OSPCM containing the transaction data from all of the OSPCM servers (currently 4). The Asset Management system resides on a UNIX box in the Jackson, MS data center.

The following material inventory transactions are sent to Asset Management as addition (ADD) transactions.

Order Receipt - These transactions are created when material ordered from a BST warehouse or an outside vendor is receipted into inventory and the material was not ordered direct to code (neither to a maintenance account nor to an in-service account).

Transfer Receipt (warehouse to Inventory site) - These transactions are created when material transferred from a warehouse site to an inventory site or from an RCOE site to an inventory site is receipted into inventory. Transfers between a warehouse site and an inventory site occur when requesting a transfer for emergency material from one of 13 warehouse sites or an RCOE site.

Disbursement Reversal - These transactions are created when a Disbursement transaction is reversed.

The following material inventory transactions are sent to Asset Management as remove (REM) transactions.

Order Receipt Reversal - These transactions are created when an Order Receipt transaction is reversed and the material was not ordered direct to code (neither to a maintenance account nor to an in-service account).

Transfer Receipt Reversal (inventory site to warehouse) - These transactions are created when a Transfer Receipt transaction is reversed and the inventory item is being sent from an inventory site back to a warehouse site or back to an RCOE site.

Disbursement - These transactions are created when an inventory item is reported used.

Junk - These transactions are created when an inventory item is manually junked as opposed to auto-junked . Auto-Junk transactions are transactions created by the system to clear a reel of remaining cable following a disbursement. The major differences between an auto-junk and a manual-junk are that an auto-junk transaction records "AUTOJNK" as the common userid (CUED) and junks the material to the field reporting code (FRC) of the last assignment on the reel; whereas a manual-junk records either the CUID of the person performing the junk or "SYSTEM" as the CUID, if a recover from junk reversal occurs, and junks the material to expense.

Return - These transactions are created when an inventory item is returned to either a BST warehouse or to an outside vendor.

Inventory Deletion - These transactions are created when an inventory balance is decreased in an inventory site. Inventory Deletions made from a warehouse site or from an RCOE site are not sent to Asset Management.

Remove to Good Reversal - These transactions are create when a Remove to Good transaction is reversed.

The following material inventory transaction is sent to Asset Management as a placement (PLC) transaction.

Junk - These transactions are created when an inventory item is auto-junked as opposed to manually junked.

Unassignment (Reclassify from Maintenance) - These transactions are created when an inventory item is unassigned from the job for which it was ordered (e.g., job is cancelled) and the inventory item was ordered to a maintenance account.

Order Receipt (Reclassify from Maintenance) - These transactions are created when material ordered from a BST warehouse or an outside vendor is receipted into inventory but not assigned to the maintenance account for which it was ordered. Ordered material will not be assigned as direct to code inventory if the job or substep for which the material was ordered was cancelled, if the substep's direct to code indicator was changed to "N" after the material was already ordered, or if the material was received as "damaged or unwanted". Since accounting has this inventory booked to the maintenance account, a salvage transaction is created to move the inventory back to the 12201100 account.

Order Receipt Reversal (Reverse Reclassify From Maintenance) - These transactions are created when an Order Receipt transaction is reversed and the inventory item was not assigned to the maintenance account to which it was ordered.

The following material inventory transactions are sent to Asset Management as transfer (TRF) transactions.

Transfer Receipt (inventory site to inventory site) - These transactions are created when material transferred from one inventory site to another inventory site is receipted into inventory.

Transfer Receipt Reversal (inventory site to inventory site) - These transactions are created when a Transfer Receipt transaction is reversed and the inventory item is being sent from an inventory site back to another inventory site.

The following material inventory transactions are sent to Asset Management as adjustment (ADJ) transactions.

Recover from Junk - These transactions are created when material is recovered from junk and put back into inventory.

Inventory Addition - The transactions are created when an inventory balance is increased in an inventory site. Inventory Additions made to a warehouse site or to a RCOE site are not sent to Asset Management.

Remove to Good - These transactions are created when inventory items previously placed in service are taken out of service and put back into inventory .

Reclassify to Exempt - These transactions are created when a non-exempt inventory item is reclassified as exempt material.

Reclassify from Exempt - These transactions are created when exempt material is reclassified as a non-exempt inventory item.

The following material inventory transactions are sent to Asset Management as salvage (SAL) transactions.

Unassignment (Reclaim) -These transactions are created when an inventory item is unassigned from the job for which it was ordered (e.g., job is cancelled) and the inventory item was ordered to an in-service account and the job to which it was assigned is an estimate. Since accounting has this inventory booked to the in-service account, a salvage transaction is created to move the inventory back to the 12201100 account.

Order Receipt (Reclaim) - These transactions are created when material ordered from a BST warehouse or an outside vendor is receipted into inventory but not assigned to the in-service account for which it was ordered and the job for which it was ordered is an estimate. Since accounting has this inventory booked to the in-service account, a salvage transaction is created to move the inventory back to the 12201100 account.

Order Receipt Reversal (Reverse Reclaim) - These transactions are created when an Order Receipt transaction is reversed and the inventory item was not assigned to the in-service account to which it was ordered and the job for which it was ordered is an estimate.

The following material inventory transactions are sent to Asset Management as remove (REM) and salvage (SAL) transactions.

Unassignment (Reclassify from In Service) - These transactions are created when an inventory item is unassigned from the job for which it was ordered (e.g.,. job is cancelled) and the inventory item was ordered to an in-service account and the job to which it was assigned is a routine job. Since material has already started depreciating, it cannot be transferred directly from the in-service account back to the 12201100 account with just a salvage transaction. Material purchased to a routine job directly to the in-service account, is considered in-service as soon as the bill is paid and starts depreciating at that time.

Order Receipt (Reclassify from In Service) - These transactions are created when material ordered from a BST warehouse or an outside vendor is receipted into inventory but not assigned to the in-service account for which it was ordered and the job for which it was ordered is a routine job. Since accounting has this inventory booked to the in-service account and the material has already started depreciating, a remove and a salvage transaction is created to move the inventory back to the 12201100 account.

The following material inventory transactions are sent to Asset Management as recover (REC) and salvage (SAL) transactions.

Order Receipt Reversal (Reverse Reclassify from In Service) - These transactions are created when an Order Receipt transaction is reversed and the inventory item was not assigned to the in-service account to which it was ordered and the job to which it was ordered is a routine job.

A header record containing the following information is written as the first record in the file. All fields are left-justified unless otherwise noted.

Record Type - Indicates whether the current record is a "header", "data", or "trailer", record. For a header record this field is set equal to '0'. (Length: 1).

Source System Code - Identifies the source system. This field is set equal to "OSPCM". (Length: 10).

Company Code - Identifies the source company. This field is set equal to "BST". (Length: 3).

Interface Location Code - Uniquely differentiates between files created with the same file name but different location. This field is set equal to the host name of the server where the file is created. Currently, this interface is scheduled to run on the Alabama server (Length; 15).

File Name - Uniquely identifies the file name in the event that a source system is sending more than one file. This field is set equal to "AMFII950". (Length: 8)

Sequence Number - A sequential number to uniquely identify the transaction file. This number is increased each time a file is sent to Asset Management. (Length: 9; Justification: right; Example: 000000001 represents the 1st file sent to Asset Management).

Creation Date Time - The date and time that the transaction file is created. Defaults to the current date and time. (Length: 14; Format: yyyymmddhhmmss).

Accounting Period - The month and year that the file was run for. For example, a file is created on 8/1/1996, but contains transaction data for July. The Creation Date Time would be 19960801, but the Accounting Period would be 199607. (Length: 8; Format yyyymmbb; where bb equals spaces).

Final Flag Indicator - A yes/no indicator to identify whether or not the file is the last file of the month. The flag is set to "Y", if it is the last file of the month; otherwise it is set to "N". Since the file contains transaction data from the previous day's business, the file created on the first day of the month contains a "Y" in this field. (Length: 1).

Filler - Reserved for future use. This field contains spaces. (Length: 381).

The following information is written to the file for each transaction. All fields are left-justified unless otherwise noted.

Record Type - Indicates whether the current record is a "header", "data", or "trailer", record. For a data record this field is set equal to '5'. (Length: 1).

Trans Type - Each OSPCM material inventory transaction reported is translated into Asset Management's transaction type as described above. (Length: 3).

Business Unit - The default for this field is "BST". (Length: 5).

Asset Id - This field defaults to spaces. (Length: 8).

FRC - This field defaults to "12201100", except in the following cases (Length: 10):

Unassignment (Reclassify from In Service - REM transaction) - The field reporting code (c-code) from which the inventory item was unassigned.

Order Receipt (Reclassify from In Service - REM transaction) - The field reporting code (c-code) to which the inventory item was ordered.

Order Receipt Reversal (Reverse Reclassify from In Service - REC transaction) - The field reporting code (c-code) to which the inventory item was ordered.

GLC - This field defaults to the geographic location code of the inventory site responsible for the inventory item, except in the following cases (Length: 6):

Transfer Receipt (inventory site to inventory site) - The glc of the inventory site from which the inventory item was transferred.

Transfer Receipt Reversal (inventory site to inventory site) - The glc of the inventory site from which the inventory item was transferred.

Unassignment (Reclassify from In Service - REM transaction) - The glc of the wire center area of the substep to which the inventory item was assigned.

Order Receipt (Reclassify from In Service - REM transaction) - The glc of the wire center area of the substep for which the inventory item was ordered.

Order Receipt Reversal (Reverse Reclassify from In Service - REC transaction) - The glc of the wire center area of the substep for which the inventory item was ordered.

State - This field defaults to the state of the inventory site responsible for the inventory item, except in the following cases (Length: 2):

Transfer Receipt (inventory site to inventory site) - The state of the inventory site from which the inventory item was transferred.

Transfer Receipt Reversal (inventory site to inventory site) - The state of the inventory site from which the inventory item was transferred back.

Unassignment (Reclassify from In Service - REM transaction) - The state of the wire center area of the substep to which the inventory item was assigned.

Order Receipt (Reclassify from In Service - REM transaction) - The state of the wire center area of the substep for which the inventory item was ordered.

Order Receipt Reversal (Reverse Reclassify from In Service – REC transaction) - The state of the wire center area of the substep for which the inventory item was ordered.

Account Type - This field defaults to spaces, except in the following cases (Length:1):

Unassignment (Reclassify from In Service - REM transaction) - Defaults to "6".

Order Receipt (Reclassify from In Service - REM transaction) - Defaults to "1".

Order Receipt Reversal (Reverse Reclassify from In Service - REM transaction) - Defaults to "1".

Unassignment (Reclaim) - Defaults to "6".

Order Receipt Reversal (Reverse Reclaim) - Defaults to "6".

BST ID - The MIC of the material description of the inventory item. (Length: 12).

BST Sub ID - This field defaults to spaces. (Length: 2).

Trans Code - This field defaults to spaces, except in the following cases (Length: 5):

Order Receipt Reversal - Defaults to "R" (remove).

Transfer Receipt Reversal (inventory site to warehouse) - Defaults to "R".

Disbursement - Defaults to "R".

Reclassify to Exempt - Defaults to "F".

Reclassify from Exempt -Defaults to "F".

Junk (manual) - Defaults to "R".

Return - Defaults to "R".

Unassignment (Reclassify from In Service - REM transaction) - Defaults to "R".

Order Receipt (Reclassify from In Service - REM transaction) - Defaults to "R.

Order Receipt Reversal (Reclassify from In Service - REC transaction) - Defaults to "R".

Recover from Junk - Defaults to "O" (write-on).

Inventory Addition - Defaults to "O".

Remove to Good - Defaults to "O",

Inventory Deletion - Defaults to "W" (write-off).

Remove to Good Reversal - Defaults to "W".

Trans Amount - This field defaults to zeros. (Length: 16; Format: S9(13)V99; Example: +000000000000000).

Salvage Amount - This field defaults to zeros. (Length: 16; Format: S9(13)V99; Example: +000000000000000).

Cost Of Removal Amount - This field defaults to zeros. (Length: 16; Format: S9(13)V99; Example: +000000000000000).

Depreciation Amount - This field defaults to zeros. (Length: 16; Format: S9(13)V99; Example: +000000000000000).

Effective Date - The date the material inventory transaction occurred. (Length: 8; Format: yyyymmdd).

Accounting Date - The date the material inventory transaction is reported to Asset Management. (Length: 8; Format: yyyymmdd).

Quantity - The quantity of the inventory item affected. All quantities are positive values except for the following which should be sent as a negative quantity (Length: 11; Justification: right; Format: S9(8)V99; Example: +0000030000 represents a quantity of 300):

Reclassify To Exempt.

Order Receipt Reversal (Reverse Reclassify from Maintenance).

Order Receipt Reversal (Reverse Reclassify from In Service - SAL transaction).

Order Receipt Reversal (Reverse Reclaim).

Description - The material description of the inventory item, (Length: 60).

Vintage - This field defaults to zeros. (Length: 4).

RC - The responsibility code of the inventory site responsible for the inventory item, except in the following cases (Length: 8):

Transfer Receipt (inventory site to inventory site) - The responsibility code of the inventory site from which the inventory item was transferred.

Transfer Receipt Reversal (inventory site to inventory site) - The responsibility code of the inventory site from which the inventory item was transferred.

Authorization - This field defaults to spaces, except in the following cases (Length: 10):

Junk (auto) - The job authority of the last assignment on reel before the inventory item was junked.

Unassignment (Reclaim) - The job authority from which the inventory item was unassigned.

Order Receipt (Reclaim) - The job authority for which the inventory item was ordered.

Order Receipt Reversal (Reverse Reclaim) - The job authority for which the inventory item was ordered.

Lease Term - This field defaults to spaces, (Length: 3).

To Business Unit - This field defaults to spaces, except in the following cases (Length: 5):

Transfer Receipt (inventory site to inventory site) - Defaults to "BST",

Transfer Receipt Reversal (inventory site to inventory site) - Defaults to "BST".

Reclassify to Exempt - Defaults to "BST".

Reclassify from Exempt - Defaults to "BST".

Unassignment (Reclassify from Maintenance) - Defaults to "BST".

Order Receipt (Reclassify from Maintenance) - Defaults to "BST".

Order Receipt Reversal (Reverse Reclassify from Maintenance) - Defaults to "BST".

Junk (auto) - Defaults to "BST".

Unassignment (Reclassify from In Service - SAL transaction) - Defaults to "BST".

Order Receipt (Reclassify from In Service - SAL transaction) - Defaults to "BST".

Order Receipt Reversal (Reverse Reclassify from In Service - SAL transaction) - Defaults to "BST".

Unassignment (Reclaim)- Defaults to "BST".

Order Receipt (Reclaim) - Defaults to "BST".

Order Receipt Reversal (Reverse Reclaim) - Defaults to "BST".

To Asset ID - This field defaults to spaces (Length: 8):

To GLC - This field defaults to spaces, except in the following cases (Length: 6):

Transfer Receipt (inventory site to inventory site) - The glc of the inventory site to which the inventory item was transferred.

Transfer Receipt Reversal (inventory site to inventory site) - The glc of the inventory site to which the inventory item was transferred.

Unassignment (Reclassify from Maintenance) - The glc of the wire center area of the substep to which the inventory item was assigned.

Order Receipt (Reclassify from Maintenance) - The glc of the wire center area of the substep for which the inventory item was ordered.

Order Receipt Reversal (Reverse Reclassify from Maintenance) - The glc of the wire center area of the substep for which the inventory item was ordered.

Junk (auto) - The glc of the wire center area of last assignment on the reel before the inventory item was junked.

Unassignment (Reclassify from In Service - SAL transaction) - The glc of the wire center area of the substep to which the inventory item was assigned.

Order Receipt (Reclassify from In Service - SAL transaction) - The glc of the wire center area of the substep for which the inventory item was ordered.

Order Receipt Reversal (Reverse Reclassify from In Service - SAL transaction) - The glc of the wire center area of the substep for which the inventory item was ordered.

Unassignment (Reclaim) - The glc code of the wire center area of the substep to which the inventory item was assigned.

Order Receipt (Reclaim) - The glc of the wire center area of the substep for which the inventory item was ordered.

Order Receipt Reversal (Reverse Reclaim) - The glc of the wire center area of the substep for which the inventory item was ordered.

To RC - This field defaults to spaces, except in the following cases (Length: 8):

Transfer Receipt (inventory site to inventory site) - The responsibility code of the inventory site to which the inventory item was transferred.

Transfer Receipt Reversal (inventory site to inventory site) - The responsibility code of the inventory site to which the inventory item was transferred.

Unassignment (Reclassify from Maintenance) - The responsibility code of the inventory site responsible for the inventory item.

Order Receipt (Reclassify from Maintenance) - The responsibility code of the inventory site responsible for the inventory item.

Order Receipt Reversal (Reverse Reclassify from Maintenance) - The responsibility code of the inventory site responsible for the inventory item.

Junk (auto) - The responsibility code of the inventory site responsible for the inventory item.

Unassignment (Reclassify from In Service - SAL transaction ) - The responsibility code of the inventory site responsible for the inventory item.

Order Receipt (Reclassify from In Service - SAL transaction) - The responsibility code of the inventory site responsible for the inventory item.

Order Receipt Reversal (Reverse Reclassify from In Service - SAL transaction) - The responsibility code of the inventory site responsible for the inventory item.

Unassignment (Reclaim) - The responsibility code of the inventory site responsible for the inventory item.

Order Receipt (Reclaim) - The responsibility code of the inventory site responsible for the inventory item.

Order Receipt Reversal (Reverse Reclaim) - The responsibility code of the inventory site responsible for the inventory item.

To FRC - This field defaults to spaces, except in the following cases (Length: 10):

Transfer Receipt (inventory site to inventory site) - Defaults to "12201100".

Transfer Receipt Reversal (inventory site to inventory site) - Defaults to "12201100".

Unassignment (Reclassify from Maintenance) - Defaults to the m-code from which the inventory item was unassigned.

Order Receipt (Reclassify from Maintenance) - Defaults to the m-code to which the inventory item was ordered.

Order Receipt Reversal (Reverse Reclassify from Maintenance) - Defaults to the m-code to which the inventory item was ordered.

Junk (auto) - The field reporting code of the last assignment on the reel before the inventory item was junked.

Unassignment (Reclassify from In Service - SAL transaction) - Defaults to the corresponding x-code of the c-code from which the inventory item was unassigned. For example, if the c-code is 45C, send 45X as the To FRC.

Order Receipt (Reclassify from In Service - SAL transaction) - Defaults to the corresponding x-code of the c-code to which the inventory item was ordered. For example, if the c-code is 45C, send 45X as the To FRC.

Order Receipt Reversal (Reverse Reclassify from In Service - SAL transaction) - Defaults to the corresponding x-code of the c-code to which the inventory item was ordered. For example, if the c-code is 45C, send 45X as the To FRC.

Unassignment (Reclaim) - The field reporting code (c-code) from which the inventory item was unassigned.

Order Receipt (Reclaim) - The field reporting code (c-code) to which the inventory item was ordered.

Order Receipt Reversal (Reverse Reclaim) - The field reporting code (c~ code) to which the inventory item was ordered.

To State - This field defaults to spaces, except in the following cases (Length: 2):

Transfer Receipt (inventory site to inventory site) - The state of the inventory site to which the inventory item was transferred.

Transfer Receipt Reversal (inventory site to inventory site) - The state of the inventory site to which the inventory item was transferred.

Unassignment (Reclassify from Maintenance) - The state of the wire center area of the substep to which the inventory item was assigned.

Order Receipt (Reclassify from Maintenance) - The state of the wire center area of the substep for which the inventory item was ordered.

Order Receipt Reversal (Reverse Reclassify from Maintenance) - The state of the wire center area of the substep for which the inventory item was ordered.

Junk (auto) - The state of the wire center area of the last assignment on the reel before the inventory item was junked.

Unassignment (Reclassify from In Service - SAL transaction) - The state of the wire center area of the substep to which the inventory item was assigned.

Order Receipt (Reclassify from In Service - SAL transaction) - The state of wire center area of the substep for which the inventory item was ordered.

Order Receipt Reversal (Reverse Reclassify from In Service - SAL transaction) - The state of the wire center area of the substep for which the inventory item was ordered.

Unassignment (Reclaim) - The state of the wire center area of the substep to which the inventory item was assigned.

Order Receipt (Reclaim) - The state of the wire center area of the substep for which the inventory item was ordered.

Order Receipt Reversal (Reverse Reclaim) - The state of the wire center area of the substep for which the inventory item was ordered.

To Account Type - This field defaults to spaces, except in the following case (Length: 1):

Junk (auto) - If the job authority from which the inventory item was junked is an estimate, this field defaults to "2". If the job authority from which the inventory item was junked is a routine job, plant work order, or a project, this field defaults to "1". If the job authority from which the inventory item was junked is a maintenance job (FRC ends in an "M"), this field defaults to spaces.

To BST ID - This field defaults to spaces, except in the following cases (Length: 12):

Transfer Receipt (inventory site to inventory site) - The MIC of the material description of the inventory item.

Transfer Receipt Reversal (inventory site to inventory site) - The MIC of the material description of the inventory item.

Reclassify to Exempt - The MIC of the material description of the inventory item.

Reclassify from Exempt - The MIC of the material description of the inventory item.

Junk (auto) - The field reporting code (c-code) of the last assignment on the reel before the inventory item was junked.

To BST SUB ID - This field defaults to spaces (Length: 2).

To Vintage - This field defaults to zeroes, (Length: 4).

Entry Origin - The field defaults to "OSPCM" (Length: 10).

Voucher Number - This field defaults to spaces. (Length: 7).

Source Code - This field defaults to spaces. (Length: 5).

Transaction ID - This field defaults to spaces, (Length: 3).

Asset Group - This field defaults to spaces. (Length: 5).

Use Tax - This field defaults to CCN", except for the following cases (Length: 1):

Transfer Receipt (inventory site to inventory site) - Defaults to "Y".

Transfer Receipt Reversal (inventory site to inventory site) - Defaults to "Y".

Post Account - A "1" here indicates that the transaction should not be posted to PP. This field defaults to "0", except for the following cases (Length: 1):

Order Receipt - Defaults to "1".

Transfer Receipt (warehouse to inventory site) - Defaults to "1".

Transfer Receipt Reversal (inventory site to warehouse) - Defaults to "1".

Order Receipt Reversal - Defaults to "1".

Disbursement - Defaults to "1".

Disbursement Reversal - Defaults to "1".

Return-Defaults to "1".

Unassignment (Reclaim) - Defaults to "1".

Order Receipt (Reclaim) - Defaults to "1".

Order Receipt Reversal (Reverse Reclaim) - Defaults to "1".

Ad Valorem Tax Switch - This field defaults to "N". (Length: 1).

Serial Number - The serial number of the inventory item (if serialized). (Length: 15).

Previously Used - This field defaults to "N". (Length: 1).

Record ID - This field defaults to spaces. (Length: 8).

EXTC - Expenditure type code. This field defaults to spaces. (Length: 4).

PO Number - This field defaults to spaces, except in the following cases (Length: 10):

Order Receipt - The purchase order number or select ticket number on which the inventory item was ordered.

Order Receipt Reversal - The purchase order number or select ticket number on which the inventory item was ordered.

Serial Code - The transaction number of the material inventory transaction reported. (Length: 11).

Source Transaction Key - This field defaults to spaces. (Length: 30).

Filler - Reserved for future use. This field contains spaces. (Length: 49).

A trailer record containing the following information is written as the last record in the file. All fields are left-justified unless otherwise noted.

Record Type - Indicates whether the current record is a "header", "data", or "trailer", record. For a trailer record this field is set equal to '9'. (Length: 1).

Record Count - The total number of records written to the file, including the header and trailer records. (Length: 6; Justification: right; Example: 000001000 represents a total of 1000 records were written to the file).

Total Amount - The sum of the transaction records' transaction amount, salvage amount, cost of removal amount, and depreciation amount. Since OSPCM does not sent dollars to Asset Management, this field is always zero. (Length: 16; Format: S9(13)V99; Example: +000000000000000).

Total Quantity - The sum of the transaction records' transaction quantity. Note: A negative quantity should be added as negative value in this sum. (Length: 11; Justification: right; Format: S9(8)V99; Example: +0000300000 represents a total transaction quantity of 3000).

Filler - Reserved for future use. This field contains spaces. (Length: 416).

The following business rules are applied when material inventory transactions are reported to Asset Management.

Material inventory transactions that involve inventory items ordered direct to code are not reported to Asset Management (this includes Central Office equipment and other types of material explicitly ordered direct to code either to a c-code or to an m-code).

The exceptions to this rule are as follows:

Reclassify from in Service (i.e., when direct to code inventory is unassigned from a routine job or when material is ordered direct to a c-code but not assigned as direct to code inventory),

Reclaim (i.e., when direct to code inventory is unassigned from an estimate or when material ordered direct to a c-code but not assigned as direct to code inventory), and

Reclassify from Maintenance (i.e., when material ordered to a maintenance account is unassigned or when material is ordered direct to a m-code but not assigned as direct to code inventory).

These exceptions must be reported to Asset Management so that the inventory item gets moved from the c-code or m-code back to the 12201100 account.

Only transactions that have been marked as needing to be sent to Asset Management should be added to the file.

After a transaction has been added to the file, the material inventory transaction record should be updated to reflect that the transaction has been posted to Asset Management.

If a transaction cannot be added to the file for some reason (e.g., an error occurred while obtaining the data), the error should be written to a log file and the process should continue as normal.

ISSUE MATERIAL NEEDED ON A JOB

Issuing material allows you to keep track of inventory that has been taken from an inventory site to be used on a job. Once issued, the inventory item is considered "at site" until that issue is closed.

Figure 36:
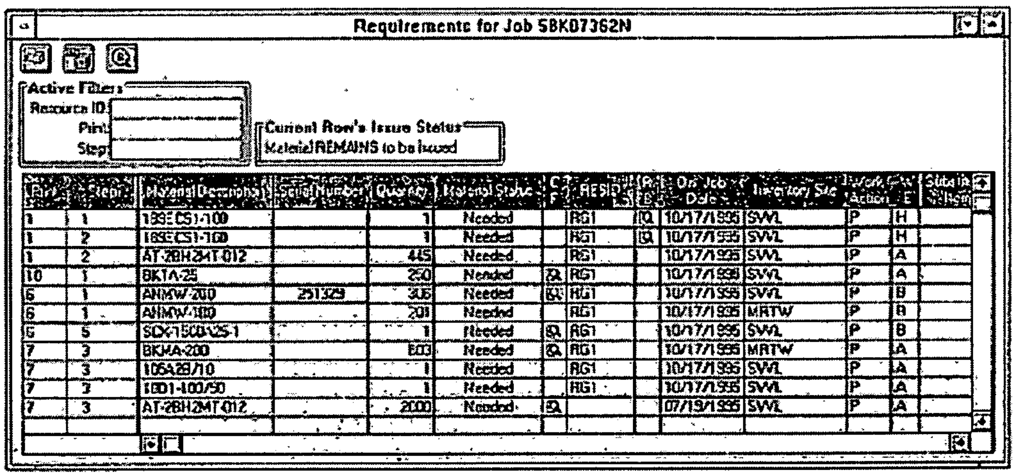
FIG. 36 is an exemplary screen print for Requirements for Job.

First, display the REQUIREMENTS FOR JOB xxxx window, where xxxx is the selected job number as previously discussed in the first section of this document. (See Fig. 36).

To issue the material assigned to a requirement, select a requirement in the grid and press the Issue Material toolbar button located on the REQUIREMENTS window or select "Issue..." from the Actions menu. The system displays an error message if the serial number assigned to the selected requirement has already been issue. This can occur if a reel of cable has been assigned to multiple substeps. Respond to the message by pressing OK. If no errors are found, the ISSUE MATERIAL dialog shown on the following page is displayed. This function is available if the following conditions are met:

You have security access to update inventory in the inventory site responsible for the inventory item(s) assigned to the selected requirement.

You are a Materials Management Manager or a Materials Management Clerical user.

Material has been assigned to the selected requirement.

All of the material has not yet been issued.

This dialog allows you to issue the material assigned to the selected requirement to the person who will be responsible for the material until it is returned to the inventory site or is reported used. The grid contains a list of all inventory items assigned to the requirement that have not yet been issued and the first inventory item is pre-selected.

The following information is displayed about each assigned inventory item:

Material Description - The material description of the inventory item.

Serial Number - The serial number of the inventory item (if serialized). If the requirement is for non-serialized material, the serial column is not displayed in the grid.

Quantity - The portion of the inventory balance that is assigned to this requirement.

Physical Location - A glyph here indicates that the inventory item assigned to the substep is physically located at a site (alternate address or inventory site) different from the inventory site responsible for procuring the material. No glyph here indicates that the inventory item is located at the inventory site responsible for procuring the material.

Multiple inventory items may be displayed if the requirement is for a quantity greater than one and one or more of the following apply:

If the inventory items assigned to the requirement have different material descriptions.

If the inventory items assigned to the requirement are physically located in different places (e.g., some at the responsible inventory site and some at alternate storage location).

More than one reel is assigned to the requirement (if the requirement is for cable).

To issue the material, select the inventory items that you want to issue and provide the following information:

Name - The name of the person to whom you are issuing the material. Type a name (or initials) in the Name text box.

Issue Date - The date for which you are issuing the material It defaults to the current date. Type a valid date in the Issue Date text box or accept the default. The date entered cannot be greater than the current date.

Remarks - Type any remarks that you wish to have recorded with the issue.

To get additional help while on this dialog, press the HELP button. To close this dialog without issuing material, press the CANCEL button. To close this dialog and issue the selected inventory items, press the OK button. If the Name text box is not populated, the system displays an appropriate error message. Respond to the message by pressing OK.

If no errors are found, the system creates a separate issue for each inventory item selected, increases the inventory item's at site balance, and marks the inventory item as issued. However, the name of the person to whom you are issuing the material, the issue date, and any remarks provided are the same on each issue created. If you want to issue the material to different people, issue the material on different dates, or provide different remarks, you must issue each inventory item separately. For non-serialized inventory items and serialized non-cable items, the total quantity issued is equal to the quantity assigned to the substep. For cable items, the quantity issued is equal to the entire balance on the reel.

If issuing a reel of cable that is assigned to multiple substeps, the system issues the inventory item for each substep within the current job. This is done to prevent you from having to issue the inventory item more than once for a job. Therefore, an inventory item can be issued for multiple substeps, but not for multiple jobs.

After issuing the material, the Current Row's Issue Status frame located on the REQUIREMENTS window is updated to indicate whether some or all of the material assigned to the requirement has been issued.

To close the REQUIREMENTS window, double-click the control box located in the upper left corner of the window.

JUNK AN INVENTORY ITEM

Junking cable material allows you to clear a reel of a small amount of material making the reel available for reuse. Non-cable material is sometimes junked because it has been at the inventory site for a while and is no longer needed.

If the Construction Management Center (CMC) is using the auto-junk feature, remaining cable on a reel will be junked by the system when the material is reported used if the remaining quantity is less than the auto-junk limit and is not assigned. You may need to manually junk an inventory item if you are not using the auto-junk feature or you need to junk non-cable material.

Figure 37:
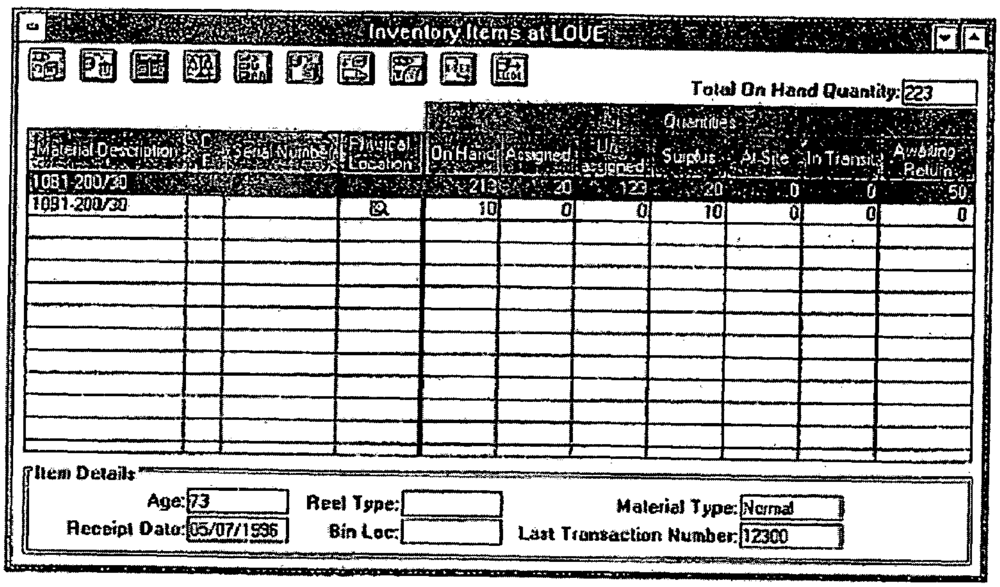
FIG. 37 is an exemplary screen print for Inventory Items.

First, display the INVENTORY ITEMS AT xxxx window, where xxxx is the selected inventory site as previously discussed in the third section of this document. The INVENTORY ITEMS window as shown in Fig. 37 is displayed.

To junk an inventory item, select an inventory item from the grid and press the Junk toolbar button located on the INVENTORY ITEMS window or select "Junk..." from the Actions menu. The JUNK INVENTORY ITEM dialog shown below is displayed. This function is available if the following conditions are met:

You have security access to update inventory in this inventory site.

You are a Materials Management Manager or Materials Management Clerical user.

The selected inventory item has an unassigned, surplus, or awaiting return inventory balance.

Figure 38:
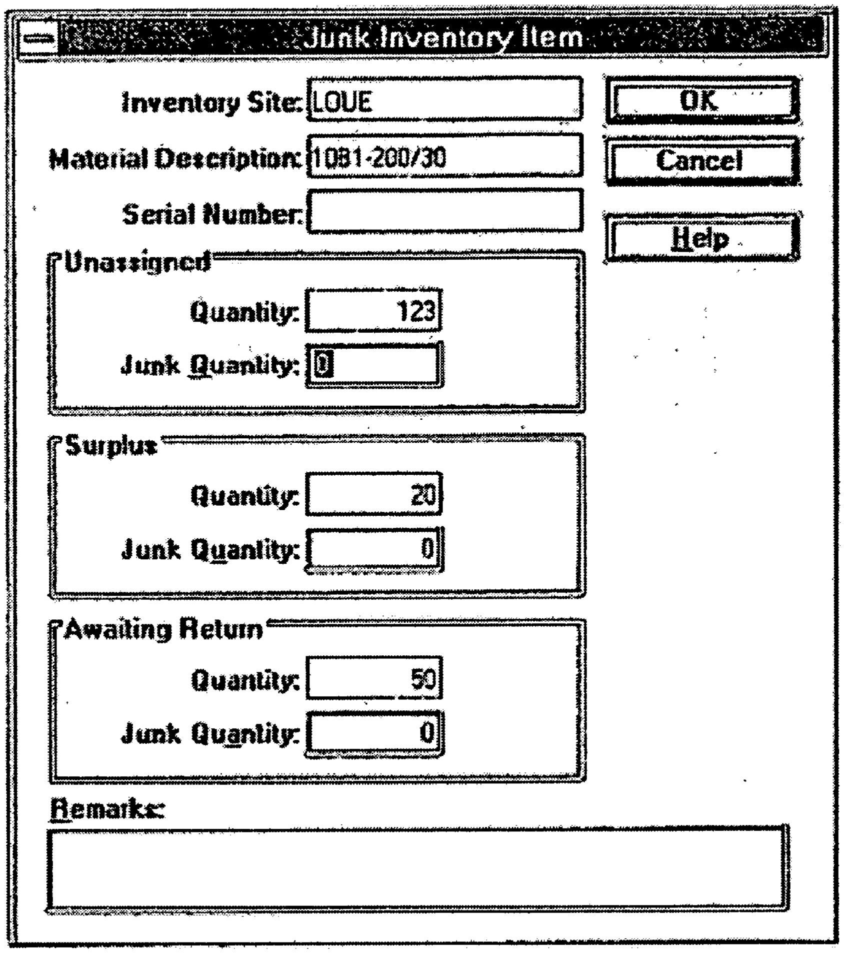
FIG. 38 is an exemplary screen print for Junk Inventory Items.

If the selected inventory item is serialized material and has not been issued (at site balance = 0). (See Fig. 38).

This dialog allows you to junk an inventory item. The following information is displayed about the selected inventory item:

Inventory Site - The name of the inventory site responsible for the inventory item.

Material Description - The material description of the inventory item.

Serial Number - The serial number of the inventory item (if serialized).

The Unassigned frame displays the inventory item's current unassigned balance. The Surplus frame displays the inventory item's current surplus balance. The Awaiting Return frame displays the inventory item's current awaiting return balance. The corresponding frame is not displayed if the inventory item does not have a balance in that status.

To junk the selected inventory item, provide the following information:

Junk Quantity - The quantity to be junked. If the selected inventory item is serialized material, the Junk Quantity is set equal to the on hand balance of the inventory item minus any assigned balance it may have, but may be changed. Cable items may have both an assigned and unassigned balance. The assigned balance is subtracted out because assigned material may not be junked. If the selected inventory item is non-serialized material, type the quantity to junk in the Junk Quantity text box. The Junk Quantity cannot be greater than the current balance, but must be greater than zero.

Remarks - Type any remarks in the Remarks text box that you wish to have recorded with the Junk transaction.

To get additional help while on this dialog, press the HELP button To close this dialog and not junk the inventory item, press the CANCEL button. To close this dialog and junk the inventory item, press the OK button. The system displays an appropriate message under the following conditions:

If the quantity to be junked is greater than 299 feet (if cable) or greater than $500.00 (junk quantity times the average price of the material), the system displays an appropriate warning message. Respond to the message by pressing YES if you still wish to junk the material or NO if you don't want to junk the material. The system allows you to junk more than 299 feet or greater than $500.00, but the message is issued to warn you that you are junking more than the BellSouth Executive Instructions (E.I.s) have allowed.

If you are junking cable and the quantity to be junked is less than the total balance of the reel, the system displays an appropriate warning message. Respond to the message by pressing YES if you still wish to junk the material or NO if you don't want to junk the material. The system allows you to junk a partial reel, but the message is issued to warn you that you are not junking the entire reel.

If the Junk Quantity is greater than the current unassigned, surplus, or awaiting return balance, the system displays an appropriate error message. Respond to the message by pressing OK.

If the Junk Quantity is equal to zero, the system displays an appropriate error message. Respond to the message by pressing OK.

If there are no errors found, the system junks the selected inventory item and records a Junk material inventory transaction as follows. Multiple transactions are created if you junk from more than one status. This could only happen if the selected inventory item was non-serialized material.

If junking awaiting return inventory, the system decreases both the inventory item's awaiting return balance and on hand balance and records a Junk material inventory transaction from the awaiting return status. If the inventory item's on hand balance reaches zero, the inventory item is deleted from the system.

If junking unassigned inventory, the system decreases both the inventory item's unassigned balance and on hand balance and records a Junk material inventory transaction from the unassigned status. If the inventory item's on hand balance reaches zero, the inventory item is deleted from the system.

If junking surplus inventory, the system decreases both the inventory item's surplus balance and on hand balance and records a Junk material inventory transaction from the surplus status. If the inventory item's on hand balance reaches zero, the inventory item is deleted from the system.

If the inventory item is central office equipment, the Junk transaction is marked as not to be sent to Asset Management; otherwise it is marked to be sent to Asset Management.

If the inventory item was junked successfully, the system displays an appropriate message. The inventory balances shown on the INVENTORY ITEMS window are updated to reflect the results of the Junk transaction. The Last Transaction Number text box is updated to reflect the number of the last Junk transaction created.

To close the INVENTORY ITEMS window, double-click the control box located in the upper left corner of the window.

PROCESS MATERIAL USAGE

When material is taken out of inventory and placed in service or taken out of service and put back into inventory, material usage is reported by a Telephone Company (TELCO) employee or by a contractor hired to do the work. As a result, the inventory balance of the item used must be adjusted.

Material Usage is reported when the substep for which a material requirement exists is reported complete. See the Business Solutions for the LapTop and the Billing and Reporting JAD areas to receive an overview on how to report material usage. Reporting material usage results in the creation of a material inventory transaction which in turn adjusts the inventory balance of the used item.

If a substep is marked complete with material usage, a Materials Management process is called to adjust the inventory balance. To use this process, the identifier of the material usage record must be provided. The following types of transactions may be created as a result:

Disbursement - This type of transaction is created when an existing inventory item is placed in service (Material Usage is reported as follows: Removed Condition equals blank and Usage Type equals "U" for usage) or when an inventory item recovered from junk is placed in service (Material Usage is reported as follows: Removed Condition equal blank, Usage Type equal "U", and a miscellaneous code of RFJ = "Y" is reported). This transaction decreases the inventory item's current assigned balance by the quantity reported. If cable material is reported used, the quantity reported is equal to the quantity placed in service (record quantity) plus any splice loss incurred.

Disbursement Reversal - This type of transaction is created when a substep is completed incorrectly and must be backed out. The wrong substep may have been reported complete, the wrong inventory item may have been reported, or the wrong quantity may have been reported (Material Usage is reported as follows: Removed Condition equals blanks and Usage Type equals "R" for reversal). This transaction assigns the inventory item back to the substep to which it was assigned prior to disbursement thereby increasing the inventory item's assigned balance by the quantity previously disbursed. It also recovers any material previously auto-junked.

Recover from Junk - This type of transaction is created when the material used was recovered from junk. If not enough inventory was assigned to the substep to complete the work, the TELCO employee or contractor may report that the material used was recovered from junk (Material Usage is reported as follows: Removed Condition equals blank, Usage Type equals "U", and a miscellaneous code of RFJ = "Y" is reported). This transaction increases the inventory item's unassigned balance by the quantity recovered from junk or, if the inventory item does not already exist, creates the inventory item with an unassigned balance equal to the quantity recovered from junk. The recovered inventory item is then assigned to the substep reported and is then disbursed.

Junk - This type of transaction is created when cable material is reported used and the remaining quantity on the reel is unassigned and less than the auto-junk limit set by the responsible CMC (Material Usage is reported as follows: Removed Condition equal blank and Usage Type equals "U") or when a substep for which material was recovered from junk was completed incorrectly and must be backed out (Material Usage is reported as follows: Removed Condition equals blank. Usage Type equals "R", and a miscellaneous code of RFJ = "Y" is reported). A CMC may choose to use the auto-junk feature or not to use it. The default auto-junk limit is set to 300 ft, but may be decreased by the CMC. Use of the auto-junk feature and the auto-junk limit are set as OFF parameters. This transaction decreases the inventory item's unassigned balance by the quantity junked.

Remove to Good - This type of transaction is created when material is removed from service and put back into inventory (Material Usage is reported as follows: Removed Condition equals "G" and Usage Type equals "U"). This transaction increases the inventory item's unassigned balance by the quantity removed from service or, if the inventory item does not already exist, creates the inventory item with an unassigned balance equal to the quantity removed from service.

Remove to Good Reversal - This type of transaction is created when a substep is completed incorrectly and must be backed out. The wrong substep may have been reported complete, the wrong inventory item may have been reported, or the wrong quantity may have been reported (Material Usage is reported as follows: Removed Condition equals "G" and Usage Type equals "R"). This transaction decreases the inventory item's unassigned balance by the quantity previously removed from service.

The following general business rules are observed when material inventory transactions are created as a result of material usage:

All material inventory transactions created as a result of material usage are created with a CUID = "SYSTEM", except for an auto-junk which has a CUDD = "AUTOJNK".

The system generates a serial number for the inventory item reported if the reel type reported is "HC" and no serial number is reported. A reel type of "HC" can be reported if recovering cable from junk or removing cable to good. The format of a system generated serial number is the first four non-blank characters of the inventory site to which you are adding the inventory item plus a 1 character month (represented as A - L, where "A" represents January and "L" represents December) plus a 1 character hour (represented as A - X, where "A" represents hour 0 (midnight) and "X" represents hour 23) plus a 2 character minute plus a 2 character second (e.g. ROMMAN2032 would mean that the serial number was created in an inventory site called ROMM in January at 1:20:32 PM). If the generated serial number already exists, the system increases the value by 1 until it generates a unique serial number.

The system makes every attempt to adjust the balance of the inventory item reported as long as its inventory balance can meet the reported quantity.

If the inventory item reported was ordered direct to code, the material inventory transaction is marked as not to be sent to Asset Management.

The following business rules are observed when existing inventory is reported used:

If the inventory item (serial number or material description) reported does not exist in the location (inventory site or alternate address) reported, the system returns an appropriate error code to the calling application.

If the quantity reported is greater than the current inventory balance, the system returns an appropriate error code to the calling application.

If no errors occur, the system creates a Disbursement transaction for the inventory item and quantity reported.

If the inventory item reported is issued, the system decreases the issue quantity and the inventory item's current at site balance by the quantity reported. If the entire issue quantity is decreased to zero, the system closes (i.e., deletes) the issue and marks the inventory item, if it still exists, as no longer issued.

If the inventory item reported is not assigned to the substep reported or if the quantity reported is more than the quantity assigned to the substep, the system determines if the reported inventory item has enough unassigned or surplus balance from which to disburse the material. If it does, the system assigns the reported inventory item to the substep, and creates a Disbursement transaction for the inventory item reported. This is done to keep the audit trail in check so that only assigned inventory gets disbursed. f there is not enough unassigned or surplus balance, the system determines if the inventory item is assigned to another substep. If it is, the system unassigns the inventory item from the substep to which it is currently assigned, changes that substep's material status back to "needed", assigns the inventory item to the substep reported complete, and creates a Disbursement transaction for the inventory item reported.

If the quantity reported is less than the quantity assigned to the substep, the system creates an Unassignment transaction for the quantity not used and then creates a Disbursement transaction for the quantity reported.

If the inventory item reported is cable, in addition to creating a Disbursement transaction, the system creates a Junk transaction if the responsible CMC is using the auto-junk feature and the quantity remaining on the reel is unassigned and less than the CMC's auto-junk limit. If the inventory item is issued, the system closes (i.e., deletes) the issue upon auto-junking it.

If any inventory is still assigned to the reported substep after the material usage record is processed, the system creates an Unassignment transaction for the remaining assigned quantity. This can happen if a different inventory item from the assigned inventory is reported (e.g., different material description or different serial number).

If the material usage record is processed successfully, the substep's material status is changed to "D" (disbursed).

If a miscellaneous code of PIR = "N" is reported, a Disbursement transaction is not created; however, the substep's material status is still changed to "D" and any inventory assigned to the substep is unassigned.

The following business rules are observed when inventory reported as used is reversed:

If serialized material is reported and the serial number does not exist in the inventory site reported, but does exist in the responsible CMC, the system returns an appropriate error code to the calling application. This is because OSPCM will not allow duplicate serial numbers to exist within a CMC.

If serialized non-cable material is reported and the serial number already exists in the reported inventory site, the system returns an appropriate error code to the calling application. This is because serialized non-cable material cannot have an inventory balance greater than 1.

If non-serialized material or cable material is reported and the inventory item already exists in the reported inventory site and no errors occur, the system creates a Disbursement Reversal transaction to add the reported quantity to the existing inventory item. For non-serialized material, "the inventory item already exists" implies that there exists some of this material at this inventory site with a receipt date equal to the current date. If there is not, a new inventory item is created with its receipt date equal to the current date. This is done so that non-serialized material removed to good does not receive an "age" older than the current date.

If the material reported does not exist in the reported inventory site and no errors occur, the system creates a Disbursement Reversal transaction to create a new inventory item for the quantity reported.

If cable material is reported and an issue exists for the serial number, the system increases the issue quantity by the quantity reported and in effect reissues the material previously disbursed.

If the Disbursement transaction that is to be reversed involved an auto-junk, the system first creates a Recover From Junk transaction for the quantity previously junked and then creates a Disbursement Reversal transaction for the reported quantity.

If the material usage record is processed successfully, the substep's material status is changed back to its previous status.

If a miscellaneous code of PIR = "N" is reported, a Disbursement Reversal transaction is not created; however, the substep's material status is changed to "N" (needed).

The following business rules are observed when material recovered from junk is reported used:

If reporting serialized material and the serial number does not exist in the inventory site reported, but does exist in the responsible CMC, the system returns an appropriate error code to the calling application. This is because OSPCM will not allow duplicate serial numbers to exist within a CMC.

If reporting serialized non-cable material and the serial number already exists in the reported inventory site, the system returns an appropriate error code to the calling application. This is because serialized non-cable material cannot have an inventory balance greater than 1.

If the material reported is cable and the reel type reported is "HC" (hand-coil) and no serial number is reported, the system generates a serial number for the inventory item as described earlier.

If reporting non-serialized material or cable material and the inventory item already exists in the reported inventory site and no errors occur, the system creates a Recover from Junk transaction to add the reported quantity to the existing inventory item, creates an Assignment transaction to assign the inventory item to the substep reported, and creates a Disbursement transaction to disburse the inventory item for the quantity reported.

If the material reported does not exist in the reported inventory site and no errors occur, the system creates a Recover from Junk transaction to create a new inventory item for the quantity reported, creates an Assignment transaction to assign the inventory item to the substep reported, and creates a Disbursement transaction to disburse the inventory item for the quantity reported.

If any inventory is still assigned to the reported substep after the material usage record is processed, the system creates an Unassignment transaction for the remaining assigned quantity. This can happen if recovered from junk material was used rather than the assigned inventory item.

If the material usage record is processed successfully, the substep's material status is changed to "D" (disbursed).

The following business rules are observed when recovered from junk material reported as used is reversed:

If reporting serialized material and the serial number does not exist in the inventory site reported, but does exist in the responsible CMC, the system returns an appropriate error code to the calling application. This is because OSPCM will not allow duplicate serial numbers to exist within a CMC.

If reporting serialized non-cable material and the serial number already exists in the reported inventory site, the system returns an appropriate error code to the calling application. This is because serialized non-cable material cannot have an inventory balance greater than 1.

If reporting non-serialized material or cable material and the inventory item already exists in the reported inventory site and no errors occur, the system creates a Disbursement Reversal transaction to add the reported quantity to the existing inventory item and then creates a Junk transaction to junk the inventory item for the quantity reported.

If the material reported does not exist in the reported inventory site and no errors occur, the system creates a Disbursement Reversal transaction to create a new inventory item for the quantity reported and then creates a Junk transaction to junk the inventory item for the quantity reported.

If the material usage record is processed successfully, the substep's material status is changed back to its previous status.

The following business rules are observed when material is reported as removed to good:

If reporting serialized material and the serial number does not exist in the inventory site reported, but does exist in the responsible CMC, the system returns an appropriate error code to the calling application. This is because OSPCM will not allow duplicate serial numbers to exist within a CMC.

If reporting serialized non-cable material and the serial number already exists in the reported inventory site, the system returns an appropriate error code to the calling application. This is because serialized non-cable material cannot have an inventory balance greater than 1.

If the material reported is cable and the reel type reported is "HC" (hand-coil) and no serial number is reported, the system generates a serial number for the inventory item as described earlier.

If reporting non-serialized material or cable material and the inventory item already exists in the reported inventory site and no errors occur, the system creates a Remove To Good transaction to add the reported quantity to the existing inventory item.

If the material reported does not exist in the reported inventory site and no errors occur, the system creates a Remove To Good transaction to create a new inventory item for the quantity reported.

The following business rules are observed when material reported as removed to good is reversed:

If the inventory item (serial number or material description) reported does not exist in the location (inventory site or alternate address) reported, the system returns an appropriate error code to the calling application.

If the quantity reported is greater than the current inventory balance, the system returns an appropriate error code to the calling application.

If no errors occur, the system creates a Remove to Good Reversal transaction for the inventory item and quantity reported.

If the inventory item reported has been assigned, the system first unassigns the inventory item from the substep, changes its material status back to "needed", and then creates a Remove To Good Reversal transaction for the quantity reported.

RELOCATE AN INVENTORY ITEM

You may relocate an inventory item by changing its bin location, by moving it from your inventory site to an alternate storage location, or by moving it from an alternate storage location back to your inventory site.

Figure 39:
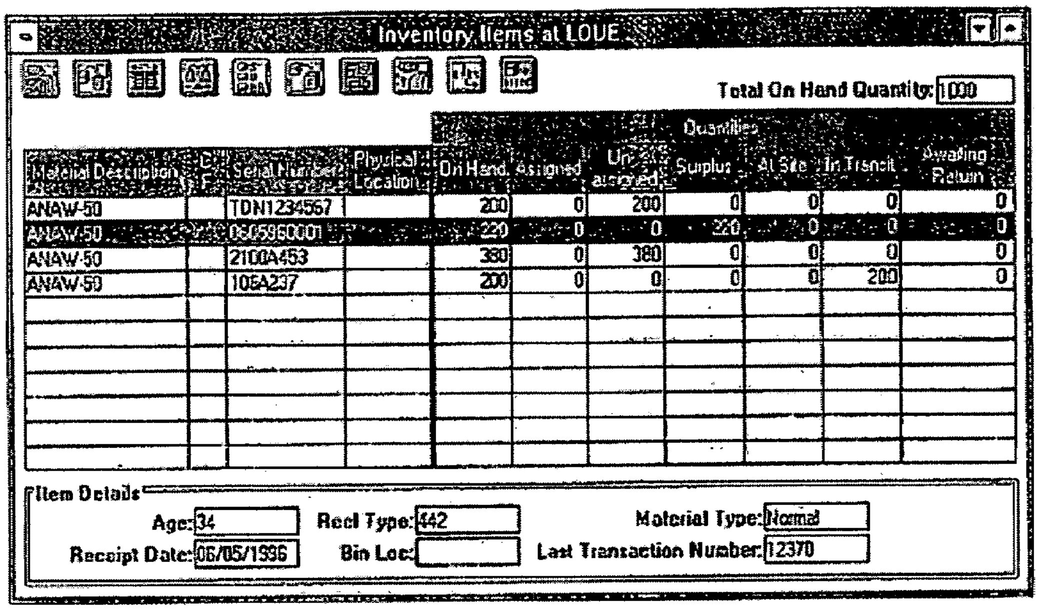
FIG. 39 is another exemplary screen print for Inventory Items.

First, display the INVENTORY ITEMS AT xxxx window, where xxxx is the selected inventory site as previously discussed in the third section of this document. The INVENTORY ITEMS window as shown in Fig. 39 is displayed.

Select an inventory item from the grid and press the Relocate toolbar button located on the INVENTORY ITEMS window or select "Relocate..." from the Actions menu. The RELOCATE INVENTORY ITEM dialog shown on the following page is displayed. This function is available if the following conditions are met:

You have security access to update inventory in this inventory site.

You are a Materials Management Manager or a Materials Management Clerical user.

Figure 40:
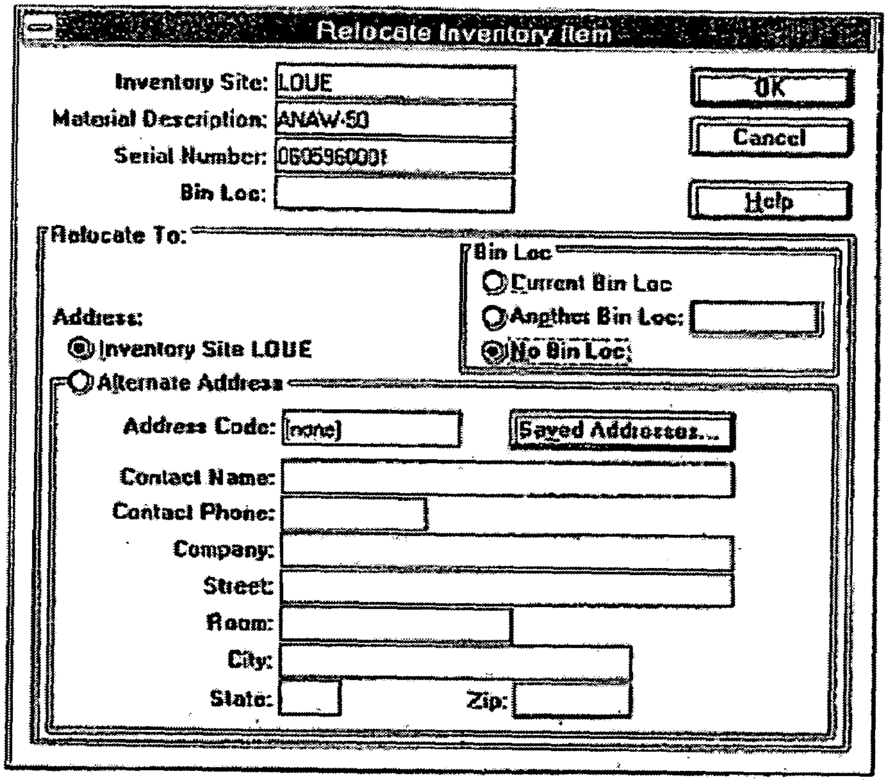
FIG. 40 is an exemplary screen print for Relocate Inventory Item.

The selected inventory item's entire on hand balance has not been issued nor in transit. (See Fig. 40).

This dialog allows you to specify a new bin location for the selected inventory item or to move it between your inventory site and an alternate storage location. The following information is displayed about the selected inventory item:

Inventory Site - The name of the inventory site responsible for the inventory item.

Material Description - The description of the inventory item.

Serial Number - The serial number of the inventory item (if serialized).

Bin Loc - The current bin location of the inventory item. If the inventory item does not have a bin loc, this field is blank.

The address radio button defaults to the current location of the inventory item. If the inventory item is physically located at the inventory site, the Inventory Site radio button is selected. If the inventory item is physically located at an alternate storage location, the Alternate Address radio button is selected and the following information is displayed:

Address Code - The code by which this address was saved.

Contact Name - The contact name of the alternate address (if applicable).

Contact Phone - The contact phone number of the alternate address.

Company - The company of the alternate address (if applicable).

Street - The street of the alternate address.

Room - The room number of the alternate address (if applicable).

City - The city of the alternate address.

State - The state of the alternate address.

Zip Code - The zip code of the alternate address.

CHANGE THE INVENTORY ITEM'S BIN LOCATION

The Bin Loc frame is used to specify the inventory item's bin location. The following radio buttons are available:

Current Bin Loc - If the inventory item has a bin loc, the Current Bin Loc radio button is selected when this dialog is opened. To keep the inventory item in its current bin location, do nothing.

Another Bin Loc - To specify a new bin location for the inventory item, select the Another Bin Loc radio button and type the new bin location in the associated text box.

No Bin Loc - If the inventory item does not have a bin loc, the No Bin Loc radio button is selected when this dialog is opened. If the inventory item has a bin loc and you want to indicate that it is no longer at a particular bin location, select the No Bin Loc radio button.

If you are relocating a serialized inventory item that is waiting to be returned (Awaiting Return balance > 0), the only action you may take is to change its bin location.

MOVE THE INVENTORY ITEM BACK TO THE INVENTORY SITE

To move the inventory item from an alternate storage location back to your inventory site, select the Inventory Site radio button.

MOVE THE INVENTORY ITEM TO AN ALTERNATE STORAGE LOCATION

Figure 41:
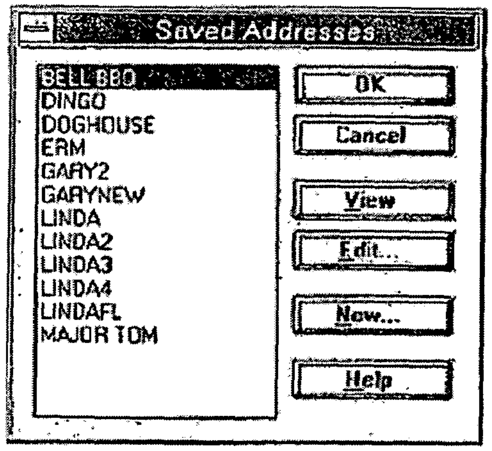
FIG. 41 is an exemplary screen print for Saved Addresses.

To relocate the inventory item to an alternate storage location, select the Alternate Address radio button followed by the SAVED ADDRESSES button. The SAVED ADDRESSES dialog as shown in Fig. 41 is displayed.

The Saved Address list box lists all of the alternate addresses currently stored in the system. By default, the first code in the list is selected.

To relocate the inventory item to a saved address, select one from the list box. If the address you need is not listed, you may create a new alternate address by pressing the NEW button as described later in this document.

To get additional help while on this dialog, press the HELP button. To close this dialog and not use the selected address, press the CANCEL button. To close this dialog and use the selected address, press the OK button. If OK is pressed, the address associated with the selected code is copied to the alternate address fields on the RELOCATE INVENTORY ITEM window.

Figure 42:
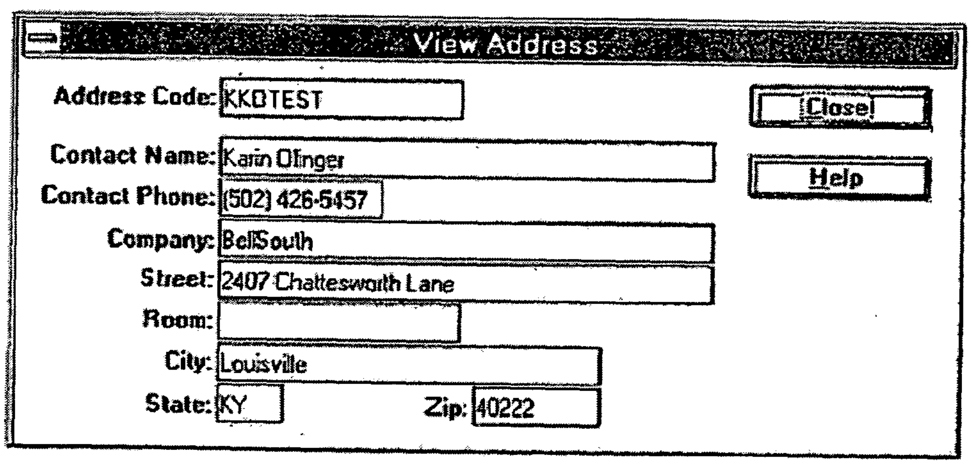
FIG. 42 is an exemplary screen print for View Address.

The following buttons are also available from the SAVED ADDRESSES dialog:

VIEW - To view the address associated with a code, select one from the list box and press the VIEW button. The VIEW ADDRESS dialog as shown in Fig. 42 is displayed.

This dialog displays the address associated with the code selected. To get help while on this dialog, press the HELP button. To close this dialog, press the CLOSE button.

Figure 43:
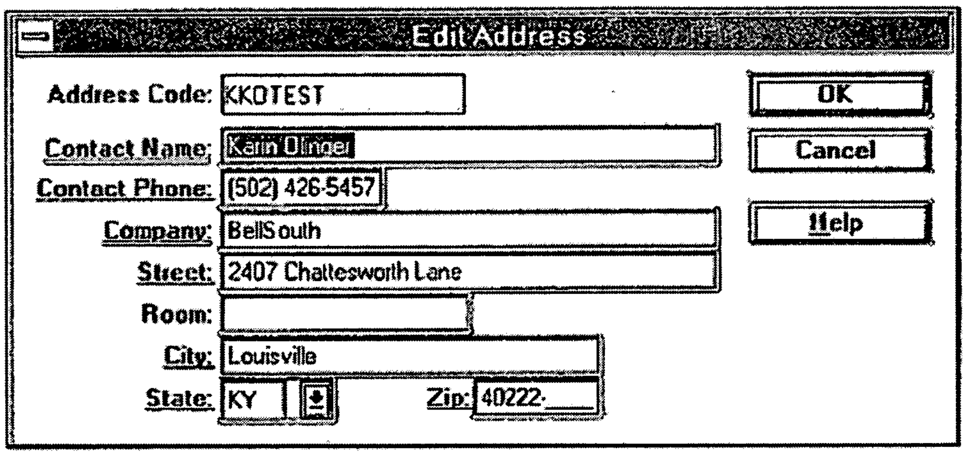
FIG. 43 is an exemplary screen print for Edit Address.

EDIT - To edit the address associated with a code, select one from the list box and press the EDIT button. The EDIT ADDRESS dialog as shown in Fig. 43 is displayed.

You may modify the contact name, contact phone, company, street, room, city, state, or zip.

To get help while on this dialog, press the HELP button. To close this dialog without saving the changes made, press the CANCEL button. To close this dialog and save the changes made, press the OK button. The system displays a message under the following conditions:

If both the contact name and the company name are blank, an error message is displayed. Respond to the message by pressing OK.

If the contact phone, street, city, state, or zip code are blank, an error message is displayed. Respond to the message by pressing OK.

If the contact phone or zip code are incomplete, an error message is displayed. Respond to the message by pressing OK.

Figure 44:
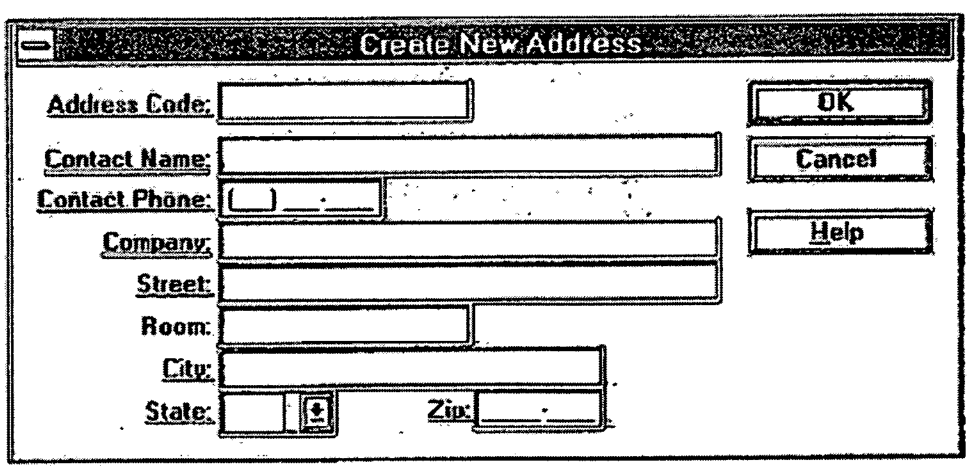
FIG. 44 is an exemplary screen print for Create New Address.

NEW - To add a new alternate address, press the NEW button. The CREATE NEW ADDRESS dialog as shown in Fig. 44 is displayed.

To add a new alternate address to which the inventory item should be relocated, provide the following information:

Address Code - Type a code by which this address will be known. This code will appear in the Alternate Address drop down lists and will be available to anyone who wishes to store material at this location. Address Code must be provided.

Contact Name - Type the name of the person to whom the inventory item should be relocated or the name of the person who should be notified of the relocation in the Contact Name text box. If Contact Name is not provided, Company must be provided.

Contact Phone - Type the phone number of the person to whom the inventory item should be relocated or the phone number of the person who should be notified of the relocation in the Contact Phone text box. Contact Phone must be provided.

Company - Type the name of the company to which the inventory item should be relocated in the Company text box. If Company is not provided, Contact Name must be provided.

Street - Type the street address to which the inventory item should be relocated in the Street text box. Street must be provided.

Room - Type the room number to which the inventory item should be relocated in the Room text box. Room is optional.

City - Type the name of the city to which the inventory item should be relocated in the City text box. City must be provided.

State - Type or select the abbreviation of the state to which the inventory item should be relocated in the State combo box, which contains a list of the nine BellSouth states. State must be provided. If a state is entered that is not in the list, the system displays an appropriate error message. Respond to the message by pressing OK.

Zip - Type the zip code to which the inventory item should be relocated in the Zip text box. Zip must be provided. Format is nnnnn or nnnnn-nnnn, where n is a number between 0 and 9.

To get help while on this dialog, press the HELP button. To close this dialog without adding the new address, press the CANCEL button. To close this dialog and add the new address, press the OK button. The system displays a message under the following conditions:

If both the contact name and the company name are blank, an error message is displayed. Respond to the message by pressing OK.

If the address code, contact phone, street, city, state, or zip code are blank, an error message is displayed. Respond to the message by pressing OK.

If the contact phone or zip code are incomplete, an error message is displayed. Respond to the message by pressing OK.

If the address code entered already exists, an interrogative message is displayed asking you if you want to replace the old address with the new address. Press YES if you want to replace the address or press NO if you do not want to replace the address.

If the address code has the same name as an inventory site, an error message is displayed (e.g., you cannot have an alternate address code name "SWL" and an inventory site named "SWL"). Respond to the message by pressing OK.

If no errors are found, the system creates a new alternate address of type code "A".

To get additional help while on the RELOCATE INVENTORY ITEM dialog, press the HELP button. To close the dialog without relocating the inventory item, press the CANCEL button. To close the dialog and relocate the inventory item, press the OK button. The system displays an appropriate message if the following conditions occur:

If you have not made any changes, a warning message is displayed indicating that the inventory item will not be relocated since no changes were made. Respond to the message by pressing OK.

If you are changing the bin location of the inventory item and did not specify a new bin location (i.e., different from the current bin location) to which the inventory item should be moved, an error message is displayed. Respond to the message by pressing OK.

If you are changing the bin location of the inventory item and did not specify a bin location to which the inventory item should be moved, an error message is displayed. Respond to the message by pressing OK.

If you are relocating the inventory item to an alternate storage location and did not provide the required address information, an error message is displayed. Respond to the message by pressing OK.

If no errors were found, the system makes one or more of the following changes:

Changes the physical location of the selected inventory item from the alternate address to the inventory site responsible for the inventory item or changes the physical location of the selected inventory item from the inventory site responsible for the inventory item to the alternate address specified.

If the inventory item had a designated bin location and it was relocated to an alternate address or back to the responsible inventory site without having a new bin location specified, the inventory item is removed from its current bin location.

Changes the current bin location of the selected inventory item to the new bin location specified or removes the selected inventory item from its current bin location.

If you are relocating non-serialized inventory, the entire on-hand balance located at that physical location is moved to the inventory site, alternate address, or bin location specified because you cannot specify the quantity or the inventory status to relocate. This means that any issued or in-transit inventory will be moved as well.

If the inventory item was relocated successfully, the system displays an appropriate message. No material inventory transaction is recorded as a result of relocating the selected inventory item. The appropriate changes are displayed on the INVENTORY ITEMS window to reflect the results of the relocation.

To close the INVENTORY ITEMS window, double-click the control box located in the upper left corner of the window.

REPORT RECONCILIATION FILE TO ASSET MANAGEMENT

This section defines the reconciliation interface between OSPCM and Asset Management, the accounting system that tracks inventory dollars in the 12201100 account. This account is maintained in Asset Management by geographic location code (GLC) and material item code (MIC). On occasion, the inventory units and dollars in this account must be reconciled between the two systems. The inventory units are reported to Asset Management by MIC for a specified inventory site. Since OSPCM inventories both non-exempt material ordered to the 12201100 account (e.g. cable) and non-exempt material ordered directly to the in-service account (e.g. central office equipment, conduit, manholes), those inventory items ordered directly to the in-service account, must be excluded from the interface.

The chosen interface is an on demand file transmission using BUFIT. Asset Management requests a reconciliation file by sending a file via BUFIT containing the geographic location code (GLC) of the desired inventory site(s) and an inventory ED. When the file is transmitted to OSPCM, a process is run to create the reconciliation file. After the file is created, it is transmitted back to Asset Management via BUFIT. The Asset Management system resides on a UNIX box in the Jackson, MS data center.

The reconciliation file is created for the specified GLC (which may contain 1 or more inventory sites) by summing the on hand balance of each of its inventory items by MIC. All inventory items that are the responsibility of the specified GLC, excluding those inventory items ordered direct to code, are used in the calculation.

A header record containing the following information is written as the first record in the file.

Trans Code - Defaults to "HDR".

Inventory Date - The date the inventory was taken. This is the current date. (Format: YYYY/MM/DD)

The following information is written to the file per MIC.

Business Unit - Defaults to "BST" (5 char).

Dept ID - State of the glc for which the file is created (2 char).

Inventory ID - The ID provided by Asset Management to identify the inventory reconciliation file (7 numeric).

Location - The GLC provided by Asset Management (6 char).

BST ID - The MIC of the inventory items reported (12 char).

BST SUB ID - Defaults to spaces (2 char).

Table Sequence Number - Defaults to zeroes (11 numeric).

Custodian - The responsibility code of the inventory site for which the file is created (8 char). If the glc crosses inventory sites, this field should be populated with ???.

Quantity - The inventory balance for the MIC reported (10 numeric). The last two digits are for tenths and hundredths. The decimal point is not transmitted (e.g. a quantity of 8 is sent as 800).

Asset Cost - Defaults to zeroes (15 numeric).

Asset Description - The description of the MIC (60 char).

A trailer record containing the following information is written as the last record in the file.

Trans Code - Defaults to "TRL".

Number of Records - The number of records written to the file, excluding the header and trailer records (9 numeric).

ADD AN INVENTORY ITEM

You add an item to your inventory when you recover material from junk, reclassify material that was previously exempt as non-exempt, when you find material on your yard that has not been accounted for, or when you need to add an inventory item for use on a Turn-Key job. The turn-key process is the outsourcing of outside plant tech hours for splicing and pre-service turn up at a carrier site. This process is part of an initiative for "fiber in the loop" technology. All new subdivisions are supposed to be cabled with fiber and the turn-key process is a method to be used so as to not increase the workload on existing resources. The material needed on a turn-key job is ordered by the Procurement Services Office (PSO) directly in REGIS or CAPRI. Since the order does not exist in OSPCM, the material cannot be added into inventory using the receipt process. Instead, it must be added into inventory using the. Add Inventory Item window and then assigned to the appropriate job using the assignment procedures discussed in Business Solution III. If you are responsible for a warehouse site, you may add an item to your inventory to replenish your emergency or consignment stock. If you are responsible for a Refurbished Central Office Equipment (RCOE) site, you may add an item to your inventory when refurbished equipment is delivered to your site.

An additional feature is available for a period of time. During the conversion from the Major Apparatus and Cable System (MACS) to OSPCM, you can convert unassigned or surplus inventory remaining in the MACS system to the OSPCM system.

To add an inventory item, select "Add Inventory Item" from the Inventory menu located on the main MATERIALS MANAGEMENT window. The ADD INVENTORY ITEM dialog is displayed. The command buttons and some of the fields on this dialog will vary slightly depending on whether or not you are undergoing a MACS conversion. The Add Inventory Item function is available if the following conditions are met:

You have security access to update inventory.

You are a Materials Management Manager or a Materials Management Warehouse user. During the MACS conversion, a Materials Management clerk will be able to add inventory as long as all other security requirements are met.

ADD A NON-MACS INVENTORY ITEM

Figure 45:
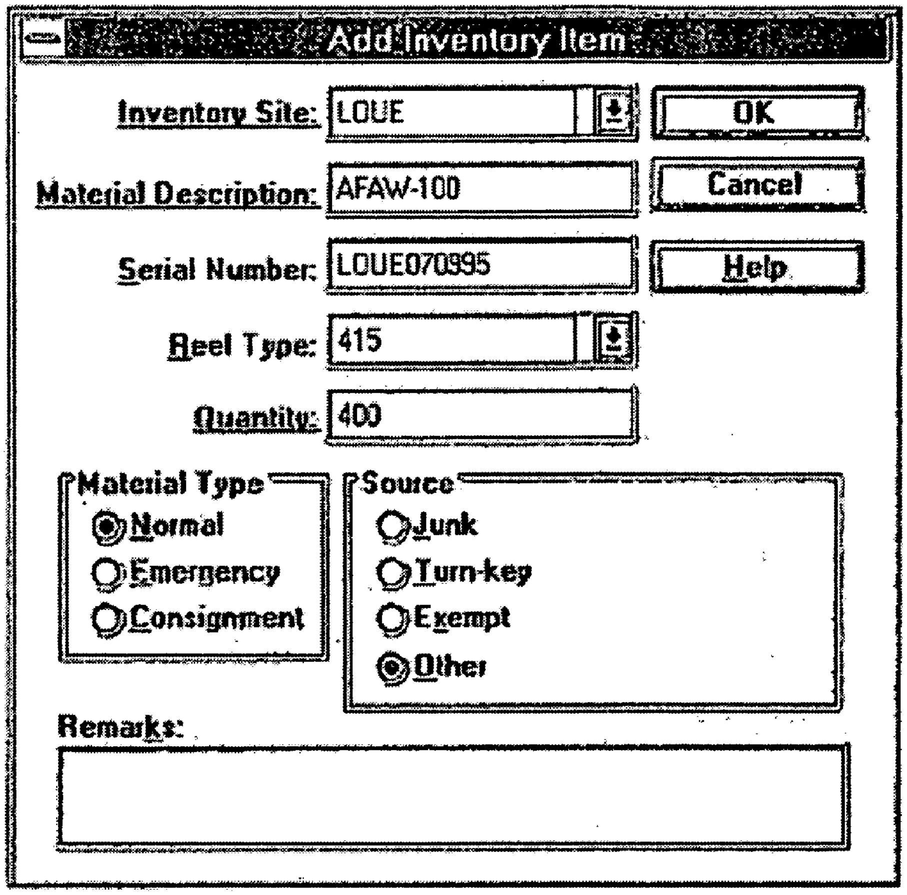
FIG. 45 is an exemplary screen print after selecting Add Inventory Item from an Inventory menu located on a main Materials Management window.

If you are not undergoing a MACS conversion, the dialog shown below is displayed after selecting "Add Inventory Item" from the Inventory menu located on the main MATERIALS MANAGEMENT window. (See Fig. 45).

To add an item, provide the following information.

Inventory Site - The name of the inventory site to which you want to add the inventory. Type a valid inventory site in the Inventory Site list box or select one from its drop-down list. If you are a Materials Management manager or clerk, the drop-down list contains a list of all inventory sites, excluding warehouse and RCOE sites, for which you have security access to update inventory. If you are a warehouse user, the drop-down list contains a list of all warehouse sites and RCOE sites for which you have security access to update inventory. The inventory site defaults to the inventory site you have selected on the PREFERENCES dialog.

Material Description - The material description of the inventory item. Type a valid material description in the Material Description text box. If adding inventory to a warehouse site, only serialized material may be added.

Serial Number - The serial number of the inventory item. If you are adding serialized material to your inventory, type a serial number in the Serial Number text box. If you are adding cable to your inventory you may leave this field blank and enter "HC" (hand coil) in the Reel Type field to have the system generate a serial number. The format of a system generated serial number is the first four non-blank characters of the inventory site to which you are adding the inventory item plus a 1 character month (represented as A -L, where "A" represents January and "L" represents December) plus a 1 character hour (represented as A - X, where "A" represents hour 0 (midnight) and "X" represents hour 23) plus a 2 character minute plus a 2 character second. For example, ROMMAN2032 would mean that the serial number was created in an inventory site called ROMM in January at 1:20:32 PM. If the generated serial number already exists, the system increases the value by 1 until it generates a unique serial number.

Reel Type - The reel type of the inventory item. If you are adding cable to your inventory, type a valid reel type in the Reel Type text box or select one from its drop down list. If the serial number is not provided and the reel type is "HC", the system will generate a serial number.

Quantity - The quantity to add to inventory. Type a quantity greater than zero in the Quantity text box. If adding serialized non-cable, the quantity cannot be greater than one.

Material Type - The intended use of the inventory item. Valid values are as follows:

Normal - Select the Normal button if the inventory item is for normal use. This button is available only if adding inventory to an inventory site or to an RCOE site. This is the default Material Type if adding to an inventory site or RCOE site.

Emergency - Select the Emergency button if the inventory item is reserved for emergency use. This button is available only if adding inventory to an inventory site that can store emergency material or to a warehouse site. This is the default Material Type if adding to a warehouse site.

Consignment - Select the Consignment button if the inventory item is consignment material. This button is available only if adding inventory to a warehouse site.

Source - The source of the inventory item. Valid values are as follows:

Junk - Select the Junk button if the inventory item was recovered from junk.

Turn key - Select the Turn key button if the inventory item is added for use on a Turn key job.

Exempt - Select the Exempt button if the inventory item was reclassified from exempt.

Other - Select the Other button if the inventory item was found on the yard and you do not know where it came from. This is the default Source.

Remarks - Enter any remarks in the Remarks text box that you wish to have recorded with the Recover From Junk, Reclassify From Exempt, or Inventory Addition transaction.

To get additional help while on this dialog, press the HELP button. To close this dialog without adding the inventory item, press the CANCEL button. To close this dialog and add the inventory item, press the OK button.

The system displays an appropriate error message under the following conditions:

If the inventory site is not valid.

If no material description is provided or the one provided is not valid.

If adding an inventory item as consignment material and its material description is not marked as a consignment item in the Material Item table.

If adding non-serialized material to a warehouse site.

If adding emergency non-serialized material to an inventory site.

If the material is serialized non-cable and you did not provide a serial number.

If the material is cable and you did not specify a serial number or specify the reel type as "HC".

If the serial number provided already exists in the CMC responsible for the inventory site to which you are adding the inventory.

If the material is non-serialized and a serial number is provided.

If the material is cable and you did not specify a reel type.

If the material is not cable and a reel type is provided.

If the reel type provided is not valid.

If the quantity added is zero.

If adding serialized non-cable and the quantity is greater than one, a message displays indicating that the quantity will be changed to one and asks you if you wish to continue adding the item. Respond to the message by pressing YES if you wish to continue or NO if you do not.

Respond to all error messages by pressing OK unless otherwise noted.

If no errors are found, the system updates or creates an inventory balance for the inventory site, material description, and serial number specified and records a material inventory transaction as follows.

If adding serialized inventory or adding non-serialized inventory for which there is not yet an inventory balance, the system creates a new inventory item with an unassigned balance equal to the quantity to be added. Adding non-serialized inventory will create a new inventory item if there was not already some of this material added today to this inventory site (either via the Add Inventory process or the Receipt process) so that the age of the inventory items may be tracked appropriately. If some of this material was added today, but relocated to an alternate address before the new inventory item is added, a new inventory item will be created so that the location of the inventory items may be tracked appropriately If adding non-serialized inventory for which there is already an inventory balance, the system increases the unassigned balance by the quantity to be added..

If the inventory item's source is "Junk", the system records a Recover From Junk material inventory transaction. If the material is non-Central Office Equipment, the transaction is marked to be sent to Asset Management; otherwise the transaction is marked as not to be sent to Asset Management.

If the inventory item's source is "Turn key", the system records an Inventory Addition material inventory transaction. The transaction is marked as not to be sent to Asset Management because the material was already reported to the accounting systems through REGIS or CAPRI.

If the inventory item's source is "Exempt", the system records a Reclassify From Exempt material inventory transaction. If the material is non-Central Office Equipment, the transaction is marked to be sent to Asset Management; otherwise the transaction is marked as not to be sent to Asset Management.

If the inventory item's source is "Other", the system records an Inventory Addition material inventory transaction. If the material is non-Central Office Equipment, the transaction is marked to be sent to Asset Management; otherwise the transaction is marked as not to be sent to Asset Management.

If the inventory item was added successfully, the system displays an appropriate message. The message provides the serial number added (if serialized and generated by the system).

ADD A MACS INVENTORY ITEM

Figure 46:
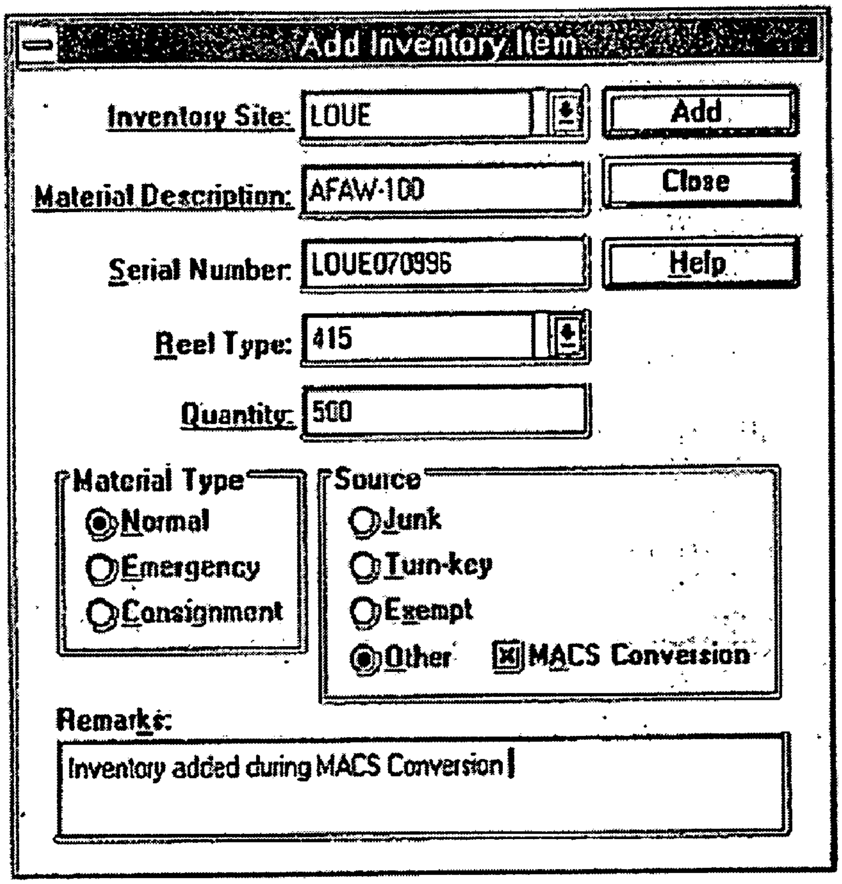
FIG. 46 is an exemplary screen print for Add Inventory Items.

If you are undergoing a MACS conversion, the dialog shown below is displayed after selecting "Add Inventory Item" from the Inventory menu located on the main MATERIALS MANAGEMENT window. This version of the dialog replaces the OK button with an ADD button and the CANCEL button with a CLOSE button. Because you may want to add multiple items during the conversion period, the behavior of the dialog has been modified to remain open after adding an inventory item. (See Fig. 46).

This version of the dialog displays a MACS Conversion check box in the Source frame. To add a MACS inventory item, provide the Inventory Site, Material Description, Serial Number (if serialized), Reel Type (if cable), Quantity, and Material Type as described earlier and then select a Source of "Other" and select the MACS Conversion check box. The MACS Conversion check box is enabled only if a Source of "Other" is selected. It is also recommended that you add a remark indicating that the inventory item is being added as part of the MACS conversion.

You can add a non-MACS inventory item during the conversion period, by not selecting the MACS Conversion check box.

To get additional help while on this dialog, press the HELP button. To close this dialog without adding the inventory item, press the CLOSE button. To add the inventory item, press the ADD button.

RETURN AN INVENTORY ITEM

If an inventory item is damaged or no longer wanted, it may be returned to a BellSouth Telecommunications (BST) warehouse (e.g., BH) or to an outside vendor (e.g., Lucent).

Figure 47:
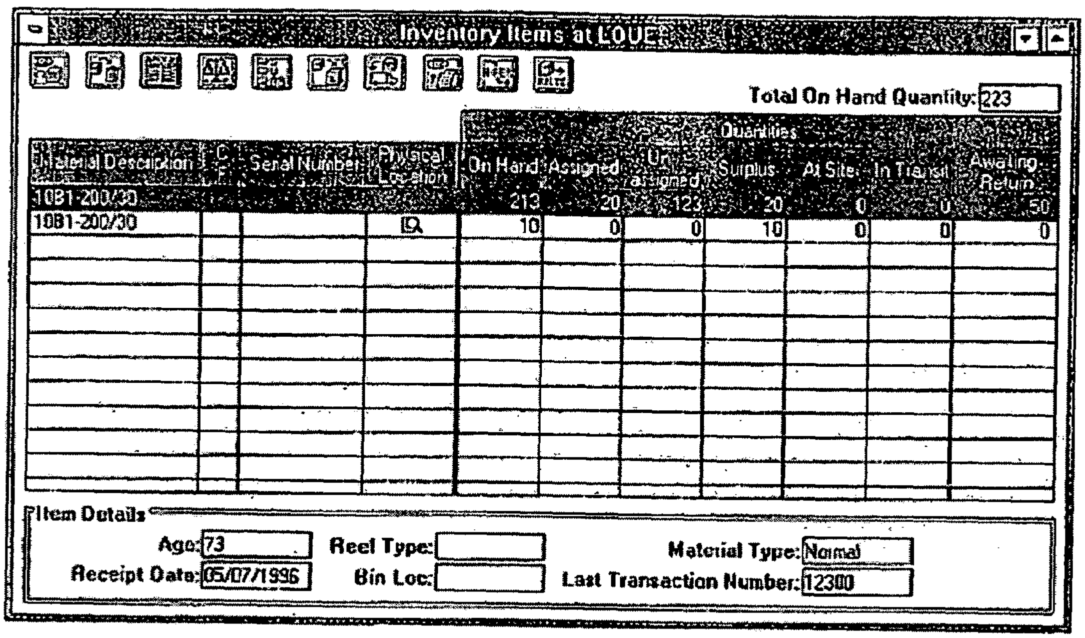
FIG. 47 is another exemplary screen print for Inventory Items.

First, display the INVENTORY ITEMS AT xxxx window, where xxxx is the selected inventory site as previously discussed in the third section of this document. The INVENTORY ITEMS window as shown in Fig. 47 is displayed.

To return an inventory item, select an inventory item from the grid and press the Return toolbar button located on the INVENTORY ITEMS window or select "Return..." from the Actions menu. The RETURN INVENTORY ITEM dialog shown on the following page is displayed. This function is available if the following conditions are met:

You have security access to update inventory in this inventory site.

You are a Materials Management Manager or a Materials Management Clerical user.

Figure 48:
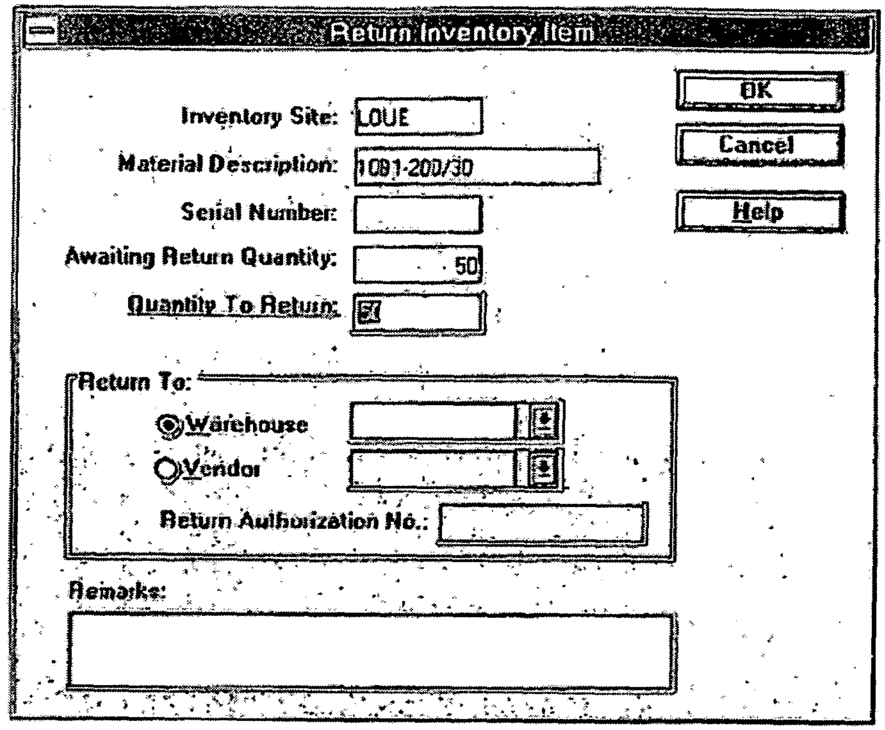
FIG. 48 is an exemplary screen print for Return Inventory Item.

The selected inventory item has an awaiting return inventory balance. (See Fig. 48).

This dialog allows you to return an inventory item to a BST warehouse or to an outside vendor. The following information is displayed about the selected inventory item.

Inventory Site - The name of the inventory site responsible for the inventory item.

Material Description - The material description of the inventory item.

Serial Number - The serial number of the inventory item (if serialized).

Awaiting Return Quantity - The inventory item's current awaiting return balance.

To return the selected inventory item, provide the following information.

Quantity to Return - The quantity to be returned. If the selected inventory item is serialized material, the Quantity to Return is set equal to the on hand balance of the inventory item and cannot be changed. If the selected inventory item is non-serialized material, type the quantity to return in the Quantity to Return text box. The Quantity to Return cannot be greater than the current awaiting return balance, but must be greater than zero.

Return To - The BST warehouse or the outside vendor to which the inventory item is to be returned. To return the inventory item to a BST warehouse, select the Warehouse radio button and type a valid warehouse in the Warehouse combo box or select one from its drop-down list. The drop-down contains a list of all BellSouth warehouses. To return the inventory item to an outside vendor, select the Vendor radio button and type a valid vendor in the Vendor combo box or select one from its drop-down list. The drop-down contains a list of vendors that BellSouth currently uses.

Return Authorization Number - The return authorization number received from the vendor to which the inventory item is being returned. If returning the inventory item to a vendor, you must type the return authorization number in the Return Authorization Number text box. If returning the inventory item to a warehouse, you cannot provide the Return Authorization Number (i.e., the Return Authorization Number text box is disabled). The system generates the return authorization number when returning an inventory item to a warehouse. The format of a system generated return authorization number is OP-n-xxxxx, where n is 1,2, 3, or 4 and xxxxx is a sequential number. To make the return authorization number unique across the region, a number is assigned to each server as the value of n and xxxxx is a sequential number within that server. "1" indicates that the inventory item was returned from Alabama or Georgia. "2" indicates that the inventory item was returned from Louisiana, Mississippi, or Tennessee. "3" indicates that the inventory item was returned from North Carolina, South Carolina, or Kentucky. "4" indicates that the inventory item was returned from Florida.

Remarks - Type in any remarks in the Remarks text box that you wish to have recorded with the Return transaction.

To get additional help while on this dialog, press the HELP button. To close this dialog without returning the inventory item, press the CANCEL button. To close this dialog and return the inventory item, press the OK button. The system displays an appropriate message if the following conditions occur:

If the Quantity to Return is greater than the current awaiting return balance, an error message is displayed. Respond to the message by pressing OK.

If the Quantity to Return is equal to zero, an error message is displayed. Respond to the message by pressing OK.

If you are returning the inventory item to a vendor and did not provide the Return Authorization Number, an error message is displayed. Respond to the message by pressing OK.

If an invalid warehouse or invalid vendor is selected, an error message is displayed. Respond to the message by pressing OK.

If there are no errors found, the system returns the selected inventory item and records a Return material inventory transaction as follows:

The system decreases the awaiting return balance of the inventory item by the Quantity to Return and records a Return material inventory transaction from the awaiting return status. If the inventory item balance reaches a zero, the inventory item is deleted from the system.

If the inventory item is central office equipment, the material inventory transaction created is marked as not to be sent to Asset Management; otherwise it is marked to be sent to Asset Management.

If the inventory item was returned successfully, the system displays an appropriate message and a Material Return Order (RF-1Q10) form is printed (See Attachment 1). The inventory balances shown on the INVENTORY ITEMS window are updated to reflect the results of the Return transaction. The Last Transaction Number text box is updated to reflect the number of the Return transaction created.

To close the INVENTORY ITEMS window, double-click the control box located in the upper left corner of the window.

Attachment 1:

If returning the inventory item to a warehouse, the RF-1010 form should be shipped with the inventory item and a copy kept for your records. If returning the inventory item to a vendor, the RF-1010 form should be kept for your records. The following information is printed on the report:

Originator - The name of the person returning the inventory item. Your Common Userid (CUID) is used to obtain your name.

Date - The current date.

Supervisor's Telephone Number - The telephone number of supervisor responsible for the inventory item.

Request Number - The Return Authorization Number. If returning to a warehouse, it is equal to the return authorization number generated by the system. If returning to a vendor, it is equal to the return authorization number provided by the vendor.

Authority Number - The Requestor Authority Number (RAN) of the inventory site responsible for the inventory item.

RCC - The responsibility code charged for the return (the supervisor's responsibility code).

Geo Loc - The geographical location code of the inventory site responsible for the inventory item.

Comments - The remarks recorded with the Return transaction.

Equipment Description - The material description of the inventory item. If the inventory item is serialized material, its serial number is printed following the description.

PID Number - The product identifier of the material returned.

Quantity - The quantity returned.

RUN AN INVENTORY SCAN

The inventory scan is a real-time "look" at the inventory for which you have responsibility. You may run an inventory scan when it is time to do a physical inventory so that you can compare what the system indicates you have to what is physically on the yard. Or you may run an inventory scan to verify the availability of emergency or consignment material.

Figure 49:
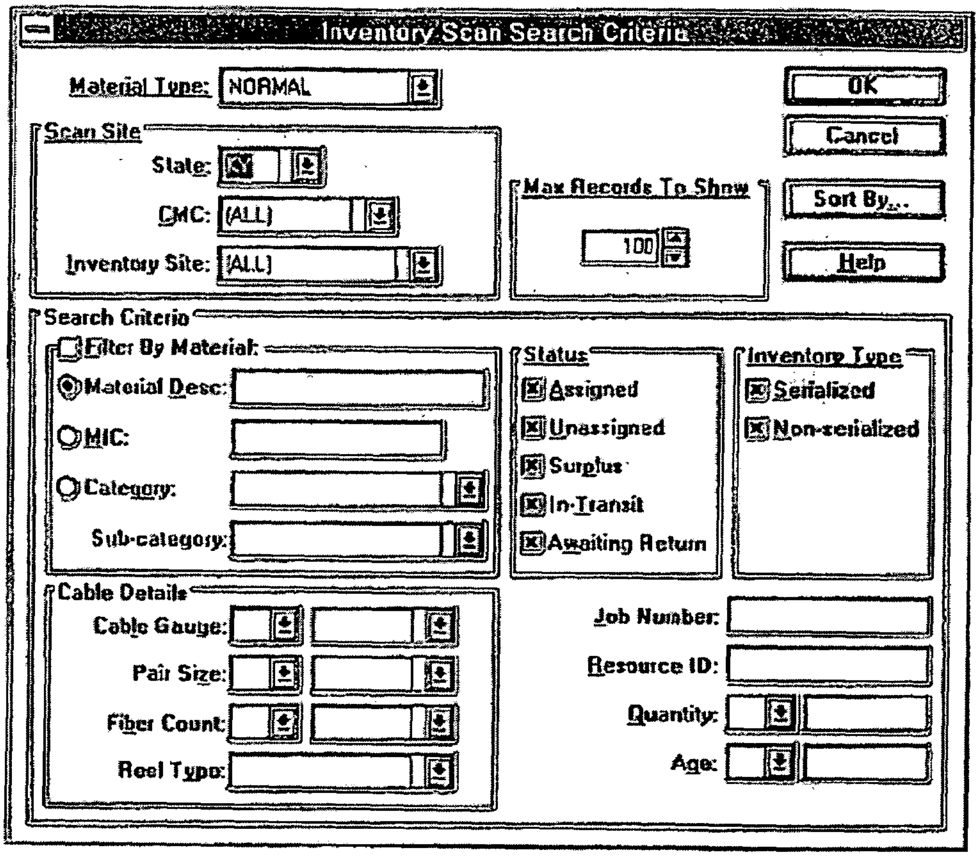
FIG. 49 is an exemplary screen print for Inventory Scan Search Criteria.

To run an inventory scan, press the Inventory Scan toolbar button located on the main MATERIALS MANAGEMENT window or select "Inventory Scan" from the Inventory menu. The INVENTORY SCAN SEARCH CRITERIA dialog shown below is displayed. This function is available at ail times to any Materials Management user. (See Fig. 49).

This dialog allows you to define the search criteria of an inventory scan.

Provide the following information to identify the type of material to search for, the location to search, and the maximum number of inventory items to display.

Material Type - Select the type of material to search for from the Material Type list box or accept the default of "Normal". The type of material you may search for depends on the type of user you are.

Materials Management manager or clerk - You may choose to search for normal, emergency, consignment, or joint-use inventory.

Materials Management warehouse user - You may choose to search for normal, emergency, or consignment inventory.

State - Type a valid state to search in the State combo box or select one from its drop down list. The State combo box defaults to the state you have selected on the PREFERENCES dialog. If you are a Materials Management manager and you want to search all states, select ALL. The states you may search depend on the type of material you have selected to search for and the type of user you are. Security Work-Around: If you a user of the Materials Management application only, you can view inventory in any state. If you are a Materials Management user and a user of another OSPCM application, you can view inventory only in the states to which you have access. Therefore, where this document states that all states, CMCs, or inventory sites are listed, may not apply if you have access to other OSPCM applications besides Materials Management.

Materials Management manager or clerk -

Normal - If searching for normal inventory, the drop down contains a list of all nine states in the BellSouth region.

Consignment - If searching for consignment inventory, the drop down contains a list of states that have warehouse sites.

Emergency - If searching for emergency inventory, the drop down contains a list of states that can store emergency inventory. Emergency inventory can be stored at either an inventory site that is allowed to have emergency material or at a warehouse site.

Joint Use - If searching for normal inventory, the drop down contains a list of all nine states in the BellSouth region.

Materials Management warehouse user -

Normal - If searching for normal inventory, the drop down contains a list of states that have Refurbished Central Office Equipment (RCOE) sites.

Consignment - If searching for consignment inventory, the drop down contains a list of states that have warehouse sites.

Emergency - If searching for emergency inventory, the drop down contains a list of states that have warehouse sites.

CMC - Type a valid CMC to search in the CMC combo box or select one from its drop down list. The CMC combo box defaults to "ALL" indicating that all CMCs for which you have access that can store the specified material type in the specified state are to be searched. The CMCs you may search depend on the type of material you have selected to search for and the type of user you are. Security Work-Around: If you a user of the Materials Management application only, you can view inventory in any CMC. If you are a Materials Management user and a user of another OSPCM application, you can view inventory only in the CMCs to which you have access. Therefore, where this document states that all states, CMCs, or inventory sites are listed, may not apply if you have access to other OSPCM applications besides Materials Management.

Materials Management manager or clerk -

Normal - If searching for normal inventory, the drop down contains a list of all CMCs in the BellSouth region (the state for each CMC listed is also displayed in the drop down).

Consignment - If searching for consignment inventory, the drop down contains a list of CMCs that have warehouse sites.

Emergency - If searching for emergency inventory, the drop down contains a list of the CMCs that can store emergency inventory.

Joint Use - If searching for normal inventory, the drop down contains a list of all CMCs in the BellSouth region.

Materials Management warehouse user -

Normal - If searching for normal inventory, the drop down contains a list of CMCs that have RCOE sites.

Consignment - If searching for consignment inventory, the drop down contains a list of CMCs that have warehouse sites.

Emergency - If searching for emergency inventory, the drop down contains a list of CMCs that have warehouse sites.

Inventory Site - Type a valid inventory site to search in the Inventory Site combo box or select one from its drop down box. The Inventory Site combo box defaults to "ALL" indicating that all inventory sites, warehouse sites, and RCOE sites for which you have access that can store the specified material type in the specified state or CMC are to be searched. The inventory sites you may search depend on the type of material you have selected to search for and the type of user you are. Security Work-Around: If you a user of the Materials Management application only, you can view inventory in any inventory site. If you are a Materials Management user and a user of another OSPCM application, you can view inventory only in the inventory sites to which you have access. Therefore, where this document states that all states, CMCs, or inventory sites are listed, may not apply if you have access to other OSPCM applications besides Materials Management.

Materials Management manager or clerk -

Normal - If searching for normal inventory, the drop down contains a list of all inventory sites and RCOE sites in the BellSouth region (the CMC for each inventory site listed is also displayed in the drop down).

Consignment - If searching for consignment inventory, the drop down contains a list of all warehouse sites in the BellSouth region.

Emergency - If searching for emergency inventory, the drop down contains a list of the inventory sites that can store emergency inventory and all warehouse sites.

Joint Use - If searching for normal inventory, the drop down contains a list of all inventory sites in the BellSouth region.

Materials Management warehouse user -

Normal - If searching for normal inventory, the drop down contains a list of all RCOE. sites in the BellSouth region.

Consignment - If searching for consignment inventory, the drop down contains a list of all warehouse sites in the BellSouth region.

Emergency - If searching for emergency inventory, the drop down contains a list of all warehouse sites in the BellSouth region,

Max Records to Show - This limits the number of inventory items returned by the search and defaults to the maximum number of records last requested. (If you are using this dialog for the first time, the default is 100). You may either decrease or increase this number in increments of 25 or enter your own maximum limit based on your needs at the time. The maximum number of records that may be displayed is 9999.

To define your search criteria by material, check the Filter By Material check box and select either the Material Description, MIC, or Category radio button as follows:

Material Description - If you want to search for inventory items having a specific material description, select the Material Description radio button and type a valid material description in the Material Description text box; otherwise leave it blank. You may type a partial material description using an asterisk (*) to search for inventory items having a material description starting and/or ending with the portion you provided (e.g. AFAW* searches for inventory items having a material description starting with "AFAW"; *100 searches for inventory items having a material description ending in "100"; A* 100 searches for inventory items having a material description starting with "A" and ending in "100"). If a material description is provided, neither a MIC, category, or subcategory may be identified as search criteria.

MIC - If you want to search for inventory items within a specific material item code, select the MIC radio button and type a material item code in the MIC text box; otherwise leave it blank. If a material item code is provided, neither a material description, category, or subcategory may be identified as search criteria.

Category - If you want to search for inventory items within a specific material category, select the Category radio button and type a valid category in the Category combo box or select one from its drop down list; otherwise leave it blank. The drop down contains a list of all valid material categories. If a category is provided, neither a material description or MIC may be identified as search criteria.

Subcategory - If you want to search for inventory items within a specific material subcategory, select the Category radio button and type a valid subcategory in the Subcategory combo box or select one from its drop down list; otherwise leave it blank. The drop down contains a list of all valid material subcategories. If a subcategory is provided, neither a material description or MIC may be identified as search criteria. If the subcategory is provided and the category not provided, the system will populate the Category text box with the category of the subcategory specified.

To define your search criteria by status, provide the following information.

Status - If you want to search for inventory items having a specific inventory status, check or uncheck the appropriate Status check box. By default, all statuses are searched for. To search for assigned inventory items, uncheck all statuses except for the Assigned status. To search for unassigned inventory items, uncheck all statuses except for the Unassigned status. To search for surplus inventory items, uncheck all statuses except the Surplus status. To search for inventory items in transit to another inventory site, uncheck all statuses except the In Transit status. To search for inventory items waiting to be returned, uncheck all statuses except the Awaiting Return status.

To define your search criteria by inventory type provide the following information.

Inventory Type - If you want to search for inventory items of a specific inventory type, check or uncheck the Serialized or Non-Serialized check boxes as appropriate. By default, both serialized and non-serialized inventory is searched for.

To define your search criteria by cable details provide the following information.

Cable Gauge - If you want to search for cable items having a specific cable gauge, select an operator from the Cable Gauge list box and select or type a valid cable gauge from the Cable Gauge combo box. You may choose from the following operators: equal to (=), greater than (>), less than (<), greater than or equal to (>=), or less than or equal to (<=). The second Cable Gauge drop down contains a list of the cable gauges that BellSouth currently uses. If an operator is provided without specifying a cable gauge, the attribute is ignored. If a cable gauge is provided without an operator, the operator defaults to equal to (=).

Pair Size - If you want to search for cable items having a specific pair size, select an operator from the Pair Size list box and select or type a valid pair size from the Pair Size combo box. You may choose from the following operators: equal to (=), greater than (>), less than (<), greater than or equal to (>=), or less than or equal to (<=). The second Pair Size drop down contains a list of the pair sizes that BellSouth currently uses. If an operator is provided without specifying a pair size, the attribute is ignored. If a pair size is provided without an operator, the operator defaults to equal to (=).

Fiber Count - If you want to search for cable items having a specific fiber count, select an operator from the Fiber Count list box and select or type a valid fiber count from the Fiber Count combo box. You may choose from the following operators: equal to (=), greater than (>), less than (<), greater than or equal to (>=), or less than or equal to (<=). The second Fiber Count drop down contains a list of the fiber counts that BellSouth currently uses. If an operator is provided without specifying a fiber count, the attribute is ignored- If a fiber count is provided without an operator, the operator defaults to equal to (=).

Reel Type - If you want to search for cable items stored on a specific reel type, type a valid reel type in the Reel Type combo box or select one from its drop down list. The drop down contains a list of the reel types that BellSouth currently uses.

You may further define your search criteria by providing the following information.

Job Number - If you want to search for inventory items assigned to specific job, type a job authority number in the Job Number text box; otherwise leave it blank.

Res ID - If you want to search for inventory items assigned to a specific resource id, type a resource id in the Res Id text box; otherwise leave it blank.

Quantity - If you want to search for inventory items having a specific inventory balance, select an operator from the Quantity drop down list and type a quantity in the Quantity text box; otherwise leave them both blank. For each inventory item that meets all other criteria, the sum of all statuses selected is compared to the Quantity identified to determine if the current inventory item will be displayed (e.g., If Quantity selected is >= 200 and selected status is Assigned and Unassigned, the system searches for all inventory items whose Assigned Quantity + Unassigned Quantity is >= 200). You may choose from the following operators: greater than or equal to (>=) or less than or equal to (<=). If an operator is provided without specifying a quantity, the attribute is ignored. If a quantity is provided without an operator, the operator defaults to greater than or equal to (>=).

Age - If you want to search for inventory items of a specific age (in days), select an operator from the Age drop down list and type an age in the Age text box; otherwise leave both blank. You may choose from the following operators: greater than or equal to (>=) or less than or equal to (<=). If an operator is provided without specifying an age, the attribute is ignored. If an age is provided without an operator, the operator defaults to greater than or equal to (>=).

Figure 50:
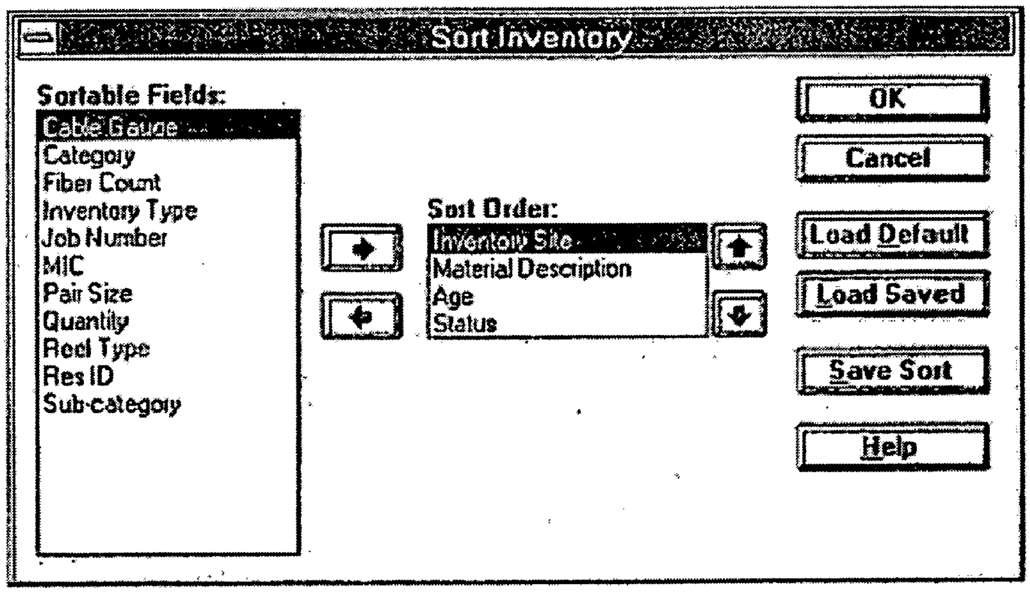
FIG. 50 is an exemplary screen print for Sort Inventory.

To customize the sort order of the inventory scan, press the SORT BY button located on the INVENTORY SCAN SEARCH CRITERIA dialog. The SORT INVENTORY dialog as shown in Fig. 50 is displayed.

This dialog allows you to customize the sort order of the inventory scan. You may sort on a maximum of four (4) fields. Upon display of this dialog, the last saved sort order is displayed in the Sort Order list and a list of fields on which the inventory scan may be sorted, but not currently in the sort order, are listed in the Sortable Fields list. You may use the sort last saved, define a new sort, or use the default sort.

The available sort fields are as follows:

Inventory Site -inventory items will be sorted in alphanumeric order by responsible inventory site;

Material Description -inventory items will be sorted in alphanumeric order by material description;

MIC - inventory items will be sorted in alphanumeric order by material item code;

Res ID - inventory items will be sorted in alphanumeric order by resource id;

Age - inventory items will be sorted in descending numerical sequence by age (oldest inventory items are shown first);

Status - assigned inventory items will be sorted first, unassigned inventory items second, surplus inventory items third, in transit inventory items fourth, and awaiting return inventory items fifth;

Category - inventory items will be sorted in alphanumeric order by category;

Subcategory - inventory items will be sorted in alphanumeric order by subcategory;

Reel Type - inventory items will be sorted in alphanumeric order by reel type;

Fiber Count - inventory items will be sorted in ascending numerical sequence by fiber count;

Pair Size - inventory items will be sorted in ascending numerical sequence by pair size;

Inventory Type - serialized inventory items will be sorted prior to non-serialized inventory items;

Cable Gauge - inventory items will be sorted in ascending numerical sequence by cable gauge;

Job Number - inventory items will be sorted in alphanumeric order by Job Number;

Quantity - inventory items will be sorted in ascending numerical sequence by quantity.

To use the default sort, press the LOAD DEFAULT button. The default sort order is as follows: inventory site, material description, age, and status. To go back to the saved sort, press the LOAD SAVED button.

To identify a new sort, select a field from the Sortable Fields list and press the right arrow button or double-click on the field. The selected field is moved to the Sort Order list. If there are already four fields listed in the Sort Order list, you must first move those fields you don't wish to sort on back to the list of available sort fields. To remove a field from the sort list, select a field from the Sort Order list and press the left arrow button or double-click on the field. The selected field is moved back to the Sortable Fields list. Continue moving fields back and forth until the Sort Order list contains all the fields on which you wish to sort.

The up and down arrows next to the Sort Order list are used to identify the sort order of the selected sort fields. Select a field listed in the Sort Order frame and press the up arrow to move the field up one position in the list. Press the down arrow to move the selected field down one position in the list. Continue moving fields up and down until your sort order has been obtained.

To save the sort order for future inventory scans, press the SAVE SORT button. There is no need to save the default sort as this is always available to you by pressing the LOAD DEFAULT SORT button. If you do save the default sort, you will overwrite the sort order previously saved.

To get additional help while on the SORT INVENTORY dialog, press the HELP button. To close this dialog and not modify the sort order, press the CANCEL button. To close this dialog and modify the sort order, press the OK button.

To get additional help while on the INVENTORY SCAN SEARCH CRITERIA dialog, press the HELP button. To close this dialog without running an inventory scan, press the CANCEL button. To close this dialog and run the inventory scan, press the OK button.

The system displays an appropriate error message under the following conditions. Respond to the error message by pressing OK.

If an invalid state is provided.

If an invalid CMC is provided.

If the CMC provided is not available to be searched due to your user type and the material type you have selected to search for.

If an invalid inventory site is provided.

If the inventory site provided is not available to be searched due to your user type and the material type you have selected to search for.

If an invalid category is provided.

If an invalid subcategory is provided.

If an invalid cable gauge is provided.

If an invalid pair size is provided.

If an invalid fiber count is provided.

If an invalid reel type is provided.

Figure 51:
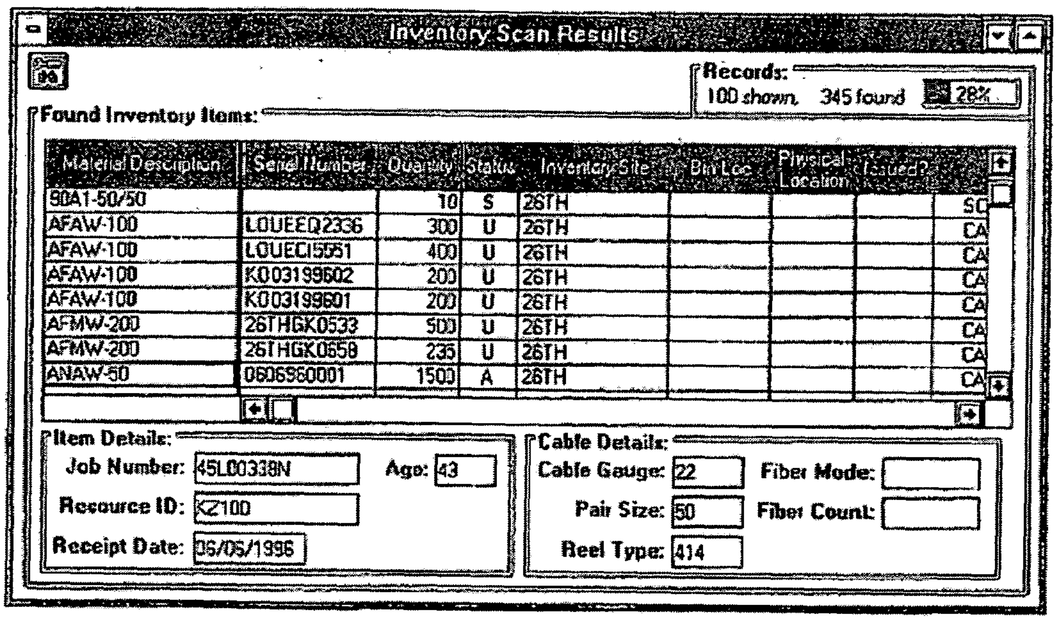
FIG. 51 is an exemplary screen print for Inventory Scan Results.

If there are inventory items that meet your criteria, the INVENTORY SCAN RESULTS window shown below is displayed; otherwise the system displays an appropriate message to indicate that no inventory items were found. Respond to the message by pressing OK. (See Fig. 51).

This dialog displays the results of the inventory scan in the sort order specified. If the inventory item reported on the scan has inventory in more that one status, there is a separate row in the grid for each status. Also, if non-serialized inventory is reported on the scan, there is a separate row in the grid for each group of non-serialized items receipted on different dates or located at different physical locations.

The Records frame displays the number of inventory items shown and the total number of inventory items found.

The Found Inventory Items grid displays the following information about each of the inventory items found:

Material Description - the material description of the inventory item;

Serial Number - the serial number of the inventory item (if serialized);

Quantity - the current inventory balance of the inventory item in the status indicated;

Status - the current inventory status of the inventory item. Possible values are, "A" (assigned), "U" (unassigned), "S" (surplus), "IT" (in transit), and "AW" (awaiting return);

Inventory Site - the inventory site responsible for the inventory item;

Bin Loc - the current bin location of the inventory item;

Physical Location - a glyph here indicates that the inventory item is physically located at an alternate storage location. No glyph means that the inventory item is at the inventory site responsible for the material;

Issued? - an asterisk (*) here indicates that the inventory item has been issued;

MIC - the material item code of the inventory item;

Custom Features (abbreviated CF) - a glyph here indicates that the inventory item has custom features;

Category - the material category of the inventory item;

Subcategory - the material subcategory of the inventory items.

The Items Detail frame displays the following information about the inventory item that has the marquee:

Job Number - the job authority number to which the inventory item is assigned (if status = "A");

Resource ID - the resource id to which the inventory item is assigned (if status = "A");

Receipt Date - the date that the inventory item was receipted into inventory;

Age - the age in days of the inventory item. If the age is greater that 9999 days, asterisks (*) are displayed.

The Cable Details frame displays the following information about the inventory item that has the marquee if that inventory item is cable:

Cable Gauge - the gauge of the cable item;

Pair Size - the pair size of the inventory item (if the inventory item has a pair size);

Reel Type - the type of reel that the cable item is stored on;

Fiber Mode - the fiber mode of the cable item (if fiber cable);

Fiber Count - the fiber count of the cable item (if fiber cable).

VIEW CUSTOM FEATURES

A symbol appears in the Custom Features column (abbreviated CF) if the inventory item found has custom features. To view the custom features, double-click on the symbol or use the arrow keys to move the marquee to it and press ENTER. The CUSTOM FEATURES dialog is displayed. The custom features displayed will vary with the type of inventory item.

Figure 52:
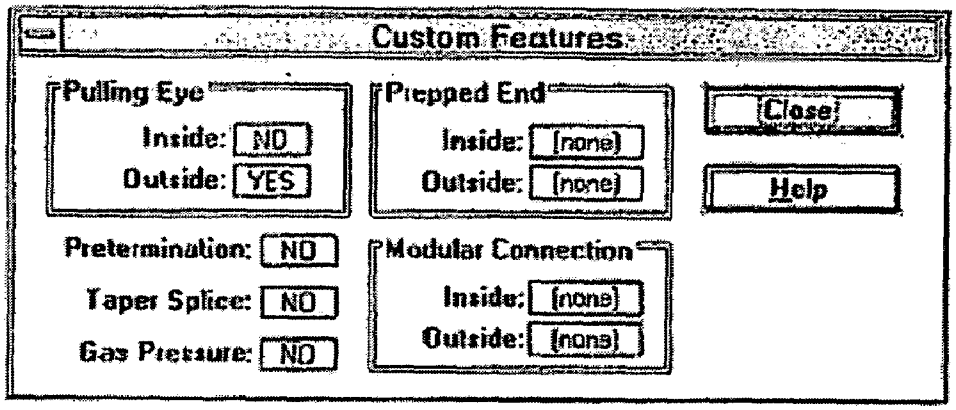
FIG. 52 is an exemplary screen print for Custom Features associated with cable.

If the inventory item selected is cable, the dialog displays the custom features associated with cable as shown below. Information includes whether or not the inventory item has pulling eyes, prepped ends, preterminations, a taper splice, gas pressure, or modular connections. (See Fig. 52).

Figure 53:
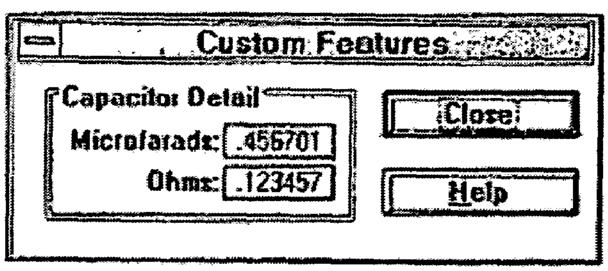
FIG. 53 is an exemplary screen print for Custom Features associated with capacitors.

If the inventory item selected is a capacitor, the dialog displays the custom features associated with capacitors as shown below. Information includes the microfarads and/or ohms of the capacitor. (See Fig. 53).

Figure 54:
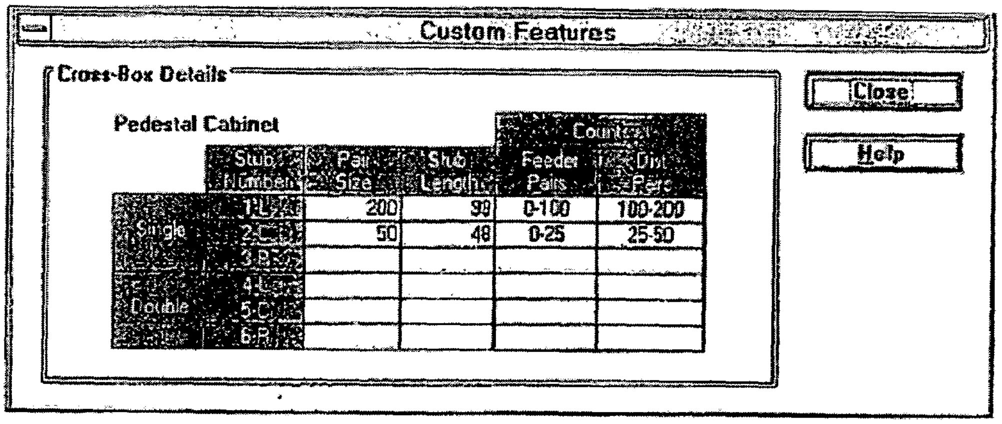
FIG. 54 is an exemplary screen print for Custom Features associated with non-standard pedestal cross-box.

If the inventory item selected is a non-standard pedestal cross-box, the dialog displays its configuration as shown below. Information includes the size and length of each stub and the connections between the feeder pairs and distribution pairs inside the cross-box. (See Fig. 54).

Figure 55:
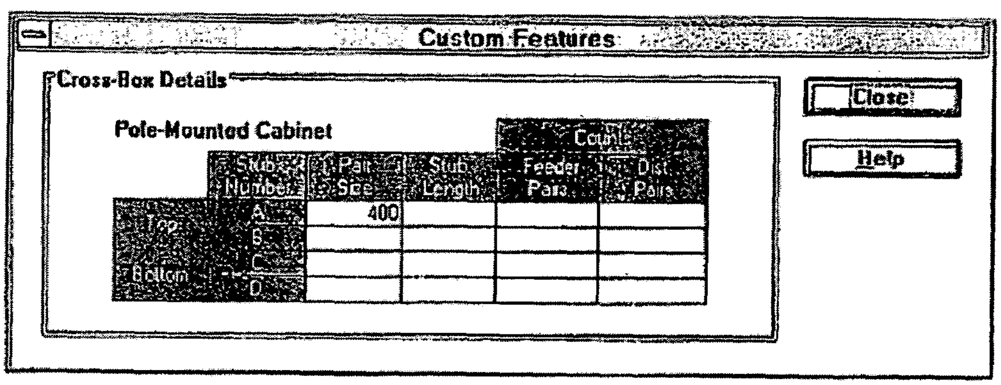
FIG. 55 is an exemplary screen print for Custom Features associated with non-standard pole-mounted cross-box.

If the inventory item selected is a non-standard pole-mounted cross-box, the dialog displays its configuration as shown below. Information includes the size and length of each stub and the connections between the feeder pairs and distribution pairs inside the cross-box. (See Fig. 55).

To get help while on this dialog, press the HELP button. To close this dialog, press the CLOSE button.

VIEW ALTERNATE LOCATION

Figure 56:
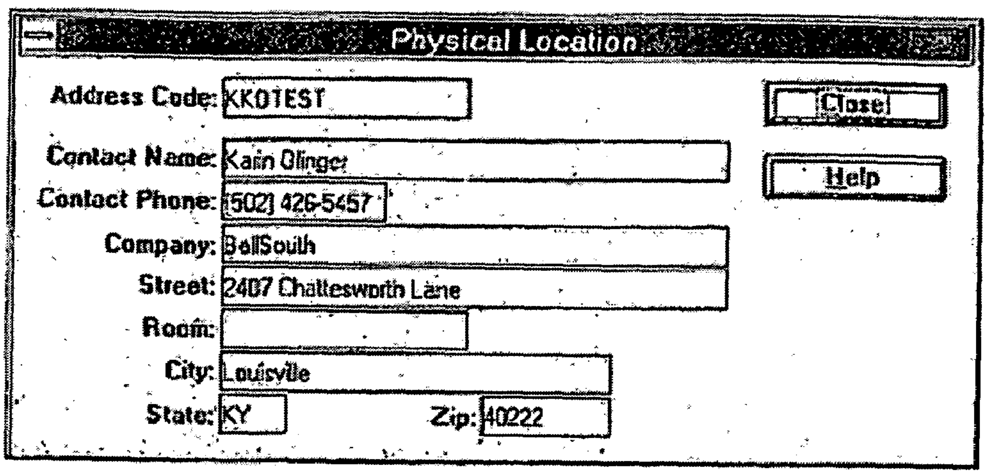
FIG. 56 is an exemplary screen print for Physical Location.

A symbol appears in the Physical Location column if the inventory item is not physically at the inventory site, but rather at an alternate location. To view the address of where the inventory item is located, double-click on this symbol or use the arrow keys to move the marquee to it and press ENTER. The PHYSICAL LOCATION dialog shown below is displayed. (See Fig. 56).

This dialog displays the location of an inventory item that is not physically located at the inventory site responsible for the material. Information includes the name under which this alternate address was saved, the contact name and phone number, company name, street address, room number, city, state, and zip.

To get help while on this dialog, press the HELP button. To close this dialog, press the CLOSE button.

REFINE THE SEARCH CRITERIA FOR THE INVENTORY SCAN

Figure 57:
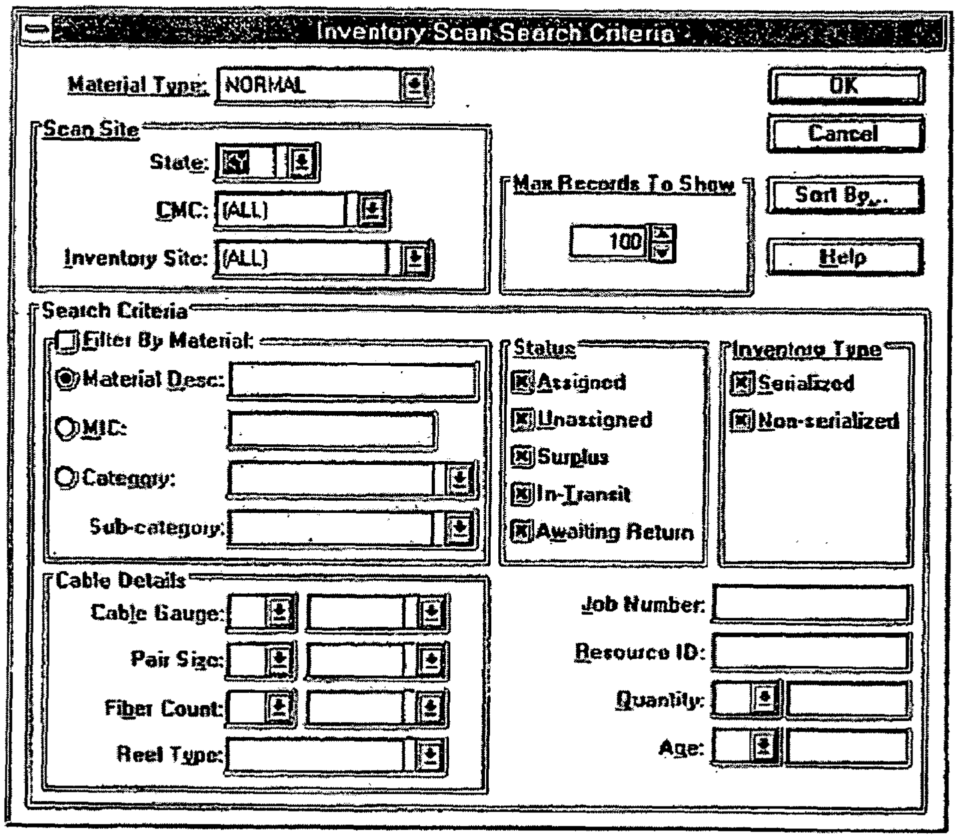
FIG. 57 is an exemplary screen print for Inventory Scan Search Criteria.

To refine the search criteria used to run the inventory scan or to view the search criteria used to run the inventory scan, press the Refine Search Criteria toolbar button located on the INVENTORY SCAN RESULTS window or select "Refine Search Criteria" from the Actions menu. The INVENTORY SCAN SEARCH CRITERIA dialog shown below is displayed. (See Fig. 57).

This dialog is used to define your search criteria as described earlier in this document. It is populated with the search criteria used during the previous scan. You may change the material type, the scan site, the maximum records to show or any of the search criteria previously defined.

To change the sort order press the SORT BY button as described earlier. To run the inventory scan again, press the OK button as described earlier. If you were just viewing the search criteria used to run the scan or don't want to change the criteria, press the CANCEL button.

PRINT AN INVENTORY SCAN

Figure 58:
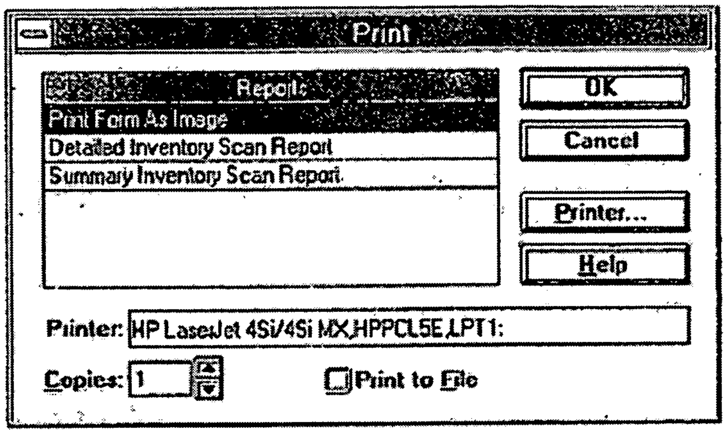
FIG. 58 is an exemplary screen print for Print from Materials Management Window.

To print a report, press the Printer toolbar button located on the main MATERIALS MANAGEMENT window or select "Print..." from the File menu. The PRINT dialog as shown in Fig. 58 is displayed.

Figure 59:
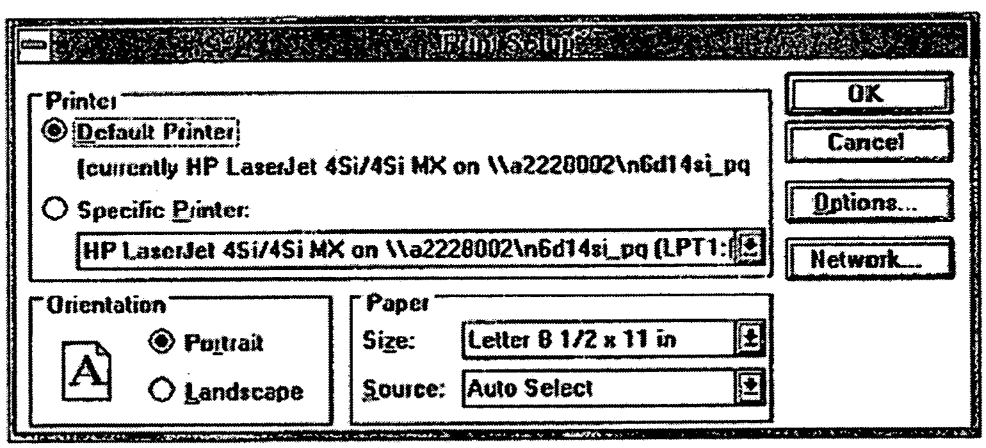
FIG. 59 is an exemplary screen print for Print Setup.

This dialog allows you to print a report. The Reports grid contains a list of the available reports. The Copies text box sets the number of copies to print and defaults to 1. You may decrease or increase this number based on your needs at the time. The Print to File check box allows you to save the report in a file instead of printing it on paper. The Printer text box displays your default printer. To change the printer, press the PRINTER button. The PRINT SETUP dialog as shown in Fig. 59 is displayed.

This is the Microsoft Windows Print Setup dialog that allows you to change your default printer.

To get help while on the PRINT dialog, press the HELP button. To close the dialog without printing, press the CANCEL button.

Figure 60:
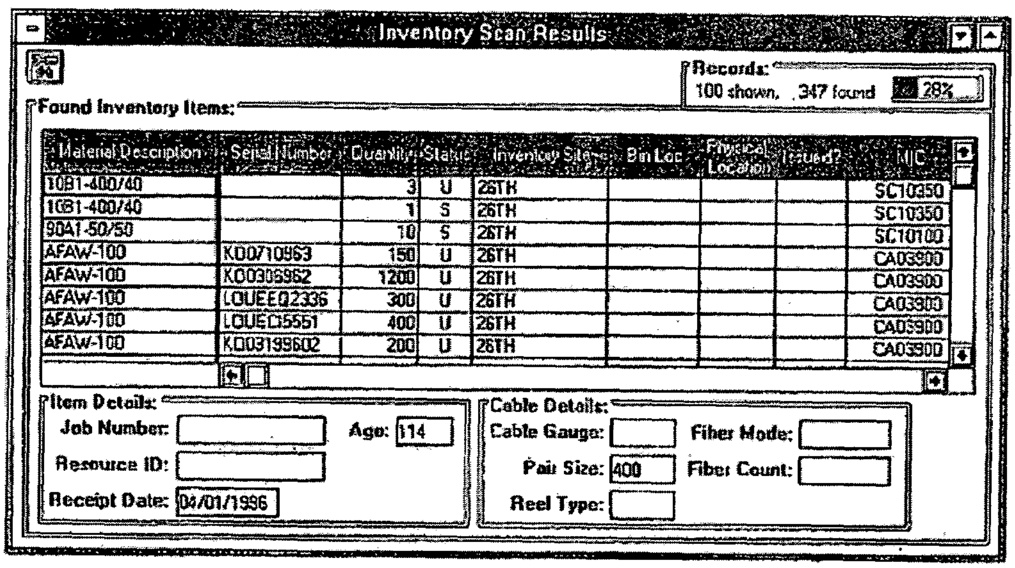
FIG. 60 is an exemplary screen print for Print Form as Image from the Reports grid.

To print a copy of the current window as an image (aka screen print), select Print Form as Image from the Reports grid and press the OK button. An image similar to the one shown in Fig. 60 is generated.

To print an inventory scan summary report, select Summary Inventory Scan Report from the Reports grid and press the OK button. An Inventory Scan Report similar to the one shown below is generated. Data for the report is collected from the current contents of the Found Inventory Items grid on the INVENTORY SCAN RESULTS window.

MP-10310-S INVENTORY SCAN SUMMARY Page 1

By: Karin Olinger (yjlgrqd)
Date: 07/24/1996
Job: MA031SCN
Site:

| MIC | Material Description | Serial Number | Reel Type | Quantity | Bin Loc | Inventory Site | Phys Loc | Job Number | Res ID | Status |
|---|---|---|---|---|---|---|---|---|---|---|
| SC10350 | 10B1-400/40 | | | 3 | | 26TH | | | | U |
| SC10350 | 10B1-400/40 | | | 1 | | 26TH | | | | S |
| SC10100 | 90A1-50/50 | | | 10 | | 26TH | | | | S |
| CA03900 | AFAW-100 | KO0710963 | 415 | 150 | | 26TH | INV | | | U |

To print an inventory scan detail report, select Detailed Inventory Scan Report from the Reports grid and press the OK button. An Inventory Scan report similar to the one shown below is generated. Data for the report is collected from the current contents of the Found Inventory Items grid, the Item Details frame, and the Cable Details frame on the INVENTORY SCAN RESULTS window.

MP-10310-D

INVENTORY SCAN DETAILS

Page 1

By: Karin Olinger (yjlgrqd)
Date: 07/24/1996
Job: MA03ISCN
Site:

| MIC / Pair Size | Material Description / Cable Gauge | Serial Number / Fiber Count | Reel Type / Fiber Mode | Quantity / Age | Bin Loc | Inventory Site / Phys Loc | Job Number / Custom Features | Res ID | Status |
|---|---|---|---|---|---|---|---|---|---|
| SC10350 | 10B1-400/40 | | | 3 | | 26TH | | | U |
| 400 | 0 | 0 | | 114 | | | | | |
| SC10350 | 10B1-400/40 | | | 1 | | 26TH | | | S |
| 400 | 0 | 0 | | 114 | | | | | |
| SC10100 | 90A1-50/50 | | | 10 | | 26TH | | | S |
| 50 | 0 | 0 | | 69 | | | | | |
| CA03900 | AFAW-100 | KO0710963 | 415 | 150 | | 26TH | | | U |
| 100 | 22 | 0 | | 1 | | INV | | | |

Figure 61:
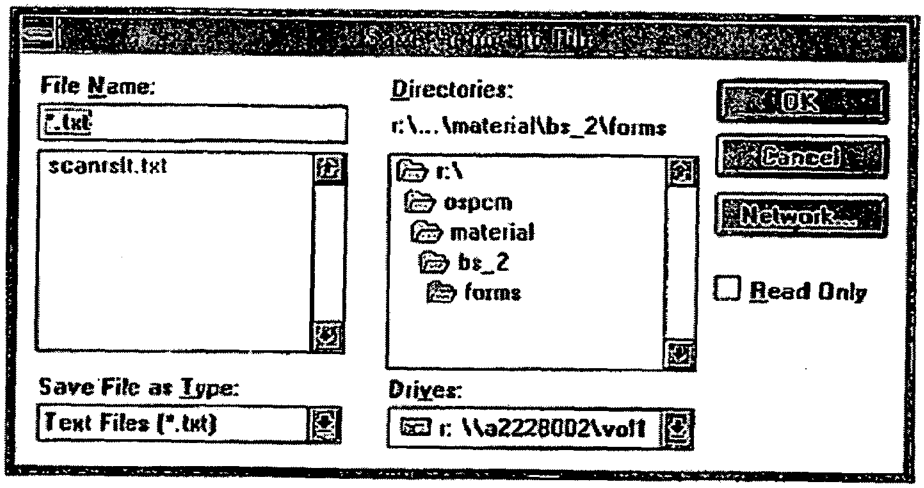
FIG. 61 is an exemplary screen print for Save Report to File.

If the Print to File check box is checked when you press OK, the SAVE REPORT to FILE dialog ashown in Fig. 61 is displayed.

This dialog allows you to identify where you would like to save the report. Select a drive and directory, then specify a file name for the report. Press OK to save the report in the specified file.

SATISFY MATERIAL REQUIREMENT WITH EMERGENCY MATERIAL

On occasion, a job may need to have a material requirement satisfied prior to its scheduled order date. One way of satisfying the requirement is to obtain emergency material from one of thirteen emergency warehouse sites or from an inventory site that stores emergency material.

Select a button from the toolbar located on the main MATERIALS MANAGEMENT window or select "Show a Job's Requirement's" from the Requirements menu and then select "Needed" to view the requirements for a specific job that are in a needed status. See Business Solution I Overview Document (BS1OVER.DOC) for a detailed description.

Figure 62:
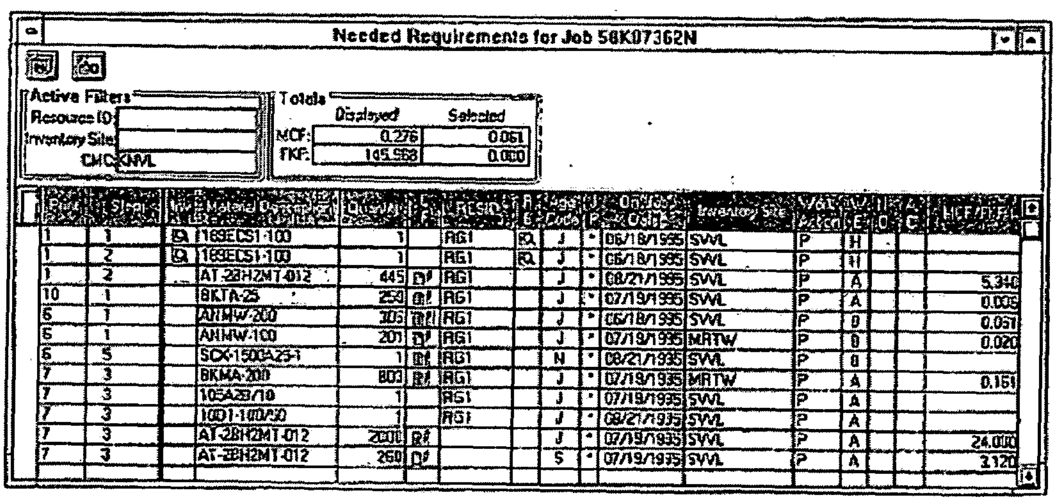
FIG. 62 is an exemplary screen print for Needed Requirement for Job.

After identifying the job, the NEEDED REQUIREMENTS FOR JOB xxxx window as shown in Fig. 62 is displayed, where xxxx is the selected job number.

This window displays the selected job's needed requirements (i.e., those requirements that have not been completely satisfied). The following information is displayed for each requirement:

Print - the job print for which the requirement is needed.

Step - the job step for which the requirement is needed.

Inv. - a glyph here indicates that the inventory site where the requirement is needed has inventory that could be used to satisfy the material requirement.

Material Description - the description of the material needed.

Quantity - the remaining quantity needed to satisfy the requirement.

Custom Features (abbreviated CF) - a glyph here indicates that custom features (e.g., inside pulling eye) are needed on the required material. Double-click this glyph to view the custom features.

RESID - the resource id responsible for the work;

Roadblocks (abbreviated RB) - a glyph here indicates that roadblocks (critical or non-critical) exist that may delay the work. Double-click this glyph to view the roadblocks.

Aggregation Code - a code indicating at what level the requirement may be aggregated. A "J" indicates that the requirement may be aggregated across the job. An "S" indicates that the requirement may be aggregated within the step. An "N" indicates that the requirement may not be aggregated.

Jeopardy (abbreviated JP) - an asterisk (*) here indicates that if the requirement is satisfied with a new order, the material may not be delivered by the on job date because the shipping interval is too long;

On Job Date - the date the material is needed on the job;

Inventory Site - the name of the inventory site responsible for procuring the material;

Work Action - the type of work for which the material is needed;

Work Environment (abbreviated WE) - the work environment for which the material is needed;

Not Orderable (abbreviated NO) - an asterisk (*) here indicates that the material needed is not orderable because the material description has been end-dated;

Assembly Code (AC) - a code indicating that the material needed is part of an assembled item;

MCF/FKF - the million conductor feet of copper cable needed or the fiber kilo feet of fiber cable needed.

Figure 63:
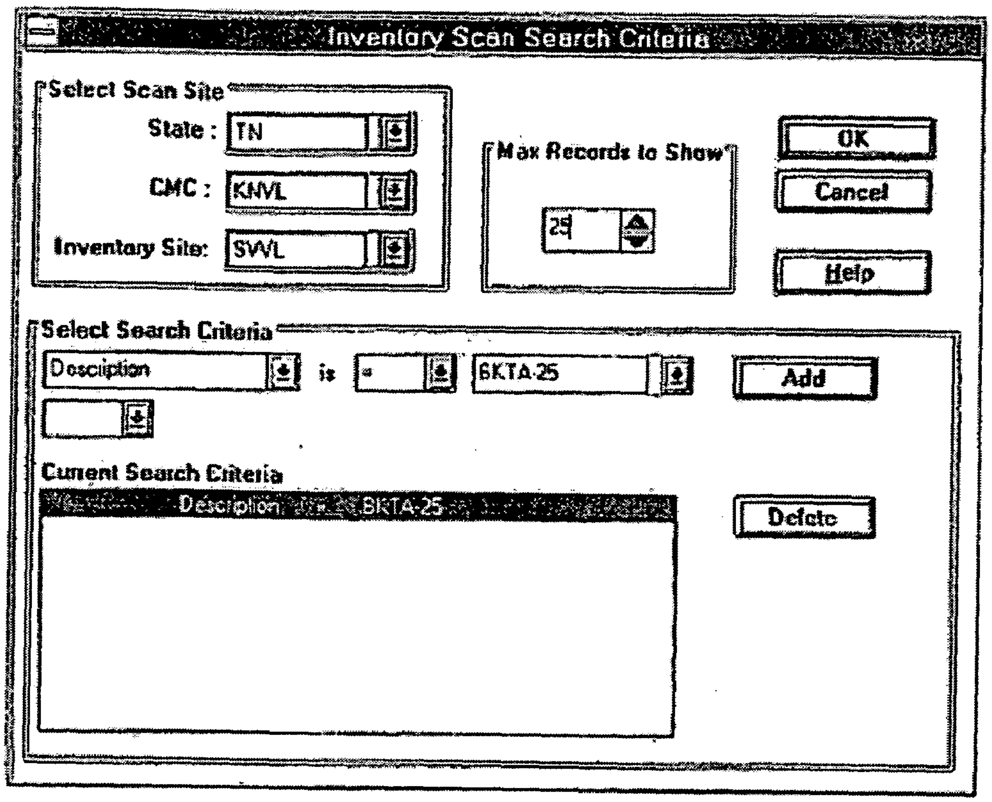
FIG. 63 is another exemplary screen print for Inventory Scan Search Criteria.

To satisfy the requirement with emergency material, select a requirement from the grid and press the Inventory Scan toolbar button located on the NEEDED REQUIREMENTS window or select "Satisfy Requirements with Existing Inventory" from the Requirements menu. The system displays an error message if you select more than one requirement. Respond to the error message by pressing YES if you want the system to deselect all but the first requirement selected and continue or press NO if you don't want to continue. If a single requirement is selected or you pressed YES in response to the error message, the INVENTORY SCAN SEARCH CRITERIA dialog as shown in Fig. 63 is displayed.

This dialog allows you to define the search criteria of an inventory scan to search for inventory that could be used to satisfy a material requirement.

Provide the following information to identify the type of material to search for, the location to search, and the maximum number of inventory items to display.

Material Type - the type of material to search for. Select "Emergency" to search for emergency material.

State - type a valid state to search in the State combo box or select one from its down list. The drop down contains a list of the states that are currently responsible for emergency inventory. Emergency inventory can be stored at either a warehouse site or at a normal inventory site. If a state is not provided, you must indicate the Construction Management Center (CMC) or inventory site to search. If the state is not valid (i.e., not in the list), the system displays an appropriate error message. Respond to the message by pressing OK.

CMC - type a valid CMC to search in the CMC combo box or select one from its drop down list. The drop down contains a list of all CMCs that are currently responsible for emergency inventory or a list of all CMCs that are responsible for Emergency inventory in the specified state. If a CMC is not provided, you must indicate the state or inventory site to search. If state is provided the CMC combo box defaults to "ALL" indicating that all CMCs having responsibility for emergency material in the specified state are to be searched. If the CMC is not valid (i.e., not in the list), the system displays an appropriate error message. Respond to the message by pressing OK.

Inventory Site - type a valid inventory site to search in the Inventory Site combo box or select one from its drop down box. The drop down contains a list of the inventory sites and warehouse sites that are currently responsible for emergency inventory or a list of all inventory sites and warehouse sites that are responsible for emergency inventory in the specified state. If an inventory site is not provided, you must indicate the state or CMC to search. If the state or CMC is provided, the Inventory Site combo box defaults to "ALL" indicating that all inventory sites and warehouse sites having responsibility for emergency material in the specified state or CMC are to be searched.

Max Records to Show - this limits the number of inventory items returned by the search and defaults to the maximum number of records last requested (If you are using this dialog for the first time, the default is 25). You may either decrease or increase this number in increments of 5 based on your needs at the time. The maximum number of records that may be displayed is 999.

At least one criteria must be specified before an inventory scan may be initiated. Three list boxes and one combo box are available to help you build the search criteria:

an Attribute list box,
an Operator list box;
a Value combo box, and
a Conjunction list box.

Each list box or combo box has a dropdown list containing items from which to choose and the selected item affects the choices available in subsequent dropdown lists. A description of each list box or combo box, its values, and its default value follows.

The first list box allows you to choose the attribute on which you would like to search. Available items in the dropdown list are:

Material Description
Category
Subcategory
Cable Gauge
Pair Size
Fiber Count

Choose "Material Description" if you want to search for inventory items having the same material description as the requirement that you are trying to satisfy. When you choose the Description attribute, the only item in the dropdown list of the Operator list box is the "=" and the only item in the dropdown list of the Value combo box is the material description of the selected requirement. If the Description attribute is chosen as part of the search criteria, no other criteria is allowed. The description attribute is the default value of the Attribute box.

Choose "Category" if you want to search for inventory items of the same material category as the requirement that you are trying to satisfy. When you choose the Category attribute, the only item in the dropdown list of the Operator box is "=" and the only item in the dropdown list of the Value combo box is the material category of the selected requirement.

Choose "Subcategory" if you want to search for inventory items of the same or of a different subcategory than the subcategory of the requirement that you are trying to satisfy. However, the subcategory must be in the same category as the selected requirement. When you choose the Subcategory attribute, the only item in the dropdown list of the Operator list box is "=" and the dropdown list of the Value combo box lists the valid subcategories on the same category as the selected requirement.

Choose "Cable Gauge" if you want to search for inventory items having a cable gauge greater than or equal to the cable gauge of the requirement that you are trying to satisfy. This choice is only available if the selected requirement is for copper cable or a stub. When you choose the Cable Gauge attribute, the items in the dropdown list of the Operator list box are "=" and ">=" and the items in the dropdown box list of the Value combo box are 19, 22, 24, and 26.

Choose "Pair Size" if you want to search for inventory items having a pair size greater than or equal to the pair size of the requirement that you are trying to satisfy. This choice is only available of the requirement is for copper cable, a stub, or a terminal. When you choose the Pair Size attribute, the items in the dropdown list of the Operator list box are "=" and ">=" and the items in the dropdown list of the Value combo box are the pair sized that BellSouth currently uses.

Choose "Fiber Count" if you want to search for inventory items having a fiber count greater than or equal to the fiber count of the requirement that you are trying to satisfy. This choice is only available of the requirement is for fiber cable. When you choose the Fiber Count attribute, the items in the dropdown list of the Operator list box are "=" and ">=" and the items in the dropdown list of the Value combo box are the fiber counts that BellSouth currently uses.

To build your search criteria, choose values from the dropdown lists and press the ADD button. As the criteria are built, they are displayed in the Current Search Criteria list box. To add additional criteria, select "AND" or "OR" from the Conjunction list box, specify your next criteria and press the ADD button. To group criteria, select "AND" or "OR" from the Conjunction list box and press the ADD button. The conjunction appears on a line by itself. The criteria above the conjunction are grouped together and the criteria below the conjunction are grouped together. For example, the criteria (Subcategory = 'SS-AIR-CORE' AND Pair Size = 150) OR (SubCategory = 'DUCT PIC' AND Pair Size = 300) should be represented as:

Subcategory = SS-AIR-CORE
AND Pair Size = 150
OR
Subcategory = DUCT PIC
AND Pair Size = 300

To change the search criteria, select a line from the Current Search Criteria list box. The selected criteria are populated in the corresponding list boxes and the ADD button is changed to an UPDATE button. Make the necessary changes in the list boxes and press the UPDATE button. You can discard any changes by simply selecting another line in the Current Search Criteria text box before pressing the UPDATE button. After making the update, the cursor moves to the next empty row in the Current Search Criteria list box and the UPDATE button reverts back to an ADD button. Continue adding criteria or select another one to update. You may delete criteria by selecting a line from the Current Search Criteria list box and pressing the DELETE button.

To get help while on this dialog, press the HELP button. To close this dialog without initiating an inventory scan, press the CANCEL button. To close this dialog and initiate an inventory scan, press the OK button.

The Inventory Scan searches for emergency inventory items that meet the specified criteria and if the requirement is for cable, has an inventory balance greater than or equal to the quantity needed or if the requirement is for non-cable, has an inventory balance greater than zero.

When the scan completes, the INVENTORY SCAN RESULTS window as shown in Fig. 64 is displayed.

This window displays the results of the inventory scan from which you may make assignments or transfer requests to satisfy a material requirement. The Requirements grid displays the material requirement selected from the MATERIAL REQUIREMENTS window followed by other requirements from that window which have the same material description and are needed in the same inventory site as the selected requirement.

The Found Inventory Items grid displays the following information about each of the emergency inventory items found:

Material Description - the material description of the inventory item.

Serial Number - the serial number of the inventory item (if serialized).

Quantity - the current Inventory balance of the inventory item in the status indicated.

Status - the current inventory status of the inventory item. For an emergency inventory item, this is always "unassigned."

Custom Features (abbreviated CF) - a glyph here indicates that the inventory item has custom features. Double-click the glyph or uses the arrow keys to move the marquee to it and press ENTER to view the custom features.

Job - the job authority to which the inventory item is assigned. Since emergency material is unassigned inventory, this column is always blank.

Inventory Site - the name of the inventory site or warehouse site responsible for the inventory item.

Physical Location - a glyph here indicates that the inventory item is physically located at an alternate address. Double-click the glyph or use the arrow keys to move the marquee to it and press ENTER to view the address.

Age -the age of the inventory item in days. If the age of the inventory item is greater than 9999 days, asterisks (*) will appear in this field.

Emergency inventory items found in the inventory site where the requirement is needed appear first in the list sorted first by material description and then by age (oldest first). These are followed by the inventory items found in another inventory site or warehouse site sorted first by material description and then by age (oldest first).

The Records frame displays the number of inventory items shown and the total number of inventory items found, the Scan Site frame displays the location that was searched, and the Search Criteria frame displays the search criteria that was used during the inventory scan.

ASSIGN AN INVENTORY ITEM

Inventory found in an inventory site where the requirement is needed may be assigned immediately to the requirement. Select an inventory item that you wish to assign and select the requirement to which you would like to make the assignment. You may make one assignment at a time. Type any remarks in the Remarks text box that you wish to have recorded with the Assignment transaction.

To satisfy the selected requirement with an assignment, press the Assignment toolbar button located on the INVENTORY SCAN RESULTS window or select "Assign Item to Requirement" from the Actions menu. The system displays an error message if you try to assign an inventory item located in a different inventory site from where the requirement is needed, if you try to assign inventory item to a requirement whose needed quantity is zero, or if you try to assign an inventory item whose balance is zero.

The inventory item selected is assigned to the requirement selected to be satisfied. Only the quantity needed is assigned; any remaining quantity stays in its original status. If assigning an inventory item that has an outstanding transfer request, the system automatically rejects the associated transfer request and puts the requirement for which the request was made back in a "needed" status. This is an inventory item that has been requested by another inventory site. If the material is Central Office Equipment, form 8010 is printed (see Attachment 1) to move the material from the 1220.1412 (Material Held for Future Use) account to the Field Reporting Code (FRC) and Geographic Location Code (GLC) of the requirement to which it is assigned.

As assignments are made on the Inventory Scan Results window, the needed quantity in the Requirements grid is decreased by the quantity assigned. When a requirement is completely satisfied (needed quantity drops to zero), a check mark appears beside the requirement. Likewise, as inventory items are used to satisfy requirements, the inventory balance in the Found Inventory Items grid decreases by the quantity assigned. Once an inventory item is completely depleted (balance drops to zero), the inventory item can no longer be assigned. NOTE: The inventory balance does not actually decrease, it just changes status. The decrease is shown to visually indicate that the inventory item has been set aside for a particular job.

REQUEST A TRANSFER OF AN INVENTORY ITEM

Inventory found in an inventory site other than where the requirement is needed or found at a warehouse site must first be transferred to the inventory site where it is needed. Select the inventory item that you wish to have transferred and select the requirement to which you would like the inventory assigned once the material has been transferred and received. Type in any remark in the Remarks text box that you wish to have recorded with the transfer request.

 To satisfy the selected requirement with a transfer request, press the Transfer Request toolbar button located on the INVENTORY SCAN RESULTS window or select "Request Transfer" from the Actions menu. The system displays an error message if you request a transfer of an inventory item located in the same inventory site where the requirement is needed, if you request a transfer of an inventory item whose balance is zero, or if you request a transfer of an inventory item that is already requested for the selected requirement.

A transfer request for the material is created and the requirement that will be satisfied via the transfer is put into a "transfer requested" status. No further action is required of the requestor until it is time to receipt the material. The transfer is approved or rejected by the inventory site or warehouse site to which the request is made. See the overview document for Business Solution II (BS2OVER.DOC) for details on how to approve or reject a transfer request and how to receipt transferred material.

As transfer requests are made, the needed quantity in the Requirements grid is decreased by the quantity requested to be transferred. When a requirement is completely satisfied (needed quantity drops to zero), a check mark appears beside the requirement. Likewise, as inventory items are used to satisfy requirements, the inventory balance in the Found Inventory Items grid decreases by the quantity requested to be transferred. Once an inventory item is completely depleted (balance drops to zero), the inventory item can no longer be requested to be transferred. NOTE: The inventory balance does not actually decrease, it just changes status. The decrease is shown to visually indicate that the inventory item has been set aside for a particular job.

To close the INVENTORY SCAN RESULTS window, double-click the control box located in the upper left-hand corner of the window.

SPLIT A REEL OF CABLE

Splitting a reel means that you are taking cable off one reel and putting it on a new reel or hand coil.

Figure 65:
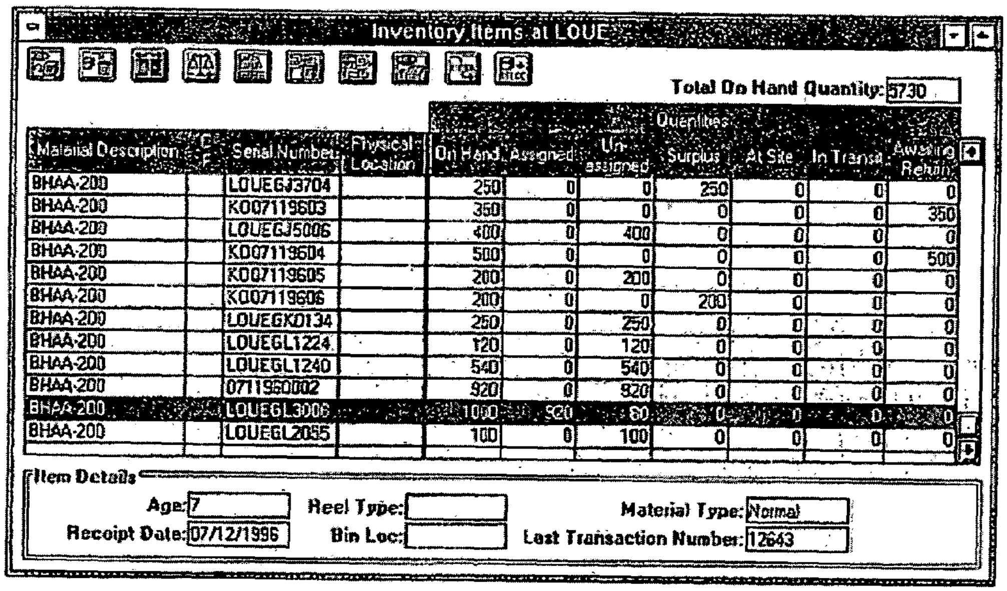
FIG. 65 is another exemplary screen print for Inventory Items.

First, display the INVENTORY ITEMS T xxxx window, where xxxx is the selected inventory site a previously discussed in the third section of this document. The INVENTORY ITEMS window as shown in Fig. 65.

To split a reel, select an inventory item and press the Split Reel toolbar button located on the INVENTORY ITEMS window or select "Split a Reel" from the Actions menu. The SPLIT A REEL dialog shown on the following page is displayed. This function is available if the following conditions are met:

You have security access to update inventory in this inventory site.

You are a Materials Management Manager or a Materials Management Clerical user.

The selected inventory item is cable.

The selected inventory has not been issued (at site balance =0).

The selected inventory item does not have an awaiting return or in transit balance.

Figure 66:
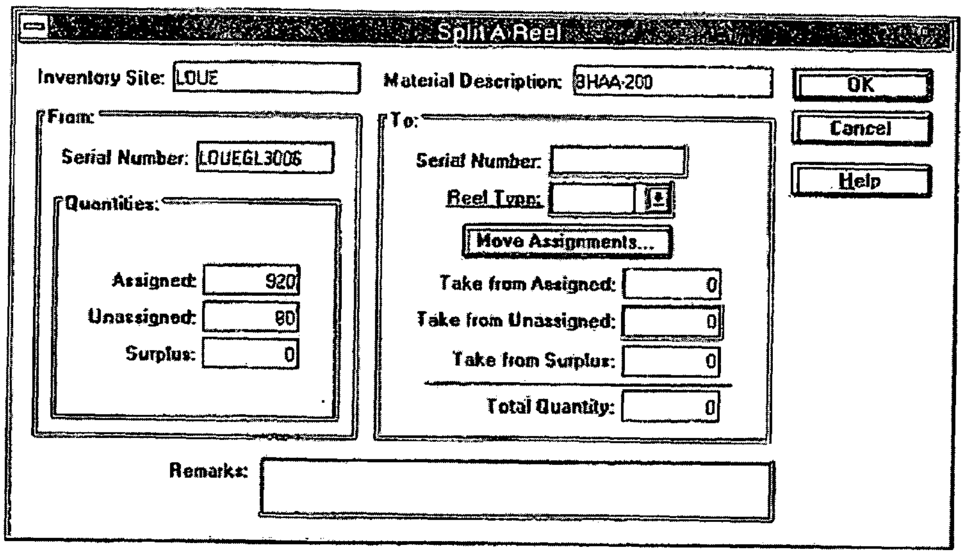
FIG. 66 is an exemplary screen print for Split a Reel.

The selected inventory item does not have custom features. (See Fig. 66).

This dialog allows you to split a reel of cable. The following information is displayed about the selected reel:

Inventory Site - the name of the inventory site responsible for the reel.

Material Description - the description of the material on the reel.

The From frame displays the following information about the reel from which the cable is to be split:

Serial Number - the serial number of the reel.

Assigned - the current assigned balance on the reel.

Unassigned - the current unassigned balance on the reel.

Surplus - the current surplus balance on the reel.

To split the selected reel, provide the following information:

Serial Number - the serial number to split the material to. Type the serial number of the new reel in the Serial Number text box located in the To frame or leave this field blank and enter "HC" (hand coil) in the Reel Type combo box to have the system generate a serial number. The format of a system generated serial number is the first four non-blank characters of the inventory site to which you are adding the inventory item plus a 1 character month (represented as A-L, where "A" represents January and "L" represents December) plus a 1 character hour (represented as A-X, where "A" represents hour 0 (midnight) and "X" represents hour 23) plus a 2 character minute plus a 2 character second. For example, ROMMAN2023 would mean that the serial number was created in an inventory site called ROMM in January at 1:20:32 PM. If the generated serial number already exists, the system increases the value by 1 until it generates a unique serial number.

Reel Type - the reel type of the serial number to split the material to. Type a valid reel type in the Reel Type text box located in the To frame or select one from its drop-down list. If the serial number is not provided and the reel type is "HC", the system will generate a serial number. If the reel is not valid (i.e., not in the list), the system displays an appropriate error message when you leave this field. Respond to the message by pressing OK.

Figure 67:
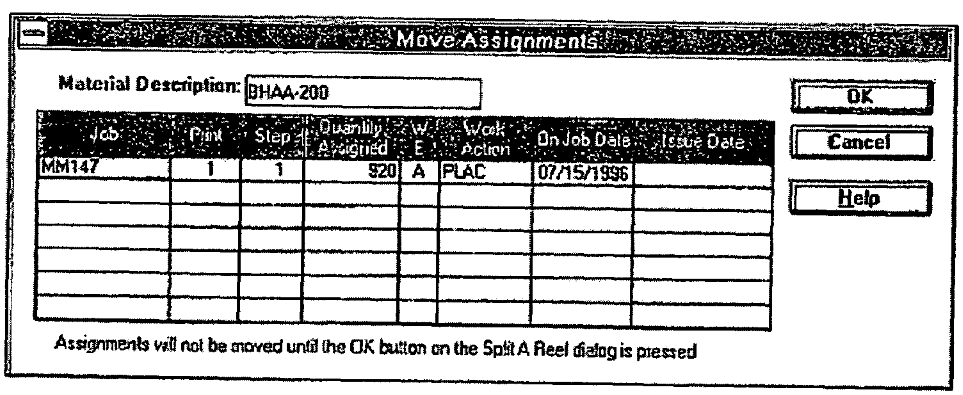
FIG. 67 is an exemplary screen print for Move Assignments.

Take from Assigned - the quantity to split from the assigned inventory balance. You cannot type directly in this text box because you must first indicate which assignments you want to move to the new reel. To split from the assigned balance, press the Move Assignments button. The MOVE ASSIGNMENTS dialog shown in Fig. 67 is displayed. If the selected inventory item does not have an assigned balance, the Move Assignments button is not displayed.

This dialog allows you to move the selected assignments from the current reel to a new reel. The description of the material is displayed in the Material Description text box above the grid and the following information is displayed about each requirement to which the reel is assigned.

Job - the job to which the reel is assigned.

Print - the job print to which the reel is assigned.

Step - the job step to which the reel is assigned.

Quantity Assigned - the quantity on the reel that is assigned to this requirement.

Work Environment (abbreviated WE) - the work environment for which the material is needed.

Work Action - the type of work for which the material is needed.

On Job Date - the date the material is needed on the job.

Issue Date - the date the reel was issued. Since you cannot split an issued reel of cable, this column is always blank.

To get additional help while on the MOVE ASSIGNMENTS dialog, press the HELP button. To close this dialog without moving assignments, press the CANCEL button. To close this dialog and indicate the assignments to move, select the requirements that you want to assign to the new reel and press the OK button. The assignments will not actually be released until the OK button is pressed on the SPLIT A REEL window. If no requirements are selected, an error message is displayed. Respond to the message by pressing OK.

If no errors are found, the system populates the quantity to split in the Take from Assigned text box on the SPLIT A REEL window and the quantity in the Total Quantity text box increases by the same amount.

Take from Unassigned - the quantity to split from the unassigned inventory balance. Type the quantity that you want to split from the unassigned balance in the Take from Unassigned box. There is no default. The quantity entered cannot be greater than the current unassigned balance, but must be greater than zero. The quantity in the Total Quantity text box increases by the quantity entered. If the selected inventory item does not have an unassigned balance, you cannot split from the unassigned balance (i.e., the Take from Unassigned text box is disabled).

Take from Surplus - the quantity to split from the surplus inventory balance. Type the quantity that you want to split from the surplus balance in the Take from Surplus text box. There is no default. The quantity entered cannot be greater than the current surplus balance, but must be greater than zero. The quantity in the Total Quantity text box increases by the quantity entered. If the selected inventory item does not have a surplus balance, you cannot split from the surplus balance (i.e., the Take from Surplus text box is disabled).

Remarks - type in any remarks in the Remarks text box that you wish to have recorded with the Split a Reel Transaction.

To get additional help while on this dialog, press the HELP button. To close this dialog without splitting the reel, press the CANCEL button. To close this dialog and split the reel, press the OK button. The system displays an appropriate message if any of the following conditions occur:

If the total quantity to be split is equal to zero, the system displays an appropriate error message. Respond to the message by pressing OK.

If the quantity in the Take From Unassigned text box is greater than the current unassigned balance or if the quantity in the Take From Surplus text box is greater then the current surplus balance, the system displays an appropriate error message. Respond to the message by pressing OK.

If you entered a serial number, the system checks to see if that serial number already exists in this Construction Management Center (CMC). If it does, the system displays an appropriate error message. Respond to the message by pressing OK.

If there are no errors found, the system creates a new inventory item using the serial number you provided or, if the serial number was left blank and "HC" was provided as the reel type, the system creates a new inventory item using a system generated serial number, and records a Split a Reel material inventory transaction as follows: Multiple transactions are created if you split from more than one status.

If you are splitting unassigned inventory, the system decreases the unassigned balance on the old reel, creates an unassigned balance on the new reel for the quantity split, and records a Split a Reel material inventory transaction from the unassigned status to an unassigned status. If you split the entire inventory balance of the old reel to a new reel, the old reel is deleted from the system.

If you are splitting surplus inventory, the system decreases the surplus balance on the old reel, creates an unassigned balance on the new reel for the quantity split, and records a Split a Reel material inventory transaction from the surplus status to the unassigned status. If you split the entire inventory balance of the old reel to a new reel, the old reel is deleted from the system.

If you are splitting assigned inventory, the system transfers the assignment of the selected requirements from the old reel to the new reel. As a result of splitting assigned material, the system records a Split a Reel material inventory transaction from the assigned status to the assigned status. If you split the entire inventory balance of the old reel to a new reel, the old reel is deleted from the system.

The Split a Reel transaction is marked as not to be sent to Asset Management.

If the reel was split successfully, the system displays an appropriate message. The message provides the serial number added (if generated by the system). The inventory balances of the old reel shown on the INVENTORY ITEMS window are updated to reflect the results of the Split A Reel transaction and the new reel is displayed in the grid. The Last Transaction Number text box is updated to reflect the number of the last Split A Reel transaction created.

To close the INVENTORY ITEMS window, double-click the control box located in the upper left corner of the window.

TRANSFER AND INVENTORY ITEM

Transferring an inventory item allows you to move an inventory item from one inventory site to another in emergency situations when no formal transfer request has been made.

Figure 68:
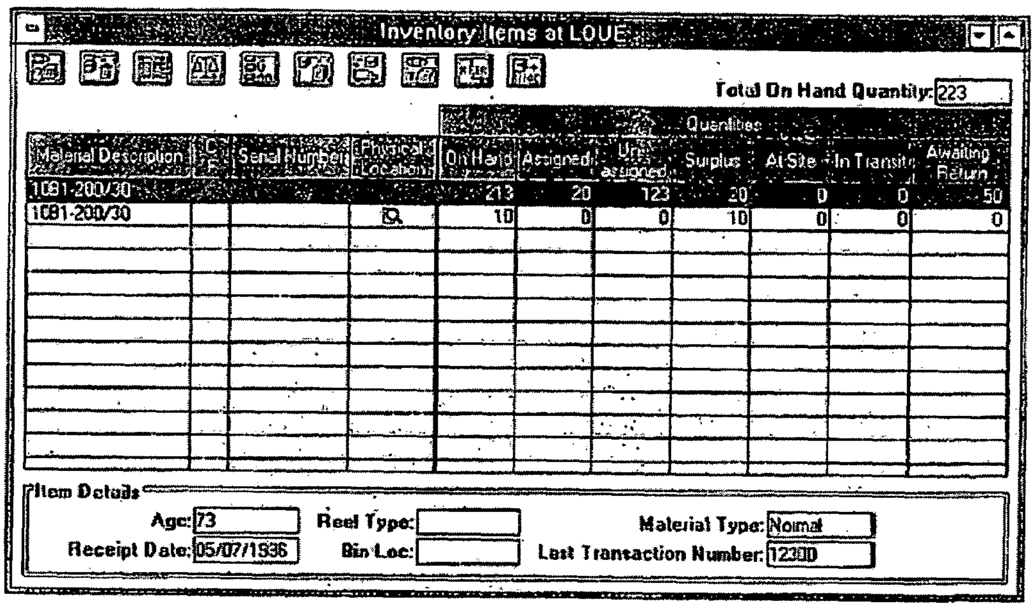

First, display the INVENTORY ITEMS AT xxxx window, where xxxx is the selected inventory site as previously discussed in the third section of this document. The INVENTORY ITEMS window as shown in Fig. 68 is displayed.

Figure 69:
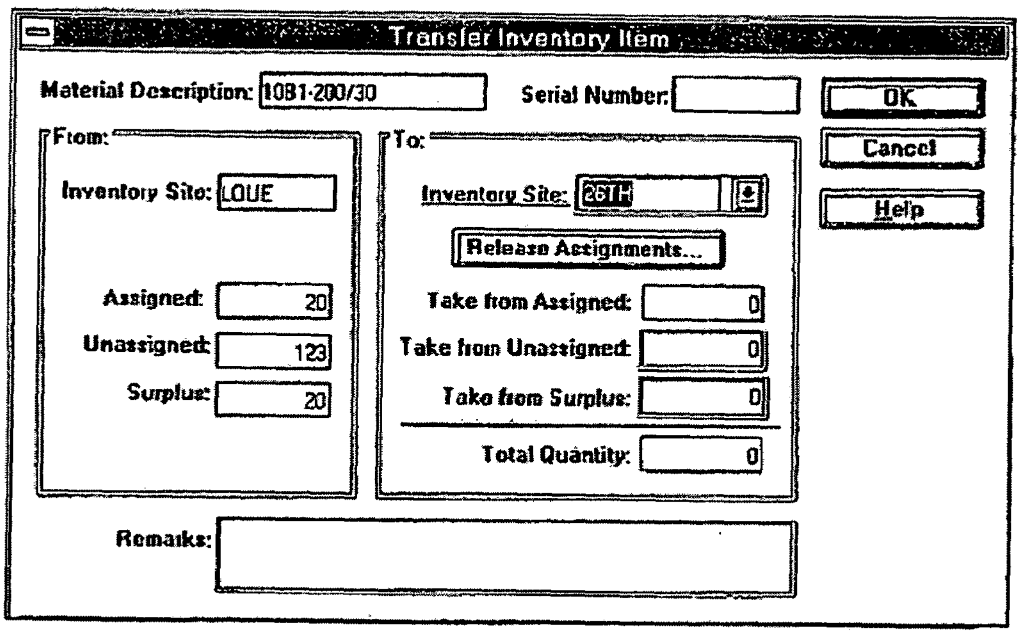
FIG. 69 is an exemplary screen print for Transfer Inventory Item.

To transfer an inventory item, select an inventory item from the grid and press the Transfer toolbar button located on the INVENTORY ITEMS window or select "Transfer..." from the Actions menu. The TRANSFER INVENTORY ITEM dialog as shown in Fig. 69 is displayed. This function is available if the following conditions are met:

You have security access to update inventory in this inventory site.

You are a Materials Management Manager, Materials Management Clerical, or a Materials Management Warehouse user.

The selected inventory item has an assigned, unassigned, or surplus inventory balance.

The selected inventory item's entire on hand balance has not been issued.

This dialog allows you to transfer the selected inventory item to another inventory site. The following information is displayed about the selected inventory item:

Material Description - the description of the inventory item.

Serial Number - the serial number of the inventory item (if serialized).

The From frame displays the following information about the inventory item in the current inventory site:

Inventory Site - the inventory site currently responsible for the inventory item.

Assigned Quantity - the current assigned balance of the inventory item.

Unassigned Quantity - the current unassigned balance of the inventory item.

Surplus Quantity - the current surplus balance of the inventory item.

To transfer the selected inventory item, provide the following information:

Inventory Site - the inventory site to which you want to transfer the inventory item. Type a valid inventory site in the Inventory Site combo box in the To frame or select one from its drop-down list. The drop-down contains a list of all inventory sites, excluding warehouse sites and Refurbished Central Office Equipment (RCOE) sites. If the inventory site is not valid (i.e., not in the list), the system displays an appropriate error message when you leave this field. Respond to the message by pressing OK.

Figure 70:
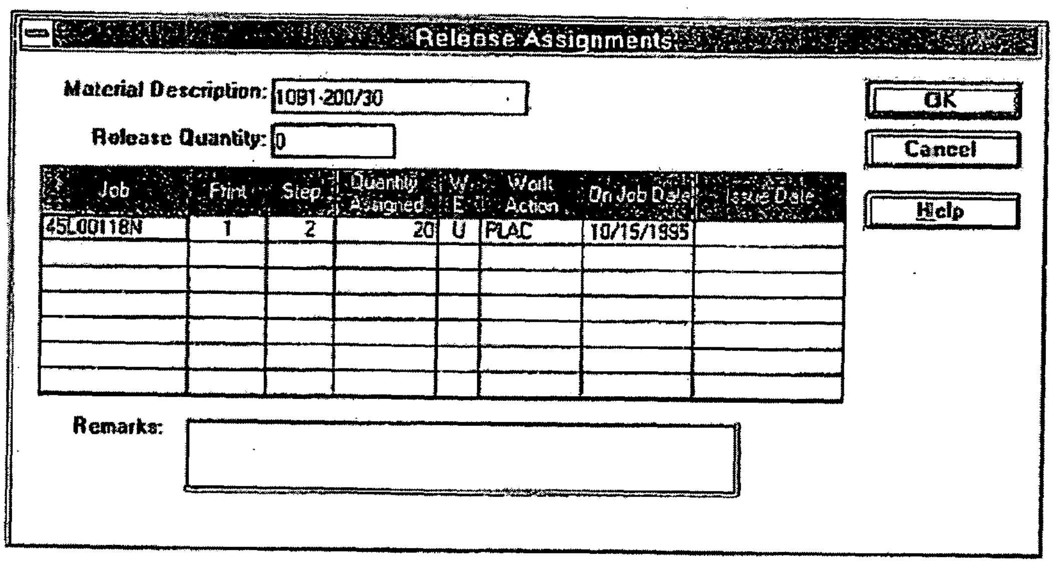
FIG. 70 is an exemplary screen print for Release Assignments.

Take from Assigned - the quantity to transfer from the assigned inventory balance. If transferring serialized material with an assigned balance, this field defaults to the assigned quantity and cannot be changed. If transferring non-serialized material, you cannot type directly in this text box because you must first choose the requirements from which the inventory item should be unassigned prior to transferring it. To release assignments, press the Release Assignment button. The RELEASE ASSIGNMENTS dialog as shown in Fig. 70 is displayed. If the selected inventory item does not have an assigned balance or if the inventory item is serialized, the Release Assignments button is not displayed. If the inventory item is serialized, the system will automatically release all assignments to that serial number upon transfer.

This dialog allows you to release the assignments of the selected inventory item.

The description of the material is displayed in the Material Description text box and the Release Quantity text box is initially set to zero. The following information is displayed about each requirement to which the inventory item is assigned:

Job - the job authority to which the inventory item is assigned.

Print - the job print to which the inventory item is assigned.

Step - the job step to which the inventory item is assigned.

Quantity Assigned - the quantity of the inventory item that is assigned to this requirement.

Work Environment (abbreviated WE) - the work environment for which the material is needed.

Work Action - the type of work for which the material is needed.

On Job Date - the date the material is needed on the job.

Issue Date - the date this inventory item was issued for use on this requirement. If the inventory item has not been issued, this column is blank. If the inventory item has been issued, it cannot be unassigned and therefor cannot be transferred.

To release assignments, select the requirements from which you wish to have the inventory item unassigned. The value in the Release Quantity text box increases by the quantity assigned to the selected requirements. Type any remarks in the Remarks text box that you wish to have recorded with the Unassignment transaction.

To get additional help while on this dialog, press the HELP button. To close this dialog without releasing assignments, press the CANCEL button. To close this dialog and indicate the assignments to release, press the OK button. The assignments will not actually be released until the OK button is pressed on the TRANSFER INVENTORY ITEM window. The system displays an appropriate message if the following conditions occur:

If no requirements are selected, an error message is displayed. Respond to the message by pressing OK.

If the inventory item has been issued for a selected requirement, the system displays an appropriate message. Respond to the message by pressing OK.

If multiple requirements have been selected and the inventory item has been issued for at least one of them, the system displays an appropriate message. If you want the system to deselect those requirements for which the inventory item has been issued and release the remaining assignments, respond to the message by pressing YES. If you don't want to release the remaining assignments, respond to the message by pressing NO.

If no errors are found, the system populates the quantity to transfer in the Take from Assigned text box on the TRANSFER INVENTORY ITEM window and the quantity in the Total Quantity text box increases by the same amount.

Take from Unassigned - the quantity to transfer from the unassigned balance, this field defaults to the unassigned quantity and cannot be changed. If transferring non-serialized material, type the quantity that you want to transfer from the unassigned balance in the Take from Unassigned text box in the To frame. The quantity entered cannot be greater that the current unassigned balance, but must be greater than zero. The quantity in the Total Quantity text box increases by the quantity entered. If the selected inventory item does not have an unassigned balance, you cannot transfer from the unassigned balance (i.e., the Take from Unassigned text box is disabled).

Take from Surplus - the quantity to transfer from the surplus inventory balance. If transferring serialized material with a unassigned balance, this field defaults to the unassigned quantity that you want to transfer from the surplus balance on the Take from Surplus text box in the To frame. The quantity entered cannot be greater than the current surplus balance, but must be greater than zero. The quantity in the Total Quantity text box increases by the quantity entered. If the selected inventory item does not have a surplus balance, you cannot transfer from the surplus balance (i.e., the Take from Surplus text box is disabled).

Remarks - type in any remarks in the Remarks text box that you wish to have recorded with the Transfer transaction.

To get additional help while on the TRANSFER INVENTORY ITEM dialog, press the HELP button. To close with dialog without transferring the inventory item, press the CANCEL button. To close this dialog and transfer the inventory item, press the OK button. The system displays an appropriate message if any of the following conditions occur:

If the total quantity to be transferred is equal to zero, the system displays an appropriate error message. Respond to the message by pressing OK.

If the quantity in the Take From Unassigned text box is greater than the current unassigned balance or if the quantity in the Take From Surplus text box is greater than the current surplus balance, the system displays an appropriate error message. Respond to the message by pressing OK.

If there are no errors found, the system creates a transfer request setting the transferred date equal to the current date and records a Transfer material inventory transaction as follows: Multiple transfer requests and multiple transactions are created if transferring non-serialized material from more than one status.

If you are transferring unassigned inventory, the system decreases the unassigned balance of the inventory item, increases the in-transit balance of the inventory item, and records a Transfer material inventory transaction from the unassigned status to the in-transit status. A transfer request is created so that the inventory site to which the material is transferred will be able to receipt the material into its inventory and take responsibility for it.

If you are transferring surplus material, the system decreases the surplus balance of the inventory item, increases the in-transit balance of the inventory item, and records a Transfer material inventory transaction from the surplus status to the in-transit status.

If you are transferring assigned material, the system first unassigned the inventory item and then transfers it as follows:

The inventory item is unassigned from each selected requirement, or if serialized, unassigned from each requirement to which it is currently assigned.

The inventory item's assigned balance is decreased, its unassigned balance is increased, and an Unassignment material inventory transaction is recorded.

The remaining needed quantity on each requirement from which the inventory item was unassigned is recalculated, and, if greater than zero, the requirement is put back in a "needed" status.

A Transfer material inventory transaction is recorded from the unassigned status to the in-transit status.

If the inventory item is non-central office equipment and ordered direct to code, the Unassignment transaction is marked to be sent to Asset Management; otherwise it is marked as not to be sent to Asset Management.

The Transfer transaction is marked as not to be sent to Asset Management.

If you released an assignment of Central Office Equipment, form RF-8010 is printed to move the material from the Field Reporting Code (FRC) and Geographic Location Code (GLC) of the requirement to which it was previously assigned to the 1220.1412 (Material Held for Future Use) account (See attachment 1).

If transferring Central Office Equipment, form RF-8010 is printed to move the material from the 1220-1412 account in the "from" inventory site to the 1220-1412 account in the "to" inventory site (see attachment 2).

If transferring material other than Central Office Equipment, form RF-6241-M is printed (see attachment 3).

The RF-8010 and RF-6241-M forms should serve as the packing slip when shipping the material to the "to" inventory site.

The inventory item was transferred successfully, the system displays an appropriate message. The inventory balances displayed on the INVENTORY ITEMS window are updated to reflect the results of the Transfer transaction. The Last Transaction Number text box is updated to reflect the number of the Transfer Transaction created.

To close the INVENTORY ITEMS window, double-click the control box located in the upper left corner of the window.

Attachment 1

The following information is printed on the RF-8010 form when unassigning Central Office Equipment:

Transfer Report No - the state responsible for the inventory item followed by the OSPCM Material Inventory Transaction Number (e.g., KY1184).

Purpose of Transfer - this field always equals "Adj. Accounts."

Ship/Transfer From (credit) –

Location - the inventory site responsible for the inventory item.

State - the state responsible for the inventory item.

Geo. Loc. - the exception geographic location code of the substep to which the inventory item was assigned.

Auth. No. - the job number to which the inventory item was assigned. RCO - the responsibility code of the inventory site responsible for the inventory item.

RCC - the responsibility code of the inventory site responsible for the inventory item.

Field Code - the field reporting code (FRC) of the substep to which the inventory item was assigned (i.e., 257C).

Vendor Order Number - the purchase order or select ticket on which the inventory item was shipped.

Ship/Transfer To (debit) –

Location - the inventory site responsible for the inventory item.

State - the state responsible for the inventory item.

Geo. Loc. - the geographic location code of the inventory site responsible for the inventory item.

RCO - the responsibility code of the inventory site responsible for the inventory item.

RCC - the responsibility code of the inventory site responsible for the inventory item.

Func. Code - the function code of the Material Held for Future Use account. This field is always equal to "5C5T."

Transportation Instructions –

Field Code - this field defaults to 6 blanks followed by an "M." Methods and Procedures (M&Ps) will be written to instruct the user how to manually complete this section.

Engineering Contact -

Engineer - the name of the user's supervisor. The "user" is the person who unassigned the inventory item.

Prepared By - the name of the person who unassigned the inventory item. The user's Common UserID (CUID) is used to obtain his/her name.

Date - the date the inventory item was unassigned. This field is always equal to the current date.

Remarks - remarks entered at the time the inventory item was unassigned.

Equipment Description - the description of the inventory item unassigned. If the material is serialized, its serial number will be printed following the material description.

Cond. - the condition of the material. This field always equals "G" (good).

Qty. - the quantity of the material unassigned.

Per. - this field always equals "EA" (each).

Yr. Pl. - the year the inventory item was receipted into inventory.

Attachment 2

The following information is printed on the RF-8010 form when transferring Central Office Equipment:

Transfer Report No. - the state from which the inventory item was transferred followed by the OSPCM Material Inventory Transaction Number (e.g., KY11184).

Purpose of Transfer - this field always equals "Adj. Accounts."

Ship/Transfer From (credit):

Location - the inventory site from which the inventory item was transferred.

State - the state from which the inventory item was transferred.

Geo. Loc. - the geographic location code of the inventory site from which the inventory item was transferred.

RCO - the responsibility code of the inventory site from which the inventory item was transferred.

RCC - the responsibility code of the inventory site from which the inventory item was transferred.

Func. Code - the function code of the Material Held for Future Use account. This field is always equal to "5C5T."

Ship/Transfer To (debit) –

Location - the inventory site to which the inventory item was transferred.

State - the state to which the inventory item was transferred.

Geo. Loc. - the geographic location code of the inventory site to which the inventory item was transferred.

RCO - the responsibility code of the inventory site to which the inventory item was transferred.

RCC - the responsibility code of the inventory site to which the inventory item was transferred.

Func. Code - the function code of the Material Held for Future Use account. This field is always equal to "5C5T."

Transport Instructions –

Field Code - this field defaults to 6 blanks followed by an "M." Methods and Procedures (M&Ps) will be written to instruct the user how to manually complete this section.

Engineering Contact -

Engineer - the name of the user's supervisor. The "user" is the person who transferred the inventory item.

Prepared By - the name of the person who transferred the inventory item. The user's Common UserID (CUID) is used to obtain his/her name.

Date - the date the inventory item was transferred. This field is always equal to the current date.

Remarks - remarks entered at the time the inventory item was transferred.

Equipment Description - the description of the inventory item transferred. If the material is serialized, its serial number will be printed following the material description.

Cond. - the condition of the material. This field always equals "G".

Qty. - the quantity of the material transferred.

Per. - this field equals "EA" if non-cable is transferred or equals "FT" if cable is transferred.

Yr. Pl. - the year the inventory item was receipted into inventory.

Attachment 3

The following information is printed on the RF-6241-M form when transferring non-Central Office Equipment:

Shipped To:

Name - the name of the person responsible for the inventory site from which the inventory item was transferred.

Tel. No. - the telephone number of the person responsible for the inventory site from which the inventory item was transferred.

Geoloc - the geographic location code of the inventory site from which the inventory item was transferred.

Street Address - the street address of the inventory site from which the inventory item was transferred.

City & State - the city and state of the inventory site from which the inventory item was transferred.

Shipped From:

Name - the name of the person responsible for the inventory site to which the inventory item was transferred.

Tel. No. - the telephone number of the person responsible for the inventory site to which the inventory item was transferred.

Geoloc - the geographic location code of the inventory site to which the inventory item was transferred.

Street Address - the street address of the inventory site to which the inventory item was transferred.

City & State - the city and state of the inventory site to which the inventory item was transferred.

Description - the material description of the inventory item transferred.

Serial Number - the serial number of the inventory item transferred (if serialized).

Quantity - the quantity of material transferred.

VIEW A JOB'S MATERIAL REQUIREMENTS

Figure 71:
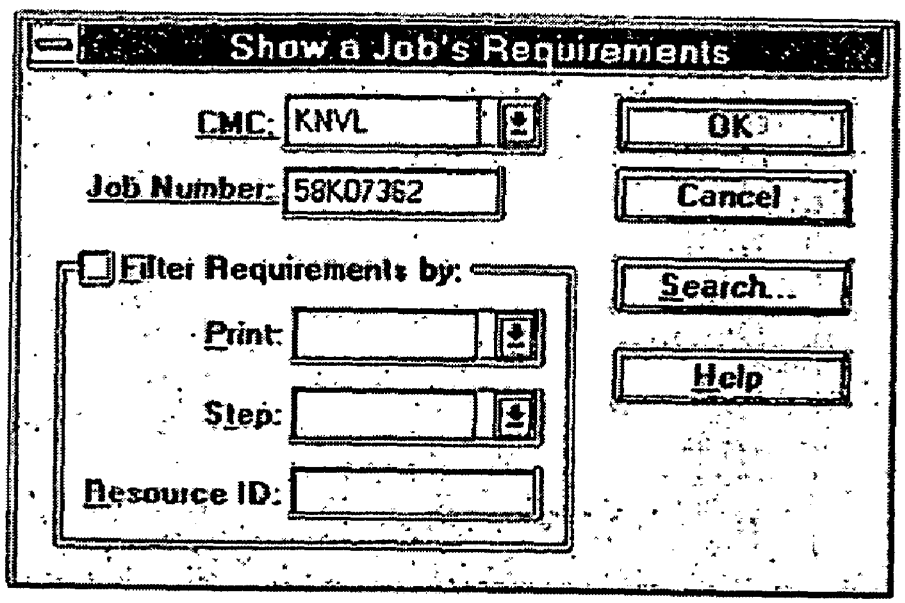
FIG. 71 is an exemplary screen print for Show a Job's Requirement.

To view all of an approved job's material requirements, regardless of the material status, press the Show All Requirements for a Job toolbar button located on the Materials Management application window or select "Show ALL of a Job's Requirements" from the Requirements menu. The SHOW A JOB'S REQUIREMENTS dialog as shown in Fig. 71 is displayed. This function is available at all times to a Materials Management Manager or a Materials Management Clerical user. If a Core Staff user requires access to Materials Management, they must be given an additional user type of "Materials Management Manager".

This dialog allows you to select the scope for which material requirements should be displayed. To display requirements, you must provide the following information:

CMC - type a valid Construction Management Center (CMC) name in the CMC combo box or select one from its drop-down list. The drop-down contains a list of all CMCs in the BellSouth region. This field defaults to the CMC you selected as your default CMC on the PREFERENCES window or the last CMC used during this session. If a CMC is entered that is not in the list, the system displays an appropriate error message. Respond to the message by pressing OK.

Job - type the job number whose requirements you wish to view in the Job Number text box.

Optionally, you may select the Filter Requirements By check box to display only certain requirements within the selected job. Select one of the following choices:

Print - to display only requirements for a specific print within the job, select or type a print number in the Print combo box which contains a list of valid prints for the selected job.

Step - to display only requirements for a specific step within the job, select or type a print number in the Print combo box, then select or type a step number in the Step combo box which contains a list of valid steps for the selected print.

Resource ID - to display only requirements that are assigned to a specific resource ID within the job, type a resource ID in the Resource ID text box.

Figure 72:
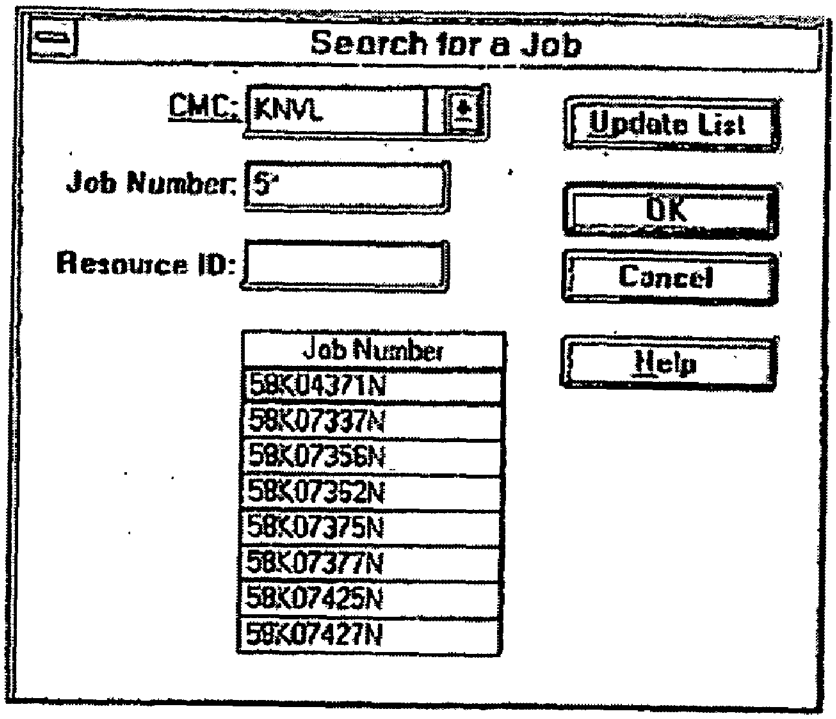
FIG. 72 is an exemplary screen print for Search for a Job.

To get help while on this dialog, press the HELP button. If you don't know the job number or only know part of it, you may leave the Job Number text box empty or type a partial job number using as asterisk (*) to search for job numbers starting and/or ending with the portion you provided. For example, 45L8 searches for job numbers starting with "45L"; 100 searches for job numbers ending in "'100"; 45*00 searches for job numbers starting with "45" and ending in "00." To run the search, press the SEARCH button. The SEARCH FOR A JOB dialog as shown in Fig. 72 is displayed.

This dialog allows you to view a list of all the job numbers for the identified scope. To Run the search, press the UPDATE LIST button. The system displays an appropriate message under the following conditions:

If no jobs were found that had material requirements for the selected CMC, job, and/or resource ID, an informative message is displayed. Respond to the message by pressing OK.

If an invalid resource ID is entered, an error message is displayed. Respond to the message by pressing OK.

To change the scope from the SEARCH FOR A JOB dialog, provide the following information:

CMC - select or type a new CMC name in the CMC combo box, which contains a list of all CMCs in the BellSouth region. This field is required and defaults to the CMC selected on the SHOW A JOB'S REQUIREMENTS dialog. If a CMC is entered that is not in the list, the system displays an appropriate error message. Respond to the message by pressing OK.

Job Number - type a new job number in the Job text box. You may type an entire job number to display a particular job number or you may type a partial job number using an asterisk (*) to view job numbers starting and/or ending with the portion you provided. This field defaults to the job number entered on the SHOW A JOB'S REQUIREMENTS dialog if one was entered.

Resource ID - to view a list of jobs for a particular resource ID, type a resource ID in the Resource ID text box. This field defaults to the Resource ID entered on the SHOW A JOB'S REQUIREMENTS dialog if one was entered.

To get help while on this dialog, press the HELP button. To close the dialog without running a search or selecting a job number, press the CANCEL button. To work with a particular job, select it and press the OK button or double-click it. The job number selected is copied to the Job Number text box on the SHOW A JOB'S REQUIREMENTS dialog and Resource ID is also populated if it was used as part of the search criteria. You may now filter the requirements to be displayed by print, step, or resource ID as described earlier.

To display the specified requirements, press the OK button. The system displays an appropriate message under the following conditions:

If the job number does not exist in the CMC specified or has not been approved, an error message is displayed. Respond to the message by pressing OK.

If no material requirements were found for the selected CMC, job, print, step, and/or resource ID, an informative message is displayed. Respond to the message by pressing OK.

If the Filter Requirements By check box is selected and an invalid resource ID is entered, an error message is displayed. Respond to the message by pressing OK.

Figure 73:
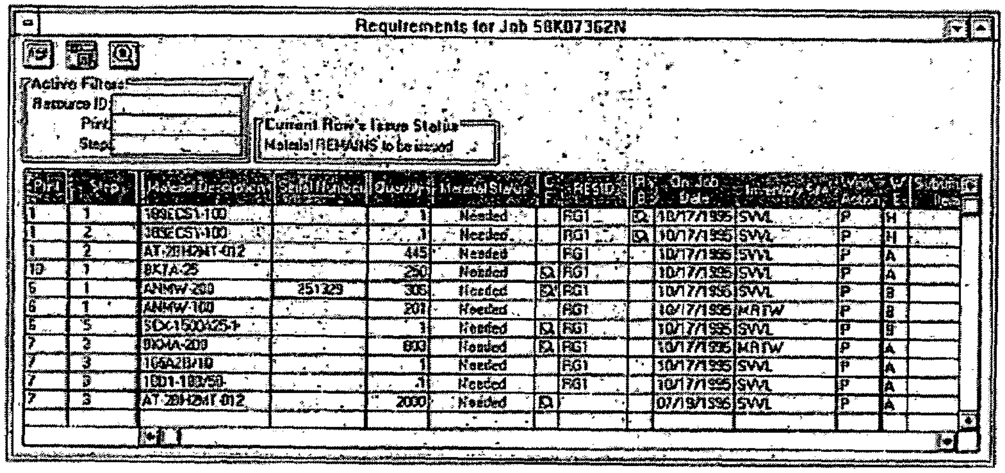
FIG. 73 is an exemplary screen print for Requirements for a Job.

If no errors are found, the REQUIREMENTS FOR JOB xxxx window as shown in Fig. 73 is displayed, where xxxx is the selected job number.

This window allows you to monitor the status of the material needed to work a job. The Active Filters frame displays the filters used to display the job and the grid displays all the substeps for that job that has a material requirement. A substep has a material requirement if it has a material status other than "unnecessary". The Current Row's Issue Status frame displays information to indicate whether or not you may issue the material assigned to the substep. Valid values are as follows:

Material REMAINS to be issued

ALL material has been issued

The requirement has no assignments

Disbursed-no assignments

The following information is displayed about each material requirement:

Print - the job print for which the requirement is needed.

Step - the job step for which the requirement is needed.

Material Description - the description of the material needed.

Serial Number - the serial number of the inventory item assigned to satisfy the requirement. If there are multiple serial numbers assigned to satisfy the requirement, a glyph appears here instead of a serial number. To view the assigned serial numbers, double-click the glyph or move the marquee to it a press ENTER.

Quantity - the quantity material required to do the work.

Material Status - the material status of the requirement. Values are as follows:

"Needed" - the requirement is still needed and has not yet been satisfied;

"Ordered" - the requirement was satisfied with a new order;

"Shipped" - the requirement was satisfied with a new order and the material has been shipped;

"Transfer Req." - the requirement was satisfied with a transfer request;

"Transferred" - the requirement was satisfied with a transfer request and the material has been transferred;

"Received" - the requirement was satisfied and the material has been assigned;

"Disbursed" - the material for this requirement has been placed in service.

Custom Features (abbreviated CF) - a glyph here indicates that custom features (e.g., inside pulling eye) are needed on the required material.

RESID - the resource ID responsible for the work.

Roadblocks (abbreviated RB) - a glyph here indicates that roadblocks (critical or non-critical) exist that may delay the work.

On Job Date - the date that the material is needed on the job.

Inventory Site - the name of the inventory site responsible for procuring the material.

Work Action - the type of work for which the material is needed.

Work Environment (abbreviated WE) - the work environment for which the material is needed.

Substituted Item - an asterisk (*) here indicates that the material assigned to the substep differs from the required material encoded by the engineer.

VIEW CUSTOM FEATURES

A symbol appears in the Custom Features column (abbreviated CF) if the requirement needs custom material features. To view the custom features, double-click on the symbol or use the arrow keys to move the marquee to it and press ENTER. The CUSTOM FEATURES dialog is displayed. The custom features displayed will vary with the type of material needed.

Figure 74:
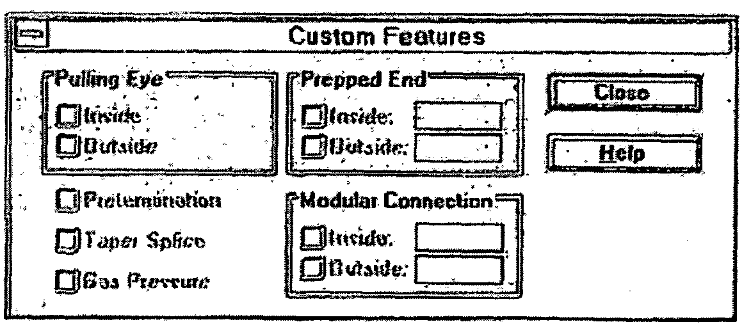
FIG. 74 is another exemplary screen print for Custom Features associated with cable.

If the requirement is for cable, the dialog displays the custom features associated with cable as shown in Fig. 74. Information includes whether or not the requirement needs pulling eyes, prepped ends, preterminations, a taper splice, gas pressure, or modular connections.

Figure 75:
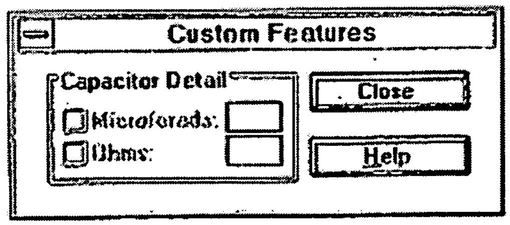
FIG. 75 is another exemplary screen print for Custom Features associated with capacitors.

If the requirement is for a capacitor, the dialog displays the custom features associated with capacitors as shown in Fig. 75. Information includes the microfarads an/or ohms of the capacitor.

Figure 76:
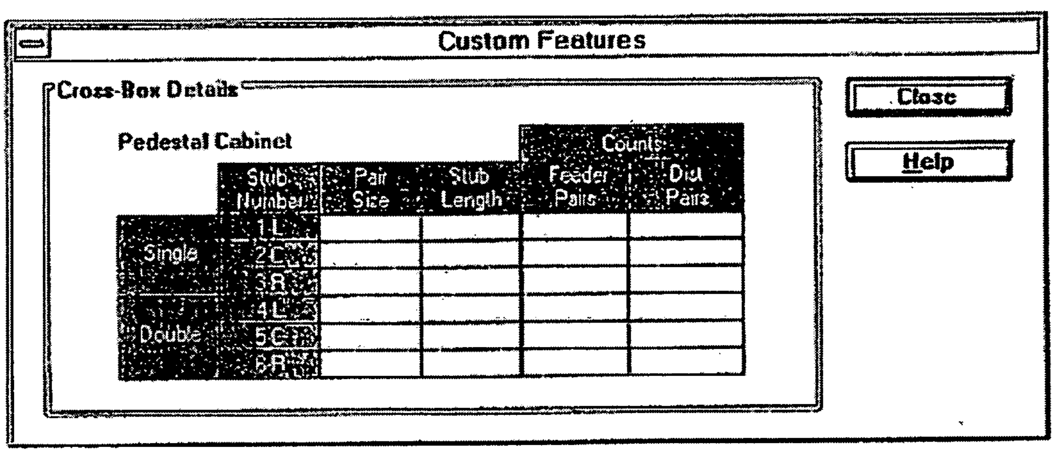
FIG. 76 is another exemplary screen print for Custom Features associated with non-standard pedestal cross-box.
Figure 77:
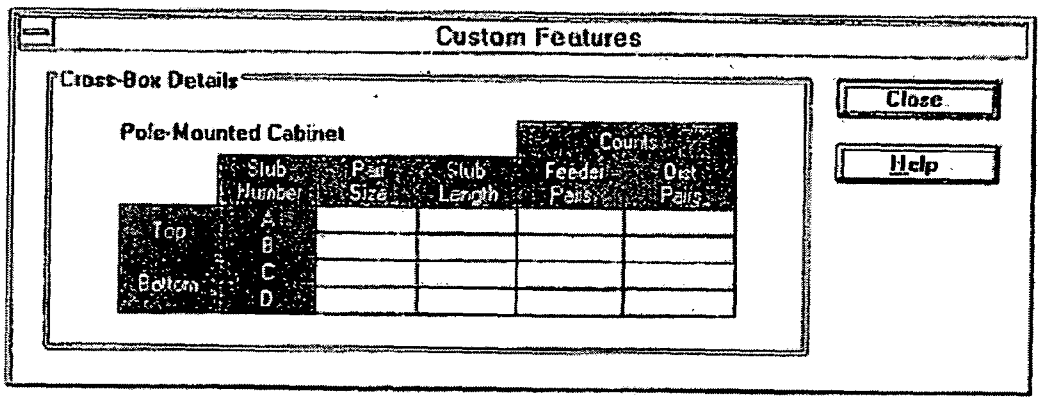
FIG. 77 is another exemplary screen print for Custom Features associated with non-standard pole-mounted cross-box.

If the requirement is for a non-standard pedestal cross-box, the dialog displays its configuration as shown in Fig. 76 below. Information includes the size and length of each stub and the connections between the feeder pairs and distribution pairs inside the cross-box If the requirement is for a non-standard pole-mounted cross-box, the dialog displays it configuration as shown in Fig. 77. Information includes the size and length of each stub and the connections between the feeder pairs and distribution pairs inside the cross-box.

To get help while on this dialog, press the HELP button. To close this dialog, press the CLOSE button.

VIEW ROADBLOCKS

Figure 78:
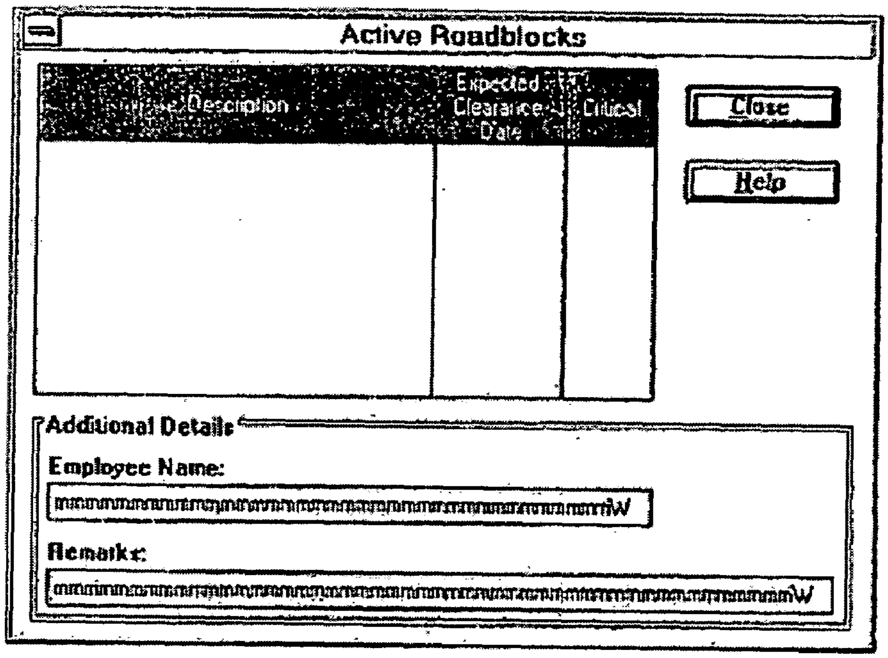
FIG. 78 is an exemplary screen print for Active Roadblocks.

A symbol appears in the Roadblock column (abbreviated RB) if the substep for which the requirement exists has any roadblocks. To view the roadblock(s), double-click this symbol or use the arrow keys to move the marquee to it and press ENTER. The ACTIVE ROADBLOCKS dialog as shown in Fig. 78 is displayed.

This dialog displays the roadblocks associated with the substep. The following information is displayed about each roadblock:

Description - the description of the roadblock.

Expected Clearance Date - the date the roadblock is expected to be cleared.

Critical - an asterisk (*) here indicates that the roadblock is considered critical.

Employee Name - the name of the person who created the roadblock.

Remarks - the remarks that were recorded at the time the roadblock was created.

To get additional help while on this dialog, press the HELP button. To close this dialog, press the CLOSE button.

VIEW MULTIPLE SERIALIZED ASSIGNMENTS

Figure 79:
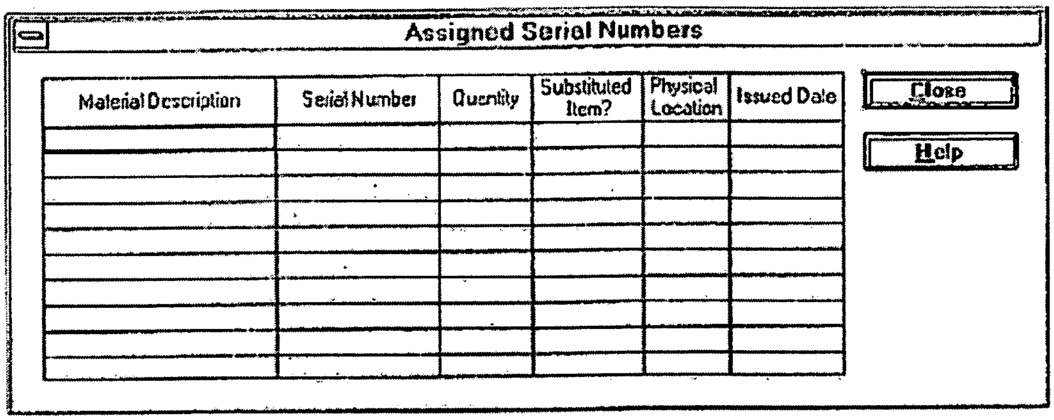
FIG. 79 is an exemplary screen print for Assigned Serial Number.

If multiple serial numbers have been assigned to a requirement, this symbol appears in the Serial Number column. To view the serial numbers, double-click this symbol or move the marquee to it and press ENTER. The ASSIGNED SERIAL NUMBERS dialog as shown in Fig. 79 is displayed.

This dialog displays all of the serial numbers currently assigned to the selected requirement. Multiple serial numbers can be assigned if the requirement is for cable material and the entire required quantity cannot be satisfied with one reel. The following information is displayed about each serial number:

Material Description - the description of the material on the reel.

Serial Number - the serial number of the reel.

Quantity - the quantity on the reel that is assigned to this requirement.

Substituted Item - an asterisk (*) here indicates that the material assigned differs from the required material encoded by the engineer.

Physical Location - a glyph here indicates that the reel assigned to the substep is physically located at a site (alternate address or inventory site) different from the inventory site responsible for procuring the material. No glyph here indicates that the reel is located at the inventory site responsible for procuring the material.

Issue Date - the date that the reel was issued. If the reel has not been issued, this field is blank.

Figure 80:
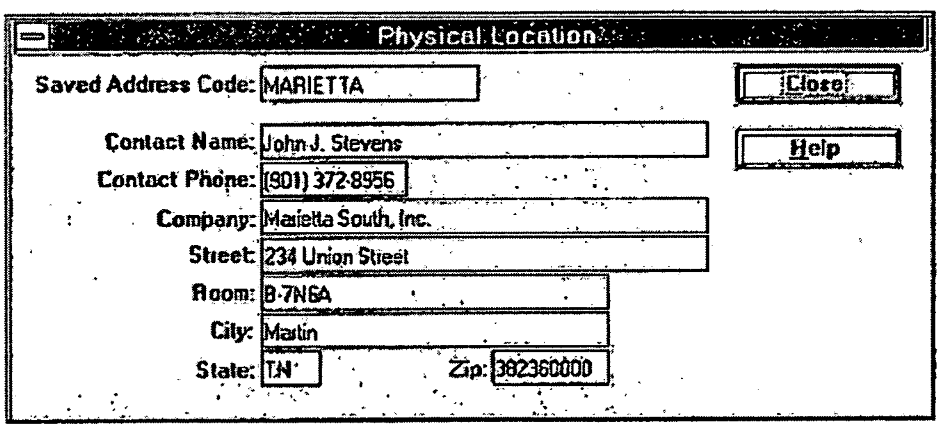
FIG. 80 is another exemplary screen print for Physical Location.

A symbol appears in the Physical Location column if the inventory item is not physically at the inventory site responsible for procuring the material, but rather at an alternate location. To view the address of where the inventory item is located, double-click on this symbol or use the arrow keys to move the marquee to it and press ENTER. The PHYSICAL LOCATION dialog asshown in Fig. 80 is displayed.

This dialog displays the location of an inventory item that is not physically located at the inventory site responsible for procuring the material. Information includes the name under which this alternate address was saved, the contact name and phone number, company name, its street address, room number, city, state, and zip. To get help while on this dialog, press the HELP button. To close this dialog, press the CLOSE button.

To get additional help on the ASSIGNED SERIAL NUMBERS dialog, press the HELP button. To close the dialog, press the CLOSE button.

VIEW ASSIGNMENTS

Figure 81:
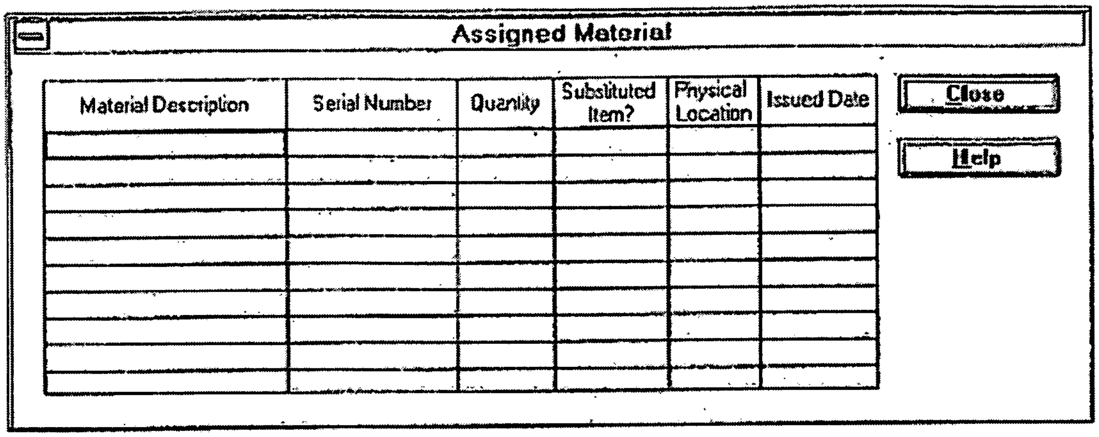
FIG. 81 is an exemplary screen print for Assigned Material.

To view assignments for a requirement, select a requirement from the grid and press the Show Assignments toolbar button located on the REQUIREMENTS window or select "Show Assignments" from the Action menu. The ASSIGNMENT MATERIAL dialog as shown in Fig. 81 is displayed. This function is available only if the requirement has inventory assigned to it.

This dialog displays all of the inventory items currently assigned to the selected requirement. If the requirement is for non-serialized material, the serial number column is not displayed.

Multiple inventory items may be displayed if the requirement is for a quantity greater than one and one or more of the following apply:

If the requirement is for cable and more than one reel is assigned to the requirement.

If the requirement is for cable or non-serialized material and then inventory items assigned to the requirement have different material descriptions. If a cable requirement has multiple reels assigned to it, they could have different material descriptions.

If the requirement is for cable or non-serialized material and the inventory items assigned to the requirement are physically located in different places. If a cable requirement has multiple reels assigned to it, they could be physically located in different places.

The following information is displayed about each inventory item:

Material Description - the material description of the inventory item.

Serial Number - the serial number of the inventory item (if serialized).

Quantity - the quantity that is assigned to this requirement.

Substituted Item - an asterisk (*) here indicates that the material assigned differs from the required material encoded by the engineer.

Physical Location - a glyph here indicates that the inventory item assigned to the substep is physically located at a site (alternate address or inventory site) different from the inventory site responsible for procuring the material. No glyph here indicates that the inventory item is located at the inventory site responsible for procuring the material.

Issue Date - the date that the inventory item was issued. If the inventory item has not been issued, this field is blank.

To get additional help while on this dialog, press the HELP button. To close this dialog, press the CLOSE button.

VIEW REQUIREMENT STATUS

Figure 82:
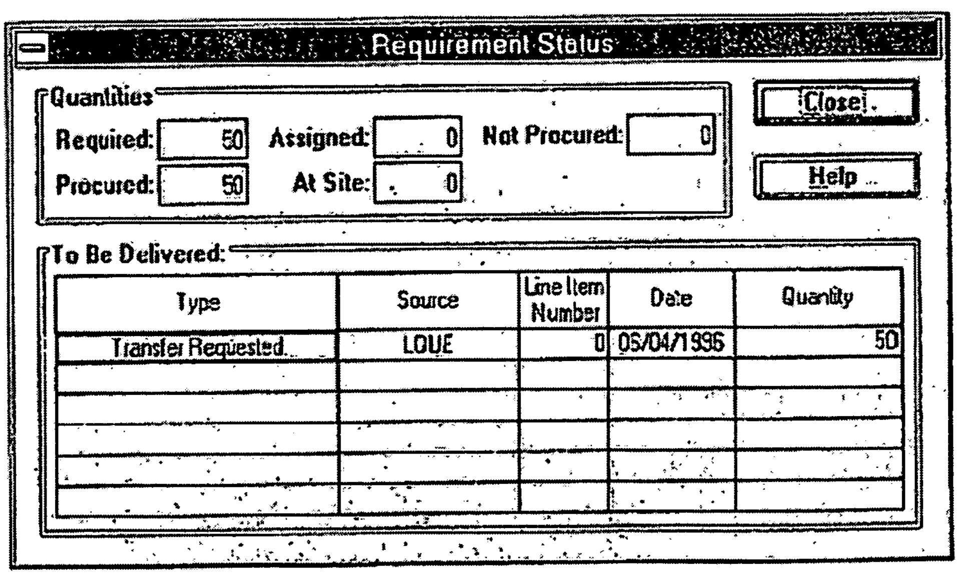
FIG. 82 is an exemplary screen print for Requirement Status.

To view a requirement's status in more detail, select a requirement from the grid and press the Show Requirement Status toolbar button located on the REQUIREMENTS window or select "Show Requirement Status" from the Actions menu. The REQUIREMENT STATUS dialog as shown in Fig. 82 is displayed.

This dialog gives a summary of the selected requirement's current status. The Quantities frame displays the following information:

Required - The quantity required to do the work on the substep.

Assigned - The portion of the required quantity currently assigned to the substep.

Procured - The portion of the required quantity that is/was ordered, shipped, transfer requested, or transferred to satisfy the substep.

At Site - The portion of the assigned quantity currently issued on the substep.

Not Yet Procured - The portion of the required quantity that remains to be satisfied on the substep.

The To Be Delivered grid displays any orders, shipments, transfer requests, or transfers, sorted in that order, that are still due to arrive. Information in this grid includes the following:

Type - The type of delivery expected. Values are "Order", "Scheduled Shipment", "Shipment", "Transfer Requested" or "Transfer".

Source - The source of the delivery.

If the type is "Order", this column contains the OrderMaster Number assigned to the order.

If the type is "Scheduled Shipment", this column contains the Select Ticket Number (stock order) or the Purchase Order Number (non-stock order) when the requirement has been ordered and the system has been notified of a scheduled shipment.

If the type is "Shipment", this column contains the Select Ticket Number (stock order) when the requirement has been ordered and the system is notified of an actual shipment. Since the system is not notified when non-stock orders are actually shipped, you will not see a Shipment type for a non-stock order.

If the type is "Transfer Requested" this column contains the name of the inventory site to which the transfer request was made.

If the type is "Transfer" this column contains the name of the inventory site that transferred the material.

Line Number - The line number associated with the OrderMaster Number, Select Ticket, or Purchase Order. This column is blank if the type is 'Transfer Requested" or "Transfer".

Date -

If the type is "Order", this column contains the date that the requirement was ordered.

If the type is "Scheduled Shipment", this column contains the date that the order is scheduled to be shipped.

If the type is "Shipment", this column contains the date a stock order was shipped from a BST warehouse.

If the type is "Transfer Requested" this column contains the date the transfer request was made.

If the type is "Transfer" this column contains the date the transfer was made.

Quantity - The quantity expected to be delivered.

If the type is "Order", this column contains the quantity ordered for the requirement.

If the type is "Scheduled Shipment", this column contains the quantity scheduled to be shipped on this select ticket line item or purchase order line item. If the shipment is for an aggregated requirement, the quantity scheduled to be shipped may be greater than the quantity needed on the requirement.

If the type is "Shipment", this column contains the quantity shipped on this select ticket line item or purchase order line item. If the shipment is for an aggregated requirement, the quantity scheduled to be shipped may be greater than the quantity needed on the requirement.

If the type is "Transfer Requested" this column contains the quantity requested to be transferred for this requirement.

If the type is "Transfer" this column contains the quantity transferred for this requirement.

To get additional help on this dialog, press the HELP button. To close this dialog, press the CLOSE button.

To close the REQUIREMENTS window, double-click the control box located in the upper left corner of the window.

VIEW AN INVENTORY ITEM

Figure 83:
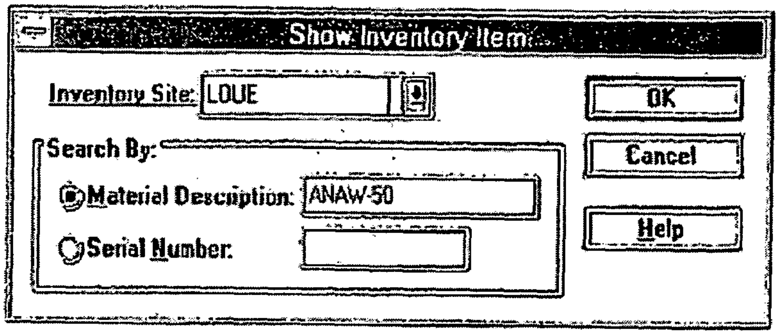
FIG. 83 is an exemplary screen print for Show Inventory Item.

To view an inventory item, press the Show Inventory Item toolbar button located on the Materials Management application window or select "Show Inventory Item" from the Inventory menu. The SHOW INVENTORY ITEM dialog as shown in Fig. 83 is displayed. This function is available at all times to any Materials Management user.

This dialog allows you to choose the inventory site and inventory item that you would like to view. First, identify the inventory site responsible for the inventory you wish to view.

Inventory Site - Type a valid inventory site in the Inventory Site combo box or select one from its drop-down list. If you are a Materials Management Manager or a Materials Management Clerical user, the drop-down contains a list of all inventory sites excluding warehouse sites and Refurbished Central Office Equipment (RCOE) sites. If you are a Materials Management Warehouse user, the drop-down contains a list of only the warehouse and RCOE sites.

Next, identify the inventory item to view by choosing one of the following:

Material Description - Select the Material Description radio button and type a material description in the Material Description text box to view inventory items having a particular material description (serialized or non-serialized). You may type an entire material description to view inventory items having that material description or you may type a partial material description using an asterisk (*) to view inventory items starting and/or ending with the portion you provided as described earlier. Material Description is the default radio button.

Serial Number - Select the Serial Number radio button and type a serial number in the Serial Number text box to view serialized inventory items. You may type an entire serial number to view a particular serial number or you may type a partial serial number using an asterisk (*) to view inventory items having a serial number starting and/or ending with the portion you provided. For example, 234* displays inventory items having a serial number starting with "234"; *234 displays inventory items having a serial number ending in "234"; 2*4 displays inventory items having a serial number starting with "2" and ending in "4".

To get additional help while on this dialog, press the HELP button. To close this dialog without viewing an inventory item, press the CANCEL button. To close this dialog and view the identified inventory item, press the OK button. The system displays an appropriate message if any of the following conditions occur:

If the inventory site entered is not valid, the system displays an error message. Respond to the message by pressing OK.

If the material description provided is not valid, the system displays an error message. Respond to the message by pressing OK, If the specified inventory item does not exist at that location, the system displays an informative message . Respond to the message by pressing OK.

Figure 84:
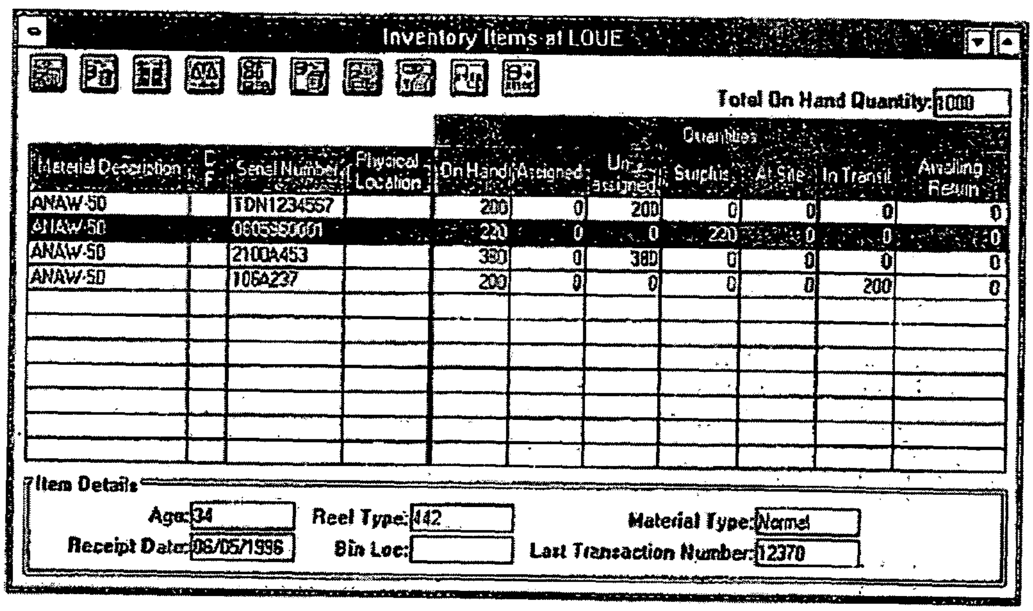
FIG. 84 is another exemplary screen print for Inventory Items.

If the inventory item currently exists at the specified inventory site (inventory balance is > zero), the INVENTORY ITEMS at xxxx window as shown in Fig. 84 is displayed, where xxxx is the selected inventory site.

This window contains a grid listing all of the inventory items for your chosen selection that have an inventory balance greater than zero. If you are viewing serialized inventory items there is one row in the grid for each serial number. If you are viewing non-serialized inventory items there is one row in the grid for each group of non-serialized items located at a different physical location. If you did not use an asterisk (*) when choosing the inventory items to display, the Total On Hand Quantity text box is displayed and is populated with the sum of the on hand balances displayed. For example, if you choose to display inventory items having a material description of "AFAW-100", all reels of cable containing AFAW-100 material are displayed and the Total On Hand Quantity would equal the sum of the on hand balance of each reel. This is a useful way to tell how much cable of a particular type you have. If you used an asterisk when choosing the inventory items to display, the Total On Hand Quantity text box is not displayed because it no longer serves a useful purpose. Knowing how much "AF*" material you have is not very useful.

The following information is displayed about each inventory item:

Material Description - The material description of the inventory item.

Custom Features (abbreviated CF) - A symbol here indicates that the inventory item has custom material features (e.g., inside pulling eye).

Serial Number - The serial number of the inventory item (if serialized).

Physical Location - A symbol here indicates that the inventory item is located at an alternate address. No symbol means that the inventory item is located at the inventory site responsible for the material.

On Hand - The inventory item's current on hand balance. This quantity is the sum of the assigned balance, the unassigned balance, the surplus balance, the in transit balance, and the awaiting return balance.

Assigned - The portion of the inventory item's on hand balance that is assigned to a job or jobs.

Unassigned - The portion of the inventory item's on hand balance that is unassigned.

Surplus - The portion of the inventory item's on hand balance that is surplus. If the surplus quantity is greater than zero and the inventory item serialized, it is equal to the entire on hand balance.

At Site - The portion of the inventory item's on hand balance that has been issued. In the case of serialized material, it is equal to the entire on hand balance.

In Transit - The portion of the inventory item's on hand balance that has been transferred to another inventory site but not yet receipted. If the in transit quantity is greater than zero and the inventory item serialized, it is equal to the entire on hand balance.

Awaiting Return - The portion of the inventory item's on hand balance that is waiting to be returned to a BST warehouse or to an outside vendor because it is either damaged or unwanted. If the awaiting return quantity is greater than zero and the inventory item serialized, it is equal to the entire on hand balance.

The Item Details frame displays the following information about the inventory item that currently has the marquee:

Age - The age of the inventory item in days. If this is non-serialized material and the items in this group were receipted on different days, the age will be the oldest item in the group. To see the actual age of a non-serialized inventory item, run an Inventory Scan which is described later in this document.

Receipt Date - The date the inventory item was receipted into inventory. If this is non-serialized material and the items in this group were receipted on different days, the receipt date will be the earliest receipt date of the items in the group.

Reel Type - If this is cable material, this field displays the reel type of the inventory item.

Bin Loc - The current bin location of the inventory item (if it has one).

Material Type - This field is used to indicate for what purpose the inventory item may be used or is being used. Values are:

Normal - This is serialized or non-serialized inventory that can be used for just about any purpose. "Normal" inventory is only displayed if you are viewing inventory items that are the responsibility of an inventory site or of an RCOE site. Inventory items of this type will have an assigned, unassigned, surplus, in transit, or awaiting return inventory balance. All non-serialized material is considered "normal".

Emergency - This is serialized inventory that is reserved for emergency purposes. "Emergency" inventory is only displayed if you are viewing inventory items that are the responsibility of an inventory site that can store emergency material or of a warehouse site.. Inventory Items of this type located at a warehouse site will have an unassigned inventory balance. Inventory items of this type located at an inventory site will have either an unassigned or surplus inventory balance.

Consignment - This is serialized inventory that can be used on consignment. "Consignment" inventory is only displayed if you are viewing inventory items that are the responsibility of a warehouse site. Inventory items of this type will have an unassigned inventory balance.

Joint Use - This is serialized inventory that will be placed by another company (e.g., Alabama Power). "Joint Use" inventory is only displayed if you are viewing inventory items that are the responsibility of an inventory site. Inventory items of this type will have an assigned inventory balance. An inventory item is considered joint use if the substep to which it is assigned is associated with a joint use contract

Last Transaction Number - The last transaction number that affected this inventory item.

Several actions are available to you depending on your level of security. Each action is described in a separate section of this document.

VIEW CUSTOM FEATURES

A symbol appears in the Custom Features column (abbreviated CF) if the inventory item has custom features. To view the custom features, double-click the symbol or use the arrow keys to move the marquee to it and press ENTER. The CUSTOM FEATURES dialog is displayed. The custom features displayed will vary with the type of inventory item.

Figure 85:
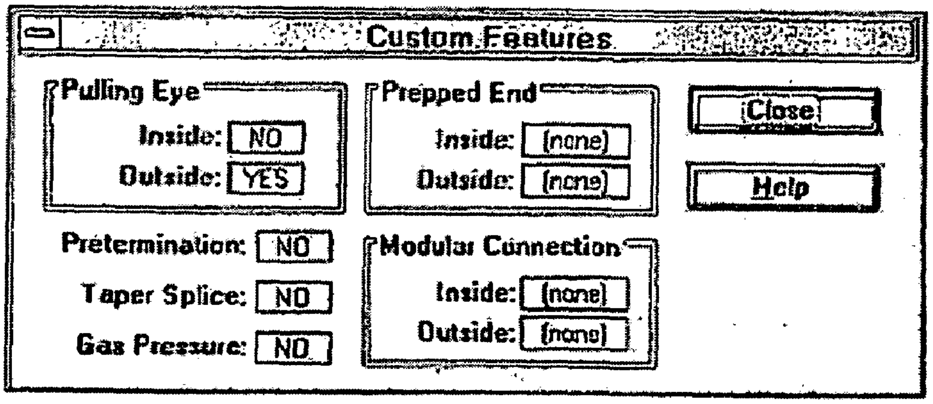
FIG. 85 is another exemplary screen print for Custom Features associated with cable.

If the inventory item selected is cable, the dialog displays the custom features associated with cable as shown in Fig. 85. Information includes whether or not the inventory item has pulling eyes, prepped ends, preterminations, a taper splice, gas pressure, or modular connections.

Figure 86:
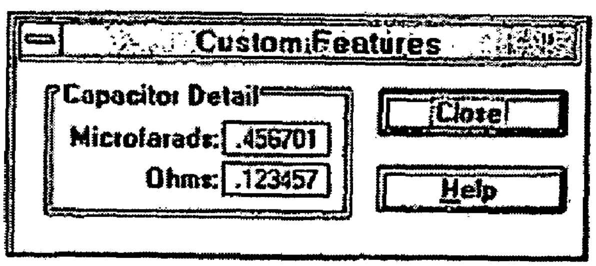
FIG. 86 is another exemplary screen print for Custom Features associated with capacitors.

If the inventory item selected is a capacitor, the dialog displays the custom features associated with capacitors as shown in Fig. 86. Information includes the microfarads and/or ohms of the capacitor.

Figure 87:
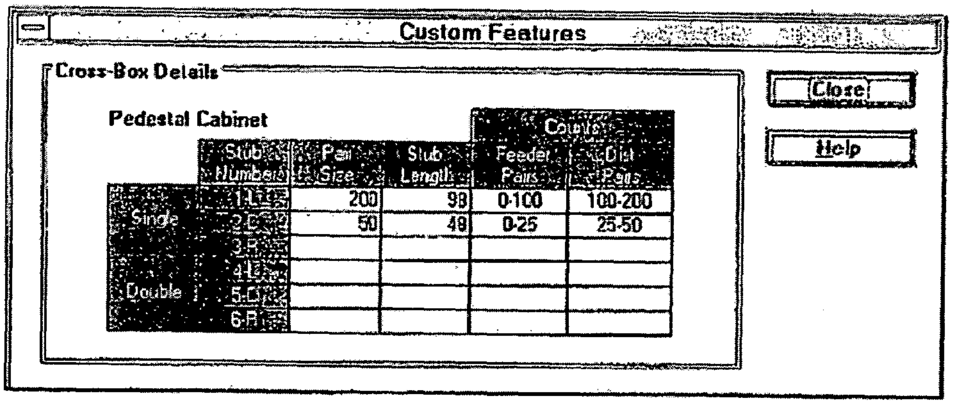
FIG. 87 is another exemplary screen print for Custom Features associated with non-standard pedestal cross-box.

If the inventory item selected is a non-standard pedestal cross-box, the dialog displays its configuration as shown in Fig. 87. Information includes the size and length of each stub and the connections between the feeder pairs and distribution pairs inside the cross-box.

Figure 88:
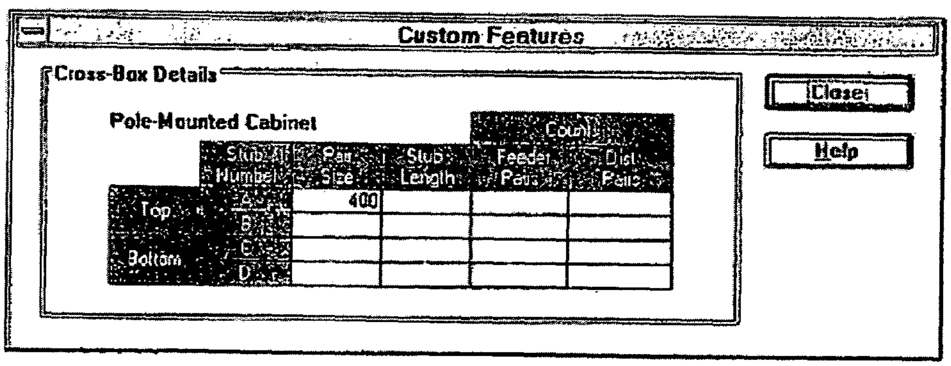
FIG. 88 is another exemplary screen print for Custom Features associated with non-standard pole-mounted cross-box.

If the inventory item selected is a non-standard pole-mounted cross-box, the dialog displays its configuration as shown in Fig. 88. Information includes the size and length of the stub and the connections between the feeder pairs and distribution pairs inside the cross-box.

To get help while on this dialog, press the HELP button- To close this dialog, press the CLOSE button.

VIEW ALTERNATE ADDRESS

Figure 89:
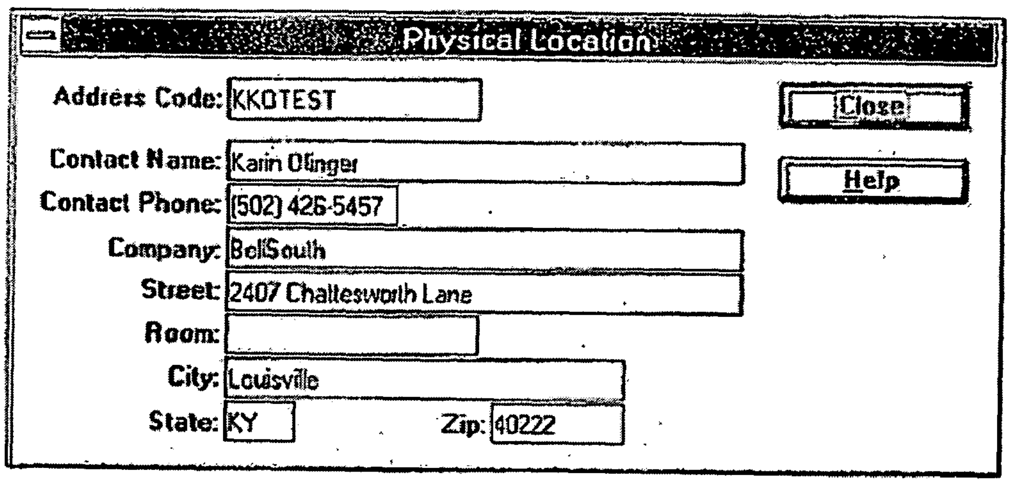
FIG. 89 is another exemplary screen print for Physical Location.

A symbol appears in the Physical Location column if the inventory item is not physically at the inventory site, but rather at an alternate location. To view the address of where the inventory item is located, double-click this symbol or use the arrow keys to move the marquee to it and press ENTER. The PHYSICAL LOCATION dialog as shown in Fig. 89 is displayed.

This dialog displays the location of an inventory item that is not physically located at the inventory site responsible for the material. Information includes the name under which this alternate address was saved, the contact name and phone number, company name, street address, room number, city, state, and zip.

To get help while on this dialog, press the HELP button. To close this dialog, press the CLOSE button.

To close the INVENTORY ITEMS window, double-click on the control button located in the upper left corner of the window.

VIEW ASSIGNMENTS

If an inventory item is reserved for use on a specific job or jobs, it is considered assigned inventory. If the material assigned to a job is damaged or unusable for some reason, you can unassign the material from that job.

Figure 90:
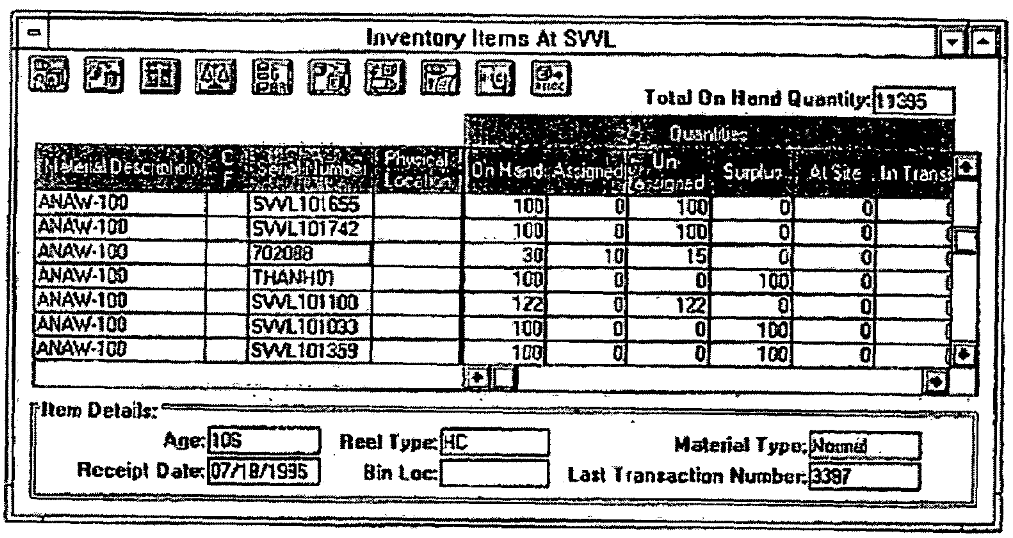
FIG. 90 is another exemplary screen print for Inventory Items.

First, display the INVENTORY ITEMS AT xxxx window, where xxxx is the selected inventory site as previously discussed in the third section of this document. The INVENTORY ITEMS window as shown Fig. 90 is displayed.

Figure 91:
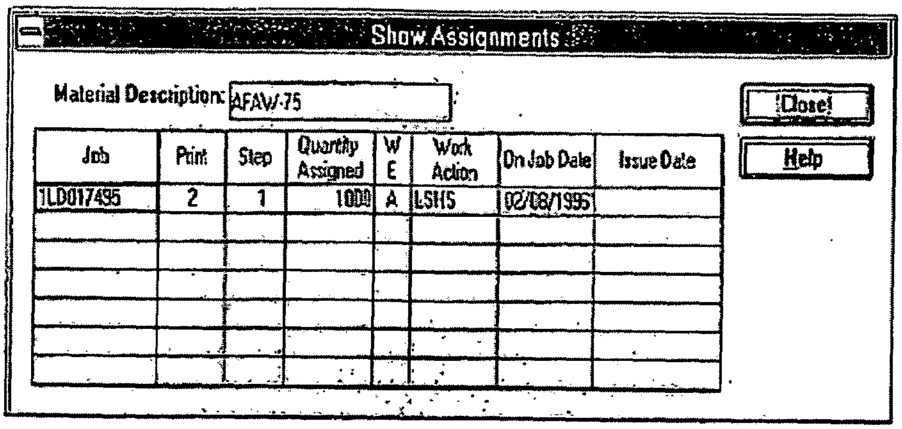
FIG. 91 is an exemplary screen print for Show Assignments.

If you do not have security access to update inventory in this inventory site and you want to view the requirements to which an inventory item is assigned, select an inventory item from the grid and press the Assignments toolbar button located on the INVENTORY ITEMS window or select "Show Assignments" from the Actions menu. The SHOW ASSIGNMENTS dialog in Fig. 91 is displayed. This function is available if the following conditions are met:

You are a Materials Management Manager or a Materials Management Clerical user.

The selected inventory item has an assigned inventory balance.

This dialog allows you to view the requirements to which the selected inventory item is assigned. The description of the material is displayed in the Material Description text box and the following information is displayed about each requirement to which the inventory item is assigned:

Job - The job authority to which the inventory item is assigned.

Print - The job print to which the inventory item is assigned.

Step - The job step to which the inventory item is assigned.

Quantity Assigned - The quantity of the inventory item that is assigned to this requirement.

Work Environment (abbreviated WE) - The work environment for which the material is needed.

Work Action - The type of work for which the material is needed.

On Job Date - The date the material is needed on the job.

Issue Date - The date the inventory item was issued for use on this requirement. If the inventory item has not been issued, this column is blank.

To get additional help while on this dialog, press the HELP button. To close this dialog, press the CLOSE button.

RELEASE ASSIGNMENTS

Figure 92:
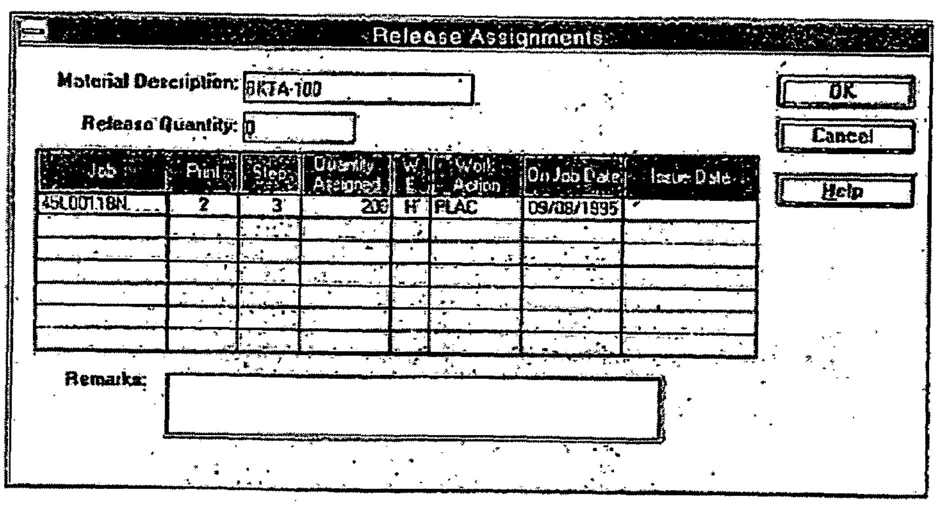
FIG. 92 is another exemplary screen print for Release Assignments.

If you have security access to update inventory in this inventory site and you want to view the requirements to which an inventory item is assigned or release assignments, select an inventory item from the grid and press the Assignments toolbar button located on the INVENTORY ITEMS window or select "Show/Release Assignments" from the Actions menu. The RELEASE ASSIGNMENTS dialog shown in Fig. 92 is displayed. This function is available if the following conditions are met:

You have security access to update inventory in this inventory site.

You are a Materials Management Manager or a Materials Management Clerical user.

The selected inventory item has an assigned inventory balance.

This dialog looks similar to the SHOW ASSIGNMENTS dialog with two exceptions: the addition of the Release Quantity text box and the replacement of the CLOSE button with OK and CANCEL buttons.

To release assignments, select the requirements from which you wish to have the inventory item unassigned. The value in the Release Quantity text box increases by the quantity assigned to the selected requirements. You cannot unassign an issued inventory item. Type any remarks in the Remarks text box that you wish to have recorded with the Unassignment transaction.

To get additional help while on this dialog, press the HELP button. To close this dialog without releasing assignments, press the CANCEL button. To close this dialog and release the selected assignments, press the OK button. The system displays an appropriate message if the following conditions occur:

If no requirements are selected, an error message is displayed. Respond to the message by pressing OK.

If the inventory item has been issued for a selected requirement, the system displays an appropriate message. Respond to the message by pressing OK,.

If multiple requirements have been selected and the inventory item has been issued for at least one of them, the system displays an appropriate message. If you want the system to deselect those requirements for which the inventory item has been issued and release the remaining assignments, respond to the message by pressing YES. If you don't want to release the remaining assignments, respond to the message by pressing NO.

If no errors are found, the system does the following:

Unassigns the inventory item from each selected requirement.

Decreases the associated inventory item's assigned balance and increases its unassigned balance.

Records an Unassignment material inventory transaction. If the inventory item is non-central office equipment and ordered direct to code, the Unassignment transaction is marked to be sent to Asset Management; otherwise it is marked as not to be sent to Asset Management.

Recalculates the remaining needed quantity on each requirement from which the inventory item was unassigned, and if it is greater than zero, puts the requirement back in a "needed" status.

If you released an assignment of Central Office Equipment, form RF-8010 is printed to move the material from the Field Reporting Code (FRC) and Geographic Location Code (GLC) of the requirement to which it was previously assigned to the 1220.1412 (Material Held For Future Use) account (See attachment 1).

If releasing assignments and the inventory item is unassigned successfully, the system displays an appropriate message. The inventory balances shown on the INVENTORY ITEMS window are updated to reflect the results of the Unassignment transaction. The Last Transaction Number text box is updated to reflect the number of the Unassignment transaction created.

To close the INVENTORY ITEMS window, double-click the control box located in the upper left corner of the window.

Attachment 1:

The following information is printed on the RF-8010 form when unassigning Central Office Equipment:

Transfer Report No. - The state responsible for the inventory item followed by the OSPCM Material Inventory Transaction Number (e.g., KY11184).

Purpose of Transfer - This field always equals "Adj. Accounts".

Ship/Transfer From (Credit)

Location - The inventory site responsible for the inventory item.

State - The state responsible for the inventory item.

Geo. Loc. - The exception geographic location code of the substep to which the inventory item was assigned.

Auth. No. - The job number to which the inventory item was assigned.

RCO - The responsibility code of the inventory site responsible for the inventory item.

RCC - The responsibility code of the inventory site responsible for the inventory item.

Field Code - The field reporting code (FRC) of the substep to which the inventory item was assigned (i.e., 257C).

Vendor Order Number - The purchase order or select ticket on which the inventory item was shipped.

Ship/Transfer To (Debit)

Location - The inventory site responsible for the inventory item.

State - The state responsible for the inventory item.

Geo. Loc. - The geographic location code of the inventory site responsible for the inventory item.

RCO - The responsibility code of the inventory site responsible for the inventory item.

RCC - The responsibility code of the inventory site responsible for the inventory item.

Func. Code - The function code of the Material Held For Future Use account. This field is always equal to "5C5T".

Transportation Instructions

Field Code - This field defaults to 6 blanks followed by an "M". Methods and Procedures (M&Ps) will be written to instruct the user how to manually complete this section.

Engineering Contact

Engineer - The name of the user's supervisor. The "user" is the person who unassigned the inventory item.

Prepared By - The name of the person who unassigned the inventory item. The user's Common Userid (CUID) is used to obtain his/her name.

Date - The date the inventory item was unassigned. This field is always equal to the current date.

Remarks - Remarks entered at the time the inventory item was unassigned.

Equipment Description - The description of the inventory item unassigned. If the material is serialized, its serial number will be printed following the material description.

Cond. - The condition of the material. This field always equals "G" (good).

Qty. - The quantity of material unassigned.

Per - This field always equals "EA" (each).

Yr. Pl. - The year the inventory item was receipted into inventory.

VIEW ISSUES

Once an issue has been created, you may view open issues. An open issue is one that still has an outstanding issue quantity (issue quantity > zero). An issue cannot be closed until the entire issued quantity has been reported used or the unused portion has been returned to the inventory site.

Figure 93:
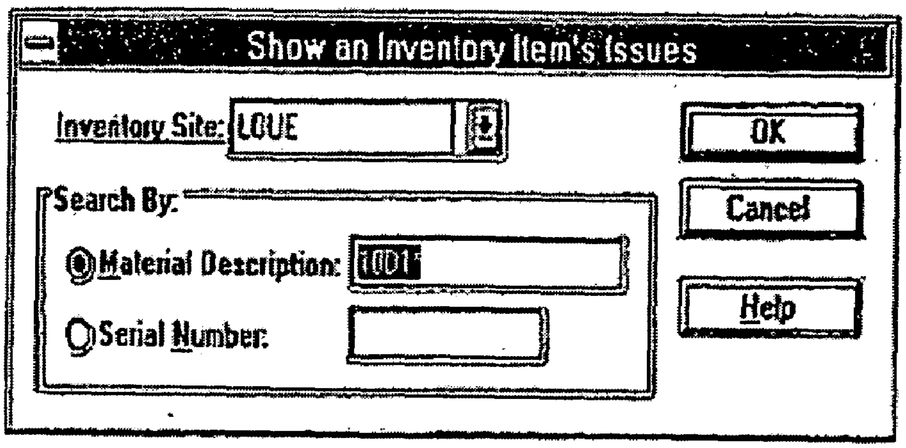
FIG. 93 is an exemplary screen print for Show an Inventory Item's Issues.

To view an issue, select "Show Issues" from the Inventory menu. The SHOW AN INVENTORY ITEM'S ISSUES dialog shown in Fig. 93 is displayed. This function is available at all times to a Materials Management Manager or Materials Management Clerical user.

This dialog allows you to choose the inventory site and inventory item for which you would like to view issues. To view issues, you must type a valid inventory site in the Inventory Site combo box or select one from its drop-down list. The drop-down list contains a list of all inventory sites in the BellSouth region, excluding warehouse and Refurbished Central Office Equipment (RCOE) sites.

You must identify the inventory item by choosing one of the following:

Material Description - Select the Material Description radio button and type a material description in the Material Description text box to view open issues for inventory items having a particular material description (serialized or non-serialized). You may type an entire material description to view issues for inventory items having that material description or you may type a partial material description using an asterisk (*) to view open issues for inventory items having a material description starting and/or ending with the portion you provided as described earlier Material Description is the default radio button.

Serial Number - Select the Serial Number radio button to view open issues for serialized inventory items and type a serial number in the Serial Number text box. You may type an entire serial number to view open issues for that serial number or you may type a partial serial number using an asterisk (*) to view open issues for a serial number starting and/or ending with the portion you provided. For example, 234* displays open issues for inventory items having a serial number starting with "234"; *234 displays inventory items having a serial number ending in "234"; 2*4 displays inventory items having a serial number starting with "2" and ending in "4".

To get additional help while on this dialog, press the HELP button. To close this dialog without viewing issues, press the CANCEL button. To close this dialog and view issues, press the OK button. The system displays an appropriate message if either of the following conditions occur:

If the inventory site entered is not valid, the system displays an error message. Respond to the message by pressing OK.

If the material description or serial number entered is not valid, an error message is displayed. Respond to the message by pressing OK.

If there are no open issues for the identified inventory item, an informative message is displayed. Respond to the message by pressing OK.

Figure 94:
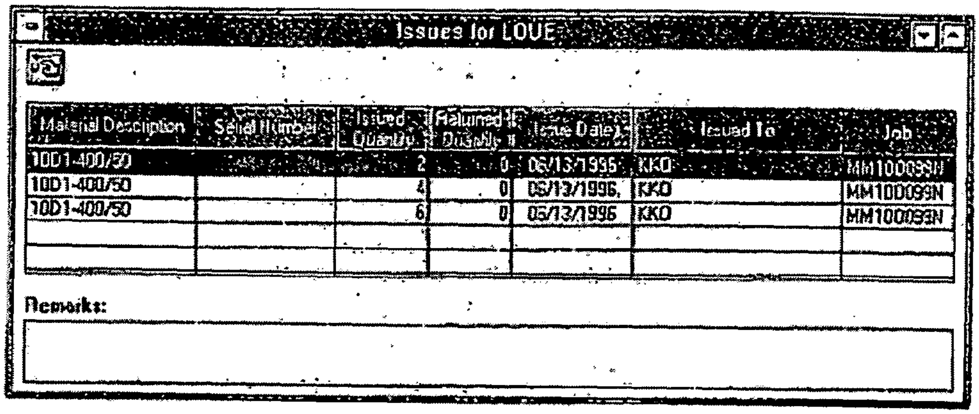

If there are open issues for the identified inventory item, the ISSUES FOR xxxx window as shown in Fig. 94 is displayed, where xxxx is the selected inventory site.

This window displays a list of all the open issues for the inventory item selected. The following information is displayed about each issue:

Material Description - The material description of the inventory item.

Serial Number - The serial number of the inventory item (if serialized).

Issued Quantity - The total quantity currently issued.

Returned Quantity - The quantity of the inventory item that you are returning. This field is populated with a zero on initial display of this window.

Issue Date - The date the inventory item was issued.

Issued To - The identifier of the person to whom the inventory item was issued.

Job - The job authority for which the inventory item was issued.

Remarks - Remarks that were recorded at issue time are shown in the Remarks text box for whichever issue has the marquee.

RETURN ISSUED MATERIAL

Under normal circumstances, an inventory item is issued, it is reported used and disbursed. When material is disbursed, the system closes the issue if the reported quantity plus any quantity auto-junked is greater than or equal to the issued quantity.

If the reported quantity is less than the issued quantity, the issue remains open until the remaining issued quantity is returned. This could happen if less than was assigned is reported, if a reel of cable is assigned to substeps that have not been worked yet or if a reel of cable has an unassigned balance.

Figure 95:
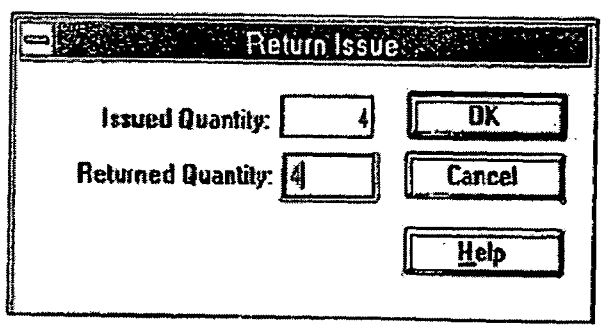
FIG. 95 is an exemplary screen print for Return Issue.

You may return issued material by indicating that all or part of the issued quantity has been returned to the inventory site. Select an issue from the grid and press the Return Issued Material toolbar button located on the ISSUES window or select "Return Issued Material" from the Actions menu. The Return Issue dialog as shown Fig. 95 is displayed. This function is available only if you have security to update inventory in this inventory site.

This dialog is used to return issued material to the inventory site. The Issued Quantity text box displays the quantity currently issued. To return issued material, type the quantity returned in the Return Quantity text box.

To get additional help while on this dialog, press the HELP button. To close this dialog without returning the issued material, press the CANCEL button. To close this dialog and return the issued material, press the OK button. The system displays an appropriate message under the following conditions:

If the quantity returned is equal to zero, an error message is displayed. Respond to the message by pressing OK.

If the returned quantity is greater than the issued quantity, an error message is displayed. Respond to the message by pressing OK, If no errors were found, the system decreases the issue quantity by the quantity returned and decreases the inventory item's at site balance by the quantity returned. If the issue quantity reaches zero, the system closes the issue. If the inventory item's at site balance reaches zero, the system marks the inventory item as no longer issued.

The Issued Quantity field on the ISSUES window is updated to reflect the current issued quantity and the Returned Quantity field is updated to reflect the total quantity returned since you displayed this window.

To close the ISSUES window, double-click the control box located in the upper left corner of the window.

VIEW MATERIAL INVENTORY TRANSACTIONS

Material inventory transactions may be viewed as a means of investigating the history of an inventory item at a specified inventory site. This section of the document describes several different ways in which transactions may be viewed.

VIEW DETAILS OF AN INVENTORY ITEM'S LAST TRANSACTION

Figure 96:
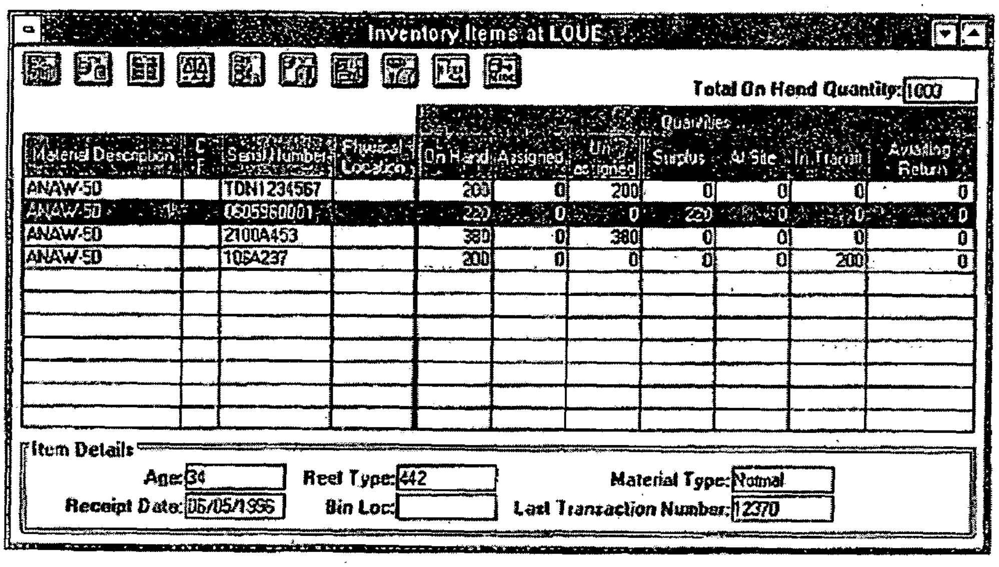
FIG. 96 is another exemplary screen print for Inventory Items.

First, display the INVENTORY ITEMS AT xxxx window, where xxxx is the selected inventory site as previously discussed in the third section of this document. The INVENTORY ITEMS window as shown in Fig. 96 is displayed.

Figure 97:
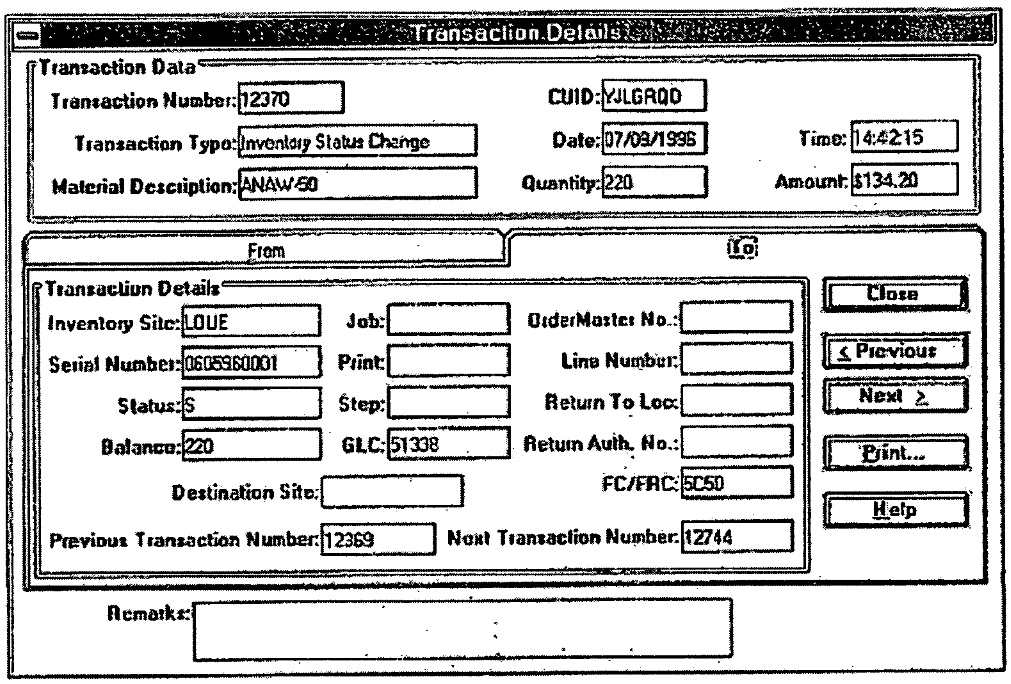
FIG. 97 is an exemplary screen print for Transaction Details.

To view the transaction details for the last transaction that affected this inventory item, select an inventory item from the grid and press the Show Transactions toolbar button located on the INVENTORY ITEMS window or select "Show Transactions" from the Actions menu. The TRANSACTION DETAILS dialog as shown in Fig. 97 is displayed. This function is available at all times to any Materials Management user.

This dialog allows you to view the details of the last transaction that affected the selected inventory item and to follow the transaction chain backwards to the first transaction that affected the selected inventory item. The Transaction Data frame displays the following general information about a transaction:

Transaction No. - The system generated number of the transaction.

Transaction Type - The type of transaction that affected this inventory item. Valid values are Order Receipt, Order Receipt Reversal, Assignment, Unassignment, Inventory Addition, Inventory Deletion, Inventory Status Change, Split A Reel, Reclassify to Exempt, Reclassify from Exempt, Transfer, Transfer Reversal, Transfer Receipt, Transfer Receipt Reversal, Return, Disbursement, Disbursement Reversal, Junk, Recover from Junk, Remove to Good, and Remove to Good Reversal.

Material Description - The material description of the inventory item affected by this transaction.

CUID - The common userid of the person who created the transaction. If this transaction was generated by the system (e.g., an assignment due to the receipt of material), this field will be populated with the word "SYSTEM".

Date - The date that the transaction occurred.

Time - The time of day that the transaction occurred.

Quantity - The quantity involved in the transaction.

Amount - The dollar amount involved in the transaction (quantity times the average price amount of the material item.) The average price of cable is per 100 feet.

A transaction can be one-sided (e.g., Order Receipt transactions) or two-sided (e.g., Transfer transactions). There are two tabs on this dialog; one displaying transaction details for the FROM side of the transaction and one displaying the transaction details for the TO side of the transaction. The Transaction Details frame displays the following information:

Inventory Site

Order Receipt - The inventory site responsible for the inventory item following the transaction.

Order Receipt Reversal - The inventory site responsible for the inventory item prior to the transaction.

Assignment - The inventory site responsible for the inventory item prior to the transaction. (This is the same as the To Inventory Site). The inventory site responsible for the inventory item following the transaction. (This is the same as the From Inventory Site).

Unassignment - The inventory site responsible for the inventory item prior to the transaction. (This is the same as the To Inventory Site). The inventory site responsible for the inventory item following the transaction. (This is the same as the From Inventory Site)

Inventory Status Change - The inventory site responsible for the inventory item prior to the transaction. (This is the same as the To Inventory Site). The inventory site responsible for the inventory item following the transaction. (This is the same as the From Inventory Site).

Inventory Addition - The inventory site responsible for the inventory item following the transaction.

Inventory Deletion - The inventory site responsible for the inventory item prior to the transaction.

Split A Reel - The inventory site responsible for the inventory item prior to the transaction. (This is the same as the To Inventory Site). The inventory site responsible for the inventory item following the transaction. (This is the same as the From Inventory Site).

Transfer - The inventory site from which the inventory item was transferred. (The inventory site of the "sending" location). The inventory site from which the inventory item was transferred. (The inventory site of the "sending" location). The "to" and "from" inventory site is the same on a Transfer transaction since the "receiving" location does not take responsibility for the inventory item until the transfer is received. The Transfer transaction only moves the inventory item from the unassigned or surplus status to the in-transit status in the "sending" location.

Transfer Reversal - The inventory site from which the inventory item was transferred. (The inventory site of the "sending" location). The "to" and "from" inventory site is the same on a Transfer Reversal transaction since the "receiving" location does not take responsibility for the inventory item until the transfer is received. The Transfer Reversal transaction only moves the inventory item from the in-transit status back to the unassigned or surplus status in the "sending" location. The inventory site from which the inventory item was transferred. (The inventory site of the "sending" location).

Transfer Receipt - The inventory site responsible for the inventory item prior to the transaction. (The inventory site of the "sending" location). The inventory site responsible for the inventory item prior to the transaction. (The inventory site of the 'receiving" location).

Transfer Receipt Reversal - The inventory site responsible for the inventory item prior to the transaction. (The inventory site of the "receiving" location). The inventory site responsible for the inventory item following the transaction. (The inventory site of the "sending" location).

Reclassify to Exempt - The inventory site responsible for the inventory item following the transaction.

Reclassify from Exempt - The inventory site responsible for the inventory item prior to the transaction.

Return - The inventory site responsible for the inventory item prior to the transaction.

Disbursement - The inventory site responsible for the inventory item prior to the transaction.

Disbursement Reversal - -The inventory site responsible for the inventory item following the transaction.

Remove to Good - The inventory site responsible for the inventory item following the transaction.

Remove to Good Reversal - The inventory site responsible for the inventory item prior to the transaction.

Junk - The inventory site responsible for the inventory item prior to the transaction.

Recover from Junk - The inventory site responsible for the inventory item following the transaction.

Serial Number - Displayed only if the inventory item is serialized.

Order Receipt - The serial number of the inventory item following the transaction.

Order Receipt Reversal - The serial number of the inventory item prior to the transaction.

Assignment - The serial number of the inventory item prior to the transaction. (This is the same as the To Serial Number). The serial number of the inventory item following the transaction. (This is the same as the From Serial Number).

Unassignment - The serial number of the inventory item prior to the transaction. (This is the same as the To Serial Number). The serial number of the inventory item following the transaction. (This is the same as the From Serial Number).

Inventory Status Change - The serial number of the inventory item prior to the transaction. (This is the same as the To Serial Number). The serial number of the inventory item following the transaction. (This is the same as the From Serial Number).

Inventory Addition - The serial number of the inventory item following the transaction.

Inventory Deletion - The serial number of the inventory item prior to the transaction.

Split A Reel - The serial number from which the inventory item was split. The serial number to which the inventory item was split.

Transfer - The serial number of the inventory item prior to the transaction. (This is the same as the To Serial number). The serial number of the inventory item following the transaction. (This is the same as the From Serial Number).

Transfer Reversal - The serial number of the inventory item prior to the transaction. (This is the same as the To Serial number). The serial number of the inventory item following the transaction. (This is the same as the From Serial Number).

Transfer Receipt - The serial number of the inventory item prior to the transaction. (This is the same as the To Serial number). The serial number of the inventory item following the transaction. (This is the same as the From Serial Number).

Transfer Receipt Reversal - The serial number of the inventory item prior to the transaction. (This is the same as the To Serial number). The serial number of the inventory item following the transaction. (This is the same as the From Serial Number).

Reclassify to Exempt - The serial number of the inventory item prior to the transaction.

Reclassify from Exempt - The serial number of the inventory item following the transaction.

Return - The serial number of the inventory item prior to the transaction.

Disbursement - The serial number of the inventory item prior to the transaction.

Disbursement Reversal - The serial number of the inventory item following the transaction.

Remove to Good - The serial number of the inventory item following the transaction.

Remove to Good Reversal - The serial number of the inventory item prior to the transaction.

Junk - The serial number of the inventory item prior to the transaction.

Recover from Junk - The serial number of the inventory item following the transaction.

Status

Order Receipt - The status of the inventory item following the transaction. In this case, the value is "U" (unassigned).

Order Receipt Reversal - The status of the inventory item prior to the transaction. In this case, the value is "U".

Assignment - The status of the inventory item prior to the transaction. In this case, the value is "U" or "S" (surplus). The status of the inventory item following the transaction. In this case, the value is "A" (assigned).

Unassignment - The status of the inventory item prior to the transaction. In this case, the value is "A". The status of the inventory item following the transaction. In this case, the value is "U".

Inventory Status Change - The status of the inventory item prior to the transaction. In this case, the value is "U", "S", or "AR" (awaiting return). The status of the inventory item following the transaction. In this case, the value is "U", "S", or "AR".

Inventory Addition - The status of the inventory item following the transaction. In this case, the value is "U".

Inventory Deletion - The status of the inventory item prior to the transaction. In this case, the value is "U" or "S".

Split A Reel - The status of the inventory item prior to the transaction. In this case, the value is "U", "S", or "A". The status of the inventory item following the transaction. In this case, the value is "U", "S", or "A".

Transfer - The status of the inventory item prior to the transaction. In this case, the value is "U" or "S". The status of the inventory item following the transaction. In this case, the value is "IT" (in transit).

Transfer Reversal - The status of the inventory item prior to the transaction. In this case, the value is "IT". The status of the inventory item following the transaction. In this case, the value is "U or "S".

Transfer Receipt - The status of the inventory item prior to the transaction. In this case, the value is "IT". The status of the inventory item following the transaction. In this case, the value is "U".

Transfer Receipt Reversal - The status of the inventory item prior to the transaction. In this case, the value is "U". The status of the inventory item following the transaction. In this case, the value is "IT".

Reclassify to Exempt - The status of the inventory item prior to the transaction. In this case, the value is "U" or "S".

Reclassify from Exempt - The status of the inventory item following the transaction. In this case, the value is "U".

Return - The status of the inventory item prior to the transaction. In this case, the value is "AR".

Disbursement - The status of the inventory item prior to the transaction. In this case, the value is "A".

Disbursement Reversal - The status of the inventory item following the transaction. In this case, the value is "A".

Remove to Good - The status of the inventory item following the transaction. In this case, the value is "U".

Remove to Good Reversal - The status of the inventory item prior to the transaction. In this case, the value is "U".

Junk - The status of the inventory item prior to the transaction. In this case, the value is "U" or "S".

Recover from Junk - The status of the inventory item following the transaction. In this case, the value is "U".

Balance - For non-serialized inventory, the balance represents the quantity of inventory of a particular inventory status for this material description at this inventory site. For serialized inventory, the balance represents the quantity of inventory of a particular inventory status for this serial number at this inventory site.

Order Receipt - The balance of the inventory item in the unassigned status following the transaction.

Order Receipt Reversal - The balance of the inventory item in the unassigned status following the transaction.

Assignment - The balance of the inventory item in the unassigned or surplus status following the transaction. The balance of the inventory item in the assigned status following the transaction.

Unassignment - The balance of the inventory item in the assigned status following the transaction. The balance of the inventory item in the unassigned, surplus, or awaiting return status following the transaction.

Inventory Status Change - The balance of the inventory item in the unassigned, surplus, or awaiting return status following the transaction. The balance of the inventory item in the unassigned, surplus, or awaiting return status following the transaction.

Inventory Addition - The balance of the inventory item in the unassigned status following the transaction.

Inventory Deletion - The balance of the inventory item in the unassigned or surplus status following the transaction.

Split A Reel - The balance of the inventory item in the unassigned, surplus, or assigned status following the transaction. The balance of the inventory item in the unassigned, surplus, or assigned status following the transaction.

Transfer - The balance of the inventory item in the unassigned or surplus status following the transaction. The balance of the inventory item in the intransit status following the transaction.

Transfer Reversal - The balance of the inventory item in the intransit status following the transaction. The balance of the inventory item in the unassigned or surplus status following the transaction.

Transfer Receipt - The balance of the inventory item in the intransit status following the transaction. The balance of the inventory item in the unassigned status following the transaction.

Transfer Receipt Reversal - The balance of the inventory item in the unassigned status following the transaction. The balance of the inventory item in the intransit status following the transaction.

Reclassify to Exempt - The balance of the inventory item in the unassigned or surplus status following the transaction.

Reclassify from Exempt - The balance of the inventory item in the unassigned status following the transaction.

Return - The balance of the inventory item in the awaiting return status following the transaction.

Disbursement - The balance of the inventory item in the assigned status following the transaction.

Disbursement Reversal - The balance of the inventory item in the assigned status following the transaction.

Remove to Good - The balance of the inventory item in the unassigned status following the transaction.

Remove to Good Reversal - The balance of the inventory item in the unassigned status following the transaction.

Junk - The balance of the inventory item in the unassigned or surplus status following the transaction.

Recover from Junk - The balance of the inventory item in the unassigned status following the transaction.

Destination Site

Transfer - The inventory site to which the inventory item was transferred,, (The inventory site of the "receiving" location).

Transfer Reversal - The inventory site to which the inventory item was transferred. (The inventory site of the "receiving" location).

Job

Assignment - The job authority to which the inventory item is assigned following the transaction.

Unassignment - The job authority to which the inventory item was assigned prior to the transaction.

Split A Reel - If splitting assigned inventory, this field displays the job authority to which the inventory was assigned prior to the transaction. (This is the same as the To Job). If splitting assigned inventory, this field displays the job authority to which the inventory was assigned following the transaction. (This is the same as the From Job).

Disbursement - The job authority to which the inventory item was assigned prior to the transaction.

Disbursement Reversal - The job authority to which the inventory item was re-assigned following the transaction.

Junk - If this transaction was created as a result of a disbursement (CUID –"AUTOJNK" for an auto-junk), this field displays the job authority of the last assignment on the reel; otherwise this field is blank.

Print

Assignment - The job print to which the inventory item is assigned following the transaction.

Unassignment - The job print to which the inventory item was assigned prior to the transaction.

Split A Reel - If splitting assigned inventory, this field displays the job print to which the inventory was assigned prior to the transaction. (This is the same as the To Print). If splitting assigned inventory, this field displays the job print to which the inventory was assigned following the transaction. (This is the same as the From Print).

Disbursement - The job print to which the inventory item was assigned prior to the transaction.

Disbursement Reversal - The job print to which the inventory item was reassigned following the transaction.

Junk - If this transaction was created as a result of a disbursement (CUID = "AUTOJNK" for an auto-junk), this field displays the job print of the last assignment on the reel; otherwise this field is blank.

Step

Assignment - The job step to which the inventory item was assigned following to the transaction.

Unassignment - The job step to which the inventory item is assigned prior to the transaction.

Split A Reel - If splitting assigned inventory, this field displays the job step to which the inventory was assigned prior to the transaction. (This is the same as the To Step). If splitting assigned inventory, this field displays the job step to which the inventory was assigned following the transaction. (This is the same as the From Step).

Disbursement - The job step to which the inventory item was assigned prior to the transaction.

Disbursement Reversal - The job step to which the inventory item was reassigned following the transaction.

Junk - If this transaction was created as a result of a disbursement (CUID –"AUTOJNK" for an auto-junk), this field displays the job step of the last assignment on the reel; otherwise this field is blank.

GLC - The geographic location code

Order Receipt -If the material is central office equipment (mtl_process_cd = "CE"), this field displays the exception GLC of the job substep for which it was ordered; otherwise it displays the GLC of the inventory site responsible for the inventory item following the transaction.

Order Receipt Reversal - If the material is central office equipment, this field displays the exception GLC of the job substep for which it was ordered; otherwise it displays the GLC of the inventory site responsible for the inventory item prior to the transaction.

Assignment - If this assignment is due to an order receipt and the inventory item is central office equipment, this field displays the exception GLC of the job substep for which it was ordered; otherwise it displays the GLC of the inventory site responsible for the inventory item. If the inventory item is central office equipment, this field displays the exception GLC of the job substep to which it is assigned; otherwise it displays the GLC of the inventory site responsible for the inventory item.

Unassignment - If the inventory item is central office equipment, this field displays the exception GLC of the job substep to which it was assigned; otherwise it displays the GLC of the inventory site responsible for the inventory item. The GLC of the inventory site responsible for the inventory item.

Inventory Status Change - The GLC of the inventory site responsible for the inventory item. (This is the same as the To GLC). The GLC of the inventory site responsible for the inventory item. (This is the same as the From GLC).

Inventory Addition - The GLC of the inventory site responsible for the inventory item following the transaction.

Inventory Deletion - The GLC of the inventory site responsible for the inventory item prior to the transaction.

Split A Reel - The GLC of the inventory site responsible for the inventory item prior to the transaction. (This is the same as the To GLC). The GLC of the inventory site responsible for the inventory item following to the transaction. (This is the same as the From GLC).

Transfer - The GLC of the inventory site from which the inventory item was transferred. (The GLC of the "sending" inventory site). The GLC of the inventory site from which the inventory item was transferred. (The GLC of the "sending" inventory site). Since the "to" and "from" inventory site represents the "sending" inventory site on a Transfer transaction, the "to" and "from" GLC represents the GLC of the "sending" inventory site.

Transfer Reversal - The GLC of the inventory site from which the inventory item was transferred. (The GLC of the "sending" inventory site). Since the "to" and "from" inventory site represents the "sending" inventory site on a Transfer Reversal transaction, the "to" and "from" GLC represents the GLC of the "sending" inventory site. The GLC of the inventory site from which the inventory item was transferred. (The GLC of the "sending" inventory site).

Transfer Receipt - The GLC of the inventory site responsible for the inventory item prior to the transaction. (The GLC of the "sending" inventory site). The GLC of the inventory site responsible for the inventory item prior to the transaction. (The GLC of the "receiving" inventory site).

Transfer Receipt Reversal - The GLC inventory site responsible for the inventory item prior to the transaction. (The GLC of the "receiving" inventory site). The GLC of the inventory site responsible for the inventory item following the transaction. (The GLC of the "sending" inventory site).

Reclassify to Exempt - The GLC inventory site responsible for the inventory item prior to the transaction.

Reclassify from Exempt - The GLC of the inventory site responsible for the inventory item following the transaction.

Return - The GLC of the inventory site responsible for the inventory item prior to the transaction.

Disbursement - If the inventory item is central office equipment, this field displays the exception GLC of the job substep to which it was assigned; otherwise it displays the GLC of the inventory site responsible for the inventory item.

Disbursement Reversal - If the inventory item is central office equipment, this field displays the exception GLC of the job substep to which it is assigned; otherwise it displays the GLC of the inventory site responsible for the inventory item.

Remove to Good - The GLC of the inventory site responsible for the inventory item following the transaction.

Remove to Good Reversal - The GLC of the inventory site responsible for the inventory item prior to the transaction,

Junk - The GLC of the inventory site responsible for the inventory item prior to the transaction.

Recover from Junk - The GLC of the inventory site responsible for the inventory item following the transaction.

Order Master No.

Order Receipt - The OrderMaster Number on which the inventory item was ordered.

Order Receipt Reversal - The OrderMaster Number on which the inventory item was ordered.

Line Number

Order Receipt - The OrderMaster Line Number on which the inventory item was ordered.

Order Receipt Reversal - The OrderMaster Line Number on which the inventory item was ordered.

Return To Loc

Return - The vendor or warehouse to which the inventory item was returned.

Return Auth No.

Return – The Return Authorization Number assigned to the return.

FC/FRC - The function code (FC) or Field Reporting Code (FRC) affected by this transaction.

Order Receipt - If the material was ordered direct to code, this field displays the FRC (e.g., 22C) to which the material was ordered; otherwise it displays the FC "5C50".

Order Receipt Reversal - If the material was ordered direct to code, this field displays the FRC to which the material was ordered; otherwise it displays the FC "5C50".

Assignment - If this assignment is due to an order receipt and the inventory item was ordered direct to code, this field displays the FRC to which the material was ordered; otherwise it displays the FC "5C50". If this assignment is not due to an order receipt and the inventory item is central office equipment this field displays the FC "5C5T". If this assignment is due to an order receipt and the inventory item was ordered direct to code, this field displays the FRC to which the material was ordered; otherwise it displays the FC "5C50". If this assignment is not due to an order receipt and the inventory item is central office equipment, this field displays the FRC of the job substep to which the inventory item is assigned.

Unassignment - If the inventory item was ordered direct to code, this field displays the FRC of the job substep to which it was assigned; otherwise it displays the FC "5C50". If the inventory item is central office equipment, this field displays the FC "5C5T"; otherwise it displays the FC "5C50".

Inventory Status Change - If the inventory item is central office equipment, this field displays the FC "5C5T"; otherwise it displays the FC "5C50". If the inventory item is central office equipment, this field displays the FC "5C5T"; otherwise it displays the FC"5C50".

Inventory Addition - If the inventory item is central office equipment, this field displays the FC "5C5T"; otherwise it displays the FC "5C50".

Inventory Deletion - If the inventory item is central office equipment, this field displays the FC "5C5T"; otherwise it displays the FC"5C50".

Split A Reel - This field always displays the FC"5C50". Note: Only cable may be split and cable is not central office equipment nor is it ordered direct to code. This field always displays theFC"5C50". Note: Only cable may be split and cable is not central office equipment nor is it ordered direct to code.

Transfer - If the inventory item is central office equipment, this field displays the FC "5C5T"; otherwise it displays the FC"5C50". If the inventory item is central office equipment, this field displays the FC "5C5T"; otherwise it displays the FC "5C50".

Transfer Reversal - If the inventory item is central office equipment, this field displays the FC "5C5T"; otherwise it displays the FC "5C50". If the inventory item is central office equipment, this field displays the FC "5C5T"; otherwise it displays the FC "5C50".

Transfer Receipt - If the inventory item is central office equipment, this field displays the FC "5C5T"; otherwise it displays the FC "5C50". If the inventory item is central office equipment, this field displays the FC "5C5T"; otherwise it displays the FC "5C50".

Transfer Receipt Reversal - If the inventory item is central office equipment, this field displays the FC "5C5T"; otherwise it displays the FC"5C50". If the inventory item is central office equipment, this field displays the FC "5C5T"; otherwise it displays the FC "5C50".

Reclassify to Exempt - If the inventory item is central office equipment, this field displays the FC "5C5T"; otherwise it displays the FC "5C50".

Reclassify from Exempt - If the inventory item is central office equipment, this field displays the FC "5C5T"; otherwise it displays the FC "5C50".

Return - If the inventory item is central office equipment, this field displays the FC "5C5T"; otherwise it displays the FC "5C50".

Disbursement - If the inventory item was ordered direct to code, this field displays the FRC to which the material was ordered; otherwise it displays the FC "5C50".

Disbursement Reversal - If the inventory item was ordered direct to code, this field displays the FRC to which the material was ordered; otherwise it displays the FC "5C50".

Remove to Good - If the inventory item is central office equipment, this field displays the FC "5C5T"; otherwise it displays the FC "5C50".

Remove to Good Reversal - If the inventory item is central office equipment, this field displays the FC "5C5T"; otherwise it displays the FC "5C50".

Junk - If this transaction was created as a result of a disbursement (CUID = "AUTOJNK" for an auto-junk), this field displays the FRC of the last assignment on the reel; otherwise it displays the FC "5C50".

Recover from Junk - If this transaction was created as a result of a disbursement reversal (CUID = "SYSTEM"), this field displays the FRC that the inventory item was junked from; otherwise it displays the FC "5C50".

Previous Transaction Number - The previous transaction number that affected this inventory item at this inventory site (e.g., If this was an Assignment transaction for serial number 1234 at inventory site SVVL, the previous transaction number could be an Order Receipt transaction for serial number 1234 at SVVL).

Order Receipt - The transaction number that affected this inventory item prior to this transaction. If this is non-serialized material without an existing inventory balance or if this is serialized material, the previous transaction number is 0 since this is the start of its transaction chain.

Order Receipt Reversal - The transaction number that affected this inventory item prior to this transaction.

Assignment - The transaction number that affected this inventory item prior to this transaction. (This is the same as the To Previous Transaction Number). The transaction number that affected this inventory item prior to this transaction. (This is the same as the From Previous Transaction Number).

Unassignment - The transaction number that affected this inventory item prior to this transaction. (This is the same as the To Previous Transaction Number). The transaction number that affected this inventory item prior to this transaction. (This is the same as the To Previous Transaction Number).

Inventory Status Change - The transaction number that affected this inventory item prior to this transaction. (This is the same as the From Previous Transaction Number). The transaction number that affected this inventory item prior to this transaction. (This is the same as the From Previous Transaction Number).

Inventory Addition - The transaction number that affected this inventory item prior to this transaction. If this is non-serialized material without an existing inventory balance or if this is serialized material, the previous transaction number is 0 since this is the start of its transaction chain.

Inventory Deletion - The transaction number that affected this inventory item prior to this transaction.

Split A Reel - The transaction number that affected this inventory item (i.e., the old reel) prior to this transaction. The transaction number that affected this inventory item (i.e., the new reel) prior to this transaction. Since the split was made to a new reel, the To Previous Transaction Number is 0 since this is the start of its transaction chain.

Transfer - The transaction number that affected this inventory item prior to this transaction at the old inventory site. (Since the inventory site did not change on a Transfer transaction, this is the same as the To Previous Transaction Number). The transaction number that affected this inventory item prior to this transaction at the old inventory site. (Since the inventory site did not change on a Transfer transaction, this is the same as the From Previous Transaction Number).

Transfer Reversal - The transaction number that affected this inventory item prior to this transaction at the old inventory site. (Since the inventory site did not change on a Transfer Reversal transaction, this is the same as the To Previous Transaction Number). The transaction number that affected this inventory item prior to this transaction at the old inventory site. (Since the inventory site did not change on a Transfer Reversal transaction, this is the same as the From Previous Transaction Number).

Transfer Receipt - The transaction number that affected this inventory item prior to this transaction at the old inventory site. The transaction number that affected this inventory item prior to this transaction at the new inventory site. If the inventory item does not already exist in the new inventory site, the To Previous Transaction Number is 0 since this is the start of its transaction chain.

Transfer Receipt Reversal - The transaction number that affected this inventory item prior to this transaction at the new inventory site. The transaction number that affected this inventory item prior to this transaction at the old inventory site.

Reclassify to Exempt - The transaction number that affected this inventory item prior to this transaction.

Reclassify from Exempt - The transaction number that affected this inventory item prior to this transaction. If this is non-serialized material without an existing inventory balance or if this is serialized material, the previous transaction number is 0 since this is the start of its transaction chain.

Return - The transaction number that affected this inventory item prior to this transaction.

Disbursement - The transaction number that affected this inventory item prior to this transaction.

Disbursement Reversal - The transaction number that affected this inventory item prior to this transaction.

Remove to Good - The transaction number that affected this inventory item prior to this transaction. If this is non-serialized material without an existing inventory balance or if this is serialized material, the previous transaction number is 0 since this is the start of its transaction chain.

Remove to Good Reversal - The transaction number that affected this inventory item prior to this transaction.

Junk - The transaction number that affected this inventory item prior to this transaction.

Recover from Junk - The transaction number that affected this inventory item prior to this transaction. If this is non-serialized material without an existing inventory balance or if this is serialized material, the previous transaction number is 0 since this is the start of its transaction chain.

Next Transaction Number - The next transaction number that affected this inventory item at this inventory site (e.g., If this was an Assignment transaction for serial number 1234 at inventory site SVVL, the next transaction number could be a Disbursement transaction for serial number 12.34 at inventory site SWL).

Order Receipt - The transaction number that affected this inventory item following this transaction.

Order Receipt Reversal - The transaction number that affected this inventory item following this transaction. If this is non-serialized material without an inventory balance or if this is serialized material, the From Next Transaction is 0 since this is the end of its transaction chain.

Assignment - The transaction number that affected this inventory item following this transaction. (This is the same as the To Next Transaction Number). The transaction number that affected this inventory item following this transaction. (This is the same as the From Next Transaction Number).

Unassignment - The transaction number that affected this inventory item following this transaction. (This is the same as the To Next Transaction Number). The transaction number that affected this inventory item following this transaction. (This is the same as the To Next Transaction Number).

Inventory Status Change - The transaction number that affected this inventory item following this transaction. (This is the same as the To Next Transaction Number). The transaction number that affected this inventory item following this transaction. (This is the same as the From Next Transaction Number).

Inventory Addition - The transaction number that affected this inventory item following this transaction.

Inventory Deletion - The transaction number that affected this inventory item following this transaction. If this is non-serialized material without an inventory balance or if this is serialized material, the From Next Transaction is 0 since this is the end of its transaction chain.

Split A Reel - The transaction number that affected this inventory item (i.e., the old reel) following this transaction. If the entire reel was split to a new reel, the From Next Transaction is 0 since this is the end of its transaction chain. The transaction number that affected this inventory item (i.e., the new reel) following this transaction.

Transfer - The transaction number that affected this inventory item following this transaction at the old inventory site. (Since the inventory site did not change on a Transfer transaction, this is the same as the To Previous Transaction Number). The transaction number that affected this inventory item following this transaction at the old inventory site. (Since the inventory site did not change on a Transfer transaction, this is the same as the From Previous Transaction Number).

Transfer Reversal - The transaction number that affected this inventory item following this transaction at the old inventory site. (Since the inventory site did not change on a Transfer Reversal transaction, this is the same as the To Previous Transaction Number). The transaction number that affected this inventory item following this transaction at the old inventory site. (Since the inventory site did not change on a Transfer Reversal transaction, this is the same as the From Previous Transaction Number).

Transfer Receipt - The transaction number that affected this inventory item following this transaction at the old inventory site. If this is non-serialized material without an inventory balance or if this is serialized material, the From Next Transaction is 0 since this is the end of its transaction chain (unless the transfer receipt is reversed, then the From Next Transaction is the transaction number of the Transfer Receipt Reversal). The transaction number that affected this inventory item following this transaction at the new inventory site.

Transfer Receipt Reversal - The transaction number that affected this inventory item following this transaction at the new inventory site. If this is non-serialized material without an inventory balance or if this is serialized material, the From Next Transaction is 0 since this is the end of its transaction chain. The transaction number that affected this inventory item following this transaction at the old inventory site.

Reclassify to Exempt - The transaction number that affected this inventory item following this transaction. If this is non-serialized material without an inventory balance or if this is serialized material, the From Next Transaction is 0 since this is the end of its transaction chain.

Reclassify from Exempt - The transaction number that affected this inventory item following this transaction.

Return - The transaction number that affected this inventory item following this transaction. If this is non-serialized material without an inventory balance or if this is serialized material, the From Next Transaction is 0 since this is the end of its transaction chain.

Disbursement - The transaction number that affected this inventory item following this transaction. If this is non-serialized material without an inventory balance or if this is serialized material, the From Next Transaction is 0 since this is the end of its transaction chain.

Disbursement Reversal - The transaction number that affected this inventory item prior to this transaction.

Remove to Good - The transaction number that affected this inventory item prior to this transaction.

Remove to Good Reversal - The transaction number that affected this inventory item following this transaction. If this is non-serialized material without an inventory balance or if this is serialized material, the From Next Transaction is 0 since this is the end of its transaction chain.

Junk - The transaction number that affected this inventory item following this transaction. If this is non-serialized material without an inventory balance or if this is serialized material, the From Next Transaction is 0 since this is the end of its transaction chain.

Recover from Junk - The transaction number that affected this inventory item following this transaction.

The Remarks text box displays the remarks that were entered at the time the transaction was created.

Using the PREVIOUS and NEXT buttons allows you to trace the history of an inventory item. Press the PREVIOUS button to have the system display the previous transaction that affected this inventory item at this inventory site. Press the NEXT button to have the system display the next transaction that affected this inventory item at this inventory site.

Figure 98:
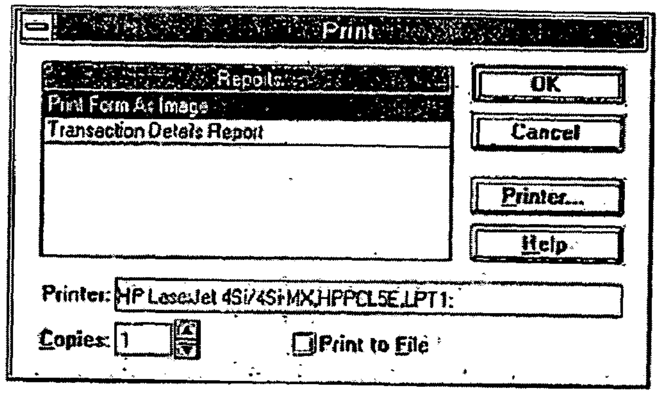
FIG. 98 is an exemplary screen print for Print from a Transaction Details Report.

To print a Transaction Details report, press the PRINT button. The PRINT dialog as shown in Fig. 98 is displayed.

Figure 99:
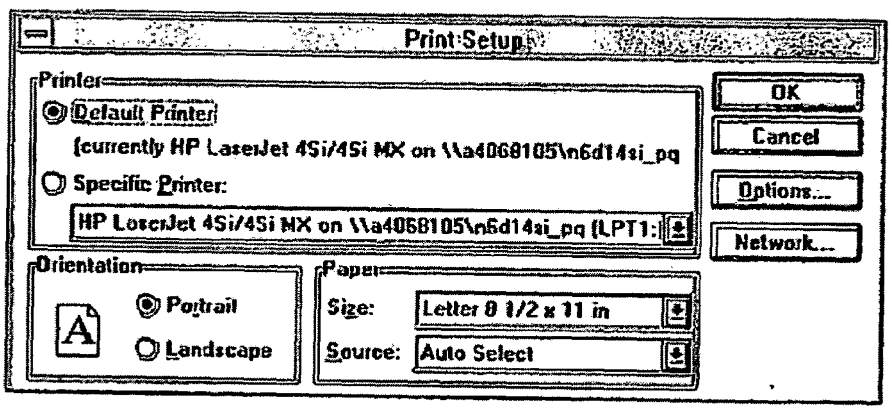
FIG. 99 is an exemplary screen print for Print Setup for Print Screen as shown in FIG. 98.

This dialog allows you to print a report. The Reports grid contains a list of the available reports. The Copies text box sets the number of copies to print and defaults to 1. The Print to File check box allows you to save the report in a file instead of printing it on paper. The Printer text box displays your default printer. To change the printer, press the PRINTER button. The PRINT SETUP dialog as shown in Fig. 99 is displayed.

This is the Microsoft Windows Print Setup dialog that allows you to change your default printer.

To get help while on the PRINT dialog, press the HELP button. To close the dialog without printing, press the CANCEL button.

To print a copy of the current window as an image (aka screen print), select Print Form as Image from the Reports grid and press the OK button. An image of the TRANSACTION DETAILS window is printed.

To print a Transaction Details report, which shows the To and From sides of the transaction simultaneously, select Transaction Details Report from the Reports grid and press the OK button. A Transaction Details report similar to the one shown below is generated.

MP-10339 TRANSACTION DETAILS
By: Karin Olinger (yjlgrqd)
Date: 07/18/1996
Job: MA04MITD
Site:

Transaction Data:

| | | |
|---|---|---|
| Transaction Number: 12799 | CUID: YJLGRQD | |
| Transaction Type: Inventory Status Change | Date: 07/18/1996 | Time: 14:59:25 |
| Material Description: 10A1-200/30 | Quantity: 1 | Amount: $90.58 |
| Remarks: | | |

Transaction Details:

FROM:

| | | |
|---|---|---|
| Inventory Site: LOUE | Job: | OrderMaster No.: |
| Serial Number: | Print: | Line Number: |
| Status: U | Step: | Return To Loc: |
| Balance: 2 | GeoLoc: 51338 | Return Auth. No.: |
| Destination Site: | | FC/FRC: 5C50 |
| Previous Transaction Number: 12798 | Next Transaction Number: 12801 | |

TO:

| | | |
|---|---|---|
| Inventory Site: LOUE | Job: | OrderMaster No.: |
| Serial Number: | Print: | Line Number: |
| Status: AR | Step: | Return To Loc: |
| Balance: 1 | GeoLoc: 51338 | Return Auth. No.: |
| Destination Site: | | FC/FRC: 5C50 |
| Previous Transaction Number: 12798 | Next Transaction Number: 12801 | |

To get additional help while on the Transaction Details dialog, press the HELP button. To close the dialog, press the CLOSE button.

To close the INVENTORY ITEMS window, double-click the control box located in the upper left corner of the window.

VIEW MULTIPLE TRANSACTIONS

Figure 100:
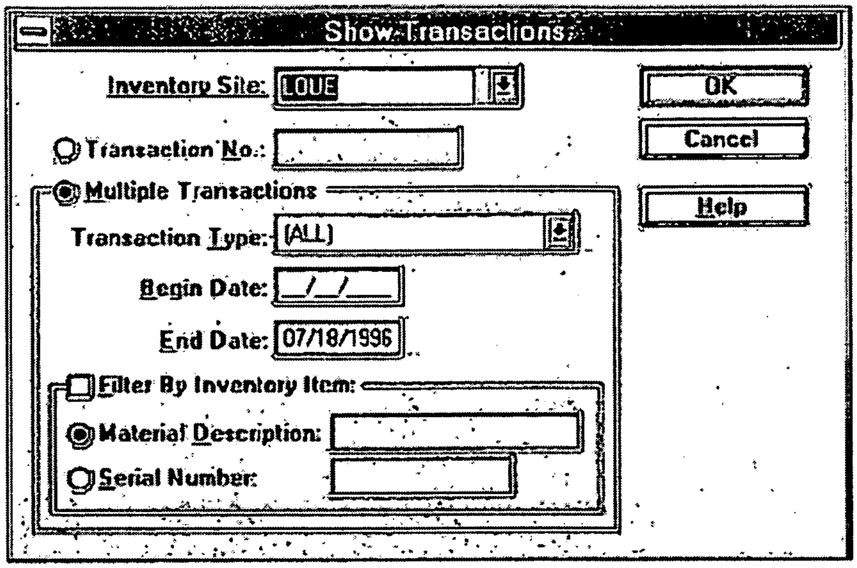
FIG. 100 is an exemplary screen print for Show Transactions.

To view multiple transactions, press the Show Transactions toolbar button located on the main MATERIALS MANAGEMENT window or select "Show Transactions" from the Inventory menu. The SHOW TRANSACTIONS dialog as shown in Fig. 100 is displayed. This function is available at all times to any Materials Management user.

To identify the transactions to view, you must provide the following information:

Inventory Site - Type a valid inventory site in the Inventory Site list box or select one from its drop down list. The drop down list contains a list of all inventory sites including warehouse and Refurbished Central Office Equipment (RCOE) sites. If the inventory site entered is not valid, the system displays an appropriate error message when you leave this field. Respond to the message by pressing OK.

Next, click the Multiple Transactions radio button (this is the default) to indicate that you wish to view multiple transactions. Once clicked, you may optionally view transactions of a specific type, within a specific date range, or for a specific inventory item. To filter the transactions to be displayed identify one or more of the following:

Transaction Type - Select a valid transaction type from the Transaction Type drop down list to indicate that only transactions of a specific type are to be displayed or accept the default of "ALL". Available transaction types are Order Receipt, Order Receipt Reversal, Assignment, Unassignment, Inventory Addition, Inventory Deletion, Inventory Status Change, Split A Reel, Reclassify to Exempt, Reclassify from Exempt, Transfer, Transfer Reversal, Transfer Receipt, Transfer Receipt Reversal, Return, Disbursement, Disbursement Reversal, Junk, Recover from Junk, Remove to Good, and Remove to Good Reversal.

Begin Date - Type a valid date in the Begin Date text box to indicate that only transactions created on this date or later are to be displayed. There is no default.

End Date - Type a valid date in the End Date text box to indicate that only transactions created prior to this date or earlier are to be displayed. The End Date defaults to the current date.

You may view the transactions for a specific inventory item by selecting the Filter by Inventory Item check box and selecting one of the following radio buttons:

Material Description - Select this radio button to view transactions for a particular serialized or non-serialized material description (This is the default). Type a valid material description in the Material Description text box. You may type an entire material description to view transactions involving that material description or you may type a partial material description using an asterisk (*) to view material descriptions starting and/or ending with the portion you provided as described earlier. Material Description is the default radio button.

Serial Number - Select this radio button to view transactions for a particular serial number. Type a serial number in the Serial Number text box. You may type an entire serial number to view transactions involving a that serial number or you may type a partial serial number using an asterisk (*) to view transactions involving a serial number starting and/or ending with the portion you provided. For example, 234* displays inventory items having a serial number starting with "2.34";

*234 displays inventory items having a serial number ending in "234"; 2*4 displays inventory items having a serial number starting with "2" and ending in "4".

To get additional help while on this dialog, press the HELP button. To close this dialog without displaying transactions, press the CANCEL button. To close this dialog and display the transactions that meet your criteria, press the OK button. The system displays an appropriate error message if the following conditions occur:

If the material description is not valid.

If an invalid date is entered (e.g., 2/31/95).

If the begin date or end date is greater than the current date.

If the begin date is greater than the end date.

Respond to the message by pressing OK.

Figure 101:
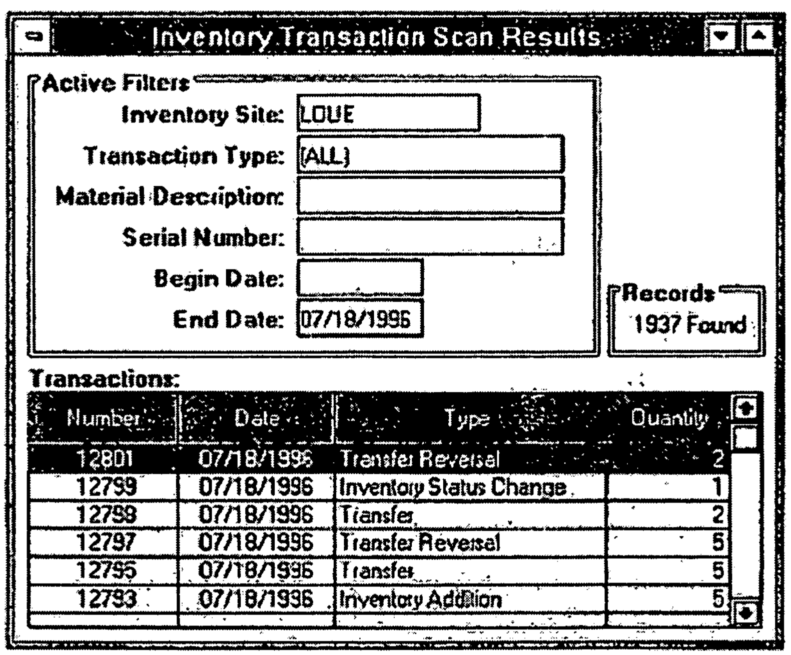
FIG. 101 is an exemplary screen print for Inventory Transaction Scan Results.

If no errors occur and there are transactions that exist for the criteria specified, the INVENTORY TRANSACTION SCAN RESULTS window as shown in Fig. 101 is displayed; otherwise an appropriate message is displayed indicating that there were no transactions found. Respond to the message by pressing OK.

This window displays the results of the transaction scan. The Active Filters frame displays the filters used to run the transaction scan as follows:

Inventory Site - The inventory site responsible for the identified inventory item.

Transaction Type - If you specified that only transactions of a certain type were to be displayed, this field displays the transaction type selected; otherwise it displays "ALL".

Material Description - If you specified that only transactions of a certain material description were to be displayed, this field displays the material description selected; otherwise it is blank.

Serial Number - If you specified that only transactions of a certain serial number were to be displayed, this field displays the serial number selected; otherwise it is blank.

Begin Date - If you specified that only transactions created on or after a certain date were to be displayed, this field displays the date selected; otherwise it is blank.

End Date - If you specified that only transactions created on or before a certain date were to be displayed, this field displays the date selected; otherwise it displays the current date.

The Records frame displays the total number of transactions found.

The Transactions grid displays a list of transactions starting with the most recent transaction for the identified filters. The following information is displayed:

Number - The number of the transaction.

Date - The date the transaction was created.

Type - The type of transaction created.

Quantity - The quantity involved in the transaction.

Figure 102:
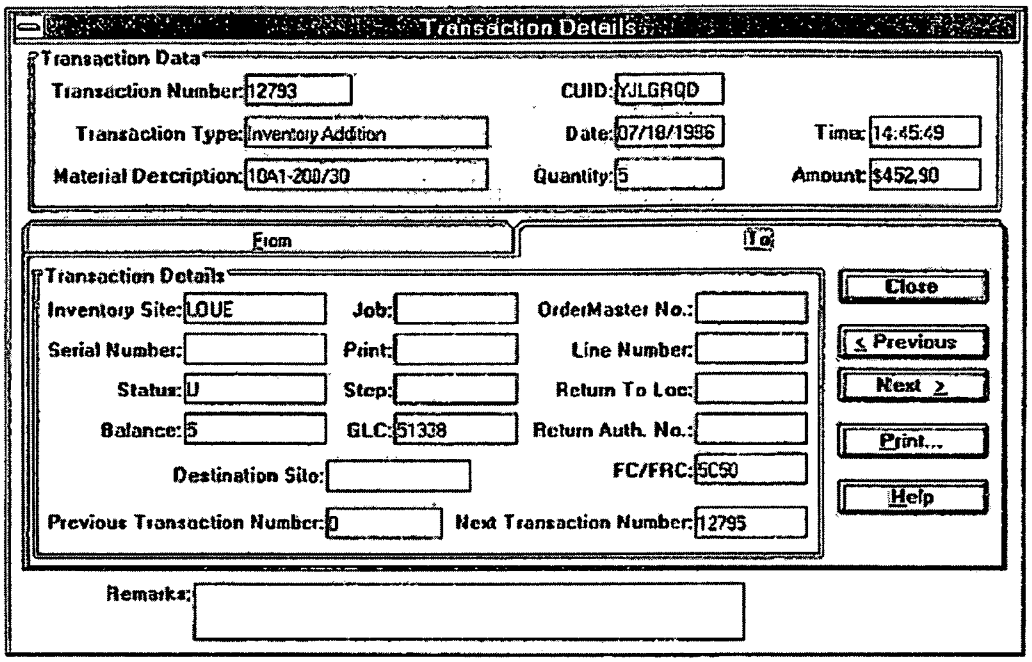
FIG. 102 is another exemplary screen print for Transaction Details.

To view a transaction in more detail, double-click a transaction in the Transactions grid. The TRANSACTION DETAILS dialog as shown in Fig. 102 is displayed.

This dialog displays details about the selected transaction as described earlier.

To close the TRANSACTION DETAILS dialog, press the CLOSE button. To close the INVENTORY TRANSACTION SCAN RESULTS window, double-click the control box located in the upper left corner of the window.

VIEW A SINGLE TRANSACTION

Figure 103:
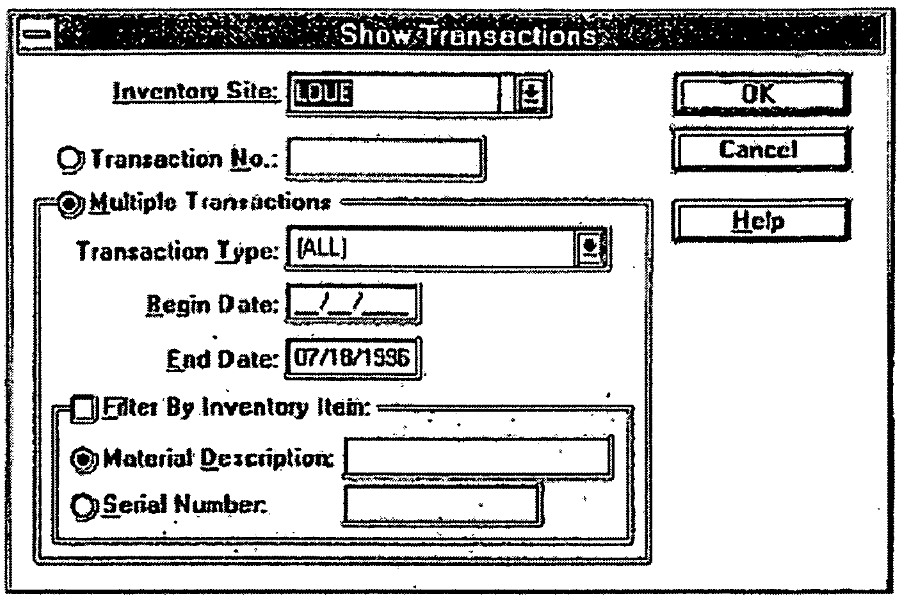
FIG. 103 is another exemplary screen print for exemplary screen print for Show Transactions.

To view a single transaction, press the Show Transactions toolbar button located on the main MATERIALS MANAGEMENT window or select "Show Transactions" from the Inventory menu. The SHOW TRANSACTIONS dialog as shown in Fig. 103 is displayed. This function is available at all times to any Materials Management user.

To identify the transaction to view, you must provide the following information:

Inventory Site - Type a valid inventory site in the Inventory Site list box or select one from its drop down list. The drop down list contains a list of all inventory sites including warehouse and Refurbished Central Office Equipment (RCOE) sites. If the inventory site entered is not valid, the system displays an appropriate error message when you leave this field. Respond to the message by pressing OK.

Next, click the Transaction No. radio button to indicate that you wish to view a specific transaction and type the transaction number in the Transaction Number text box.

To get additional help while on this dialog, press the HELP button. To close this dialog without viewing the transaction, press the CANCEL button. To close this dialog and display the identified transaction, press the OK button. If the transaction number entered does not exist, the system displays an appropriate error message. Respond to the message by pressing OK.

Figure 104:
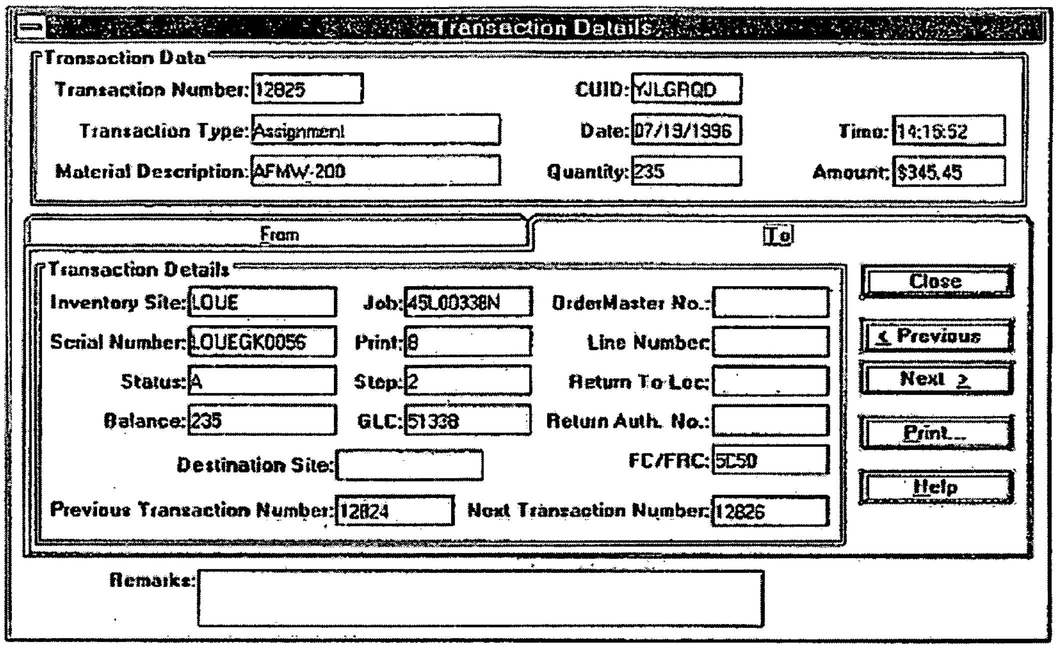
FIG. 104 is another exemplary screen print for Transaction Details.

If no errors occur, the TRANSACTION DETAILS dialog as shown in Fig. 104 is displayed.

This dialog displays details about the selected transaction as described earlier. To close the TRANSACTION DETAILS dialog, press the CLOSE button.

OSPCM MATERIALS MANAGEMENT – BS IV

INTRODUCTION

The purpose of MATERIALS MANAGEMENT Business Solution Area IV is to gain consensus on how material requirements are handled when the Jobentry-EWO application makes one or more of the following changes to substep (a substep is a breakdown of the work required on a job step):

(1) indicates that the material requirement is no longer needed either because the job or substep was deleted;

(2) changes the description of the material required on the substep;

(3) changes the custom features required on the substep (i.e., creating, updating, or deleting the custom features); and (4) changes the quantity of material required on the substep.

When a change is made to a substep, Jobentry-EWO checks the material status of the substep and, based on that status, decides whether or not to call a Materials Management function to handle any material that may have already been procured (for the purposes of this document, "procured" includes the following material status: ordered, shipped, transfer requested, and transferred) or assigned to that substep. A substep can have one of the following material status:

(1) Unnecessary – the substep requires no material;

(2) Needed – all of the material required on the substep has not yet been procured; pending orders or transfers may exist or a partial assignment may exist (a pending order or transfer is one in which the ordered or transferred material has not been received into inventory). If the remaining needed quantity on the substep is greater than zero but less than the substep's order quantity, the requirement is "partially satisfied";

(3) Ordered – the material required on the substep has been ordered; a pending transfer or partial assignment may also exist. The substep obtains a material status of "ordered" because that is the method of procurement used last;

(4) Shipped – the material required on the substep has been shipped; a pending transfer or partial assignment may also exist;

(5) Transfer requested – the material required on the substep has been requested for transfer; a pending order or partial assignment may also exist. The substep obtains a material status of "transfer requested" because that is the method of procurement used last;

(6) Transferred – the material required on the substep has been transferred; a pending order or partial assignment may also exist;

(7) Received – all of the material required on the substep has been received and assigned to the substep; no pending orders or transfer exist; and (8) Disbursed – all of the material required on the substep has been reported and the substep is complete.

If a material requirement has changed (e.g., material description) and the substep has a material status of "needed", a call is made to Materials Management because the substep may be partially satisfied. If needed, any pending orders or transfers are disassociated from the substep and any material assigned to the substep is unassigned.

If the requirement is no longer needed (e.g., the substep is deleted) and the substep has a material status of "needed", a call is made to Materials Management only if the requirement has been partially satisfied; otherwise no call is made.

Regardless of the change made, if the substep has one of the "procured" material statuses, a call is made to Materials Management to disassociate any pending orders or transfers from the substep and to unassign any material that may be assigned to the substep.

Regardless of the change made, if the substep has a material status of "unnecessary", no call is made to Materials Management since material is not needed or the substep is complete. If the substep has a material status of "disbursed", Jobentry-EWO does not allow changes to be made.

The Materials Management function handles on type of change at a time. If multiple changes are to be made, the order in which the changes should be processed is as follows: (1) a change in material description or custom features; and (2) a change in order quantity.

Depending on the nature of the change and the material status of the substep at the time of the change, one or more of the following may occur when a call is made to Materials Management:

(1) Pending transfers may be disassociated from the substep – Disassociating the substep from its transfer will mean that any material transferred for that substep will be received into inventory as unassigned material upon delivery;

(2) Pending orders may be disassociated from the substep - Disassociating the substep from its order will mean that any material ordered for that substep will be received into inventory as unassigned material upon delivery;

(3) Material assigned to the substep may be unassigned – Unassigning the material from the substep means that the material is no longer reserved for use on that substep;

(4) The remaining needed quantity on the substep may be adjusted; and (5) The material status of the substep may be changed.

After the material which has already been procured or assigned to the substep has been successfully handled, Jobentry-EWO may delete the substep, change the description of the material required, create/update/delete the custom features required, or change the quantity required.

MATERIAL REQUIREMENT IS NO LONGER NEEDED

A substep may be deleted when an engineer makes a revision to an approved job and the substep is no longer required or an entire job may be cancelled because of budget reasons, etc. If a substep is to be deleted or a job is to be cancelled, any material that has already been procured or assigned to the substep(s) must be handled. To do so, Jobentry-EWO provides the identifier of the substep, the substep's old order quantity, and a new order quantity equal to zero to the Materials Management function (if canceling a job, Jobentry-EWO must call this function for each substep requiring material within the job). Passing a new order quantity of zero means that the requirement is no longer needed which prompts the system to take the appropriate action.

NEEDED OR PROCURED STATUS

If the material needed on a substep has already been procured or partially satisfied, any pending orders or transfers must be entirely disassociated from the substep and any material already assigned to the substep must be unassigned as follows:

(1) Transfer Request – If the substep has a pending transfer, the action taken by the system depends on whether or not the transfer request has been approved;

(a) Unapproved – If the transfer request has not been approved, the substep is disassociated from the transfer request and, if the request was not made for any other substep, the transfer request is deleted because the inventory item has not yet been transferred. If the request was made to satisfy multiple substeps, the transfer request is not deleted so that it may still be approved for the remaining substeps for which it is needed. If multiple transfer requests exist, the system disassociates the substep from each transfer request found;

(b) Approved – If the transfer request has been approved, the substep is disassociated from the transfer request, but the transfer request is not deleted because the inventory item has been transferred and may have been shipped. The transfer request must remain in existence so that the inventory item may be receipted. If multiple transfer requests exist, the system disassociates the substep from each transfer request found;

(2) Order Request – If the substep has a pending order, the system changes the quantity to be assigned to the substep to zero. If multiple orders exist, the system changes the quantity to be assigned to the substep to zero on each order found;

(3) Assignment – If the substep has an assignment, the system takes the following action: (a) decreases the associated inventory item's assigned balance and increases its unassigned balance by the quantity assigned to the substep; and (b) records an unassignment material inventory transaction. If multiple assignments exist, the system creates an Unassignment material inventory transaction for each assignment found. If the inventory item is non-central office equipment and ordered direct to code, the Unassignment transaction is marked to be sent to Asset Management; otherwise it is marked as not to be sent to Asset Management.

Disassociation occurs first from the transfers, then from the orders, and then from the assignments until the old order quantity has been disassociated or there are no more orders, transfers, or assignments from which to disassociate, whichever comes first.

If no errors are found during this process, a flag of success is returned to the calling application; otherwise a flag of failure is returned (the fact that no disassociations or unassignments may be done is NOT considered an error). If a flag of success is returned, Jobentry-EWO changes the status of the substep to "DE" (deleted).

RECEIVED STATUS

If the material needed on the substep has already been received, all of the material assigned to the substep must be unassigned as follows: (1) the associated inventory item's assigned balance is decreased and its unassigned balance is increased by the quantity assigned to the substep; and (2) records an Unassignment material inventory transaction. If multiple assignments exists, the system creates an Unassignment material inventory transaction for each assignment found. If the inventory item is non-central office equipment and ordered direct to code, the Unassignment transaction is marked to be sent to Asset Management; otherwise it is marked as not to be sent to Asset Management.

If no errors are found during this process, a flag of success is returned to the calling application; otherwise a flag of failure is returned. If a flag of success is returned, Jobentry-EWO changes the status of the substep to "DE" (deleted).

CHANGING THE MATERIAL DESCRIPTION OR A CUSTOM FEATURE OF A SUBSTEP

If the material description or custom feature is to be changed on a substep, any material that has already been procured or assigned to the substep(s) must be handled. To do so, Jobentry-EWO provides the identifier of the substep, the substep's old order quantity, and new order quantity equal to the substep's old order quantity to the Materials Management function. Passing a new order quantity equal to the old order quantity means that the material description or a custom feature of the substep has changed which prompts the system to take the appropriate action.

NEEDED OR PROCURED STATUS

If the material needed on a substep has already been procured or partially satisfied, any pending orders or transfers must be entirely disassociated from the substep and any material already assigned to the substep must be unassigned as follows:

(1) Transfer request – If the substep has a pending transfer, the action taken by the system depends on whether or not the transfer request has been approved;

(a) Unapproved – If the transfer request has not been approved, the substep is disassociated from the transfer request and, if the request was not made for any other substep, the transfer request is deleted because the inventory item has not yet been transferred. If the request was made to satisfy multiple substeps, the transfer request is not deleted so that it may still be approved for the remaining substeps for which it is needed. If multiple transfer requests exist, the system disassociates the substep from each transfer request found; and (b) Approved – If the transfer request has been approved, the substep is disassociated from the transfer request, but the transfer request is not deleted because the inventory item has been transferred and may have been shipped. The transfer request must remain in existence so that the inventory item may be receipted. If multiple transfer requests exist, the system disassociates the substep from each transfer request found;

(2) Order request – If the substep has a pending order, the system changes the quantity to be assigned to the substep to zero. If multiple orders exist, the system changes the quantity to be assigned to the substep to zero on each order found; and (3) Assignment – If the substep has an assignment, the system takes the following action: (a) Decreases the associated inventory item's assigned balance and increases its unassigned balance by the quantity assigned to the substep; and (b) Records an Unassignment material inventory transaction. If multiple assignments exist, the system creates an Unassignment material inventory transaction for each assignment found. If the inventory item is non-central office equipment and ordered direct to code, the Unassignment transaction is marked to be sent to Asset Management; otherwise it is marked as not to be sent to Asset Management.

Disassociation occurs first from the transfers, then from the orders, and then from the assignments until the old order quantity has been disassociated or there are no more orders, transfers, or assignments from which to disassociate, whichever comes first.

After all orders, transfers, and assignments have been disassociated, the system resets the substep's remaining needed quantity back to the old order quantity and its material status back to "needed". If disassociation was not needed because the substep's remaining needed quantity was equal to the old order quantity, the system just sets the remaining needed quantity to the old order quantity and the material status to "needed".

If no errors are found during this process, a flag of success is returned to the calling application; otherwise a flag of failure is returned. If a flag of success is returned, Jobentry- EWO changes the material description required on the substep to the new material description or creates, updates, or deletes the custom feature required.

The new material may be procured using the methods described in Business Solutions I and II (BS1OVER.DOC and BS2OVER.DOC).

RECEIVED STATUS

If the material needed on a substep has already been received, all of the material assigned tot he substep must be unassigned as follows: (1) The associated inventory item's assigned balance is decreased and its unassigned balance is increased by the quantity assigned to the substep; and (2) Records an Unassignment material inventory transaction. If multiple assignments exist, the system creates an Unassignment material inventory transaction for each assignment found. If the inventory item is non-central office equipment and ordered direct to code, the Unassignment transaction is marked to be sent to Asset Management; otherwise it is marked as not to be sent to Asset Management.

After all material has been unassigned, the system resets the substep's remaining needed quantity back to the old order quantity and its material status back to "needed".

If no errors are found during this process, a flag of success is returned to the calling application; otherwise a flag of failure is returned. If a flag of success is returned, Jobentry-EWO changes the material description required on the substep to the new material description or creates, updates, or deletes the custom feature required.

The new material may be procured using the methods described in Business Solutions I and II (BS1OVER.DOC and BS2OVER.DOC).

INCREASE THE ORDER QUANTITY OF A SUBSTEP

No matter what the material status of the substep, if the order quantity of a substep is to be increased, the substep's remaining needed quantity and its material status must be changed so that more material may be procured. To do so, Jobentry-EWO provides the identifier of the substep, the substep's old order quantity, and the substep's new order quantity to the Materials Management function. Passing a new order quantity greater than the old order quantity means that more material is needed which prompts the system to take the following action: (1) Increases the substep's remaining needed quantity by the difference between the new order quantity and the old quantity; and (2) Resets the substep's material status to "needed".

If no errors are found during this process, a flag of success is returned to the calling application; otherwise a flag of failure is returned. If a flag of success is returned, Jobentry-EWO increases the substep" order quantity.

The additional material may be procured using the methods described in Business Solutions I and II (BS1OVER.DOC and BS2OVER.DOC).

DECREASE THE ORDER QUANTITY OF A SUBSTEP

If the order quantity of a substep is to be decreased, any material that has already been procured or assigned to the substep(s) must be handled. To do so, Jobentry-EWO provides the identifier of the substep, the substep's old order quantity, and the substep's new order quantity to the Materials Management function. Passing a new order quantity less than the old order quantity means that less material is needed which prompts the system to take the appropriate action.

NEEDED STATUS

If the material needed on a substep has not been procured or has been partially satisfied, there remains some quantity still to be satisfied on the substep. If that is the case, the system decreases the substep's remaining needed quantity by the difference between the old order quantity and the new order quantity or by as much as it can before the decreasing the quantity to be assigned from any pending orders or transfers or before decreasing the quantity that may be already assigned to the substep.

If the substep's remaining needed quantity is not enough to satisfy the decrease in the quantity needed (remaining needed quantity, decrease in quantity), the system decreases the substep's remaining needed quantity by as much as it can until the remaining needed quantity reaches zero and then disassociates the difference from any pending transfers, pending orders, or assignments as follows:

(1) Transfer Request – If the substep has a pending transfer, the action taken by the system depends on whether or not the transfer request has been approved;

(a) Unapproved – If the transfer request has not been approved, the substep is disassociated from the transfer request by the quantity remaining to be decreased or by as much as it can, whichever is smaller. If the request was not made for any other substep, the transfer request is deleted because the inventory item has not yet been transferred. If the request was made to satisfy multiple substeps, the transfer request is not deleted so that it may still be approved for the remaining substeps for which it is needed. If multiple transfer requests exist, the system disassociates the substep from each transfer request found by the quantity remaining to be decreased until the decrease in quantity has been satisfied or there are no more transfer requests from which to disassociate;

(b) Approved – If the transfer request has been approved, the substep is disassociated from the transfer request by the quantity remaining to be decreased or by as much as it can, whichever is smaller, but the transfer request is not deleted because the inventory item has been transferred and may have been shipped. The transfer request must remain in existence so that the inventory item may be receipted. If multiple transfer requests exist, the system disassociates the substep from each transfer request found by the quantity remaining to be decreased until the decrease in quantity has been satisfied or there are no more transfer requests from which to disassociate;

(2) Order Request – If the substep has a pending order, the system decreases the quantity to be assigned to the substep by the quantity remaining to be decreased or by as much as it can, whichever is smaller. If multiple orders exist, the system decreases the quantity to be assigned to the substep on each order found by the quantity remaining to be decreased until the decrease in quantity has been satisfied or there are no more orders from which to disassociate; and (3) Assignment – If the substep has an assignment, the system takes the following action: (a) Decreases the associated inventory item's assigned balance and increases its unassigned balance by the quantity remaining to be decreased; and (b) Records an Unassignment material inventory transaction. If multiple assignments exist, the system creates an Unassignment material inventory transaction for each assignment that was decreased. If the inventory item is non-central office equipment and ordered direct to code, the Unassignment transaction is marked to be sent to Asset Management; otherwise it is marked as not to be sent to Asset Management.

Disassociation occurs first from the transfers, then from the orders, and then from the assignments until the decrease in quantity has been satisfied or there are no more orders, transfers, or assignments from which to disassociate, whichever comes first.

After all order, transfers, and assignments have been disassociated, the system adjusts the substep's material status to the appropriate value as follows: (1) If the quantity assigned to the substep is equal to the substep's new order quantity, its material status is set to "received"; (2) If a pending order exists for the substep, its material status is set to "ordered"; (3) If an unapproved pending transfer exists for the substep, its material status is set to "transfer requested"; and (4) If an approved pending transfer exists for the substep, its material status is set to "transferred".

If the entire decrease is taken from the substep's remaining needed quantity (remaining needed quantity >= decrease in quantity), disassociation is not needed and the system adjusts the substep's material status tot he appropriate value as follows: (1) if the substep's remaining needed quantity is still greater than zero, its material status is set to "needed"; (2) if the quantity assigned tot he substep is equal to the substep's new order quantity, its material status is set to "received"; (3) if a pending order exists for the substep, its material status is set to "ordered"; (4) if an unapproved pending transfer exists for the substep, its material status is set to "transfer requested"; (5) if an approved pending transfer exists for the substep, its material status is set to "transferred".

If no errors are found during this process, a flag of success is returned tot he calling application; otherwise a flag of failure is returned. If a flag of success is returned, Jobentry-EWO decreases the substep's order quantity.

PROCURED STATUS

If the material needed on a substep has been procured, there is no quantity still to be satisfied on the substep. If that is the case, the system decreases the quantity to be assigned from any pending orders or transfers and decreases the quantity that may be already assigned to the substep by difference between the old order quantity and the new order quantity as follows:

(1) Transfer Request – If the substep has a pending transfer, the action taken by the system depends on whether or not the transfer request has been approved:

(a) Unapproved – If the transfer request has not been approved, the substep is disassociated from the transfer request by the quantity remaining to be decreased or by as much as it can, whichever is smaller. If the request was not made for any other substep, the transfer request is deleted because the inventory item has not yet been transferred. If the request was made to satisfy multiple substeps, the transfer request is not deleted so that it may still be approved for the remaining substeps for which it is needed. If multiple transfer requests exist, the system disassociates the substep from each transfer request found by the quantity remaining to be decreased until the decrease in quantity has been satisfied or there are no more transfer requests from which to disassociate;

(b) Approved – If the transfer request has been approved, the substep is disassociated from the transfer request, but t5he transfer request is not deleted because the inventory item has been transferred and may have been shipped. The transfer request must remain in existence so that the inventory item may be receipted. If multiple transfer requests exist, the system disassociates the substep from each transfer request found by the quantity remaining to be decreased until the decrease in quantity has been satisfied or there are no more transfer requests from which to disassociate;

(2) Order Request – If the substep has a pending order, the system decreases the quantity to be assigned to the substep by the quantity remaining to be decreased or by as much as it can, whichever is smaller. If multiple orders exist, the system decreases the quantity to be assigned to the substep on each order found by the quantity remaining to be decreased until the decrease in quantity has been satisfied or there are no more orders from which to disassociate; and (3) Assignment – If the substep has an assignment, the system takes the following action: (a) decreases the associated inventory item's assigned balance and increases its unassigned balance by the quantity remaining to be decreased; and (b) Records an Unassignment material inventory transaction. If multiple assignments exist, the system creates an Unassignment material inventory transaction for each assignment that was decreased. If the inventory item is non-central office equipment and ordered direct to code, the Unassignment transaction is marked to be sent to Asset Management; otherwise it is marked as not to be sent to Asset Management.

Disassociation occurs first from the transfers, then from the orders, and then from the assignments until the decrease in quantity has been satisfied or there are no more orders, transfers, or assignments from which to disassociate, whichever comes first.

After all orders, transfers, and assignments have been disassociated, the system adjusts the substep's material status to the appropriate value as follows: (a) If the quantity assigned to the substep is equal to the substep's new order quantity, its material status is set to "received"; (b) If a pending order exists for the substep, its material status is set to "ordered"; (c) If an unapproved pending transfer exists for the substep, its material status is set to "transfer requested"; and (d) If an approved pending transfer exists for the substep, its material status is set to "transferred".

If no errors are found during this process, a flag of success is returned to the calling application; otherwise a flag of failure is returned. If a flag of success is returned, Jobentry-EWO decreases the substep's order quantity.

RECEIVED STATUS

If the material needed on a substep has already been received, the system decreases the quantity assigned tot he substep as follows: (a) Decreases the associated inventory item's assigned balance and increases its unassigned balance by the difference between the old order quantity and the new order quantity; and (b) Records and Unassignment material inventory transaction. If multiple assignments exist, the system creates an Unassignment material inventory transaction for each assignment that was decreased. If the inventory item is non-central office equipment and ordered direct to code, the Unassignment transaction is marked to be sent to Asset Management; otherwise it is marked as not to be sent to Asset Management.

If no errors are found during this process, a flag of success is returned to the calling application; otherwise a flag of failure is returned. If a flag of success is returned, Jobentry-EWO decreases the substep's order quantity.

INTRODUCTION

The purpose of MATERIALS MANAGEMENT Business Solution Area IV is to gain consensus on how material requirements are handled when the JOBENTRY-EWO application makes the following changes to a job or substep (a substep is a breakdown of the work required on a job step): (1) Deletes or cancels a substep; (2) Cancels a job; and (3) Changes the material required, custom feature required, or the quantity of material required on the substep.

MATERIALS MANAGEMENT uses the following functions to respond to a job or substep change: (1) Disassociate the material request from the substep; (2) Decrease the quantity to be assigned to the substep; and (3) Unassign the material from the substep.

When a change is made to a job or substep requiring material, JOBENTRY-EWO checks the material status of the substep and call the appropriate MATERIALS MANAGEMENT function based on that status. If the substep has a material status of "unnecessary", "needed", or "disbursed", no call is made, since material is not needed, has not been assigned or procured, or the substep is complete.

A substep can have one of the following status:

(1) Unnecessary – The substep requires no material;

(2) Needed – The material required on the substep has not yet been procured;

(3) Ordered – The material required on the substep has been ordered;

(4) Shipped – The material required on the substep has been shipped;

(5) Transfer Requested – The material required on the substep has been requested for transfer;

(6) Transferred – The material required on the substep has been transferred;

(7) Received – The material required on the substep has been received and assigned to the substep; and (8) Disbursed – The material required on the substep has been reported and the substep is complete.

For the purposes of this document, "procured" includes the following material statuses: Ordered, Shipped, Transfer Requested, and Transferred.

DELETING/CANCELLING A SUBSTEP

A substep may be deleted/cancelled when an engineer makes a revision to an approved job and the substep is no longer required (Jobentry-EWO makes a distinction between when a substep is cancelled as opposed to being deleted. Materials Management makes no such distinction and the same function is called regardless). Before the substep can be deleted/cancelled, any material that has already been procured or assigned to the substep must be handled.

PROCURED STATUS

If the material needed on a substep has already been procured, JOBENTRY-EWO calls a MATERIALS MANAGEMENT function to disassociate the material request from the substep. This function expects the identifier of the substep to be passed to it. Disassociating the substep from its material request will mean that any material ordered or transferred for that substep will be received into inventory as unassigned material upon delivery.

The action the system takes to disassociate the substep from its material request depends on whether the request for material was made via an order or a transfer:

(1) Order Request – If the request was made via an order, the system changes the quantity to be assigned to the substep to zero;

(2) Transfer request – If the request was made via a transfer, the action taken by the system depends on whether or not the transfer request has been approved;

(a) Unapproved – If the transfer request has not been approved, the substep is disassociated from the transfer request and, if the request was not made for any other substep, the transfer request is deleted because the inventory item has not yet been transferred. If the request was made to satisfy multiple substeps, the transfer request is not deleted so that it may still be approved for the remaining substeps for which it is needed; and (b) Approved – If the transfer request has been approved, the substep is disassociated from the transfer request, but the transfer request is not deleted because the inventory item has been transferred and may have been shipped. The transfer request must remain in existence so that the inventory item may be receipted.

A flag of success or failure is returned to the calling application. If there are no material requests to be disassociated, a flag of success is still returned to the calling application. If the substep is successfully disassociated, JOBENTRY-EWO deletes/cancels the substep.

RECEIVED STATUS

If the material is needed on a substep has already been received, JOBENTRY-EWO calls a MATERIALS MANAGEMENT function to unassign the material from the substep. This function expects both the identifier of the substep and a quantity to be unassigned to be passed to it. Since the substep is going to be deleted/cancelled, the quantity to be unassigned is equal to the substep's order quantity (a substep's order quantity is the quantity required to do the work on the substep. If cable is required, the order quantity usually includes extra footage to account for any splice loss that may be incurred while placing the cable). Unassigning the material from the substep means that the material is no longer reserved for use on that substep.

The system unassigns the inventory item from the substep as follows: (1) Decreases the associated inventory item's assigned balance and increases its unassigned balance by the quantity assigned to the substep; (2) Records an Unassignment material inventory transaction. If the inventory item is non-central office equipment and ordered direct to code, the Unassignment transaction is marked to be sent to Asset Management; otherwise it is marked as not to be sent to Asset Management; (3) Recalculates the remaining needed quantity on the substep from which the inventory item was unassigned, and if it is greater than zero, puts the requirement back in a "needed" status.

A flag of success or failure is returned to the calling application. If there are no unassignments to be made, a flag of success is still returned to the calling application. If the material is successfully unassigned from the substep, JOBENTRY-EWO deletes/cancels the substep.

CANCELING A JOB

A job may be canceled through the JOBENTRY-EWO application because of budget reasons, etc. Before the job can be canceled, material that has already been procured or assigned to each substep within that job must be handled.

PROCURED STATUS

If the material needed on a substep has already been procured, JOBENTRY-EWO calls a MATERIALS MANAGEMENT function to disassociate the material request from each substep within that job that has procured material. This function expects the identifier of the substep to be passed to it. Disassociating the substep from its material request will mean that any material ordered or transferred for that substep will be received into inventory as unassigned material upon delivery.

The action the system takes to disassociate the substep from its material requests depends on whether the request for material was made via n order or a transfer:

(1) Order Request – If the request was made via an order, the system changes the quantity to be assigned to the substep to zero;

(2) Transfer Request – If the request was made via a transfer, the action taken by the system depends on whether or not the transfer request has been approved;

(a) Unapproved – If the transfer request has not been approved, the substep is disassociated from the transfer request and, if the request was not made for any other substep, the transfer request is deleted because the inventory item has not yet been transferred. If the request was made to satisfy multiple substeps, the transfer request is not deleted so that it may still be approved for the remaining substeps for which it is needed;

(b) Approved – If the transfer request has been approved, the substep is disassociated from the transfer request, but the transfer request is not deleted because the inventory item has been transferred and may have been shipped. The transfer request must remain in existence so that the inventory item may be receipted.

A flag of success or failure is returned to the calling application. If there are no material requests to be disassociated, a flag of success is still returned to the calling application. If the substep is successfully disassociated, JOBENTRY-EWO deletes/cancels the substep. If all substeps are successfully disassociated, JOBENTRY-EWO cancels the job.

RECEIVED STATUS

If the material needed on a substep has already been received, JOBENTRY-EWO calls a MATERIALS MANAGEMENT function to unassign the material from each substep within that job that has material assigned to it. This function expects both the identifier of the substep and a quantity to be unassigned to be passed to it. Since the substep is going to be deleted/cancelled, the quantity to be unassigned is equal tot he substep's order quantity. Unassigning the material from the substep means that the material is no longer reserved for use on that substep.

The system unassigns the inventory item from the substep as follows: (1) Decreases the associated inventory item's assigned balance and increases its unassigned balance by the quantity assigned to the substep; (2) Records an Unassignment material inventory transaction. If the inventory item is non-central office equipment and ordered direct to code, the Unassignment transaction is marked to be sent to asset Management; otherwise it is marked as not to be sent to Asset Management; and (3) Recalculates the remaining needed quantity on the substep from which the inventory item was unassigned, and if it is greater than zero, puts the requirement back in a "needed" status.

A flag of success or failure is returned to the calling application. If there are no unassignments to be made, a flag of success is still returned to the calling application. If the material is successfully unassigned from the substep, JOBENTRY-EWO deletes/cancels the substep. If the material is successfully unassigned from all substeps, JOBENTRY-EWO cancels the job.

CHANGING A MATERIAL REQUIREMENT FOR A SUBSTEP

A change in a material requirement for a job substep can occur for the following reasons: (1) a different material description is required; (2) a custom feature of the material is changed; and (3) the required quantity changes.

PROCURED STATUS

*Decrease in the Quantity Required*

For a decrease in the quantity required, JOBENTRY-EWO calls a MATERIALS MANAGEMENT function to decrease the quantity that should be assigned to the substep once the item is received into inventory. This function expects both the identifier of the substep and the quantity that is no longer needed to be passed to it. Since the required quantity is going to be decreased, this quantity is equal to the difference between the old quantity and the new quantity.

The action the system takes to decrease the quantity to be assigned to the substep depends on whether the request for material was made via an order or a transfer:

(1) Order Request – If the request was made via an order, the system decreases the quantity to be assigned to the substep by the quantity no longer needed;

(2) Transfer Request – If the request was made via a transfer, the action taken by the system depends on whether or not the transfer request has been approved;

(a) Unapproved – If the transfer request has not bee approved, the quantity to be assigned to the substep is decreased by the quantity no longer needed. If the quantity to be assigned is reduced to zero, the substep is disassociated from the transfer request and, if the request was not made for any other substep, the transfer request is deleted because the inventory item has not yet been transferred. If the request was made to satisfy multiple substeps, the transfer request is not deleted so that it may still be approved for the remaining substeps for which it is needed; and (b) Approved – If the transfer request has been approved, quantity to be assigned to the substep is decreased by the quantity no longer needed, but the transfer request is not deleted because the inventory item has been transferred and may have been shipped. The transfer request must remain in existence so that the inventory item may be receipted.

A flag of success or failure is returned to the calling application. If the quantity to be assigned is reduced successfully, JOBENTRY-EWO decreases the substep's order quantity.

*Increase in the Quantity Required*

For an increase in the quantity required, JOBENTRY-EWO does not call a MATERIALS MANAGEMENT function. JOBENTRY-EWO makes the needed adjustments itself as follows: (1) Increases the substep's order quantity by the additional quantity needed; (2) Calculates the remaining quantity needed on the substep (new qty – old qty); and (3) Changes the material status of the substep back to "needed".

The additional material may be procured using the methods described in Business Solutions I and II (BS1OVER.DOC and BS2OVER.DOC).

*Change in Material Description of Custom Feature*

For a change in material description or custom feature, JOBENTRY-EWO calls a MATERIALS MANAGEMENT function to disassociate the material request from the substep. This function expects the identifier of the substep to be passed to it. Disassociating the substep from its material request will mean that any material ordered or transferred for that substep will be received into inventory as unassigned material upon delivery.

The action the system takes to disassociate the substep from its material request depends on whether the request for material was made via an order or a transfer;

(1) Order Request – If the request was made via an order, the system changes the quantity to be assigned to the substep to zero;

(2) Transfer Request – If the request was made via a transfer, the action taken by the system depends on whether or not the transfer request has been approved;

(a) Unapproved – If the transfer request has not been approved, the substep is disassociated from the transfer request and, if the request was not made for any other substep, the transfer request is deleted because the inventory item has not yet been transferred. If the request was made to satisfy multiple substeps, the transfer request is not deleted so that it may still be approved for the remaining substeps for which it is needed.; and (b) Approved – If the transfer request has been approved, the substep is disassociated from the transfer request, but the transfer request is not deleted because the inventory item has been transferred and may have been shipped. The transfer request must remain in existence so that the inventory item may be receipted.

A flag of success or failure is returned to the calling application. If there are no material requests to be disassociated, a flag of success is still returned to the calling application. If the substep is successfully disassociated, JOBENTRY-EWO takes the following action: (1) Changes the material description required on the substep to the new material description or makes a change to the custom feature required; (2) Sets the remaining quantity needed on the substep back to its order quantity; and (3) Changes the material status of the substep back to "needed".

The new material may be procured using the methods described in Business Solutions I and II (BS1OVER.DOC and BS2OVER.DOC).

RECEIVED STATUS

*Decrease in the Quantity Required*

For a decrease in the quantity required, JOBENTRY-EWO calls a MATERIALS MANAGEMENT function to unassign the material quantity no longer needed on that substep. This function expects both the identifier of the substep and a quantity to be unassigned to be passed to it. Since the required quantity is going to be decreased, this quantity is equal to the difference between the old quantity and the new quantity. Unassigning the material from the substep means that the material is no longer reserved for use on that substep.

The system unassigns the inventory item from the substep as follows: (1) Decreases the associated inventory item's assigned balance and increases its unassigned balance by the quantity to be unassigned; (2) Records an Unassignment material inventory transaction. If the inventory item is non-central office equipment and ordered direct to code, the Unassignment transaction is marked to be sent to Asset Management; otherwise it is marked as not to be sent to Asset Management; and (3) Recalculates the remaining needed quantity on the substep from which the inventory item was unassigned, and if it is greater than zero, puts the requirement back in a "needed" status.

A flag of success of failure is returned to the calling application. If the material is successfully unassigned from the substep,.JOBENTRY-EWO decreases the substep's order quantity.

*Increase in the Quantity Required*

For an increase in the quantity required, JOBENTRY-EWO does not call a MATERIALS MANAGEMENT function. JOBENTRY-EWO makes the needed adjustments itself as follows: (1) Increases the substep" order quantity by the additional quantity needed; (2) Calculates the remaining quantity needed on the substep (new qty -old qty); and (3) Changes the material status of the substep back to "needed".

The additional material may be procured using the methods described in Business Solutions I and II (BS1OVER.DOC and BS2OVER.DOC).

*Change in Material Description or Custom Feature*

If the description of the material required changes or a custom feature changes, JOBENTRY-EWO calls a MATERIALS MANAGEMENT function to unassign the material from the substep. This function expects both the identifier of the substep and a quantity to be unassigned to be passed to it. Since the material needed on the substep or a custom feature is changing, the quantity to be unassigned is equal to the substep's order quantity. Unassigning the material from the substep means that the material is no longer reserved for use on that substep.

The system unassigns the inventory item from the substep as follows: (1) Decreases the associated inventory item's assigned balance and increases its unassigned balance by the quantity assigned to the substep; (2) Records an Unassignment material inventory transaction. If the inventory item is non-central office equipment and ordered direct to code, the Unassignment transaction is marked to be sent to Asset Management; otherwise it is marked as not to be sent to Asset Management; and (3) Recalculates the remaining needed quantity on the substep from which the inventory item was unassigned, and if it is greater than zero, puts the requirement back in a "needed" status.

A flag of success or failure is returned to the calling application. If there are no unassignments to be made, a flag of success is still returned to the calling application. If the material is successfully unassigned from the substep, JOBENTRY-EWO takes the following action: (1) Changes the material description required on the substep to the new material description or makes a change to the custom feature required; (2) Sets the remaining quantity needed on the substep back to its order quantity; and (3) Changes the material status of the substep back to "needed".

The new material may be procured using the methods described in Business Solutions I and II (BS1OVER.DOC and BS2OVER.DOC).

INVESTMENT MANAGEMENT REPORT

The Investment Management Report (IMR) provides an index which measures how efficient inventory is managed. The index describes how much inventory was owned over a given period of time and how much it cost the company to own that inventory. The report may be requested by any OSPC user that has access to the Management Reports application.

To request the Investment Management Report, provide the following information:

(1) Location – The state, CMC, or inventory site on which to report. You may print the report for any of the nine states in the BellSouth region, any CMC, or any inventory site. Location must be specified. The following business rules are observed depending on the location specified:

(a) State – The investment records for the specified state are listed on the report;

(b) CMC – The investment records the specified CMC are listed on the report; and (c) Inventory Site – the investment records for the specified inventory site are listed on the report;

(2) Type of Material – The type of material on which to report. You may choose to print one or more types. Each type selected becomes a separate section of the report. If not specified, every type of material is reported in the order specified below. Valid choices are:

(a) Copper Cable – This section of report contains information on the copper and coax cable investment for the specified state, CMC, or inventory site;

(b) Fiber Cable – This section of the report contains information on the fiber cable investment for the specified state, CMC, or inventory site;

(b) All Cable – This section of the report contains information on the cable (copper, coax, and fiber) investment for the specified state, CMC, or inventory site;

(c) Circuit Equipment – This section of the report contains information on the circuit equipment investment for the specified state, CMDC or inventory site;

(d) Miscellaneous – This section of the report contains information on the non-cable investment (serialized and non-serialized) for the specified state, CMC, or inventory site excluding direct to code inventory and circuit equipment since each of these are reported in a section of its own;

(e) Direct to Code – This section of the report contains information on the direct to code investment for the specified state, CMC, or inventory site excluding circuit equipment since it has a section of its own. Inventory ordered directly to the in-service code (e.g., 22C) is reported here; and (f) All – This section of the report contains information on the entire investment for the specified state, CMC, or inventory site excluding direct to code inventory and circuit equipment. "ALL" represents the entire investment held in the 12201100 account.

The first part of the report contains information concerning investment:

(1) Tot. Investment – The total investment that the company has in inventory at the specified state, CMC, or inventory site. It is the sum value of the current inventory and of all material disbursed or moved from that location (in dollars). "Moved" inventory is inventory that has been returned, junked, deleted (i.e., write off), transferred out and received, or reclassified as exempt material;

(2) Carry Cost – The cost to the company for holding material in inventory. It is equal to (the percentage carrying cost per year divided by number of days in the year) time (the dollars inventoried times the age of that inventory) plus the sum of the following (the percentage carrying cost per year is currently set at 25% and the number of days in the year is set to 365):

(a) The dollars disbursed times the age of the inventory before it was disbursed;

(b) The dollars transferred and received times the age of the inventory before it was received;

(c) The dollars deleted (i.e., write off) times the age of the inventory before it was deleted;

(d) The dollars returned times the age of the inventory before it was returned;

(e) The dollars junked times the age of the inventory before it was junked; and (f) The dollars reclassified as exempt times the age of the inventory before it was reclassified;

(3) Investment Index – The calculated indicator which measures how efficiently cable, serialized apparatus, and non-serialized apparatus is managed. It is equal to the total investment divided by the carrying cost.

The second part of the report contains information about the dollars in inventory and the dollars involved in various transactions affecting the inventory balance:

(a) Inventory – The dollar value of the end of the month inventory or the current inventory for the current month for the specified state, CMC, or inventory site;

(b) Transfer Out – The dollar value of all inventory transferred out of the specified state, CMC, or inventory site during the month. It is calculated based on the total value of Transfer Receipt and Transfer Receipt Reversal transactions that have occurred during the month. Only inventory that has been receipted in the location to which it was transferred is recorded as being transferred out. Inventory still in an in-transit status is recorded as part of your current inventory;

(c) Placed – The dollar value of all inventory disbursed during the month from the specified state, CMC, or inventory site. This value represents the dollars used from the inventory, it does not include the dollars junked as a result of a disbursement. It is calculated based on the total value of Disbursement and Disbursement Reversal transactions that have occurred during the month;

(d) Returned – The dollar value of all inventory returned to a BST warehouse or to an outside vendor during the month for the specified state, CMC, or inventory site. It is calculated based on the total value of Return transactions that have occurred during the month;

(e) Junked – The dollar value of all inventory junked (manually or auto-junked) during the month for the specified state, CMC, or inventory site. It is calculated based on the total value of Junk transactions that have occurred during the month.

(f) Added – The dollar value of all inventory added during the month for the specified state, CMC, or inventory site. It is calculated based on the total value of Inventory Addition, Recover from Junk, Remove to Good, Remove to Good Reversal, and Reclassify from Exempt transactions that have occurred during the month;

(g) Deleted – The dollar value of all inventory deleted during the month for the specified state, CMC, or inventory site. It is calculated based on the total value of Inventory Deletion transactions that have occurred during the month;

(h) Exempted – The dollar value of all inventory reclassified as exempt material during the month for the specified state, CMC, or inventory site. It is calculated based on the total value of Reclassify to Exempt transactions that have occurred during the month;

(i) Receipted – The dollar value of all ordered or transferred material receipted into inventory during the month for the specified state, CMC, or inventory site. It is calculated based on the total value of Order Receipt, Order Receipt Reversal, Transfer Receipt, and Transfer Receipt Reversal transactions that have occurred during the month;

(j) Ratio Plc/Rct – The ratio of the dollars placed to the dollars receipted during the month for the specified state, CMC, or inventory site. It is calculated by dividing the dollars placed by the dollars receipted during the month; and (k) Days Stock – The number of days material is held in stock at the specified state, CMC, or inventory site. It is calculated by dividing the dollars inventoried by the average daily placement. The Average daily placement is calculated by dividing the dollars placed by the number days in the month including weekends.

The third part of the report contains information about inventory that is currently over x number of days:

(1) Xdays – The number of days "x" represents. This value is set at 30 days;

(2) Inv > Xdays – The dollar value of all material currently in inventory older than x number of days;

(3) %Inv > Xdays – The percentage of all material currently in inventory older than x number of days. It is calculated by dividing the dollar value of the inventory older than x number of days by the total dollar value of the inventory; and (4) Carry Cost – The cost to the company for holding material in inventory over x number of days. It is calculated as described earlier, but only the dollars in inventory over x number of days is used as the value for the dollars inventoried.

The fourth part of the report contains information about inventory that is currently over y number of days:

(1) The fourth part of the report contains information about inventory that is currently over y number of days:

(1) Ydays - the number of days "y" represents. This value is set at 60 days;

(2) Inv > Ydays – The dollar value of all material currently in inventory older than x number of days;

(3) %Inv > Ydays – The percentage of all material currently in inventory older than y number of days. It is calculated by dividing the dollar value of the inventory older than y number of days by the total dollar value of the inventory; and (4) Carry Cost – The cost to the company for holding material in inventory over y number of days. It is calculated as described earlier, but only the dollars in inventory over y number of days is used as the value for the dollar inventoried.

The fifth part of the report contains information about the million conductor feet (MCF) of copper cable or fiber kilofeet (FKF) of fiber cable that is currently in inventory and involved in various transactions affecting the inventory balance. This portion of the report is blank if reporting on all cable or non-cable.

(1) Cable Units – The cable units report. This value is "MCF" if reporting on copper cable, "FKF" if reporting on fiber cable, or N/A if not reporting on cable;

(2) Inv Units – The MCF of copper cable or FKF of fiber cable at the end of the month inventory or the MCF of copper cable or FKF of fiber cable in the current inventory for the current month;

(3) Transfer Out – The MCF of copper cable or FKF of fiber cable transferred out of the specified state, CMC, or inventory site during the month. It is calculated based on the total number of units on the Transfer Receipt and Transfer Receipt Reversal transactions that have occurred during the month. Only inventory that has been receipted in the location to which it was transferred is recorded as being transferred out. Inventory still in an in-transit status is recorded as part of your current inventory;

(4) Placed – The MCF of copper cable or FKF of fiber cable disbursed during the month for the specified state, CMC, or inventory site. This value represents the MCF or FKF used from inventory, it does not include the MCF or FKF junked as a result of a disbursement. It is calculated based on the total number of units on the Disbursement and Disbursement Reversal transactions that have occurred during the month;

(5) Returned – The MCF of copper cable or FKF of fiber cable returned to a BST warehouse or to an outside vendor during the month for the specified state, CMC, or inventory site. It is calculated based on the total number of units on the Return transactions that have occurred during the month;

(6) Junked – The MCF of copper cable of FKF of fiber cable junked (manually or auto-junked) during the month for the specified state, CMC, or inventory site. It is calculated based on the total number of units on the Junk transactions that have occurred during the month;

(7) Added – The MCF of copper cable or FKF of fiber cable added to inventory during the month for the specified state, CMC, or inventory site. It is calculated based on the total number of units on the Inventory Addition, Recover from Junk, Remove to Good, Remove to Good Reversal, and Reclassify from Exempt transactions that have occurred during the month;

(8) Deleted – The MCF of copper cable or FKF of fiber cable deleted from inventory during the month for the specified state, CMC, or inventory site. It is calculated based on the total number of units on the Inventory Deletion transactions that have occurred during the month;

(9) Exempted – The MCF of copper cable or FKF of fiber cable reclassified as exempt material during the month for the specified state, CMC, or inventory site. It is calculated based on the total number of units on the Reclassify to Exempt transactions that have occurred during the month;

(10) Receipted – The MCF of copper cable or FKF of fiber cable receipted into inventory via an order or transfer during the month for the specified state, CMC, or inventory site. It is calculated based on the total number of units on the Order Receipt, Order Receipt Reversal, Transfer Receipt, and Transfer Receipt Reversal transactions that have occurred during the month; and

(11) Ratio Plc/Rct – The ratio of the MCF of copper cable or FKF of fiber cable placed to the MCF of copper cable or FKF of fiber cable receipted during the month for the specified state, CMC, or inventory site. It is calculated by dividing the MCF of copper cable placed by the MCF of copper cable receipted during the month or by dividing the FKF of fiber cable placed by the FKF of fiber cable receipted during the month.

The sixth part of the report contains information concerning the dollars, MCF, and FKF involved in various transactions affecting the inventory balance year to date as well as for the last 3 months:

(1) Material Transferred Out – The dollar value, MCF (if reporting on copper cable), and FKF (if reporting on fiber cable) of all inventory transferred out of the specified state, CMC, or inventory site year to date and for the last 3 months. If reporting on all cable, both MCF and FKF is calculated;

(2) Material Placed – The dollar value, MCF (if reporting on copper cable), and FKF (if reporting on fiber cable) of all inventory disbursed from the specified state, CMC, or inventory site year to date and for the last 3 months. If reporting on all cable, both MCF and FKF is calculated;

(3) Material Returned – The dollar value, MCF (if reporting on copper cable), and FKF (if reporting on fiber cable) of all inventory returned from the specified state, CMC, or inventory site year to date and for the last 3 months. If reporting on all cable, both MCF and FKF is calculated;

(4) Material Junked – The dollar value, MCF (if reporting on copper cable), and FKF (if reporting on fiber cable) of all inventory junked (manually and auto-junked) from the specified state, CMC, or inventory site year to date and for the last 3 months. If reporting on cable, both MCF and FKF is calculated;

(5) Material Added – The dollar value, MCF (if reporting on copper cable), and FKF (if reporting on fiber cable) of all material added to inventory in the specified state, CMC, or inventory site year to date and for the last 3 months. If reporting on all cable, both MCF and FKF is calculated;

(6) Material Deleted Added – The dollar value, MCF (if reporting on copper cable), and FKF (if reporting on fiber cable) of all material deleted from inventory in the specified state, CMC, or inventory site year to date and for the last 3 months. If reporting on all cable, both MCF and FKF is calculated;

(7) Material Exempted Added – The dollar value, MCF (if reporting on copper cable), and FKF (if reporting on fiber cable) of all inventory reclassified as exempt material in the specified state, CMC, or inventory site year to date and for the last 3 months. If reporting on all cable, both MCF and FKF is calculated;

(8) Material Receipted – the dollar value, MCF (if reporting on copper cable), and FKF (if reporting on fiber cable) of all material receipted into inventory via an order or tr4ansfer in the specified state, CMC, or inventory site year to date and for the last 3 months. If reporting on all cable, both MCF and FKF is calculated;

(9) Ratio Matl Placed/Receipted – The ratio of the dollars, MCF (if reporting on copper cable), and FKF (if reporting on fiber cable) placed to the dollars, MCF (if reporting on copper cable), and FKF (if reporting on fiber cable) receipted year to date and for the last three months in the specified state, CMC, or inventory site. If reporting on all cable, both MCF and FKF is calculated;

(10) Avg Daily Placement – The average daily placement of inventory from the specified state, CMC, or inventory site. This value is calculated year to date and for the last 3 months in dollars, MCF (if reporting on copper cable), and FKF (if fiber cable reported). If reporting on all cable, both MCF and FKF is calculated; and

(11) Days Stock on Hand – The number of days material is held in stock at the specified state, CMC, or inventory site. This value is calculated year to date and for the last 3 months in dollars, MCF (if copper cable reported), and FKF (if reporting on fiber cable). If reporting on all cable, both MCF and FKF is calculated.

The following business rules are observed when creating the Investment Management Report:

(1) Investment is stored at the inventory site level and summed together when reporting at the state or CMC level;

(2) Investment is calculated on a daily basis rather than a "real-time" basis. In other words, you will get the same results whether you request the IMR at 11:00 AM or 3:00 PM on the same day. Investment is re-calculated each evening after midnight;

(3) The majority of the investment is reported month to date with a column of data for each month reported. Once the end of the month is reached, the investment calculated for that month remains static. If you request the IMR on January 12, you receive the investment from January 1 through January 11. If you request the IMR on March 15, you receive the investment for the months of January and February along with the investment for March 1 through March 14;

(4) The report period MM/DD/YYYY through MM/DD/YYYY and the number of days in the report period are printed in the heading of the report;

(5) MCF equals (2 times pair size times footage) divided by 1,000,000;

(6) FKF equals (fiber count times footage) divided by 1,000;

(7) The age of an inventory item is calculated by subtracting the current date from the date the inventory item was receipted into inventory;

(8) Investment is not tracked for warehouse sites nor for Refurbished Central Office Equipment (RCOE) sites; and (9) Inventory items marked for emergency use or joint use are not tracked on the Investment Management Report.

Fig. 105 is an exemplary investment management report.

ISSUE SUMMARY REPORT

An Issue Summary Report contains information about issued material. The report is used to print a list of inventory items that have been taken from the inventory site to the job site. The report may be requested by any OSPCM user that has access to the Management Reports application. To request an Issue Summary Report, provide the following information:

(1) Location – The state, CMC, or inventory site on which to report. You may print the report for any of the nine states in the BellSouth region, any CMC, or any inventory site. Location must be specified. The following business rules are observed depending on the location specified:

(a) State – All inventory items issued in the specified state are listed on the report. A page break occurs for each CMC in the specified state (sorted alphabetically);

(b) CMC – All inventory items issued in the specified CMC are listed on the report. A page break occurs for each inventory site in the specified CMC (sorted alphabetically); and (c) Inventory Site – All inventory items issued in the specified inventory site are listed on the report.

Every open issue in the specified state, CMC, or inventory site is listed on the report and the following information is printed:

(1) Inventory Site – The name of the inventory site from which the material was issued;

(2) Issued Date – The date the material was issued;

(3) Job Number – The job authority for which the material was issued;

(4) Resource ID – The resource ID responsible for the work for which the material was issued. If the inventory item was issued for multiple substeps, the resource ID assigned to each substep and its job number is printed on the report;

(5) Material Description – The description of the material issued;

(6) Serial Number – The serial number of the inventory item issued (if the inventory item is serialized material);

(7) Quantity – The quantity currently issued;

(8) Picked Up By – The identifier (name or initials) of the person to whom the material was issued; and (9) In Jeopardy? – An asterisk (*) here indicates that the material has been issued longer than expected and is in jeopardy of not being used or returned within x number of days. The number of days before issued material is considered "in jeopardy" is set by each CMC.

The report is sorted in ascending order by inventory site, issue date, job number, and resource ID.

SAMPLE REPORT LAYOUT

MP-1030S
By: Karin Olinger, YJLGRQD
Date: 08/20/1995 08:14:56 AM
Job: RMMISSUM

ISSUE SUMMARY REPORT
FOR STATE : GA

Page: 1

CMC : LAWR

| Inventory Site | Issued Date | Job Number | Resource ID | Material Description | Serial Number | Quantity | Picked Up By | In Jeopardy? |
|---|---|---|---|---|---|---|---|---|
| LRVL | 08/15/1995 | 45G003456 | KKOT | AFAW-100 | S345903411 | 200 | John Smith | * |
| | | 45G003456 | KKOT | | | | | |
| SNLV | 08/20/1995 | 45G006789 | KKOS | AFAW-200 | | 400 | MAS | |
| SNLV | 08/20/1995 | 45G006789 | KKOT | 10A1-50/30 | | 2 | MAS | |

MP-1030S
By: Karin Olinger, YJLGRQD
Date: 08/20/1995 08:14:56 AM
Job: RMMISSUM

ISSUE SUMMARY REPORT
FOR STATE : GA

Page: 2

CMC : ROME

| Inventory Site | Issued Date | Job Number | Resource ID | Material Description | Serial Number | Quantity | Picked Up By | In Jeopardy? |
|---|---|---|---|---|---|---|---|---|
| LGRN | 08/16/1995 | 45G004567 | KKOT | 10B-550/30 | | 1 | KKO | * |
| LGRN | 08/16/1995 | 45G004567 | KKOT | ANAW-200 | S221189021 | 400 | KKO | * |
| ROMM | 08/18/1995 | 45G003221 | MASR | 10A1-50/30 | | 2 | Joe Jones | |

* END OF REPORT *

MAJOR MATERIAL ACTIVITY REPORT

The Major Material Activity Report contains information about material inventory transactions that involve movement in and out of inventory, excluding order receipts, transfer receipts, and disbursements. The report is designed so that a manager is aware of the transaction activity that occurs within an area for which he/she is responsible. Any abnormal activity is invested. The report may be requested by any OSPCM user that has access to the Management Reports application.

To request the Major Material Activity Report, provide the following information:

(1) Location – The state, CMC, or inventory site on which to report. You may print the report for any of the nine states in the BellSouth region, any CMC, or any inventory site. Location must be specified. The following business rules are observed depending on the location specified:

- (a) State – All transactions occurring in the specified state are listed on the report. A page break occurs for each CMC in the specified state (sorted alphabetically);
- (b) CMC – All transactions occurring in the specified CMC are listed on the report. Note that there is no page break between inventory sites when requesting the report for a specific CMC; and
- (c) Inventory Site – All transactions occurring in the specified inventory site are listed on the report.

The report is divided into the following six sections (in the order specified):

(1) Material Junked – This section of the report lists transactions for inventory items junked (either manually by a user or auto-junked by the system) or reclassified as exempt material. It includes transactions of type Junk and Reclassify to Exempt. This section requires a manager's or director's signature acknowledging validity of entries. The signature assures proper controls are implemented to prevent improper junks and reclassification of inventory as exempt material. This section of the report is required to be kept on file for three years;

(2) Inventory Record Adjustments – This section of the report lists transactions for material that was added to inventory from salvage operations, recoveries from previous junkings, reclassification of exempt material as non-exempt material, and physical inventory "write on/off'. It includes transactions of type Inventory Addition, Inventory Deletion, Remove to Good, Remove to Good Reversal, Recover from Junk and Reclassify from Exempt. This section of the report should be reviewed periodically to recognize abnormal activity;

(3) Material Returned to Supplier – This section of the report lists transactions for inventory items that have been sent back to a warehouse or to an outside vendor. It includes transactions of type Return;

(4) Material Transferred Out – This section of the report lists transactions for inventory items that have been transferred from one CMC to another. It includes transactions of type Transfer and Transfer Reversal. The following business rules are observed:

(a) Only those transactions involving a transfer from an inventory site (as opposed to from a warehouse site) are listed on the report;

(b) Only those transactions involving a transfer that has not yet been received in the TO inventory site are listed on the report; and (c) Only those transactions involving a transfer out of a CMC are listed on the report (i.e., transfers between inventory sites within the same CMC are not listed).

(5) Order Receipt Corrections – This section of the report lists transactions for order receipt corrections. It includes transactions of type Order Receipt Reversal. It is provided for management review. The volume of transactions listed will reflect the accuracy of proper receipting procedures and data entry; and (6) Disbursement Corrections – This section of the report lists transactions for disbursement corrections. It includes transactions of type Disbursement Reversal. Since all disbursement transactions are mechanically created whenever material usage is reported, numerous correction transactions may indicate a problem with Telco or contractor reporting.

Each section of the report is printed whenever this report is requested. The following information is printed on the report:

(1) Tran Type – The type of transaction report. Valid codes are: "JNK" (Junk); "RTE" (Reclassify to Exempt); "IA" (Inventory Addition; "ID" (Inventory Deletion); "RM" (Remove to Good); "RMR" (Remove to Good Reversal); "RCJ" (Recover from Junk); "RFE" (Reclassify from Exempt); "RT" (Return); "T" (Transfer; "TRV" (Transfer Reversal); "ORR" (Order Receipt Reversal); and "DBR" (Disbursement Reversal);

(2) Pair Size – The pair size of the material. Populated only if the material associated with the transaction has a pair size (e.g., copper cable);

(3) Fiber Count – The fiber count of the material. Populated only if the material associated with the transaction is cable and contains fiber;

(4) Cable Gauge – The cable gauge of the material. Populated only if the material associated with the transaction is cable;

(5) Material Description – The description of the material associated with the transaction;

(6) Quantity – The quantity associated with the transaction (i.e., the quantity junked, the quantity added to inventory, etc.);

(7) Value – The dollar value associated with the transaction (quantity * the average price of the material (the average price of cable is per 100 feet);

(8) Serial Number – The serial number associated with the transaction (if the material is serialized);

(9) From Location – The location from which the transaction was made. Populated when the following transactions are reported: (a) Junk; (b) Reclassify to Exempt; (c) Inventory Deletion; (d) Remove to Good Reversal; (e) Order Receipt Reversal; (f) Return; (g) Transfer; and (h) Transfer Reversal;

(10) To Location – The location to which the transaction was made. Populated when the following transactions are reported: (a) Inventory Addition; (b) Remove to Good; (c) Reclassify from Exempt; (d) Recover from Junk; (e) Return – For a Return transaction, the To Location represents the warehouse or outside vendor to which the material was returned; (f) Disbursement Reversal; (g) Transfer; and (h) Transfer Reversal.

(11) Tran Number – The system generated number of the transaction; and

(12) Tran Date – The date the transaction was created.

The following business rules are observed when creating this report:

(a) Transactions are reported for the previous month. For example, if the report is requested on January 12th, the report lists only those transactions that occurred during the month of December;

(b) Each transaction is listed as a separate line on the report;

(c) Each section of the report is sorted by transaction type;

(d) Each section of the report is printed regardless of whether or not there are transactions to report. This is done so that we have positive report. The message " * No Activity to Report * " is printed if there are no transactions to report in that section;

(e) Transactions involving less than 50 feet of cable are not listed on the report so that the report size is controlled;

(f) The Material Junked section contains a line for an approval signature and a note that indicates this section of the report must be retained for three years; and (g) The Inventory Record Adjustment section contains a summary of the total dollar value added to inventory and the total dollar value deleted from inventory.

Figs. 106-113 are exemplary major material activity reports.

MATERIAL NOTIFICATION REPORT

The Material Notification Report contains information about the inventory items currently assigned to a job. The report is used to determine the material that is available to begin work. The report may be requested by any OSPCM user that has access to the Management Reports application. To request a Material Notification Report, provide the following information:

(1) Job Number – The job authority number of which to report. Job Number is optional but if not specified, Resource ID must be specified; and (2) Resource ID – The resource ID on which to report. Resource ID is optional but if not specified, Job Number must be specified.

The following information is printed on the report:

(1) Job Number – The job authority to which the inventory items are assigned;

(2) Resource ID – The resource ID to which the inventory items are assigned;

(3) Print – The job print to which the inventory items are assigned;

(4) Step – The job step to which the inventory items are assigned;

(5) Material Description – The material description of the assigned inventory item;

(6) Quantity Required – The quantity currently assigned to satisfy a requirement on this step;

(7) Quantity Assigned – The quantity currently assigned to satisfy a requirement on this step;

(8) Serial Number – The serial number of the inventory item (if the inventory item is serialized material);

(9) Reel Type – The reel size that the material is stored on (if the material is cable);

(10) Custom Features? – An asterisk (*) here indicates that the inventory item has custom features (e.g., pulling eye, modular connection, etc.);

(11) Inventory Site – The name of the inventory site responsible for the inventory item;

(12) Bin Loc – The bin location of the inventory item at the inventory site. Bin Loc may be blank if the inventory site is not using bin locations;

(13) Physical Location – The physical location of the inventory item. Values are: "INV" (at the inventory site); "ALT" (at an alternate storage location); "ISS" (issued); and

(14) Assigned Date – The date the inventory item was assigned to the job.

The following business rules are observed when creating the Material Notification Report:

(1) If a job number is specified without a resource ID, a report of all material assigned to the specified job, regardless of resource ID, is printed and the report breaks on resource ID;

(2) If a resource ID is specified without a job number, a report of all material assigned to the specified resource ID, regardless of job, is printed and the report breaks on job number;

(3) If both a job number and a resource ID are specified, a report of all material assigned to the specified resource ID within the specified job is printed;

(4) For each unique print, step, and assigned material description with a job, a separate detail line is printed for each assignment. For example, (a) Each serialized inventory item assigned to satisfy a material requirement on a step is shown on a separate line of the report; and (b) Each non-serialized inventory item assigned to satisfy a material requirement on a step that is located in a different place (bin loc or physical location) is shown on a separate line of the report; and (5) Within a job, the report is sorted by print and step.

Fig. 114 is an exemplary material notification report.

ORDER REPORTS

An Order report contains information about orders having a specified status. The report may be requested by any OSPCM user that has access to the Management Reports application. To request an Order report, provide the following information:

(1) Location – The state, CMC, or inventory site on which to report. You may print the report for any of the nine states in the BellSouth region, any CMC, or any inventory site. Location must be specified. The following business rules are observed depending on the location specified:

(a) State – All orders created for the specified state are listed on the report. A page break occurs for each CMC in the specified state (sorted alphabetically);

(b) CMC – All orders created for the specified CMC are listed on the report. A page break occurs for each inventory site in the specified CMC (sorted alphabetically); and (c) Inventory Site – All orders created for the specified inventory site are listed on the report; and (2) Status – The order status on which you want to report. Valid choices are: "Ordered", "Shipped", "Received", or "Cancelled". Status must be provided;

(3) Date Range – The date range for which orders are to be reported. Date Range is optional. If not provided, all orders for the specified location and in the specified status are listed on the report.

OPEN ORDERS

These are orders that have been placed with OrderMaster, but not yet shipped in its entirety. If you choose to report on orders in the "Ordered" status, the following business rules are observed:

(1) The report name is "Open Order Report "(MP-10285);

(2) Only orders in the "ordered" status or "backordered" status are listed on the report. An order is in the "ordered" status if at least one item within that order remains in the "ordered" status or "backordered" status. An order is in the "backordered" status only if every item within that order is "backordered";

(3) If an order is selected to appear on the report, every order item within that order is listed as a line on the report;

(4) If a date range is provided, only those orders created within the specified range are listed on the report (e.g., If a date range of 01/01/1995 – 01/15/1995 is provided, only those orders with a requisition date between 01/01/1995 and 01/15/1995 are reported.).

(5) The following information is printed on the report:

(a) Job Number – The job authority for which the material was ordered;

(b) OrderMaster Number – The number assigned by OrderMaster to this order;

(c) OrderMaster Line Item – The line item number assigned by OrderMaster to this order item;

(d) Material Description – The description of the material ordered;

(e) Quantity – The quantity ordered;

(f) Order Date – The date the material was ordered. The date is the same for every order item within an order;

(g) Scheduled Ship Date – The date the order item is expected to be shipped. This column is blank if the order item was backordered or cancelled;

(h) Inventory Site – The name of the inventory site that ordered the material;

(i) Resource ID – The resource ID responsible for the work for which the material was ordered;

(j) Status – The status of the order item. Values are: "ORDE" (ordered), "SHPD" (shipped), "RCVD" (received, "COMP" (complete), and "CANC" (cancelled);

(k) Ordered Late? – An asterisk (*) here indicates that the order item is in jeopardy of being delivered late (past the on job date) because the order was placed late;

(l) Custom Features? – An asterisk (I) here indicates that the material was ordered with custom features (e.g., pulling eyes, pre-term, etc.);

(5) Pre-term? – An asterisk (*) here indicates that the material was ordered with a custom feature of pre-term;

(6) The report breaks on job number (sorted alphabetically in ascending order);

(7) Within a job, the orders are listed in ascending order by OrderMaster Number and OrderMaster Line Item.

SHIPPED ORDERS

These are orders that have been shipped, but not yet received in its entirety. If you choose to report on orders in the "Shipped" status, the following business rules are observed;

(1) The report name is "Shipped Order Report" (MP-10286);

(2) Only orders in the "shipped" status are listed on the report. An order is in the "shipped" status if at least one item within that order remains in the "shipped" status and there is no item within that order in the "ordered" status;

(3) If an order is selected to appear on the report, every order item within that order is listed as a line on the report;

(4) If multiple shipments exist for an order item, each shipment is listed as a separate line on the report;

(5) If a date range is provided, only those orders that have an order item that was shipped within the specified range are listed on the report (e.g., If a date range of 01/01/1995 – 01/15/1995 is provided, only those orders that have an order item that was shipped between 01/01/1995 and 01/15/1995 are reported.)

(a) Job Number – The job authority for which the material was ordered;

(b) OrderMaster Number – The number assigned by OrderMaster to this order;

(c) OrderMaster Line Item – The line item number assigned by OrderMaster to this order item;

(d) Material Description – The description of the material shipped;

(e) Quantity – The quantity shipped;

(f) Serial Number – The serial number shipped (if the material shipped is serialized);

(g) Shipped Date – The date the material was actually shipped;

(h) Inventory Site – The name of the inventory site that ordered the material;

(i) Resource ID – The resource ID responsible for the work for which the material was ordered;

(j) Status – The status of the order item. Values are: "SHPD" (shipped), "RCVD" (received), "COMP" (complete), and "CANC" (cancelled);

(k) Custom Features? – An asterisk (*) here indicates that the material was ordered with custom features (e.g., pulling eyes, pre-term, etc.);

(l) Pre-term? – An asterisk (*) here indicates that the material was ordered with a custom feature of pre-term;

(6) The report breaks on job number (sorted alphabetically in ascending order); and (7) Within a job, the orders are listed in ascending order by OrderMaster Number and OrderMaster Line Item.

RECEIVED ORDERS

These are orders that have been received in its entirety. If you choose to report on orders in the "Received" status, the following business rules are observed.

(1) The report name is "Received Order Report" (MP-10287);

(2) Only orders in the "received" status are listed on the report. An order is in the "received" status only if every item within that order is "received" and/or "complete";

(3) If an order is selected to appear on the report, every order item within that order is listed as a line on the report;

(4) If multiple shipments exist for an order item, each shipment is listed as a separate line on the report;

(5) If a date range is provided, only those orders that have an order item that was receipted into inventory within the specified range are listed on the report (e.g., If a date range of 01/01/1995 – 01/15/1995 is provided, only those orders that have an order item that was receipted between 01/01/1995 and 01/15/1995 are reported.);

(6) The following information is printed on the report:

(a) Job Number – The job authority for which the material was ordered;

(b) OrderMaster Number – The number assigned by OrderMaster to this order;

(c) OrderMaster Line Item – The line item number assigned by OrderMaster to this order item;

(d) Material Description – The description of the material received;

(e) Quantity – The quantity received;

(f) Serial Number – The serial number received (if the material received is serialized);

(g) Receipt Date – The date the material was received;

(h) Inventory Site – The name of the inventory site that ordered the material;

(i) Resource ID – The resource ID responsible for the work for which the material was ordered;

(j) Custom Features? – An asterisk (*) here indicates that the material was ordered with custom features (e.g., pulling eyes, pre-term, etc.)

(k) Pre-term? – An asterisk (*) here indicates that the material was ordered with a custom feature of pre-term;

(7) The report breaks on job number (sorted alphabetically in ascending order); and (8) Within a job, the orders are listed in ascending order by OrderMaster Number and OrderMaster Line Item.

CANCELLED ORDERS

These are orders that have been cancelled in its entirety. This can happen if REGIS rejected each order item within the order or if you completed each order item within the order before any shipments were received (CAPRI cannot reject an order item. If the item fails to generate a PO, the item drops to a report that is handled by the PSO rather than returning an error message to OSPCM). If you choose to report on orders in the "Cancelled" status, the following business rules are observed:

(1) The report name is "Cancelled Order Report" (MP-10288);

(2) Only orders in the "cancelled" status are listed on the report. An order is in the "cancelled" status only if every item within that order is "cancelled".

(3) If an order is selected to appear on the report, every order item within that order is listed as a line on the report;

(4) If a date range is provided, only those orders that have an order item that was ordered within a specified range are listed on the report (e.g., If a date range of 01/01/1995 - 01/15/1995 is provided, only those orders that have a requisition date between 01/01/1995 and 01/15/1995 are reported.);

(5) The following information is printed on the report:

(a) Job Number – The job authority for which the material was ordered;

(b) OrderMaster Number – The number assigned by OrderMaster to this order;

(c) OrderMaster Line Item – The line item number assigned by OrderMaster to this order item;

(d) Material Description – The description of the material ordered;

(e) Quantity – The quantity ordered;

(f) Order Date – The date the material was ordered. The date is the same for every order item within an order;

(g) Inventory Site – The name of the inventory site that ordered the material;

(h) Resource ID – The resource ID responsible for the work for which the material was ordered;

(i) Reason for Cancellation – If the order item was rejected by REGIS, this column contains the error message returned from REGIS (e.g., Backorder Not Allowed). If you completed the order item, this column contains the message "Item was completed in OSPCM before shipments were received";

(j) Ordered Late? – An asterisk (*) here indicates that the order item is in jeopardy of being delivered late (past the on job date) because the order was placed late;

(6) The report breaks on job number (sorted alphabetically in ascending order);

(7) Within a job, the orders are listed in ascending order by OrderMaster Number and OrderMaster Line Item.

Fig. 115 is an exemplary open order report.

OVER-AGE MATERIAL REPORT

The Over-Age Material Report contains information about material that will be held in inventory over 30 days because of a change in the associated job's schedule. This includes material that is 1) on order that, once receipted, will be in inventory for over 30 days before it is used and 2) assigned material that will be in inventory for over 30 days before it is used. The report serves as a warning that you are in jeopardy of holding inventory for over 30 days which could adversely affect your investment index. The report can be used to reference the inventory items that could be unassigned from the original job and assigned to a job that will be worked earlier or used to reschedule the job again so that the material can be used for its original purpose. The report may be requested by any OSPCM user that has access to the Management Reports application.

To request the Over-Age Material Report, you must provide the inventory site on which to report. You may print the report for any inventory site.

Each substep that has been marked as potentially having over age material assigned to it in the specified inventory site is listed on the report and the following information is printed:

(1) Job Number – The job authority number for which the material is on order or to which the inventory item is currently assigned;

(2) Print – The job print for which the material is on order or to which the inventory item is currently assigned;

(3) Step – The job step for which the material is on order or to which the inventory item is currently assigned;

(4) Activity Number – The scheduling activity to which the substep is assigned;

(5) Resource ID – The resource ID for which the material is on order or to which the inventory item is currently assigned;

(6) Old Schedule Date – The date the substep was originally scheduled to begin work;

(7) New Schedule Date – The date the substep is currently scheduled to begin work;

(8) Material Description – The description of the material ordered, shipped, or assigned;

(9) Serial Number – The serial number of the material. Serial Number is populated if the material was ordered from a BST warehouse and has been shipped or if the material is already in inventory; otherwise it is blank;

(10) Quantity – The quantity ordered, shipped, or assigned; and

(11) Receipt Date – The date the material was receipted into inventory. Receipt Date is populated if the material is already in inventory; otherwise it is blank.

The report is sorted in ascending order by job number, activity number, print, step, and resource ID.

Fig. 116 is an exemplary over-age material report.

TRANSACTION REPORTS

A Transaction report contains information about transactions of a specified type. The report may be requested by any OSPCM user that has access to the Management Reports application. To request a Transaction report, provide the following information:

(1) Location – The state, CMC, or inventory site on which to report. You may print the report for any of the nine states in the BellSouth region, any CMC, or any inventory site. Location must be specified. The following business rules are observed depending on the location specified:

(a) State – All transactions created to and from the specified state are listed on the report. A page break occurs for each CMC in the specified state (sorted alphabetically);

(b) CMC – All transactions created to and from the specified CMC are listed on the report. A page break occurs for each inventory site in the specified CMC (sorted alphabetically); and (c) Inventory Site – All transactions created to and from the specified inventory site are listed on the report;

(2) Transaction Type – The type of transaction on which to report. Valid choices are: Order Receipt, Assignment, Unassignment, Inventory Status Change, Inventory Addition, Inventory Deletion, Split a Reel, Transfer, Transfer Receipt, Reclassify to Exempt, Reclassify from Exempt, Return, Disbursement, Remove to Good, Junk, Recover from Junk. Transaction Type must be specified.

(3) Material Category – The category of material on which to report. Valid choices are: ALL, Copper Cable, Fiber Cable, Circuit Equipment, Miscellaneous Apparatus, All Cable. Material Category must be provided. The default is ALL. The following business rules are observed depending on the material category specified:

(a) ALL – All transactions regardless of category of material involved are listed on the report:

(b) Copper Cable – Only those transactions involving copper cable and coax cable are listed on the report;

(c) Fiber Cable – Only those transactions involving fiber cable are listed on the report;

(d) Circuit Equipment – Only those transactions involving circuit equipment are listed on the report;

(e) Miscellaneous Apparatus – Only those transactions involving material other than copper cable, coax cable, fiber cable, or circuit equipment are listed on the report; and (f) All Cable – Only those transactions involving copper cable, coax cable, and fiber cable are listed on the report;

(4) Date Range – The date range for which transactions are to be reported. Date Range must be provided. Only those transactions created within the date range specified are listed on the report.

ORDER RECEIPT TRANSACTIONS

These are transactions that are created when material ordered either from a BST warehouse or an outside vendor is received into inventory. If you choose to report on transaction of type "Order Receipt", the following business rules are observed:

(1) The report name is "Order Receipt Report";

(2) Only transactions of type code "Order Receipt" or "Order Receipt Reversal" are listed on the report;

(3) Each transaction is listed as a separate line on the report;

(4) The following information is printed on the report:

(a) Trans Type – The transaction type reported. Values are: "OR" (Order Receipt) and "ORR" (Order Receipt Reversal);

(b) Job Number – The job authority for which the material was ordered;

(c) Material Description – The description of the material received;

(d) Transaction Quantity – The quantity received;

(e) Serial Number – The serial number received (if the material received was serialized);

(f) MCF/FKF – The million conductor feet (if the transaction involved copper or coax cable) or the fiber kilo feet (if the transaction involved fiber cable) received;

(g) Transaction Number – The system generated number of this transaction;

(h) Transaction Date – The date this transaction was created;

(i) Inventory Site – The name of the inventory site responsible for the material received;

(j) OrderMaster Number – The number assigned by OrderMaster to the order that was received;

(k) OrderMaster Line Item – The line item number assigned by OrderMaster to the line item received;

(l) Dollar Amount – The dollar amount received; and (m) FC/FRC – The account to which the material was ordered; and (5) Sort order is by job number (ascending order) and Transaction Date (ascending order).

ASSIGNMENT TRANSACTIONS

These are transactions that are created when an inventory item is assigned for use on a specific job. If you choose to report on transactions of type "Assignment", the following business rules are observed:

(1) The report name is "Assignment Report";

(2) Only transactions of type code "Assignment" are listed on the report;

(3) Each transaction is listed as a separate line on the report;

(4) The following fields always appear on the report:

(a) Job Number – The job authority to which the inventory item was assigned;

(b) Material Description – The material description of the inventory item;

(c) Transaction Quantity – The quantity assigned;

(d) Serial Number – The serial number of the inventory item (if the inventory item is serialized material).

(e) MCF/FKF – The million conductor feet (if the transaction involved copper or coax cable) or the fiber kilo feet (if the transaction involved fiber cable) assigned;

(f) Transaction Number – The system generated number of this transaction;

(g) Transaction Date – The date this transaction was created;

(h) Inventory Site – The name of the inventory site responsible for the inventory item;

(i) Resource ID – The resource ID to which the inventory item was assigned;

(j) From Status – The status of the inventory item before it was assigned. Values are: "U" (unassigned) and "S" (surplus);

(k) Dollar Amount – The dollar amount assigned; and (l) To FC/FRC – The account in which the inventory item resides after it was assigned; and (5) Sort order is by job number (ascending order) and Transaction Date (ascending order).

UNASSIGNMENT TRANSACTIONS

These are transactions that are created when an inventory item is unassigned from a job. If you choose to report on transactions of type "Unassignment", the following business rules are observed:

(1) The report name is "Unassignment Report";

(2) Only transactions of type code "Unassignment" are listed on the report;

(3) Each transaction is listed as a separate line on the report;

(4) The following information is printed on the report:

(a) Job Number – The job authority to which the inventory item was previously assigned;

(b) Material Description – The material description of the inventory item;

(c) Transaction Quantity – The quantity unassigned;

(d) Serial Number – The serial number of the inventory item (if the inventory item is serialized material);

(e) MCF/FKF – The million conductor feet (if the transaction involved copper or coax cable) or the fiber kilo feet (if the transaction involved fiber cable) unassigned;

(f) Transaction Number – The system generated number of this transaction;

(g) Transaction Date – The date this transaction was created;

(h) Inventory Site – The name of the inventory site responsible for the inventory item;

(i) Resource ID – The resource ID to which the inventory item was previously assigned;

(j) From Status – The status of the inventory item before it was unassigned. Its value is "A" (assigned);

(k) Dollar Amount – The dollar amount unassigned;

(l) From FC/FRC – The account in which the inventory item resided before it was unassigned;

(5) Sort order is by job number (ascending order) and Transaction Date (ascending order).

INVENTORY STATUS CHANGE TRANSACTIONS

These are transactions that are created when an inventory item changes from awaiting return to unassigned or surplus, from unassigned to awaiting return or surplus, or from surplus to awaiting return or unassigned. If you choose to report on transactions of type "Inventory Status Change", the following business rules are observed:

(1) The report name is "Inventory status Change Report"

(2) Only transactions of type code "Inventory Status Change" are listed on the report;

(3) Each transaction is listed as a separate line on the report;

(4) The following information is printed on the report:

(a) Material Description – The material description of the inventory item;

(b) Transaction Quantity – The quantity that changed status;

(c) Serial Number – The serial number of the inventory item (if the inventory item is serialized material);

(d) MCF/FKF – The million conductor feet (if the transaction involved copper or coax cable) or the fiber kilo feet (if the transaction involved fiber cable) that changed status;

(e) Transaction Number – The system generated number of this transaction;

(f) Transaction Date – The date this transaction was created;

(g) Inventory Site – The name of the inventory site responsible for the inventory item;

(h) From Status – The status of the inventory item before it was changed. Values are: "U" (unassigned), "S" (surplus), and "AW" (awaiting return);

(i) Dollar Amount – The dollar amount unassigned; and (5) Sort order is by Transaction Date (ascending order).

INVENTORY ADDITION TRANSACTIONS

These are transactions that are created when material is added to inventory because of a need to correct an out of balance condition. If you choose to report on transactions of type "Inventory Addition", the following business rules are observed:

(1) The report name is "Inventory Addition Report";

(2) Only transactions of type code "Inventory Addition" are listed on the report;

(3) Each transaction is listed as a separate line on the report;

(4) The following information is printed on the report:

(a) Material Description – The material description of the inventory item;

(b) Transaction Quantity – The quantity added to inventory;

(c) Serial Number – The serial number of the inventory item (if the inventory item is serialized material);

(d) MCF/FKF – The million conductor feet (if the transaction involved copper or coax cable) or the fiber kilo feet (if the transaction involved fiber cable) added to inventory;

(e) Transaction Number – The system generated number of this transaction;

(f) Transaction Date – The date this transaction was created;

(g) Inventory Site – The name of the inventory site responsible for the inventory item after it was added to inventory;

(h) Dollar Amount – The dollar amount added to inventory; and (5) Sort order is by Transaction Date (ascending order).

INVENTORY DELETION TRANSACTIONS

These are transactions that are created when material is deleted from inventory because of a need to correct an out of balance condition. If you choose to report on transactions of type "Inventory Deletion", the following business rules are observed:

(1) The report name is "Inventory Deletion Report";

(2) Only transactions of type code "Inventory Deletion" are listed on the report;

(3) Each transaction is listed as a separate line on the report;

(4) The following information is printed on the report:

(a) Material Description – The material description of the inventory item;

(b) Transaction Quantity – The quantity deleted from inventory;

(c) Serial Number – The serial number of the inventory item (if the inventory item is serialized material);

(d) MCF/FKF – The million conductor feet (if the transaction involved copper or coax cable) or the fiber kilo feet (if the transaction involved fiber cable) deleted from inventory;

(e) Transaction Number – The system generated number of this transaction;

(f) Transaction Date – The date this transaction was created;

(g) Inventory Site – The name of the inventory site responsible for the inventory item after it was deleted from inventory;

(h) From Status – The status from which the inventory was deleted. Values are "U" (unassigned) and "S" (surplus);

(i) Dollar Amount – The dollar amount added to inventory; and (5) Sort order is by Transaction Date (ascending order).

SPLIT A REEL TRANSACTIONS

These are transactions that are created when cable is moved from a reel to a new reel or hand-coil. If you choose to report on transactions of type "Split A Reel", the following business rules are observed:

(1) The report name is "Split A Reel Report";

(2) Only transactions of type code "Split A Reel" are listed on the report;

(3) Each transaction is listed as a separate line on the report;

(4) The following information is printed on the report:

(a) Material Description – The material description of the inventory item;

(b) Transaction Quantity – The quantity split;

(c) Serial Number – The serial number from which the cable was split;

(d) To Serial Number – The serial number to which the cable was split;

(e) MCF/FKF – The million conductor feet (if the transaction involved copper or coax cable) or the fiber kilo feet (if the transaction involved fiber cable) split;

(f) Transaction Number – The system generated number of this transaction;

(g) Transaction Date – The date this transaction was created;

(g) Inventory Site – The name of the inventory site responsible for the inventory item;

(h) Dollar Amount – The dollar amount split; and (5) Sort order is by Transaction Date (ascending order).

TRANSFER TRANSACTIONS

These are transactions that are created when material is transferred between inventory sites or from a warehouse site to an inventory site. If you choose to report on transactions of type "Transfer", the following business rules are observed:

(1) The report name is "Transfer Report";

(2) Only transactions of type code "Transfer" and "Transfer Reversal" are listed on the report;

(3) Each transaction is listed as a separate line on the report;

(4) The following information is printed on the report:

(a) Trans Type – The transaction type reported. Values are "T" (Transfer) and "TRV" (Transfer Reversal);

(b) Material Description – The material description of the material transferred;

(c) Transaction Quantity – The quantity transferred;

(d) Serial Number – The serial number of the inventory item transferred (if the inventory item is serialized material);

(e) MCF/FKF – The million conductor feet (if the transaction involved copper or coax cable) or the fiber kilo feet (if the transaction involved fiber cable) transferred;

(f) Transaction Number – The system generated number of this transaction;

(g) Transaction Date – The date this transaction was created;

(h) Inventory Site – The name of the inventory site responsible for the inventory item after it was transferred;

(i) To Inventory Site – The name of the inventory site to which the material was transferred;

(j) Dollar Amount – The dollar amount transferred; and (5) Sort order is by Transaction Date (ascending order).

TRANSFER RECEIPT TRANSACTIONS

These are transactions that are created when material transferred from another inventory site or from a warehouse site is received into inventory. If you choose to report on transactions of type "Transfer Receipt", the following business rules are observed:

(1) The report name is "Transfer Receipt Report";

(2) Only transactions of type code "Transfer Receipt" and "Transfer Receipt Reversal" are listed on the report;

(3) Each transaction is listed as a separate line on the report;

(4) The following information is printed on the report:

(a) Trans Type – The transaction type reported. Values are "TR" (Transfer Receipt) and "TRR" (Transfer Receipt Reversal);

(b) Material Description – The material description of the material received;

(c) Transaction Quantity – The quantity received;

(d) Serial Number – The serial number received (if the inventory item is serialized material);

(e) MCF/FKF – The million conductor feet (if the transaction involved copper or coax cable) or the fiber kilo feet (if the transaction involved fiber cable) received;

(f) Transaction Number – The system generated number of this transaction;

(g) Transaction Date – The date this transaction was created;

(h) Inventory Site – The name of the inventory site from which the material was transferred;

(i) To Inventory Site – The name of the inventory site to which the material was transferred;

(j) Dollar Amount – The dollar amount transferred; and (5) Sort order is by Transaction Date (ascending order).

RECLASSIFY TO EXEMPT TRANSACTION

These are transaction that are created when an inventory item is reclassified as exempt material. If you choose to report on transactions of type "Reclassify to Exempt", the following business rules are observed:

(1) The report name is "Reclassify to Exempt Report";

(2) Only transactions of type code "Reclassify to Exempt" are listed on the report;

(3) Each transaction is listed as a separate line on the report;

(4) The following information is printed on the report:

(a) Material Description – The material description of the inventory item;

(b) Transaction Quantity – The quantity reclassified as exempt;

(c) Serial Number – The serial number of the inventory item (if the inventory item is serialized material);

(d) MCF/FKF – The million conductor feet (if the transaction involved copper or coax cable) or the fiber kilo feet (if the transaction involved fiber cable) reclassified as exempt;

(e) Transaction Number – The system generated number of this transaction;

(f) Transaction Date – The date this transaction was created;

(g) Inventory Site – The name of the inventory site responsible for the inventory item before it was reclassified as exempt material;

(h) Dollar Amount – The dollar amount reclassified as exempt; and (5) Sort order is by Transaction Date (ascending order).

RECLASSIFY FROM EXEMPT TRANSACTIONS

These are transactions that are created when material is reclassified as non-exempt material. If you choose to report on transactions of type "Reclassify from Exempt", the following business rules are observed:

(1) The report name is "Reclassify from Exempt Report";

(2) Only transactions of type code "Reclassify from Exempt" are listed on the report;

(3) Each transaction is listed as a separate line on the report;

(4) The following information is printed on the report:

(a) Material Description – The material description of the inventory item;

(b) Transaction Quantity – The quantity reclassified as non-exempt;

(c) Serial Number – The serial number of the inventory item (if the inventory item is serialized material);

(d) MCF/FKF – The million conductor feet (if the transaction involved copper or coax cable) or the fiber kilo feet (if the transaction involved fiber cable) reclassified as non-exempt;

(e) Transaction Number – The system generated number of this transaction;

(f) Transaction Date – The date this transaction was created;

(g) Inventory Site – The name of the inventory site responsible for the inventory item before it was reclassified as non-exempt material;

(h) Dollar Amount – The dollar amount reclassified as non-exempt; and (5) Sort order is by Transaction Date (ascending order).

RETURN TRANSACTIONS

These are transactions that are created when an inventory item is returned to a BST warehouse or to an outside vendor. If you choose to report on transactions of type "Return", the following business rules are observed:

(1) The report name is "Return Report";

(2) Only transactions of type code "Return" are listed on the report;

(3) Each transaction is listed as a separate line on the report;

(4) The following information is printed on the report:

(a) Trans Type – The transaction type report. Values are: "RT" (Return);

(b) Material Description – The material description of the inventory item;

(c) Transaction Quantity – The quantity returned;

(d) Serial Number – The serial number of the inventory item (if the inventory item is serialized material);

(e) MCF/FKF – The million conductor feet (if the transaction involved copper or coax cable) or the fiber kilo feet (if the transaction involved fiber cable) returned;

(f) Transaction Number – The system generated number of this transaction;

(g) Transaction Date – The date this transaction was created;

(h) Inventory Site – The name of the inventory site responsible for the inventory item before it was returned;

(i) Returned To – The BST warehouse or outside vendor to which the inventory item was returned;

(j) Return Authorization Number – The authorization number for this return;

(k) Dollar Amount – The dollar amount returned; and (5) Sort order is by Transaction Date (ascending order).

DISBURSEMENT TRANSACTIONS

These are transactions that are created when an inventory item is disbursed (placed in service). If you choose to report on transaction of type "Disbursement", the following business rules are observed:

(1) The report name is "Disbursement Report";

(2) Only transactions of type code "Disbursement" and "Disbursement Reversal" are listed on the report;

(3) Each transaction is listed as a separate line on the report;

(4) The following information is printed on the report:

(a) Trans Type – The transaction type report. Values are: "DB" (Disbursement) and "DBR" (Disbursement Reversal);

(b) Material Description – The material description of the inventory item;

(c) Transaction Quantity – The quantity disbursed;

(d) Serial Number – The serial number of the inventory item (if the inventory item is serialized material);

(e) MCF/FKF – The million conductor feet (if the transaction involved copper or coax cable) or the fiber kilo feet (if the transaction involved fiber cable) disbursed;

(f) Transaction Number – The system generated number of this transaction;

(g) Transaction Date – The date this transaction was created;

(h) Inventory Site – The name of the inventory site responsible for the inventory item before it was disbursed;

(i) Resource ID – The resource ID to which the inventory item was assigned before it was disbursed;

(j) Dollar Amount – The dollar amount disbursed; and (5) Sort order is by job number (ascending order) and Transaction Date (ascending order).

REMOVE TO GOOD TRANSACTIONS

These are transactions that are created when material is taken out of service and put back into inventory. If you choose to report on transactions of type "Remove to Good", the following business rules are observed:

(1) The report name is "Remove to Good Report";

(2) Only transactions of type code "Disbursement" and "Disbursement Reversal" are listed on the report;

(3) Each transaction is listed as a separate line on the report;

(4) The following information is printed on the report:

(a) Trans Type – The transaction type report. Values are: "RM" (Remove to Good) and "RMR" (Remove to Good Reversal);

(b) Material Description – The material description of the inventory item;

(c) Transaction Quantity – The quantity removed to good;

(d) Serial Number – The serial number of the inventory item (if the inventory item is serialized material);

(e) MCF/FKF – The million conductor feet (if the transaction involved copper or coax cable) or the fiber kilo feet (if the transaction involved fiber cable) removed to good;

(f) Transaction Number – The system generated number of this transaction;

(g) Transaction Date – The date this transaction was created;

(h) Inventory Site – The name of the inventory site responsible for the inventory item after it was put back into inventory;

(i) Dollar Amount – The dollar amount removed to good; and (5) Sort order is by Transaction Date (ascending order).

JUNK TRANSACTIONS

These are transactions that are created when an inventory item is junked. If you choose to report on transactions of type "Junk", the following business rules are observed:

(1) The report name is "Junk Report";

(2) Only transactions of type code "Junk" are listed on the report;

(3) Each transaction is listed as a separate line on the report;

(4) The following information is printed on the report:

(a) Material Description – The material description of the inventory item;

(b) Transaction Quantity – The quantity junked;

(c) Serial Number – The serial number of the inventory item (if the inventory item is serialized material);

(d) MCF/FKF – The million conductor feet (if the transaction involved copper or coax cable) or the fiber kilo feet (if the transaction involved fiber cable) junked;

(f) Transaction Number – The system generated number of this transaction;

(g) Transaction Date – The date this transaction was created;

(h) Inventory Site – The name of the inventory site responsible for the inventory item after it was junked;

(i) Dollar Amount – The dollar amount junked;

(j) Auto-Junked? – An asterisk (*) here indicates that the inventory item was auto-junked by the system during the disbursement process (5) Sort order is by Transaction Date (ascending order).

RECOVER FROM JUNK TRANSACTIONS

These are transactions that are created when material is recovered from junk. If you choose to report on transactions of type "Recover from Junk" the following business rules are observed:

(1) The report name is "Recover from Junk Report";

(2) Only transactions of type code "Recover from Junk" are listed on the report;

(3) Each transaction is listed as a separate line on the report;

(4) The following information is printed on the report:

(a) Material Description – The material description of the inventory item;

(b) Transaction Quantity – The quantity recovered from junked;

(c) Serial Number – The serial number of the inventory item (if the inventory item is serialized material);

(d) MCF/FKF – The million conductor feet (if the transaction involved copper or coax cable) or the fiber kilo feet (if the transaction involved fiber cable) recovered from junk;

(f) Transaction Number – The system generated number of this transaction;

(g) Transaction Date – The date this transaction was created;

(h) Inventory Site – The name of the inventory site responsible for the inventory item after it was recovered from junk;

(i) Dollar Amount – The dollar amount recovered from junk; and (5) Sort order is by Transaction Date (ascending order).

SAMPLE REPORT LAYOUT

MP-10294
By: Karin Olinger, YJLGRQD
Date: 08/20/1995 08:14:56 AM
Job: RMMINVDL

INVENTORY DELETION REPORT
FOR CMC : ROME
DATE RANGE : 08/04/1995 - 08/06/1996

INVENTORY SITE : ROMM

Page: 1

| Material Description | Transaction Quantity | Serial Number | MCF/FKF | Transaction Number | Transaction Date | Inventory Site | Dollar Amount | From Status |
|---|---|---|---|---|---|---|---|---|
| AFAW-100 | 200 | SS90456756 | .04 | 3000 | 08/04/1995 | ROMM | $216.00 | S |
| AFAW-200 | 2000 | SS90456780 | 1.2 | 3022 | 08/05/1995 | ROMM | $6000.00 | U |

Private/Proprietary. Not for use or disclosure outside BellSouth except by written permission. BellSouth OSPCM MP-10294
By: Karin Olinger, YJLGRQD
Date: 08/20/1995 08:14:56 AM
Job: RMMINVDL

INVENTORY DELETION REPORT
FOR CMC : ROME
DATE RANGE : 08/04/1995 - 08/06/1996

INVENTORY SITE : LGRN

Page: 2

| Material Description | Transaction Quantity | Serial Number | MCF/FKF | Transaction Number | Transaction Date | Inventory Site | Dollar Amount | From Status |
|---|---|---|---|---|---|---|---|---|
| 10B1-50/30 | 2 | | | 4052 | 08/06/1995 | LGRN | $113.24 | S |

* END OF REPORT *

OSPCM MATERIAL MANAGEMENT – BS V

INTRODUCTION

The MATERIALS MANAGEMENT Business Solution Area V. deals with creating Management Reports. This Business Solution area is composed of 7 reports as follows:

Order reports (This group of reports is comprised of 4 individual reports)
Transaction reports (This group of reports is comprised of 16 individual reports)
Issue Summary Report
Major Material Activity Report
Material Notification Report
Over-Age Material Report
Investment Management Report (IMR)

Each report is described in a separate section of the document. Each section provides a description of the report and its purpose, a description of how the report may be requested, and a report layout and a description of each field on the report. The purpose of this document is to gain consensus as to the deliverable for MATERIALS MANAGEMENT Business Solution Area V.

The first section describes the types of Order reports that are available. This report contains information about orders for specified status. You may print the report for a state, Construction Management Center (CMC), or inventory site.

The second section describes the types of Transaction reports that are available. This report contains information about material inventory transactions for a specified type. You may print the report for a state, CMC, or inventory site.

The third section describes the Issue Summary Report. This report contains information about inventory items that are currently issued. You may print the report for a state, CMC, or inventory site.

The fourth section describes the Major Material Activity Report. This report contains information about material inventory transactions that involve movement of material in and out of inventory, excluding receipts and disbursements. You may print the report for a state, CMC< or inventory site.

The fifth section describes the Material Notification Report. This report contains information about the material currently assigned to a job. You may print the report for a job and/or resource id.

The sixth section describes the Over-Age Material Report. This report contains information about material that will be over 30 days old because of a scheduling change. This includes material that is 1) on order that, once receipted, will be in inventory for over 30 days before it is used and 2) assigned material that will be in inventory for over 30 days before it is used. You may print the report for an inventory site only.

The seventh section describes the Investment Management Report. This report provides an index which measures how efficient inventory is managed. The index describes how much inventory was owned over a given period of time and how much it cost the company to own that inventory. You may print the report for a state, CMC, or inventory site.

INTRODUCTION

The MATERIALS MANAGEMENT Business Solution Area II deals with satisfying a material requirement on an Outside Plant Construction Engineering Work Order (EWO) or a Plant Work Order (PWO) job with existing inventoried material. This method of satisfying a requirement may be used instead of ordering new material. This Business Solution area is broken down into three (3) sections:

Satisfy a Material Requirement with Inventory
Approve a Transfer Request
Receipt Transferred Material Each section is briefly described and then broken down into the actual navigational flow through the presentation. The purpose of this document is to gain consensus as to the deliverable for MATERIALS MANAGEMENT Business Solution Area II.

The first section deals with retrieving material requirements that need to be satisfied and satisfying those requirements with either an assignment or a transfer request. The procedures for retrieving requirements are presented in Business Solution Area I (BS1OVER.DOC). When material requirements are displayed, an indicator is shown for each requirement that can be satisfied from existing inventory at the requirement's inventory site. You may choose to make assignments from the inventory found or initiate another inventory scan to search for suitable substitutions for which assignments or transfer requests may be made.

The second section deals with approving a transfer request to satisfy a material requirement or rejecting a transfer request. You may display simultaneously the transfer requests that need to be approved by your inventory site and the transfer requests that have been approved by your inventory site but have not been received. You may transfer the inventory item requested, transfer a substitute for the inventory item requested, reject the transfer request, or cancel an approved transfer request that has not been received.

The third section deals with receipting transferred material. You may display simultaneously the inventory items that have been transferred to your inventory site but have not been received into your inventory and the transfer requests that have been made by your inventory site but have not been approved for transfer. You may receipt an inventory item that has not been received or cancel any transfer request that has not been approved.

RECEIPT TRANSFERRED MATERIAL

Figure 117:
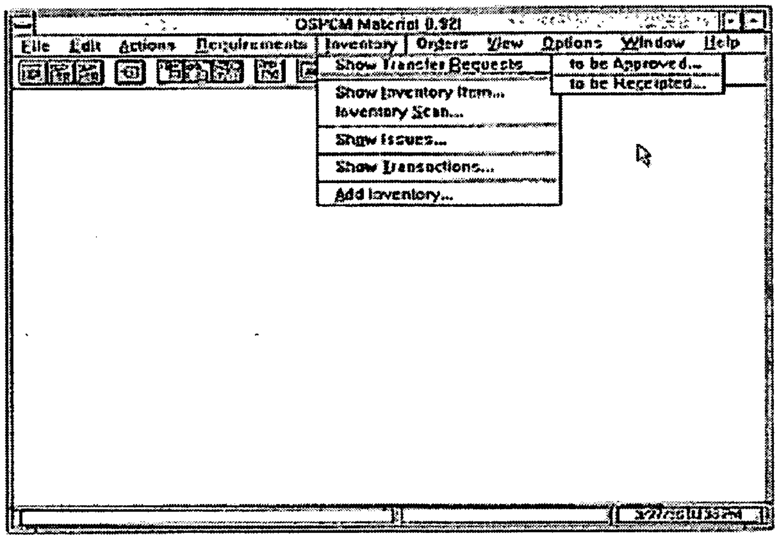
FIG. 117 is an exemplary screen print for OSPCM Material 0.92I.

From the Materials Management application window as shown in Fig. 117, select "Show Transfer Requests" and then select "to be Receipted..." from the Inventory menu. This function is available only if you are a Materials Management manager or Materials Management clerk and have the authority to update inventory.

Figure 118:
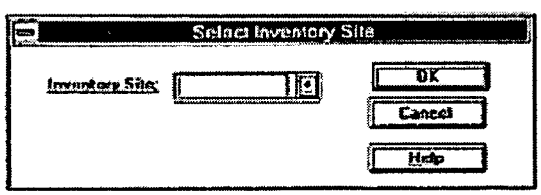
FIG. 118 is an exemplary screen print for Select Inventory Site.

If there are no outstanding transfer requests, the system will display an appropriate message. Respond to the message by pressing OK. If there are outstanding transfer requests, the SELECT INVENTORY SITE dialog as shown in Fig. 118 is displayed.

This dialog allows you to select the inventory site for which transfers are to be received. To do so, provide the following information:

Inventory Site - Enter or select a valid inventory site from the Inventory Site combo box. The drop down list for the Inventory Site combo box is populated with a list of valid inventory sites, which currently have transfers that have not yet been received and/or transfer requests that have not yet been approved.

Figure 119:
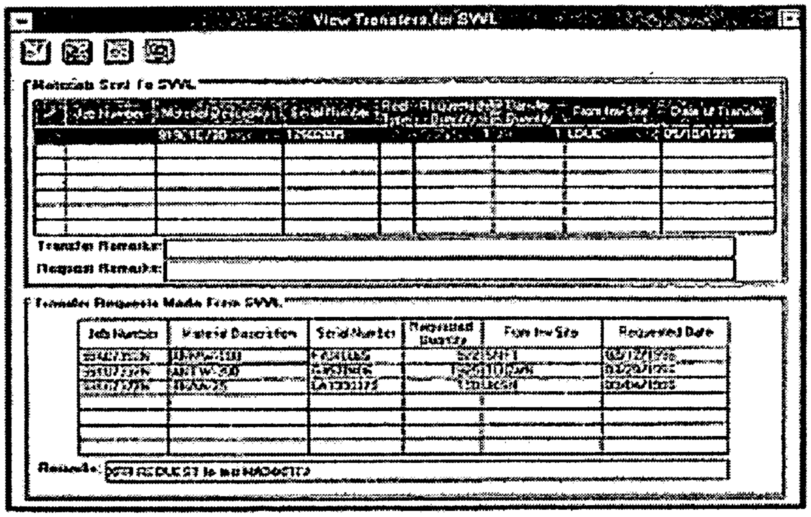
FIG. 119 is an exemplary screen print for View Transfer SWL.

To get help while on this dialog, press the HELP button. To close this dialog without selecting an inventory site, press the CANCEL button. To close this dialog and display the transfers for the selected inventory site, press the OK button. The system displays an appropriate message if the inventory site entered does not have any transfer requests (i.e., inventory site is not in the drop down list). Respond to the message by pressing OK.
If no errors are found, the VIEW TRANSFERS FOR xxxx window as shown in Fig. 119 is displayed, where xxxx is the selected inventory site.

From this window you may receipt a transferred inventory item that has not yet been received or cancel a transfer request that has not yet been approved. The Materials Sent To grid displays the inventory items that have been transferred to the selected inventory site, but not yet received. The following information is displayed:

Job - The job for which the transfer request was made. This column is blank if the inventory item was transferred without an associated transfer request (i.e., from the Inventory Items At window described in Business Solution III) or if the requirement for which the material was transferred no longer exists (i.e., the job or substep was cancelled or the requirement changed).
Material Description - The material description of the inventory item transferred.

Serial Number - The serial number of the inventory item transferred (if serialized).

Reel Type - The reel type of the inventory item transferred (if cable).

Requested Quantity-The quantity of material requested to be transferred.

Transfer Quantity - The quantity of material transferred.

From Inv Site - The inventory site from which the inventory item was transferred.

Date of Transfer - The date the inventory item was approved for transfer.
The Transfer Requests Made From grid displays all of the inventory items that have been requested to be transferred to the selected inventory site that have not yet been approved for transfer. The following information is displayed:

Job - The job for which the transfer request was made. This column is blank if the requirement for which the transfer request was made no longer exists (i.e., the job or substep was cancelled or the requirement changed).

Material Description - The material description of the inventory item requested.

Serial Number - The serial number of the inventory item requested (if serialized).

Requested Quantity - The quantity of material requested to be transferred.

From Inv Site - The inventory site from which the inventory item was requested to be transferred.

Requested Date - The date that the transfer request was made.

VIEW JOB DETAILS

To view the material requirements for which the transfer exists, select an inventory item from either grid and press the Show Job Details toolbar button located on the VIEW TRANSFERS window or select "Show Job Details" from the Actions menu. The system displays a message if the inventory item selected has no job details. Respond to the message by pressing OK.

Figure 120:
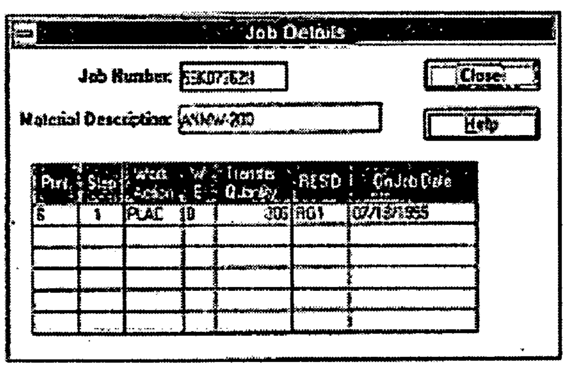
FIG. 120 is an exemplary screen print for Job Details.

If no errors are found, the JOB DETAILS dialog as shown in Fig. 120 is displayed.

This dialog displays the material requirements for which the transfer request was made. The following information is displayed:

Job -The job for which the transfer request was made.

Material Description - The description of the material needed.

Print - The job print for which the transfer request was made.

Step - The job step for which the transfer request was made.

Work Action - The type of work for which the material is needed.

Work Environment - The work environment for which the material is needed.

Transfer Quantity - The portion of the needed quantity that was requested for transfer.

RESID - The resource id responsible for the work.

On Job Date - The date that the material is needed on the job (Scheduled Start Date - On Job Interval).

To get help while on this dialog, press the HELP button. To close this dialog, press the CLOSE button.

RECEIPT AN IN-TRANSIT ITEM WITHOUT EXCEPTIONS

Receipting an in-transit inventory item without exceptions implies that:

1. the quantity transferred is equal to the quantity shipped,
2. the date the inventory item was received is equal to the current date,
3. no remarks need to be recorded with the receive transfer transaction,
4. the bin location of the inventory item is not to be recorded, and
5. the material arrived in good condition and will not be returned.

To receipt an in-transit inventory item, select an inventory item from the Materials Sent To grid. The following information is displayed below the grid:

Transfer Remarks - This text box displays the remarks entered at the time the inventory item was approved for transfer. If no remarks were entered, this field is blank.

Request Remarks - This text box displays the remarks entered at the time the inventory item was requested for transfer. If no remarks were entered, this field is blank.

To receipt the selected item, press the Receive Transfer toolbar button located on the VIEW TRANSFERS window or select "Receipt Transfer Item" from the Actions menu. If no errors are found, the system receipts the material into inventory as follows:

The transfer is marked "received" and a check-mark is displayed in the leftmost column of the grid next to the inventory item received.

The inventory item is deleted from the "from" inventory site's "in-transit" inventory, added to the "to" inventory site's "unassigned" inventory, and a Transfer Receipt material inventory transaction is recorded.

If the material was transferred for a specific job, the material is assigned to the appropriate substep(s) within that job and an Assignment material inventory transaction is recorded for each assignment made. If the requirement has been completely satisfied (substep's assigned quantity = substep's order qty), each substep to which the material was assigned is put into the "received" status. The system will not assign more material than is needed on the substep. If the quantity received is greater than the quantity needed, as is sometimes the case when transferring cable, the assignment is made for the quantity needed and the remaining quantity remains in the unassigned status.

If the requirement for which the material was transferred no longer exists (e.g., the job or substep was cancelled or the requirement changed), the inventory item remains in the "unassigned" status.

The Assignment transaction is marked as not to be sent to Asset Management.

If the inventory item is central office equipment, the Transfer Receipt transaction is marked as not to be sent to Asset Management; otherwise it is marked to be sent to Asset Management.

RECEIPT AN IN-TRANSIT ITEM WITH EXCEPTIONS

Receipting an in-transit inventory item with exceptions implies that one or more of the following applies:

1. the quantity to be receipted is not equal to the quantity shipped,
2. the date the inventory item was received is not equal to the current date,
3. remarks need to be recorded with the receipt transaction,
4. the bin location of the inventory item is to be recorded, or
5. the material is damaged and will be returned to a BST warehouse or to an outside vendor.

Figure 121:
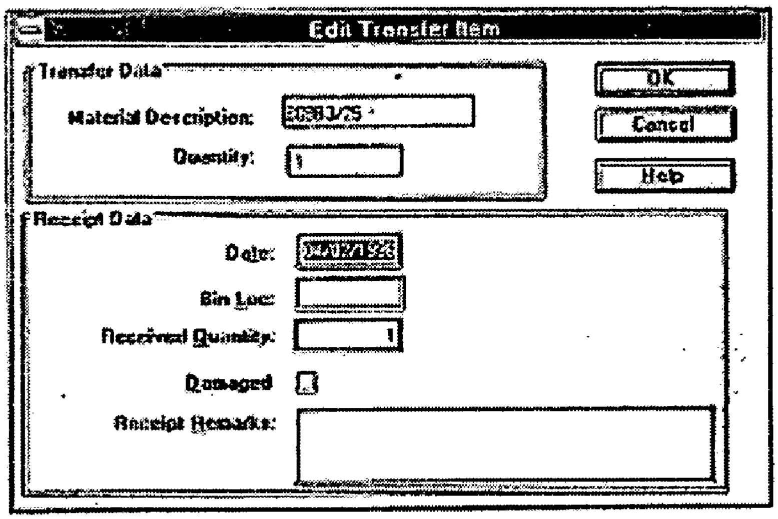
FIG. 121 is an exemplary screen print for Edit Transfer Item.

To indicate the exceptions with which to receipt the material, double-click the in-transit inventory item you want to receive or move the marquee to it and press ENTER. The EDIT TRANSFER ITEM dialog as shown in Fig. 121 is displayed.

The fields on this dialog default to what the system indicates was transferred. The following information is displayed in the Transfer Data frame:

Material Description - The material description of the inventory item transferred.

Quantity - The quantity of material transferred.
You may enter or overtype the information displayed in the Receipt Data frame as described below.

Date - The date the material was received. This field defaults to the current date. If receipting material for a previous day, enter a date prior to the current date.

Bin Loc - The bin location of where the material will be stored in inventory. If your inventory site is using bin locations, enter a bin loc. This field is not validated. If you receipt the same non-serialized material on the same day and don't use the same bin as previously used, the last entered bin loc will become the bin loc for all of this non-serialized material at this location received on this day.

Received Quantity - The quantity of material received. This field defaults to the quantity transferred. If the quantity is different from what was shipped, enter the quantity to be received into inventory. The quantity entered must be greater than zero and, if receipting serialized non-cable, the quantity cannot be greater than 1.

Damaged - If the material will be returned to a BST warehouse or to an outside vendor, check the Damaged check box.

Remarks - Enter any remarks that you wish to be recorded with the transfer receipt transaction.

To get help while on this dialog, press the HELP button. To close this dialog without saving the changes, press the CANCEL button. To close this dialog and save the changes made, press the OK button. The system displays an appropriate message under the following conditions:

If the quantity to be received is zero, an error message is displayed. Respond to the message by pressing OK.

If receipting serialized non-cable material and the quantity to be received is greater than 1, an error message is displayed. Respond to the message by pressing OK.

If the receipt date entered is greater than the current date, an error message is displayed. Respond to the message by pressing OK.

If no errors are found, the Transfer Quantity column on the VIEW TRANSFERS window is updated with the quantity received.

To receipt an in-transit inventory item into your own inventory after the appropriate changes have been made, press the Receive Transfer toolbar button located on the VIEW TRANSFERS window or select "Receipt Transfer Item" from the Actions menu as described earlier. The system receipts the material as described earlier with the following exceptions:

If the shipment was marked as damaged, the material is receipted and marked as "awaiting return" inventory and is not assigned to the job for which it was requested. Each associated requirement is marked as needing material again and ready to be fulfilled.

If the quantity received is different from the quantity transferred, the difference is handled with an inventory adjustment in the appropriate inventory site. This is done to keep the accounting records accurate when the transactions are reported to Asset Management. For example.

If 1000 ft was transferred but 1010 ft was actually shipped and received, a Transfer Receipt transaction is created to add 1000 ft to the "to" site's inventory and delete 1000 ft from the "from" site's inventory and an Inventory Addition transaction is created to add the additional 10 ft to the "to" site's inventory.

If 1000 ft was transferred but 990 ft was actually shipped and received, a Transfer Receipt transaction is created to add 990 ft to the "to" site's inventory and delete 990 ft from the "from" site's inventory and an Inventory Deletion transaction is created to delete the additional 10 ft from the "from" site's inventory.

UNDO RECEIPT OF AN IN-TRANSIT ITEM

Prior to closing the VIEW TRANSFERS window, you may undo the receipt of the in-transit inventory item (e.g., the wrong inventory item is receipted).

To undo the receipt of an in-transit item, select an inventory item from the Materials Sent To grid that has been received (indicated by the presence of a checkmark) and press the Undo toolbar button located on the VIEW TRANSFERS window or select "Undo" from the Edit menu. The system unreceipts the inventory item as follows:

The transfer is marked "unreceived" and the check-mark is removed from the grid for the selected item.

If the material was assigned to a job, the inventory item is unassigned from the appropriate substep(s) within that job and an Unassignment material inventory transaction is recorded for each unassignment done. Each substep to which the material was assigned is put back into the "transferred" status.

The inventory item is deleted from your inventory, put back into the sender's "in-transit" inventory, and a Transfer Receipt Reversal material inventory transaction is recorded.

If the inventory item is central office equipment, the Transfer Receipt Reversal transaction is marked as not to be sent to Asset Management; otherwise it is marked to be sent to Asset Management.

The inventory item may now be receipted at a later date or you may call the sending inventory site to cancel the transfer.

CANCEL A TRANSFER REQUEST PRIOR TO APPROVAL

If you decide that you no longer need the inventory item for which there is an outstanding request, you may cancel the transfer request if it has not yet been approved.

To cancel a transfer request, select a request from the Transfer Requests Made From grid and press the Cancel Request toolbar button located on the VIEW TRANSFERS window or select "Cancel Transfer Request" from the Inventory menu. If no errors are found, the system cancels the transfer request as follows:

The transfer request is deleted.

Each material requirement for which the transfer was requested has its remaining needed quantity re-calculated. If greater than zero, the requirement is put back into the "needed" status and marked as ready to be fulfilled.

To close the VIEW TRANSFERS window, double-click the control box located in the upper left corner of the window. Upon exit, all transfers that were received are deleted; therefore, upon leaving this window, you can no longer undo a receipt of an in-transit item. In addition, if Central Office Equipment was received and an assignment was made, form RF-8010 is printed to move the material from the 1220.1412 account in the inventory site to which the material was received to the FRC and GLC of the substep to which it is assigned (See attachment 1).

Attachment 1:

The following information is printed on the RF-8010 form when assigning Central Office Equipment:

Transfer Report No. - The state responsible for the inventory item followed by the OSPCM Material Inventory Transaction Number (e.g., KYI 1184)

Purpose of Transfer - This field always equals "Adj. Accounts".

Ship/Transfer From (Credit)

Location - The inventory site responsible for the inventory item.

State - The state responsible for the inventory item.

Geo. Loc. - The geographic location code of the inventory site responsible for the inventory item.

Auth. No. - The job number for which the inventory item was ordered.

RCO - The responsibility code of the inventory site responsible for the inventory item.

RCC - The responsibility code of the inventory site responsible for the inventory item.

Func. Code - The function code of the Material Held For Future Use account. This field is always equal to "5C5T".

Ship/Transfer To (Debit)

Location - The inventory site responsible for the inventory item.

State - The state responsible for the inventory item.

Geo. Loc. - The exception geographic location code of the substep to which the inventory item was assigned.

Auth. No. - The job number to which the inventory item was assigned.

RCO - The responsibility code of the inventory site responsible for the inventory item.

RCC - The responsibility code of the inventory site responsible for the inventory item.

Field Code - The field reporting code (FRC) of the substep to which the inventory item was assigned (i.e., 257C).

Transportation Instructions

Field Code - This field defaults to 6 blanks followed by an "M".
Methods and Procedures (M&Ps) will be written to instruct the user how to manually complete this section.

Engineering Contact

Engineer - The name of the user's supervisor. The "user" is the person who assigned the inventory item.

Prepared By - The name of the person who assigned the inventory item.
The user's Common Userid (CUID) is used to obtain his/her name.

Date - The date the inventory item was assigned. This field is always equal to the current date.

Remarks - Remarks entered at the time the inventory item was assigned.

Equipment Description - The description of the inventory item assigned. If the material is serialized, its serial number will be printed following the material description.

Cond. - The condition of the material. This field always equals "G" (good).
Qty. - The quantity of material assigned.

Per - This field always equals "EA" (each).

Yr. PI. - The year the inventory item was receipted into inventory.

SATISFY MATERIAL REQUIREMENT WITH INVENTORY

Figure 122:
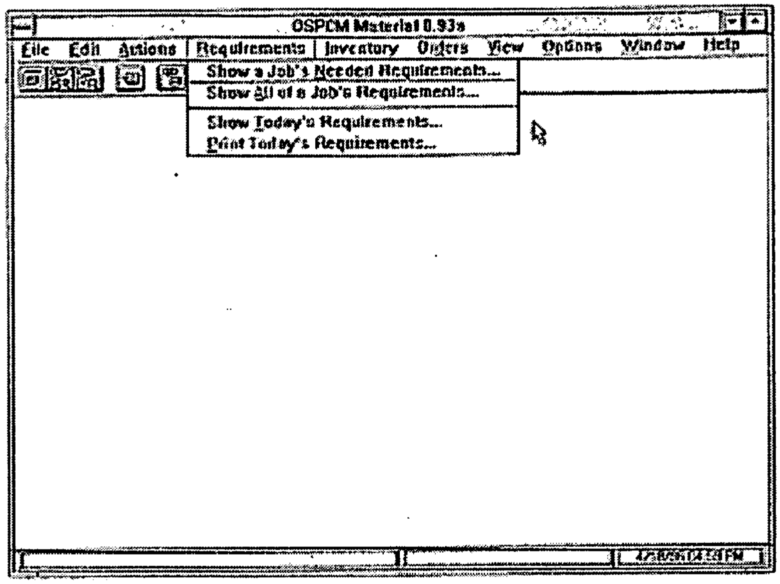

From the Materials Management application window as shown in Fig. 122, view the needed material requirements by selecting the appropriate toolbar button or menu item.

Select a button from the toolbar or "Show Today's Requirements . . ." from the Requirements menu to view the requirements that need to be fulfilled today via a resource ID, inventory site, or Construction Management Center (CMC). See Business Solution I Overview Document (BS1OVER.DOC) for a detailed description.

Select a button from the toolbar or select "Show Job's Needed Requirements . . ." from the Requirements menu to view the needed requirements for a specific job. See Business Solution I Overview Document (BS1OVER.DOC) for a detailed description.

Figure 123:
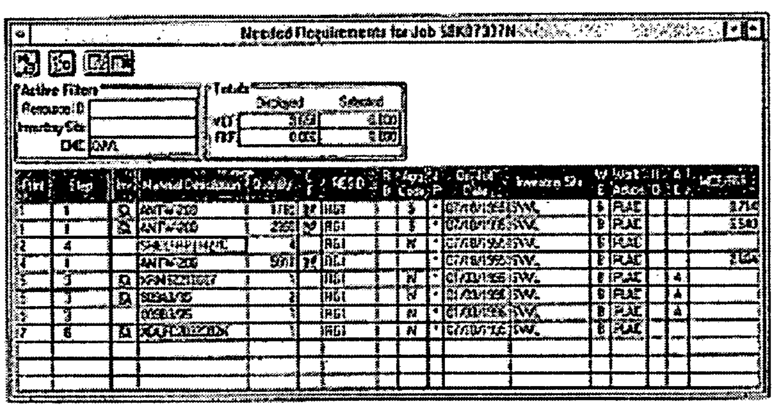

If you choose to display the needed requirements for a specific job, the NEEDED REQUIREMENTS FOR JOB xxxx window as shown in Fig. 123 is displayed where xxxx is the specified job number.

Figure 124:
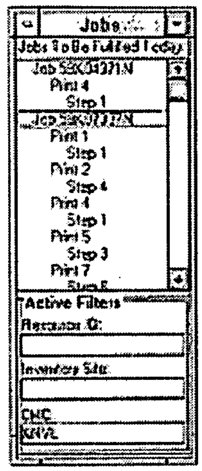

If you choose to display today's needed requirements, the JOBS window as shown in Fig. 124 is displayed.

To display the NEEDED REQUIREMENTS window as shown earlier, double-click a job, print, or step or move the marquee to it and press ENTER.

The overview document for Business Solution I (BS1OVER.DOC) describes most of the fields on the NEEDED REQUIREMENTS window. This document discusses new functionality only.

VIEW RESULTS OF THE AUTOMATIC INVENTORY SCAN

When the NEEDED REQUIREMENTS window is opened, the system performs a limited search for available inventory that could be used to satisfy the requirements. The system searches for inventory that meets the following criteria:

It is located in the inventory site where the requirement is needed or, if the requirement is for central office equipment, it is located in the inventory site where the requirement is needed or in an inventory site that stores refurbished central office equipment (RCOE), It is unassigned or surplus. Since the system allows assigned material found in the inventory site where the requirement is needed to be re-assigned, the term "unassigned", when searching for cable in the same inventory site where the requirement is needed, refers to reels that could be partially unassigned. The portion of the reel that is unassigned is a candidate for available material.

It has not been issued. "Issued" material is material that has been picked up from the inventory location and taken to the job site. When a reel of cable is issued, its entire quantity is issued even if a portion of that quantity is unassigned.

It is not reserved for emergency use,

It matches the requirement's material description, and its inventory balance is greater than or equal to the smallest quantity needed (if the requirement is for cable) or its inventory balance is greater than zero (if the requirement is for non-cable).

To search for inventory in another inventory site or to search for suitable substitutes, you may request a user-defined inventory scan which is described later in this document.

Figure 125:
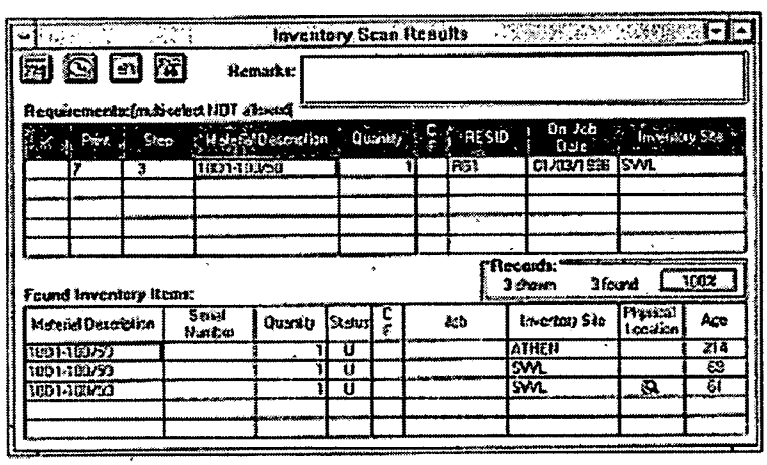

A symbol appears in the Inventory column (abbreviated "INV") if there is available inventory that could be used to satisfy the requirement. To view the results of the automatic inventory scan, double-click the symbol or use the arrow keys to move the marquee to it and press ENTER. The INVENTORY SCAN RESULTS window as shown in Fig. 125 is displayed.

NOTE: This same window is used to show the results of both the automatic inventory scan and a user-defined inventory scan, so the navigation is described as if either method was used.

This window displays the results of the inventory scan from which you may make assignments or transfer requests to satisfy a material requirement. The Records frame located above the Found Inventory Items grid displays the number of inventory items shown and the total number of inventory items found. If this window is used to view the results of the automatic inventory scan, all inventory items found are displayed.

The Requirements grid displays the material requirement selected from the NEEDED REQUIREMENTS window followed by other requirements from that window which have the same material description and are needed in the same inventory site as the selected requirement. The following information is displayed:

Print - The job print for which the requirement is needed.

Step - The job step for which the requirement is needed.

Material Description - The description of the material needed.

Quantity - The remaining quantity of material needed to do the work.

Custom Features (abbreviated CF) - A symbol here indicates that custom material features are needed (e.g., inside pulling eye).

RESID - The resource ID responsible for the work.

On Job Date - The date that the material is needed on the job (Scheduled Start Date - On Job Interval).

Inventory Site - The inventory site responsible for procuring the material.

The Found Inventory Items grid displays the inventory item(s) that could be used to satisfy the material requirement(s). The following information is displayed:

Material Description - The material description of the inventory item.

Serial Number - The serial number of the inventory item, if serialized.

Quantity - The quantity of the inventory item in the indicated status.

Status - The status of the inventory item. Values are:

A - Assigned. The inventory item found is assigned to a job.
U - Unassigned. The inventory item found is not assigned to a job and is available for use in the CMC where it was found.
S - Surplus. The inventory item found is not assigned to a job and is available for use in the entire BellSouth region.

Custom Features (abbreviated CF) - A symbol here indicates that the inventory item has custom material features (e.g., inside pulling eye).

Job - The job to which the inventory item is assigned, if it has an "assigned" status. If a reel of cable is assigned to multiple jobs, one line is displayed for each job to which the reel is currently assigned.

Inventory Site - The inventory site responsible for the inventory item.

Physical Location - A symbol here indicates that the inventory item is located at an alternate address. No symbol means that the inventory item is located at the inventory site responsible for the material.

Age - The age of the inventory item in days. If this is non-serialized material and the individual items were receipted on different days, the age displayed will be that of the oldest item. If the age of the inventory item is greater than 9999 days, asterisks will appear in this column.

The inventory items found by the scan will appear in the grid in the following order:

Inventory items found at an RCOE inventory site.

The inventory items found in the inventory site where the requirement is needed sorted first by material description, then by age (oldest first), and then by status ("surplus", "unassigned", and "assigned")

The inventory items found in another inventory site sorted first by material description, then by age (oldest first), and then by status ("surplus" and "unassigned")

VIEW CUSTOM FEATURES

A symbol appears in the Custom Features column (abbreviated CF) if the requirement needs custom features or if the inventory item found has custom features. To view the custom features, double-click the symbol or use the arrow keys to move the marquee to it and press ENTER. The CUSTOM FEATURES dialog is displayed. The custom features displayed will vary with the type of material needed or the inventory item found.

Figure 126:
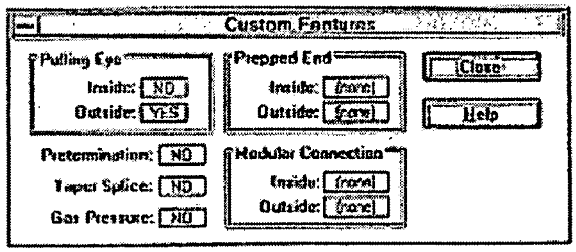

If the requirement or inventory item selected is cable, the dialog displays the custom features associated with cable as shown in Fig. 126. Information includes whether or not the requirement needs (or the inventory item has) pulling eyes, prepped ends, preterminations, a taper splice, gas pressure, or modular connections.

Figure 127:
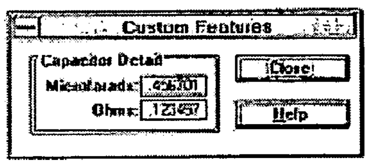

If the requirement or the inventory item selected is a capacitor, the dialog displays the custom features associated with capacitors as shown in Fig. 127. Information includes the microfarads and/or ohms of the capacitor.

Figure 128:
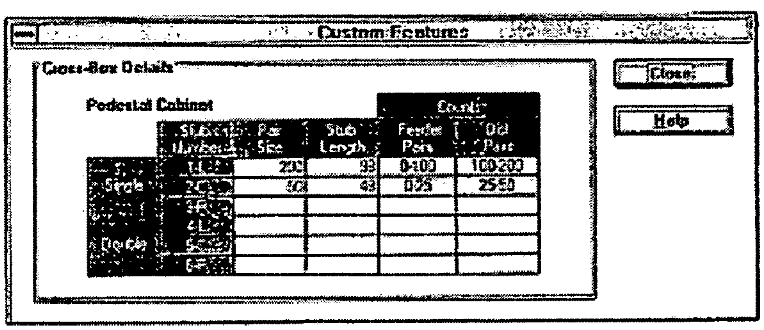

If the requirement or the inventory item selected is a non-standard pedestal cross-box, the dialog displays its configuration as shown in Fig. 128. Information includes the size and length of each stub and the connections between the feeder pairs and distribution pairs inside the cross-box.

Figure 129:
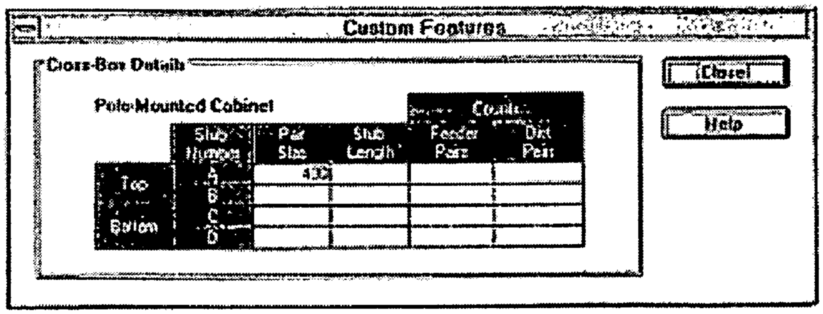

If the requirement or the inventory item selected is a non-standard pole-mounted cross-box, the dialog displays its configuration as shown in Fig. 129. Information includes the size and length of each stub and the connections between the feeder pairs and distribution pairs inside the cross-box.

To get help while on this dialog, press the HELP button. To close this dialog, press the CLOSE button.

VIEW ALTERNATE INVENTORY LOCATION

Figure 130:
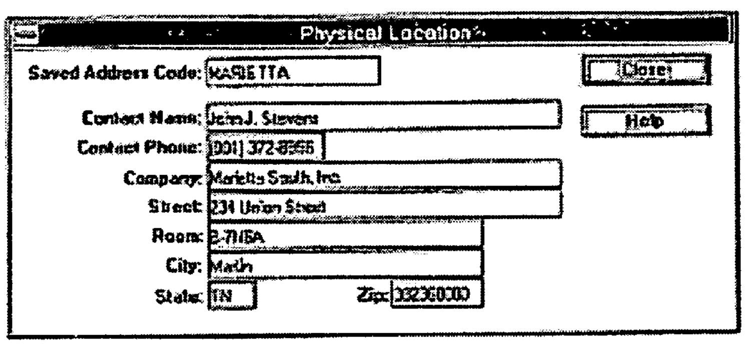

A symbol appears in the Physical Location column if the inventory item is not physically at the inventory site, but is at an alternate storage location. To view the address of where the inventory item is located, double-click the symbol or use the arrow keys to move the marquee to it and press ENTER, The PHYSICAL LOCATION dialog as shown in Fig. 130 is displayed.

This dialog displays the location of an inventory item that is not physically located at the inventory site responsible for the material. Information includes the code under which this alternate address was saved, the contact name and phone number, company name, street address, room number, city, state, and zip.

To get help while on this dialog, press the HELP button. To close this dialog, press the CLOSE button.

ASSIGN AN INVENTORY ITEM

Inventory found in an inventory site where the requirement is needed may be assigned immediately to the requirement. If you do not have authority to update inventory in the state where the requirement is needed, you cannot make an assignment.

If the requirement is for non-cable material, you may only make one assignment at a time. Select an inventory item that you wish to assign and select the requirement to which you would like to make the assignment. If the requirement is for cable, you may make multiple assignments at a time. Select an inventory item that you wish to assign and select one or more requirements to which you would like to make the assignment. Remarks entered in the Remarks text box are recorded with each Assignment transaction.

To satisfy the selected requirements with an assignment, press the Assignment toolbar button located on the INVENTORY SCAN RESULTS window or select "Assign Item to Requirement" from the Actions menu. If you do not have the authority to make assignments, this toolbar button and menu item are disabled. The system displays a message under the following conditions:

If no requirement is selected, an error message is displayed. Respond to the message by pressing OK.

If you try to assign an inventory item located in a different inventory site from where the requirement is needed, an error message is displayed. Respond to the message by pressing OK.

If you try to assign an inventory item to a requirement whose needed quantity is zero, an error message is displayed. Respond to the message by pressing OK.

If you try to assign an inventory item whose balance is zero, an error message is displayed. Respond to the message by pressing OK.

If you try to assign an inventory item that is already assigned to the selected requirement, an error message is displayed. Respond to the message by pressing OK.

If you try to reassign an inventory item when there is surplus or unassigned inventory available in the same inventory site where the requirement is needed. A re-assignment occurs when you try to assign inventory that is already assigned to a job. an appropriate message is displayed. Respond to the message by pressing YES if you still wish to use the item or NO if you don't want to use the item.

If assigning an inventory item to multiple requirements and the inventory balance is not large enough to satisfy all of the requirements selected, an error message is displayed. Respond to the message by pressing OK.

If no errors are found, the system assigns the inventory item as follows:

If the selected inventory item is non-cable and is in the "unassigned" or "surplus" status or is cable and in the "unassigned" status, it is assigned to the requirement(s) selected and an Assignment material inventory transaction is recorded for each assignment made. For non-serialized material, the system makes assignments from the oldest inventory first. The system will not assign more material than is needed on a substep. If the balance of the selected inventory item is greater than the quantity needed, the assignment is made for the quantity needed and the remaining quantity remains in its original status. If the requirement is completely satisfied (substep's assigned quantity = substep's order quantity), its material status is changed to “received”. If the requirement is not completely satisfied, it remains in a “needed” status and the remaining needed quantity is calculated.

If the selected inventory item is cable and in the “surplus” status, the inventory item is first moved to the “unassigned” status and an Inventory Status Change material inventory transaction is recorded. It is then assigned to the selected requirement(s) as stated above. If the entire reel of cable is not assigned, the remaining balance must be in the “unassigned” status. Therefore, the inventory item is moved to the “unassigned” status before it is assigned to satisfy this business rule.

If assigning an inventory item that has an outstanding transfer request (i.e., a transfer request that has not yet been approved), the system automatically rejects the associated transfer request and puts the requirement for which the request was made back in a “needed” status and marks it ready to be fulfilled. For example, if RIVD makes a request for serial number 123 from LOUE and then LOUE assigns serial number 123 to one of its own substeps, the transfer request made by RIVD is deleted and the substep it was requested for is put back in the "needed" status and marked ready to be fulfilled.

The Inventory Status Change transaction is marked as not to be sent to Asset Management.

The Assignment transaction is marked as not to be sent to Asset Management.

If the selected inventory item is in the “assigned” status, you must first unassign the material before reassigning it to another requirement. Assigned inventory can only be found if running a user-defined inventory scan and the inventory is found in the inventory site responsible for procuring the material. The process of reassigning an inventory item is described below.

REASSIGN AN INVENTORY ITEM

Figure 131:
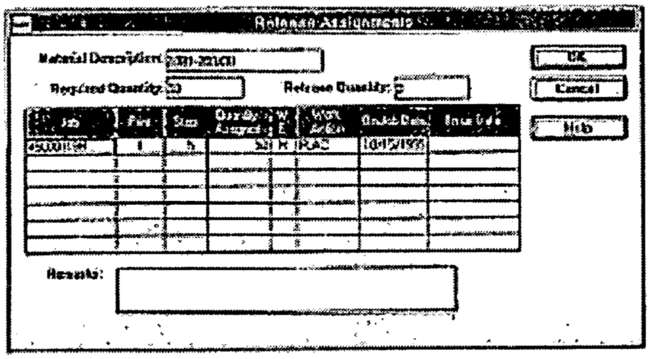

If the selected inventory item is in the “"assigned” status, the RELEASE ASSIGNMENTS dialog as shown in Fig. 131 is displayed after the Assignment toolbar button is pressed.

This dialog allows you to unassign material from the requirement(s) listed in the grid in order to reassign it to the requirement(s) selected on the Inventory Scan Results window. The following information is displayed above the grid:

Material Description - The description of the inventory item to be reassigned.

Required Quantity - The total quantity required to be satisfied. It is equal to the sum of the required quantities selected to be satisfied on the Inventory Scan Results window.

Release Quantity - The quantity to be unassigned. It is initially set to zero and is incremented as requirements are selected to have material unassigned.

The grid on this dialog displays each requirement within the job to which the selected inventory item is currently assigned. The following information is displayed:

Job - The job to which the inventory item is assigned.
Print - The job print to which the inventory item is assigned.
Step - The job step to which the inventory item is assigned.
Quantity Assigned - The portion of the inventory balance that is assigned to the requirement.
Work Environment (abbreviated WE) - The work environment for which the inventory item is needed (e.g., B = buried).
Work Action - The type of work for which the inventory item is needed (e.g., PLAC = Placing).
On Job Date - The date the material is needed on the job (Scheduled Start Date - On Job Interval).
Issue Date - The date the inventory item was issued for use on this requirement. If the inventory item has not been issued, this column is blank.

To get help while on this dialog, press the HELP button. If you decide not to reassign the material, press the CANCEL button to close this dialog.

To reassign the inventory item, select the requirement(s) from which the inventory item should be unassigned and press the OK button. As requirements are selected, the quantity in the Release Quantity text box is increased by the quantity assigned to that requirement. If the inventory item is non-cable, the Release Quantity is not allowed to exceed the Required Quantity and is set equal to the lesser of the sum of the quantities selected to be unassigned or the Required Quantity. Type any remarks in the Remarks text box that you wish to have recorded with the Unassignment transaction.

The system displays an appropriate message under the following conditions:

If the selected requirement's material has been issued and there is only one assignment or the inventory item is serialized, the system displays a message indicating that the assignment cannot be released because the inventory item has been issued.

If the inventory item is non-serialized and multiple requirements have been selected and at least one of the selected requirements has had its material issued, the system displays a message indicating that a selected requirement has had its material issued and asking if you want the system to release the assignments that have not been issued. Respond to the message by pressing YES if you want to release the un-issued assignments. Respond to the message by pressing NO if you do not want to release the un-issued assignments.

If no requirement is selected to have its material unassigned, an error message is displayed. Respond to the message by pressing OK.

If no errors are found, the system releases the old assignment and makes a new assignment as follows:

The inventory item is unassigned from the selected requirement(s) for the quantity to be released and an Unassignment material inventory transaction is recorded for each unassignment made.

If you released an assignment of Central Office Equipment, an RF-8010 form is printed to move the material from the Field Reporting Code (FRC) and Exception Geographic Location Code (GLC) of the requirement to which it was previously assigned to the 1220.1412 (Material Held For Future Use) account (See attachment 1).

The inventory item is assigned to the selected requirement(s) and an Assignment material inventory transaction is recorded for each assignment made. The system will not assign more material than is needed on a substep. If the balance of the selected inventory item is greater than the quantity needed, the assignment is made for the quantity needed and the remaining quantity remains in the "unassigned" status. If the requirement is completely satisfied (substep's assigned quantity = substep's order quantity), its material status is changed to "received". If the requirement is not completely satisfied, it remains in a "needed" status and the remaining needed quantity is calculated.
If the inventory item is non-central office equipment and ordered direct to code, the Unassignment transaction is marked to be sent to Asset Management; otherwise it is marked as not to be sent to Asset Management.

The Inventory Status Change transaction is marked as not be sent to Asset Management.

The Assignment transaction is marked as not to be sent to Asset Management.

As assignments are made on the Inventory Scan Results window, the needed quantity in the Requirements grid is decreased by the quantity assigned. When a requirement is completely satisfied (needed quantity drops to zero), a check mark appears beside the requirement. Likewise, as inventory items are used to satisfy requirements, the inventory balance in the Found Inventory Items grid decreases by the quantity assigned. Once an inventory item is completely depleted (balance drops to zero), the inventory item can no longer be assigned. NOTE: The inventory balance does not actually decrease, it just changes status. The decrease is shown to visually indicate that there have been assignments made from the inventory item.

REQUEST A TRANSFER OF AN INVENTORY ITEM

Inventory found in an inventory site other than where the requirement is needed must first be transferred to the inventory site where it is needed before it can be assigned. If the requirement is for non-cable material, you may only select one requirement to be satisfied per transfer request. Select an inventory item that you wish to have transferred and select the requirement to which you would like the inventory assigned once the material has been transferred and received. If the requirement is for cable, you may select multiple requirements to be satisfied per transfer request. Select an inventory item that you wish to assign and select one or more requirements to which you would like the inventory assigned once the material has been transferred and received. Remarks entered in the Remarks text box are recorded with the transfer request.

To satisfy the selected requirement with a transfer request, press the Transfer Request toolbar button located on the INVENTORY SCAN RESULTS window or select "Request Transfer" from the Actions menu. The system displays a message under the following conditions:

If no requirement is selected, an error message is displayed. Respond to the message by pressing OK.

If you request a transfer of an inventory item located in the same inventory site where the requirement is needed, an error message is displayed. Respond to the message by pressing OK.

If you request a transfer of an inventory item whose balance is zero, an error message is displayed. Respond to the message by pressing OK.

If you request a transfer of an inventory item to satisfy multiple requirements and the inventory balance is not large enough to satisfy all of the requirements selected, an error message is displayed. Respond to the message by pressing OK.

If no errors are found, the system creates a transfer request as follows:

A transfer is created for the selected inventory item for the quantity to be transferred. If transferring cable, the transfer request is created for the total quantity on the reel. Only the quantity needed will be assigned once the material is received into inventory, but the entire reel must be transferred to avoid having to split the reel prior to its transfer. If transferring non-cable, the transfer request is created for the quantity needed.

If a selected requirement is completely satisfied by the transfer request, it is put into a "transfer requested" status. If a selected requirement is not completely satisfied, it remains in a "needed" status and the remaining quantity needed is calculated.

No further action is required of the requestor. The transfer is approved or rejected by the inventory site to which the request is made; this process is described in the second section of this document.

As transfer requests are made, the needed quantity in the Requirements grid is decreased by the quantity requested to be transferred. When a requirement is completely satisfied (needed quantity drops to zero), a check mark appears beside the requirement. Likewise, as inventory items are used to satisfy requirements, the inventory balance in the Found Inventory Items grid decreases by the quantity requested to be transferred. Once an inventory item is completely depleted (balance drops to zero), the inventory item can no longer be requested to be transferred. NOTE: The inventory balance does not actually decrease, it is just "ear-marked" for transfer. The decrease is shown to visually indicate that transfer requests have been made for the inventory item.

UNDO AN ASSIGNMENT OR TRANSFER REQUEST

Prior to leaving the INVENTORY SCAN RESULTS window, you may undo the assignments or transfer requests made for a particular requirement.

To undo an assignment or transfer request, select requirements(s) from the Requirements grid to which assignments or transfer requests have been made and press the Undo toolbar button located on the INVENTORY SCAN RESULTS window or select "Undo" from the Edit menu.

If, upon selection, the Undo toolbar button or menu item is not enabled, the requirement has had neither an assignment nor a transfer request made.

The last assignment made or the last transfer request made is undone as follows:

If undoing an assignment, the inventory item is unassigned from the selected requirement and an Unassignment material inventory transaction is recorded for each unassignment made. If the inventory item is no longer assigned to any requirement, it reverts back to its previous status unless its previous status was "assigned". An inventory item that was reassigned is not assigned back to its original requirement(s) on an undo. Instead, it is put into the "unassigned" status.

If undoing a transfer request, the transfer request is marked as no longer needed for the selected requirement and if the transfer request is no longer needed to satisfy any requirement, it is deleted.

The selected requirement is put back into a "needed" status, marked as ready to be fulfilled, and its remaining needed quantity is calculated.

Both the needed quantity in the Requirements Found and the inventory balance in the Inventory Items grid are increased by the quantity that was previously assigned or by the quantity that was requested to be transferred. The check-mark indicating that the requirement has been satisfied is no longer displayed.

You may continue to undo multiple assignments or transfer requests for a requirement as long as the Undo toolbar button is enabled.

To close the INVENTORY SCAN RESULTS window, double-click the control box located in the upper left corner of the window. At this time, if an assignment was made for Central Office Equipment, an RF-8010 form is printed to move the material from the 1220.1412 account to the FRC and the Exception GLC of the requirement to which it is assigned (see Attachment 2).

CREATE A USER-DEFINED INVENTORY SCAN

If the automatic inventory scan did not find any unassigned or surplus inventory that could be used to satisfy a material requirement or you want to expand the search criteria, you may request a user-defined inventory scan.

Figure 132:
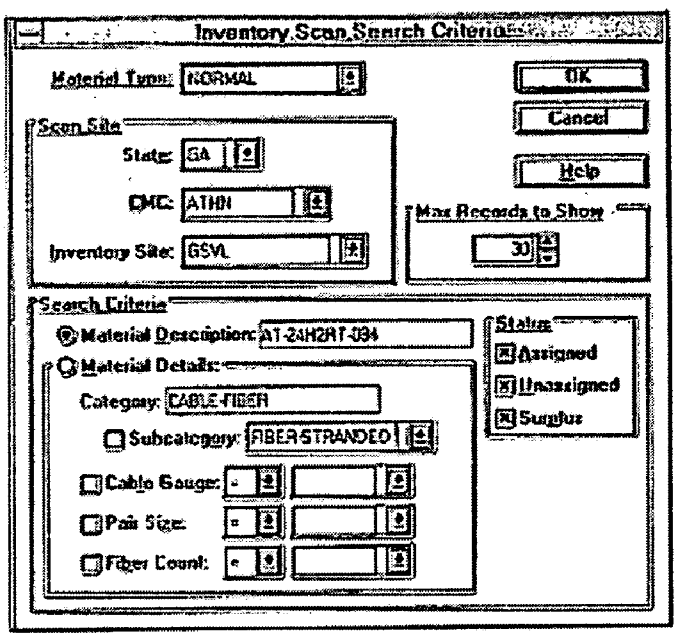

Select a requirement that you wish to satisfy and press the Inventory Scan toolbar button located on the NEEDED REQUIREMENTS window or select "Satisfy Requirements" and then select "with Existing Inventory..." from the Actions menu. The system displays an error message if you select more than one requirement. Respond to the error message by pressing YES if you want the system to deselect all but the first requirement selected and continue or press NO if you do not want to continue. If a single requirement is selected or you pressed YES in response to the error message, the INVENTORY SCAN SEARCH CRITERIA dialog as shown in Fig. 132 is displayed.

This dialog allows you to define the search criteria of an inventory scan to search for inventory that could be used to satisfy a material requirement.

Provide the following information to identify the type of material to search for, the location to search, and the maximum number of inventory items to display.

Material Type - Select the type of material to search for from the Material Type list box or accept the default of "Normal". You may choose to search for "normal", "emergency", or "consignment" inventory.

State - Type a valid state to search in the State combo box or select one from its drop down list. If searching for "normal" inventory, the drop down contains a list of all nine states in the BellSouth region. Security Work-Around: If you a user of the Materials Management application only, you can view inventory in any state. If you are a Materials Management user and a user of another OSPCM application, you can view inventory only in the states to which you have access. Therefore, where this document states that all states, CMCs, or inventory sites are listed, may not apply if you have access to other OSPCM applications besides Materials Management. If searching for "emergency" inventory, the drop down contains a list of the states that can store emergency material. Emergency inventory can be stored at either an inventory site that is allowed to have emergency material or at a warehouse site. If searching for "consignment" inventory, the drop down contains a list of states that can store consignment material. Consignment material can only be stored at a warehouse site.
The State combo box defaults to the state of the selected requirement.

CMC - Type a valid CMC to search in the CMC combo box or select one from its drop down list. If searching for "normal" inventory, the drop down contains a list of all CMCs in the BellSouth region (the state for each CMC listed is also displayed in the drop down). Security Work-Around: If you a user of the Materials Management application only, you can view inventory in any CMC. If you are a Materials Management user and a user of another OSPCM application, you can view inventory only in the CMCs to which you have access. Therefore, where this document states that all states, CMCs, or inventory sites are listed, may not apply if you have access to other OSPCM applications besides Materials Management.

If searching for "emergency" inventory, the drop down contains a list of the CMCs that can store emergency material. If searching for "consignment" inventory, the drop down contains a list of CMCs that can store consignment material. The CMC combo box defaults to the CMC of the selected requirement. Select "(ALL)" to search all CMCs that can store the type of material you are looking for in the specified state. If the CMC selected is not in the selected state, the State combo box is changed to the state of the selected CMC.

Inventory Site - Type a valid inventory site to search in the Inventory Site combo box or select one from its drop down list. If searching for "normal" inventory, the drop down contains a list of all inventory sites and Refurbished Central Office Equipment (RCOE) sites in the BellSouth region (the CMC and state for each inventory site listed is also displayed in the drop down). Security Work-Around: If you a user of the Materials Management application only, you can view inventory in any inventory site. If you are a Materials Management user and a user of another OSPCM application, you can view inventory only in the inventory sites to which you have access. Therefore, where this document states that all states, CMCs, or inventory sites are listed, may not apply if you have access to other OSPCM applications besides Materials Management. If searching for "emergency" inventory, the drop down contains a list of the inventory sites that can store emergency material and all warehouse sites. If searching for "consignment" inventory, the drop down contains a list of all warehouse sites. The Inventory Site combo box defaults to the inventory site of the selected requirement. Select "(ALL)" to search all inventory sites that can store the type of material that you are looking for in the specified state or CMC. If the inventory site selected is not in the selected state or CMC, the contents of the State combo box and/or the CMC combo box is changed to the state and CMC of the selected inventory site.

Max Records to Show - This limits the number of inventory items returned by the search and defaults to the maximum number of records last requested (If you are using this dialog for the first time, the default is 25). You may decrease or increase this number in increments of 5 by using the spin buttons or enter your own maximum directly into the text box. The maximum number of records that may be displayed is 999.

Define the search criteria to be used in the scan by providing the following information:

Material Description - If you want to search for inventory items having the same material description as the selected requirement, select the Material Description radio button. The material description of the selected requirement is displayed in the associated text box. If you choose to search by Material Description, the only additional search criteria allowed is Status. By default, the inventory scan searches by Material Description.

Subcategory - If you want to search for inventory items in the same or in a different material subcategory as the selected requirement, select the Material Details radio button and then select the Subcategory check box. The subcategory to search for must be in the material category of the selected requirement. Type a valid material subcategory or select one from the associated drop down list, which contains a list of the valid subcategories in the category of the selected requirement. The Subcategory text box defaults to the material subcategory of the selected requirement. For reference, the requirement's material category is displayed in the Category text box

Cable Gauge - If you want to search for inventory items having a cable gauge greater than or equal to a specified gauge, select the Material Details radio button and then select the Cable Gauge check box. This choice is available only if the selected requirement is for a material description that has a cable gauge. Select an operator from the Cable Gauge list box and select or type a valid cable gauge from the Cable Gauge combo box. You may choose from the following operators: "=" (equal to) or ">=" (greater than or equal to). The default operator is "=". The rightmost Cable Gauge drop down contains a list of valid cable gauges (19, 22, 24, and 26).

Pair Size - If you want to search for inventory items having a pair size greater than or equal to the pair size of the selected requirement, select the Material Details radio button and then select the Pair Size check box. This choice is available only if the selected requirement is for a material description that has a pair size. Select an operator from the Pair Size list box and select or type a valid pair size from the Pair Size combo box. You may choose from the following operators: "=" (equal to) or ">=" (greater than or equal to). The default operator is "=". The rightmost Pair Size drop down contains a list of the pair sizes that BellSouth currently uses that are greater than or equal to the pair size of the requirement.

Fiber Count - If you want to search for inventory items having a fiber count greater than or equal to the fiber count of the selected requirement, select the Material Details radio button and then select the Fiber Count check box. This choice is available only if the selected requirement is for a material description that has a fiber count. Select an operator from the Fiber Count list box and select or type a valid fiber count from the Fiber Count combo box. You may choose from the following operators: "=" (equal to) or ">=" (greater than or equal to). The default operator is "=". The rightmost Fiber Count drop down contains a list of the fiber counts that BellSouth currently uses that are greater than or equal to the fiber count of the requirement.

Status - If you want to search for inventory items having a specific inventory status, check or uncheck the appropriate Status check box. By default, the system searches for all statuses. To search for assigned inventory items only, uncheck all statuses except for the Assigned status. To search for unassigned inventory items only, uncheck all statuses except for the Unassigned status. To search for surplus inventory items only, uncheck all statuses except the Surplus status. You must indicate at least one inventory status. To get help while on this dialog, press the HELP button. To close this dialog without running an inventory scan, press the CANCEL button. To close this dialog and run the inventory scan, press the OK button. The system displays an appropriate error message under the following conditions. Respond to the error message by pressing OK.

If an invalid state is provided.

If an invalid CMC is provided.

If an invalid inventory site is provided.

If zero is entered as the maximum number of records to display.

If Subcategory is selected and no subcategory is provided or an invalid subcategory is provided.

If Cable Gauge is selected and no cable gauge value is provided or an invalid cable gauge value is provided.

If Pair Size is selected and no pair size value is provided or an invalid pair size value is provided.

If Fiber Count is selected and no fiber count value is provided or an invalid fiber count value is provided.

An inventory status to search for is not provided.

If no errors are found, the system determines the inventory status to search for based on the search location and then further limits the search based on the criteria you have provided, including the status criteria. For example, searching the entire state that is responsible for procuring the requirement normally finds all assigned, unassigned, and surplus inventory in the requirement's inventory site. If you indicate that only unassigned inventory should be searched for, the system will not search for assigned or surplus items. The system initially determines the inventory status to search for by applying the following business rules:

Surplus inventory and inventory located at an RCOE site is available to any inventory site located in the BellSouth region.

Emergency inventory located at a warehouse site or at an inventory site is available only to an inventory site located within the responsible state.

Unassigned non-emergency inventory is available only to an inventory site located within the responsible CMC.

Assigned inventory is available only to the responsible inventory site. You cannot request that assigned material be transferred because it is unlikely that an assigned inventory item would be released for transfer. The inventory site from which the transfer is made can transfer assigned material if it chooses, but assigned material cannot be requested to be transferred via the Materials Management application.

If searching for "normal" inventory, the scan searches for inventory items based on the location that you have specified to search as follows:

State - If you are searching an entire state (i.e., a valid state is selected and "(ALL)" is selected for CMC and Inventory Site) and the state to search is not the state responsible for procuring the selected requirement, the system searches for surplus inventory items only. If the state to search is the state responsible for procuring the selected requirement, the system searches for assigned, unassigned, and surplus inventory items which are the responsibility of the requirement's inventory site, searches for unassigned and surplus inventory items which are the responsibility of any other inventory site in the requirement's CMC, and searches for surplus inventory items which are the responsibility of any other inventory site in that state. Since the system allows assigned material found in the inventory site where the requirement is needed to be re-assigned, the term "unassigned", when searching for cable in the same inventory site where the requirement is needed, refers to reels that could be partially unassigned. Both the assigned and unassigned portions of the reel are candidates for available material.

CMC - If you are searching an entire CMC (i.e., a valid state and CMC are selected and "(ALL)" is selected for Inventory Site) and the CMC to search is not the CMC responsible for procuring the selected requirement, the system searches for surplus inventory items only. If the CMC to search is the CMC responsible for procuring the selected requirement, the system searches for assigned, unassigned, and surplus inventory items which are the responsibility of the requirement's inventory site and searches for unassigned and surplus inventory items which are the responsibility of any other inventory site in that CMC. Since you must transfer an inventory item found in another inventory before it may be assigned, the term "unassigned", when searching for cable in an inventory site different from the requirement's inventory site, refers to reels that are completely unassigned.

Inventory Site - If you are searching an inventory site (i.e., a valid state, CMC, and inventory site are selected) and the inventory site to search is not in the CMC responsible for procuring the selected requirement, the system searches for surplus inventory items only. If the inventory site to search is not the inventory site responsible for procuring the selected requirement but is in the CMC responsible for procuring the selected requirement, the system searches for unassigned and surplus inventory items which are the responsibility of that inventory site. If the inventory site to search is the same inventory site responsible for procuring the requirement, the system searches for assigned, unassigned, and surplus inventory items which are the responsibility that inventory site.

If the selected requirement is for Central Office Equipment (COE) or if you are searching for "emergency" or "consignment" inventory, the inventory scan applies the following rules:

If the selected requirement is for COE, in addition to searching in the specified search location, the system also searches for COE inventory items located in all RCOE sites regardless of the search location or the Inventory Status selected.

If searching for "emergency" inventory, the system searches for emergency material stored at all warehouse sites and at all inventory sites that can store emergency material in the State specified regardless of the CMC, the Inventory Site or the Inventory Status selected.

If searching for "consignment" inventory, the system searches for consignment material stored at all warehouse sites in the State specified regardless of the CMC, the Inventory Site or the Inventory Status selected.

In addition to meeting the specified criteria, the inventory item must also meet the following conditions to be considered available material:

It has not been issued,
its inventory balance is greater than or equal to the smallest quantity needed (if the requirement is for cable) or its inventory balance is greater than zero (if the requirement is for non-cable), and it does not have an outstanding transfer request (if the inventory item is found in a different inventory site than where the requirement is needed).

If the search finds inventory items that meet all of the above criteria, the INVENTORY SCAN RESULTS window asshown in Fig. 133 is displayed; if not, the system displays an appropriate message to indicate that no inventory items were found. Respond to the message by pressing OK.

This window displays the results of the inventory scan and inventory items may be assigned or requested for transfer as described earlier.

REFINE THE SEARCH CRITERIA FOR THE INVENTORY SCAN

To refine the search criteria, press the Refine Search Criteria toolbar button located on the INVENTORY SCAN RESULTS window or select "Refine Search Criteria" from the Actions menu. The INVENTORY SCAN SEARCH CRITERIA dialog is re-displayed with the criteria previously used to generate the inventory scan. You may change the scan location, maximum records to show, and scan criteria as desired. If there are more inventory items found than were shown, and you wish to see more, increase the value in the Max Records to Show text box. After the changes have been made, resubmit the inventory scan by pressing the OK button. The INVENTORY SCAN RESULTS window displays the results of the new inventory scan.

PRINT AN INVENTORY SCAN REPORT

To print an Inventory Scan Report, press the Printer toolbar button located on the main MATERIALS MANAGEMENT window or select "Print" from the File menu while the INVENTORY SCAN RESULTS window is the active window. The PRINT dialog as shown in Fig. 134 is displayed.

This dialog allows you to print a report. The Reports grid contains a list of the available reports. The Copies text box sets the number of copies to print and defaults to 1. The Print to File check box allows you to save the report in a file instead of printing it on paper. The Printer text box displays your default printer. To change the printer, press the PRINTER button. The PRINT SETUP dialog as shown in Fig. 135 is displayed.

This is the Microsoft Windows Print Setup dialog that allows you to change your default printer.

To get help while on the PRINT dialog, press the HELP button. To close the dialog without printing, press the CANCEL button.

To print a copy of the current window as an image (i.e., screen print), select Print Form as Image from the Reports grid and press the OK button. An image of the INVENTORY SCAN RESULTS window is printed.

To print an inventory scan report, select Inventory Scan Report from the Reports grid and press the OK button. An Inventory Scan report similar to the one shown below is generated. Data for the report is collected from the current contents of the Inventory Items grid on the INVENTORY SCAN RESULTS window.

MP-10310 INVENTORY SCAN Page 1
By: John Doe (yjkoiyt)
Date: 05/10/1996
Job: MA031SCN
Site:

| Material Description | Serial Number | Balance Quantity | Status | Custom Features | Job Number | Inventory Site | Physical Location | Age |
|---|---|---|---|---|---|---|---|---|
| BKMA-50 | CB34589 | 50 | U | | | LOUE | INV | 94 |
| BKMA-50 | G5610580 | 310 | U | | | LOUE | ALT | 63 |
| BKMA-50 | LOUEDL3841 | 50 | U | | | LOUE | INV | 39 |
| BKMA-50 | LOUEEJ0801 | 150 | U | | | LOUE | INV | 4 |

If the Print to File check box is checked when you press OK, the SAVE REPORT TO FILE dialog as shown in Fig. 136 is displayed.

This dialog allows you to identify where you would like to save the report. Select a drive and directory, then specify a file name for the report. Press OK to save the report in the specified file.

Attachment 1:

The following information is printed on the RF-8010 form when unassigning Central Office Equipment:

Transfer Report No. - The state responsible for the inventory item followed by the OSPCM Material Inventory Transaction Number (e.g., KYI 1184).

Purpose of Transfer- This field always equals "Adj. Accounts".
Ship/Transfer From (Credit)

Location - The inventory site responsible for the inventory item.

State - The state responsible for the inventory item.

Geo. Loc. - The exception geographic location code of the substep to which the inventory item was assigned.

Auth. No. - The job number to which the inventory item was assigned.

RCO - The responsibility code of the inventory site responsible for the inventory item.

RCC - The responsibility code of the inventory site responsible for the inventory item.

Field Code - The field reporting code (FRC) of the substep to which the inventory item was assigned, (i.e., 257C).

Vendor Order Number - The purchase order or select ticket on which the inventory item was shipped.

Ship/Transfer To (Debit)

Location - The inventory site responsible for the inventory item.

State - The state responsible for the inventory item.

Geo. Loc. - The geographic location code of the inventory site responsible for the inventory item.

RCO - The responsibility code of the inventory site responsible for the inventory item.

RCC - The responsibility code of the inventory site responsible for the inventory item.

Func. Code - The function code of the Material Held For Future Use account. This field is always equal to "5C5".

Transportation Instructions

Field Code - This field defaults to 6 blanks followed by an "M". Methods and Procedures (M&Ps) will be written to instruct the user how to manually complete this section.

Engineering Contact

Engineer-The name of the user's supervisor. The "user" is the person who unassigned the inventory item.

Prepared By - The name of the person who unassigned the inventory item. The user's Common Userid (CUTD) is used to obtain his/her name.

Date - The date the inventory item was unassigned. This field is always equal to the current date.

Remarks - Remarks entered at the time the inventory item was unassigned.

Equipment Description - The description of the inventory item unassigned.

If the material is serialized, its serial number will be printed following the material description.

Cond. - The condition of the material. This field always equals "G" (good).

Qty. - The quantity of material unassigned.

Per - This field always equals "EA" (each).

Yr. PI. - The year the inventory item was receipted into inventory.

Attachment 2:

The following information is printed on the RF-8010 form when assigning Central Office Equipment:

Transfer Report No. - The state responsible for the inventory item followed by the OSPCM Material Inventory Transaction Number (e.g., KYI 1184)

Purpose of Transfer- This field always equals "Adj. Accounts".

Ship/Transfer From (Credit)

Location - The inventory site responsible for the inventory item.

State - The state responsible for the inventory item.

Geo. Loc. - The geographic location code of the inventory site responsible for the inventory item.

Auth. No. - The job number for which the inventory item was ordered.

RCO - The responsibility code of the inventory site responsible for the inventory item.

RCC - The responsibility code of the inventory site responsible for the inventory item.

Func. Code - The function code of the Material Held For Future Use account. This field is always equal to "5C5T".

Ship/Transfer To (Debit)

Location - The inventory site responsible for the inventory item.

State - The state responsible for the inventory item.

Geo. Loc. - The exception geographic location code of the substep to which the inventory item was assigned, a

Auth. No. - The job number to which the inventory item was assigned.

RCO - The responsibility code of the inventory site responsible for the inventory item.

RCC - The responsibility code of the inventory site responsible for the inventory item.

Field Code - The field reporting code (FRC) of the substep to which the inventory item was assigned (i.e., 257C).

Transportation Instructions

Field Code - This field defaults to 6 blanks followed by an "M".

Methods and Procedures (M&Ps) will be written to instruct the user how to manually complete this section.

Engineering Contact

Engineer - The name of the user's supervisor. The "user" is the person who assigned the inventory item.

Prepared By - The name of the person who assigned the inventory item. The user's Common Userid (CUED) is used to obtain his/her name.

Date - The date the inventory item was assigned. This field is always equal to the current date.

Remarks - Remarks entered at the time the inventory item was assigned.

Equipment Description - The description of the inventory item assigned. If the material is serialized, its serial number will be printed following the material description.

Cond. - The condition of the material. This field always equals "G" (good).

Qty. - The quantity of material assigned.

Per - This field always equals "EA" (each).

Yr. PL - The year the inventory item was receipted into inventory.

APPROVE A TRANSFER REQUEST

From the Materials Management application window as shown in Fig. 137, select "Show Transfer Requests" and then select "to be Approved..." from the Inventory menu. This function is available only if you are a Materials Management Manager, Materials Management Clerk, or a Materials Management Warehouse user and have the authority to update inventory.

If there are no outstanding transfer requests, the system will display an appropriate message. Respond to the message by pressing OK. If there are outstanding transfer requests, the SELECT INVENTORY SITE dialog as shown in Fig. 138 is displayed.

This dialog allows you to select the inventory site for which transfer requests need to be approved. To do so, provide the following information:

Inventory Site - Enter or select a valid inventory site from the Inventory Site combo box. If you are a Materials Management manager or clerk, the drop down list is populated with a list of inventory sites (excluding RCOE and warehouse sites) which currently have transfer requests that require approval and/or transfer requests that have been approved but not yet receipted. If you are a Materials Management warehouse user, the drop down list is populated with a list of warehouse sites and RCOE sites which currently have transfer requests that require approval and/or transfer requests that have been approved but not yet receipted.
To get help while on this dialog, press the HELP button. To close this dialog without selecting an inventory site, press the CANCEL button. To close this dialog and display the transfer requests for the selected inventory site, press the OK button. The system displays an appropriate message if the inventory site entered does not have any transfer requests (i.e., inventory site is not in the drop down list). Respond to the message by pressing OK.

If no errors are found, the APPROVE TRANSFER REQUEST FOR xxxx window as shown in Fig. 139 is displayed, where xxxx is the selected inventory site.

From this window you may approve the transfer of an inventory item requested, approve the transfer of a substitute inventory item, reject a transfer request, or cancel the transfer of an inventory item which has not been receipted.

The Awaiting Approval grid displays the inventory items waiting to be approved for transfer by the selected inventory site. The following information is displayed:

Material Description - The material description of the inventory item requested.

Serial Number - The serial number of the inventory item requested (if serialized).

Requested Quantity - The quantity of material requested.

Requested From Status - The inventory status from which the material was requested. Values are "U" (unassigned) or "S" (surplus).

Physical Location - A symbol here indicates that the inventory item requested is located at an alternate address. No symbol means that the inventory item is located at the selected inventory site.

To Inv Site - The inventory site requesting the transfer.

Requested Date - The date the transfer request was made.

The Approved but Not Receipted grid displays all of the inventory items that have been approved for transfer by the selected inventory site but have not been receipted. The following information is displayed:

Material Description - The material description of the inventory item approved for transfer.

Serial Number - The serial number of the inventory item approved for transfer (if serialized).

Approved Quantity - The quantity of material approved for transfer.

To Inv Site - The inventory site requesting the transfer.

Approval Date - The date that the inventory item was approved for transfer.

A symbol appears in the Physical Location column if the inventory item is not physically at the responsible inventory site, but is at an alternate storage location. To view the address of where the inventory item is located, double-click the symbol or use the arrow keys to move the marquee to it and press ENTER. The PHYSICAL LOCATION dialog as shown in Fig. 140 is displayed.

This dialog displays the location of an inventory item that is not physically located at the inventory site responsible for the material. Information includes the code under which this alternate address was saved, the contact name and phone number, company name, street address, room number, city, state, and zip. To get help while on this dialog, press the HELP button. To close this dialog, press the CLOSE button.

TRANSFER THE INVENTORY ITEM REQUESTED

To approve a transfer request for the inventory item requested, select an inventory item from the Awaiting Approval grid on the APPROVE TRANSFER REQUEST window. The following information is displayed in the area below the grid:

Available Quantity - The inventory balance of the material in the requested status at the location where it exists. For example, there exists an unassigned inventory balance of 600 for AFAW-100 at alternate address 123 1st Street or a surplus inventory balance of 500 for AFAW-100 at inventory site LOUE.

Transfer Quantity - The quantity of material to be transferred. If the request is for serialized inventory, the Transfer Quantity is set equal to the available quantity. This is because the entire serialized quantity must be transferred. If the request is for non-serialized inventory, the Transfer Quantity is set equal to the lesser of the available quantity or the requested quantity. This is because you cannot transfer more inventory than is available nor transfer more non-serialized inventory than has been requested. The quantity to be transferred may be changed if the inventory item to be transferred is non-serialized. However, the quantity entered may not be greater than the quantity available nor greater than the quantity requested to be transferred.

Request Remarks - This text box displays the remarks entered at the time the inventory item was requested for transfer. If no remarks were entered, this field is blank.

To record remarks with the Transfer material inventory transaction created at the time the request is approved, enter your remarks in the Transfer Remarks text box.

To approve the transfer of the selected inventory item, press the Transfer Item toolbar button located on the APPROVE TRANSFER REQUEST window or select "Approve Transfer" from the Actions menu. The system displays an appropriate message under the following conditions:

If you try to approve a transfer and the inventory item no longer has an available quantity, an error message is displayed. Respond to the message by pressing OK.
If you try to transfer a quantity greater than zero but less than the quantity requested, the system displays a warning message. Respond to the warning message by pressing YES if you still wish to transfer the item or NO if you do not want to transfer the item.

If no errors are found, the system approves the transfer request as follows:

The transfer request is put into the "approved" status.

The inventory item is put into the "in-transit" status and a Transfer material inventory transaction is recorded. The inventory item will remain the responsibility of the "from" inventory site until receipted in the "to" inventory site.

The Transfer transaction is marked as not to be sent to Asset Management.

If the transferred quantity is less than the requested quantity, each material requirement for which the transfer was requested has its remaining needed quantity re-calculated. If greater than zero, the requirement is put back into the "needed" status and marked ready to be fulfilled.

If the transferred quantity is greater than or equal to the requested quantity, each material requirement for which the transfer was requested is put into the "transferred" status.

TRANSFER A SUBSTITUTE INVENTORY ITEM

If the inventory item requested to be transferred is no longer available (the Available Quantity equals zero) or you do not want to transfer that inventory item for some reason, you may search for suitable substitutes and choose one of these to transfer. When substituting material, all but a serial number change should be agreed upon by the inventory site that requested the transfer to be sure that the item is a suitable substitute.

If you would like to transfer a substitute item, select an inventory item from the Awaiting Approval grid and press the Find Substitutes toolbar button located on the APPROVE TRANSFER REQUEST window or select "Transfer Substitute Item" from the Actions menu. A process is initiated to search for inventory items that could be used as substitutes as follows:

If the selected transfer request is for cable, the inventory scan searches for unassigned, surplus, or assigned inventory items which have not been issued that have the same material description as requested and have an inventory balance greater than or equal to the quantity requested. Since a reel of cable may have both unassigned and assigned balances, the term "unassigned", when searching for cable to transfer from your inventory site, refers to reels that could be partially unassigned.

If the selected transfer request is for non-cable, the inventory scan searches for unassigned, surplus, or assigned inventory items which have not been issued that have the same material description as requested and have an inventory balance greater than zero.

If there are inventory items that meet this criteria, the AVAILABLE SUBSTITUTES window as shown in Fig. 141 is displayed; if not, the system displays an appropriate message to indicate that no inventory items were found. Respond to the message by pressing OK.

This dialog allows you to select a substitute inventory item to transfer in place of the inventory item requested. The following information is displayed:

Requested Quantity - The quantity of material requested to be transferred.

Transfer Quantity - The quantity to be transferred. It is initially set to zero and is increased as inventory items are selected to be transferred.

The grid on this dialog displays the inventory items found that could be used as a substitute for the inventory item requested. The following information is displayed:

Material Description - The material description of the inventory item.

Custom Features (abbreviated CF) - A symbol here indicates that the inventory item has custom material features (e.g., inside pulling eye).

Serial Number - The serial number of the inventory item (if serialized).

Physical Location - A symbol here indicates that the inventory item is located at an alternate address. No symbol means that the inventory item is located at the inventory site responsible for the material.

Status - The inventory status of the inventory item. Values are "U" (unassigned), "S" (surplus), or "A" (assigned).

Quantity - The inventory balance of the inventory item in that status at that location.

Age - The age of the inventory item in days. If this is non-serialized material and the individual items were receipted on different days, the age displayed will be that of the oldest item. If the age of the inventory item is greater than 9999 days, asterisks will appear in this column.

A symbol appears in the Physical Location column if the inventory item is not physically at the responsible inventory site, but is at an alternate storage location. To view the address of where the inventory item is located, double-click the symbol or use the arrow keys to move the marquee to it and press ENTER. The PHYSICAL LOCATION dialog as shown in Fig. 142 is displayed.

This dialog displays the location of an inventory item that is not physically located at the inventory site responsible for the material as described earlier.

A symbol appears in the Custom Features column (abbreviated CF) if the inventory item found has custom features. To view the custom features, double-click on the symbol or use the arrow keys to move the marquee to it and press ENTER. The CUSTOM FEATURES dialog is displayed. The custom features displayed will vary with the type of inventory item.

If the inventory item selected is cable, the dialog displays the custom features associated with cable as shown in Fig. 143. Information includes whether or not the inventory item has pulling eyes, prepped ends, preterminations, a taper splice, gas pressure, or modular connections.

If the inventory item selected is a capacitor, the dialog displays the custom features associated with capacitors as shown in Fig. 144. Information includes the microfarads and/or ohms of the capacitor.

If the inventory item selected is a non-standard pedestal cross-box, the dialog displays its configuration as shown in Fig. 145. Information includes the size and length of each stub and the connections between the feeder pairs and distribution pairs inside the cross-box.

If the inventory item selected is a non-standard pole-mounted cross box, the dialog display sits configuration as shown in Fig. 146. Information includes the size and length of each stub and the connections between the feeder pairs and distribution pairs inside the cross-box.

To get help while on this dialog, press the HELP button. To close this dialog, press the CLOSE button.

To get help while on the AVAILABLE SUBSTITUTES dialog, press the HELP button. If you decide not to transfer a substituted item, press the CANCEL button to close this dialog and either approve the transfer of the requested inventory item or reject the transfer request. The procedure for rejecting a transfer request is described later in this document.

If you decide to transfer a substitute inventory item from the list of available substitutes, select the inventory item(s) you wish to transfer. You may select multiple inventory items only if the inventory items are non-serialized and located in the same physical location. As an inventory item is selected, the Transfer Quantity is increased by the inventory balance of that inventory item. If transferring non-cable, the Transfer Quantity is not allowed to exceed the Requested quantity and is set equal to the lesser of the sum of the quantities selected to be transferred or the Requested Quantity. If transferring non-serialized material, you may decrease the Transfer Quantity if the entire balance is not to be transferred.

After selecting the inventory item(s) to transfer, press the OK button. The system displays a warning message if you try to transfer less material than has been requested. Respond to the warning message by pressing YES if you still wish to transfer the items or NO if you do not want to transfer the items.

If no errors are found and the selected inventory item is in the assigned status, the RELEASE ASSIGNMENTS dialog as shown in Fig. 147 is displayed. You must first unassign the material before transferring it.

This dialog allows you to unassign material from a requirement listed in the grid in order to have it transferred and assigned to another requirement. The following information is displayed above the grid.

Material Description - The description of the inventory item to be unassigned.

Requested Quantity - The quantity of material requested to be transferred.

Release Quantity - The quantity to be unassigned. If the inventory item is non-serialized, the Release Quantity is initially set to zero and is increased as requirements are selected to have material unassigned. If the inventory item is serialized, the Release Quantity is set equal to the inventory balance of the inventory item.

The grid on this dialog displays each requirement to which the selected inventory item is currently assigned. The following information is displayed:

Job - The job to which the inventory item is assigned.

Print - The job print to which the inventory item is assigned.

Step - The job step to which the inventory item is assigned.

Quantity Assigned - The portion of the inventory balance that is assigned to the requirement.

Work Environment (abbreviated WE) - The work environment for which the inventory item is needed (e.g., B = buried).

Work Action - The type of work for which the inventory item is needed (e.g., PLAC = Placing)

On Job Date - The date the material is needed on the job (Scheduled Start Date - On Job Interval).

Issue Date - The date the inventory item was issued for use on this requirement. If the inventory item has not been issued, this column is blank.

To get help while on this dialog, press the HELP button. If you decide not to approve the transfer of assigned material, press the CANCEL button to close this dialog.

If the inventory item is serialized, all requirements are automatically selected by the system when the RELEASE ASSIGNMENTS dialog is opened because the entire serialized quantity must be unassigned before it can be transferred. If the inventory item is non-serialized, you must select the requirement(s) from which the inventory item should be unassigned.

As requirements are selected, the Release Quantity is increased by the quantity assigned to that requirement. If the inventory item is non-cable, the Release Quantity is not allowed to exceed the Requested Quantity and is set equal to the lesser of the sum of the quantities selected to be unassigned or the Requested Quantity. Type any remarks in the Remarks text box that you wish to have recorded with the Unassignment transaction.

To release the assignment, press the OK button. The system displays an appropriate message under the following conditions:

If the selected requirement's material has been issued and there is only one assignment or the inventory item is serialized, the system displays a message indicating that the assignment cannot be released because the inventory item has been issued.

If the inventory item is non-serialized and multiple requirements have been selected and at least one of the selected requirements has had its material issued, the system displays a message indicating that a selected requirement has had its material issued and asking if you want the system to release the assignments that have not been issued. Respond to the message by pressing YES if you want to release the un-issued assignments. Respond to the message by pressing NO if you do not want to release the un-issued assignments.

If no requirement is selected to have its material unassigned, an error message is displayed. Respond to the message by pressing OK.

If no errors are found, the system releases the assignment as follows:

The inventory item is unassigned from the selected requirement(s) for the quantity to be released and an Unassignment material inventory transaction is recorded for each unassignment made.

If the inventory item is non-central office equipment and ordered direct to code, the Unassignment transaction is marked to be sent to Asset Management; otherwise it is marked as not to be sent to Asset Management.

If you released an assignment of Central Office Equipment, form RF-8010 is printed to move the material from the Field Reporting Code (FRC) and Geographic Location Code (GLC) of the requirement to which it was previously assigned to the 1220.1412 (Material Held For Future Use) account (See attachment 1).

After any assigned inventory is unassigned, the system approves the transfer of the substituted item as follows:

The transfer request is put into the "approved" status.

Each selected inventory item is put into the "in-transit" status for the quantity to be transferred and a Transfer material inventory transaction is recorded. The inventory item will remain the responsibility of the "from" inventory site until receipted in the "to" inventory site.

The Transfer transaction is marked as not to be sent to Asset Management.

If the transferred quantity is less than the requested quantity, each material requirement for which the transfer was requested has its remaining needed quantity re-calculated. If greater than zero, the requirement is put back into the "needed" status and marked ready to be fulfilled.

If the transferred quantity is greater than or equal to the requested quantity, each material requirement for which the transfer was requested is put into the "transferred" status.

REJECT A TRANSFER REQUEST PRIOR TO APPROVAL

If you find that the inventory item requested to be transferred is no longer available (the Available Quantity equals zero) or you do not want to approve the transfer for some reason, you may reject the transfer request.

To reject a transfer request, select an inventory item from the Awaiting Approval grid and press the Reject Transfer Request toolbar button located on the APPROVE TRANSFER REQUEST window or select "Reject Transfer Request" from the Actions menu. If no errors are found, the system rejects the transfer request as follows:

The transfer request is deleted.

Each material requirement for which the transfer was requested has its remaining needed quantity re-calculated. If greater than zero, the requirement is put back into the "needed" status and marked ready to be fulfilled.

CANCEL AN APPROVED TRANSFER REQUEST

If a transferred inventory item has not yet been receipted, you may cancel the transfer. For example, you decide to transfer a different inventory item or the requesting site made a phone call to cancel the transfer before the material was shipped.

To cancel a transfer, select an inventory item from the Approved but Not Receipted grid and press the Cancel Transfer toolbar button located on the APPROVE TRANSFER REQUEST window or select "Cancel Approved Transfer" from the Actions menu. If no errors are found, the system cancels the transfer as follows:

The transfer request is put back into the "unapproved" status.

The inventory item is moved from the "in-transit" status back to its previous status, unless its previous status was "assigned", and a Transfer Reversal material inventory transaction is recorded. An inventory item that had its assignments released in order to be transferred is not assigned back to its original requirement(s) when the transfer is cancelled. Instead, it is put into the "unassigned" status.

Each material requirement for which the material was transferred is put back into the "transfer requested" status.

The Transfer Reversal transaction is marked as not to be sent to Asset Management.

The transfer request may then be approved at a later date or rejected.

To close the APPROVE TRANSFER REQUEST window, double-click the control box located in the upper left corner of the window. If any material was transferred, one of the following forms is printed:

If transferring Central Office Equipment, form RF-8010 is printed to move the material from the 1220.1412 account in the "from" inventory site to the 1220.1412 account in the "to" inventory site (see attachment 2).

If transferring material other than Central Office Equipment, form RF-6241-M is printed (see attachment 3).

These forms should serve as the packing slip when shipping the material to the "to" inventory site.

Attachment 1:

The following information is printed on the RF-8010 form when unassigning Central Office Equipment:

Transfer Report No. - The state responsible for the inventory item followed by the OSPCM Material Inventory Transaction Number (e.g., KYI 1184)

Purpose of Transfer- This field always equals "Adj. Accounts".

Ship/Transfer From (Credit)

Location - The inventory site responsible for the inventory item.

State - The state responsible for the inventory item.

Geo. Loc. - The exception geographic location code of the substep to which the inventory item was assigned.

Auth. No. - The job number to which the inventory item was assigned.

RCO - The responsibility code of the inventory site responsible for the inventory item.

RCC - The responsibility code of the inventory site responsible for the inventory item.

Field Code - The field reporting code (FRC) of the substep to which the inventory item was assigned (i.e., 257C).

Vendor Order Number - The purchase order or select ticket on which the inventory item was shipped.

Ship/Transfer To (Debit)

Location - The inventory site responsible for the inventory item.

State - The state responsible for the inventory item.

Geo. Loc. - The geographic location code of the inventory site responsible for the inventory item.

RCO - The responsibility code of the inventory site responsible for the inventory item.

RCC - The responsibility code of the inventory site responsible for the inventory item.

Func. Code - The function code of the Material Held For Future Use account. This field is always equal to "5C5T".

Transportation Instructions

Field Code - This field defaults to 6 blanks followed by an "M". Methods and Procedures (M&Ps) will be written to instruct the user how to manually complete this section.

Engineering Contact

Engineer - The name of the user's supervisor. The "user" is the person who unassigned the inventory item.

Prepared By - The name of the person who unassigned the inventory item. The user's Common Userid (CUID) is used to obtain his/her name.

Date - The date the inventory item was unassigned. This field is always equal to the current date.

Remarks - Remarks entered at the time the inventory item was unassigned.

Equipment Description - The description of the inventory item unassigned. If the material is serialized, its serial number will be printed following the material description.

Cond. - The condition of the material. This field always equals "G" (good).

Qty. - The quantity of material unassigned.

Per - This field always equals "EA" (each).

Yr. PI. - The year the inventory item was receipted into inventory.

Attachment 2:

The following information is printed on the RF-8010 form when transferring Central Office Equipment:

Transfer Report No. - The state from which the inventory item was transferred followed by the OSPCM Material Inventory Transaction Number (e.g., KYI 1184)

Purpose of Transfer- This field always equals "Adj. Accounts".

Ship/Transfer From (Credit)

Location - The inventory site from which the inventory item was transferred.

State - The state from which the inventory item was transferred.

Geo. Loc. - The geographic location code of the inventory site from which the inventory item was transferred.

RCO - The responsibility code of the inventory site from which the inventory item was transferred.

RCC - The responsibility code of the inventory site from which the inventory item was transferred.

Func. Code - The function code of the Material Held For Future Use account. This field is always equal to "5C5T".

Ship/Transfer To (Debit)

Location - The inventory site to which the inventory item was transferred.

State - The state to which the inventory item was transferred.

Geo. Loc. The geographic location code of the inventory site to which the inventory item was transferred.

RCO - The responsibility code of the inventory site to which the inventory item was transferred.

RCC - The responsibility code of the inventory site to which the inventory item was transferred.

Func. Code - The function code of the Material Held For Future Use account. This field is always equal to "5C5T".

Transportation Instructions

Field Code - This field defaults to 6 blanks followed by an "M". Methods and Procedures (M&Ps) will be written to instruct the user how to manually complete this section.

Engineering Contact

Engineer-The name of the user's supervisor. The "user" is the person who transferred the inventory item.

Prepared By - The name of the person who transferred the inventory item. The user's Common Userid (CUID) is used to obtain his/her name.

Date - The date the inventory item was transferred. This field is always equal to the current date.

Remarks - Remarks entered at the time the inventory item was transferred.

Equipment Description - The description of the inventory item transferred. If the material is serialized, its serial number will be printed following the material description.

Cond. - The condition of the material. This field always equals "G".

Qty. - The quantity of material transferred.

Per - This field equal "EA" if non-cable is transferred or equals "FT" if cable is transferred.

Yr. Pl. - The year the inventory item was receipted into inventory.

Attachment 3:

The following information is printed on the RF-6241-M form when transferring non-Central Office Equipment:

Shipped To

Name - The name of the person responsible for the inventory site from which the inventory item was transferred.

Tel. No. - The telephone number of the person responsible for the inventory site from which the inventory item was transferred.

Geo. Loc - The geographic location code of the inventory site from which the inventory item was transferred.
Street Address - The street address of the inventory site from which the inventory item was transferred.

City & State - The city and state of the inventory site from which the inventory item was transferred.

Shipped From

Name - The name of the person responsible for the inventory site to which the inventory item was transferred.

Tel. No. - The telephone number of the person responsible for the inventory site to which the inventory item was transferred.

Geo. Loc. - The geographic location code of the inventory site to which the inventory item was transferred.

Street Address - The street address of the inventory site to which the inventory item was transferred.

City & State - The city and state to which the inventory item was transferred.

Description - The material description of the inventory item transferred.

Serial Number - The serial number of the inventory item transferred (if serialized).

Quantity - The quantity of material transferred.

SET PREFERENCES

To set user preferences, select "Preferences" from the Options menu on the Materials Management application window. The PREFERENCES dialog as shown in Fig. 148 is displayed.

Each tab on the PREFERENCES dialog provides a different function.

SET TOOLBAR POSITION

To set the position of the main Materials Management toolbar for the current session, select one of the following options from the Toolbar frame located on the OSPCM tab:

Align Top - To position the toolbar at the top of the window, select Align Top. This is the default location for the toolbar.

Align Right - To position the toolbar along the right side of the window, select Align Right.

Align Left - To position the toolbar along the left side of the window, select Align Left.

Align Bottom - To position the toolbar at the bottom of the window, select Align Bottom.

Floating Toolbar - To place the toolbar in its own window, select Floating Toolbar.

To allow the toolbar to be moved by clicking and dragging, check Moveable Toolbar.

SET MESSAGE LEVEL

To indicate at which level you would like messages displayed for the current session, select one of the following options from the Message Level frame located on the OSPCM tab:

Novice - Select Novice if you are new to the Materials Management application. As a novice user, all messages will be displayed to you in the form of a dialog window. You must provide a response before you may continue.

Advanced - Select Advanced if you are familiar with the Materials Management application. As an advanced user, most messages are displayed on the status bar in the Last Action panel. Only messages that require a user response are displayed as a dialog.

SAVE SIZE AND POSITION OF WINDOWS

To save the size and position of windows each time they are closed during the current session, select one or more of the following options from the Remember Size and Position frame located on the OSPCM tab:

Application Window - To save the size and position of the main window, check Application Window.

Child Windows - To save the size and position of child windows, check Child Windows.

SET DEFAULT LOCATIONS

To set the default locations to be used during the current session, click the Default Location tab as shown in Fig.149.

The default locations will be used in various combo boxes throughout the Materials Management application. To set the default location, identify the state, CMC, and inventory site as follows:

State - Type or select a valid state from the State combo box. The drop down contains a list of all nine states in the BellSouth region.

CMC - Type or select a valid CMC from the CMC combo box. The drop down contains a list of all CMCs in the selected state.

Inventory Site - Type or select a valid inventory site from the Inventory Site combo box. The drop down contains a list of all inventory sites in the selected CMC.

To get help while on the PREFERENCES dialog, press the HELP button. To close this dialog without saving the changes made, press the CANCEL button. To close this dialog and save the changes made, press the OK button.

The changes made on the OSPCM tab will be made for the current session only. To save these changes between sessions, check the Save Settings on Exit item in the Options menu before exiting the Materials Management application.

Changes made on the Default Locations tab will be saved between sessions without having to check Save Settings on Exit. Any changes made to the default locations during a session will become the new default. For example, if your default inventory site is LOUE and you display an inventory item in inventory site LKWE, LKWE becomes the new default inventory site. To return to your original default settings, open the PREFERENCES dialog and press OK.

IDENTIFY TODAY'S REQUIREMENTS

This process runs nightly after midnight following the OSPCM scheduling process to determine the material requirements that need to be satisfied today so that they are available when the job is scheduled to be worked. Since a material requirement may be satisfied with either an order or with material already in inventory, this process assumes that the material requirement will be satisfied with a new order because ordering material usually takes longer.

The process determines if a material requirement on an EWO job needs to be satisfied today by comparing its calculated order date with the current date. If all the following criteria are met, the requirement is flagged as needing to be fulfilled today:

the status of the job for which the requirement exists is "open",
the job for which the requirement exists is approved (i.e., the job has an approval date),
the status of the requirement is "open",
the material status of the requirement is "needed", and
the order date of the requirement is less than or equal to the current date.

These requirements may then be retrieved and satisfied by a Material Service Coordinator (MSC), a Customer Service Team member, a Marketing Provisioning Team member, a construction supervisor, or a construction clerk.

INTRODUCTION

The Materials Management Business Solution Area I deals with satisfying a material requirement on an Outside Plant Construction Engineering Work Order (EWO) or a Plant Work Order (PWO) job with new material. All new material is obtained through a real-time interface with OrderMaster, the front-end interface to REGIS and CAPRI. All PIDed items, those with a Product Identifier, are sent from OrderMaster to REGIS to be fulfilled, if possible, by a BellSouth Telecommunications (BST) warehouse. All non-PIDed items are sent from OrderMaster to CAPRI to be fulfilled by an outside vendor, such as AT&T. This Business Solution area is broken down into eight sections:

Calculate Order Date
Identify Today's Requirements
Order Material Requirements
View an Order Receive Shipment Details Receipt Ordered Material Send Receipt Notification to CAPRI Set Preferences Each section is briefly described and then broken down into the actual navigational flow through the presentation and/or process. The purpose of this document is to gain consensus as to the deliverable for Materials Management Business Solution Area I.

The first section deals with calculating the order date for a material requirement. This process is called by the OSPCM Scheduling application each time a scheduling activity obtains a new schedule start date.

The second section deals with identifying material requirements that need to be satisfied today so that the material is available when the job is scheduled to be worked. An automated process will execute each night to identify those requirements for any open (i.e., not closed, cancelled, or completed) EWO-job that has been approved. A PWO job will not be automatically identified as needing requirements to be fulfilled. These requirements must be identified manually and ordered on an individual basis. The process will flag any open substep within that job that needs material and whose order date is less than or equal to today as having a material requirement that needs to be satisfied today. Each flagged substep may later be retrieved by a Visual Basic (VB) presentation window.

The third section deals with satisfying a material requirement with a new order. This area allows you to retrieve requirements for a specific job or to retrieve those requirements identified as needing to be satisfied today. The former is the method of choice in an emergency situation. The system provides a presentation that allows you to display a specific job or a list of jobs that have material requirements that need to be satisfied today. You then select those requirements you wish to order. The selected requirements are pre-processed and grouped into one or more orders/order items due to aggregation and various other ordering rules. The system provides a presentation that allows you to view each order created before it is sent to OrderMaster. Appropriate changes can be made at this time, such as de-aggregating requirements aggregated to an order item within the order or changing the location to which an order should be shipped. You then send each order to OrderMaster separately. OrderMaster returns an OrderMaster Number ("Q" Number) if the order was processed successfully, indicates that the order has been queued, or indicates that an error was found.

The fourth section involves viewing an order which has already been sent to OrderMaster. This area allows you to retrieve a specific order and view details about that order and its associated line items. You may display a specific order via its OrderMaster Number, a Purchase Order Number or Select Ticket Number on which the order was or will be fulfilled, or via the Job Number for which the material was ordered.

The fifth section involves receiving shipment details from the procurement systems for an ordered item. An automated process will run each time shipment details are received from either REGIS or CAPRI. Shipment details are received from REGIS when a select ticket is created, each time a select ticket number changes (e.g. future day ticket to current day ticket), when the quantity or material to be shipped is changed, when a select ticket item is cancelled, or when the select ticket is loop closed indicating that the material has been shipped. Shipment details are received from CAPRI when a purchase order is created, when a shipment date has changed, or when a purchase order item is cancelled.

The sixth section involves receipting ordered material into inventory once the material has been shipped and delivered to the appropriate location. You have the choice of retrieving items to be receipted either by the OrderMaster Number on which the material was ordered or by the Purchase Order Number (vendor orders) or Select Ticket Number (BST warehouse orders) on which the material was shipped. The system provides a presentation that allows you to display order items within a specific order, order items shipped on a specific Purchase Order, or order items shipped on a specific Select Ticket. A list of items already receipted or to be receipted is displayed. The material can be receipted into inventory as unassigned material, receipted into inventory and assigned to the appropriate substep within the job for which it was ordered, or receipted into inventory and flagged as material to be returned.

The seventh section involves sending receipt notification to CAPRI, the system that processes outside vendor orders. All material ordered from an outside vendor must be reported to CAPRI after it has been received into inventory so that CAPRI may authorize payment to the vendor. This section describes MATERIALS MANAGEMENT'S daily interface to report order receipts to CAPRI. Since this is an automatic process initiated by the system on a daily basis, there is no user interface.

The eighth section involves setting user preferences. The system provides a presentation that allows you to set various preferences, such as the toolbar's position and a default location to be used throughout the application.

The navigation through the Materials Management application is done from the Materials Management application window, which has a button toolbar and pulldown menus to drive user selections.

The application window for Materials Management is shown in Fig. 150.

The first eight toolbar buttons on the OSPCM Material window apply only to Materials Management. Their functions are as follows:

Show Today's Requirements
Show a Job's Needed Requirements
Show All Requirements for a Job
Receipt an Order
Show Inventory Item
Inventory Scan
Show Transactions
Show an Order Summary The remaining toolbar buttons are standard buttons that appear in all OSPCM applications. The first, second, fourth, and eight toolbar buttons are described in this document. The other Materials Management buttons are described in later business solutions.

INTRODUCTION

The Materials Management Business Solution Area I deals with satisfying a material requirement on an Outside Plant Construction Engineering Work Order (EWO) or a Plant Work Order (P WO) job with new material. All new material is obtained through a real-time interface with OrderMaster, the front-end interface to REGIS and CAPRI. All PIDed items, those with a Product Identifier, are sent from OrderMaster to REGIS to be fulfilled, if possible, by a BellSouth Telecommunications (BST) warehouse. All non-PIDed items are sent from OrderMaster to CAPRI to be fulfilled by an outside vendor, such as AT&T. This Business Solution area is broken down into eight sections:

Calculate Order Date
Identify Today's Requirements
Order Material Requirements
View an Order
Receive Shipment Details
Receipt Ordered Material
Send Receipt Notification to CAPRI
Set Preferences Each section is briefly described and then broken down into the actual navigational flow through the presentation and/or process. The purpose of this document is to gain consensus as to the deliverable for Materials Management Business Solution Area I.

The first section deals with calculating the order date for a material requirement. This process is called by the OSPCM Scheduling application each time a scheduling activity obtains a new schedule start date.

The second section deals with identifying material requirements that need to be satisfied today so that the material is available when the job is scheduled to be worked. An automated process will execute each night to identify those requirements for any open (i.e., not closed, cancelled, or completed) EWO-job that has been approved. A PWO job will not be automatically identified as needing requirements to be fulfilled. These requirements must be identified manually and ordered on an individual basis. The process will flag any open substep within that job that needs material and whose order date is less than or equal to today as having a material requirement that needs to be satisfied today. Each flagged substep may later be retrieved by a Visual Basic (VB) presentation window.

The third section deals with satisfying a material requirement with a new order. This area allows you to retrieve requirements for a specific job or to retrieve those requirements identified as needing to be satisfied today. The former is the method of choice in an emergency situation. The system provides a presentation that allows you to display a specific job or a list of jobs that have material requirements that need to be satisfied today. You then select those requirements you wish to order. The selected requirements are pre-processed and grouped into one or more orders/order items due to aggregation and various other ordering rules. The system provides a presentation that allows you to view each order created before it is sent to OrderMaster. Appropriate changes can be made at this time, such as de-aggregating requirements aggregated to an order item within the order or changing the location to which an order should be shipped. You then send each order to OrderMaster separately. OrderMaster returns an OrderMaster Number ("Q" Number) if the order was processed successfully, indicates that the order has been queued, or indicates that an error was found.

The fourth section involves viewing an order which has already been sent to OrderMaster. This area allows you to retrieve a specific order and view details about that order and its associated line items. You may display a specific order via its OrderMaster Number, a Purchase Order Number or Select Ticket Number on which the order was or will be fulfilled, or via the Job Number for which the material was ordered.

The fifth section involves receiving shipment details from the procurement systems for an ordered item. An automated process will run each time shipment details are received from either REGIS or CAPRI. Shipment details are received from RBGIS when a select ticket is created, each time a select ticket number changes (e.g. future day ticket to current day ticket), when the quantity or material to be shipped is changed, when a select ticket item is cancelled, or when the select ticket is loop closed indicating that the material has been shipped. Shipment details are received from CAPRI when a purchase order is created, when a shipment date has changed, or when a purchase order item is cancelled.

The sixth section involves receipting ordered material into inventory once the material has been shipped and delivered to the appropriate location. You have the choice of retrieving items to be receipted either by the OrderMaster Number on which the material was ordered or by the Purchase Order Number(vendor orders) or Select Ticket Number (BST warehouse orders) on which the material was shipped. The system provides a presentation that allows you to display order items within a specific order, order items shipped on a specific Purchase Order, or order items shipped on a specific Select Ticket. A list of items already receipted or to be receipted is displayed. The material can be receipted into inventory as unassigned material, receipted into inventory and assigned to the appropriate substep within the job for which it was ordered, or receipted into inventory and flagged as material to be returned.

The seventh section involves sending receipt notification to CAPRI, the system that processes outside vendor orders. All material ordered from an outside vendor must be reported to CAPRI after it has been received into inventory so that CAPRI may authorize payment to the vendor. This section describes MATERIALS MANAGEMENT'S daily interface to report order receipts to CAPRI. Since this is an automatic process initiated by the system on a daily basis, there is no user interface.

The eighth section involves setting user preferences. The system provides a presentation that allows you to set various preferences, such as the toolbar's position and a default location to be used throughout the application.

The navigation through the Materials Management application is done from the Materials Management application window, which has a button toolbar and pulldown menus to drive user selections.

The application window for Materials Management is shown in Fig. 151.

The first eight toolbar buttons on the OSPCM Material window apply only to Materials Management. Their functions are as follows:

Show Today's Requirements

Show a Job's Needed Requirements

Show AH Requirements for a Job

Receipt an Order

Show Inventory Item

Inventory Scan

Show Transactions

Show an Order Summary

The remaining toolbar buttons are standard buttons that appear in all OSPCM applications. The first, second, fourth, and eight toolbar buttons are described in this document. The other Materials Management buttons are described in later business solutions.

ORDER MATERIAL REQUIREMENTS

This section deals with satisfying a material requirement with a new order. To order a material requirement, you must first view the substeps within a job that has at least one material requirement to be satisfied. A substep is a breakdown of work required on a job step. You may do this in one of two ways.

View all of the requirements that need to be satisfied today (i.e., the substep for which the requirement is needed has an order date less than or equal to the current date).

OR

View all of a job's needed requirements regardless of when they need to be ordered (i.e., the substep for which the requirement is needed may have an order date greater than the current date or may not yet have had an order date calculated). The substep for which a requirement is needed does not have an order date calculated until it has gone through the scheduling process and is scheduled to begin work within 10 weeks of the current date (See Calculate Order Date section).

SHOW TODAY'S REQUIREMENTS

Today's requirements are those requirements that need to be satisfied today so that they are available by the time the job is ready to be worked.

To view the requirements that need to be satisfied today, press the Show Today's Requirements toolbar button located on the Materials Management application window or select "Show Today's Requirements..." from the Requirements menu. The SHOW TODAY'S REQUIREMENTS dialog as shown in Fig.152 is displayed. This function is available only if you are a Materials Management manager or clerk and you have the authority to order material.

This dialog allows you to select the scope for which material requirements that need to be satisfied today should be displayed- You must provide the following information:

CMC - Select or type a Construction Management Center (CMC) name in the CMC combo box, which contains a list of all CMCs in the states for which you may order material. This field defaults to the CMC you selected as your default CMC on the PREFERENCES window, which is described later in this document. If the selected CMC default is not in a state for which you may order material, this field defaults to the first CMC listed in the CMC drop-down list. If a CMC is entered that is not in the list, the system displays an appropriate error message. Respond to the message by pressing OK.

Optionally, you may select the Filter Requirements By check box to display only certain requirements within the selected CMC. Select one of the following choices:

Inventory Site - To display only requirements for a specific inventory site, select or type an inventory site name in the Inventory Site combo box, which contains a list of inventory sites for the specified CMC that currently have material requirements that need to be satisfied today. If an inventory site is entered that is not in the list, the system displays an appropriate error message. Respond to the message by pressing OK. Inventory Site is the default radio button.

Resource ID - To display only requirements that are assigned to a specific resource ID, type a resource ID in the Resource ID text box.

To get help while on this dialog, press the HELP button. To close the dialog without displaying today's requirements, press the CANCEL button. To display the list of jobs that have requirements to be fulfilled today, press the OK button. The system displays an appropriate message under the following conditions:

If no requirements were found that needed to be satisfied today for the selected CMC, resource ID, or inventory site, an appropriate message is displayed. Respond to the message by pressing OK.

If an invalid resource ED is entered, an error message is displayed. Respond to the message by pressing OK.

If the Filter Requirements By check box is selected and neither a resource ID nor an inventory site is entered, an error message is displayed. Respond to the message by pressing OK.

If no errors are found, the JOBS window as shown in Fig. 153 is displayed.

This window displays a list of open jobs, prints, and steps, within the scope selected, that have material requirements that need to be satisfied today. To the view the requirements, double-click a job, print, or step or move the marquee to it and press ENTER. The NEEDED REQUIREMENTS for JOB xxxx window as shown in Fig. 154 is displayed, where xxxx is the selected job number.

The Active Filters frame displays the filters used to display the requirements. The Totals frame displays the total Million Conductor Feet (MCF) and/or Fiber Kilo Feet (FKF) needed for all the requirements shown and the total MCF and/or FKF currently selected.

The grid displays the material requirements within the job, print, or step (depending on the selection from the JOBS window) that are in the "needed" status and have an order date which is prior to or equal to the current date. The following information is displayed for each material requirement:

Print - The job print for which the requirement is needed.

Step - The job step for which the requirement is needed.

Inventory Found (abbreviated Inv) - A symbol here indicates that there is available inventory that could be used to satisfy the requirement. Discussion of this field is deferred to Business Solution II.

Material Description - The description of the material needed.

Quantity - The quantity of material needed to do the work.

Custom Features (abbreviated CF) - A symbol here indicates that custom features (e.g., inside pulling eye) are needed or could be added to the required material. If a symbol is not present, the required material cannot have custom features added to it. See discussion under View or Update Custom Features.

RESID - The resource ID responsible for the work.

Roadblocks (abbreviated RB) - A symbol here indicates that roadblocks (critical or non-critical) exist that may delay the work.

Aggregation Code (abbreviated Agg Code) - A code indicating at what level the requirement may be aggregated. This code was provided at the time the requirement was encoded. Values are:

J - The requirement may be aggregated within the job. This is the default value.

S - The requirement may be aggregated within the step.

N - The requirement may not be aggregated.

Jeopardy Indicator (abbreviated JP) - An asterisk (*) here indicates that, if ordered, the material may not be delivered by the on job date because the delivery interval is too long (Order Date + Delivery Interval > On Job Date). A requirement is also considered in jeopardy if the needed material is no longer orderable.

On Job Date - The date that the material is needed on the job (Scheduled Start Date - On Job Interval).

Inventory Site - The inventory site responsible for procuring the material.

Work Environment (abbreviated WE) - The work environment for which the material is needed (e.g., B = buried).

Work Action - The type of work for which the material is needed (e.g., PLAC = placing).

Not Orderable Indicator (abbreviated NO) - An asterisk (*) here indicates that the needed material is no longer orderable because the material item has been end-dated.

Assembly Code (abbreviated AC) - A code indicating that the material needed is part of an assembly.

MCF/FKF - The MCF of copper cable or the FKF of fiber cable needed. This field is populated only if the requirement is for cable.

SHOW A JOB'S NEEDED REQUIREMENTS

Instead of viewing only those requirements that need to be ordered today, you may view all the needed requirements for a specific job.

To view the needed requirements for a specific job, press the Show A Job's Needed Requirements toolbar button located on the Materials Management application window or select "Show a Job's Needed Requirements..." from the Requirements menu. The SHOW A JOB'S NEEDED REQUIREMENTS dialog is displayed (See Fig. 155). This function is available only if you are a Materials Management manager or clerk and you have the authority to order material.

This dialog allows you to select the scope for which needed material requirements should be displayed. The following information must be provided:

CMC - Select or type a Construction Management Center (CMC) name in the CMC combo box, which contains a list of all CMCs in the states for which you may order material. This field defaults to the CMC you selected as your default CMC on the PREFERENCES window, which is described later in this document. If the selected CMC default is not in a state for which you may order material, this field defaults to the first CMC listed in the CMC drop-down list. If a CMC is entered that is not in the list, the system displays an appropriate error message. Respond to the message by pressing OK.

Job Number - Type a job number in the Job Number text box.

Optionally, you may select the Filter Requirements By check box to display only certain requirements within the selected job. If the job number is valid and has been approved, select one or more of the following choices:

Print - To display only requirements for a specific print within the job, select or type a print number in the Print combo box, which contains a list of valid prints for the selected job. If a print is entered that is not in the list, the system displays an appropriate error message. Respond to the message by pressing OK.

Step - To display only requirements for a specific step within the job, select or type a print number in the Print combo box, then select or type a step number in the Step combo box, which contains a list of valid steps for the selected print. If a step is entered that is not in the list, the system displays an appropriate error message. Respond to the message by pressing OK.

Resource ID - To display only requirements that are assigned to a specific resource ID within the job, type a resource ID in the Resource ED text box.

To get help while on this dialog, press the HELP button. If you don't know the job number or only know part of it, you may leave the Job Number text box empty or type a partial job number using an asterisk (*) to search for job numbers starting and/or ending with the portion you provided. For example, 45L* searches for job numbers starting with "45L"; *100 searches for job numbers ending in "100"; 45*00 searches for job numbers starting with "45" and ending in "00". To display the SEARCH FOR A JOB dialog as shown in Fig 156, press the SEARCH button.

This dialog allows you to view a list of all the job numbers for the identified scope. To run the search, press the UPDATE LIST button. The system displays an appropriate message under the following conditions:

If an invalid CMC is entered, an error message is displayed. Respond to the message by pressing OK.

If the job number does not exist in the CMC specified or has not been approved, an error message is displayed. Respond to the message by pressing OK.

If an invalid resource ID is entered, an error message is displayed. Respond to the message by pressing OK.

If no jobs were found that had material requirements in the "needed" status for the selected CMC, job, and/or resource ID, an informative message is displayed. Respond to the message by pressing OK.

If no errors are found, the Job Number grid is updated with a list of approved jobs which have needed requirements that meet the specified criteria.

To change the scope from the SEARCH FOR A JOB dialog provide the following information and press the UPDATE LIST button.

CMC - Select or type a new CMC name in the CMC combo box, which contains a list of all CMCs in the states for which you may order material. This field is required and defaults to the CMC selected on the SHOW A JOB'S NEEDED REQUIREMENTS dialog. If a CMC is entered that is not in the list, the system displays an appropriate error message. Respond to the message by pressing OK.

Job Number - Type a new job number in the Job text box. You may type an entire job number to display a particular job number or you may type a partial job number using an asterisk (*) to view job numbers starting and/or ending with the portion you provided. This field defaults to the job number entered on the SHOW A JOB'S NEEDED REQUIREMENTS dialog if one was entered.

Resource ID - To view a list of jobs for a particular resource ID, type a resource ID in the Resource ID text box. This field defaults to the Resource ID entered on the SHOW A JOB'S NEEDED REQUIREMENTS dialog if one was entered.

To get help while on this dialog, press the HELP button. To close the dialog without running a search or selecting a job number, press the CANCEL button.

To work with a particular job, select it and press the OK button or double-click it. The job number selected is copied to the Job Number text box on the SHOW A JOB'S NEEDED REQUIREMENTS dialog and the Resource Id is also populated if it was used as part of the search criteria. You may now filter the requirements to be displayed by print, step, or resource ID as described earlier.

To display the specified requirements, press the OK button. The system displays an appropriate message under the following conditions:

If the job number does not exist in the CMC specified or has not been approved, an error message is displayed. Respond to the message by pressing OK.

If the Filter Requirements By check box is selected and the job print does not exist, an error message is displayed. Respond to the message by pressing OK.

If the Filter Requirements By check box is selected and the job step does not exist, an error message is displayed. Respond to the message by pressing OK.

If the Filter Requirements By check box is selected and an invalid resource ID is entered, an error message is displayed. Respond to the message by pressing OK.

If no material requirements were found in the "needed" status for the selected CMC, job, print, step, and/or resource ID, an informative message is displayed. Respond to the message by pressing OK.

If no errors are found, the NEEDED REQUIREMENTS FOR JOB xxxx window as shown in Fig. 157 is displayed, where xxxx is the specified job number.

The grid in this window displays the requirements for the job, print, step, or resource ID, depending on the scope selected, that are in the "needed" status. No consideration is made of when the material should be ordered (i.e., the requirement may not have an order date or it may have an order date prior to, subsequent to, or equal to the current date).

Once displayed, the NEEDED REQUIREMENTS window allows you to view, add, or update custom material features, view roadblocks, or select requirements to order as described on the following pages.

VIEW ROADBLOCKS

A symbol appears in the Roadblock column (abbreviated RB) if the substep for which the requirement exists has any roadblocks. To view the roadblock(s), double-click the symbol or use the arrow keys to move the marquee to it and press ENTER. The ACTIVE ROADBLOCKS dialog as shown in Fig. 158 is displayed.

This dialog displays the roadblocks that may prevent a substep from being worked. They are included here as an aid in determining whether or not the material should be ordered yet. The grid displays the following information for each roadblock:

Description - The description of the roadblock.

Expected Clearance Date - The date the roadblock is expected to be cleared.

Critical Indicator - An asterisk (*) here indicates that the roadblock is of a critical nature.

The Additional Details frame displays the following information about the roadblock that currently has the marquee:

Employee Name - The name of the person who created the roadblock.

Remarks - Any remarks that are associated with the roadblock.

To get help while on this dialog, press the HELP button. To close this dialog, press the CLOSE button.

VIEW OR UPDATE CUSTOM FEATURES

A symbol appears in the Custom Features column (abbreviated CF) if a requirement does not currently have custom features but can have them added. To add custom features now, double-click the symbol or use the arrow keys to move the marquee to it and press ENTER.

A symbol appears in the Custom Features column (abbreviated CF) if a requirement has custom material features that may be edited. To view or change these custom features, double-click the symbol or use the arrow keys to move the marquee to it and press ENTER.

A symbol appears in the Custom Features column (abbreviated CF) if a requirement has custom material features that may not be edited. To view these custom features, double-click the symbol or use the arrow keys to move the marquee to it and press ENTER.

The CUSTOM FEATURES dialog is displayed. This dialog displays the custom material features that were placed on the requirement at encoding time by an Outside Plant Engineer or added by either the Customer Service Team or the Marketing Provisioning Team before the requirement was ordered. Custom material features are features that should be added by a BST warehouse or outside vendor before the material is shipped to its designated location. The custom features displayed will vary with the type of material required.

If the requirement selected is for cable, the dialog displays the custom features associated with cable as shown in Fig. 159. Information includes whether or not the requirement needs pulling eyes, prepped ends, preterminations, a taper splice, gas pressure, or modular connections. While on this dialog, you can add or remove pulling eyes, remove pre-terminations, remove prepped-ends, remove modular connections, or add or remove a taper splice.

If the requirement selected is a capacitor, the dialog displays the custom features associated with capacitors as shown in Fig. 160. Information includes the microfarads and/or ohms required. If viewing capacitor custom features, no changes may be made.

If the requirement selected is a non-standard pedestal cross-box, the dialog displays its configuration as shown in Fig. 161. Information includes the size and length of each stub and the connections between the feeder pairs and distribution pairs inside the cross-box. If viewing cross-box custom features, no changes may be made.

If the requirement selected is a non-standard pole-mounted cross-box, the dialog displays its configuration as shown in Fig. 162. Information includes the size and length of each stub and the connections between the feeder pairs and distribution pairs inside the cross-box. If viewing cross-box custom features, no changes may be made.

To get help while on this dialog, press the HELP button. If viewing cable custom features, press the OK button to close the dialog and save any changes made or press the CANCEL button to close the dialog without saving the changes. If viewing non-cable custom features, press the CLOSE button to close the dialog.

SATISFY REQUIREMENTS WITH AN ORDER

Individually select each requirement that you wish to satisfy or select them all by pressing the Select All toolbar button located on the NEEDED REQUIREMENTS window or choose "Select All" from the Actions menu.

To deselect all the selected requirements, press the Deselect All toolbar button located on the NEEDED REQUIREMENTS window or choose "Deselect All" from the Actions menu. As requirements are selected and deselected, the total MCF of copper cable selected and the total FKF of fiber cable selected are calculated and displayed in the Totals frame.

To satisfy the selected requirements with an order, press the New Order toolbar button located on the NEEDED REQUIREMENTS window or select "Satisfy Requirements" and then select "with a New Order..." from the Actions menu. The system displays a message when one or more of the following conditions are met:

If a selected requirement needs material that is no longer orderable, a warning message is displayed. Respond to the message by pressing YES if you wish to continue creating the new order or NO if you do not want to continue creating the new order.

If a selected requirement has a critical roadblock, a warning message is displayed. Respond to the message by pressing YES if you wish to continue creating the new order or NO if you do not want to continue creating the new order.

If a selected requirement is in jeopardy of not arriving by the time the material is needed on the job, a warning message is displayed. Respond to the message by pressing YES if you wish to continue creating the new order or NO if you do not want to continue creating the new order.

If a selected requirement has an assembly code but all requirements with the same assembly code have not been selected, an interrogative message is displayed. To order requirements with an assembly code, you must order all requirements with the same assembly code. Also, if one of the items in the assembly is not orderable, none of the items in the assembly may be ordered. Respond to the message by pressing YES if you want the system to select the requirements having the same assembly code and continue creating the new order or NO if you do not want to continue creating the new order.

If a selected requirement causes the CMC's yearly budgeted MCF or FKF to be exceeded, a warning message is displayed. Respond to the message by pressing YES if you wish to continue creating the new order or NO if you do not want to continue creating the new order.

If you choose to continue, those items that are no longer orderable are deselected and the non-selected assembly items are added to the list of items to be ordered. Next, a process runs to group these material requirements into one or more orders.

Multiple orders are created when one or more of the following conditions are met:

When the Ship To address of the selected requirements are different. The material needed on a requirement is normally shipped to the inventory site responsible for procuring the material unless an alternate shipping address was specified at the time the requirement was encoded. An entire order must be shipped to the same location. Therefore, an order must consist of those requirements that are to be shipped to the same inventory site or those that are to be shipped to the same alternate address.

When the exception geographic location code (GLC) of the selected requirements are different. Exception GLCs are encoded for a substep when central office equipment (COE) is needed. An entire order must be associated with one GLC OrderMaster obtains the GLC from the Requestor Authority Number (RAN) on the order unless an exception GLC is provided. Therefore, if a requirement has an exception GLC, only those requirements having the same exception GLC may be placed on the same order.

When the selected requirements have different assembly codes. An assembly code is encoded on a substep to indicate that items having the same assembly code must be ordered together. An entire order must be for the same assembly code and cannot consist of non-assembly code items. If one of the items within the assembly is for an XPIDed item the XPIDed item must be the first item on the order followed by the other items within the assembly (XPID or non-XPID). An XPIDed item is a material item whose Product Identifier (PID) starts with the letter "X". An XPID is a template that "expands" into several PIDed items once the order is received in CAPRI. Each individual item can be supplied by different vendors. The final product is assembled by a single vendor and shipped to the final destination as a single unit.

When one of the selected requirements is for an XPIDed item with no assembly code. Since CAPRI will assume all items following an XPID are add-on items to the XPID template, all XPIDed items that are not part of an assembly must be placed on an order by themselves.

When an order would have over twenty (20) items on it. The twenty item limit per order is a requirement of the method by which the system interfaces with OrderMaster. It may be possible to select more than 20 requirements since aggregation may reduce the number of order items created.

Multiple order items may be created within an order due to aggregation. The above rules that determine if multiple orders are created are applied before requirements are aggregated. In general, the aggregation rules apply only to the items selected to be ordered with the exception of one rule, which will be noted later. Each rule is dependent on the other rules. Meeting a single condition for aggregation does not imply that the requirement will be aggregated. The basic aggregation rules are as follows:

Material requirements will not be aggregated across jobs, but can be aggregated across steps within a job or within a step.

Substeps requiring like material (cable or non-cable), shipped to the same address, and having the same order date can be aggregated within a job.

If a substep explicitly indicates that its material requirements should not be aggregated across steps (aggregation code = "S"), it can still be aggregated within the step.

If a substep explicitly indicates that its material requirements should not be aggregated (aggregation code = "N"), no aggregation rules are applied and the substep will not be aggregated.

A substep needing custom features will not be aggregated with another substep needing custom features. However, a substep needing custom features can be aggregated with a substep that does not need custom features.

A substep requiring pulp cable (subcategory - pulp) can be aggregated within a step, but will not be aggregated across steps.

A substep requiring preterm cable can be aggregated within a step, but will not be aggregated across steps.

A substep requiring fiber cable (category = cable-fiber) can be aggregated within a step, but will not be aggregated across steps.

A substep requiring cable with a modular connection (connex cable) will not be aggregated.

A substep requiring a prepped end will not be aggregated.

Substeps requiring cable with a pulling eye at both ends of the cable will not be aggregated.

A substep requiring a non-standard cross-box will not be aggregated.

Substeps containing assembly codes will not be aggregated.

When aggregating cable, as many substeps can be aggregated within a job as possible until the maximum reel length is exceeded. The substep that caused the maximum reel length to be exceeded will be aggregated to the next order item. (i.e., a substep will not be split across order items).

Substeps that are to be ordered direct to code (Central Office Equipment and those substeps that have been explicitly marked "Direct To Code") will not be aggregated.

A substep that cannot be aggregated will exist as an order item by itself.

As stated earlier, the basic aggregation rules apply only to the requirements selected to be ordered. The following aggregation rule applies to requirements that have not been selected.

Substeps requiring like cable material (copper or fiber), shipped to the same address, and whose order dates are less than 30 days from the date that the material is actually ordered can be aggregated within a step. This rule is referred to as the In Step Cable Aggregation rule. The number of days used to calculate whether or not a substep meets the In Step Aggregation Rule is set as an operations profile. Its parameter is In StepAgggregationDayDur and defaults to 30 days.

To implement the In Step Cable Aggregation rule, the system searches for other substeps within the selected job step that meet the basic aggregation rules and whose order dates are a specified number of days from the current date. Any substep found that meets this criteria is aggregated to the selected requirement. If requirements from more than one job step have been selected, the system first aggregates the selected requirements according to the basic aggregation rules. It then applies the In Step Cable Aggregation rule, starting its search with the job step of the last selected requirement to be aggregated.

After the requirements have been pre-processed, the GENERATE ORDER for Job xxxx window is displayed, where xxxx is the job whose requirements you are ordering. If multiple orders were created, both the ORDERS window and the GENERATE ORDER window as shown in fig. 163 are displayed.

The GENERATE ORDER window allows you to view and change an order before sending it to OrderMaster. The ORDERS window displays a list of the orders created. It displays the preliminary order number assigned to each order. The first order listed in the ORDERS window is automatically displayed when the ORDERS window is displayed. Double-clicking or moving the marquee with the arrow keys and pressing ENTER on another order in the ORDERS window displays that order.

The following information is displayed at the top of the GENERATE ORDER window:

Due Date - The date the order is due at the Ship To location. It is equal to the earliest on job date of the requirements to be ordered.

Totals - The total MCF and/or FKF on the order.

In addition, there are four tabs on the GENERATE ORDER window: Line Items, Order Options, Order Remarks, and Ship To.

The Line Items tab as shown in Fig. 164 displays all items on the order.

The following information is displayed for each line item:

Material Description - The description of the material to be ordered.

Quantity - The quantity to be ordered.

Inventory Site - The inventory site responsible for procuring the material. It is also the inventory site to which the order will be shipped if an alternate address is not specified.

Custom Features (abbreviated CF) - A symbol here indicates that the material is being ordered with custom features.

Jeopardy Indicator (abbreviated JP) - An asterisk (*) here indicates that the material may not be delivered by the on job date (Order Date + Shipping Interval > On Job Date).

Aggregation Indicator (Abbreviated Agg) - A symbol here indicates that the order item consists of two or more aggregated material requirements. If a symbol is not present, the order item consists of a single material requirement.

Assembly Code (abbreviated AC) - A code indicating that the order item is part of an assembly.

PID - The Product Identifier of the ordered item.

You may add remarks for each line item by moving the marquee to a line item and typing remarks in the Line Item Remarks text box.

DELETE A LINE ITEM

To delete one or more line items on this order, select them and press the Delete A Line Item toolbar button located on the GENERATE ORDER window or select "Delete Line Item" from the Actions menu. The system displays a message under the following conditions:

If you try to delete an item that is part of an assembly, an error message is displayed. Respond to the message by pressing OK.

If you try to delete the line item on an order containing only one item, an error message is displayed. Respond to the message by pressing OK.

VIEW CUSTOM FEATURES

A symbol appears in the Custom Features column (abbreviated CF) if the ordered item has custom material features. To view these custom features, double-click the symbol or move the marquee to it and press ENTER. The CUSTOM FEATURES dialog is displayed as shown earlier.

The only difference is that you cannot change the cable custom features from the GENERATE ORDER window. Press the CLOSE button to return to the GENERATE ORDER window.

VIEW OR CHANGE THE RESULTS OF AGGREGATION

A symbol appears in the Agg Ind column if more than one material requirement has been aggregated to an order item. To view the aggregated requirements, double-click the symbol or move the marquee to it and press ENTER. The AGGREGATED MATERIALS FOR THIS ORDER ITEM dialog as shown in Fig. 165 is displayed.

This dialog lists all of the requirements that were aggregated to the selected line item based on the requirements selected to be ordered from the NEEDED REQUIREMENTS window and the OSPCM aggregation rules stated previously.

The requirements listed in the Selected Requirements grid are those that were selected to be ordered from the NEEDED REQUIREMENTS window. The following information is displayed:

Aggregate - You may choose whether or not a requirement is aggregated to this order item by toggling its Aggregate check box.

Print - The job print for which this item is ordered.

Step - The job step for which this item is ordered.

Res ID - The resource ID responsible for the work.

Quantity - The quantity needed to satisfy the requirement.

The requirements listed in the Added Requirements grid are cable requirements that were either not selected or not available to be selected from the NEEDED REQUIREMENTS window but were added because of OSPCM's In Step Cable Aggregation rule. The following information is displayed:

Order - You may choose whether or not an added requirement is ordered at this time by toggling its Order check box.

Print - The job print for which this item is ordered.

Step - The job step for which this item is ordered.

Res ID - The resource ID responsible for the work.

Quantity - The quantity needed to satisfy the requirement.

To get help while on this dialog, press the HELP button. To close this dialog and ignore any changes made, press the CANCEL button. To close this dialog and save your changes, press the OK button. The system displays an error message if de-aggregation will cause the order to have more than 20 items. Respond to the message by pressing OK.

If no errors are found, the system de-aggregates the requirements that had their check box de-selected and displays the results on the GENERATE ORDER window as follows:

The Quantity column reflects the new order quantity of the selected order item.

Those requirements de-aggregated appear as new line items and those added requirements that were chosen not to be ordered are deleted from the order.

The Due Date of the order is re-calculated in case an added requirement having the earliest on job date was deleted from the order.

The Order Options tab as shown in Fig. 166 allows you to specify options that apply to the entire order.

You may take one or more of the following actions while on the Order Options tab:

Change the Due Date of the order - The Due Date defaults to the earliest On Job Date of the material requirements placed on the order. To change it, type a date greater than the current date in the Due Date text box. The system displays an error message if a date prior to or equal to the current date is provided or if an invalid date is entered. Respond to the message by pressing OK.

Mark the order as an emergency - To indicate that an order is an emergency, click the Emergency Order check box. If the order contains items that may be ordered from consignment stock, marking the order as an emergency causes the system to order the items as a non-PIDed item and to include an order item remark which states "Ship from Consignment" followed by the Product Identifier (PID) of the material needed. Any order item remarks entered by the user will be overwritten by this consignment remark.

Charge the order to another Responsibility Code - To charge the order to a responsibility code other than the one associated with the inventory site responsible for procuring the material, click the Charge To Alternate Responsibility Code (RCC) check box and type in a valid Corporate Table System (CORTS) responsibility code in the RCC text box.

The Order Remarks tab as shown in Fig. 167 allows you to enter remarks that apply to the entire order.

Remarks entered in the OrderMaster Remarks text box are recorded with the order and sent to OrderMaster. Remarks entered in the Additional Remarks text box are recorded with the order but are not provided to OrderMaster.

The Ship To tab as shown in Fig. 168 allows you to indicate where the entire order should be shipped.

This tab is pre-populated with the Ship To information that was entered when the requirement was encoded, but may be changed. You may select one of the following choices:

To ship the order to the inventory site responsible for procuring the material, click the STANDARD SHIPPING ADDRESS radio button. This is the default Ship To location unless an alternate Ship To location was encoded with the requirement.

To ship the order to an alternate inventory site, click the ALTERNATE INVENTORY SITE radio button and type or select an inventory site from the Alternate Inventory Site combo box, which contains a list of all inventory sites located within the slate responsible for the job, excluding warehouse sites and RCOE sites. If an inventory site is entered that is not in the list, the system displays an appropriate error message. Respond to the message by pressing OK.

To ship the order to an alternate address (e.g. 345 3rd Street), click the ALTERNATE SHPPING ADDRESS radio button followed by the SAVED ADDRESSES button. The SAVED ADDRESSES dialog as shown in Fig. 169 is displayed.

The Saved Address list box lists all of the alternate addresses currently stored in the system. By default, the first code in the list is selected.

To ship the order to a saved address, select one from the list box. If the address you need is not listed, you may create a new alternate address by pressing the NEW button as described later in this document.

To get additional help while on this dialog, press the HELP button. To close this dialog and not use the selected address, press the CANCEL button. To close this dialog and use the selected address, press the OK button. If OK is pressed, the address associated with the selected code is copied to the alternate address fields on the GENERATE ORDER window.

The following buttons are also available from the SAVED ADDRESSES dialog:

VIEW - To view the address associated with a code, select one from the list box and press the VIEW button. The VIEW ADDRESS dialog as shown in Fig. 170 is displayed.

This dialog displays the address associated with the code selected. To get help while on this dialog, press the HELP button. To close this dialog, press the CLOSE button.

EDIT - To edit the address associated with a code, select one from the list box and press the EDIT button. The EDIT ADDRESS dialog as shown in Fig. 171 is displayed.

You may modify the contact name, contact phone, company, street, room, city, state, or zip.

To get help while on this dialog, press the HELP button. To close this dialog without saving the changes made, press the CANCEL button. To close this dialog and save the changes made, press the OK button. The system displays a message under the following conditions:

If both the contact name and the company name are blank, an error message is displayed. Respond to the message by pressing OK, If the contact phone, street, city, state, or zip code are blank, an error message is displayed. Respond to the message by pressing OK.

If the contact phone or zip code are incomplete, an error message is displayed. Respond to the message by pressing OK.

NEW - To add a new alternate address, press the NEW button. The CREATE NEW ADDRESS dialog as shown in Fig. 172 is displayed.

To add a new alternate address to which the order should be shipped, provide the following information:

Address Code - Type a code by which this address will be known. This code will appear in the Alternate Address drop down lists and will be available to anyone who wishes to store material at this location. Address Code must be provided.

Contact Name - Type the name of the person to whom the order should be shipped or the name of the person who should be notified of the shipment in the Contact Name text box. If Contact Name is not provided, Company must be provided.

Contact Phone - Type the phone number of the person to whom the order should be shipped or the phone number of the person who should be notified of the shipment in the Contact Phone text box. Contact Phone must be provided.

Company - Type the name of the company to which the order should be shipped in the Company text box. If Company is not provided. Contact Name must be provided.

Street - Type the street address to which the order should be shipped in the Street text box. Street must be provided.

Room - Type the room number to which the order should be shipped in the Room text box. Room is optional.

City - Type the name of the city to which the order should be shipped in the City text box. City must be provided.

State - Type or select the abbreviation of the state to which the order should be shipped in the State combo box, which contains a list of the nine BellSouth states. State must be provided. If a state is entered that is not in the list, the system displays an appropriate error message. Respond to the message by pressing OK.

Zip - Type the zip code to which the order should be shipped in the Zip text box. Zip must be provided. Format is nnnnn or nnnnn-nnnn, where n is a number between 0 and 9.

To get help while on this dialog, press the HELP button. To close this dialog without adding the new address, press the CANCEL button. To close this dialog and add the new address, press the OK button. The system displays a message under the following conditions:

If both the contact name and the company name are blank, an error message is displayed. Respond to the message by pressing OK.

If the address code, contact phone, street, city, state, or zip code are blank, an error message is displayed. Respond to the message by pressing OK.

If the contact phone or zip code are incomplete, an error message is displayed. Respond to the message by pressing OK.

If the address code entered already exists, an interrogative message is displayed asking you if you want to replace the old address with the new address. Press YES if you want to replace the address or press NO if you do not want to replace the address.

If the address code has the same name as an inventory site, an error message is displayed (e.g., you cannot have an alternate address code name "SWL" and an inventory site named "SWL"). Respond to the message by pressing OK.

SEND AN ORDER TO ORDERMASTER

To send an order and all of its order items to OrderMaster, press the Send Order To OrderMaster toolbar button located on the GENERATE ORDER window or select "Send Order to OrderMaster" from the Actions menu. The system displays an appropriate message under the following conditions:

If shipping the order to an alternate inventory site and an invalid alternate inventory site is selected, an error message is displayed. Respond to the message by pressing OK.

If shipping the order to an alternate address and any of the required fields are missing or incomplete (e.g., zip code), an error message is displayed. Respond to the message by pressing OK.

If specifying an alternate responsibility code to which the order should be charged (RCC) and no RCC or an invalid RCC is provided, an error message is displayed. Respond to the message by pressing OK.

If an invalid due date is provided, an error message is displayed. Respond to the message by pressing OK.

If ordering consignment material and the order is marked "emergency", a warning message is displayed indicating that any item remarks entered will be ignored and asking you if you wish to continue sending the order. Respond to the message by pressing YES if you wish to send the order or NO if you do not wish to send the order.

The order is sent to OrderMaster via a fixed length navigator contract. The contract was designed to be used by any system wanting to interface with OrderMaster. Because of this, the fields that are not provided by OSPCM will be populated with spaces to serve as place holders. The contract is made up of a header (data pertaining to the entire order) followed by 1 to n order items, where n cannot exceed 20.

The following information is sent to OrderMaster for each order:

System Id - The OSPCM System Identifier Its value is "MA". (Length: 2).

Sequence Number - A sequence number used by a batch process for reconciling OrderMaster orders placed after a navigator time-out has occurred. (Length = 40; Format: YYYYMMDDHHMMSSbTTTTTTTTTTbPPPPPPPPbOOObS, where YYYY = year, MM = month, DD = day of the month, HH = hour of the day, MM = minutes, SS = seconds, b = 1 blank, TTTTTTTTTT = 10 char Encoded Process TimeStamp, PPPPPPPP = 8 char Process ID, OOO = 3 char PseudoOrder Number, and S = Server Code (1 through 4)).

Common Userid - The common userid (CUID) of the person who placed the order. (Length: 8).

RAN - The requestor authority number which authorized the order. Its value is the RAN associated with the inventory site responsible for procuring the material. (Length: 7).

RCC - The responsibility code charged for the order. This field is blank if you did not provide an alternate RCC on the Order Options tab of the GENERATE ORDER window. If not provided, OrderMaster uses the responsibility code associated with the RAN. (Length: 8).

GeoLoc - The geographic location code (GLC) of where the items on this order will be placed in service This field is blank if not ordering central office equipment. If not provided, OrderMaster uses the GeoLoc associated with the RAN. (Length: 6 (5 characters; pad with spaces)).

State Code - The state responsible for this order. This field is always blank. (Length: 1).

Due Date - The date the order is due at the Ship To address. (Length: 8; Format: MMDDYYYY, where MM is the month, DD is the day, and YYYY is the year).

Not Before Date - The date before which the material should not be delivered. This field is always blank. (Length: 8).

Contact Name - Name of the person that should be contacted if there are any questions related to the order. This field is always blank. OrderMaster uses the CUID to determine the contact name. Note: This is not the contact name of the Ship To address. (Length: 25).

Contact Phone Number - Telephone number of the person that should be contacted if there are any questions related to the order. This field is always blank. OrderMaster uses the CUID to determine the contact phone number. Note: This is not the contact phone number of the Ship To address. (Length: 10).

Ship To Name - The name of the person or company to which the order should be shipped. This field is blank if an alternate ship address was not provided on the Ship To tab of the GENERATE ORDER window. If both a person's name and a company are specified, the person's name is provided to OrderMaster. If not provided, OrderMaster uses the Ship To Address associated with the RAN. (Length: 30).

Ship To Streetl - The street address to which the order should be shipped. This field is blank if an alternate ship address was not provided on the Ship To tab of the GENERATE ORDER window. If not provided, OrderMaster uses the Ship To Address associated with the RAN. (Length: 30).

Ship To Street2 - The room number to which the order should be shipped. This field is blank if a room number was not provided on the alternate address or if an alternate ship address was not provided on the Ship To tab of the GENERATE ORDER window. If not provided, OrderMaster uses the Ship To Address associated with the RAN. (Length: 15).

Ship to City - The city to which the order should be shipped. This field is blank if an alternate ship address was not provided on the Ship To tab of the GENE-RATE ORDER window. If not provided, OrderMaster uses the Ship To Address associated with the RAN. (Length: 20).

Ship To State - The state to which the order should be shipped. This field is blank if an alternate ship address was not provided on the Ship To tab of the GENERATE ORDER window. If not provided, OrderMaster uses the Ship To Address associated with the RAN. (Length: 2).

Ship To Zip - The zip code + US postal suffix to which the order should be shipped. This field is blank if an alternate ship address was not provided on the Ship To tab of the GENERATE ORDER window. If not provided, OrderMaster uses the Ship To Address associated with the RAN. (Length: 9; Format: 00000 or 000000000).

Truck Route - The truck route of the alternate shipping address. This field is always blank. (Length: 5).

Ref Doc - This field is always blank. (Length: 10).

Remarks - Remarks which apply to the entire order. This field is blank if no remarks were entered in the OrderMaster Remarks text box on the Order Remarks tab of the GENERATE ORDER window. (Length: 65).

Phrase Code - A code which is converted by REGIS into additional information for the order. This field is always blank. (Length: 4).

Phrase Information - This field is always blank. (Length: 10).

Debug Ind - A code which indicates whether debug mode should be turned on or off in OrderMaster. This field is used to investigate problems with the interface. (Length: 1; Valid Values: "Y" (turn debug mode on) or blank (turn debug mode off)).

The following information is sent to OrderMaster for each item:

Pseudo Order item Number - The OSPCM identifier of the ordered item. (Length: 3).

MU - Material Usage. Describes how and where the ordered item will be used. This field is blank if ordering a non-PIDed item; otherwise it is populated with a "20". A "20" is provided since OSPCM always provides an account to which the material is to be ordered and REGIS will not accept an accounting override if the MU is anything other than a "20". (Length: 2).

PID - The product identifier of the ordered item. This field is blank if ordering a non-PIDed item. (Length: 9).

Item Description - The material description of the ordered item. This field is blank if ordering a PIDed item. (Length: 40).

Quantity - The quantity of the material ordered for this item. This field is always greater than zero. (Length = 7).

Account - The field reporting code (FRO) or function code (FC) to which the item is ordered. If the item is ordered direct to code (if the material is central office equipment or if the substep was explicitly encoded with the direct to code indicator set to "Y"), this field is populated with the FRC of the substep for which the item is ordered; otherwise it is populated with an FC of F5C50. (Length: 5).

Business Purpose - A description of why this item was ordered. If this material was ordered for a job of type "routine" (ROU) or "plant work order" (PWO), this field is populated with "OSPCM Material for Job Number xxxx", where xxxx is the job for which the item was ordered. If this material was ordered for a job of type "estimate" (EST), this field is populated with "OSPCM Material for Estimate Number xxxx", where xxxx is the name of the job for which the item was ordered. If this material was ordered for a job of type "project" (PROJ), this field is populated with "OSPCM Material for Project xxxx", where xxxx is the job for which the item was ordered. (Length: 158).

Item Due Date - The date the ordered item is due at the Ship To location. This field is always blank. (Length: 8).

Job Nbr - The job for which the item was ordered. This field is blank if the job type for which the item was ordered is an "estimate" or a "project". (Length: 9).

Estimate Nbr - The job for which the item was ordered. This field is blank if the job type for which the item was ordered is a "routine" or "plant work order". (Length: 9).

Award # - This field is always blank. (Length: 14).

RBA # - This field is always blank. (Length: 9).

MIC - The Material Item Code for the item ordered. This field is blank if the item ordered is PIDed or if it is non-PIDed and ordered to an account other than F5C50. (Length: 10).

EXTC - Expenditure Type Code. This field is always blank. (Length: 5).

Remarks - Remarks that apply only to the ordered item. This field is blank if no remarks were entered in the Line Item Remarks text box on the Line Items tab of the GENERATE ORDER window unless you placed an emergency consignment order. (Length: 35).

Phrase Code - A code which is expanded by REGIS to convey additional item information. This field is always blank. (Length: 4).

Phrase Information - This field is always blank. (Length: 10).

CSI - The customer service indicator code. This field is always populated with "MA". (Length: 2).

CSI Order Number - The Order Number for the CSI. This field is populated with the job for which this item was ordered. (Length: 20).

CSI Line Number - The item sequence number of the CSI order number. This field is always blank. (Length: 3).

DSTN - A code which indicates that the ordered item is an emergency. This field is blank if the Emergency check box is not clicked on the Order Options tab of the GENERATE ORDER window. (Length: 1; Valid Values: "E" (emergency) or blank (non-emergency)).

Substitution Ind - A code which indicates that another item can be substituted for the ordered item. This field is always blank. (Length: 1).

Backorder Ind - A code which indicates that the item should be backordered if not currently in stock. This field is always blank. (Length: 1).

Vendor Part Number - The part number assigned by the vendor for the ordered item. This field is always blank. (Length: 20).

Suggested Vendor - The name of the vendor suggested by the client. This field is always blank. (Length: 35).

Unit - The description of the disbursing unit (e.g., ft, ea) (Length: 2).

Print Nbr - The job print for which the item was ordered. This field is blank if the ordered item is non-PDDed. (Length: 4).

Step Nbr - The job step for which the item was ordered. This field is blank if the ordered item is non-PIDed. (Length: 6).

Pulling Eye - Indicates that a pulling eye is desired on the inside end of the cable, outside end of the cable, or on both ends of the cable. (Length: 1; Valid Values: "I" (inside pulling eye), "O" (outside pulling eye), "B" (inside and outside pulling eye), blank (no pulling eye)).

Gas Pressure - Identifies that the cable should be sealed to maintain gas pressure. (Length: 1; Valid Values: "Y" (gas pressure) or blank (no gas pressure)).

Preterm - Indicates that preterm cable is required. (Length: 1; Valid Values: "Y" (preterm) or blank (non-preterm)).

Taper Splice - Indicates that the cable requires a taper splice. (Length: 1; Valid Values: "Y" (taper splice) or blank (no taper splice)).

Microfarads - Identifies the microfarads of a capacitor. (Length: 4 (decimal places)).

Ohms - Identifies the ohms of a capacitor. (Length: 4 (decimal places)).

Inside Mod Con - The code that represents the modular connection needed on the inside end of the cable. (Length: 4).

Outside Mod Con - The code that represents the modular connection needed on the outside end of the cable. (Length: 4).

Inside Prepped End Length - Indicates the length, in inches, that needs to be prepped on the inside end of the cable. (Length: 4).

Inside Prepped End Code - The AT&T comm code indicating the length that needs to be prepped on the inside end of the cable and the pair size of the cable. For a prepped end length of 48 inches, pass a comm code of 106797194 to OrderMaster if the cable has 200 pairs or fewer and pass a comm code of 106797202 to OrderMaster if the cable has more than 200 pairs. For a prepped end length of 100 inches, pass a comm code of 105467658 to OrderMaster if the cable has fewer than 900 pairs and pass a comm code of 105467666 to OrderMaster if the cable has more than 900 pairs. (Length: 9).

Outside Prepped End Length - Indicates the length, in inches, that needs to be prepped on the outside end of the cable. (Length: 4).

Outside Prepped End Code - The AT&T comm code indicating the length that needs to be prepped on the outside end of the cable and the pair size of the cable. For a prepped end length of 48 inches, pass a comm code of 106797194 to OrderMaster if the cable has fewer than 200 pairs and pass a comm code of 106797202 to OrderMaster if the cable has more than 200 pairs. For a prepped end length of 100 inches, pass a comm code of 105467658 to OrderMaster if the cable has fewer than 900 pairs and pass a comm code of 105467666 to OrderMaster if the cable has more than 900 pairs. (Length: 9).

Cross Box Code - Identifies when a cross-box requires a non-standard configuration and indicates the type of cabinet needed. (Length: 1; Valid Values: "S" (single-sided pedestal cabinet), "D" (double-sided pedestal cabinet), "P" (pole-mounted cabinet), or blank (cross-box is not needed)).

Stub ID - The identifier of the stub. This field is always blank if the Cross Box Code is blank. (Length: 1; Valid Values: 1 - 6 (used when referring to a pedestal cabinet), A - D (used when referring to a pole-mounted cabinet)).

Pair Quantity - The number of pairs of wire in the stub (e.g., 600 refers to a 600 pair cable stub). This field is always blank if the Cross Box Code is blank; otherwise it may be populated if the pair-size was specified in the configuration of the cross-box. (Length: 4).

Stub Length - The length of the stub (e.g., 45 refers to a 45 foot stub). This field is always blank if the Cross Box Code is blank; otherwise it may be populated if the stub length was specified in the configuration of the cross-box. (Length: 3).

Feed Pair Begin ID - The beginning pair number for the feeder pair range (e.g., 1 indicates that pairs 1 through n should be designated as feeder pairs, where n is the feeder pair end id). This field is always blank if the Cross Box Code is blank; otherwise it may be populated if the feeder pairs were specified in the configuration of the cross-box. (Length: 4).

Feed Pair End ID - The ending pair number for the feeder pair range (e.g., 300 indicates that pairs n through 300 should be designated as feeder pairs, where n is the feeder pair begin id). This field is always blank if the Cross Box Code is blank; otherwise it may be populated if the feeder pairs were specified in the configuration of the cross-box. (Length: 4).

Dist Pair Begin ID - The beginning pair number for the distribution pair range (e.g., 301 indicates that pairs n through 301 should be designated as distribution pairs, where n is the dist pair end id). This field is always blank if the Cross Box Code is blank; otherwise it may be populated if the distribution pairs were specified in the configuration of the cross-box. (Length: 4).

Dist Pair End ID - The ending pair number for the distribution pair range (e.g., 600 indicates that pairs n through 600 should be designated as distribution pairs, where n is the dist pair begin id). This field is always blank if the Cross Box Code is blank; otherwise it may be populated if the distribution pairs were specified in the configuration of the cross-box. (Length: 4).

If OrderMaster detects a fatal error at the header level (i.e., an error that applies to the entire order such as invalid RAN), a message describing the error condition is returned to OSPCM, no items for that order are processed, and no "Q" number is assigned to the order.

If no fatal errors are found at the header level, OrderMaster returns the "Q" number assigned to the order and the "Q" sequence number assigned to each item that was successfully ordered or a message describing the reason an item was not successfully ordered (e.g. Invalid PID). If a fatal error occurs at the item level, the remaining items are processed. The only exception to this rule is when a fatal error occurs at the item level of a PID Explosion order (see below).

If OrderMaster rejects the entire order, the system displays the error message returned from OrderMaster. Respond to the message by pressing OK. OrderMaster will view the following conditions as critical header errors and will not process the order:

Invalid RAN - If the RAN is spaces or not known to REGIS, an error will occur. OrderMaster uses the REGIS RAN table to validate a RAN. Before the order can be placed, the inventory site's RAN must be corrected. Contact whomever maintains your Core Staff tables to make the change.

Invalid RCC - If the alternate RCC provided is not valid in SuperEdit/CORTS, an error will occur. Before the order can be placed, the Responsibility Code to which the order should be charged must be corrected on the Order Options tab of the GENERATE ORDER window.

RAN contains invalid data - If data associated with the RAN is invalid in SuperEdit/CORTS (e.g., the RC on the RAN is not a valid RC), an error will occur. Before the order can be placed, contact the Cost Office to correct the problem in RB-GIS.

Unable to access SuperEdit/CORTS, REGIS, or CAPRI - OrderMaster accesses SuperEdit/CORTS to perform various edits and retrieves data from both REGIS and CAPRI to process an order. If OrderMaster cannot access these systems, an error will occur. Try placing the order at a later time.

Unexpected error condition - If an unexpected error occurred in OrderMaster or while it was accessing SuperEdit/CORTS, REGIS, or CAPRI, an error will occur. Try placing the order at a later time.

Unable to process PID Explosion order - A PID Explosion order is an order that contains an XPIDed item. If OrderMaster cannot retrieve the XPID template or if the template is not in "EXPL" status, an error will occur. If a fatal error is encountered for any item on a PID Explosion order, the entire order is rejected rather than just the individual item.

If OrderMaster detects an error that applies to an item within the order, the ORDERMASTER ERRORS dialog as shown in Fig. 173 is displayed.

This dialog displays each item for which OrderMaster detected an error. The following information is displayed:

Line Item Number - The order item that was in error.

Error Message - The error message explaining why the item was not ordered.

OrderMaster will view the following conditions as critical item errors and will not process that item:

Invalid PID - If the FED is not valid, an error will occur. Before the order can be placed, the PID for the ordered material description must be corrected. Contact whomever maintains your Core Staff tables to make the change.

Order quantity is too large - If ordering a serialized non-cable item and the order quantity is greater than 499, an error will occur. Before the order can be placed, de-aggregate the requirements aggregated to this order item or have an engineer reduce the quantity needed on the substep for which the order was placed.

Invalid FC/FRC - If the Field Reporting Code (FRC) to which the item is ordered is invalid in CQRTS, an error will occur. Before the order can be placed, the FRC on the substep for which the material is ordered must be corrected.

Invalid MIC - If the Material Item Code (MIC) of the item ordered is invalid in CORTS, an error will occur. Before the order can be placed, the MIC for the ordered material description must be corrected. Contact whomever maintains your Core Staff tables to make the change.

To get help while on this dialog, press the HELP button. To close this dialog, press the CLOSE button.

After OrderMaster successfully processes the order, it routes each item on the order to either REGIS or CAPRI. OrderMaster routes an order item to CAPRI under the following conditions:

the item is part of a PID Explosion order, the item is non-PIDed, the item is cable that requires a prepped-end, the item is cable that requires a modular connection, the item is a cross-box that requires a non-standard configuration, or the item is a capacitor.

OrderMaster routes an order item to REGIS if the item is PIDed and also meets the following conditions:

it is not a capacitor, it does not require a non-standard cross-box configuration, it does not require a prepped-end, and it does not require a modular connection.

If OrderMaster fails to process the order (i.e., no items are ordered), an "X" appears beside the order in the ORDERS window. If OrderMaster successfully processes at least one item within the order, a check mark (V) appears beside the order in the ORDERS window and the preliminary order number is replaced with the assigned "Q" number.

For each item successfully ordered, the requirement(s) for which the item was ordered are put in an "ordered" status if its required quantity has been completely satisfied; otherwise, the requirement(s) will stay in a "needed" status. In addition, if ordering cable, the responsible CMC's year-to-date MCF or FKF is increased by the quantity ordered.

Occasionally, a time-out error will occur when you send an order to OrderMaster. If a time-out occurs, OSPCM does not know if your order was processed by OrderMaster. Because OrderMaster does not return a "Q" number in this situation, the system displays a message indicating that the order has been queued. Respond to the message by pressing OK. It is assumed that the order was processed. OSPCM saves the preliminary order and the requirements that were ordered are put into an "ordered" status until OSPCM is notified that the order was not processed.

To handle the problems associated with a time-out error. Procurement sends a batch file to OSPCM 3 times a day with all of the orders that were processed by OrderMaster since the last transmission. A file is sent at 10:00AM, 3:00PM, and 6:00PM. OSPCM processes each record in the file using the following business rules:

If a record contains a "Q" number that exists in OSPCM, OrderMaster processed the order and OSPCM received response that the order was placed (i.e., no time-out error occurred).

If a record contains a "Q" number that does not exist in OSPCM, the order was processed by OrderMaster and the time-out occurred before the "Q" number could be sent back to OSPCM. The "Q" number is matched to the appropriate preliminary order, the order is recorded in OSPCM, and the preliminary order is deleted.

Any preliminary order remaining after the file is processed and is at least one hour old was not processed by OrderMaster. The preliminary order is deleted and each associated requirement is put back in a "needed" status and, if its order date is less than or equal to the current date, marked ready to be fulfilled.

Display the SUMMARY FOR ORDER window, described later in this document, periodically to see if a "Q" number has been assigned to your order. For example, if you tried to place an order before 10:00AM, a "Q" number should have been assigned to the order sometime after 10:00AM if OrderMaster successfully processed the order. If a "Q" number has not been assigned, you should try to place the order again.

The process of sending orders to OrderMaster may be repeated for each order listed in the ORDERS window. To close the GENERATE ORDER window, double-click the control box located in the upper left-hand corner of the window. If the ORDERS window is not open and you attempt to close the GENERATE ORDER window before the order is sent to OrderMaster, the system displays a warning message indicating that the order has not been sent to OrderMaster and asking if you still want to close the window. Respond to the message by pressing YES if you want to close the window or NO if you do not want to close the window.

To close the ORDERS window, double-click the control box located in the upper left-hand corner of the window. Any open GENERATE ORDER, windows where the order has been sent to OrderMaster will also be closed. If you attempt to close the ORDERS window but have not sent all the orders to OrderMaster, the system displays a warning message indicating that there are orders that have not been sent to OrderMaster and asking if you still want to close the window. Respond to the message by pressing YES if you want to close the window or NO if you do not want to close the window.

Any order that was not sent to OrderMaster will need to be re-created by selecting those requirements again on the NEEDED REQUIREMENTS window.

When a job's, print's, or step's material requirements have been completely fulfilled, a check-mark appears to the left of the job, print, or step, respectively, in the JOBS window.

To close the NEEDED REQUIREMENTS window, double-click the control box located in the upper left-hand corner of the window. To close the JOBS window, double-click the control box located in the upper left-hand corner of the window.

PRINT AN ORDER

To print a copy of an order after it has been sent to OrderMaster, press the Printer Toolbar button on the Materials Management application window or select "Print" from the File menu while the order is still displayed in the GENERATE ORDER window. The PRINT dialog as shown in Fib. 174 is displayed.

This dialog allows you to print a report. The Reports grid contains a list of the available reports. The Copies text box sets the number of copies to print and defaults to 1. The Print to File check box allows you to save the report in a file instead of printing it on paper. The Printer text box displays your default printer. To change the printer, press the PRINTER button. The PRINT SETUP dialog as shown in Fig. 175 is displayed.

This is the Microsoft Windows Print Setup dialog that allows you to change your default printer.

To get help while on the PRINT dialog, press the HELP button. To close the dialog without printing, press the CANCEL button.

To print a copy of the current window as an image (aka screen print), select Print Form as Image from the Reports grid and press the OK button. An image of the GENERATE ORDER window is printed.

To print a material request report, select Material Request Report from the Reports grid and press the OK button. A Material Request report similar to the one shown on the following pages is generated.

MATERIAL REQUEST Page 1

MP-10311
By: John Doe, YZPLREW
Date: 08/14/1995 07:25:08 PM
Job: MA04RORD ORDERMASTER Number: QTHANH02 Order Date: 08/15/1995
Site: JOB Number: 58K07362N Due Date: 08/20/1995

**EMERGENCY ORDER**

---

GENERAL

RAN: 3069153
RCO: NN20C800
RCC: NN20C800
GeoLoc: 10035

TOTALS

MCF: 1.235
FKF: 56.123

SHIP TO:

CONSTRUCTION MANAGER
201 CHURCH ST
SEVIERVILLE, TN 378620000
Phone: (615) 693-9564

RECEIPT TO:

CONSTRUCTION MANAGER
201 CHURCH STREET
SEVIERVILLE, TN 378620000
Phone: (615) 693-9564

ORDER REMARKS

OrderMaster: Thanh test data for order_master nbr QTHANH02.

Additional: Additional remarks are recorded here.

MATERIAL REQUEST Page 1

MP-10311
By: John Doe, YZPLREW
Date: 08/14/1995 07:25:08 PM
Job: MA04RORD
Site:

ORDERMASTER Number: QTHANH02 Order Date: 08/15/1995
JOB Number: 58K07362N Due Date: 08/20/1995

**EMERGENCY ORDER**

---

ORDER LINE ITEMS

| Item<br>PID | Material Desc. | Qty<br>Unit | Mtl Usage<br>FC/FRC | JP MIC<br>REMARKS | Average Price |
|---|---|---|---|---|---|
| 0001 | ANMW-200<br>103266946 | 1000<br>FT | 20<br>F5C50 | * CA04850 | 138.00 |
| 0002 | SCX-1500A25-1<br>000000000 | 3<br>EA | 20<br>F5C50 | * TE51500 | 2245.84 |
| 0003 | BKTA-25<br>100024025 | 250<br>FT | 20<br>F5C50 | * CA02450 | 16.00 |
| 0004 | SCX01500A25-1<br>0987654321 | 4<br>EA | 20<br>F5C50 | * TE51500<br>THANH TEST-REMARK TEXT #4 | 2245.84 |
| 0005 | SCX01200A25CF<br>352001366 | 5<br>EA | 20<br>F5C50 | * TE51200<br>THANH TEST – LINE 5 --- 12345678901 | 1952.28 |
| 0006 | CAP100A10<br>247001019 | 60<br>EA | 20<br>F5C50 | AC01150<br>CAPACITOR MUST BE 1% TOLERANT | 235.66 |
| 0007 | CAP100A15<br>1234500890 | 70<br>EA | 20<br>F5C50 | AC01150<br>ALREADY ORDERED BY PHONE | 345.07 |

MATERIAL REQUEST

Page 3

MP-10311
By: John Doe. YZPLREW
Date: 03/14/1995 07:25:08 PM
Job: MA04RORD
Site:

ORDERMASTER Number: QTHANH02
JOB Number: 58K07362N
** EMERGENCY ORDER **

Order Date: 08/15/1995
Due Date: 08/20/1995

CUSTOM FEATURES (CABLE)

| Item | Material Desc | Pulling Eye | Preterm | Inside Prep End | Outside Prep End | Taper Splice | Gas Press | Inside Mod Conn | Outside Mod Conn |
|---|---|---|---|---|---|---|---|---|---|
| 0003 | BKTA-25 | IN | * | | | | | | |

CAPACITOR DETAIL

| Item | Material Desc | Microfarads | Ohms |
|---|---|---|---|
| 0006 | CAP100A10 | 0.1235 | 0.4568 |

CROSS BOX DETAILS

Item: 0002
Material Description: SCX-1500A25-I

| Pole-Mounted Cabinet | Stub Number | Pair Size | Stub Length | <======== COUNTS ========> Feeder Pairs | Dist. Pairs |
|---|---|---|---|---|---|
| TOP | A | 100 | 50 | [ 1 - 50 ] | [ 55 - 100 ] |
| | B | | | | |
| BOTTOM | C | | | | |
| | D | | | | |

CROSS BOX DETAILS

Item:: 0004
Material Description: SCXH-100UCF

| Pedestal Cabinet | Stub Number | Pair Size | Stub Length | <======== COUNTS ========> Feeder Pairs | Dist. Pairs |
|---|---|---|---|---|---|
| SINGLE | 1-L | 200 | 45 | [1 - 100] | [ 101 - 200 ] |
| | 2-C | | | | |
| | 3-R | | | | |
| DOUBLE | 4-L | | | | |
| | 5-C | | | | |
| | 6-R | | | | |

If the Print to File check box is checked when you press OK, the SAVE REPORT TO FILE dialog as shown in Fig. 176 is displayed.

This dialog allows you to identify where you would like to save the report. Select a drive and directory, then specify a file name for the report. Press OK to save the report in the specified file.

PRINT TODAY'S REQUIREMENTS

To print a report of today's requirements, select "Print Today's Requirements" from the Requirements menu. The PRINT TODAY'S REQUIREMENTS dialog as shown in Fig. 177 is displayed.

This dialog allows you to print a list of material requirements that need to be satisfied today. You must provide the following information:

CMC - Select or type a Construction Management Center (CMC) name in the CMC combo box, which contains a list of all CMCs in the states for which you may order material. This field defaults to the CMC you selected as your default CMC on the PREFERENCES window, which is described later in this document. If the selected CMC default is not in a state for which you may order material, this field defaults to the first CMC listed in the CMC drop-down list. If a CMC is entered that is not in the list, the system displays an appropriate error message. Respond to the message by pressing OK.

Optionally, you may select the Filter Requirements By check box to print only certain requirements within the selected CMC. Select one of the following choices:

Inventory Site - To print only requirements for a specific inventory site, select the Inventory Site radio button and select or type an inventory site name in the Inventory Site combo box, which contains a list of inventory sites for the specified CMC that currently have material requirements that need to be satisfied today. If an inventory site is entered that is not in the list, the system displays an appropriate error message. Respond to the message by pressing OK. Inventory Site is the default radio button.

Resource ID - To print only requirements that are assigned to a specific resource ID, select the Resource ID radio button and type a resource ID in the Resource ID text box.

To get help while on this dialog, press the HELP button. To close this dialog without printing the report, press the CANCEL button. To close this dialog and print the report, press the OK button. The system displays an appropriate message under the following conditions:

If no requirements were found that needed to be satisfied today for the selected CMC, resource ED, or inventory site, an informative message is displayed. Respond to the message by pressing OK.

If an invalid resource ID is entered, an error message is displayed. Respond to the message by pressing OK.

If the Filter Requirements By check box is selected and neither a resource ID nor inventory site is entered, an error message is displayed. Respond to the message by pressing OK.

If no errors are found, The PRINT dialog as shown in Fig. 178 is displayed.

This dialog allows you to print a report as described earlier. To get help while on the PRINT dialog, press the HELP button. To close the dialog without printing, press the CANCEL button.

To print a report of today's requirements, press the OK button. A Material Requirements to be Fulfilled Today report similar to the one shown on the following page is printed. The report is sorted by job number and inventory site.

MP-10312 MATERIAL REQUIREMENTS TO BE FULFILLED TODAY Page 1
FOR CMC: LSVL

By: John Doe, YZPLREW
Date: 04/24/1995 01:23:43 PM
Job: MA02RMFT
Site:

Job: 45L00118N

| PRINT | STEP | MATERIAL DESCRIPTION | QUANTITY | J P | ON JOB DATE | RESOURCE ID | INVENTORY SITE | C F | SCHEDULED ORDER DATE | R B |
|---|---|---|---|---|---|---|---|---|---|---|
| 1 | 2 | GFMW-400 | 200 | * | 04/30/1995 | KO36 | LOUE | * | 04/22/1995 | |
| 5 | 1 | 189B1-100/25 | 2 | | 04/25/1995 | KJ98 | LOUE | | 04/24/1995 | |
| 5 | 1 | 10B1-400/40 | 1 | | 04/28/1995 | KJ98 | LOUE | | 04/24/1995 | * |

Job: 45L00392N

| PRINT | STEP | MATERIAL DESCRIPTION | QUANTITY | J P | ON JOB DATE | RESOURCE ID | INVENTORY SITE | C F | SCHEDULED ORDER DATE | R B |
|---|---|---|---|---|---|---|---|---|---|---|
| 9 | 2 | BKMA-25 | 30 | * | 04/20/1995 | KO78 | LOUE | | 04/14/1995 | * |
| 9 | 2 | GFMW-25 | 200 | * | 04/21/1995 | MN09 | LOUE | * | 04/19/1995 | |

If the Print to File check box is checked when you press OK, the report is printed to a file as described earlier.

CALCULATE ORDER DATE

Each time the OSPCM scheduling process runs, if the scheduled start date of an activity is within ten weeks of the current date, a process is called to calculate the on job date and order date for the requirements that have a "needed" status within that scheduling activity. To perform these calculations, the process expects to receive both a scheduling activity and a scheduled start date. In addition, the process sets a flag to indicate that the requirement does not need to be fulfilled today. This flag may later be set to indicate that the requirement does need to be fulfilled today by the process that identifies today's requirements. That process is described in the next section.

A requirement's on job date is the date that the material is needed on the job. It is based on the number of days that the material should be available prior to the requirement's scheduled start date (On Job Date = Schedule Start Date - On Job Interval). The On Job Interval is an Operation Profile (OFF) parameter set at a CMC level. A CMC may have an On Job Interval set for both its Telco work and contract work. If not set, the region default, which is currently set at 7 days, is used. A requirement's order date is the date that the requirement should be ordered so that it is available when the job is scheduled to be worked. It is based on when the material is needed on the job and how long it takes to get the material delivered once the order is placed (Order Date = On Job Date - Delivery Interval). The delivery interval depends on the type of material needed and whether the material is stocked in a BST warehouse or must be ordered from an outside vendor. If the material can be ordered from either a warehouse or a vendor, the warehouse (stock) delivery interval will be used as the normal delivery interval.

If the material needed requires a particular custom feature, if a stub is needed, or if non-cable material is needed, special delivery intervals are calculated as follows:

| **Needed Material** | **Delivery Interval** |
|---|---|
| Non-cable or a stub | Normal delivery interval + 2 days |
| A non-standard cross-box (requires special configuration) | Normal delivery interval 4- 2 days + 4 weeks (Since a cross-box is non-cable, 2 days are added. If a non-standard cross-box is needed an additional 4 weeks (28 days) are added). |
| Prepped-end cable | Normal delivery interval + 7 days |
| Pre-term cable or a taper splice | 15 days |

In addition, the following business rules are enforced:

If the calculated order date or on job date falls on a weekend or a holiday, one day is subtracted from the date until a non-weekend or non-holiday date is reached.

If the needed material is no longer orderable (i.e., the material item has been end-dated), the order date is set equal to the current date. This will cause the requirement to be displayed when the current day's needed requirements are viewed so that you are notified that a new material description needs to be encoded when you try to order the material.

If the needed material is neither orderable as stock or non-stock (i.e., the material item has a stock code of "U" (unnecessary)), the order date is set equal to the current date. This will cause the requirement to be displayed when the current day's needed requirements are viewed so that you are notified that a new material description needs to be encoded when you try to order the material or that the stock code on the material item table needs to be updated to "S" (stock), "N"(non-stock), or "B"(both).

All items in an assembly receive the order date of the earliest item in that assembly. For example, if two requirements have an assembly code of "A" and the order date of one requirement is calculated to be 1/11/96 and the order date of the other requirement is calculated to be 1/19/96, both requirements receive an order date of 1/11/96.

RECEIPT ORDERED MATERIAL

To receipt ordered material into inventory, press the Receipt Ordered Material toolbar button located on the Materials Management application window or select "Receipt Ordered Material..." from the Orders menu. The OPEN ORDER FOR RECEIPT dialog as shown in Fig. 179 is displayed. This function is available only if you are a Materials Management manager or clerk and you have the authority to update inventory.

This dialog allows you to identify the shipments that you would like to receipt into inventory. Select one of the following options:

OrderMaster Number - To display shipments associated with an OrderMaster Number, click the OrderMaster Number radio button and enter a valid OrderMaster number in the associated text box.

Purchase Order Number - To display shipments associated with a purchase order number, click the Purchase Order Number radio button and enter a valid purchase order number in the associated text box.

Select Ticket Number - To display shipments associated with a select ticket number, click the Select Ticket Number radio button and enter a valid select ticket number in the associated text box.

To display shipments starting at a particular line item within an order, purchase order, or select ticket, click the Start at Line Item check box and type a line item number in the associated text box. For example, to display the last 3 line items for an order having 6 line items, enter a 4 in this field. By default, the system will start at line item 1.

If you want to display shipments associated with an OrderMaster Number, but don't know the OrderMaster Number, select the OrderMaster radio button and press the SEARCH button. The SELECT ORDER dialog as shown in Fig. 180 is displayed.

This dialog is used to search for orders for a particular inventory site. To search for orders, you must enter the following information:

Inventory Site - Type or select an inventory site name in the Inventory Site combo box which contains a list of all inventory sites in the states for which you can update inventory. If an inventory site is entered that is not in the list, the system displays an appropriate error message. Respond to the message by pressing OK.

Optionally, you may further limit the search by providing the following information:

1. Material Description – To search for orders for a particular material description, type a material description in the Material Description text box. You may type an entire material description or you may type a partial material description using an asterisk (*) to view orders for material starting and/or ending with the portion you provided. For example, AFAW* displays orders for material starting with "AFAW"; 100 displays orders for material ending in "100"; AW displays orders for material starting with "A" and ending in "W".

To get help while on this dialog, press the HELP button. To close the dialog without selecting an order, press the CANCEL button. To view a list of OrderMaster Numbers and its associated items, press the UPDATE button. The system displays an appropriate message under the following conditions:

1. If the material description entered is not a valid material description, an error message is displayed. Respond to the message by pressing OK.

2. If no orders were found for the selected inventory site or material description, an appropriate message is displayed. Respond to the message by pressing OK.

If no errors are found, the following information is displayed:

1. OrderMaster Number – The number assigned by OrderMaster to an order.
2. Line Item – The line item assigned by OrderMaster to an ordered item.
3. Material Description – The description of the material ordered.
4. Quantity – the quantity of material ordered.
5. Job Number – the job for which the material was ordered.

To view a particular order, select it and press the OK button or double-click it. The system displays an appropriate error message if you press OK and an order was not selected from the grid. Respond to the message by pressing OK.

If no errors are found, the OrderMaster number selected is copied to the OrderMaster Number text box on the OPEN ORDER FOR RECEIPT and the line item selected is copies to the Start at Line Item text box. To start viewing the order from this line item, click the associated check box; otherwise the system will display the order starting at the first line item.

To view the shipments associated with the specified order, purchase order, or select ticket press the OK button. The system displays an appropriate message under the following conditions:

1. If you do not have access to update inventory for the state in which the order was placed, an error message is displayed. Respond to the message by pressing OK.

2. If the identified OrderMaster number, purchase order number, or select ticket number does not exist, an informative message is displayed. Respond to the message by pressing OK.

3. If no Order Master number, purchase order number, select ticket number is entered, an error message is displayed. Respond to the message by pressing OK.

4. If the Order Master number identified has been cancelled or all the items starting with the line number specified are cancelled, a warning message is displayed. Respond to the message by pressing OK.

5. If the starting line item is other than "1" and the shipments to be displayed are for an assembly order, an error message is displayed indicating that you must display the shipments starting at the first line item. An assembly order is an order that has an XPIDed item as the first item on the order followed by other items that are to be assembled by various vendors and shipped as one unit to the inventory site. Respond to the message by pressing YES if you wish to continue by having the system display the shipments starting at the first line item or NO if you do not wish to continue. You must display all the shipments associated with an assembly order because you are only allowed to receipt the first item into inventory. The other items are receipted for you but are not added as inventory.

6. If the starting line item specified is larger than the number of line items on the order, an error message is displayed. For example, if you indicate that you want to start viewing an order starting at line item 3 and there are only 2 line items on the order, you will receive an appropriate error message. Respond to the message by pressing OK.

7. If the first character of the purchase order number entered does not begin with the letter "P", an error message is displayed. Respond to the message by pressing OK.

If no errors are found, the RECEIPT MATERIAL window as shown in Fig. 181 is displayed.

The RECEIPT MATERIAL window allows you to receipt ordered material into your inventory starting at the line item specified. If not specified, the order, purchase order, or select ticket is displayed starting with its first line item.

The OrderMaster number, purchase order number, or select ticket number is displayed in a text box above the grid on the left side of the window. If displaying shipments for a purchase order or select ticket, the associated OrderMaster number is displayed in a text box above the grid on the right side of the window.

The grid on this window contains a line for each ordered item on the selected order, purchase order, or select ticket (called the "order line") followed by a line for each associated shipment (called the "shipment line").

The following information is displayed on an order line:

1. Line Item – The line item of the order, purchase order, or select ticket.
2. Material Ordered – The description of the material ordered.
3. Quantity Ordered – The quantity of material ordered.
4. Custom Features (abbreviated CF) – A symbol here indicates that the material was ordered with custom features.

The following information is displayed on a shipment line:

1. Received Indicator – A click-mark here indicates that the shipment has been received into inventory.
2. Quantity Received – The quantity of material shipped or scheduled to be shipped or the quantity of material received into inventory following receipt of the shipment. If the shipment has been shipped from a BST warehouse, the quantity actually shipped is displayed. If the shipment has not yet been shipped, the quantity scheduled to be shipped is displayed. If the shipment is to be shipped from an outside vendor, the quantity actually shipped is never displayed since CAPRI does not furnish actual ship dates to OSPCM.
3. Serial Number – The serial number shipped from a BST warehouse or the serial number received into inventory following receipt of the shipment. This field is displayed only if the ordered material is serialized. If the shipment has been shipped from a BST warehouse, the expected serial number is displayed. If the shipment is to be shipped from an outside vendor, the serial number is not displayed because CAPRI does not furnish serial numbers to OSPCM. If the shipment has been received, the serial number that was received into inventory is displayed.
4. Reel Type – The type of reel the material was shipped on or the type of reel received into inventory following receipt of the shipment. This field is displayed only if the ordered material is cable. If the shipment has been shipped from a BST warehouse, the expected reel type is displayed. If the shipment is to be shipped from an outside vendor, the reel type is not displayed because CAPRI does not furnish reel types to OSPCM. If the shipment has been received, the reel type that was received into inventory is displayed.
5. Date Receipted – The date the shipment was received into inventory. Format: mm/dd/yyyy.
6. Backorder – An asterisk (*) here indicates that the shipment is on backorder in a BST warehouse.

7. Sub Item – An asterisk (*) here indicates that the material shipped, expected to be shipped, or received into inventory is different from the material ordered.

A shipment may be in one of four states:

1. Scheduled – A shipment is "scheduled" if OSPCM has received initial status information from either REGIS or CAPRI concerning the shipment (i.e., a select ticket or purchase order has been generated). It is denoted by the absence of a receipt date, the absence of a serial number (if serialized), the absence of a check-mark in the leftmost column of the grid, and the presence of a purchase order number or a select ticket number in the Additional Detail frame. All shipments from an outside vendor are "scheduled" shipments.

2. Shipped – A shipment is "shipped" if OSPCM has received notice that the associated select ticket has been loop closed in REGIS. It is denoted by the presence of a serial number (if serialized), the absence of a receipt date, the absence of a check-mark in the leftmost column of the grid, and the presence of a select ticket number in the Additional Detail frame. Currently, there is no way to visually distinguish between a "scheduled" shipment and a "shipped" shipment for non-serialized material.

3. Received – A shipment is "received" if the associated material has been received into inventory. It is denoted by the presence of a receipt date and the presence of a check-mark in the leftmost column of the grid.

4. Calculated – A shipment is "calculated" if OSPCM has not yet received initial status information from either REGIS or CAPRI or if a shipment is missing for an ordered item. It is based on the quantity that Procurement should supply. If the sum of the quantity scheduled to be shipped plus the quantity actually shipped plus the quantity received for an order item is less than the quantity that Procurement should supply, a calculated shipment line is created; otherwise it is not. If no shipment information has been received from REGIS or CAPRI, a shipment line equal to the quantity ordered is displayed. A calculated shipment is denoted by the absence of a receipt date, the absence of a check-mark in the leftmost column of the grid, and the absence of a purchase order or select ticket in the Additional Detail frame. If the RECEIPT MATERIAL window was opened via a Purchase Order or a Select Ticket, a calculated shipment line is never displayed because the entire order might not be displayed when using this method.

The Additional Detail frame below the grid displays additional information for the selected line in the grid. The Additional Detail frame displays the following information:

1. PO or S/T – The purchase order number or the select ticket number on which the material was shipped or is scheduled to be shipped. If the shipment is to be shipped from a BST warehouse, a select ticket number is displayed. If the shipment is to be shipped from an outside vendor, a purchase order number is displayed. This field is blank if no shipment details have been received from either REGIS or CAPRI.

2. Line Item – The purchase order line item or, if a select ticket is displayed, the OrderMaster line item. This field is blank if no purchase order or select ticket is displayed.

3. Bin Loc – The location of the material in the inventory yard. This field is blank if the responsible inventory site is not using bin locs to organize its inventory.

4. Ship Date – If the shipment is scheduled to be shipped from a BST warehouse, the date the shipment is scheduled to be shipped is displayed here. If the shipment is scheduled to be shipped from an outside vendor and the vendor provides a shipment date to CAPRI, the date the shipment is scheduled to be shipped is displayed here. If the vendor does not provide a shipment date, this field is blank. If the shipment was shipped from a BST warehouse, the date the shipment was actually shipped from the warehouse is displayed here.

5. Order Item remarks – The item remarks entered at the time the order was placed. If no remarks were entered, this field is blank.

6. Receipt Item remarks – Remarks pertaining to the receipt of this shipment. The remarks are recorded with the inventory transaction created at receipt time. If no remarks were entered, this field is blank.

VIEW CUSTOM FEATURES

A symbol appears in the Custom Features column (abbreviated CF) of an order line if the ordered item has custom material features. To view these features, double-click the symbol or use the arrow keys to move the marquee to it and press ENTER. The CUSTOM FEATURES dialog is displayed. The custom features displayed will vary with the type of material.

If the ordered item selected is cable, the dialog displays the custom features associated with cable as shown in Fig. 182. Information includes whether or not the ordered item has pulling eyes, prepped ends, preterminations, a taper splice, gas pressure, or modular connections.

If the ordered item selected is a capacitor, the dialog displays the custom features associated with capacitors as shown in Fig. 183. Information includes the microfarads and/or ohms of the capacitor.

If the ordered item selected is a non-standard pedestal cross-box, the dialog displays its configuration as shown in Fig. 184. Information includes the size and length of each stub and the connections between the feeder pairs and distribution pairs inside the cross-box.

If the ordered item selected is a non-standard pole-mounted cross-box, the dialog displays its configuration as shown in Fig. 185. Information includes the size and length of each stub and the connections between the feeder pairs and distribution pairs inside the cross-box.

To get help while on this dialog, press the HELP button. To close this dialog, press the CLOSE button.

VIEW ORDER REMARKS

To view remarks pertaining to the entire order, press the View Order Remarks toolbar button located on the RECEIPT MATERIAL window or choose "View Order Remarks" from the Actions menu. The REMARKS FOR ORDER xxxx dialog as shown in Fig. 186 is displayed, where xxxx is the current order number.

This dialog allows you to view the order remarks that were sent to OrderMaster and any additional remarks that were recorded with the order when the order was placed.

To get help while on this dialog press the HELP button. To close this dialog, press the CLOSE button.

VIEW JOB DETAILS

To view details about the job for which this material was ordered, select an order line and press the Show Job Details toolbar button located on the RECEIPT MATERIAL window or choose "Show Job Details" from the Actions menu. The JOB DETAILS FOR THIS ORDER ITEM dialog as shown in Fig. 187 is displayed.

This dialog displays each material requirement aggregated to the selected ordered item. The following information is displayed:

1. Job Number – The job number for which this item was ordered.
2. Material Description – The description of the material ordered.
3. Print – The job print for which this item was ordered.
4. Step – The job step for which this item was ordered.
5. Quantity Ordered – The portion of the needed quantity that was ordered.
6. Custom Features (abbreviated CF) – A symbol here indicates that the requirement needs custom material features (e.g., inside pulling eye).
7. RESID – The resource ID responsible for the work.
8. Roadblocks (abbreviated RB) – A symbol here indicates that roadblocks (critical or non-critical) exist that may delay the work.
9. Inventory Site – The inventory site responsible for procuring the material.
10. Work Action – The type of work for which the material is needed (e.g. PLAC = placing).
11. Work Environment (abbreviated WE) – The work environment for which the material is needed (e.g. B = buried).

A symbol appears in the Custom Features column (abbreviated CF) if the requirement has custom material features. To view the custom features, double-click the symbol or use the arrow keys to move the marquee to it and press ENTER. The CUSTOM FEATURES dialog is displayed. The CUSTOM FEATURES dialog as shown earlier is displayed. To get help while on this dialog, press the HELP button. To close this dialog, press the CLOSE button.

A symbol appears in the Roadblock column (abbreviated RB) if the substep for which the requirement exists has any roadblocks. To view the roadblock(s), double-click the symbol or use the arrow keys to move the marquee to it and press ENTER. The ACTIVE ROADBLOCKS dialog as shown in Fig. 188 is displayed.

To get help while on the dialog, press the HELP button. To close this dialog, press the CLOSE button.

To close the JOB DETAILS FOR THIS ORDER ITEM dialog, press the CLOSE button.

RECEIPT MATERIAL FOR THE FIRST TIME WITHOUT EXCEPTIONS

Receipting material for the first time without exceptions implies that the shipment has not already been receipted and that:

1. the description of the material to be receipted is exactly the same as the description of the material ordered or expected to be shipped (if a substitution was made by the warehouse),
2. the quantity to be receipted is equal to the quantity ordered or expected to be shipped,
3. a serial number is present, if the material is serialized, and it is equal to the serial number to be receipted,
4. a reel type is present, if the material is cable, and it is equal to the reel type to be receipted,
5. the date the material was received is equal to the current date,
6. no remarks need to be recorded with the receipt transaction, and
7. the bin location of the material is not to be recorded.

To receipt a shipment, select one or more shipment lines for the ordered item you want to receipt and press the Receipt Line Item toolbar button located on the RECEIPT MATERIAL window or choose "Receipt Line Item" from the Actions menu. The system displays an appropriate message under the following conditions:

1. If receipting an assembly order, the system displays an error message if you select any shipment but the first. Respond to the message by pressing OK.
2. If receipting serialized material and a serial number is not provided, an error message is displayed. Respond to the message by pressing OK.
3. If receipting cable and a reel type is not provided, an error message is displayed. Respond to the message by pressing OK.

If no errors are found, the system receipts the material into the responsible inventory site's inventory as follows: If the material was ordered by one inventory site and shipped to an alternate inventory site, the material is receipted into the alternate inventory site's inventory. If the material was shipped to an alternate address, the material is receipted into the ordering inventory site's inventory.

1. The selected shipments are marked as "received". Each shipment received has a check-mark displayed in the leftmost column of the grid and the current date appears in the Date Receipted field. If receipting an assembly order, the shipments for the add-on assembly items will be receipted automatically when the XPID is receipted. If a calculated shipment is received, a shipment is created and marked "received".

2. The material is receipted as "unassigned" inventory and an Order Receipt material inventory transaction is recorded. If receipting an assembly order, the XPID will be receipted as "unassigned" inventory, but the add-on assembled items will not be receipted into inventory. An Order Receipt material inventory transaction is recorded only for the XPIDed item of the assembly order.

3. If the requirement for which the material was ordered still exists (i.e., the job or substep has not been cancelled and the requirement has not changed), the material is assigned to the appropriate substep(s) within that job and an Assignment material inventory transaction is recorded for each assignment made. If the requirement has been completely satisfied (substep's assigned quantity = substep's order quantity) or, if cable, and the quantity assigned to the substep is greater than or equal to the record length measurement needed, each substep to which the material was assigned is marked as having all of its material received. The system will not assign more material than is needed on the substep. If the quantity received is greater than the quantity needed, the assignment is made for the quantity needed and the remaining quantity remains in the unassigned status.

4. If the requirement for which the material was ordered no longer exists (e.g., the job or substep was cancelled or the requirement changed), the inventory item remains in the "unassigned" status.

5. If the total quantity received for this ordered item is greater than or equal to the quantity to be supplied by Procurement, the ordered item is marked "received". If the total quantity received for this ordered item is less than the quantity to be supplied by Procurement, the difference is calculated and the remaining balance to be shipped is displayed on a new shipment line for that order item.

6. The Assignment transaction is marked as not to be sent to Asset Management.

7. The Order Receipt transaction is marked as to be sent to Asset Management or not to be sent to Asset Management based on the following rules:

a. If the material received was not ordered direct to code, the transaction is marked to be sent to Asset Management.

b. If the material received was ordered direct to code (either to a c-code or to an m-code) but not assigned to the account for which it was ordered, the transaction is marked to be sent to Asset Management. This situation can occur if the requirement for which the material was ordered no longer exists or if it was marked "do not order direct to code" after the material was already ordered.

c. If the material received is central office equipment, the transaction is marked as not to be sent to Asset Management.

d. If the material received was ordered direct to code (either to a c-code or to an m-code) and assigned to the account for which it was ordered, the transaction is marked as not to be sent to Asset Management.

RECEIPT MATERIAL FOR THE FIRST TIME WITH EXCEPTIONS

Receipting material for the first time with exceptions implies that the shipment has not already been receipted and that one or more of the following applies:

1. the description of the material to be receipted is not exactly the same as the description of the material ordered or expected to be shipped,
2. the quantity to be receipted is not equal to the quantity ordered or expected to be shipped,
3. a serial number is present, but it is not equal to the serial number to be receipted,
4. a serial number is not present and the material to be receipted is serialized,
5. a reel type is present, but it is not equal to the reel type to be receipted,
6. a reel type is not present and the material to be receipted is cable.
7. the date the material was received is not equal to the current date,
8. remarks need to be recorded with the receipt transaction,
9. the bin location of the material is to be recorded, or
10. the material is damaged or unwanted and will be returned to a BST warehouse or to an outside vendor.

To indicate the exceptions with which to receipt the material, double-click a shipment line you want to receipt or move the marquee to it and press Enter. The EDIT LINE ITEM dialog as shown in Fig. 189 is displayed.

The fields on this dialog default to what was ordered or what was expected to be shipped, if available.

The following information is displayed in the Order Data frame:

1. Material Description – The description of the material ordered.
2. Quantity – The quantity of material ordered.

You may enter or overtype the information displayed in the Receipt Data frame as described below.

1. Serial Number – The serial number of the material received, if serialized. If receipting serialized material and the serial number is blank or is different from what was shipped, enter the serial number in the Serial Number text box. The serial number entered must not be a serial number already existing in this CMC.
2. Reel Type – The reel type of the material received, if cable. If receipting cable and the reel type is blank or is different from what was shipped, enter a valid reel type in the Reel Type combo box or select one from the drop down list.
3. Material Description – The description of the material received. If the description of the material is different from what was shipped, enter a valid material description in the Material Description text box.
4. Quantity – the quantity of material received. If the quantity is different from what was shipped, enter the quantity to be received into inventory. The quantity entered must be greater than zero.
5. Date – The date the material was received. This field defaults to the current date. If receipting material for a previous day, enter a date less than the current date.
6. Bin Loc – The bin location of where the material will be stored in inventory. If your inventory site is using bin locations, enter a bin loc. This field is not validated. If you receipt the same non-serialized material on the same day and don't use the same bin loc as previously used, the last entered bin loc will become the bin loc for all of this non-serialized material at this location received on this day.

7. Remarks – enter any remarks that you wish to be recorded with the order receipt transaction.

8. Damaged/Unwanted – If the material will be returned to a BST warehouse or to an outside vendor, check the Damaged/Unwanted check box.

To get help while on this dialog, press the HELP button. To close this dialog without saving the changes, press the CANCEL button. To close this dialog and save the changes made, press the OK button. The system displays an appropriate message under the following conditions:

1. If the serial number to be received already exists in this CMC, an error message is displayed. Respond to the message by pressing OK.

2. If receipting cable and no reel type was provided or an invalid reel type was provided, an error message is displayed. Respond to the message by pressing OK.

3. If the material description to be received is not valid, an error message is displayed. Respond to the message by pressing OK.

4. If the quantity to be received is zero, an error message is displayed. Respond to the message by pressing OK.

5. If the receipt date entered is greater than the current date, an error message is displayed. Respond to the message by pressing OK.

If no errors are found, the changes made on the EDIT LINE ITEM dialog are reflected on the selected shipment line on the RECEIPT MATERIAL window as follows:

1. The Quantity Received field is populated with the indicated receipt quantity.
2. The Serial Number field is populated with the indicated serial number.
3. The Reel Type field is populated with the indicated reel type.
4. The Date Receipted field is populated with the indicated receipt date.
5. If the description of the material received is different from the description of the material ordered, the sub Item field is populated with an asterisk (*).
6. Any remarks entered on the EDIT LINE ITEM dialog are displayed in the Additional Detail frame as Receipt Item Remarks.
7. The Bin Loc field in the Additional Detail frame is populated with the indicated bin loc.

8. If the RECEIPT MATERIAL window was opened via an OrderMaster Number, any remaining balance to be shipped for the ordered item is calculated and, if greater than zero, is displayed as a new shipment line.

Select the next shipment to be receipted and make any needed changes. After all shipments that you want to receipt have been selected, press the Receipt Line item toolbar button or choose "Receipt Line Item" from the Actions menu as described earlier. The system receipts the material as described earlier with the following exception:

1. If the shipment was marked as damaged or unwanted, the material is receipted as "awaiting return" inventory, rather than "unassigned" inventory, and is not assigned to the job for which it was ordered. Each associated requirement is marked as needed material again and as ready to be fulfilled, and is not assigned to the job for which it was ordered. Each associated requirement is marked as needed material again and as ready to be fulfilled.

COMPLETE AN ORDERED ITEM

When remaining shipments are indicated and no more shipments are expected to arrive for an ordered item, the ordered item may be marked complete. This feature exists so that an ordered item will not get "hung up" in an ordered or shipped status when everything that is going to be received has been received. This function is not available if the RECEIPT MATERIAL window was opened via a Purchase Order or a Select Ticket.

Select the order line of the ordered item you wish to complete and click the complete Order Item toolbar button located on the RECEIPT MATERIAL window or choose "Complete Order Item" from the Actions menu. A process is initiated to indicate that no more shipments are expected to be received for this order item as follows:

1. If there are no shipments or no received shipments at the time the ordered item is marked complete, the selected ordered item is put into a "cancelled" status.

2. If there is at least one received shipment at the time the ordered item is marked complete, the selected ordered item is put into a "complete" status.

3. The quantity remaining to be satisfied is re-calculated for each associated substep that has not yet been received and, if the quantity remaining is greater than zero, the requirement is marked as needing material again and ready to be fulfilled. If completing a cable item and the quantity received is greater than the substep's record length measurement, the substep's material status would have been changed to "received" when the shipment was received; thereby making it unnecessary for any remaining needed quantity to be calculated.

4. If the material ordered is cable, the responsible CMC's year-to-date MCF(million conductor feet) of copper cable ordered or FKF (fiber Kilo feet) of fiber cable ordered is decreased by the remaining quantity needed on the substep.

5. After an ordered item has been completed, any unreceived shipments are no longer displayed.

UNCOMPLETE AN ORDERED ITEM

If an ordered item is "cancelled" or is "complete" it must first be uncompleted before any corrections or further receipts may be done. This function is not available if the RECEIPT MATERIAL window was opened via a Purchase Order or a Select Ticket.

Select the order line of the ordered item for which a correction or additional receipt is needed and click the Uncomplete Order Item toolbar button located on the RECEIPT MATERIAL window or choose "Uncomplete Order Item" from the Actions menu. A process is initiated to set the ordered item back to its previous status as follows:

1. If there are no shipments at the time the order item is uncompleted, the selected ordered item is put back into an "ordered" status.

2. If there are shipments but no received shipments at the time the order item is uncompleted, the status to which the ordered item is returned depends on whether or not there are actual shipments recorded. If the actual quantity shipped is greater than or equal to the quantity to be supplied by Procurement, the selected ordered item is put back into a "shipped" status. If the actual quantity shipped is less than the quantity to be supplied by Procurement, the selected ordered item is put back into an "ordered" status.

3. If there is at least one received shipment at the time the order item is uncompleted, the status to which the ordered item is returned depends on whether or not there are shipments that have not yet been received. If the received quantity is greater than or equal to the quantity to be supplied by Procurement, the selected order item is put back into a "received" status. If the actual shipped quantity is greater than or equal to the quantity to be supplied by Procurement, the selected ordered item is put back into a "shipped" status. If neither of these is true, the selected ordered item is put back into an "ordered" status.

4. The quantity remaining to be satisfied is re-calculated for each associated substep that has not yet been received, and if the quantity remaining is equal to zero, the requirement is put back into an "ordered" status and marked as not ready to be fulfilled.

5. If the material ordered is cable, the responsible CMC's year-to-date MCF (million conductor feet) of copper cable ordered or FKF (fiber Kilo feet) of fiber cable ordered is increased by the quantity no longer needed on the substep.

6. After an order item has been uncompleted, any unreceived shipments are displayed and any remaining balance to be shipped for the ordered item is calculated and, if greater than zero, is displayed as a new shipment line.

These shipments may now be received or a receipt may be made against the remaining balance. If there are no unreceived shipments or no remaining balance to receipt against, you may add a shipment using the process described below.

ADD A SHIPMENT

You may add a shipment to handle duplicate shipments for a specified ordered item. This function is not available if the RECEIPT MATERIAL window was opened via a Purchase Order or a Select Ticket.

If the ordered item is "cancelled' or "complete", you must first uncomplete the ordered item before adding a shipment. Select the order line of the ordered item for which you want to add a shipment and click the Uncomplete Order Item toolbar button located on the RECEIPT MATERIAL window or choose "Uncomplete Order Item" from the Actions menu. A process is initiated to set the ordered item back to its previous status as described earlier.

To add a shipment select the order line for the ordered item for which you want to add a shipment and click the Add A Shipment Item toolbar button located on the RECEIPT MATERIAL window or choose "Add A Shipment Item" from the Actions menu. The EDIT LINE ITEM dialog as shown in Fig. 190 is displayed.

The fields on this dialog default to what was ordered. You may enter or overtype the information in the text boxes as described earlier. Since this is probably a duplicate shipment, check the Damaged/Unwanted check box to mark the material as "awaiting return" when it is receipted into inventory.

To get help while on this dialog, press the HELP button. To close this dialog and save the changes made, press the OK button. To close this dialog without saving the changes, press the CANCEL button.

Upon returning to the RECEIPT MATERIAL window, a new shipment line is displayed for this ordered item with the information entered on the EDIT LINE ITEM dialog.

To receipt this material into inventory, press the Receipt Line item toolbar button or choose "Receipt Line Item" from the Actions menu as described earlier. A shipment is created and a process is initiated to receipt the material either as "awaiting return" inventory, "unassigned" inventory, or "assigned" inventory as described earlier.

UNRECEIPT A SHIPMENT

You may need to unreceipt a shipment previously receipted if the wrong information was entered, such as the serial number or quantity, or if a shipment was receipted for the wrong ordered item. You may unreceipt a shipment and receipt again with the correct information.

If the ordered item is "complete", you must first uncomplete the ordered item before you can unreceipt any of its shipments. Select the order line of the ordered item for which you need to make a correction and click the Uncomplete Order Item toolbar button located on the RECEIPT MATERIAL window or choose "Uncomplete Order Item" from the Actions menu. A process is initiated to set the ordered item back to its previous status as described earlier.

To unreceipt a shipment, select the shipment line of the ordered item to which you need to make a correction and click the Unreceipt Line Item toolbar button located on the RECEIPT MATERIAL window or choose "unreceipt Line Item" from the Actions menu. The system displays an error message if there is an insufficient inventory balance to unreceipt (i.e., the quantity to be unreceipted is greater than the current inventory balance for this material). Respond to the message by pressing OK.

If no errors are found, a process is initiated to reverse the previous receipt against this shipment as follows:

1. The shipment is marked as no longer being received. If the shipment is not associated with a Purchase Order or Select Ticket (i.e., an added shipment), the shipment is deleted. Following the unreceipt, the Date Receipted field of the shipment line selected is cleared and the check-mark is no longer displayed.

2. If the material was assigned to a job, the inventory item is unassigned from the appropriate substep(s) within that job and an Unassignment material inventory transaction is recorded for each unassignment done. Each substep to which the material was assigned is put back in an "ordered" status.

3. If the total quantity received for this ordered item is now less than the quantity to be supplied by Procurement, the process indicates that the ordered item is no longer received and is put back into its prior status; otherwise it remains in the "received" status. If the actual shipped quantity is greater than or equal to the quantity to be supplied by Procurement, the ordered item is put back into the "shipped" status. If the actual shipped quantity is less than the quantity to be supplied by Procurement, the ordered item is put back into the "ordered" status.

4. The material is deleted from inventory and an Order Receipt Reversal inventory transaction is recorded.

5. The Unassignment transaction is marked as not to be sent to Asset Management.

6. The Order Receipt Reversal transaction is marked as to be sent to Asset Management or not to be sent to Asset Management based on the following rules:

a. If the material received was not ordered direct to code, the transaction is marked to be sent to Asset Management.

b. If the material received was ordered direct to code (either to a c-code or to an m-code) but not assigned to the account for which it was ordered, the transaction is marked to be sent to Asset Management.

c. If the material received is central office equipment, the transaction is marked as not to be sent to Asset Management.

d. If the material received was ordered direct to code (either to a c-code or to an m-code) and assigned to the account for which it was ordered, the transaction is marked as not to be sent to Asset Management.

To close the RECEIPT MATERIAL window, double-click the control box located in the upper left corner of the window. At this time an RF-8010 form is printed if the material received is for Central Office equipment and no assignment was made following the receipt because either the requirement for which the material was ordered no longer exists or the material was receipted as damaged/unwanted. Form RF-8010 (see Attachment 1) is printed to move the material from the Field Reporting Code (FRC) and Geographic Location Code (GLC) of the requirement to which it was ordered to the 1220.1412 (Material Held For Future Use) account in the responsible inventory site.

Attachment 1

The following information is printed on the RF-8010 form when receiving unassigned Central Office Equipment:

1. Transfer Report No. – The state where the material was received followed by the OSPCM Material Inventory Transaction Number (e.g., KY11184).

2. Purpose of Transfer – This field always equals "Adj. Accounts".

3. Ship/Transfer from (Credit)

a. Location – The inventory site where the material was received.

b. State – The state where the material was received.

c. Geo. Loc. – The exception geographic location code to which the material was ordered.

d. Auth. No. – The job number for which the material was ordered.

e. RCO – The responsibility code of the inventory site where the material was received.

f. RCC – The responsibility code of the inventory site where the material was received.

g. Field Code – the field reporting code (FRC) to which the material was ordered (i.e., 257C)

h. Vendor Order Number – The purchase order or select ticket on which the material was shipped.

4. Ship/Transfer To (Debit)

a. Location – The inventory site where the material was received.

b. State – The state where the material was received.

c. Geo. Loc. – The geographic location code of the inventory site where the material was received.

d. RCO – The responsibility code of the inventory site where the material was received.

e. RCC – The responsibility code of the inventory site where the material was received.

f. Func. Code – The function code of the Material Held For Future Use account. This field is always equal to "5C5T".

5. Transportation Instructions a. Field Code – This field defaults to 6 blanks followed by an "M". Methods and Procedures (M&Ps) will be written to instruct the user how to manually complete this section.

6. Engineering Contract a. Engineer – The name of the user's supervisor. The "user" is the person who receipted the material into OSPCM.

b. Prepared By – The name of the person who receipted the material into OSPCM. The user's Common Userid (CUID) is used to obtain his/her name.

c. Date – The date the material was receipted into inventory. This field is always equal to the current date.

d. Remarks – Remarks entered at the time the material was receipted into inventory.

7. Equipment Description – The description of the material receipted into inventory. If the material is serialized, its serial number will be printed following the material description.

8. Cond. – The condition of the material. This field always equals "G" (good).

9. Qty. – The quantity of material receipted into inventory.

10. Per – This field always equals "EA" (each).

11. Yr. Pl. – The year the inventory item was receipted into inventory.

RECEIVE SHIPMENT DETAILS

Shipment details provide OSPCM information to determine the status of an ordered item as it is processed in either REGIS or CAPRI. After OrderMaster processes an order it send each ordered item to either REGIS or CAPRI, depending on the material ordered (see Order Material Requirements section of this document for a description of when items are sent to REGIS and when they are sent to CAPRI).

REGIS sends shipment information to OSPCM via a navigator contract and CAPRI sends shipment information to OSPCM via BUFIT.

Shipment information is received from REGIS under any of the following conditions:

1. Initial generation of a select ticket,
2. assignment of a new select ticket following a held order (future day, re-inventory held, IBI-held) release or a backorder resolution,
3. a quantity change on a held order,
4. a change in the scheduled ship date,
5. cancellation of a held order or a backorder, or
6. when a select ticket is looped closed (i.e., shipped from the warehouse).

Shipment information is received from CAPRI under any of the following conditions:

1. Initial generation of a purchase order,
2. a change in the scheduled ship date, or
3. cancellation of a purchase order.

Each time REGIS or CAPRI sends shipment information to OSPCM, a process is called to record the details so that they are available to you when you view the status of an order or when you want to receipt the ordered material into inventory.

The following information is provided to OSPCM (fields are provided by both REGIS and CAPRI unless otherwise noted):

1. State Code – The state associated with the Requestor Authority Number (RAN) that ordered the material. This field is used to route the contract to the proper server. (Length: 2)

2. System ID – The system identifier of the system providing the shipment information. (Length: 2) Values are "CP" (CAPRI) and "RG" (REGIS).

3. Return Code – The return code indicating the status of a shipment. (Length: 2) Values are:

a. 10 – Item was successfully ordered. This return code can be received from both REGIS and CAPRI and may be received under the following conditions:

The entire ordered quantity can be satisfied by REGIS.

The entire ordered quantity can be satisfied by CAPRI.

A portion of the ordered quantity can be satisfied by REGIS and the remaining quantity was backordered.

A portion of the ordered quantity can be satisfied by REGIS and the remaining quantity was sent to CAPRI. This situation can occur if a PIDed non-stock item is ordered and the warehouse does not have the non-stock item in stock. REGIS does not send a return code of 10 for the portion of the ordered quantity that was sent to CAPRI. Only the portion of the ordered quantity that was satisfied by REGIS is reported to OSPCM. If the entire order quantity was sent by REGOS to CAPRI, no status message is returned to OSPCM from REGIS.

b. 11 – Item was not ordered. This return code can only be received from REGIS and may be received under the following conditions:

The ordered quantity could not be satisfied by REGIS and could not be backordered. This situation can only occur if a PIDed stock item is ordered; otherwise, REGIS would have passed the order on to CAPRI.

c. 12 – Item was partially ordered. This return code can only be received from REGIS and may be received under the following conditions:

A portion of the ordered quantity can be satisfied by REGIS, but the remaining quantity cannot be satisfied. For example, if the order quantity exceeds the maximum order quantity allowed for the RAN used to place the order, REGIS satisfies the order with the maximum quantity allowed and does not satisfy the remaining quantity.

d. 13 – PROPAR failure at order time. This return code can only be received from REGIS and may be received under the following conditions:

REGIS attempted to pass either the entire order quantity or a portion of the order quantity to CAPRI at order time but there was an internal PROPAR failure in REGIS which means that CAPRI never received the order.

e. 14 – PRBA failure at order time. This return code can only be received from REGIS and may be received under the following conditions:

REGIS attempted to create a backorder for either the entire order quantity or a portion of the order quantity at order time but there was an internal PRBA failure in REGIS which means that the backorder was never created.

f. 20 – Item will be or was shipped. This return code can only be received from REGIS and may be received under the following conditions:

The select ticket was loop closed clean (Quantity ordered = quantity shipped).

The select ticket was dirtied up to some quantity greater than the ordered quantity.

The select ticket was dirtied down to some quantity less than the ordered quantity and the remaining quantity or the entire quantity (f dirtied to zero) was backordered.

The select ticket was dirtied down to some quantity less than the order quantity and the remaining quantity or the entire quantity (if dirtied to zero) was re-directed to another warehouse.

The select ticket was dirtied down to some quantity less than the order quantity and the remaining quantity or the entire quantity (if dirtied to zero) was re-directed to CAPRI.

g. 21 – Item will not be shipped. This return code can only be received from REGIS and may be received under the following conditions:

The select ticket was dirtied down to zero and the item was not backordered, not re-directed to another warehouse, nor re-directed to CAPRI.

h. 22 - Item was partially shipped. This return code can only be received from REGIS and may be received under the following conditions:

The select ticket was dirtied down to some quantity less than the ordered quantity but the remaining quantity was not backordered, not re-directed to another warehouse, nor re-directed to CAPRI.

i. 23 – Loop Closure was reversed. This return code can only be received from REGIS and may be received under the following conditions:

The select ticket was reversed loop closed. This can occur even if the select ticket was not previously loop closed. It most often occurs if a mistake was made during loop closure (e.g., the wrong select ticket was loop closed or the wrong quantity was loop closed).

j. 24 – PROPAR failure at loop closure. This return code can only be received from REGIS and may be received under the following conditions:

REGIS attempted to pass either the entire order quantity or a portion of the order quantity to CAPRI at loop closure but there was an internal PROPAR failure in REGIS which means that CAPRI never received the order.

k. 25 – PRBA failure at loop closure. This return code can only be received from REGIS and may be received under the following conditions:

REGIS attempted to create a backorder for either the entire order quantity or a portion of the order quantity at loop closure but there was an internal PRBA failure in REGIS which means that the backorder was never created.

l. 30 – Scheduled ship date change. This return code can be received from both REGIS and CAPRI and may be received under the following conditions:

The due date was changed on a held order in REGIS.

CAPRI received a scheduled ship date change from a vendor.

m. 31 – Quantity change. This return code can only be received from REGIS and may be received under the following conditions:

The quantity to be shipped was changed on a held order in REGIS n. 32 – Purchase Order or Select Ticket was cancelled. This return code can be received from both REGIS and CAPRI and may be received under the following conditions:

A held order or backorder was cancelled in REGIS.

A purchase order was cancelled in CAPRI.

4. Return Message – A message explaining why the entire order quantity could not be satisfied. This field may be provided if a return code of 11, 12, or 13 is received from REGIS. (Length: 60)

5. OrderMaster Number – The "Q" number of an ordered item. (Length: 8)

6. OrderMaster Sequence Number – The "Q" item number of an ordered item. (Length: 3)

7. Current Purchase Order Number – The current select ticket number of purchase order number assigned to the ordered item. (Length: 10)

8. Purchase Order Line Item – The purchase order line item assigned to the ordered item. This field is populated only if the shipment status is received from CAPRI. (Length: 3)

9. Previous Select Ticket Number – The previous select ticket number assigned to the ordered item. This field is populated only when a held order is released or a backorder is resolved in REGIS. It may be provided when a return code of 10 is received. (Length: 10)

10. Quantity Type Indicator – The status of the select ticket. This field is populated only if a held order or backorder is created in REGIS. It may be provided when a return code of 10 is received. (Length: 1) Values are:

a. "F" – Future Day
b. "I" – IBI-held
c. "R" – Re-inventory held
d. "B" – Backordered 11. Scheduled Ship Date – The date the material is expected to be shipped from a BST warehouse or from an outside vendor. This field is populated only if the ordered item is assigned to a future day or current day ticket in REGIS or if the vendor provided CAPRI with a scheduled ship date. It may be provided when a return code of 10, 12, or 30 is received. (Length: 10; Format: mm/dd/yyyy)

12. Actual Ship Date – The date the material was shipped from a BST warehouse. This field is populated only when a select ticket has been loop closed in REGIS. It may be provided when a return code of 20 or 22 is received. (Length: 10; Format: mm/dd/yyyy)

13. Quantity Shipped – The quantity shipped or scheduled to be shipped. This field is populated with non-zeroes if a quantity is scheduled to be shipped from REGIS at order time or if a quantity was shipped from REGIS at loop closure. It may be provided when a return code of 10, 12, 31, 20, or 22 is received. In addition, the quantity not shipped is provided in this field when a return code of 13, 21, or 24 is received from REGIS. (Length: 7)

14. Quantity Backordered – The quantity backordered. This field is populated with non-zeroes if a backorder is created in REGIS at order time or at loop closure. It may be provided when a return code of 10, 12, or 20 is received. (Length: 7)

15. Current PID – The PID of the material scheduled to be shipped, actually shipped, or not to be shipped. This field is populated only when the shipment status is received from REGIS. (Length: 15)

16. Previous PID – The PID of the material ordered if a substitution was made by REGIS at order time, the PID of the material previously scheduled to be shipped if a substitution was made by REGIS prior to loop closure or at loop closure, or the PID of the material previously shipped if a substitution was made by REGIS during a re-loop closure. It may be provided when a return code of 10, 12, 20, or 22 is received. (Length: 15)

17. Serial Number – The serial number shipped from a BST warehouse. This field is populated only if serialized material was shipped from REGIS. It may be provided when a return code of 20 is received. (Length: 10)

18. Reel Type – The type of reel on which a cable item was shipped from a BST warehouse. This field is populated only if cable was shipped from REGIS. It may be provided when a return code of 20 is received. (Length: 3)

19. S/T Item Cancellation – An indication that the shipment for this select ticket, OrderMaster sequence number, and PID should be cancelled. This field is populated only if REGIS redirects the entire order quantity to another warehouse or to CAPRI during loop closure. It may be provided when a return code of 20 is received. (Length: 1)

The return code on each shipment detail record tells OSPCM how to process the associated information. Shipments are created, updated, and deleted in OSPCM based on the return code received.

PROCESS A RETURN CODE OF "10" FROM REGIS

If the shipment status is from REGIS, the system searches for an existing shipment for the ordered item, current select ticket number (or previous select ticket number if a held order was released or a backorder was resolved), and current PID (or previous PID if a substitution was made).

If there is an existing non-held non-backorder shipment, the system takes the following action:

1. The quantity shipped is added to the existing shipment. This is done to handle when both new and used quantities in the same zone are used to satisfy the order quantity.

If there is an existing held order or backorder shipment, REGIS has released a held order or resolved a backorder and the system takes the following action:

1. The shipment is replaced with the new select ticket number, the new material description (if a substitution was made), and the quantity shipped. If the backorder was partially resolved, a new shipment is created for the ordered item, previous select ticket, and PID of the original backorder for the quantity not yet resolved.

If there is not an existing shipment, the system takes the following action:

1. A new shipment is created for the ordered item, current select ticket, and current PID for the quantity scheduled to be shipped or the quantity backordered.

PROCESS A RETURN CODE OF "10" FROM CAPRI

If the shipment status is from CAPRI, the system takes the following action:

1. A new shipment is created for the ordered item, current purchase order, and purchase order item number.

2. Since CAPRI does not send the description of the material to be shipped, the system creates the shipment for the description of the material ordered.

3. Since CAPRI does not send a ship quantity to OSPCM, the system calculates the quantity to be shipped by summing the existing shipments (including held orders and backorders) for this ordered item and subtracting this value from the quantity to be supplied by Procurement.

PROCESS A RETURN CODE OF "11"

A return code of "11" indicates that the ordered quantity will not be satisfied; therefore no shipment is created and the system must reduce the quantity that will be supplied by Procurement for this ordered item so that it can calculate how much more needs to be ordered. The system takes the following action:

1. The quantity to be supplied by Procurement is replaced with the total quantity already shipped or scheduled to be shipped (including held orders and backorders) for the ordered item.

2. The remaining needed quantity on the substeps that were aggregated to the ordered item is calculated and if >0, the material status code on the substep is reset to "needed" and marked as ready to be fulfilled.

PROCESS A RETURN CODE OF "12"

A return code of "12" indicates that only a portion of the ordered quantity will be satisfied. The system searches for an existing shipment for the ordered item, current select ticket number, and current PID (or previous PID if a substitution was made).

If there is an existing non-held non-backorder shipment, the system takes the following action:

1. The quantity shipped is added to existing shipment. This is done to handle when both new and used quantities in the same zone are used to satisfy the order quantity.

If there is not an existing shipment, the system takes the following action:

1. A new shipment is created for the ordered item, current select ticket, and current PID for the quantity shipped or backordered.

Since only a portion of ordered quantity will be satisfied, the system must reduce the quantity that will be supplied by Procurement for this ordered item so that it can calculate how much more needs to be ordered. The system takes the following action:

1. The quantity to be supplied by Procurement is replaced with the total quantity already shipped or scheduled to be shipped (including held orders and backorders) for the ordered item.

2. The remaining needed quantity on the substeps that were aggregated to the ordered item is calculated and if >0, the material status code on the substep is reset to "needed" and marked as ready to be fulfilled.

PROCESS A RETURN CODE OF "13"

A return code of "13" indicates that an internal error occurred in REGIS when the order was re-directed to CAPRI at order time; therefore the system must reduce the quantity that will be supplied by Procurement for this ordered item so that it can calculate how much more needs to be ordered. The system takes the following action:

1. The quantity to be supplies by Procurement is decreased by the quantity that will not be shipped.

2. The remaining needed quantity on the substeps that were aggregated to the ordered item is calculated and if >0, the material status code on the substep is reset to "needed" and marked as ready to be fulfilled.

PROCESS A RETURN CODE OF "14"

A return code of "14" indicates that an internal error occurred in REGIS when a backorder was attempted at order time. Since OSPCM was already notified of the backorder, the system deletes the backordered shipment for this ordered item, current select ticket, and current PID. If material is backordered at order time, REGIS sends a backorder quantity with a return code of "10" or "12" to OSPCM before the backorder is actually created in REGIS. If the process that creates the backorder in REGIS fails, a return code of "14" is sent to OSPCM indicating that the backorder did not occur.

Since either the entire ordered quantity or a portion of the ordered quantity will not be satisfied, the system must reduce the quantity that will be supplied by Procurement for this ordered item so that it can calculate how much more needs to be ordered. The system takes the following action:

1. The quantity to be supplied by Procurement is replaced with the total quantity already shipped or scheduled to be shipped (including held orders and backorders) for the ordered item.
2. The remaining needed quantity on the substeps that were aggregated to the ordered item is calculated and if >0, the material status code on the substep is reset to "needed" and marked as ready to be fulfilled.

PROCESS A RETURN CODE OF "20"

A return code of "20" indicates that a select ticket has been loop closed in REGIS. Select tickets may be loop closed "clean", "dirtied up", or "dirtied down". If a select ticket is loop closed clean, the entire quantity associated with this select ticket will be shipped from the warehouse. If a select ticket is dirtied down a portion of the quantity ordered on this select ticket will be shipped from the warehouse (as long as the ticket was not dirtied down to zero) and the remaining quantity may be backordered, redirected to another warehouse, sent to CAPRI (if a non-stock item was ordered), or not shipped at all. If the select ticket is dirtied down to zero, the entire quantity associated with this select ticket may be backordered, redirected to another warehouse, sent to CAPRI (if a non-stock item was ordered), or not shipped at all.

If shipping serialized material, REGIS sends a return code of "20" for each serial number it ships to satisfy the ordered quantity followed by a return code of "20" indicating the total quantity shipped and/or backordered. If shipping non-serialized material, REGIS sends a single return code of "20" indicating the total quantity shipped and/or backordered.

PROCESS A SERIALIZED SHIPMENT (SERIAL NUMBER NOTIFICATION)

If the shipment detail is for a serial number, the system searches for an existing shipment for the ordered item, current select ticket number, and current PID (or previous PED if a substitution was made).

If there is an existing non-held non-backorder shipment that has not been shipped, the system takes the following action:

The shipment is replaced with actual shipment information including the serial number shipped, the type of reel shipped (if cable was shipped), the material shipped, the quantity shipped, and the date the material was shipped.

If there is an existing non-held non-backorder shipment that has been shipped, the system takes the following action:

A new shipment is created with actual shipment information including the serial number shipped, the type of reel shipped (if cable was shipped), the material shipped, the quantity shipped and the date the material was shipped. This will create a new shipment for each serial number shipped.

If there is not an existing shipment, the system takes the following action:

A new shipment is created for the ordered item, current select ticket, and current PID for the quantity shipped.

PROCESS A SERIALIZED SHIPMENT (TOTAL QUANTITY SHIPPED)

When the return code of "20" is received that indicates the total quantity shipped for a serialized item, the system takes the following action:

If the sum of the quantities shipped on each serial number is less than the total quantity shipped indicated by REGIS, an additional shipment is created for the ordered item, current select ticket, and ordered material description for the difference in the quantity shipped.

If a backorder was created at loop closure, the system searches for an existing non-held non-backorder shipment that has not been shipped for the ordered item, current select ticket number, and current PID (or ordered material description if no PID is provided) and takes the following action. A PID is provided on the final loop closure message for a serialized shipment from REGIS only if the entire quantity ordered on the select ticket is backordered:

If a shipment exists, the shipment is marked as backordered.

If a shipment does not exist, a backorder shipment is created for the ordered item, current select ticket, and the description of the material ordered for the quantity backordered. If REGIS creates a backorder at loop closure, it is against the material ordered. Since the current interface is designed to provide the description of the material shipped and was not designed to handle a shipment of one material description and a backorder of another material description, OSPCM creates a backorder shipment for the material ordered. This is done to accommodate the situation when a substitution is made at order time and loop closure ships some of the substituted material and backorders the remaining quantity.

If a select ticket was dirtied down to zero and re-directed to another warehouse or to CAPRI, REGIS passes notification to OSPCM that the select ticket should be cancelled. The system deletes all existing non-held non-backorder shipments for the ordered item, current select ticket number, and current PID.

PROCESS A NON-SERIALIZED SHIPMENT

If the shipment detail is for a non-serialized item, the system searches for an existing shipment for the ordered item, current select ticket number, and current PED (or previous PID if a substitution was made).

If there is an existing non-held non-backorder shipment that has not been shipped, the system takes the following action:

The shipment is replaced with actual shipment information including the material shipped, the quantity shipped, and the date the material was shipped.

If there is not an existing shipment, the system takes the following action:

A new shipment is created for the ordered item, current select ticket, and current PID for the quantity shipped.

If a backorder was created at loop closure, the system searches for an existing non-held non-backorder shipment that has not been shipped for the ordered item, current select ticket number, and current PID (or previous PID if a substitution was made) and takes the following action:

If a shipment exists, the shipment is marked as backordered.

If a shipment does not exist, a backorder shipment is created for the ordered item, current select ticket, and the description of the material ordered for the quantity backordered. If REGIS creates a backorder at loop closure, it is against the material ordered. Since the current interface is designed to provide the description of the material shipped and was not designed to handle a shipment of one material description and a backorder of another material description, OSPCM creates a backorder shipment for the material ordered. This is done to accommodate the situation when a substitution is made at order time and loop closure ships some of the substituted material and backorders the remaining quantity.

If a select ticket was dirtied down to zero and re-directed to another warehouse or to CAPRI, REGIS passes notification to OSPCM that the select ticket should be cancelled. The system deletes all existing non-held non-backorder shipments for the ordered item, current select ticket number, and current PED.

PROCESS A RETURN CODE OF "21"

A return code of "21" indicates that REGIS will not be shipping the material associated with a select ticket. The system searches for an existing shipment for the ordered item, current select ticket number, and current PED.

If there is an existing non-held non-backorder shipment, the system takes the following action:

The quantity scheduled to be shipped for this ordered item, current select ticket, and current PID is decreased by the quantity not shipped. This is done to handle the situation where both new and used quantities axe scheduled to be shipped on the same select ticket. Since REGIS may decide to ship the new quantity but not ship the used quantity, OSPCM does not want the entire shipment deleted. If the shipped quantity is reduced to zero, the shipment is deleted.

Since either the entire ordered quantity or a portion of the ordered quantity will not be satisfied, the system must reduce the quantity that will be supplied by Procurement for this ordered item so that it can calculate how much more needs to be ordered. The system takes the following action:

The quantity to be supplied by Procurement is decreased by the quantity that will not be shipped.

The remaining needed quantity on the substeps that were aggregated to the ordered item is calculated and if > 0, the material status code on the substep is reset to "needed" and marked as ready to be fulfilled.

PROCESS A RETURN CODE OF "22"

If shipping serialized material, REGIS sends a return code of "20" for each serial number it ships to satisfy the ordered quantity followed by a return code of "22" indicating the total quantity shipped if the quantity shipped is less than the quantity ordered on that select ticket. If shipping non-serialized material, REGIS sends a single return code of "22" indicating the total quantity shipped if the quantity shipped is less than the quantity ordered on that select ticket.

PROCESS A SERIALIZED SHIPMENT

Because the quantities shipped on each serial number may not equal the total quantity shipped indicated by REGIS, the difference between the total quantity shipped and the recorded quantity shipped for the ordered item, current select ticket, and current PID is calculated. If the difference is greater than zero, an additional shipment is created for the ordered item, current select ticket, and current PED for the difference in the quantity shipped.

Since only a portion of the ordered quantity was shipped, the system must reduce the quantity that will be supplied by Procurement for this ordered item so that it can calculate how much more needs to be ordered. The system takes the following action:

The quantity to be supplied by Procurement is replaced with the total quantity already shipped or scheduled to be shipped (including held orders and backorders) for the ordered item.

The remaining needed quantity on the substeps that were aggregated to the ordered item is calculated and if > 0, the material status code on the substep is reset to "needed" and marked as ready to be fulfilled.

PROCESS A NON-SERIALIZED SHIPMENT

The system searches for an existing shipment for the ordered item, current select ticket number, and current PED (or previous PID if a substitution was made).

If there is an existing non-held non-backorder shipment, the system takes the following action:

The shipment is replaced with actual shipment information including the material shipped, the quantity shipped, and the date the material was shipped.

Since only a portion of ordered quantity was shipped, the system must reduce the quantity that will be supplied by Procurement for this ordered item so that it can calculate how much more needs to be ordered. The system takes the following action:

The quantity to be supplied by Procurement is replaced with the total quantity already shipped or scheduled to be shipped (including held orders and backorders) for the ordered item.

The remaining needed quantity on the substeps that were aggregated to the ordered item is calculated and if > 0, the material status code on the substep is reset to "needed" and marked as ready to be fulfilled.

PROCESS A RETURN CODE OF "23"

Since a return code of "23" indicates that a loop closure has been reversed, OSPCM must indicate that a shipment previously considered shipped is no longer shipped. The system deletes all existing non-held non-backorder shipments, except the first, for the ordered item, current select ticket number, and current PID. This is done to handle the situation where multiple serial numbers are shipped on a single select ticket. After deleting the appropriate shipments, the system takes the following action:

To return the shipment back to the state it was in prior to loop closure, the remaining shipment for the ordered item, current select ticket number, and current PID is increased by the total shipped quantity deleted, the actual shipped date is changed to blanks, the expected serial number is changed to blanks (if the shipment was for serialized material), and the expected reel type is changed to blanks (if the shipment was for cable).

PROCESS A RETURN CODE OF "24"

A return code of "24" indicates that an internal error occurred in REGIS when the order was re-directed to CAPRI during loop closure; therefore the system deletes any non-held non-backorder shipments for this ordered item, current select ticket, and current PID if any exist.

Since either the entire ordered quantity or a portion of the ordered quantity will not be satisfied, the system must reduce the quantity that will be supplied by Procurement for this ordered item so that it can calculate how much more needs to be ordered. The system takes the following action:

The quantity to be supplied by Procurement is decreased by the quantity that will not be shipped.

The remaining needed quantity on the substeps that were aggregated to the ordered item is calculated and if > 0, the material status code on the substep is reset to "needed" and marked as ready to be fulfilled.

PROCESS A RETURN CODE OF "25"

A return code of "25" indicates that an internal error occurred in REGIS when a backorder was attempted to be created during loop closure. Since OSPCM was already notified of the backorder, the system deletes the backordered shipment for this ordered item, current select ticket, and current PID. If material is backordered at loop closure, REGIS sends a backorder quantity with a return code of "20" to OSPCM before the backorder is actually created in REGIS. If the process that creates the backorder in REGIS fails, a return code of "25" is send to OSPCM indicating that the backorder did not occur.

Since either the entire ordered quantity or a portion of the ordered quantity will not be satisfied, the system must reduce the quantity that will be supplied by Procurement for this ordered item so that it can calculate how much more needs to be ordered. The system takes the following action:

The quantity to be supplied by Procurement is replaced with the total quantity already shipped or scheduled to be shipped (including held orders and backorders) for the ordered item.

The remaining needed quantity on the substeps that were aggregated to the ordered item is calculated and if > 0, the material status code on the substep is reset to "needed" and marked as ready to be fulfilled.

PROCESS A RETURN CODE OF "30"

A return code of "30" indicates that the date the material was scheduled to be shipped for a held order has changed. The system searches for an existing held order shipment for the ordered item, current select ticket number, and current PID (or ordered material description if the PED is not provided as in the case of CAPRI) and replaces the old scheduled ship date with the new scheduled ship date.

PROCESS A RETURN CODE OF "31"

A return code of "31" indicates that the quantity scheduled to be shipped for a held order has changed. The system searches for an existing held order shipment for the ordered item, current select ticket number, and current PID and replaces the quantity currently scheduled to be shipped with the new quantity to be shipped.

Since the quantity to be shipped by Procurement may have been increased or decreased, the system must update the quantity that will be supplied by Procurement for this ordered item so that it can calculate how much more needs to be ordered if any. The system takes the following action:

The quantity to be supplied by Procurement is replaced with the total quantity already shipped or scheduled to be shipped (including held orders and backorders) for the ordered item.

The remaining needed quantity on the substeps that were aggregated to the ordered item is calculated and if > 0, the material status code on the substep is reset to "needed" and marked as ready to be fulfilled.

PROCESS A RETURN CODE OF "32"

A return code of "32" indicates that a held order or a backorder was cancelled in REGIS; therefore the system deletes all held order or backorder shipments for this ordered item, current select ticket, and current PID (or ordered material description if the PID is not provided as in the case of CAPRI).

Since either the entire ordered quantity or a portion of the ordered quantity will not be satisfied, the system must reduce the quantity that will be supplied by Procurement for this ordered item so that it can calculate how much more needs to be ordered. The system takes the following action:

The quantity to be supplied by Procurement is replaced with the total quantity already shipped or scheduled to be shipped (including held orders and backorders) for the ordered item.

The remaining needed quantity on the substeps that were aggregated to the ordered item is calculated and if > 0, the material status code on the substep is reset to "needed" and marked as ready to be fulfilled.

CALCULATING THE STATUS OF AN ORDERED ITEM AND ITS ASSOCIATED SUBSTEPS

After a shipment status record has been processed, the system determines the status of the ordered item and the material status of the substep(s) that were aggregated to the ordered item using the following business rules:

If the quantity to be supplied by Procurement for this ordered item is zero, change its status code to "cancelled".

If all shipments associated with the ordered item are backordered, change the ordered item's status code to "backordered" if it is not already.

If the total quantity actually shipped for this ordered item is greater than or equal to the quantity to be supplied by Procurement, change the ordered item's status code to "shipped" if it is not already.

If the total quantity actually shipped for this ordered item is less than the quantity to be supplied by Procurement, change the ordered item's status code to "ordered" if it is not already.

If the ordered item's status code is "shipped", change the material status code on each associated substep to "shipped" if there is no remaining quantity needed on the substep.

If the ordered item's status code is "ordered", change the material status code on each associated substep to "ordered" if there is no remaining quantity needed on the substep.

The following business rules are observed when processing shipment details:

Any shipment detail received after the shipment has already been received into inventory is ignored.

The current PID and previous PBD are converted to a material description before they are used.

If a PID is not provided, the system uses the ordered material description to process shipment details.

The quantity to be supplied by Procurement is never increased to a quantity greater than the original ordered quantity.

SEND RECEIPT NOTIFICATION TO CAPRI

This section defines the material receipt notification interface between OSPCM and CAPRI. Order Receipt material inventory transactions are created in OSPCM each time ordered material is received into inventory via the RECEIPT MATERIAL window described in the Receipt Ordered Material section of this document. The receipt of material shipped from a BST warehouse does not need to be reported to Procurement; however, the receipt of material shipped from an outside vendor must be reported to CAPRI before it can authorize payment to the vendor.

The chosen interface is a daily file transmission using BUFIT. This transmission is automatically initiated daily by the system. One file containing all of the day's order receipt transactions for material shipped on a Purchase Order is transmitted to CAPRI. The CAPRI system runs on an MVS system in the Birmingham, AL data center.

The following information is sent to CAPRI for each ordered item received:

System Id - The OSPCM System Identifier. Its value is "MA". (Length: 2).

Requisition Number - The OrderMaster number of the ordered item received. (Length: 8).

Requisition Item Number - The OrderMaster sequence number of the ordered item received. (Length: 3).

Purchase Order Number - The purchase order number associated with the ordered item received. (Length: 8).

Purchase Order Line Item - The purchase order line item associated with the ordered item received. (Length: 3).

Quantity Received - The net quantity of material receipted into OSPCM's inventory to date for the ordered item. (Length: 7).

Receipt Date - The date the most recent shipment was receipted into OSPCM's inventory. (Length: 8; Format: MMDDYYYY, where MM is the month, DD is the day, and YYYY is the year).

The following business rules are observed when reporting receipt notification to CAPRI:

The process reads the material inventory transaction table for the current day's Order Receipt and Order Receipt Reversal transactions that are associated with a purchase order. For each purchase order line item received, one record is created in the receipt notification file.

Since there is only one Order Receipt material inventory transaction for an assembly order, the process creates one receipt notification record for the assembled unit and one receipt notification record for each add-on item. An assembly order is an order that has an XPIDed item as the first item on the order followed by other items that are to be assembled by various vendors and shipped as one unit to the inventory site.

For each purchase order line item received, OSPCM will calculate the net quantity received to date. For example, suppose a purchase order item is receipted for a quantity of 5 on Monday, unreceipted on the same day, and receipted again on Tuesday for a quantity of 6. Monday's receipt file would reflect a received quantity of 0 and Tuesday's receipt file would reflect a received quantity of 6.

VIEW ORDER SUMMARY

To view an order summary, select the Show An Order Summary toolbar button located on the Materials Management application window or select "Show an Order Summary..." from the Orders menu. The DISPLAY ORDER SUMMARY dialog as shown in Fig. 191 is displayed.

This dialog allows you to identify the order that you wish to view. You may view the entire order based on one of the following choices:

OrderMaster Number - To view an order via its OrderMaster number, click the OrderMaster Number radio button and enter a valid OrderMaster number in the associated text box. To view an OrderMaster number starting at a particular line item, click the Start at Line Item check box and type a line item number in the associated text box. For example, to view the last 3 line items for an order having 6 line items, enter a 4 in this field. By default, the system will start at line item 1.

Purchase Order Number - If you know a purchase order number associated with an order, you may view the entire order via that purchase order number. Click the Purchase Order Number radio button and enter a valid purchase order number in the associated text box.

Select Ticket Number - If you know a select ticket number associated with an order, you may view the entire order via that select ticket number. Click the Select Ticket Number radio button and enter a valid select ticket number in the associated text box.

Job Number - If you know the job for which an order was placed, you may view the entire order via that job number. Click the Job Number radio button and enter a valid job number in the associated text box.

If you want to view an order via its OrderMaster Number, but don't know the OrderMaster Number, select the OrderMaster radio button and press the SEARCH button. The SELECT ORDER dialog as shown in Fig. 192 is displayed.

This dialog is used to search for orders for a particular inventory site. To search for orders, you must enter the following information:

Inventory Site - Type or select an inventory site name in the Inventory Site combo box which contains a list of all inventory sites in the BellSouth region. If an inventory site is entered that is not in the list, the system displays an appropriate error message. Respond to the message by pressing OK.

Optionally, you may further limit the search by providing the following information:

Material Description - To search for orders for a particular material description, type a material description in the Material Description text box. You may type an entire material description or you may type a partial material description using an asterisk (*) to view orders for material starting and/or ending with the portion you provided. For example, AFAW* displays orders for material starting with "AFAW"; *100 displays orders for material ending in "100"; A*W displays orders for material starting with "A" and ending in "W".

To get help while on this dialog, press the HELP button. To close the dialog without selecting an order, press the CANCEL button. To view a list of OrderMaster Numbers and its associated items, press the UPDATE button. The system displays an appropriate message under the following conditions:

If the material description entered is not a valid material description, an error message is displayed. Respond to the message by pressing OK.

If no orders were found for the selected inventory site or material description, an appropriate message is displayed. Respond to the message by pressing OK.

If no errors are found, the following information is displayed:

OrderMaster Number - The number assigned by OrderMaster to an order.

Line Item - The line item assigned by OrderMaster to an ordered item.

Material Description - The description of the material ordered.

Quantity - The quantity of material ordered.

Job Number - The job for which the material was ordered.

To view a particular order, select it and press the OK button or double-click it. The system displays an appropriate error message if you press OK and an order was not selected from the grid. Respond to the message by pressing OK.

If no errors are found, the OrderMaster number selected is copied to the OrderMaster Number text box on the OPEN ORDER FOR RECEIPT and the line item selected is copied to the Start at Line Item text box. To start viewing the order from this line item, click the associated check box; otherwise the system will display the order starting at the first line item.

To view the specified order, press the OK button. The system displays an appropriate message under the following conditions:

If no orders were found for the identified OrderMaster number, purchase order number, select ticket number, or job number, an informative message is displayed. Respond to the message by pressing OK.

If no OrderMaster number, purchase order number, select ticket number, or job number is entered, an error message is displayed. Respond to the message by pressing OK.

If the first character of the purchase order number entered does not begin with the letter "P", an error message is displayed. Respond to the message by pressing OK.

If the select ticket number entered is not all numeric, an error message is displayed. Respond to the message by pressing OK.

Figure 193:
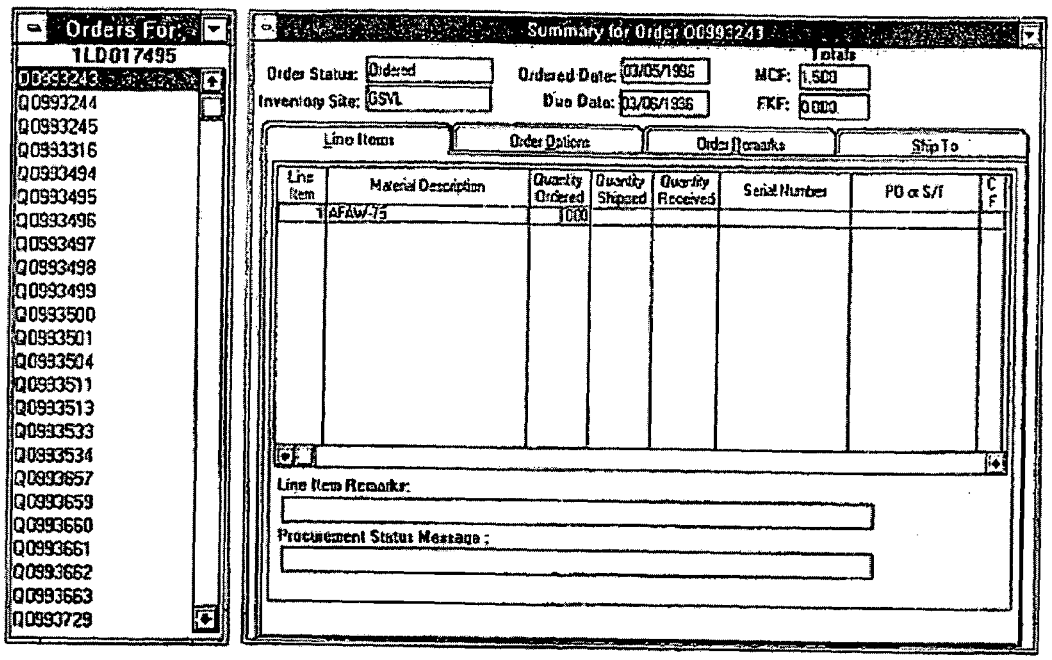

If no errors are found, the SUMMARY FOR ORDER xxxx window is displayed, where xxxx is the selected order number. If the view is by job number and multiple orders exist for that job, both the ORDERS window and the SUMMARY FOR ORDER window as shown in Fig. 193 are displayed.

The following information is displayed at the top of the SUMMARY FOR ORDER window:

Order Status - The status of the entire order. Values are:

"Ordered" -An order is in the "ordered" status if at least one item within that order remains in the "ordered" or "backordered" status.

"Backordered" - An order is in the "backordered" status only if every item within that order is "backordered".

"Shipped" - An order is in the "shipped" status if at least one item within that order remains in the "shipped" status and there is no item within that order in the "ordered" status.

"Received" - An order is in the "received" status only if every item within that order is "received" or "complete".

"Cancelled" - An order is in the "cancelled" status only if every item within that order is "cancelled".

Inventory Site - The inventory site responsible for procuring the material on this order.

Ordered Date - The requisition date of the order (i.e., the date the order was placed with OrderMaster).

Due Date - The date the order is due at the Ship To location.

Totals - The total MCF and/or FKF on the order.

In addition, there are four tabs on the SUMMARY FOR ORDER window: Line Items, Order Options, Order Remarks, and Ship To.

Figure 194:
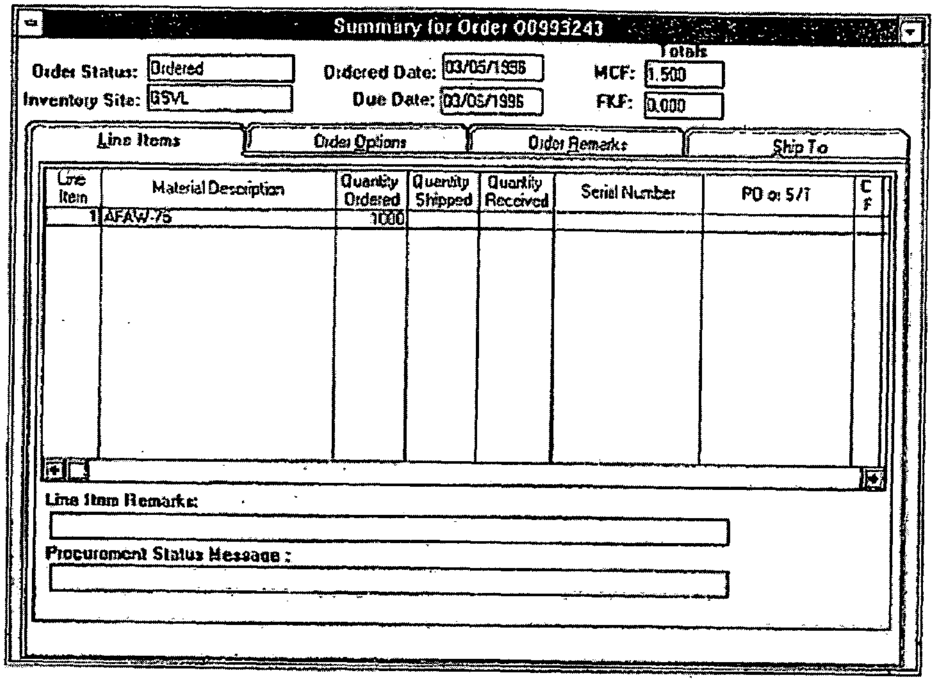

The Line Items tab as shown in Fig. 194 displays all items on the order starting with the line item specified.

The Line Items tab displays a line for each ordered item (called the "order line") followed by a line for each associated shipment (called the "shipment line"). The following information is displayed on an order line:

Line Item - The order item number. This is the line item number assigned by OrderMaster when the order was placed.

Material Description - The description of the material ordered.

Quantity Ordered - The quantity of material ordered.

Custom Features (abbreviated CF) - An asterisk (*) here indicates that the material was ordered with custom features.

Jeopardy Indicator (abbreviated JP) - An asterisk (*) here indicates that the order item is in jeopardy of not arriving by the on job date (Requisition Date + Shipping Interval > On Job Date).

Status - The status of the order item. Values are:

"Ordered" - An order item is in the "ordered" status if not all shipments for this order item have been shipped. If the entire order item is to be shipped from a BST warehouse, the order item will remain in the "ordered" status until REGIS loop closes all shipments associated with the order item. If any part of the order item is to be shipped from an outside vendor, the order item will remain in an "ordered" status until all associated shipments have been received.

"Backordered" - An order item is in the "backordered" status if every shipment for this order item is backordered. If the entire order item is to be shipped from an outside vendor, the order item will never obtain a "backordered" status because CAPRI does not notify OSPCM of backorders.

"Shipped" - An order item is in the "shipped" status if every shipment for this order item has been shipped. If the entire order item is to be shipped from a BST warehouse, the order item is considered "shipped" after REGIS loop closes all shipments for this order item. If the entire order item is to be shipped from an outside vendor, the order item will never obtain a "shipped" status because CAPRI does not send OSPCM actual ship dates.

"Received" - An order item is in the "received" status if the total quantity received for this order item is greater than or equal to the total quantity expected to be shipped.

"Complete" - An order item is in the "complete" status if you complete the order item and the total quantity received for this order item is greater than zero but less than the total quantity expected to be shipped (completing an order item is described in the Receipt Ordered Material section of this document). If an order item is in the "complete" status, any unreceived shipments will not be displayed.

"Cancelled" - An order item is in the "cancelled" status if every shipment is cancelled or if no shipments are ever received and you complete the order item. If an order item is in the "cancelled" status, any un-received shipments will not be displayed.

The following information is displayed on a shipment line:

Material Description - The description of the material shipped if a substitution was made. If the ordered material was shipped, this field is blank.

Quantity Shipped - The quantity of material shipped or scheduled to be shipped. If the shipment has been shipped from a BST warehouse, the quantity actually shipped is displayed. If the shipment has not yet been shipped, the quantity scheduled to be shipped is displayed. If the shipment is to be shipped from an outside vendor, the quantity actually shipped is never displayed since CAPRI does not furnish actual ship dates to OSPCM.

Quantity Received - The quantity of material received into inventory.

Serial Number - The serial number shipped from a BST warehouse or the serial number received into inventory following receipt of the shipment. This field is displayed only if the ordered material is serialized. If the shipment has been shipped from a BST warehouse, the expected serial number is displayed. If the shipment is to be shipped from an outside vendor, the serial number is not displayed because CAPRI does not furnish serial numbers to OSPCM. If the shipment has been received, the serial number that was received into inventory is displayed.

PO or S/T - The purchase order number or the select ticket number on which the material was shipped or is scheduled to be shipped. If the shipment is to be shipped from a BST warehouse, a select ticket number is displayed. If the shipment is to be shipped from an outside vendor, a purchase order number is displayed.

Status - The status of the shipment. Values are:

blank - The shipment is scheduled to be shipped.

"Shipped" - The shipment has been shipped from a BST warehouse. The shipment is considered "shipped" after REGIS loop closes the associated select ticket.

"Backordered" - The shipment has been put on backorder in a BST warehouse. The select ticket is held until the backorder has been resolved, at which time a new select ticket is assigned to the shipment.

"Future Day" - The associated select ticket has not yet been dropped in a BST warehouse because the due date on the order was too far in the future for REGIS to consider it a current day ticket. The select ticket is held until it becomes a current day ticket, at which time a new select ticket is assigned to the shipment.

"IBI Held" - The associated select ticket has not yet been dropped in a BST warehouse because the item is locked due to an out of balance situation for that item in the warehouse. The select ticket is held until the out of balance situation is corrected, at which time a new select ticket is assigned to the shipment.

"Re-inventory Held" - The associated select ticket has not yet been dropped in a BST warehouse because the warehouse is locked due to a physical inventory. The select ticket is held until the physical inventory is complete, at which time a new select ticket is assigned to the shipment.

The following remarks are displayed for the selected order line:

Line Item Remarks - This text box contains line item remarks entered at the time the order was placed.

Procurement Status Message - This text box contains error messages returned from REGIS (e.g., "Item not requisitionable", "Quantity reduced to maximum", etc.)

Figure 195:
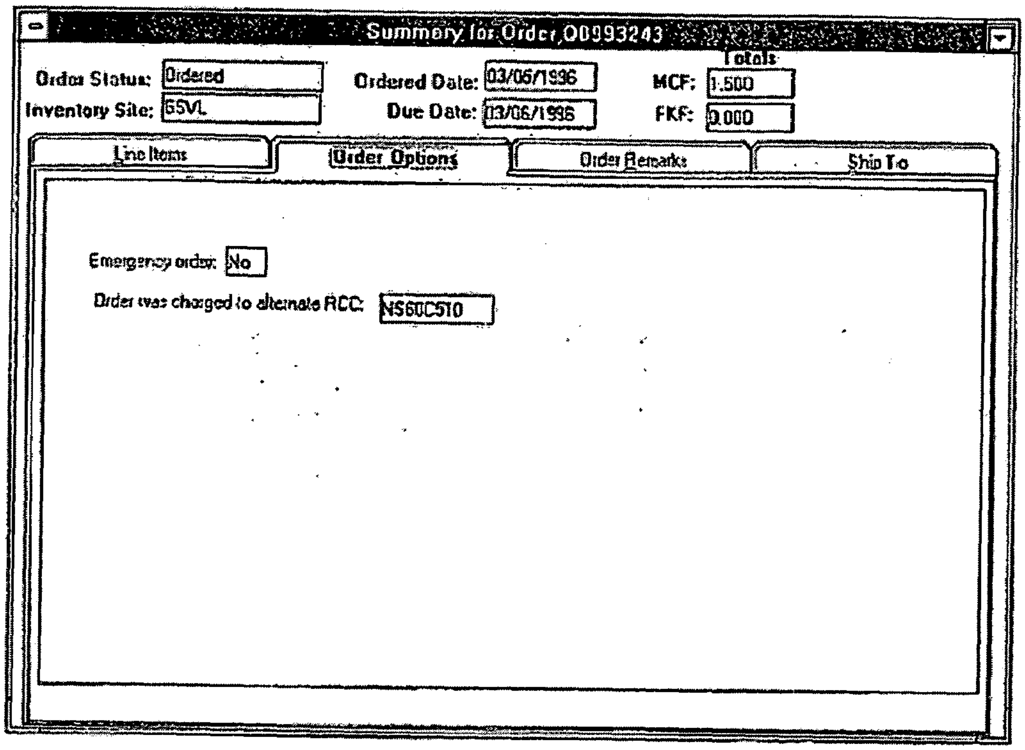

The Order Options tab as shown in Fig. 195 indicates whether or not the order was placed as an emergency and whether or not the order was charged to an alternate responsibility code.

The following information is displayed:

Emergency Order - If the order was placed as an emergency, "YES" is displayed; otherwise "NO" is displayed.

Order was charged to Alternate RCC -If the order was charged to an alternate RCC, the RCC to which the order was charged is displayed; otherwise "(none)" is displayed.

Figure 196:
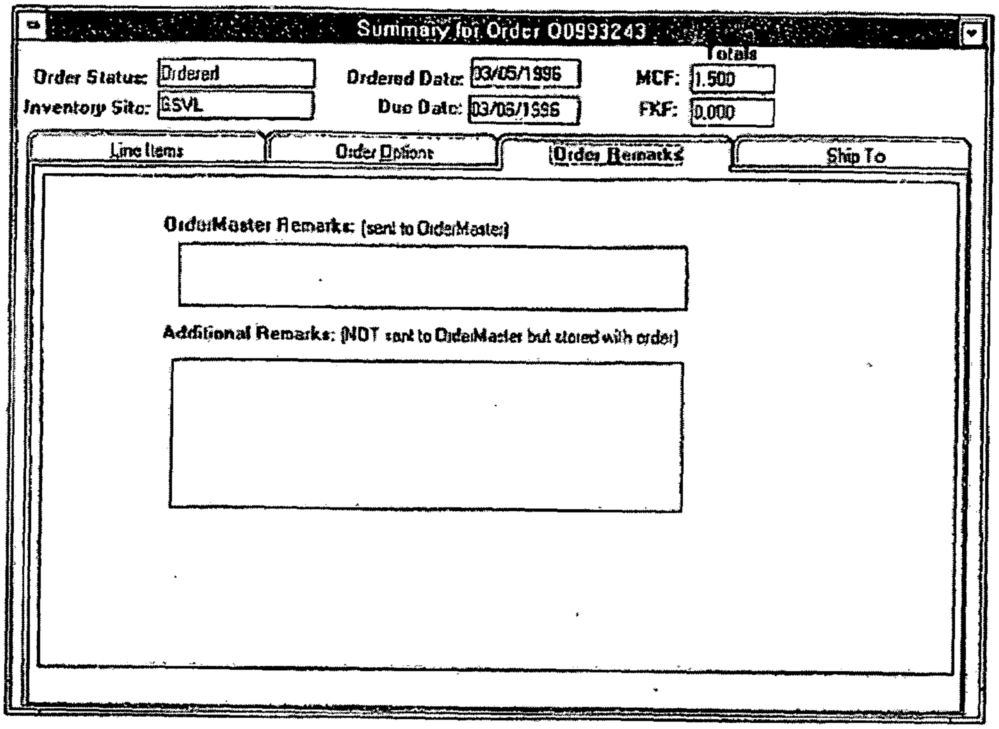

Remarks concerning the entire order may be viewed on the Order Remarks tab as shown in Fig. 196.

The following information is displayed:

OrderMaster Remarks – OrderMaster remarks are remarks that were passed to OrderMaster at the time the order was placed.

Additional Remarks – Additional remarks are remarks that were recorded with the order but were not passed to OrderMaster.

Figure 197:
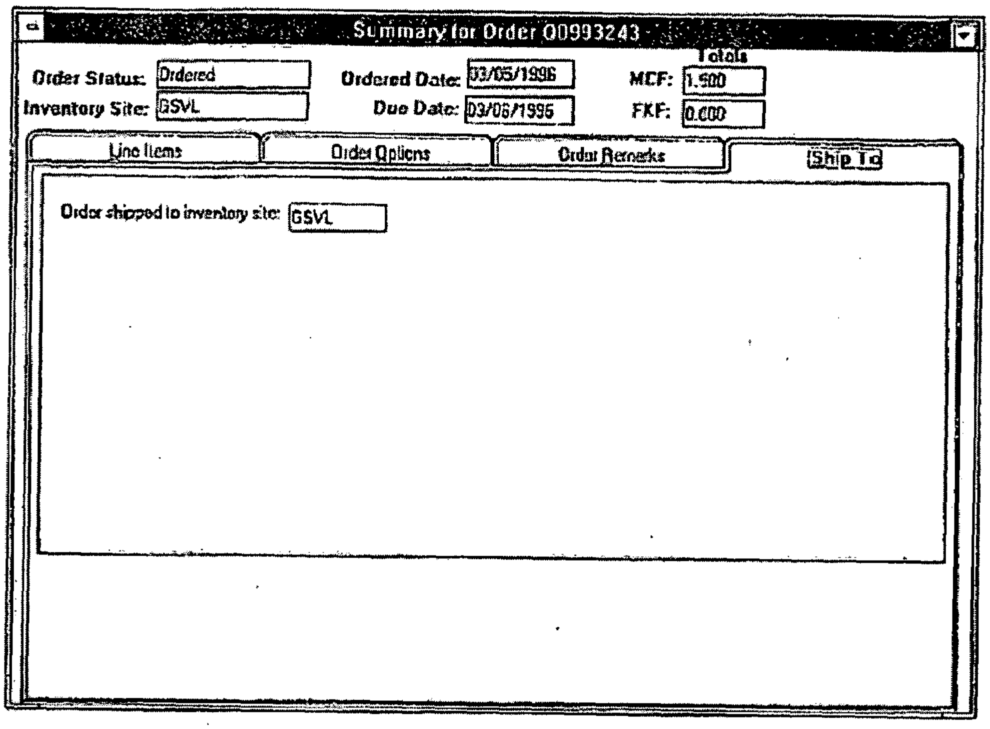

The SHIP TO tab as shown in Fig. 197 indicates whether the order should be shipped to the inventory site responsible for procuring the material, to an alternate inventory site, or to an alternate shipping address.

If shipped to an inventory site or alternate inventory site, the name of the inventory site is displayed. If shipped to an alternate shipping address the following information is displayed:

Saved Address - If the alternate address was saved with a code, the code by which this address was saved is displayed; otherwise "(none)" is displayed.

Contact Name - The name of the person to whom the order should be shipped or who should be notified of the shipment.

Contact Phone - The phone number of the person to whom the order should be shipped or the phone number of the person who should be notified of the shipment.

Company - The name of the company to which the order should be shipped.

Street - The street address to which the order should be shipped.

Room - The room number to which the order should be shipped.

City - The name of the city to which the order should be shipped.

State - The abbreviation of the state to which the order should be shipped.

Zip - The zip code to which the order should be shipped.

VIEW LINE ITEM DETAILS

To view the details for an ordered item, move the marquee to an order line or a shipment line and press ENTER or double-click one. The LINE ITEM DETAILS dialog as shown in Fig. 198 is displayed.

The LINE ITEM DETAILS dialog displays both order item details and shipment details. The Order Item Details frame displays the requirements aggregated to the selected ordered item. The same information is displayed in this frame whether you selected an order line or a shipment line.

The following information is displayed in the Order Item Details frame:

Job - The job for which the item was ordered.

Print - The job print for which the item was ordered.

Step - The job step for which the item was ordered.

Work Environment (abbreviated WE) - The work environment for which the material was ordered (e.g. B = buried).

Work Action - The type of work for which the material was ordered (e.g. PLAC = placing).

Quantity Ordered - The portion of the quantity needed that was ordered on this order item.

Jeopardy Indicator (abbreviated JP) - An asterisk (*) here indicates that the material ordered for this requirement is in jeopardy of not arriving by the on job date (Requisition Date + Shipping Interval > On Job Date).

Assembly Code (abbreviated AC) - A code indicating that the material ordered is part of an assembly.

The Shipment Details frame displays information about the selected shipment. If an order line was selected and multiple shipments exist, the Shipment Details frame is populated with data for the first shipment. If an order line was selected and no shipments exist, the Shipment Details frame does not display any information. To view the details for a specific shipment, double-click on a shipment line on the SUMMARY FOR ORDER window. To let you know which shipment is displayed, the upper right corner of the frame will display #n of x, where n is the selected shipment and x is the total number of shipments associated with this order item (e.g., #2 of 3).

The following information is displayed in the Shipment Details frame:

PO or S/T - The purchase order number or the select ticket number associated with this shipment. If the shipment is to be shipped from a BST warehouse, a select ticket number is displayed. If the shipment is to be shipped from an outside vendor, a purchase order number is displayed.

Line Item - The purchase order line item or, if a select ticket is displayed, the OrderMaster line item.

Scheduled Ship Date (or Shipped Date) - If the shipment is scheduled to be shipped from a BST warehouse, the date the shipment is scheduled to be shipped is displayed. If the shipment is scheduled to be shipped from an outside vendor and the vendor provides a shipment date to CAPRI, the date the shipment is scheduled to be shipped is displayed. If the vendor does not provide a shipment date, this field is blank. If the shipment was shipped from a BST warehouse, the date the shipment was actually shipped from the warehouse is displayed.

Received Date - The date the shipment was received into inventory.

If the item was ordered with custom features, a Custom Features frame is displayed on this dialog. The custom features displayed will vary with the type of material ordered.

If the ordered item is cable, the dialog displays the custom features associated with cable as shown in Fig. 199.

If the ordered item is a capacitor, the dialog displays the custom features associated with capacitors as shown in Fig. 200.

If the ordered item is a non-standard pedestal cross-box, the dialog displays its configuration as shown in Fig. 201.

If the ordered item is a non-standard pole-mounted cross-box, the dialog displays its configuration as shown in Fig. 202.

To get help while on this dialog, press the HELP button. To close this dialog, press the CLOSE button.

To close the SUMMARY FOR ORDER window, double-click the control box located in the upper left-hand corner of the window.

ADJUST AN INVENTORY BALANCE

During a physical inventory you may find that you have more or less inventory than the system indicates that you have and that you need to adjust an inventory balance.

First, display the INVENTORY ITEMS AT xxxx window, where xxxx is the selected inventory site as previously discussed in the third section of this document. The INVENTORY ITEMS window as shown in Fig. 203 is displayed.

To adjust an inventory balance, select the inventory item from the grid whose balance you need to adjust and press the Adjust Balances toolbar button located on the INVENTORY ITEMS window or select "Adjust Balances" from the Actions menu. The ADJUST INVENTORY ITEM BALANCE dialog as shown in Fig. 204 is displayed. This function is available if the following conditions are met:

You have security access to update inventory in this inventory site.

You are a Materials Management Manager or a Materials Management warehouse user.

If the selected inventory item is cable and does not have an in transit or awaiting return balance.

If the selected inventory item is serialized non-cable and it does not have an assigned balance.

If the selected inventory item is serialized material and has not been issued.

If the selected inventory item is non-serialized and its inventory balance is greater than zero.

This dialog allows you to adjust the selected inventory item's unassigned or surplus inventory balance. The following information is displayed about the selected inventory item:

Inventory Site - The name of the inventory site responsible for the inventory item.

Material Description - The material description of the inventory item.

Serial Number - The serial number of the inventory item (if serialized).

Assigned - The current assigned balance of the inventory item.

Unassigned - The current unassigned balance of the inventory item.

Surplus - The current surplus balance of the inventory item.

In Transit - The current in transit balance of the inventory item.

Awaiting Return - The current awaiting return balance of the inventory item.

Total Quantity - The current total on hand balance of the inventory item.

To adjust the inventory balance of the selected inventory item, provide the following information:

Unassigned - To increase or decrease the unassigned inventory balance, overtype the current quantity in the Unassigned text box with the new quantity. The value in the Total Quantity text box increases or decreases as the quantity is changed. If the selected inventory item is serialized material and the surplus balance is greater than zero, you cannot adjust the unassigned balance (i.e., the Unassigned text box is disabled).

Surplus - To increase or decrease the surplus inventory balance, overtype the current quantity in the Surplus text box with the new quantity. The value in the Total Quantity text box increases or decreases as the quantity is changed. If the selected inventory item is serialized material and the assigned or unassigned balance is greater than zero, you cannot adjust the surplus balance (i.e., the Surplus text box is disabled).

Remarks - Type in any remarks in the Remarks text box that you wish to have recorded with the Inventory Addition or Inventory Deletion transaction.

To get additional help while on this dialog, press the HELP button. To close this dialog without adjusting the inventory balance, press the CANCEL button. To close this dialog and adjust the inventory balance, press the OK button. The system displays an appropriate message if the following condition occurs:

If the selected inventory item is serialized non-cable material and the new unassigned or surplus balance is greater than 1, the system displays an appropriate error message. Respond to the message by pressing OK.

If there are no errors found, the system adjusts the selected inventory item's balance and records either an Inventory Deletion or Inventory Addition material inventory transaction as follows. Multiple transactions are created if you make adjustments to both the surplus and unassigned inventory balances. This could only happen if the selected inventory item was non-serialized material:

If decreasing the unassigned inventory balance, the system decreases the selected inventory item's unassigned balance and records an Inventory Deletion material inventory transaction from the unassigned status. If the inventory item's on hand balance reaches zero, the inventory item is deleted from the system.

If decreasing the surplus inventory balance, the system decreases the selected inventory item's surplus balance and records an Inventory Deletion material inventory transaction from the surplus status. If the inventory item's on hand balance reaches zero, the inventory item is deleted from the system.

If increasing the unassigned inventory balance, the system increases the selected inventory item's unassigned balance and records an Inventory Addition material inventory transaction from the unassigned status.

If increasing the surplus inventory balance, the system increases the selected inventory item's surplus balance and records an Inventory Addition material inventory transaction from the surplus status.

If the inventory item is central office equipment, the Inventory Addition or Inventory Deletion transaction is marked as not to be sent to Asset Management; otherwise it is marked to be sent to Asset Management.

If the inventory item's balance was adjusted successfully, the system displays an appropriate message. The inventory balances displayed on the INVENTORY ITEMS window are updated to reflect the results of the Inventory Addition and/or Inventory Deletion transaction. The Last Transaction Number text box is updated with the number of the last Inventory Addition or Inventory Deletion transaction created.

To close the INVENTORY ITEMS window, double-click the control box located in the upper left corner of the window.

CHANGE THE STATUS OF AN INVENTORY ITEM

Changing an inventory item's status involves moving an inventory balance from one inventory status to another.

First, display the INVENTORY ITEMS AT xxxx window, where xxxx is the selected inventory site as previously discussed in the third section of this document. The INVENTORY ITEMS window as shown in Fig. 205 is displayed.

To change an inventory item's inventory status, select an inventory item from the grid and press the Change Status toolbar button located on the INVENTORY ITEMS window or select "Change Status..." from the Actions menu. The CHANGE INVENTORY ITEM STATUS dialog ass shown in Fig. 206 is displayed. This function is available if the following conditions are met:

You have security access to update inventory in this inventory site.

You are a Materials Management Manager or a Materials Management Clerical user.

The selected inventory item has an unassigned, surplus, or an awaiting return balance.

If the selected inventory item is serialized material and does not have an assigned balance.

This dialog allows you to move some or all of an inventory balance among the unassigned, surplus, or awaiting return statuses. The following information is displayed about the selected inventory item:

Inventory Site - The name of the inventory site responsible for the inventory item.

Material Description - The material description of the inventory item.

Serial Number - The serial number of the inventory item (if serialized).

The Awaiting Return frame displays the inventory item's current awaiting return balance. The Unassigned frame displays the inventory item's current unassigned balance. The Surplus frame displays the inventory item's current surplus balance. The corresponding frame is not displayed if the inventory item does not have a balance in that status.

To change the inventory status of the selected inventory item, provide the following information:

Move Quantity - The quantity to be moved. If the selected inventory item is serialized material, the Move Quantity is set equal to the on hand balance of the inventory item and cannot be changed. If the selected inventory item is non-serialized material, type the quantity to move in the Move Quantity text box. The Move Quantity cannot be greater than the current balance, but must be greater than zero.

Change To - The inventory status to which the inventory item should be moved. You may move unassigned inventory to either awaiting return or surplus. You may move surplus inventory to either unassigned or awaiting return. You may move awaiting return inventory to either unassigned or surplus. Select the appropriate radio button.

Remarks - Type in any remarks in the Remarks text box that you wish to have recorded with the Change Inventory Status transaction.

To get additional help while on this dialog, press the HELP button. To close this dialog without changing the inventory status, press the CLOSE button. To close this dialog and change the inventory status, press the OK button. The system displays an appropriate message if the following conditions occur:

If the Move Quantity is greater than the current unassigned, surplus, or awaiting return balance, the system displays an appropriate error message. Respond to the message by pressing OK.

If the Move Quantity is equal to zero, the system displays an appropriate error message. Respond to the message by pressing OK.

If there are no errors found, the system changes the status of the selected inventory item and records an Inventory Status Change material inventory transaction as follows. Multiple transactions are created if you change more than one status. This could only happen if the inventory item was non-serialized material:

If changing the status of unassigned inventory, the system decreases the inventory item's unassigned balance by the Move Quantity, increases either its awaiting return or surplus balance (depending on the status selected) by the same quantity, and records an Inventory Status Change material inventory transaction from the unassigned status to either the awaiting return or surplus status.

If changing the status of surplus inventory, the system decreases the inventory item's surplus balance by the Move Quantity, increases either its unassigned or awaiting return balance (depending on the status selected) by the same quantity, and records an Inventory Status Change material inventory transaction from the surplus status to either the unassigned or awaiting return status.

If changing the status of awaiting return inventory, the system decreases the inventory item's awaiting return balance by the Move Quantity, increases either its unassigned or surplus balance (depending on the status selected) by the same quantity, and records an Inventory Status Change material inventory transaction from the awaiting return status to either the unassigned or surplus status.

The Inventory Status Change transaction is marked as not to be sent to Asset Management.

If the inventory item's status was changed successfully, the system displays an appropriate message and the inventory balances displayed on the INVENTORY ITEMS window are updated to reflect the results of the Inventory Status Change transaction.

To close the INVENTORY ITEMS window, double-click the control box located in the upper left corner of the window.

EXEMPT AN INVENTORY ITEM

All inventoried material is considered non-exempt material. There are certain situations in which you might want to reclassify the inventory item as exempt material (e.g., using the material for a maintenance job rather than an engineered job).

First, display the INVENTORY ITEMS AT xxxx window, where xxxx is the selected inventory site as previously discussed in the third section of this document. The INVENTORY ITEMS window as shown in Fig. 207 is displayed.

To reclassify an inventory item as exempt material, select an inventory item from the grid and press the Reclassify to Exempt toolbar button located on the INVENTORY ITEMS window or select "Reclassify to Exempt..." from the Actions menu. The EXEMPT INVENTORY ITEM dialog as shown in Fig. 208 is displayed. This function is available if the following conditions are met:

You have security access to update inventory in this inventory site.

You are a Materials Management Manager or a Materials Management Clerical user.

If the selected inventory item has an unassigned, surplus, or awaiting return inventory balance.

If the selected inventory item is serialized material and does not have an assigned balance.

This dialog allows you to reclassify an inventory item as exempt material. The following information is displayed about the selected inventory item:

Inventory Site - The name of the inventory site responsible for the inventory item.

Material Description - The material description of the inventory item.

Serial Number - The serial number of the inventory item (if serialized).

The Unassigned frame displays the inventory item's current unassigned balance. The Surplus frame displays the inventory item's current surplus balance. The Awaiting Return frame displays the inventory item's current awaiting return balance. The corresponding frame is not displayed if the inventory item does not have a balance in that status.

To exempt the selected inventory item, provide the following information:

Exempt Quantity - The quantity to be exempted. If the selected inventory item is serialized material, the Exempt Quantity is set equal to the on hand balance of the inventory item and cannot be changed. If the selected inventory item is non-serialized material, type the quantity to exempt in the Exempt Quantity text box. The Exempt Quantity cannot be greater than the current balance, but must be greater than zero.

Remarks - Type in any remarks in the Remarks text box that you wish to have recorded with the Reclassify to Exempt transaction.

To get additional help while on this dialog, press the HELP button. To close this dialog without exempting the inventory item, press the CLOSE button. To close this dialog and exempt the inventory item, press the OK button. The system displays an appropriate message if the following conditions occur:

If the Exempt Quantity is greater than the current unassigned, surplus, or awaiting return balance, the system displays an appropriate error message. Respond to the message by pressing OK.

If the Exempt Quantity is equal to zero, the system displays an appropriate error message. Respond to the message by pressing OK.

If there are no errors found, the system exempts the selected inventory item and records a Reclassify to Exempt material inventory transaction as follows. Multiple transactions are created if you exempt from more than one status. This could only happen if the inventory item was non-serialized material:

If exempting awaiting return inventory, the system decreases the inventory item's awaiting return balance by the Exempt Quantity and records a Reclassify to Exempt material inventory transaction from the awaiting return status. If the inventory item's on hand balance reaches zero, the inventory item is deleted from the system.

If exempting unassigned inventory, the system decreases the inventory item's unassigned balance by the Exempt Quantity and records a Reclassify to Exempt material inventory transaction from the unassigned status. If the inventory item's on hand balance reaches zero, the inventory item is deleted from the system.

If exempting surplus inventory, the system decreases the inventory item's surplus balance by the Exempt Quantity and records a Reclassify to Exempt material inventory transaction from the surplus status. If the inventory item's on hand balance reaches zero, the inventory item is deleted from the system.

If the inventory item is central office equipment, the Reclassify to Exempt transaction is marked as not to be sent to Asset Management; otherwise it is marked to be sent to Asset Management.

If the inventory item was reclassified successfully, the system displays an appropriate message. The inventory balances displayed on the INVENTORY ITEMS window are updated to reflect the results of the Reclassify to Exempt transaction. The Last Transaction Number text box is updated with the number of last Reclassify to Exempt transaction created.

To close the INVENTORY ITEMS window, double-click the control box located in the upper left corner of the window.

The invention claimed is:

1. A system for use in facilitating managing a job, the system comprising:

a bid and award application executed by a computer for generating bid packages for a job and for receiving completed bids, wherein the bid and award application stores at least one previous bid that was made on the job and awards the job based on the at least one previous bid;

a job entry application executed by a computer for defining at least one task within the job and determining whether the task should be accomplished by a contractor;

a scheduling application executed by a computer for assigning personnel to the at least one task;

a materials management application executed by a computer for assigning any needed materials to the at least one task; and an interface for receiving updates on the status of the at least one task, wherein the interface includes a billing and reporting application for receiving input from the contractor as to completed tasks and billings, wherein if the billings vary from a billing expectation of the system, the variations are sent by the billing and reporting application to a supervisor for approval, wherein upon approval of the supervisor or no variations, the billing and reporting application prepares an invoice for payment.

2. The system as set forth in claim 1, further including a pricing application executed by a computer for assigning a cost to the at least one task.

3. The system as set forth in claim 1, further including a regional contracts application executed by a computer for providing a contract template for use by the bid and award application.

4. The system as forth in claim 3, wherein the bid and award application is for generating the bid packages by adding contract work items and contractor information to the contract template.

5. The system as set forth in claim 1, wherein the job entry application is for configuring the at least one task into activities and for chronologically scheduling the activities based on desired completion dates of the activities.

6. The system as set forth in claim 2, wherein the pricing application is for assigning labor and material costs to the at least one task.

7. The system as set forth in claim 1, wherein the scheduling application is for assigning personnel to the at least one task based on worker profiles indicating availability of the personnel.

8. The system as set forth in claim 1, wherein the materials management application is for tracking materials within inventory.

9. The system as set forth in claim 1, wherein the materials management application is for assigning materials in inventory to the at least one task.

10. The system as set forth in claim 1, wherein the materials management application is for determining which materials are not within inventory and generating orders for the needed materials.

11. A computer-implemented method for facilitating managing a job, the method comprising the step of:

generating bid packages for a job and for receiving completed bids;

storing at least one previous bid that was made on the job;

awarding the job based on the at least one previous bid;

defining at least one task within the job and determining whether the task should be accomplished by a contractor;

assigning personnel to the at least one task;

assigning any needed materials to the at least one task;

receiving updates on the status of the at least one task via an interface; and receiving input from the contractor as to completed tasks and billings, wherein if the billings vary from a billing expectation, the variations are sent by a billing and reporting application to a supervisor for approval, wherein upon approval of the supervisor or no variations, the billing and reporting application prepares an invoice for payment, wherein the above steps are executed by a computer.

12. The computer-implemented method of claim 11, further comprising assigning a cost to the at least one task.

13. The computer-implemented method of claim 12, further comprising assigning labor and material costs to the at least one task.

14. The computer-implemented method of claim 11, further comprising providing a contract template.

15. The computer-implemented method of claim 14, further comprising generating the bid packages by adding contract work items and contractor information to the contract template.

16. The computer-implemented method of claim 11, further comprising configuring the at least one task into activities and for chronologically scheduling the activities based on desired completion dates of the activities.

17. The computer-implemented method of claim 11, further comprising assigning personnel to the at least one task based on worker profiles indicating availability of the personnel.

18. The computer-implemented method of claim 11, further comprising tracking materials within inventory.

19. The computer-implemented method of claim 11, further comprising assigning materials in inventory to the at least one task.

20. The computer-implemented method of claim 11, further comprising determining which materials are not within inventory and generating orders for the needed materials.

* * * * *